US006632696B2

(12) United States Patent
Kimura et al.

(10) Patent No.: US 6,632,696 B2
(45) Date of Patent: Oct. 14, 2003

(54) MANUFACTURING METHOD OF ACTIVE MATRIX SUBSTRATE PLATE AND MANUFACTURING METHOD THEREFOR

(75) Inventors: Shigeru Kimura, Tokyo (JP); Takahiko Watanabe, Tokyo (JP); Tae Yoshikawa, Tokyo (JP); Hiroyuki Uchida, Izumi (JP); Shusaku Kido, Izumi (JP); Shinichi Nakata, Izumi (JP); Tsutomu Hamada, Izumi (JP); Hisanobu Shimodouzono, Izumi (JP); Satoshi Doi, Izumi (JP); Toshihiko Harano, Izumi (JP); Akitoshi Maeda, Tokyo (JP); Satoshi Ihida, Tokyo (JP); Hiroaki Tanaka, Tokyo (JP); Takasuke Hayase, Tokyo (JP); Shouichi Kuroha, Tokyo (JP); Hirofumi Ihara, Tokyo (JP); Kazushige Takechi, Tokyo (JP)

(73) Assignee: NEC Corporation (JP)

( * ) Notice: Subject to any disclaimer, the term of this patent is extended or adjusted under 35 U.S.C. 154(b) by 231 days.

(21) Appl. No.: 09/745,657

(22) Filed: Dec. 20, 2000

(65) Prior Publication Data

US 2001/0010370 A1 Aug. 2, 2001

(30) Foreign Application Priority Data

Dec. 28, 1999 (JP) .......................................... 11-377296
Aug. 23, 2000 (JP) .................................... P2000-252076

(51) Int. Cl.[7] ................................................ H01L 21/00
(52) U.S. Cl. ........................................... 438/30; 438/66
(58) Field of Search ............................ 438/22–38, 149, 438/66

(56) References Cited

U.S. PATENT DOCUMENTS 5,060,036 A 10/1991 Choi ......................... 357/23.7
5,508,289 A 4/1996 Michejda et al. ........... 514/287
5,610,738 A 3/1997 Sasano et al. ................ 349/43
5,774,100 A 6/1998 Aoki et al. .................... 345/87
5,870,075 A 2/1999 Yamazaki et al. .......... 345/149
5,930,607 A 7/1999 Satou ......................... 438/158
6,162,654 A * 12/2000 Kawabe ...................... 349/106

FOREIGN PATENT DOCUMENTS

| | | | |
|---|---|---|---|
| EP | 0 747 182 | 12/1996 | B27K/3/15 |
| EP | 0 837 447 | 4/1998 | G09G/3/36 |
| JP | 62-35669 | 2/1987 | H01L/27/12 |
| JP | 63-15472 | 1/1988 | H01L/29/78 |
| JP | 6-160905 | 6/1994 | G02F/1/136 |
| JP | 7-175084 | 4/1995 | G02F/1/136 |
| JP | 7-147410 | 6/1995 | H01L/29/786 |
| JP | 8-15733 | 1/1996 | G02F/1/136 |
| JP | 8-43853 | 2/1996 | G02F/1/136 |
| JP | 8-146462 | 6/1996 | G02F/1/136 |
| JP | 9-120083 | 6/1997 | G02F/1/136 |
| JP | 2000-216395 | 8/2000 | H01L/29/786 |

* cited by examiner

*Primary Examiner*—Jey Tsai
(74) *Attorney, Agent, or Firm*—Hayes Soloway P.C.

(57) ABSTRACT

An active matrix substrate plate having superior properties is manufactured at high yield using four photolithographic fabrication steps. In step 1, the scanning line and the gate electrode extending from the scanning line are formed in the glass plate. In step 2, the gate insulation layer and the semiconductor layer comprised by amorphous silicon layer and $n^+$ amorphous silicon layer is laminated to provide the semiconductor layer for the TFT section. In step 3, the transparent conductive layer and the metallic layer are laminated, and the signal line, the drain electrode extending from the signal line, the pixel electrode and the source electrode extending from the pixel electrode are formed, and the $n^+$ amorphous silicon layer of the channel gap is removed by etching. In step 4, the protective insulation layer is formed, and the protective insulation layer and the metal layer above the pixel electrode are removed by etching.

17 Claims, 184 Drawing Sheets

MANUFACTURING METHOD OF ACTIVE MATRIX SUBSTRATE PLATE AND MANUFACTURING METHOD THEREFOR

BACKGROUND OF THE INVENTION

1. Field of the Invention

The present invention relates to an active matrix substrate plate used in liquid crystal display apparatuses and a manufacturing method therefor, and relates in particular to an active matrix substrate plate having superior properties made by a manufacturing process based on simplified processing steps and improved yield.

2. Description of the Related Art

Active matrix type liquid crystal display apparatus using thin film transistors (abbreviated as TFT hereinbelow) as switching elements is constructed by placing a color filter substrate plate opposite to an active matrix substrate plate, in which independent pixel regions containing a TFT and a pixel electrode in each pixel region are arranged in a matrix, with an intervening liquid crystal layer. Also, a light blocking layer is provided on the color filter substrate plate or on the active matrix substrate plate in the TFT section and the boundary region in each pixel region.

An example of the circuit arrangement of the active matrix substrate plate is shown in FIG. 182. In FIG. 182, this active matrix substrate plate is formed such that a plurality of scanning lines 1011 are formed on a transparent insulation substrate plate and a plurality of parallel signal lines 1031 are formed on the transparent insulating substrate plate so as to cross the scanning lines at right angles across the gate insulation layer (not shown), and near the intersection of the scanning line and the signal line, an inverted staggered structure TFT 1060 comprised by a gate electrode 1012, an island-shaped semiconductor layer opposing the gate electrode across the gate insulation layer, and a pair of drain electrodes 1032 and source electrodes 1033 separated by a channel gap above the semiconductor layer. And in a window section Wd surrounded by a scanning line 1011 and a signal line 1031, there are provided a pixel electrode 1041 and an accumulation capacitance section 1070, in such a way that the gate electrode 1012 is connected to the scanning line 1011, the drain electrode 1032 to the signal line 1031, and the source electrode 1033 to the pixel electrode 1041.

The window section Wd and the scanning line 1011 and the signal line 1031 surrounding the window section, the region comprised by TFT 1060 are referred to as the "pixel region Px," hereinbelow. A plurality of such pixel regions Px are arranged next to each other in a matrix pattern to construct a display surface Dp of the liquid crystal display apparatus.

The scanning lines 1011 are extended outside of the display surface Dp, and at the start end located at its tip, the scanning line terminal 1015 exposed on the surface of the active matrix substrate plate is formed. Also, each signal line 1031 is extended outside of the display surface Dp, and at the start end located at its tip, the signal line terminal 1035 exposed on the surface of the active matrix substrate plate is formed.

On the outside of the display surface Dp, a protective transistor 1080 may sometimes be attached for protecting the TFT connected to each signal line and scanning line, in case of excess current flow. And, the adjacent signal lines 1031, for the purpose of dispersing unexpected electrical shock and protecting the TFT in the pixel region, may sometimes be connected electrically to each other at the outside of the display surface Dp with a high resistance line.

On the outer peripheral section of the display surface Dp, for the purpose of preventing difficulties such as shorting between layers caused unexpected electrical shock generated on the active matrix substrate plate during the production by dispersing over all the wiring, or for the purpose of inspecting circuit defects, there are provided various kinds of peripheral circuits such as a gate-shut bus line 1091 for linking each scanning line 1011, a drain-shunt bus line 1092 for linking each signal line 1031, a connection section for connecting the gate-shunt bus line and the drain-shut bus line, inspection pads 1094 and 1095 for scanning lines and signal lines, respectively, and when manufacturing is completed, the peripheral circuits excepting the inspection pads are removed along with the substrate plate edge pieces.

The active matrix substrate plate having its edge pieces cutoff excepting the inspection pads is processed in such a way that respective scanning line terminals 1015 are connected to a not-shown scanning line driver, and the signal line terminals 1035 are connected to a not-shown signal line driver, and according to signals from respective drivers, specific individual pixel signals are input into the pixel electrode 1041 through each TFT 1060 in the pixel region.

The pixel electrode 1041 is disposed opposite to a common electrode 1014, and the liquid crystal in the pixel region is driven by applying a potential difference between the electrodes. There are two types of arrangement of the pixel electrode and the common electrode. In one type of configuration, as shown in FIG. 183A, the pixel electrode 1041 formed on the active matrix substrate plate and the common electrode 1014 formed over the entire display region of the color filter substrate plate are placed opposite to each other across the liquid crystal Lc, and this configuration is commonly called "twisted nematic type (referred to TN-type hereinbelow)". The other configuration is, as shown in FIG. 183B, pixel electrode 1041 formed in a comb-teeth shape and the common electrode 1014 formed in a comb-teeth shape on the active matrix substrate plate are placed opposite to each other non-contactingly. This configuration is commonly called "in plane switching method" (referred to as the IPS type hereinbelow).

TFT 1060 has a gate electrode 1012 extending from the scanning line 1011 in each pixel region Px, an electrode (it is referred to as the drain electrode in the following) 1032 extending from the signal line 1031, an electrode (it is referred to as the source electrode, in the following) 1033 connected to the pixel electrode 1041, and when a scanning line signal is transmitted to the gate electrode 1012, drain electrode 1032 and source electrode 1033 selectively become conductive so that a pixel signal forwarded from the signal line 1031 is transmitted to the pixel electrode 1041, and the liquid crystal is driven by the potential difference generated between the pixel electrode 1041 and the common electrode 1014.

The accumulation capacitance section 1070 is comprised by an accumulation capacitance electrode 1071 and a common accumulation electrode 1072, and is provided for the purpose of holding the liquid crystal driving potential until the next selection signal is applied on the gate electrode 1012 by preventing, when the scanning line 1011 becomes non-selective, fluctuations in the potential caused by leaking of the liquid crystal driving potential applied on the pixel electrode 1041 through the TFT 1060 and the like. FIG. 182 shows a gate-storage type of capacitance accumulation in which the common accumulation electrode 1072 is connected to the forestage scanning line, but a common-storage type of capacitance accumulation in which the common accumulation electrode 1072 is connected to the common wiring 1013 may sometimes be used.

An example (for example, a Japanese Unpublished Patent Application, First Publication, Hei 9-120083) of manufacturing steps of active matrix substrate plate for a conventional TN-type liquid crystal display apparatus having the circuit configuration described above will be explained with reference to FIGS. 184A–184E. In this case, a combination of patterning and etching steps (referred to simply as etching hereinbelow) based on film deposition and photolithography technique is regarded as one processing step. Also, in the following explanations, the location where the pixel region 1041 of the active matrix substrate plate is formed will be referred to as the window Wd, the location where TFT 1060 is formed as the TFT section Tf, the location where the accumulation capacitance section 1071 is formed as the accumulation capacitance section Cp, and outer peripheral regions of the display surface Dp where peripheral circuits such as terminals are formed as the outer peripheral section Ss.

(Step 1) As shown in FIG. 184A, a metallic layer 1010 is formed on the glass plate 1001, and excepting the scanning line 1011 (not shown) and the gate electrode 1012 extending from the scanning line to the TFT section Tf, the scanning terminal 1015 extending to the outer periphery section Ss, and the common accumulation electrode 1072 of the accumulation capacitance section Cp, the metallic layer 1010 is removed by etching.

(Step 2) As shown in FIG. 184B, laminating successively the gate insulation layer 1002 and the semiconductor layer 1020, comprised by an amorphous silicon layer 1021 and an $n^+$ amorphous silicon layer 1022, on the transparent insulation substrate plate, the semiconductor layer 1020 is removed excepting the TFT section Tf.

(Step 3) As shown in FIG. 184C, a metallic layer 1030 is formed on the transparent insulation substrate plate, and excepting the signal line 1031, signal line terminal 1035 extending from the signal line to the outer peripheral section Ss, drain electrode 1032, and source electrode 1033, the metallic layer 1030 is removed by etching. Next, using the remaining metallic layer as masking, the $n^+$ amorphous silicon layer 1022 exposed at the channel gap 1023 in the TFT section is removed.

(Step 4) As shown in FIG. 184D, a protective insulation layer 1003 is formed on the transparent insulation substrate plate, and a first opening 1061 reaching the signal line terminal 1035 by punching through the protective insulation layer 1003 in the outer peripheral section Ss, a second opening 1062 reaching the source electrode 1033 by punching through the protective insulation layer 1003 in the TFT section Tf, and a third opening 1063 reaching the scanning line terminal 1015 by punching through the protective insulation layer 1003 and the gate insulation layer 1002 in the outer peripheral section Ss are formed by etching.

(Step 5) As shown in FIG. 184E, a transparent conductive layer 1040 is formed on the transparent insulation substrate plate, and excepting the pixel electrode 1041 extending to the window section Wd and connected to the source electrode 1033 through the second opening 1062 in the TFT section Tf, the accumulation capacitance electrode 1071 extending from the pixel electrode above the common accumulation electrode 1072 in the accumulation capacitance section Cp, the terminal pad 1095 exposed above the signal line terminal 1035 through the first opening 1061 and above the scanning line terminal 1015 through the third opening 1063 in the outer peripheral section Ss, the transparent conductive layer 1040 is removed by etching to complete the processing steps.

Although there have been many methods other than the process described above for manufacturing the active matrix substrate plates, when a combination of film depositing, patterning and etching processes is regarded as one processing step, all the conventional methods require five processing steps or more. However, in recent years, in place of cathode ray tubes as a display device for personal computers and monitors, liquid crystal display apparatuses are beginning to be used frequently, and along with this trend, there has been strong demand for lowering the cost of large liquid crystal display screens. Lowering the cost of liquid crystal display apparatus requires an integrated effort to lower the cost, but one element of such effort is simplification of the manufacturing process. Especially, if the photolithographic steps are increased, resulting higher number of processing steps leads to the necessity for large investments in facilities while increasing the probability of yield drop, methods of reducing the number of etching steps have been sought actively.

Further, according to the conventional manufacturing methods, to form peripheral circuits such as protective transistors, even more processing steps are sometimes required, and drop in yield caused by etching operation has also been experienced, which is caused by infiltration corrosion of needed underlying layers which should have been left intact.

Various methods for reducing the number of etching have been proposed in the past. For example, according to a Japanese Patent No. 2570255, Second Publication, and a Japanese Unpublished Patent Application, First Publication, Showa 63-15472, in step 1, scanning line and gate electrode are formed, in step 2, after forming films for gate insulation layer and semiconductor layer and metallic layer, excepting the regions where signal line and drain electrode and source electrode are continued, the metallic layer and the semiconductor layer are removed by etching, in step 3, after forming the transparent conductive layer, the transparent conductive layer and channel gap metallic layer are removed by etching except the signal line, the drain electrode, source electrode and pixel electrode extending from the source electrode, and next, removing the $n^+$ amorphous silicon layer using the remaining transparent conductive layer as masking, and in step 4, after forming a protective insulation layer, the protective insulation layer on the pixel electrode is removed by etching, thus constituting a process comprised by four steps. However, according to this method, because the gate metallic layer and drain metallic layer are not electrically convertible, protective transistors cannot be formed, so that the yield has been a problem.

Also, a Japanese Unpublished Patent Application, First Publication, Hei 7-175084 discloses a process in which, in step 1, scanning line and gate electrode are formed, in step 2, after forming films of gate insulation layer and semiconductor layer, excepting the semiconductor layer of the TFT section, a gate insulation layer and semiconductor layer are removed by etching in step 3, after forming the transparent conductive layer, excepting the signal line, pixel electrode, drain electrode and source electrode, the transparent conductive layer is removed next, using the remaining transparent conductive layer as masking, $n^+$ amorphous silicon layer is removed, and in step 4, after forming a protective insulation layer, the protective insulation layer above the pixel electrode is removed, thus constituting a process comprised by four steps. However, this method has a problem of quality of displays and the yield, because the signal lines, drain electrodes, source electrodes and others are made only of transparent conductive layer (ITO, indium tin oxide) that has high resistance and susceptible to causing film defects.

Further, a Japanese Unpublished Patent Application, First Publication, Hei 8-146462, proposes, in step 1, to form scanning line and gate electrode and in step 2, after forming films of the gate insulation layer, the semiconductor layer and metallic silicide layer, excepting the portions linking the signal line, drain electrode and source electrode, the metallic silicide layer, semiconductor layer, and gate insulation layer are removed by etching and in step 3, after forming films of the transparent conductive layer and metallic layer, excepting the signal line, drain electrode, source electrode and the pixel electrode linking the signal line, drain electrode and source electrode and pixel electrode linked to the source electrode, the metallic layer and the transparent conductive layer are removed by etching and next, using the remaining metallic layer as masking, removing the $n^+$ amorphous silicon layer, and in step 4, after forming a protective insulation layer, the protective insulation layer above the pixel electrodes and the metallic layer are removed by etching, thereby constituting a 4-step process.

However, the methods according to a Japanese Unpublished Patent Application, First Publication, Hei 7-175084 and a Japanese Unpublished Patent Application, First Publication, Hei 8-146462, during etching of the metallic layer of signal lines and transparent conductive layer or protective insulation layer, due to infiltration of etching solution, signal line may be severed or the scanning lines in the lower layer and circuit elements of the gate electrodes and the like may become corroded and/or scanning line and signal line may become shorted, which cause poor yield or problems in the properties of the active matrix substrate plate, and therefore, it was difficult to put these techniques into practice.

SUMMARY OF THE INVENTION

The present invention is provided to resolve such forgoing problems, and therefore, the object is to provide an active matrix substrate plate that can be produced with good yield and superior properties using a lesser number of manufacturing steps and its manufacturing methods.

To resolve the subject matter, the active matrix substrate plate according to the first aspect of this invention is formed on a transparent insulating substrate plate having an array of pixel regions, wherein each pixel region contains a scanning line and a signal line and is surrounded by the scanning line and the signal line crossing each other at right angles, and in each pixel region is formed an inverted staggered structure thin film transistor comprised by a gate electrode, an island-shaped semiconductor layer opposing the gate electrode across a gate insulation layer, a pair of drain electrode and source electrode separated by a channel gap formed above the semiconductor layer, such that a pixel electrode is formed in a window section surrounded by the scanning line and the signal line for transmitting light, and the gate electrode is connected to the scanning line, the drain electrode is connected to the signal line, and the source electrode is connected to the pixel electrode (the TN-type active matrix substrate plate), wherein, the signal line, the source electrode and the drain electrode in all cases are formed by laminating a metallic layer on top of a transparent conductive layer, and the transparent conductive layer below the source electrode extends above the gate insulation layer of the window section so as to form the pixel electrode.

This TN-type active matrix substrate plate can be manufactured in four steps so that the productivity and the yield are improved.

Also, in this active matrix substrate plate, because the signal line is comprised by laminating a metallic layer and the transparent conductive layer, wiring resistance of the signal line can be reduced and the yield drop due to severing of lines can be suppressed, and because the source electrode and the pixel electrode are comprised integrally by the transparent conductive layer, an increase in the contact resistance can be suppressed and the performance properties are enhanced.

The active matrix substrate plate according to the second aspect of this invention is formed on a transparent insulating substrate plate by a plurality of scanning lines alternating with a plurality of common wiring lines, and a pixel region, containing a scanning line and a signal line is surrounded by the scanning line and the signal line crossing at right angles to each other, is arrayed in such a way that in each pixel region is formed an inverted staggered structure thin film transistor comprised by a gate electrode, an island-shaped semiconductor layer opposing the gate electrode across a gate insulation layer, a pair of drain electrode and source electrode separated by a channel gap formed above the semiconductor layer, such that in a window section surrounded by the scanning line and the signal line are formed a pixel electrode of a comb teeth shape and a common electrode of a comb teeth shape connecting to a common wiring line and opposing the pixel electrode, so that the gate electrode is connected to the scanning line, the drain electrode is connected to the signal line, and the source electrode is connected to the pixel electrode, so as to generate a horizontal electrical field with respect to the transparent insulating substrate plate between the pixel electrode and the common electrode(the IPS-type active matrix substrate plate), wherein, the common wiring line and the common electrode are both formed on a same layer as the scanning line, and at least in one perimeter section of the transparent insulating substrate plate, an end section of the common wiring line is formed so as to extend outside of an end section of the scanning line in the one perimeter section, and the end section of the common wiring line is linked to each other on the same layer as the scanning line.

This IPS-type active matrix substrate plate can be made in four steps so that the productivity and the yield are improved.

Also, in this active matrix substrate plate, the end section of the common wiring line extends outside of the end section of one perimeter section of the scanning line in the one perimeter section or opposing perimeter sections of the transparent insulating substrate plate, and the end section of the common wiring is linked to each other by the common wiring linking line, and the common wiring line terminal section is formed on the linking line, and therefore, regardless of whether the scanning line terminal is formed on one side or both sides of the transparent insulating substrate plate, the common wiring terminal can be led out, so that the IPS-type active matrix substrate plate can be produced independently.

Also, in this active matrix substrate plate, the difference in the height of the common electrode and pixel electrode section is made small, so that orientation control in the paneling step is facilitated.

The TN-type active matrix substrate plate according to the third aspect of this invention is comprised in such a way that a semiconductor layer of a same shape as the signal line is formed on a layer below the signal line and both the semiconductor layer and the signal line are covered by a transparent conductive layer, and the source electrode and the drain electrode are formed by laminating the transparent conductive layer on top of a metallic layer, and the transparent conductive layer in an upper layer of the source electrode extending above the gate insulation layer of the window section to form the pixel electrode.

This TN-type active matrix substrate plate can be manufactured in four steps so that the productivity and the yield are improved.

Also, in this active matrix substrate plate, because the signal line is comprised by a metallic layer and the transparent conductive layer, wiring resistance of the signal line can be reduced and the yield drop due to severing of lines can be suppressed, and because the source electrode and the pixel electrode are comprised integrally by the transparent conductive layer, an increase in the contact resistance can be suppressed and the performance properties are enhanced.

Also, in this active matrix substrate plate, the lateral surface of semiconductor layer below the signal line is covered by the transparent conductive layer, when etching the $n^+$ amorphous silicon layer forming the TFT channel, infiltration corrosion of the amorphous layer of the semiconductor layer in the lateral direction can be prevented, thereby preventing difficulty of orientation control caused by improper covering by the protective insulation layer. Also, because the lateral surface of the metallic layer of the signal line is covered by the transparent conductive layer, when etching the transparent conductive layer, a photo-resist coating is covering the metallic layer of the signal line and the semiconductor layer. Therefore, even if debris or foreign particles are present on the metallic layer, etching solution does not infiltrate into the boundary of the transparent conductive layer and the metallic layer, to prevent severing of the signal line.

The TN-type active matrix substrate plate according to the fourth aspect of this invention is comprised in such a way that a semiconductor layer formed in a layer below the signal line is formed in a 凸 cross sectional shape so as to have a wider bottom, and the upper layer of the 凸-shaped semiconductor layer, a metallic layer and a transparent conductive layer comprising the signal line are formed so that the lateral surfaces are aligned, and the source electrode and the drain electrode are formed by laminating the transparent conductive layer on top of the metallic layer, and the pixel electrode is formed by the transparent conductive layer in an upper layer of the source electrode extending above the gate insulation layer of the window section.

This TN-type active matrix substrate plate can be manufactured in four steps so that the productivity and the yield are improved.

Also, in this active matrix substrate plate, because the signal line is comprised by a metallic layer and the transparent conductive layer, wiring resistance of the signal line can be reduced and the yield drop due to severing of lines can be suppressed, and because the source electrode and the pixel electrode are comprised integrally by the transparent conductive layer, an increase in the contact resistance can be suppressed and the properties are enhanced.

Also, in this active matrix substrate plate, at the time of forming the TFT channel, the metallic layer of the signal line can be etched using the transparent conductive layer as masking so that dimensional control of the signal line is facilitated.

The active matrix substrate plate according to the fifth aspect of this invention is a TN-type according to one of the second to the fourth aspects of this invention, wherein a thickness of an ohmic contact layer formed in an upper layer of the semiconductor layer formed in a layer below the source electrode and the drain electrode is 3–6 nm.

These TN-type active matrix substrate plates, in addition to the benefits recited above, when etching the drain and source electrodes, the ohmic contact layer above the semiconductor layer can be etched at the same time, and the thickness of the semiconductor layer can be made thin, so that the productivity is increased and the resistance in the vertical direction of the semiconductor layer can be lowered to improve the writing capability of the TFT.

The active matrix substrate plate according to the sixth aspect of this invention relates to one of the first to the fourth aspects of this invention, wherein the scanning line is comprised by a single film layer of Al or an alloy of primarily Al, or a lamination of a high melting point metal and an upper layer of Al or an alloy of primarily Al.

These active matrix substrate plates enable to reduce wiring resistance of the scanning line and to secure reliability of connection of the scanning line driver at the scanning line terminal section.

The active matrix substrate plate according to the seventh aspect of this invention relates to one of the first to the fourth aspects of this invention, wherein the scanning line is comprised by a lamination of conductive films of not less than two layers, and an uppermost layer of the lamination is comprised by a nitride film of a metal or a transparent conductive film.

These active matrix substrate plates enable to secure reliability of connection of the scanning line driver at the scanning line terminal section.

The active matrix substrate plates according to the eighth and the ninth aspects of this invention relate to the second and the fifth aspects of this invention, respectively, wherein the signal line is comprised by a lamination of a high melting point metal and an upper layer of Al or an alloy of primarily Al.

These active matrix substrate plates enable to reduce wiring resistance of the signal line and to secure reliability of connection of the signal line driver at the signal line terminal section.

The active matrix substrate plates according to the 10th and the 11th aspects of this invention relate to the second and the fifth aspects of this invention, respectively, wherein the scanning line is comprised by a lamination of conductive films of not less than two layers, and an uppermost layer of the lamination is comprised by a nitride film of a metal or a transparent conductive film.

These active matrix substrate plates enable to secure reliability of connection of the signal line driver at the signal line terminal section.

The active matrix substrate plates according to the 12th to the 14th aspects of this invention relate to the seventh, the 10th, and the 11th aspects of this invention, respectively, wherein the nitride film of a metal is comprised by a nitride film of Ti, Ta, Nb, Cr, or a nitride film of an alloy comprised primarily of at least one metal selected from Ti, Ta, Nb, Cr.

These active matrix substrate plates enable to secure reliability of connection at the scanning line terminal section and at the signal line terminal section.

The active matrix substrate plates according to the 15th to the 17th aspects of this invention relate to the 12th to the 14th aspects of this invention, respectively, wherein the nitride film of a metal has a nitrogen concentration of not less than 25 atomic percent.

These active matrix substrate plates enable to secure reliability of connection at the scanning line terminal section and at the signal line terminal section.

The method for manufacturing according to the 18th aspect of this invention is for a TN-type active matrix substrate plate, wherein in a first step, forming a conductor layer on the transparent insulation substrate plate, and excepting the scanning line, a scanning line terminal section formed in a scanning line start end, and in each pixel region, the gate electrode extending from the scanning line to the thin film transistor section or sharing a portion of the scanning line, removing the conductor layer by etching; in a second step, laminating successively on the transparent insulation substrate plate, a gate insulation layer and a semiconductor layer comprised by an amorphous silicon layer and an $n^+$ amorphous silicon layer, and excepting the thin film transistor section, removing the semiconductor layer by etching; in a third step, laminating successively on the transparent insulation substrate plate, a transparent conductive layer and a metallic layer, and excepting the signal line, a signal line terminal section formed in the signal line start end section, and in each pixel region, the drain electrode extending from the signal line to the thin film transistor section, the pixel electrode, and the source electrode extending from the pixel electrode to the thin film transistor section disposed opposite to the drain electrode across a channel gap, removing the metallic layer and the transparent conductive layer by etching, and then removing by etching the $n^+$ amorphous silicon layer where exposed; and in a fourth step, forming a protective insulation layer on the transparent insulation substrate plate, and after removing the protective insulation layer above the pixel electrode and the signal line terminal section, and the protective insulation layer and the gate insulation layer above the scanning line by etching, removing the metallic layer above the pixel electrode and the signal line terminal section by etching, to expose the pixel electrode and the signal line terminal section comprised by the transparent conductive layer and the scanning line comprised by the conductor layer.

This method enables to manufacture the active matrix substrate plate according to the first aspect of this invention in four steps.

The method for manufacturing according to the 19th aspect of this invention is for an IPS-type active matrix substrate plate, wherein, in a first step, forming a first conductor layer on the transparent insulation substrate plate, and excepting the scanning line, the scanning line terminal section formed in a scanning line start end, and, a common wiring line whose end section at least in one perimeter section of the transparent insulation substrate plate extends outside of an end section of the scanning line in the same perimeter section, a common wiring linking line for connecting end sections of the common wiring line, and in each pixel region, the gate electrode sharing a portion of the scanning line, and a plurality of common electrodes extending from the common wiring line, removing the first conductor layer by etching; in a second step, laminating successively on the transparent insulation substrate plate, a gate insulation layer and a semiconductor layer comprised by an amorphous silicon layer and an $n^+$ amorphous silicon layer, and excepting the portion of the scanning line to form the gate electrode for the thin film transistor section in each pixel region, removing the semiconductor layer by etching; in a third step, laminating on the transparent insulation substrate plate a second conductor layer, and excepting the signal line, a signal line terminal section formed in the signal line start end section, and in each pixel region, the drain electrode extending from the signal line above the gate electrode, the pixel electrode opposing the common electrode across the gate insulation layer, and the source electrode extending from the pixel electrode to the thin film transistor section disposed opposite to the drain electrode across a channel gap, removing the second conductor layer by etching, and then removing by etching the $n^+$ amorphous silicon layer where exposed; and in a fourth step, forming a protective insulation layer on the transparent insulation substrate plate, and removing the protective insulation layer above the signal line terminal section and the protective insulation layer and the gate insulation layer above the scanning line terminal section and the common wiring line terminal section by etching, to expose the signal line terminal comprised by the second conductor layer and the scanning line terminal comprised by the first conductor layer.

This method of manufacturing an active matrix substrate plate enables to manufacture the active matrix substrate plate according to the second aspect of this invention in four steps.

The method for manufacturing according to the 20th aspect of this invention is for a TN-type active matrix substrate plate, wherein, in a first step, forming a conductor layer on the transparent insulation substrate plate, and excepting the scanning line, a scanning line terminal section formed in a scanning line start end, and in each pixel region, the gate electrode extending from the scanning line to the thin film transistor section or sharing a portion of the scanning line, removing the conductor layer by etching; in a second step, laminating successively on the transparent insulation substrate plate, a gate insulation layer and a semiconductor layer comprised by an amorphous silicon layer and an $n^+$ amorphous silicon layer, and a metallic layer, and excepting the signal line or a portion covering the signal line, a signal line terminal section formed on the signal line start end section, and in each pixel region, a protrusion section extending from the signal line to the pixel electrode through the thin film transistor section, removing the metallic layer and the semiconductor layer by etching; in a third step, forming a transparent conductive layer on the transparent insulation substrate plate, and excepting the signal line or the portion covering the signal line, the signal line terminal section formed in the signal line start end section, and in each pixel region, the drain electrode extending from the signal line to the thin film transistor section, the pixel electrode, and the source electrode disposed opposite to the drain electrode across a channel gap, removing the transparent conductive layer by etching, and then removing by etching the metallic layer and the $n^+$ amorphous silicon layer where exposed; and in a fourth step, forming a protective insulation layer on the transparent insulation substrate plate, and removing the protective insulation layer above the pixel electrode and the signal line terminal section, and the protective insulation layer and the gate insulation layer above the scanning line terminal section by etching, to expose the pixel electrode comprised by the transparent conductive layer, signal line terminal comprised by a lamination of the metallic layer and the transparent conductive layer or the transparent conductive layer itself, and the scanning line terminal comprised by the conductor layer.

This method enables to manufacture the active matrix substrate plate according to the third or the fourth aspect of this invention in four steps.

The method for manufacturing according to the 21st aspect of this invention is for a TN-type active matrix substrate plate, wherein, in a first step, forming a conductor layer on the transparent insulation substrate plate, and excepting the scanning line, a scanning line terminal section formed in a scanning line start end, and in each pixel region, the gate electrode extending from the scanning line to the thin film transistor section or sharing a portion of the scanning line, removing the conductor layer by etching; in a second step, laminating successively on the transparent insulation substrate plate, a gate insulation layer and a semiconductor layer comprised by an amorphous silicon layer, and forming an $n^+$ amorphous silicon layer on the semiconductor layer by doping with a group V element, and then depositing a metallic layer, and excepting the signal line or a portion covering the signal line, a signal line terminal section formed on a signal line start end section, and in each pixel region, a protrusion section extending from the signal line to the pixel electrode through the thin film transistor section, removing the metallic layer and the semiconductor layer by etching; in a third step, forming a transparent conductive layer on the transparent insulation substrate plate, and excepting the signal line or the portion covering the signal line, the signal line terminal section formed in the signal line start end section, and in each pixel region, the drain electrode extending from the signal line to the thin film transistor section, the pixel electrode, and the source electrode disposed opposite to the drain electrode across a channel gap, removing the transparent conductive layer by etching, and then removing by etching portions of the metallic layer and the $n^+$ amorphous silicon layer formed by doping with a group V element where exposed; and in a fourth step, forming a protective insulation layer on the transparent insulation substrate plate, and removing the protective insulation layer above the pixel electrode and the signal line terminal section, and the protective insulation layer and the gate insulation layer above the scanning line terminal section by etching, to expose the pixel electrode comprised by the transparent conductive layer, the signal line terminal comprised by a lamination of the metallic layer and the transparent conductive layer or the transparent conductive layer itself, and the scanning line terminal comprised by the conductor layer.

This method enables to manufacture the active matrix substrate plate according to the fifth aspect of this invention in four steps.

The method for manufacturing according to the 22nd aspect of this invention is for an IPS-type active matrix substrate plate, wherein, in a first step, forming a conductor layer on the transparent insulation substrate plate, and excepting the scanning line, a scanning line terminal section formed in a scanning line start end, and, a common wiring line whose end section at least in one perimeter section of the transparent insulation substrate plate extends outside of an end section of the scanning line in the same perimeter section, a common wiring line linking line for connecting end sections of the common wiring lines, and in each pixel region, the gate electrode sharing a portion of the scanning line, and a plurality of common electrodes extending from the common wiring line, removing the conductor layer by etching; in a second step, laminating successively on the transparent insulation substrate plate, a gate insulation layer and a semiconductor layer comprised by an amorphous silicon layer and an $n^+$ amorphous silicon layer, and a metallic layer, and excepting the signal line or the portion covering the signal line, a signal line terminal section formed in the signal line start end section, and in each pixel region, a protrusion section extending from the signal line to the pixel electrode section through the thin film transistor section, removing the metallic layer and the semiconductor layer by etching; in a third step, laminating on the transparent insulation substrate plate a transparent conductive layer or a nitride film layer of a metal or a second metallic layer, and excepting the signal line or the portion covering the signal line, the signal line terminal section formed in the signal line start end section, and in each pixel region, the drain electrode extending from the signal line to the thin film transistor section above the gate electrode, the pixel electrode opposing the common electrode across the gate insulation layer, and the source electrode extending from the pixel electrode to the thin film transistor section disposed opposite to the drain electrode across a channel gap, removing the transparent conductive layer or the nitride film layer of a metal or the second metallic layer by etching, and then removing by etching portions of the metallic layer and the $n^+$ amorphous silicon layer where exposed; and in a fourth step, forming a protective insulation layer on the transparent insulation substrate plate, and removing the protective insulation layer above the signal line terminal section and the protective insulation layer and the gate insulation layer above the scanning line terminal section by etching, to expose the signal line terminal comprised by any one of a lamination of the metallic layer and the transparent conductive layer or a nitride film layer of a metal, or the transparent conductive layer, or a nitride film layer of a metal, or the second metallic layer, and the scanning line terminal comprised by the conductor layer.

This method enables to manufacture the active matrix substrate plate according to the second aspect of this invention in four steps.

The method for manufacturing according to the 23rd aspect of this invention is for an IPS-type active matrix, wherein, in a first step, forming a conductor layer on the transparent insulation substrate plate, and excepting the scanning line, a scanning line terminal section formed in a scanning line start end, and, a common wiring line whose end section at least in one perimeter section of the transparent insulation substrate plate extends outside of an end section of the scanning line in the same perimeter section, a common wiring line linking line for connecting end sections of the common wiring lines, and in each pixel region, the gate electrode sharing a portion of the scanning line, and a plurality of common electrodes extending from the common wiring line, removing the conductor layer by etching; in a second step, laminating successively on the transparent insulation substrate plate, a gate insulation layer and a semiconductor layer comprised by an amorphous silicon layer, and forming an $n^+$ amorphous silicon layer on the semiconductor layer by doping with a group V element, and then depositing a metallic layer, and excepting the signal line or a portion covering the signal line, a signal line terminal section formed in a signal line start end section, and in each pixel region, a protrusion section extending from the signal line to the pixel electrode section through the thin film transistor section, removing the metallic layer and the semiconductor layer by etching; in a third step, laminating on the transparent insulation substrate plate a transparent conductive layer or a nitride film layer of a metal or a second metallic layer, and excepting the signal line or the portion covering the signal line, the signal line terminal section formed in the signal line start end section, and in each pixel region, the drain electrode extending from the signal line to the thin film transistor section above the gate electrode, the pixel electrode opposing the common electrode across the gate insulation layer, and the source electrode extending from the pixel electrode to the thin film transistor section disposed opposite to the drain electrode across a channel gap, removing the transparent conductive layer or the nitride film layer of a metal or the second conductor layer by etching, and then removing by etching the metallic layer and the $n^+$ amorphous silicon layer formed by doping with the group V element where exposed; and in a fourth step, forming a protective insulation layer on the transparent insulation substrate plate, and removing the protective insulation layer above the signal line terminal section, and the protective insulation layer and the gate insulation layer above the scanning line terminal section by etching, to expose the signal line terminal comprised by any one of a lamination of the metallic layer and the transparent conductive layer or a metal nitride film, or the transparent conductive layer, or a metal nitride film layer, or the second metallic layer, and the scanning line terminal comprised by the conductor layer.

This method enables to manufacture the active matrix substrate plate according to the fifth aspect of this invention in four steps.

The method for manufacturing according to the 24th aspect of this invention is for an IPS-type active matrix substrate plate, wherein, in a first step, forming a conductor layer on the transparent insulation substrate plate, and excepting the scanning line, a scanning line terminal section formed in a scanning line start end, and a common wiring line whose end section at least in one perimeter section of the transparent insulation substrate plate extends outside of an end section of the scanning line in the same perimeter section, a common wiring line linking line for connecting end sections of the common wiring lines, and in each pixel region, the gate electrode sharing a portion of the scanning line, and a plurality of common electrodes extending from the common wiring line, removing the conductor layer by etching; in a second step, laminating successively on the transparent insulation substrate plate, a gate insulation layer and a semiconductor layer comprised by an amorphous silicon layer and an $n^+$ amorphous silicon layer, and a metallic layer, and excepting the signal line or a portion covering the signal line, a signal line terminal section formed in a signal line start end section, and in each pixel region, a protrusion section extending from the signal line to the pixel electrode section through the thin film transistor section, and the pixel electrode extending from the protrusion section to the common electrode through the gate insulation layer or the portion covering the pixel electrode, removing the metallic layer and the semiconductor layer by etching; in a third step, laminating on the transparent insulation substrate plate a transparent conductive layer or a nitride layer of a metal or a second metallic layer, and excepting the signal line or the portion covering the signal line, the signal line terminal section formed in the signal line start end section, and in each pixel region, the drain electrode extending from the signal line to the thin film transistor section above the gate electrode, the pixel electrode or the portion covering the pixel electrode, and the source electrode extending from the pixel electrode to the thin film transistor section disposed opposite to the drain electrode across a channel gap, removing the transparent conductive layer or the nitride film layer of a metal or the second metallic layer by etching, and then removing by etching the metallic layer and the $n^+$ amorphous silicon layer where exposed; and in a fourth step, forming a protective insulation layer on the transparent insulation substrate plate, and removing the protective insulation layer above the signal line terminal section, and the protective insulation layer and the gate insulation layer above the scanning line terminal section by etching, to expose the signal line terminal comprised by any one of a lamination of the metallic layer and the transparent conductive layer or a metal nitride film, or the transparent conductive layer or a metal nitride film layer or the second metallic layer, and the scanning line terminal comprised by the conductor layer.

This method enables to manufacture the active matrix substrate plate according to the second aspect of this invention in four steps.

The method for manufacturing according to the 25th aspect of this invention is for an IPS-type active matrix substrate plate, wherein, in a first step, forming a conductor layer on the transparent insulation substrate plate, and excepting the scanning line, a scanning line terminal section formed in a scanning line start end, and a common wiring line whose end section at least in one perimeter section of the transparent insulation substrate plate extends outside of an end section of the scanning line in the same perimeter section, a common wiring line linking line for connecting end sections of the common wiring lines, and in each pixel region, the gate electrode sharing a portion of the scanning line, and a plurality of common electrodes extending from the common wiring line, removing the conductor layer by etching; in a second step, laminating successively on the transparent insulation substrate plate, a gate insulation layer and a semiconductor layer comprised by an amorphous silicon layer, and forming an $n^+$ amorphous silicon layer on the semiconductor layer by doping with a group V element, and then depositing a metallic layer, and excepting the signal line or the portion covering the signal line, a signal line terminal section formed in a signal line start end section, and in each pixel region, a protrusion section extending from the signal line to the pixel electrode section through the thin film transistor section, and the pixel electrode extending from the protrusion section to the opposing common electrode through the gate insulation layer or a portion covering the pixel electrode, removing the metallic layer and the semiconductor layer by etching; in a third step, laminating on the transparent insulation substrate plate a transparent conductive layer or a nitride layer of a metal or a second metallic layer, and excepting the signal line or the portion covering the signal line, the signal line terminal section formed in the signal line start end section, and in each pixel region, the drain electrode extending from the signal line to the thin film transistor section above the gate electrode, the pixel electrode or the portion covering the pixel electrode, and the source electrode extending from the pixel electrode to the thin film transistor section disposed opposite to the drain electrode across a channel gap, removing the transparent conductive layer or the nitride film layer of a metal or the second metallic layer by etching, and then removing the metallic layer and the $n^+$ amorphous silicon layer formed by doping of the group V element, where expose, by etching; and in a fourth step, forming a protective insulation layer on the transparent insulation substrate plate, and removing the protective insulation layer above the signal line terminal section and the protective insulation layer and the gate insulation layer above the scanning line terminal section by etching, to expose the signal line terminal comprised by any one of a lamination of the metallic layer and the transparent conductive layer or a metal nitride film, or the transparent conductive layer or a metal nitride film layer or the second metallic layer, and the scanning line terminal comprised by the conductor layer.

This method enables to manufacture the active matrix substrate plate according to the fifth aspect of this invention in four steps.

The method according to the 26th aspect of this invention relates to manufacturing the active matrix substrate plate according to one of the 18th to the 25th aspects of this invention, wherein in the first step, the conductor layer is formed by laminating Al or an alloy of primarily Al, or by laminating a high melting point metal and an upper layer of Al or an alloy of primarily Al on the transparent insulation substrate plate.

These methods for manufacturing an active matrix substrate plate enables to reduce the wiring resistance of the scanning line and to secure reliability of connection of the scanning line driver at the scanning line terminal section.

The method according to the 27th aspect of this invention relates to manufacturing the active matrix substrate plate according to one of the 18th to the 25th aspects of this invention, wherein in the first step, the conductor layer is formed by laminating not less than one layer of a conductive film and an upper layer of a nitride film of a metal or a transparent conductive film on the transparent insulation substrate plate.

These methods for manufacturing an active matrix substrate plate enables to secure reliability of connection of the scanning line driver at the scanning line terminal section.

The method according to the 28th aspect of this invention relates to manufacturing the active matrix substrate plate according to one of the 19th, the 22nd to the 25th aspects of this invention, wherein in the third step, the second conductor layer or the second metallic layer is formed by laminating a high melting point metal and an upper layer of Al or an alloy of primarily Al.

These methods for manufacturing an active matrix substrate plate enable to reduce the wiring resistance of the signal line and to secure reliability of connection of the signal line driver at the signal line terminal section.

The method according to the 29th aspect of this invention relates to manufacturing the active matrix substrate plate according to the 19th aspect of this invention, wherein, in the third step, the second conductor layer is formed by laminating not less than one layer of a conductive film and an upper layer of a nitride film of a metal or the transparent conductive film.

This method of manufacturing an active matrix substrate plate enables to secure reliability of connection of the signal line driver at the signal line terminal section.

The methods according to the 30th and the 31st aspects of this invention relate to manufacturing the active matrix substrate plate according to the 27th and the 29th aspect of this invention, respectively, wherein the nitride film of a metal is comprised by a nitride film of Ti, Ta, Nb, Cr or a nitride film of an alloy comprised primarily of at least one metal selected from Ti, Ta, Nb, Cr.

This method of manufacturing an active matrix substrate plate enables to secure reliability of connection at the scanning line terminal section and at the signal line terminal section.

The methods according to the 32nd and the 33rd aspects of this invention relate to manufacturing the active matrix substrate plate according to the 30th and the 31st aspects of this invention, respectively, wherein the nitride film of a metal is formed by reactive sputtering so as to produce a nitrogen concentration of not less than 25 atomic percent.

This method of manufacturing an active matrix substrate plate enables to secure reliability of connection at the scanning line terminal and at the signal line terminal in a good condition.

The method according to the 34th aspect of this invention relates to manufacturing the active matrix substrate plate according to one of the first to the fourth aspects of this invention, wherein the signal line is connected to each other by a high resistance line comprised by amorphous silicon.

In this active matrix substrate plate, even if unexpected electrical shock is applied to a signal line during manufacturing processes, because the potential can be dispersed in the adjacent signal lines, it is possible to prevent shorting between the scanning lines and signal lines due to insulation breakdown and to prevent changes in the properties of TFT in the pixel region.

The method according to the 35th aspect of this invention relates to manufacturing the active matrix substrate plate according to one of the first to the fourth aspects of this invention, wherein the signal line is connected to each other across an amorphous silicon layer above a floating electrode formed concurrently with the scanning line.

This active matrix substrate plate has the same benefits as the above substrate plate.

The methods according to the 36th and the 37th aspects of this invention relate to manufacturing the active matrix substrate plate according to one of the 34th and the 35th aspects of this invention, respectively, wherein adjacent signal lines have one pair or a plurality of pairs of opposing protrusion sections in the input side with respect to a pixel region, and the protrusion section is connected to each other by the amorphous silicon layer.

In these active matrix substrate plates, even if unexpected electrical shock is applied to a signal line during manufacturing processes, because the potential can be dispersed in the adjacent signal lines, it is possible to prevent shorting between the scanning lines and signal lines due to insulation breakdown and to prevent changes in the properties of TFT in the pixel region.

The method according to the 38th aspect of this invention relates to manufacturing the active matrix substrate plate according to one of the first to the fourth aspects of this invention, wherein the signal line is connected to a common wiring line by a high resistance line comprised by amorphous silicon.

In these active matrix substrate plates, even if unexpected electrical shock is applied to a signal line during manufacturing processes, because the potential can be dispersed in the common wiring lines, it is possible to prevent shorting between the scanning lines and signal lines due to insulation breakdown and to prevent changes in the properties of TFT in the pixel region.

The method according to the 39th aspect of this invention relates to manufacturing the active matrix substrate plate according to one of the first to the fourth aspects of this invention, wherein the signal line is electrically connected to a common wiring line across an amorphous silicon layer above a floating electrode formed concurrently with the scanning line.

These active matrix substrate plates provide the same beneficial effects as described above.

The methods according to the 40th and the 41st aspects of this invention relate to manufacturing the active matrix substrate plate according to the 38th and the 39th aspects of this invention, respectively, wherein the signal line and the common wiring line formed on the same layer as the signal line, or signal line linking line connected to the common wiring line formed on the same layer as the scanning line and formed on the same layer as the signal line, have one pair or a plurality of pairs of opposing protrusion sections at the signal line end, and the protrusion section is connected to each other by an amorphous silicon layer.

In these active matrix substrate plates, even if unexpected electrical shock is applied to a signal line during manufacturing processes, because the potential can be dispersed in the common wiring lines, it is possible to prevent shorting between the scanning lines and signal lines due to insulation breakdown and to prevent changes in the properties of TFT in the pixel region.

The active matrix substrate plate according to the 42nd aspect of this invention is formed on a transparent insulating substrate plate having an array of pixel regions, wherein each pixel region contains a scanning line and a signal line and is surrounded by the scanning line and the signal line crossing each other at right angles, and in each pixel region is formed an inverted staggered structure thin film transistor comprised by a gate electrode, an island-shaped semiconductor layer opposing the gate electrode across a gate insulation layer, a pair of drain electrode and source electrode separated by a channel gap formed above the semiconductor layer, such that a pixel electrode is formed in a window section surrounded by the scanning line and the signal line for transmitting light, and the gate electrode is connected to the scanning line, the drain electrode is connected to the signal line, and the source electrode is connected to the pixel electrode, wherein, the drain electrode and the source electrode are formed by laminating a metallic layer on top of a transparent conductive layer, and a lamination of the transparent conductive layer and the metallic layer of the source electrode descends vertically to the transparent insulation substrate plate so as to cover a lateral surface of the lamination of the gate insulation layer and the semiconductor layer, and further, the transparent conductive layer below the metallic layer extends on top of the transparent insulation substrate plate towards the window section to form the pixel electrode, and the lateral surface of the conductor layer above the transparent insulation substrate plate formed concurrently with the scanning line is totally covered by the gate insulation layer.

This active matrix substrate plate can be manufactured in four steps so that the productivity and the yield are improved.

Also, in this active matrix substrate plate, because the conductor layer formed together with the scanning line on top of the transparent insulation substrate plate, excepting the connection section to the transparent conductive layer, is totally covered by the gate insulation layer, during etching of metallic layer of the signal line or the transparent conductive layer, corrosion problems of circuit elements such as the scanning lines in the lower layer and gate electrodes or shorting of scanning lines and signal lines are prevented, and the yield is improved.

Also, in this active matrix substrate plate, protective transistor can be fabricated so that the TFT in the pixel region can be prevented from unexpected electrical shock during manufacturing. Also, insulation breakdown between the scanning lines and signal lines can be prevented, and the yield is improved.

Also, in this active matrix substrate plate, because the signal line is formed by laminating a metallic layer and the transparent conductive layer, the wiring resistance of the signal line can be lowered, and also, a drop in yield caused by severing of the signal line can be suppressed, and because the source electrode and the pixel electrode are formed integrally using the transparent conductive layer, an increase in contact resistance can be suppressed and the reliability is improved.

The active matrix substrate plate according to the 43rd aspect of this invention is formed on a transparent insulating substrate plate by a plurality of scanning lines alternating with a plurality of common wiring lines, and a pixel region, containing a scanning line and a signal line is surrounded by the scanning line and the signal line crossing at right angles to each other, is arrayed in such a way that in each pixel region is formed an inverted staggered structure thin film transistor comprised by a gate electrode, an island-shaped semiconductor layer opposing the gate electrode across a gate insulation layer, a pair of drain electrode and source electrode separated by a channel gap formed above the semiconductor layer, such that in a window section surrounded by the scanning line and the signal line are formed a pixel electrode of a comb teeth shape and a common electrode of a comb teeth shape connecting to a common wiring line and opposing the pixel electrode, so that the gate electrode is connected to the scanning line, the drain electrode is connected to the signal line, and the source electrode is connected to the pixel electrode, so as to generate a horizontal electrical field with respect to the transparent insulating substrate plate between the pixel electrode and the common electrode, wherein, the conductor layer of the source electrode descends vertically to the transparent insulation substrate plate so as to cover a lateral surface of a lamination of the gate insulation layer and the semiconductor layer, and further extends on top of the transparent insulation substrate plate towards the window section to form the pixel electrode, and the lateral surface of the conductor layer above the transparent insulation substrate plate formed concurrently with the scanning line is totally covered by the gate insulation layer.

This IPS-type active matrix substrate plate can be manufactured in four steps so that the productivity and the yield are improved.

Also, in this active matrix substrate plate, because the conductor layer formed together with the scanning line on top of the transparent insulation substrate plate, excepting the connection section of the conductor layer above the transparent conductive layer formed concurrently with the scanning line to the conductor layer formed concurrently with the signal line, is totally covered by the gate insulation layer, during etching of conductor layer of the signal line, corrosion problems of circuit elements such as the scanning lines in the lower layer and common wiring or shorting of scanning lines and common wiring and signal lines are prevented, and the yield is improved.

Also, in this active matrix substrate plate, protective transistor can be fabricated so that the TFT in the pixel region can be prevented from unexpected electrical shock during manufacturing. Also, insulation breakdown between the scanning lines and signal lines can be prevented, and the yield is improved The active matrix substrate plate according to the 44th aspect of this invention is formed on a transparent insulating substrate plate having an array of pixel regions, wherein each pixel region contains a scanning line and a signal line and is surrounded by the scanning line and the signal line crossing each other at right angles, and in each pixel region is formed an inverted staggered structure thin film transistor comprised by a gate electrode, an island-shaped semiconductor layer opposing the gate electrode across a gate insulation layer, a pair of drain electrode and source electrode separated by a channel gap formed above the semiconductor layer, such that a pixel electrode is formed in a window section surrounded by the scanning line and the signal line for transmitting light, and the gate electrode is connected to the scanning line, the drain electrode is connected to the signal line, and the source electrode is connected to the pixel electrode, wherein, the drain electrode and the source electrode are both formed by laminating the transparent conductive layer on top of a metallic layer, and the transparent conductive layer above the source electrode descends vertically to the transparent insulation substrate plate so as to cover a lateral surface of a lamination of the gate insulation layer and the semiconductor layer and the metallic layer, and further extends on top of the transparent insulation substrate plate towards the window section to form the pixel electrode, and the lateral surface of the conductor layer above the transparent insulation substrate plate formed concurrently with the scanning line is totally covered by the gate insulation layer.

This TN-type active matrix substrate plate can be manufactured in four steps so that the productivity and the yield are improved.

Also, in this active matrix substrate plate, because the conductor layer formed together with the scanning line on top of the transparent insulation substrate plate, excepting the connection section to the transparent conductive layer, is totally covered by the gate insulation layer, during etching of metallic layer of the signal line or the transparent conductive layer, corrosion problems of circuit elements such as the scanning lines in the lower layer and gate electrodes or shorting of scanning lines and signal lines are prevented, and the yield is improved.

Also, in this active matrix substrate plate, protective transistor can be fabricated so that the TFT in the pixel region can be prevented from unexpected electrical shock during manufacturing. Also, insulation breakdown between the scanning lines and signal lines can be prevented, and the yield is improved Also, because the signal line is formed by laminating a metallic layer and the transparent conductive layer, the wiring resistance of the signal line can be lowered, and also, a drop in yield caused by severing of the signal line can be suppressed, and because the source electrode and the pixel electrode are formed integrally using the transparent conductive layer, an increase in contact resistance can be suppressed and the reliability is improved.

The active matrix substrate plate according to the 45th aspect of this invention relates to one according to the 44th aspect of this invention, wherein a thickness of an ohmic contact layer formed in an upper layer of the semiconductor layer formed in a layer below the source electrode and the drain electrode is 3–6 nm.

In this TN-type active matrix substrate plate, in addition to the beneficial effects recited above, when etching the drain and source electrodes, the ohmic contact layer above the semiconductor layer can be etched at the same time, and the thickness of the semiconductor layer can be made thin, so that the productivity is increased and the writing capability of the TFT can be improved.

The active matrix substrate plate according to the 46th aspect of this invention relates to one according to the 43rd aspect of this invention, wherein the signal line is comprised by a lamination of a high melting point metal laminated and an upper layer of Al or an alloy of primarily Al.

This active matrix substrate plate enables to reduce wiring resistance of the signal line and to secure reliability of connection of the signal line driver at the signal line terminal section.

The active matrix substrate plate according to the 47th aspect of this invention relates to one according to the 43rd aspect of this invention, wherein the signal line is comprised by a lamination of conductive films of not less than two layers, and an uppermost layer of the lamination is comprised by a nitride film of a metal or a transparent conductive film.

This active matrix substrate plate enables to secure reliability of connection of the signal line driver at the signal line terminal section.

The active matrix substrate plate according to the 48th aspect of this invention relates to one according to the 47th aspect of this invention, wherein the nitride film of a metal is comprised by a nitride film of Ti, Ta, Nb, Cr or a nitride film of an alloy comprised primarily of at least one metal selected from Ti, Ta, Nb, Cr.

This active matrix substrate plate provides the same beneficial effects as described above.

The active matrix substrate plate according to the 49th aspect of this invention relates to one according to the 48th aspect of this invention, wherein the nitride film of a metal has a nitrogen concentration of not less than 25 atomic percent.

This active matrix substrate plate enables to secure reliability of connection of the signal line driver at the signal line terminal section in a good condition.

The active matrix substrate plate according to the 50th aspect of this invention relates to one according to one of the 42nd to the 45th aspects of this invention, wherein a portion of both lateral surface of the semiconductor layer extending in the direction of the channel gap of the thin film transistor section is covered by the protective insulation layer.

In this active matrix substrate plate, because a portion of both lateral surfaces of the semiconductor layer in the extending direction of the channel gap of the TFT section is covered by the protective insulation layer, it is possible to prevent charge leaking through the lateral surfaces of the semiconductor layer as the current path, thereby improving the reliability of thin film transistors.

The active matrix substrate plate according to the 51st aspect of this invention relates to one according to one of the 42nd to the 45th aspects of this invention, wherein the scanning line is comprised of a conductive film comprised by a lamination of not less than two layers, and an uppermost layer of the lamination serves as an etching protective layer for the conductor layer formed in a lower layer.

These active matrix substrate plates are able to prevent infiltration corrosion caused by the etching solution infiltrating through the opening section punched through the gate insulation layer above the gate electrode and the semiconductor layer, when etching the metallic layer of the signal line or the transparent conductive layer, to corrode the conductor layer in a layer below the gate electrode or the scanning line, thereby improving the yield.

The active matrix substrate plate according to the 52nd aspect of this invention relates to one according to the 51st aspect of this invention, wherein at least one layer of the conductor film in a lower layer is comprised of Al or an alloy of primarily Al, and a conductive film in the uppermost layer is comprised of Ti, Ta, Nb, or an alloy comprised primarily of at least one of preceding elements, or Ti, Ta, Nb, Cr, or a nitride film of an alloy comprised primarily of at least one metal selected from Ti, Ta, Nb, Cr.

This active matrix substrate plate provides the same beneficial effects as described above.

The active matrix substrate plate according to the 53rd aspect of this invention related to one according to one of the 42nd, the 44th and the 45th aspects of this invention, wherein a connection section is formed to connect the first conductor layer where the scanning line is formed and the second conductor layer where the signal line is formed, and the connection section is disposed so as not to superimpose on an opening section of the protective insulation layer.

The active matrix substrate plate according to the 42nd aspect of this invention is constructed so that, even if a same metal is used or different metals are used for the first conductor layer and second conductor layer, if the first conductor layer is not resistant to etching of the metallic layer in the second conductor layer, after the protective insulation layer is opened and when the metal layer above the transparent conductive layer is to be removed by etching, it is possible to prevent the etching solution to infiltrate through the transparent conductive layer at the connection section and corrode the first conductor layer, and the yield is improved.

Also, the active matrix substrate plates according to the 44th and the 45th aspects of this invention are constructed so that, when at least one layer of the first conductor layer is comprised by Al or an alloy of primarily Al, and if a hydrofluoric type acid is used to etch the opening section in the protective insulation layer, during etching operation on the protective insulation layer, it is possible to prevent the etching solution to infiltrate through the transparent conductive layer to corrode Al or an alloy of primarily Al in the first conductor layer, thereby improving the yield.

The active matrix substrate plate according to the 54th aspect of this invention relates to one according to the 42nd or the 43rd aspect of this invention, wherein the first conductor layer where the scanning line is formed and the second conductor layer where the signal line is formed are connected directly through an opening section punched through the gate insulation layer and the semiconductor layer.

These active matrix substrate plates can be manufactured in four steps, because the first conductor layer and the second conductor layer can be electrically connected according to the structure described, so that the productivity and the yield are improved.

Also, in these active matrix substrate plates, protective transistor can be fabricated so that the TFT in the pixel region can be prevented from unexpected electrical shock during manufacturing. Also, insulation breakdown between the scanning lines and signal lines can be prevented, and the yield is improved.

The active matrix substrate plate according to the 55th aspect of this invention relates to one according to the 44th or the 45th aspect of this invention, wherein the first conductor layer where the scanning line is formed and the second conductor layer where the signal line is formed are connected directly the transparent conductive layer through an opening section punched through the gate insulation layer and the semiconductor layer.

These active matrix substrate plates provide the same beneficial effects as described above.

The active matrix substrate plate according to the 56th aspect of this invention relates to one according to the 42nd aspect of this invention, wherein a conductor layer of a forestage scanning line that opposes each other across a lamination comprised by the gate insulation layer and the semiconductor layer and the transparent conductive layer extending from the pixel electrode form an accumulation capacitance section, and in this accumulation capacitance section, lateral end surfaces of the transparent conductive layer and the semiconductor layer are aligned.

This active matrix substrate plate improves productivity and yield because it can be manufactured in four steps due to the structure of the accumulation capacitance section.

The active matrix substrate plate according to the 57th aspect of this invention relates to one according to the 44th or the 45th aspect of this invention, wherein a conductor layer of a forestage scanning line that opposes each other across a lamination comprised by the gate insulation layer and the semiconductor layer and the metallic layer in the pixel region and the transparent conductive layer laminated above form an accumulation capacitance section, and in this accumulation capacitance section, lateral end surfaces of the transparent conductive layer and the metallic layer and the semiconductor layer are aligned.

This active matrix substrate plate provides the same beneficial effects as described above.

The method according to the 58th aspect of this invention relates to manufacturing a TN-type active matrix substrate plate, wherein, in a first step, forming a conductor layer on the transparent insulation substrate plate, and excepting at least the scanning line, a scanning line terminal section formed in a scanning line start end, and in each pixel region, the gate electrode extending from the scanning line to the thin film transistor section or sharing a portion of the scanning line, removing the conductor layer by etching; in a second step, laminating successively on the transparent insulation substrate plate, a gate insulation layer and a semiconductor layer comprised by an amorphous silicon layer and an $n^+$ amorphous silicon layer, and excepting a specific opening section formed above the conductor layer in the first step, and leaving so as to cover at least an upper surface of the conductor layer and an entire lateral surface with the gate insulation layer, removing the semiconductor layer and the gate insulation layer by etching; in a third step, laminating successively on the transparent insulation substrate plate, a transparent conductive layer and a metallic layer, and excepting the signal line, a signal line terminal section formed in the signal line terminal location, a connection electrode section connecting to the scanning line terminal section through the opening section formed above the scanning line terminal section, and in each pixel region, the drain electrode extending from the signal line to the thin film transistor section, the pixel electrode, and the source electrode extending from the pixel electrode to the thin film transistor section disposed opposite to the drain electrode across a channel gap, removing the metallic layer and the transparent conductive layer by etching, and then removing by etching the $n^+$ amorphous silicon layer where exposed; and in a fourth step, forming a protective insulation layer on the transparent insulation substrate plate, and excepting the protective insulation layer above the pixel electrode and the connection electrode section and the signal line terminal section, and leaving so as to form at least the semiconductor layer of the thin film transistor section, removing the protective insulation layer and the semiconductor layer successively by etching, and then, removing by etching the metallic layer exposed at the opening section formed on the protective insulation layer above the pixel electrode and the connection electrode section and the signal line terminal section to expose the pixel electrode and signal line terminal comprised by the transparent conductive layer, and the scanning line terminal laminated above the conductor layer with the transparent conductive layer through the opening section punched through the semiconductor layer and the gate insulation layer.

This method enables to manufacture the active matrix substrate plate according to the 42nd aspect of this invention in four steps.

The method according to the 59th aspect of this invention relates to manufacturing a TN-type active matrix substrate plate, wherein in a first step, forming a conductor layer on the transparent insulation substrate plate, and excepting at least the scanning line, and in each pixel region, the gate electrode extending from the scanning line to the thin film transistor section or sharing a portion of the scanning line, removing the conductor layer by etching; in a second step, laminating successively on the transparent insulation substrate plate, a gate insulation layer and a semiconductor layer comprised by an amorphous silicon layer and an $n^+$ amorphous silicon layer, and excepting a specific opening section formed above the conductor layer in the first step, and leaving so as to cover at least an upper surface of the conductor layer and an entire lateral surface with the gate insulation layer, removing the semiconductor layer and the gate insulation layer by etching; in a third step, laminating successively on the transparent insulation substrate plate, a transparent conductive layer and a metallic layer, and excepting the signal line, a signal line terminal section formed in the signal line terminal location, a connection electrode section connecting to the scanning line end section through the opening section formed above the scanning line end section, a scanning line terminal section formed in a scanning line terminal location by further extending from the connection electrode section, and in each pixel region, the drain electrode extending from the signal line to the thin film transistor section, the pixel electrode, and the source electrode extending from the pixel electrode to the thin film transistor section disposed opposite to the drain electrode across a channel gap, removing the metallic layer and the transparent conductive layer by etching, and then removing by etching the $n^+$ amorphous silicon layer where exposed; and in a fourth step, forming a protective insulation layer on the transparent insulation substrate plate, and excepting the protective insulation layer above the pixel electrode and the scanning line terminal section and the signal line terminal section, and leaving so as to form at least the semiconductor layer of the thin film transistor section, removing the protective insulation layer and the semiconductor layer successively by etching, and then, removing the metallic layer exposed at the opening section formed in the protective insulation layer above the pixel electrode and the scanning line terminal section and the signal line terminal section by etching, to expose the pixel electrode and the scanning line terminal and the signal line terminal comprised by the transparent conductive layer.

This method enables to manufacture the active matrix substrate plate according to the 42nd aspect of this invention in four steps.

The method of manufacturing an active matrix substrate plate according to the 60th aspect of this invention relates a TN-type active matrix substrate plate, wherein, in a first step, forming a conductor layer on the transparent insulation substrate plate, and excepting at least the scanning line, a scanning line terminal section formed in a scanning line terminal section location, and in each pixel region, the gate electrode extending from the scanning line to the thin film transistor section or sharing a portion of the scanning line, a lower layer signal line formed non-contactingly between adjacent scanning lines to form a portion of the signal line, removing the conductor layer by etching; in a second step, laminating successively on the transparent insulation substrate plate, a gate insulation layer and a semiconductor layer comprised by an amorphous silicon layer and an $n^+$ amorphous silicon layer, and excepting a specific opening section formed above the conductor layer in the first step, and leaving so as to cover at least an upper surface of the conductor layer and an entire lateral surface with the gate insulation layer, removing the semiconductor layer and the gate insulation layer by etching; in a third step, laminating successively on the transparent insulation substrate plate, a transparent conductive layer and a metallic layer, and excepting a signal line terminal section formed in a signal line terminal section location, a connection electrode section connecting to the scanning line terminal section through the opening section formed above the scanning line terminal section, an upper layer signal line connecting the lower layer signal line opposing an adjacent pixel region across the scanning line through an opening section punched through the semiconductor layer and the gate insulation layer, and in each pixel region, the drain electrode extending from the upper layer signal line to the thin film transistor section, the pixel electrode, and the source electrode extending from the pixel electrode to the thin film transistor section disposed opposite to the drain electrode across a channel gap, removing the metallic layer and the transparent conductive layer by etching, and then removing by etching the $n^+$ amorphous silicon layer where exposed; and in a fourth step, forming a protective insulation layer on the transparent insulation substrate plate, and excepting the protective insulation layer above the pixel electrode and the connection electrode section and the signal line terminal section, and leaving so as to form at least the semiconductor layer of the thin film transistor section, removing the protective insulation layer and the semiconductor layer successively by etching, and then, removing the metallic layer exposed at the opening section formed in the protective insulation layer above the pixel electrode and the connection electrode section and the signal line terminal section by etching, to expose the signal line terminal and the pixel electrode comprised by the transparent conductive layer, and the scanning line terminal laminated above the conductor layer with the transparent conductive layer through the opening section punched through the semiconductor layer and the gate insulation layer.

This method enables to manufacture the active matrix substrate plate according to the 42nd aspect of this invention in four steps.

The method of manufacturing an active matrix substrate plate according to the 61st aspect of this invention relates to a TN-type active matrix substrate plate, wherein, in a first step, forming a conductor layer on the transparent insulation substrate plate, and excepting at least the scanning line, and in each pixel region, the gate electrode extending from the scanning line to the thin film transistor section or sharing a portion of the scanning line, a lower layer signal line formed non-contactingly between adjacent scanning lines to form a portion of the signal line, removing the conductor layer by etching; in a second step, laminating successively on the transparent insulation substrate plate, a gate insulation layer and a semiconductor layer comprised by an amorphous silicon layer and an $n^+$ amorphous silicon layer, and excepting a specific opening section formed above the conductor layer in the first step, and leaving so as to cover at least an upper surface of the conductor layer and an entire lateral surface with the gate insulation layer, removing the semiconductor layer and the gate insulation layer by etching; in a third step, laminating successively on the transparent insulation substrate plate, a transparent conductive layer and a metallic layer, and excepting a signal line terminal section formed in a signal line terminal section location, a connection electrode section connecting to the scanning line end section through the opening section formed above the scanning line end section, the scanning line terminal section formed in the scanning line terminal section location by further extending from the connection electrode section, an upper layer signal line connecting to the lower layer signal line opposing an adjacent pixel region across the scanning line through an opening section punched through the semiconductor layer and the gate insulation layer, and in each pixel region, the drain electrode extending from the upper layer signal line to the thin film transistor section, the pixel electrode, and the source electrode extending from the pixel electrode to the thin film transistor section disposed opposite to the drain electrode across a channel gap, removing the metallic layer and the transparent conductive layer by etching, and then removing by etching the $n^+$ amorphous silicon layer where exposed; and in a fourth step, forming a protective insulation layer on the transparent insulation substrate plate, and excepting the protective insulation layer above the pixel electrode and the scanning line terminal section and the signal line terminal section, and leaving so as to form at least the semiconductor layer of the thin film transistor section, removing the protective insulation layer and the semiconductor layer are successively by etching, and then, removing the metallic layer exposed at the opening section formed in the protective insulation layer above the pixel electrode and the scanning line terminal section and the signal line terminal section by etching, to expose the signal line terminal and the scanning line terminal and the pixel electrode comprised by the transparent conductive layer.

This method enables to manufacture the active matrix substrate plate according to the 42nd aspect of this invention in four steps.

The method for manufacturing an active matrix substrate plate according to the 62nd aspect of this invention relates to an IPS-type active matrix substrate plate, wherein, in a first step, forming a first conductor layer on the transparent insulation substrate plate, and excepting at least the scanning line, a scanning line terminal section formed in a scanning line terminal section location, and the common wiring line, and in each pixel region, the gate electrode sharing a portion of the scanning line, removing the first conductor layer by etching; in a second step, laminating successively on the transparent insulation substrate plate, a gate insulation layer and the semiconductor layer comprised by an amorphous silicon layer and an $n^+$ amorphous silicon layer, and excepting a specific opening section above the first conductor layer pattern formed in the first step, and leaving so as to cover at least an upper surface of the first conductor layer and an entire lateral surface with a semiconductor layer and the gate insulation layer, removing the semiconductor layer and the gate insulation layer by etching; in a third step, laminating on the transparent insulation substrate plate a second conductor layer, and excepting the signal line, a signal line terminal section formed in a signal line terminal section location, a connection electrode section connecting to the scanning line terminal section through the opening section formed above the scanning line terminal section, a common wiring linking line connecting to the opening section formed above the end section of the common wiring line to electrically connect the end section of the common wiring line, a common wiring line terminal section connecting to the common wiring linking line, and in each pixel region, the drain electrode extending from the signal line to the thin film transistor section, and in each pixel region, the pixel electrode extending from the signal line to the gate electrode section, a plurality of common electrodes whose base sections are connected to the common wiring line through the opening section punched through the semiconductor layer and the gate insulation layer, the pixel electrode extending so as to be clamped by the common electrodes, the source electrode extending from the pixel electrode to the thin film transistor section disposed opposite to the drain electrode across a channel gap, removing the second conductor layer by etching, and then removing by etching the $n^+$ amorphous silicon layer where exposed; and in a fourth step, forming a protective insulation layer on the transparent insulation substrate plate, and excepting the protective insulation layer above the connection electrode section and the signal line terminal section and the common wiring line terminal section, and leaving to form at least the semiconductor layer of the thin film transistor, removing protective insulation layer and the semiconductor layer by etching, to expose the scanning line terminal laminated with the second conductor layer through the opening section punched through the semiconductor layer and the gate insulation layer above the first conductor layer, and the signal line terminal and the common wiring line terminal comprised by the second conductor layer.

This method enables to manufacture the active matrix substrate plate according to the 43rd aspect of this invention in four steps.

The method for manufacturing an active matrix substrate plate according to the 63rd aspect of this invention relates to an IPS-type active matrix substrate plate, wherein, in a first step, forming a first conductor layer on the transparent insulation substrate plate, and excepting at least the scanning line, the common wiring line, and in each pixel region, the gate electrode sharing a portion of the scanning line, removing the first conductor layer by etching; in a second step, laminating successively on the transparent insulation substrate plate, a gate insulation layer and a semiconductor layer comprised by an amorphous silicon layer and an $n^+$ amorphous silicon layer, and excepting a specific opening section above the first conductor layer pattern formed in the first step, and leaving so as to cover at least an upper surface of the first conductor layer and an entire lateral surface with a semiconductor layer and the gate insulation layer, removing the semiconductor layer and the gate insulation layer by etching; in a third step, laminating on the transparent insulation substrate plate a second conductor layer, and excepting the signal line, a signal line terminal section formed in a signal line terminal section location, a connection electrode section connecting to the scanning line end section through the opening section formed above the scanning line end section, a scanning line terminal section formed by further extending from the connection electrode section, a common wiring linking line connecting to the end section of the common wiring line through the opening section formed above the end section of the common wiring line to electrically connect the end section of the common wiring line, a common wiring line terminal section connecting to the common wiring linking line, and in each pixel region, the drain electrode extending from the signal line to the thin film transistor section formed on the scanning line, a plurality of common electrodes whose base sections are connected to the common wiring line through the opening section punched through the semiconductor layer and the gate insulation layer, the pixel electrode extending so as to be clamped by the common electrodes, the source electrode extending from the pixel electrode to the thin film transistor section disposed opposite to the drain electrode across a channel gap, removing the second conductor layer by etching, and then removing by etching the $n^+$ amorphous silicon layer where exposed; and in a fourth step, forming a protective insulation layer on the transparent insulation substrate plate, and excepting the protective insulation layer above the signal line terminal section and the scanning line terminal section and the common wiring line terminal section, and leaving to form at least the semiconductor layer of the thin film transistor, removing the protective insulation layer and the semiconductor layer by etching, to expose the scanning line terminal and the signal line terminal and common wiring line terminal comprised by the second conductor layer.

This method enables to manufacture the active matrix substrate plate according to the 43rd aspect of this invention in four steps.

The method for manufacturing an active matrix substrate plate according to the 64th aspect of this invention relates to an IPS-type active matrix substrate plate, wherein in a first step, forming a first conductor layer on the transparent insulation substrate plate, and excepting at least the scanning line, a scanning line terminal section formed in a scanning line terminal section location, and the common wiring line, and in each pixel region, the gate electrode sharing a portion of the scanning line, a plurality of common electrodes extending from the common wiring line, removing the first conductor layer by etching; in a second step, laminating successively on the transparent insulation substrate plate, a gate insulation layer and a semiconductor layer comprised by an amorphous silicon layer and an $n^+$ amorphous silicon layer, and excepting a specific opening section above the first conductor layer pattern formed in the first step, and leaving so as to cover at least an upper surface and an entire lateral surface of the first conductor layer with the semiconductor layer and the gate insulation layer, removing the semiconductor layer and the gate insulation layer by etching; in a third step, laminating on the transparent insulation substrate plate a second conductor layer, and excepting the signal line, a signal line terminal section formed in a signal line terminal section location, a connection electrode section connecting to the scanning line terminal section through the opening section formed above the scanning line terminal section, a common wiring linking line connecting to the end section of the common wiring line through the opening section formed above the end section of the common wiring line to electrically connect the end section of the common wiring line, a common wiring line terminal section connecting to the common wiring linking line, and in each pixel region, the drain electrode extending from the signal line to the thin film transistor section, and in each pixel region, the pixel electrode extending from the signal line to the gate electrode section, the pixel electrode extending opposite to the common electrode, the source electrode extending from the pixel electrode to the thin film transistor section disposed opposite to the drain electrode across a channel gap, removing the second conductor layer by etching, and then removing by etching the $n^+$ amorphous silicon layer where exposed; and in a fourth step, forming a protective insulation layer on the transparent insulation substrate plate, and excepting the protective insulation layer above the connection electrode section and the signal line terminal section and the common wiring line terminal section, and leaving to form at least the semiconductor layer of the thin film transistor, removing the protective insulation layer and the semiconductor layer by etching, to expose the scanning line terminal laminated with the second conductor layer through the opening section punched through the semiconductor layer and the gate insulation layer above the first conductor layer, and the signal line terminal and the common wiring line terminal comprised by the second conductor layer.

This method enables to manufacture the active matrix substrate plate according to the 43rd aspect of this invention in four steps.

The method for manufacturing an active matrix substrate plate according to the 65th aspect of this invention relates to an IPS-type active matrix substrate plate, in a first step, forming a first conductor layer on the transparent insulation substrate plate, and excepting the scanning line, the common wiring line, the gate electrode sharing a portion of the scanning line, a plurality of common electrodes extending from the common wiring line, removing the first conductor layer by etching; in a second step, laminating successively on the transparent insulation substrate plate, a gate insulation layer and a semiconductor layer comprised by an amorphous silicon layer and an $n^+$ amorphous silicon layer, and excepting a specific opening section above the first conductor layer pattern formed in the first step, and leaving so as to cover at least an upper surface of the first conductor layer and an entire lateral surface with the semiconductor layer and the gate insulation layer, removing the semiconductor layer and the gate insulation layer by etching; in a third step, laminating on the transparent insulation substrate plate a second conductor layer, and excepting the signal line, a signal line terminal section formed in a signal line terminal section location, a connection electrode section connecting to the scanning line end section through the opening section formed above the scanning line end section, a scanning line terminal section formed by further extending from the connection electrode section, a common wiring linking line connecting to the end section of the common wiring line through the opening section formed above the end section of the common wiring line to electrically connect the end section of the common wiring line, a common wiring line terminal section connecting to the common wiring linking line, and in each pixel region, the drain electrode extending from the signal line to the thin film transistor section, the pixel electrode extending from the signal line to the gate electrode section, the pixel electrode extending so as to be clamped by the common electrode, the source electrode extending from the pixel electrode to the thin film transistor section disposed opposite to the drain electrode across a channel gap, removing the second conductor layer by etching, and then removing by etching the $n^+$ amorphous silicon layer where exposed; and in a fourth step, forming a protective insulation layer on the transparent insulation substrate plate, and after removing the protective insulation layer above the connection electrode section and the signal line terminal section and the common wiring line terminal section, and leaving so as to form at least the semiconductor layer of the thin film transistor, removing the protective insulation layer and the semiconductor layer by etching, to expose the scanning line terminal and the signal line terminal and the common wiring line terminal comprised by the second conductor layer.

This method enables to manufacture the active matrix substrate plate according to the 43rd aspect of this invention in four steps.

The method of manufacturing an active matrix substrate plate according to the 66th aspect of this invention relates to forming on a transparent insulating substrate plate having an array of pixel regions, wherein each pixel region contains a scanning line and a signal line and is surrounded by the scanning line and the signal line crossing each other at right angles, and in each pixel region is formed an inverted staggered structure thin film transistor comprised by a gate electrode, an island-shaped semiconductor layer opposing the gate electrode across a gate insulation layer, a pair of drain electrode and source electrode separated by a channel gap formed above the semiconductor layer, such that a pixel electrode is formed in a window section surrounded by the scanning line and the signal line for transmitting light, and the gate electrode is connected to the scanning line, the drain electrode is connected to the signal line, and the source electrode is connected to the pixel electrode, the method comprising: in a first step, forming a conductor layer on the transparent insulation substrate plate, and excepting at least the scanning line, a scanning line terminal section formed in a scanning line terminal section location, and in each pixel region, the gate electrode extending from the scanning line to the thin film transistor section or sharing a portion of the scanning line, removing the conductor layer by etching; in a second step, laminating successively on the transparent insulation substrate plate, a gate insulation layer and a semiconductor layer comprised by an amorphous silicon layer and an $n^+$ amorphous silicon layer and a metallic layer, and removing by etching at least a specific opening section above the conductor layer pattern formed in the first step and the metallic layer and the semiconductor layer and the gate insulation layer where the pixel electrode is to be formed; in a third step, forming a transparent conductive layer on the transparent insulation substrate plate, and excepting the signal line, a signal line terminal section formed in a signal line terminal section location, a connection electrode section connecting to the scanning line terminal section through the opening section formed above the scanning line terminal section, and in each pixel region, the drain electrode extending from the signal line to the thin film transistor section, the pixel electrode, and the source electrode extending from the pixel electrode to the thin film transistor section disposed opposite to the drain electrode across a channel gap, removing the transparent conductive layer by etching, and then removing by etching the metal layer and the $n^+$ amorphous silicon layer where exposed; and in a fourth step, forming a protective insulation layer on the transparent insulation substrate plate, and excepting the protective insulation layer above the pixel electrode and the connection electrode section and the signal line terminal section, and leaving so as to cover at least an upper surface and an entire lateral surface of the signal line with the protective insulation layer and so as to form the semiconductor layer of the thin film transistor, removing successively the protective insulation layer and the semiconductor layer by etching, to expose the pixel electrode comprised by the transparent conductive layer, the signal line terminal comprised by a lamination of the metallic layer and the transparent conductive layer or the transparent conductive layer itself, the scanning line terminal laminated above the conductor layer with the transparent conductive layer through the opening punched through the semiconductor layer and the gate insulation layer.

This method enables to manufacture the active matrix substrate plate according to the 44th aspect of this invention in four steps.

The method of manufacturing an active matrix substrate plate according to the 67th aspect of this invention relates to forming on a transparent insulating substrate plate having an array of pixel regions, wherein each pixel region contains a scanning line and a signal line and is surrounded by the scanning line and the signal line crossing each other at right angles, and in each pixel region is formed an inverted staggered structure thin film transistor comprised by a gate electrode, an island-shaped semiconductor layer opposing the gate electrode across a gate insulation layer, a pair of drain electrode and source electrode separated by a channel gap formed above the semiconductor layer, such that a pixel electrode is formed in a window section surrounded by the scanning line and the signal line for transmitting light, and the gate electrode is connected to the scanning line, the drain electrode is connected to the signal line, and the source electrode is connected to the pixel electrode, the method comprising: in a first step, forming a conductor layer on the transparent insulation substrate plate, and excepting at least the scanning line, and in each pixel region, the gate electrode extending from the scanning line to the thin film transistor section or sharing a portion of the scanning line, removing the conductor layer by etching; in a second step, laminating successively on the transparent insulation substrate plate, a gate insulation layer and a semiconductor layer comprised by an amorphous silicon layer and an $n^+$ amorphous silicon layer, and a metallic layer, and removing by etching at least a specific opening section above the conductor layer pattern formed in the first step and the metallic layer and the semiconductor layer and the gate insulation layer where the pixel electrode is to be formed; in a third step, forming a transparent conductive layer on the transparent insulation substrate plate, and excepting the signal line, a signal line terminal section formed in a signal line terminal section location, a connection electrode section connecting to the scanning line end section through the opening section formed above the scanning line end section, a scanning line terminal section formed by further extending from the connection electrode section, and in each pixel region, the drain electrode extending from the signal line to the thin film transistor section, the pixel electrode, and the source electrode extending from the pixel electrode to the thin film transistor section disposed opposite to the drain electrode across a channel gap, removing the transparent conductive layer by etching, and then removing by etching the metal layer and the $n^+$ amorphous silicon layer where exposed; and in a fourth step, forming a protective insulation layer on the transparent insulation substrate plate, and excepting the protective insulation layer above the pixel electrode and the scanning line terminal section and the signal line terminal section, and leaving so as to cover at least an upper surface and an entire lateral surface of the signal line with the protective insulation layer and so as to form the semiconductor layer of the thin film transistor, removing successively the protective insulation layer and the semiconductor layer by etching, to expose the pixel electrode comprised by the transparent conductive layer, and the scanning line terminal and the signal line terminal comprised by a lamination of the metallic layer and the transparent conductive layer or the transparent conductive layer itself.

This method enables to manufacture the active matrix substrate plate according to the 44th aspect of this invention in four steps.

The method of manufacturing an active matrix substrate plate according to the 68th aspect of this invention relates to forming on a transparent insulating substrate plate having an array of pixel regions, wherein each pixel region contains a scanning line and a signal line and is surrounded by the scanning line and the signal line crossing each other at right angles, and in each pixel region is formed an inverted staggered structure thin film transistor comprised by a gate electrode, an island-shaped semiconductor layer opposing the gate electrode across a gate insulation layer, a pair of drain electrode and source electrode separated by a channel gap formed above the semiconductor layer, such that a pixel electrode is formed in a window section surrounded by the scanning line and the signal line for transmitting light, and the gate electrode is connected to the scanning line, the drain electrode is connected to the signal line, and the source electrode is connected to the pixel electrode, the method comprising: in a first step, forming a conductor layer on the transparent insulation substrate plate, and excepting at least the scanning line, the scanning line terminal section formed in a scanning line terminal section location, a lower layer signal line formed non-contactingly between adjacent scanning lines to form a portion of the signal line, and in each pixel region, the gate electrode extending from the scanning line to the thin film transistor section or sharing a portion of the scanning line, removing the conductor layer by etching; in a second step, laminating successively on the transparent insulation substrate plate, a gate insulation layer and a semiconductor layer comprised by an amorphous silicon layer and an $n^+$ amorphous silicon layer and a metallic layer, and removing by etching at least a specific opening section above the conductor layer pattern formed in the first step and the metallic layer and the semiconductor layer and the gate insulation layer where the pixel electrode is to be formed; in a third step, forming a transparent conductive layer on the transparent insulation substrate plate, and excepting an upper layer signal line connecting to a lower layer signal line opposing an adjacent pixel region across the scanning line through an opening section punched through the semiconductor layer and the gate insulation layer, a signal line terminal section formed in a signal line terminal section location, a connection electrode section connecting to the scanning line terminal section through the opening section formed above the scanning line terminal section, and in each pixel region, the drain electrode extending from the upper layer signal line to the thin film transistor section, the pixel electrode, and the source electrode extending from the pixel electrode to the thin film transistor section disposed opposite to the drain electrode across a channel gap, removing the transparent conductive layer by etching, and then removing by etching the metal layer and the $n^+$ amorphous silicon layer where exposed; and in a fourth step, forming a protective insulation layer on the transparent insulation substrate plate, and excepting the protective insulation layer above the pixel electrode and the connection electrode section and the signal line terminal section, and leaving so as to cover at least an upper surface and an entire lateral surface of the upper layer signal line with the protective insulation layer and so as to form the semiconductor layer of the thin film transistor, removing successively the protective insulation layer and the semiconductor layer by etching, to expose the pixel electrode comprised by the transparent conductive layer, the signal line terminal comprised by a lamination of the metallic layer and the transparent conductive layer or the transparent conductive layer itself, scanning line terminal laminated above the conductor layer with the transparent conductive layer through the opening section punched through the semiconductor layer and the gate insulation layer.

This method enables to manufacture the active matrix substrate plate according to the 44th aspect of this invention in four steps.

The method of manufacturing an active matrix substrate plate according to the 69th aspect of this invention relates to forming on a transparent insulating substrate plate having an array of pixel regions, wherein each pixel region contains a scanning line and a signal line and is surrounded by the scanning line and the signal line crossing each other at right angles, and in each pixel region is formed an inverted staggered structure thin film transistor comprised by a gate electrode, an island-shaped semiconductor layer opposing the gate electrode across a gate insulation layer, a pair of drain electrode and source electrode separated by a channel gap formed above the semiconductor layer, such that a pixel electrode is formed in a window section surrounded by the scanning line and the signal line for transmitting light, and the gate electrode is connected to the scanning line, the drain electrode is connected to the signal line, and the source electrode is connected to the pixel electrode, the method comprising: in a first step, forming a conductor layer on the transparent insulation substrate plate, and excepting at least the scanning line, a lower layer signal line formed non-contactingly between adjacent scanning lines to form a portion of the signal line, and in each pixel region, the gate electrode extending from the scanning line to the thin film transistor section or sharing a portion of the scanning line, removing the conductor layer by etching; in a second step, laminating successively on the transparent insulation substrate plate, a gate insulation layer and a semiconductor layer comprised by an amorphous silicon layer and an $n^+$ amorphous silicon layer and a metallic layer, and removing by etching at least a specific opening section above the conductor layer pattern formed in the first step and the metallic layer and the semiconductor layer and the gate insulation layer where the pixel electrode is to be formed; in a third step, forming a transparent conductive layer on the transparent insulation substrate plate, and excepting an upper layer signal line connecting to a lower layer signal line opposing an adjacent pixel region across the scanning line through an opening section punched through the semiconductor layer and the gate insulation layer, a signal line terminal section formed in a signal line terminal section location, a connection electrode section connecting to the scanning line end section through the opening section formed above the scanning line end section, a scanning line terminal section formed by further extending from the connection electrode section, and in each pixel region, the drain electrode extending from the upper layer signal line to the thin film transistor section, the pixel electrode, and the source electrode extending from the pixel electrode to the thin film transistor section disposed opposite to the drain electrode across a channel gap, removing the transparent conductive layer by etching, and then removing by etching the metal layer and the $n^+$ amorphous silicon layer where exposed; and in a fourth step, forming a protective insulation layer on the transparent insulation substrate plate, and excepting the protective insulation layer above the pixel electrode and the scanning line terminal section and the signal line terminal section, and leaving so as to cover at least an upper surface and an entire lateral surface of the upper layer signal line with the protective insulation layer and so as to form the semiconductor layer of the thin film transistor, removing successively the protective insulation layer and the semiconductor layer by etching, to expose the pixel electrode comprised by the transparent conductive layer, the scanning line terminal and the signal line terminal comprised by a lamination of the metallic layer and the transparent conductive layer or the transparent conductive layer itself.

This method enables to manufacture the active matrix substrate plate according to the 44th aspect of this invention in four steps.

The method of manufacturing an active matrix substrate plate according to the 70th aspect of this invention relates to forming on a transparent insulating substrate plate having an array of pixel regions, wherein each pixel region contains a scanning line and a signal line and is surrounded by the scanning line and the signal line crossing each other at right angles, and in each pixel region is formed an inverted staggered structure thin film transistor comprised by a gate electrode, an island-shaped semiconductor layer opposing the gate electrode across a gate insulation layer, a pair of drain electrode and source electrode separated by a channel gap formed above the semiconductor layer, such that a pixel electrode is formed in a window section surrounded by the scanning line and the signal line for transmitting light, and the gate electrode is connected to the scanning line, the drain electrode is connected to the signal line, and the source electrode is connected to the pixel electrode, the method comprising: in a first step, forming a conductor layer on the transparent insulation substrate plate, and excepting at least the scanning line, a scanning line terminal section formed in a scanning line terminal section location, and in each pixel region, the gate electrode extending from the scanning line to the thin film transistor section or sharing a portion of the scanning line, removing the conductor layer by etching; in a second step, laminating successively on the transparent insulation substrate plate, a gate insulation layer and a semiconductor layer comprised by an amorphous silicon layer, and forming an $n^+$ amorphous silicon layer on the semiconductor layer by doping with a group V element, and then depositing a metallic layer, and removing by etching at least a specific opening section above the conductor layer pattern formed in the first step, the portion of the metallic layer and the semiconductor layer and the gate insulation layer where the pixel electrode is to be formed; in a third step, forming a transparent conductive layer on the transparent insulation substrate plate, and excepting the signal line, a signal line terminal section formed in a signal line terminal section location, a connection electrode section connecting to the scanning line terminal section through the opening section formed above the scanning line terminal section, and in each pixel region, the drain electrode extending from the signal line to the thin film transistor section, the pixel electrode, and the source electrode extending from the pixel electrode to the thin film transistor section disposed opposite to the drain electrode across a channel gap, removing the transparent conductive layer by etching, and then removing by etching the metal layer and the $n^+$ amorphous silicon layer formed by doping with a group V element where exposed; and in a fourth step, forming a protective insulation layer on the transparent insulation substrate plate, and excepting the protective insulation layer above the pixel electrode and the connection electrode section and the signal line terminal section, and leaving so as to cover at least an upper surface and an entire lateral surface of the signal line with the protective insulation layer and so as to form the semiconductor layer of the thin film transistor, removing successively the protective insulation layer and the semiconductor layer by etching, to expose the pixel electrode comprised by the transparent conductive layer, the signal line terminal comprised by a lamination of the metallic layer and the transparent conductive layer or the transparent conductive layer itself, the scanning line terminal laminated above the conductor layer with the transparent conductive layer through the opening section punched through the semiconductor layer and the gate insulation layer.

This method enables to manufacture the active matrix substrate plate according to the 45th aspect of this invention in four steps.

The method of manufacturing an active matrix substrate plate according to the 71st aspect of this invention relates to forming on a transparent insulating substrate plate having an array of pixel regions, wherein each pixel region contains a scanning line and a signal line and is surrounded by the scanning line and the signal line crossing each other at right angles, and in each pixel region is formed an inverted staggered structure thin film transistor comprised by a gate electrode, an island-shaped semiconductor layer opposing the gate electrode across a gate insulation layer, a pair of drain electrode and source electrode separated by a channel gap formed above the semiconductor layer, such that a pixel electrode is formed in a window section surrounded by the scanning line and the signal line for transmitting light, and the gate electrode is connected to the scanning line, the drain electrode is connected to the signal line, and the source electrode is connected to the pixel electrode, the method comprising: in a first step, forming a conductor layer on the transparent insulation substrate plate, and excepting at least the scanning line, and in each pixel region, the gate electrode extending from the scanning line to the thin film transistor section or sharing a portion of the scanning line, removing the conductor layer by etching; in a second step, laminating successively on the transparent insulation substrate plate, a gate insulation layer and a semiconductor layer comprised by an amorphous silicon layer, and forming an $n^+$ amorphous silicon layer on the semiconductor layer by doping with a group V element, and then depositing a metallic layer, and removing by etching a specific opening section above the conductor layer pattern formed in the first step, the portion of the metallic layer and the semiconductor layer and the gate insulation layer where the pixel electrode is to be formed; in a third step, forming a transparent conductive layer on the transparent insulation substrate plate, and excepting the signal line, the signal line end section formed in the signal line end section location, the connection electrode section connecting to the scanning line end section through the opening section formed above the scanning line end section, a scanning line terminal section formed by further extending from the connection electrode section, and in each pixel region, the drain electrode extending from the signal line to the thin film transistor section, the pixel electrode, and the source electrode extending from the pixel electrode to the thin film transistor section disposed opposite to the drain electrode across a channel gap, removing the transparent conductive layer by etching, and then removing by etching the metal layer and the $n^+$ amorphous silicon layer formed by doping with a group V element where exposed; and in a fourth step, forming a protective insulation layer on the transparent insulation substrate plate, and excepting the protective insulation layer above the pixel electrode and the scanning line terminal section and the signal line terminal section, and leaving so as to cover at least an upper surface and an entire lateral surface of the signal line with the protective insulation layer and so as to form the semiconductor layer of the thin film transistor, removing successively the protective insulation layer and the semiconductor layer by etching, to expose the pixel electrode comprised by the transparent conductive layer, the scanning line terminal and the signal line terminal comprised by a lamination of the metallic layer and the transparent conductive layer or the transparent conductive layer itself.

This method enables to manufacture the active matrix substrate plate according to the 45th aspect of this invention in four steps.

The method of manufacturing an active matrix substrate plate according to the 72nd aspect of this invention relates to forming on a transparent insulating substrate plate having an array of pixel regions, wherein each pixel region contains a scanning line and a signal line and is surrounded by the scanning line and the signal line crossing each other at right angles, and in each pixel region is formed an inverted staggered structure thin film transistor comprised by a gate electrode, an island-shaped semiconductor layer opposing the gate electrode across a gate insulation layer, a pair of drain electrode and source electrode separated by a channel gap formed above the semiconductor layer, such that a pixel electrode is formed in a window section surrounded by the scanning line and the signal line for transmitting light, and the gate electrode is connected to the scanning line, the drain electrode is connected to the signal line, and the source electrode is connected to the pixel electrode, the method comprising: in a first step, forming a conductor layer on the transparent insulation substrate plate, and excepting at least the scanning line, a scanning line terminal section formed in a scanning line terminal section location, a lower layer signal line formed non-contactingly between adjacent scanning lines to form a portion of the signal line, and in each pixel region, the gate electrode extending from the scanning line to the thin film transistor section or sharing a portion of the scanning line, removing the conductor layer by etching; in a second step, laminating successively on the transparent insulation substrate plate, a gate insulation layer and a semiconductor layer comprised by an amorphous silicon layer, and forming an $n^+$ amorphous silicon layer on the semiconductor layer by doping with a group V element, and then depositing a metallic layer, and removing by etching at least a specific opening section above the conductor layer pattern formed in the first step, the portion of the metallic layer and the semiconductor layer and the gate insulation layer where the pixel electrode is to be formed; in a third step, forming a transparent conductive layer on the transparent insulation substrate plate, and excepting an upper layer signal line connecting to a lower layer signal line opposing an adjacent pixel region across the scanning line through an opening section punched through the semiconductor layer and the gate insulation layer, a signal line terminal section formed in a signal line terminal section location, a connection electrode section connecting to the scanning line terminal section through the opening section formed above the scanning line terminal section, and in each pixel region, the drain electrode extending from the upper layer signal line to the thin film transistor section, the pixel electrode, and the source electrode extending from the pixel electrode to the thin film transistor section disposed opposite to the drain electrode across a channel gap, removing the transparent conductive layer by etching, and then removing by etching the metal layer and the $n^+$ amorphous silicon layer formed by doping with the group V element where exposed; and in a fourth step, forming a protective insulation layer on the transparent insulation substrate plate, and excepting the protective insulation layer above the pixel electrode and the connection electrode section and the signal line terminal section, and leaving so as to cover at least an upper surface and an entire lateral surface of the upper layer signal line with the protective insulation layer and so as to form the semiconductor layer of the thin film transistor, removing successively the protective insulation layer and the semiconductor layer by etching, to expose the pixel electrode comprised by the transparent conductive layer, the signal line terminal comprised by a lamination of the metallic layer and the transparent conductive layer or the transparent conductive layer itself, the scanning line terminal laminated above the conductor layer with the transparent conductive layer through the opening section punched through the semiconductor layer and the gate insulation layer.

This method enables to manufacture the active matrix substrate plate according to the 45th aspect of this invention in four steps.

The method of manufacturing an active matrix substrate plate according to the 73rd aspect of this invention relates to forming on a transparent insulating substrate plate having an array of pixel regions, wherein each pixel region contains a scanning line and a signal line and is surrounded by the scanning line and the signal line crossing each other at right angles, and in each pixel region is formed an inverted staggered structure thin film transistor comprised by a gate electrode, an island-shaped semiconductor layer opposing the gate electrode across a gate insulation layer, a pair of drain electrode and source electrode separated by a channel gap formed above the semiconductor layer, such that a pixel electrode is formed in a window section surrounded by the scanning line and the signal line for transmitting light, and the gate electrode is connected to the scanning line, the drain electrode is connected to the signal line, and the source electrode is connected to the pixel electrode, the method comprising: in a first step, forming a conductor layer on the transparent insulation substrate plate, and excepting at least the scanning line, a lower layer signal line formed non-contactingly between adjacent scanning lines to form a portion of the signal line, and in each pixel region, the gate electrode extending from the scanning line to the thin film transistor section or sharing a portion of the scanning line, removing the conductor layer by etching; in a second step, laminating successively on the transparent insulation substrate plate, a gate insulation layer and a semiconductor layer comprised by an amorphous silicon layer, and forming an $n^+$ amorphous silicon layer on the semiconductor layer by doping with a group V element, and then depositing a metallic layer, and removing by etching at least a specific opening section above the conductor layer pattern formed in the first step, the portion of the metallic layer and the semiconductor layer and the gate insulation layer where the pixel electrode is to be formed; in a third step, forming a transparent conductive layer on the transparent insulation substrate plate, and excepting an upper layer signal line connecting to a lower layer signal line opposing an adjacent pixel region across the scanning line through an opening section punched through the semiconductor layer and the gate insulation layer, a signal line terminal section formed in a signal line terminal section location, a connection electrode section connecting to the scanning line end section through the opening section formed above the scanning line end section, a scanning line terminal section formed by further extending from the connection electrode section, and in each pixel region, the drain electrode extending from the upper layer signal line to the thin film transistor section, the pixel electrode, and the source electrode extending from the pixel electrode to the thin film transistor section disposed opposite to the drain electrode across a channel gap, removing the transparent conductive layer by etching, and then removing by etching the metal layer and the $n^+$ amorphous silicon layer formed by doping of the group V element where exposed; and in a fourth step, forming a protective insulation layer on the transparent insulation substrate plate, and excepting the protective insulation layer above the pixel electrode and the scanning line terminal section and the signal line terminal section, and leaving so as to cover at least an upper surface and an entire lateral surface of the upper layer signal line with the protective insulation layer and so as to form the semiconductor layer of the thin film transistor, removing successively the protective insulation layer and the semiconductor layer by etching, to expose the pixel electrode comprised by the transparent conductive layer, the scanning line terminal and the signal line terminal comprised by a lamination of the metallic layer and the transparent conductive layer or the transparent conductive layer itself.

This method enables to manufacture the active matrix substrate plate according to the 45th aspect of this invention in four steps.

The method of manufacturing an active matrix substrate plate according to the 74th aspect of this invention relates to one according to one of the 62nd to the 65th aspects of this invention, wherein in the third step, the second conductor layer is formed by laminating a high melting point metal and an upper layer of Al or an alloy of primarily Al.

This method for manufacturing this active matrix substrate plate enables to lower the wiring resistance of signal line and to secure reliability of connection of the signal line driver at the signal line terminal section. When the structure of the scanning line terminal is the same as that for the signal line terminal, reliability of connection of the scanning line driver at the scanning line terminal section can similarly be secured.

The method of manufacturing an active matrix substrate plate according to the 75th aspect of this invention related to one according to one of the 62nd to the 65th aspects of this invention, wherein, in the third step, the second conductor layer is formed by laminating not less than one layer of a conductive film and an upper layer of a nitride film of a metal or a transparent conductive layer.

This method for manufacturing these active matrix substrate plates enables to secure reliability of connection of the signal line driver at the signal line terminal section. When the structure of the scanning line terminal is the same as that for the signal line terminal, reliability of connection of the scanning line driver at the scanning line terminal can similarly be secured.

A method of manufacturing an active matrix substrate plate according to the 76th aspect of this invention relates to the 75th aspect of this invention, wherein the nitride film of a metal is comprised by a nitride film of Ti, Ta, Nb, Cr or a nitride film of an alloy comprised primarily of at least one metal selected from Ti, Ta, Nb, Cr.

This method for manufacturing an active matrix substrate plate provides the same beneficial effects as described above.

The method of manufacturing an active matrix substrate plate according to the 77th aspect of this invention relates to the 76th aspect of this invention, wherein the nitride film of a metal is formed by reactive sputtering so as to produce a nitrogen concentration of not less than 25 atomic percent.

This method for manufacturing an active matrix substrate plate enables to secure good reliability of connection of the signal line driver at the signal line terminal section. When the structure of the scanning line terminal is the same as that for the signal line terminal, reliability of connection of the scanning line driver at the scanning line terminal can similarly be secured.

The method of manufacturing an active matrix substrate plate according to the 78th aspect of this invention relates to the 18th aspect of this invention, wherein, on the outside of a display surface where the pixel regions are arranged in a matrix, a gate-shunt bus line is formed for connecting the respective scanning line, and on the outside of the display surface, a drain-shunt bus line is formed for connecting the respective signal line, and the gate-shunt bus line and the drain-shunt bus line are connected at least at one point, and when manufacturing the active matrix substrate plate, in the first step, excepting the gate-shunt bus line for connecting respective scanning line, removing the conductor layer by etching; in the third step, leaving so as to superimpose the drain-shunt bus line for connecting respective signal line on the gate-shunt bus line at one point at least and removing the metallic layer and the transparent conductive layer by etching; and in the fourth step, removing by etching the protective insulation layer and the metallic layer above a superposition location of the gate-shunt bus line and the drain-shunt bus line, and irradiating the superposition location with a laser beam to fuse and short circuit the gate-shunt bus line and the drain-shunt bus line by punching through the gate insulation layer.

This method allows easily fusing of the gate-shunt bus line and the drain-shunt bus line, and in the subsequent manufacturing processing to trimming and removal, even if unexpected electrical shock is applied, potential difference cannot be developed between the scanning and signal lines so as to prevent shorting between the scanning lines and signal lines due to insulation breakdown.

The method of manufacturing an active matrix substrate plate according to the 79th aspect of this invention relates to the 19th aspect of this invention, wherein, on the outside of a display surface where the pixel regions are arranged in a matrix, a gate-shunt bus line is formed for connecting the respective scanning line, and on the outside of the display surface, a drain-shunt bus line is formed for connecting the respective signal line, and the gate-shunt bus line and the drain-shunt bus line are connected at least at one point, and when manufacturing the active matrix substrate plate, in the first step, excepting the gate-shunt bus line for connecting respective scanning line, removing the first conductor layer by etching; in the third step, leaving so as to superimpose the drain-shunt bus line for connecting respective signal line on the gate-shunt bus line at one point at least and removing the second conductor layer by etching; and in the fourth step, removing by etching the protective insulation layer above a superposition location of the gate-shunt bus line and the drain-shunt bus line, and irradiating the superposition location with a laser beam to fuse and short circuit the gate-shunt bus line and the drain-shunt bus line by punching through the gate insulation layer.

This method provides the same beneficial effects as described above.

The method of manufacturing an active matrix substrate plate according to the 80th aspect of this invention relates to one according to one of the 20th to the 25th aspects of this invention, wherein, on the outside of a display surface where the pixel regions are arranged in a matrix, a gate-shunt bus line is formed for connecting the respective scanning line, and on the outside of the display surface, a drain-shunt bus line is formed for connecting the respective signal line, and the gate-shunt bus line and the drain-shunt bus line are connected at least at one point, and when manufacturing the active matrix substrate plate, in the first step, excepting the gate-shunt bus line for connecting respective scanning line, removing the conductor layer by etching; in the second step, removing by etching the metallic layer and the semiconductor layer above the gate-shunt bus line; in the third step, leaving so as to superimpose the drain-shunt bus line for connecting respective signal line on the gate-shunt bus line at one point at least and removing the transparent conductive layer, and next, removing the metallic layer and the $n^+$ amorphous silicon layer where exposed by etching; and in the fourth step, removing by etching the protective insulation layer on top of a superposition location of the gate-shunt bus line and the drain-shunt bus line, and irradiating the superposition location with a laser beam to fuse and short circuit the gate-shunt bus line and the drain-shunt bus line by punching through the gate insulation layer.

This method provides the same beneficial effects as described above.

The method of manufacturing an active matrix substrate plate according to the 81st aspect of this invention relates to the 18th aspect of this invention, wherein, on the outside of a display surface where the pixel regions are arranged in a matrix, a high resistance line for connecting adjacent signal lines or for connecting a signal line and a common wiring line is provided, and when manufacturing the active matrix substrate plate, in the second step, excepting the portion to form the high resistance line, removing the semiconductor layer by etching; and in the third step, removing by etching the metallic layer and the transparent conductive layer above the portion to form the high resistance line and then removing the $n^+$ amorphous silicon layer where exposed by etching.

This method enables to negate any potential developed by unexpected electrical shock applied the signal line by dispersing the potential to adjacent signal lines or to common wiring lines so that it is possible to prevent shorting due to insulation breakdown between the signal lines and the scanning lines or changes in the properties of the TFT in the pixel region.

The method of manufacturing an active matrix substrate plate according to the 82nd aspect of this invention relates to the 19th aspect of this invention, wherein, on the outside of a display surface where the pixel regions are arranged in a matrix, a high resistance line for connecting adjacent signal lines or for connecting a signal line and a signal line linking line connected to a common wiring line is provided, and when manufacturing the active matrix substrate plate, in the second step, excepting the portion to form the high resistance line, removing the semiconductor layer by etching; in the third step, excepting the signal line linking line, removing by etching the second conductor layer above the portion to form the high resistance line, and then removing by etching the $n^+$ amorphous silicon layer where exposed; and in the fourth step, removing by etching a portion of the protective insulation layer above the signal line linking line, and a portion of the protective insulation layer and the gate insulation layer above the common wiring line, and in the subsequent steps, through the opening section formed in the protective insulation layer above the signal line linking line and the opening section formed in the protective insulation layer and the gate insulation layer above the common wiring line, the signal line linking line and the common wiring line are connected by silver beading.

This method provides the same beneficial effects as described above.

The method of manufacturing an active matrix substrate plate according to the 83rd aspect of this invention relates to the 20th or the 21st aspect of this invention, wherein, on the outside of a display surface where the pixel regions are arranged in a matrix, a high resistance line for connecting adjacent signal lines or for connecting a signal line and a common wiring line is provided, and when manufacturing the active matrix substrate plate, in the second step, excepting the portion to form the high resistance line, removing the metallic layer and the semiconductor layer by etching; and in the third step, removing by etching the transparent conductive layer above the portion to form the high resistance line and then removing the metallic layer and the $n^+$ amorphous silicon layer where exposed by etching, thereby forming the signal line and the high resistance line using a same step.

This method provides the same beneficial effects as described above.

The method of manufacturing an active matrix substrate plate according to the 84th aspect of this invention relates to one according to one of the 22nd to the 25th aspects of this invention, wherein, on the outside of a display surface where the pixel regions are arranged in a matrix, a high resistance line for connecting adjacent signal lines or for connecting a signal line and a signal line linking line connected to a common wiring line is provided, and when manufacturing the active matrix substrate plate, in the second step, excepting the portions to form the signal line linking line and the high resistance line, removing the metallic layer and the semiconductor layer by etching; in the third step, removing by etching the transparent conductive layer above the portion to form the high resistance line and then removing the metallic layer and the $n^+$ amorphous silicon layer where exposed by etching, thereby making the signal line and the high resistance line in a same step; in the fourth step, removing by etching a portion of the protective insulation layer above the signal line linking line, and a portion of the protective insulation layer and the gate insulation layer above the common wiring line, and in the subsequent steps, through the opening section formed in the protective insulation layer above the signal line linking line and the opening section formed in the protective insulation layer and the gate insulation layer above the common wiring line, the signal line linking line and the common wiring line are connected by silver beading.

This method provides the same beneficial effects as described above.

The method of manufacturing an active matrix substrate plate according to the 85th aspect of this invention relates to the 18th aspect of this invention, wherein, on the outside of a display surface where the pixel regions are arranged in a matrix, where adjacent signal lines are connected to each other across the island-shaped semiconductor layer comprised by amorphous silicon above the floating electrode formed concurrently with the scanning lines, or the signal line is connected to the common wiring line across the island-shaped semiconductor layer comprised by amorphous silicon above the floating electrode formed concurrently with the scanning lines, and when manufacturing the active matrix substrate plate, in the first step, excepting the floating electrode, removing the conductor layer by etching; in the second step, leaving an island-shaped semiconductor layer in a portion above the floating electrode, and removing the semiconductor layer; and in the third step, removing by etching the metallic layer and the transparent conductive layer so as to connect the adjacent signal lines or the signal line to the common wiring line across the island-shaped semiconductor layer, and then removing the $n^+$ amorphous silicon layer where exposed by etching.

This method provides the same beneficial effects as described above.

The method of manufacturing an active matrix substrate plate according to the 86th aspect of this invention relates to the 19th aspect of this invention, wherein, on the outside of a display surface where the pixel regions are arranged in a matrix where adjacent signal lines are linked to each other across the island-shaped semiconductor layer comprised by amorphous silicon above the floating electrode formed concurrently with the scanning lines, or the signal line is connected to the signal line linking line connected to the common wiring linking line across the island-shaped semiconductor layer comprised by amorphous silicon above the floating electrode formed concurrently with the scanning lines, and when manufacturing the active matrix substrate plate, in the first step, excepting the floating electrode, removing the conductor layer by etching; in the second step, leaving an island-shaped semiconductor layer in a portion above the floating electrode, and removing the semiconductor layer; in the third step, removing by etching the metallic layer and the transparent conductive layer so as to connect the adjacent signal lines or the signal line to the signal line linking line across the island-shaped semiconductor layer, and then, removing the $n^+$ amorphous silicon layer where exposed by etching; and in the fourth step, removing by etching a portion of the protective insulation layer above the signal line linking line, and a portion of the protective insulation layer and the gate insulation layer above the common wiring line, and in the subsequent steps, through the opening section formed in the protective insulation layer above the signal line linking line and the opening section formed in the protective insulation layer and the gate insulation layer above the common wiring line, the signal line linking line and the common wiring line are connected by silver beading.

This method provides the same beneficial effects as described above.

The method of manufacturing an active matrix substrate plate according to the 87th aspect of this invention relates to the 20th or the 21st aspect of this invention, wherein, on the outside of a display surface where the pixel regions are arranged in a matrix where adjacent signal lines are linked to each other across the semiconductor layer comprised by amorphous silicon above the floating electrode formed concurrently with the scanning lines, or the signal line is connected to the common wiring line across the semiconductor layer comprised by amorphous silicon above the floating electrode formed concurrently with the scanning lines, and when manufacturing the active matrix substrate plate, in the first step, excepting the floating electrode, removing the conductor layer by etching; in the second step, leaving so as to link the adjacent signal lines or the signal line and the common wiring line, removing the metallic layer and the semiconductor layer by etching; and in the third step, removing by etching the transparent conductive layer on top of a portion where the adjacent signal lines or the signal line and the common wiring line are connected, and then removing the metallic layer and the $n^+$ amorphous silicon layer where exposed by etching, thereby making the signal line and the common wiring line and the semiconductor layer of the linking portion in a same step.

This method provides the same beneficial effects as described above.

The method of manufacturing an active matrix substrate plate according to the 88th aspect of this invention relates to one of the 22nd to the 25th aspects of this invention, wherein, on the outside of a display surface where the pixel regions are arranged in a matrix, where adjacent signal lines are connected to each other across the semiconductor layer comprised by amorphous silicon above the floating electrode formed concurrently with the scanning lines, or the signal line is connected to the signal line linking line connected to a common line linking line across the semiconductor layer comprised by amorphous silicon above the floating electrode formed concurrently with the scanning lines, and when manufacturing the active matrix substrate plate, in the first step, excepting the floating electrode, removing the conductor layer by etching; in the second step, removing the metallic layer and the semiconductor layer by etching so as to connect the adjacent signal lines or the signal line and the common wiring line linking line; in the third step, removing by etching the transparent conductive layer above the adjacent signal lines or a portion where the signal line and the common wiring line linking line are linked, and then removing the metallic layer and the $n^+$ amorphous silicon layer where exposed by etching, thereby making the signal line and the common wiring line linking line and the semiconductor layer at the linked portion in a same step; in the fourth step, removing by etching a portion of the protective insulation layer above the signal line linking line, and a portion of the protective insulation layer and the gate insulation layer above the common wiring line, and in the subsequent steps, through the opening section formed in the protective insulation layer above the signal line linking line and the opening section formed in protective insulation layer and the gate insulation layer above the common wiring line, the signal line linking line and the common wiring line are connected by silver beading.

This method provides the same beneficial effects as described above.

The method of manufacturing an active matrix substrate plate according to the 89th aspect of this invention relates to one according to one of the 58th to the 73rd aspects of this invention, wherein, in the fourth step, leaving the protective insulation layer so that the perimeter section of the protective insulation layer descends vertically to cover a portion of the lateral surface of the channel gap lateral section where amorphous silicon layer is exposed, and the outer protective insulation layer and the semiconductor layer are removed by etching.

This method for manufacturing an active matrix substrate plate, because a portion of both lateral surfaces of the semiconductor layer extending in the direction of the channel section in the TFT section is covered by the protective insulation layer, charge leaking through the lateral surface of the semiconductor layer can be prevented to secure reliability of the TFT section.

The method of manufacturing an active matrix substrate plate according to the 90th aspect of this invention relates to the 89th aspect of this invention, wherein, in the second step, removing by etching the semiconductor layer and the gate insulation layer on the outside of at least one end section of the channel gap to form an opening section to reach the gate electrode or the scanning line; and in the fourth step, the opening section and a perimeter section that formed in the protective insulation layer are intersected, and leaving the protective insulation layer above the thin film transistor so that the perimeter section of the protective insulation layer descends vertically to cover a portion of the lateral surface of the channel gap lateral section where amorphous silicon layer is exposed through the opening section, and removing the outer protective insulation layer and the semiconductor layer by etching.

This method provides the same beneficial effects as described above.

The method of manufacturing an active matrix substrate plate according to the 91st aspect of this invention relates to the 90th aspect of this invention, wherein, in the second step, the opening section is formed on both outer lateral sections of the channel gap.

This method provides the same beneficial effects as described above.

The method of manufacturing an active matrix substrate plate according to the 92nd aspect of this invention relates to one according to one of the 58th to the 61st, and the 66th to the 73rd aspects of this invention, wherein, in the second step, removing by etching the semiconductor layer and the gate insulation layer on the outer end section of the channel gap at least on the scanning line side to form an opening section so that at least one portion is included in the scanning line; and in the fourth step, the opening section and a perimeter section formed in the protective insulation layer are intersected, and leaving the protective insulation layer above the thin film transistor so that the perimeter section of the protective insulation layer descends vertically to cover a portion of the lateral surface of the channel gap lateral section where amorphous silicon layer is exposed through the opening section, and removing the outer protective insulation layer and the semiconductor layer by etching.

In these methods for manufacturing an active matrix substrate plate, when etching the metallic layer of the signal line or the transparent conductive layer, even if the etching solution infiltrated through the opening section punched through the gate insulation layer above the gate electrode and the semiconductor layer and a portion of the semiconductor layer is corroded, because the opening section on the scanning line side is formed so as to be contained in the scanning line, there is no danger of the conductor layer at the base section of the gate electrode to be corroded seriously, so that the signal from the scanning line driver can be sent normally to the gate electrode of the TFT section.

The methods of manufacturing an active matrix substrate plates according to the 93rd and the 94th aspects of this invention relate to the 89th and the 92nd aspects of this invention, respectively, wherein, in the first step, on top of the transparent insulation substrate plate, not less than one layer of a conductor layer and an upper layer of a conductive etching protection layer are laminated to make the conductor layer.

In these methods of manufacturing an active matrix substrate plate, during etching of the metallic layer of the signal line or the transparent conductive layer, it is possible to prevent corrosion of the gate electrode or conductive layer below the scanning line due to infiltration of etching solution through the opening section punched through the gate insulation layer above the gate electrode and the semiconductor layer, thereby preventing severing of the base section of the gate electrode or the scanning line.

The methods of manufacturing an active matrix substrate plates according to the 95th and the 96th aspects of this invention relate to according to the 93rd and the 94th aspects of this invention, respectively, wherein at least one layer of the conductive layer is formed by Al or an alloy of primarily Al, and the conductive etching protection layer is formed by Ti, Ta, Nb or an alloy containing primarily one metal of preceding metals, or by Ti, Ta, Nb, Cr or a nitride film of an alloy containing primarily one metal of preceding metals.

This method provides the same beneficial effects as described above.

The method of manufacturing an active matrix substrate plate according to the 97th aspect of this invention relates to one according to the 59th, the 61st, the 67th, the 69th, the 71st, and the 73rd aspects of this invention, wherein, in the fourth step, the protective insulation layer is left unetched so as to cover a connection section between the conductor layer and the transparent conductive layer.

In the method for manufacturing an active matrix substrate plate according to the 59th or the 61st aspect of this invention, when the first conductor layer and the metallic layer of the second conductor layer are comprised by a same type of metals or they are to be etched by a same etching solution, at the contact section of the first conductor layer and the transparent conductive layer, when removing by etching the metallic layer above the transparent conductive layer after the opening section is formed on the protective insulation layer, it is possible to prevent the etching solution to infiltrate through the transparent conductive layer to corrode the first conductor layer.

Also, the method for manufacturing an active matrix substrate plate according to one of the 67th, the 69th, the 71st, or the 73rd aspects of this invention, when at least one layer of the first conductor layer is comprised by Al or an alloy of primarily Al, and if a hydrofluoric type acid is used to etch the opening section in the protective insulation layer, at the contact section of the first conductor layer and the transparent conductive layer, during etching forming of the opening section on the protective insulation layer, it is possible to prevent the etching solution to infiltrate through the transparent conductive layer to corrode Al or an alloy of primarily Al in the first conductor layer.

The method of manufacturing an active matrix substrate plate according to the 98th aspect of this invention relates to one according to one of the 18th, the 20th, the 21st, the 58th to the 61st, and the 66th to the 73rd aspects of this invention, wherein, in the first step, the conductor layer is removed by etching so as to leave the light blocking layer to superimpose at least on one section of the perimeter section of each pixel region.

In the method for manufacturing these active matrix substrate plates, because the light blocking layer is provided on the active matrix substrate plate side, it is possible to reduce the black matrix of the color filter substrate plate that needs to have a large superpositioning margin, thereby enabling to improve the aperture factor.

The method of manufacturing an active matrix substrate plate according to the 99 aspect of this invention relates to one according to one of the 18th, the 19th, the 58th to the 65th aspects of this invention, wherein, in the second step, the semiconductor layer is removed by etching so as to leave a portion where the scanning line and the signal line are intersected.

In this method for manufacturing an active matrix substrate plate, because the semiconductor layer is laminated on the gate insulation layer at the intersection point of the scanning line and the signal line, dielectric strength between the scanning line and the signal line is improved.

BRIEF DESCRIPTION OF THE DRAWINGS

FIG. 5A is a cross sectional view through the plane A–A' in FIG. 4A, FIG. 5B is a cross sectional view through the plane B–B' in FIG. 4A.

FIG. 11A is a cross sectional view through the plane A–A' in FIG. 10A, FIG. 11B is a cross sectional view through the plane B–B' in FIG. 10A.

FIG. 17A is a cross sectional view through the plane A–A' in FIG. 16A, FIG. 17B is a cross sectional view through the plane B–B' in FIG. 16A.

FIG. 23A is a cross sectional view through the plane A–A' in FIG. 22A, FIG. 23B is a cross sectional view through the plane B–B' in FIG. 22A.

FIG. 34A is a cross sectional view through the plane A–A' in FIG. 33A, FIG. 34B is a cross sectional view through the plane B–B' in FIG. 33A.

FIG. 40A is a cross sectional view through the plane A–A' in FIG. 39A, FIG. 40B is a cross sectional view through the plane B–B' in FIG. 39A.

FIG. 57A is a cross sectional view through the plane A–A', and FIG. 57B is a cross sectional view through the plane B–B', and FIG. 57C is a cross section view through the plane C–C', which are shown in FIGS. 56A–56C, respectively.

FIG. 63A is a cross sectional view through the plane A–A' in FIG. 62A, FIG. 63B is a cross sectional view through the plane B–B' in FIG. 62A, and FIG. 63C is a cross sectional view through the plane C–C' in FIG. 62A.

FIG. 69A is a cross sectional view through the plane A–A' in FIG. 68A, FIG. 69B is a cross sectional view through the plane B–B' in FIG. 68A, FIG. 69C is a cross sectional view through the plane C–C' in FIG. 68A.

FIG. 75A is a cross sectional view through the plane A–A' in FIG. 74A, FIG. 75B is a cross sectional view through the plane B–B' in FIG. 74A, and FIG. 75C is a cross sectional view through the plane C–C' in FIG. 74A.

FIG. 81A is a cross sectional view through the plane A–A' in FIG. 80A, FIG. 81B is a cross sectional view through the plane B–B' in FIG. 80A, and FIG. 81C is a cross sectional view through the plane C–C' in FIG. 80A.

FIG. 87A is a cross sectional view through the plane A–A' in FIG. 86A, FIG. 87B is a cross sectional view through the plane B–B' in FIG. 86A, and FIG. 87C is a cross sectional view through the plane C–C' in FIG. 86A.

FIG. 93A is a cross sectional view through the plane A–A' in FIG. 92A, FIG. 93B is a cross sectional view through the plane B–B' in FIG. 92A, and FIG. 93C is a cross sectional view through the plane C–C' in FIG. 92A.

FIG. 99A is a cross sectional view through the plane A–A' in FIG. 98A, FIG. 99B is a cross sectional view through the plane B–B' in FIG. 98A, and FIG. 99C is a cross sectional view through the plane C–C' in FIG. 98A.

FIG. 105A a cross sectional view through the plane A–A' in FIG. 104A, and FIG. 105B is a cross sectional view through the plane B–B' in FIG. 104A, and FIG. 105C is a cross sectional view through the plane C–C' in FIG. 104A.

FIG. 111A is a cross sectional view through the plane A–A' in FIG. 110A, FIG. 111B is a cross sectional view through the plane B–B' in FIG. 110A, and FIG. 111C is a cross sectional view through the plane C–C' in FIG. 110A.

FIG. 117A is a cross sectional view through the plane A–A' in FIG. 116A, and FIG. 117B is a cross sectional view through the plane B–B' in FIG. 116A, and FIG. 117C is a cross sectional view through the plane C–C' in FIG. 116A.

FIG. 120A is a perspective plan view of a one-pixel-region of the active matrix substrate plate in step 1 of the manufacturing process in Embodiment 21, FIG. 120B is a cross sectional view through the plane A–A', and FIG. 120C is a cross sectional view through the plane B–B', and FIG. 120D is a cross section view through the plane C–C'.

FIG. 121A is a perspective plan view of a one-pixel-region of the active matrix substrate plate in step 2 of the manufacturing process in Embodiment 21, FIG. 121B is a cross sectional view through the plane A–A', and FIG. 121C is a cross sectional view through the plane B–B', and FIG. 121D is a cross section view through the plane C–C'.

FIG. 122A is a perspective plan view of a one-pixel-region of the active matrix substrate plate in step 3 of the manufacturing process in Embodiment 21, FIG. 122B is a cross sectional view through the plane A–A', and FIG. 122C is a cross sectional view through the plane B–B', and FIG. 122D is a cross section view through the plane C–C'.

FIGS. 123A–123C are cross sectional views of a channel-formed TFT in active matrix substrate plate manufacturing in Embodiment 21. FIG. 123A is a cross sectional view through the plane A–A' in FIG. 122A, FIG. 123B is a cross sectional view through the plane B–B' in FIG. 122A, and FIG. 123C is a cross sectional view through the plane C–C' in FIG. 122A.

FIG. 124A is a cross sectional view in the longitudinal direction of a terminal section of the active matrix substrate plate in Embodiment 21, and the left side relates to the scanning line terminal section and the right side relates to the signal line terminal section. FIGS. 124B–124D are cross sectional views relating to manufacturing step 1–step 3, respectively.

FIG. 125A is a perspective plan view of a one-pixel-region of the active matrix substrate plate in Embodiment 22, FIG. 125B is a cross sectional view through the plane A–A', and FIG. 125C is a cross sectional view through the plane B–B', and FIG. 125D is a cross section view through the plane C–C'.

FIG. 126A is a perspective plan view of a one-pixel-region of the active matrix substrate plate in step 1 of the manufacturing process in Embodiment 22, FIG. 126B is a cross sectional view through the plane A–A', and FIG. 126C is a cross sectional view through the plane B–B', and FIG. 126D is a cross section view through the plane C–C'.

FIG. 127A is a perspective plan view of a one-pixel-region of the active matrix substrate plate in step 2 of the manufacturing process in Embodiment 22, FIG. 127B is a cross sectional view through the plane A–A', and FIG. 127C is a cross sectional view through the plane B–B', and FIG. 127D is a cross section view through the plane C–C'.

FIG. 128A is a perspective plan view of a one-pixel-region of the active matrix substrate plate in step 3 of the manufacturing process in Embodiment 22, FIG. 128B is a cross sectional view through the plane A–A', and FIG. 128C is a cross sectional view through the plane B–B', and FIG. 128D is a cross section view through the plane C–C'.

FIG. 129A is a cross sectional view in the longitudinal direction of a terminal section of the active matrix substrate plate in Embodiment 22, and the left side relates to the scanning line terminal section and the right side relates to the signal line terminal section. FIGS. 129B–129D are cross sectional views relating to manufacturing step 1–step 3, respectively.

FIG. 130A is a perspective plan view of a one-pixel-region of the active matrix substrate plate in Embodiment 23, FIG. 130B is a cross sectional view through the plane A–A', and FIG. 130C is a cross sectional view through the plane B–B', and FIG. 130D is a cross section view through the plane C–C'.

FIG. 131A is a perspective plan view of a one-pixel-region of the active matrix substrate plate in step 1 of the manufacturing process in Embodiment 23, FIG. 131B is a cross sectional view through the plane A–A', and FIG. 131C is a cross sectional view through the plane B–B', and FIG. 131D is a cross section view through the plane C–C'.

Figure 132A:
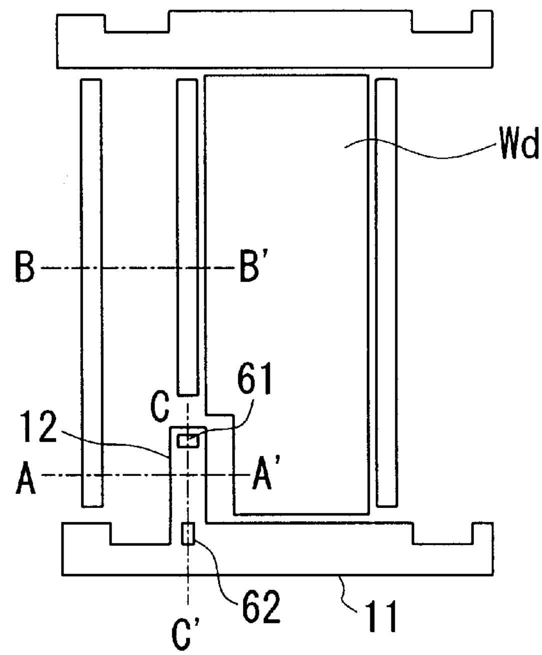
Figure 132B:
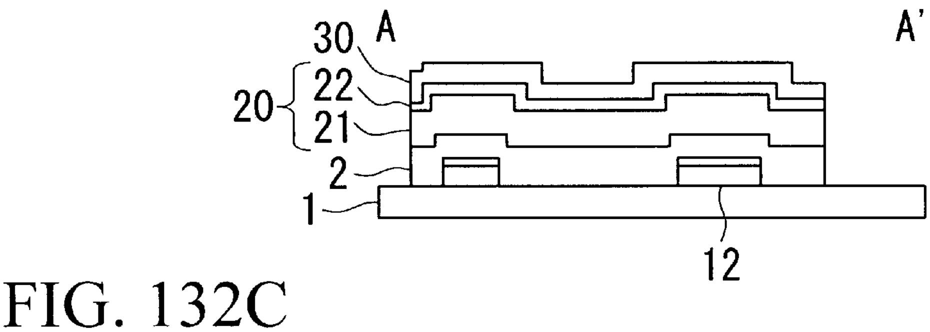
Figure 132C:
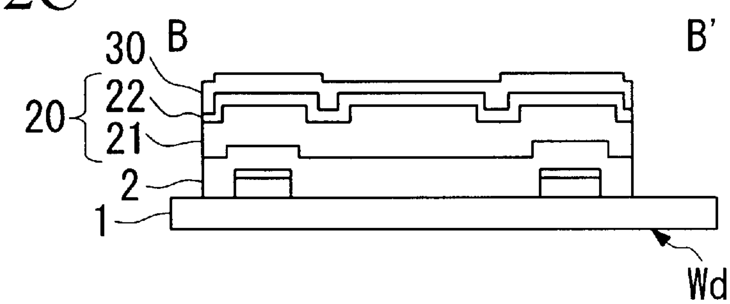
Figure 132D:
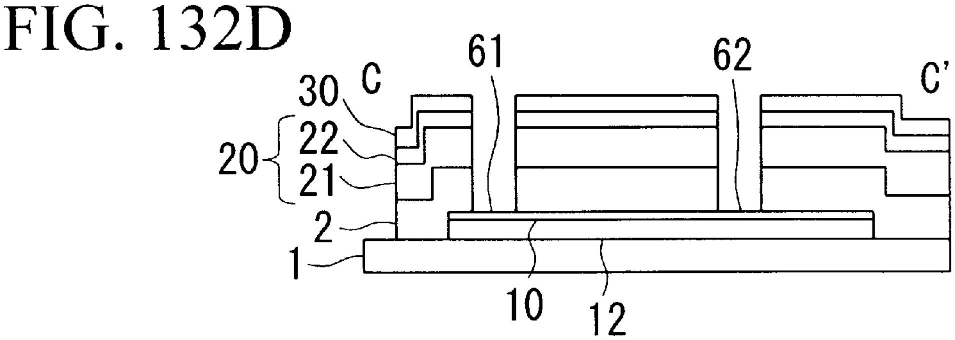

FIG. 132A is a perspective plan view of a one-pixel-region of the active matrix substrate plate in step 2 of the manufacturing process in Embodiment 23, FIG. 132B is a cross sectional view through the plane A–A', and FIG. 132C is a cross sectional view through the plane B–B', and FIG. 132D is a cross section view through the plane C–C'.

Figure 133A:
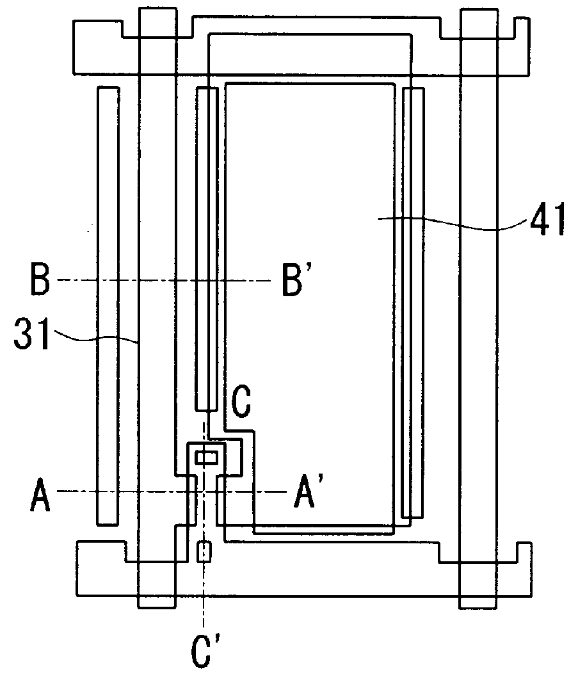
Figure 133B:
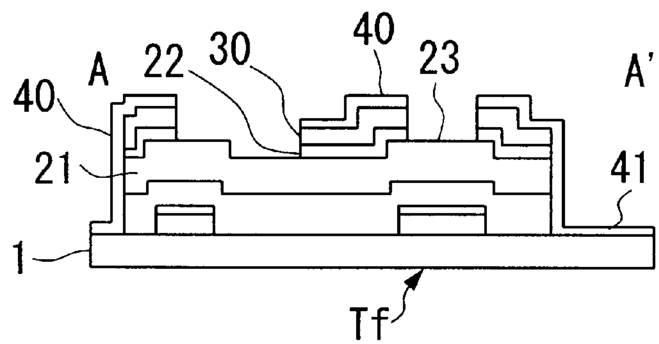
Figure 133C:
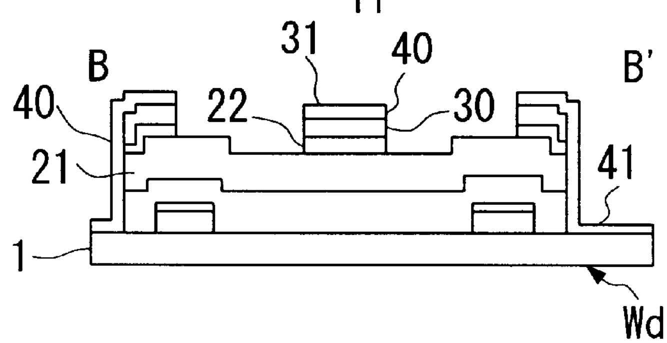
Figure 133D:
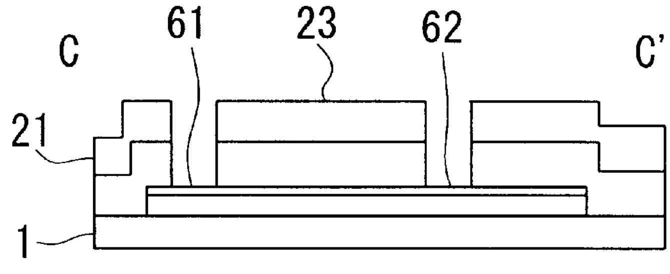

FIG. 133A is a perspective plan view of a one-pixel-region of the active matrix substrate plate in step 3 of the manufacturing process in Embodiment 23, FIG. 133B is a cross sectional view through the plane A–A', and FIG. 133C is a cross sectional view through the plane B–B', and FIG. 133D is a cross section view through the plane C–C'.

Figure 134A:
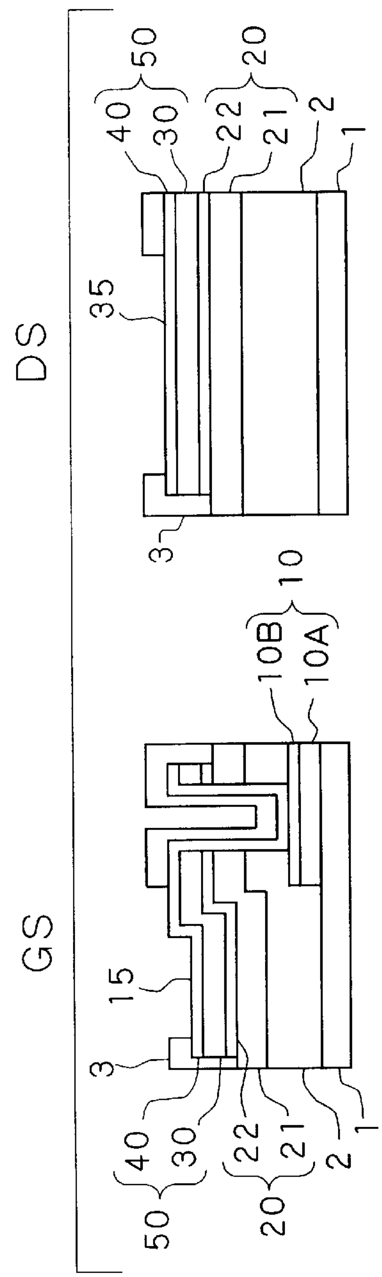
Figure 134B:
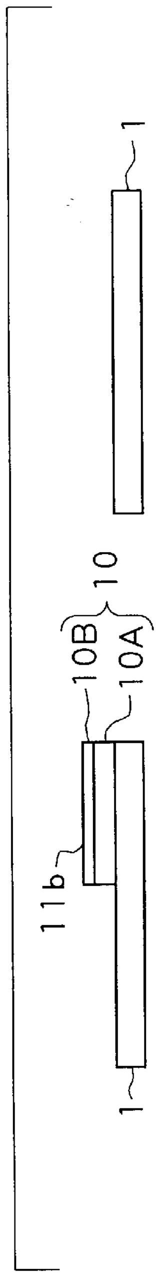
Figure 134C:
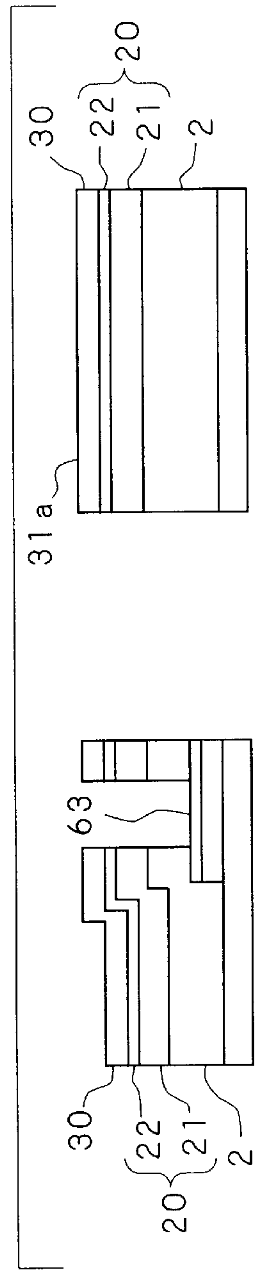
Figure 134D:
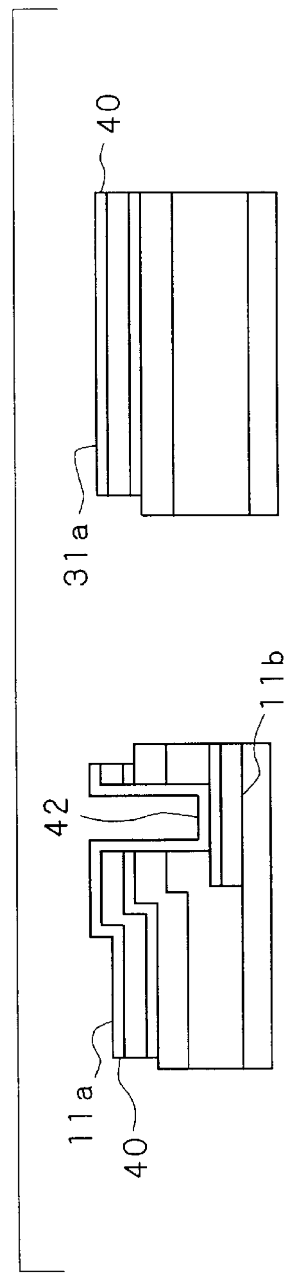

FIG. 134A is a cross sectional view in the longitudinal direction of a terminal section of the active matrix substrate plate in Embodiment 23, and the left side relates to the scanning line terminal section and the right side relates to the signal line terminal section. FIGS. 134B–134D are cross sectional views relating to manufacturing step 1–step 3, respectively.

Figures 135A, 135B, 135C, 135D:
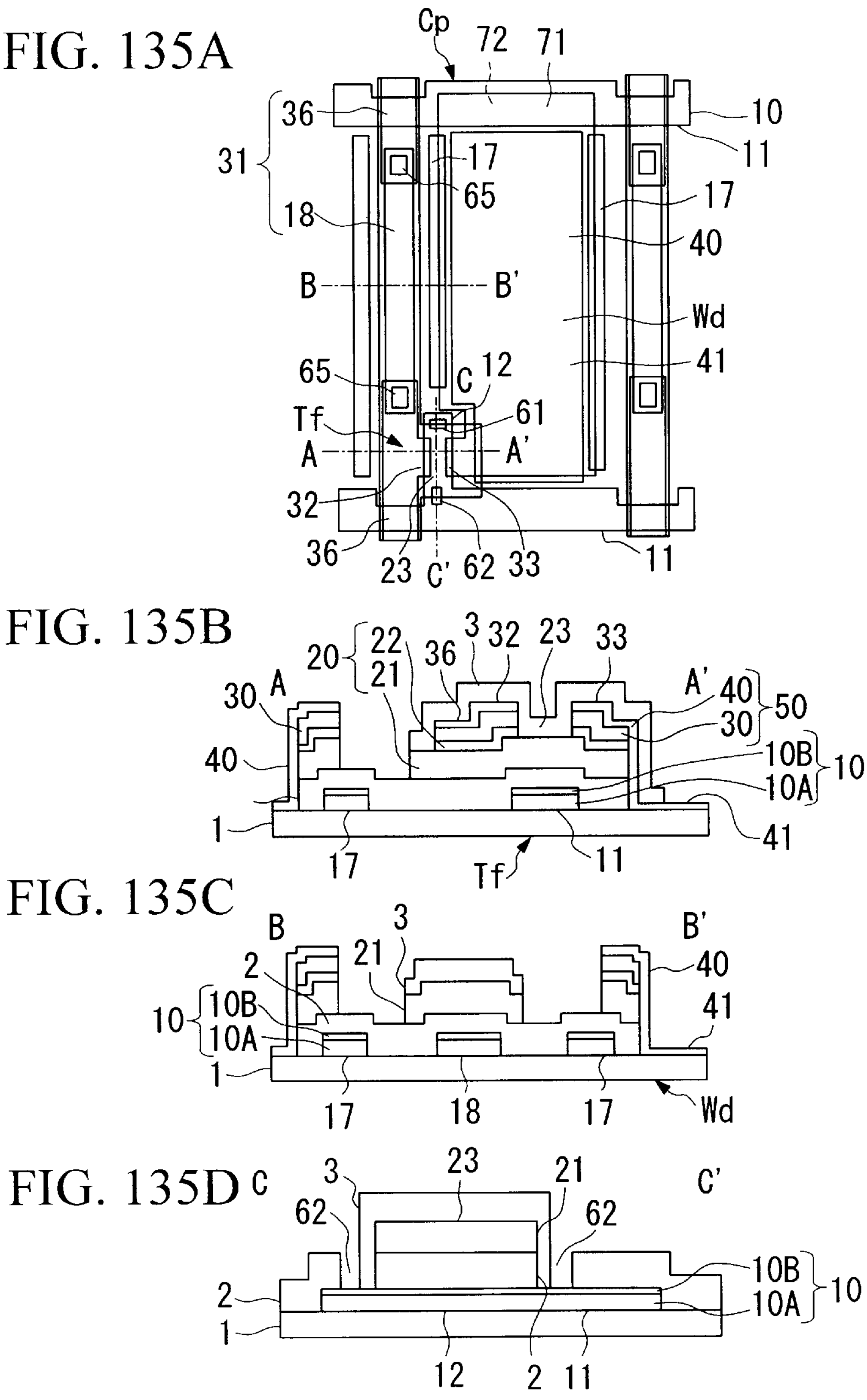

FIG. 135A is a perspective plan view of a one-pixel-region of the active matrix substrate plate in Embodiment 24, FIG. 135B is a cross sectional view through the plane A–A', and FIG. 135C is a cross sectional view through the plane B–B', and FIG. 135D is a cross section view through the plane C–C'.

Figure 136A:
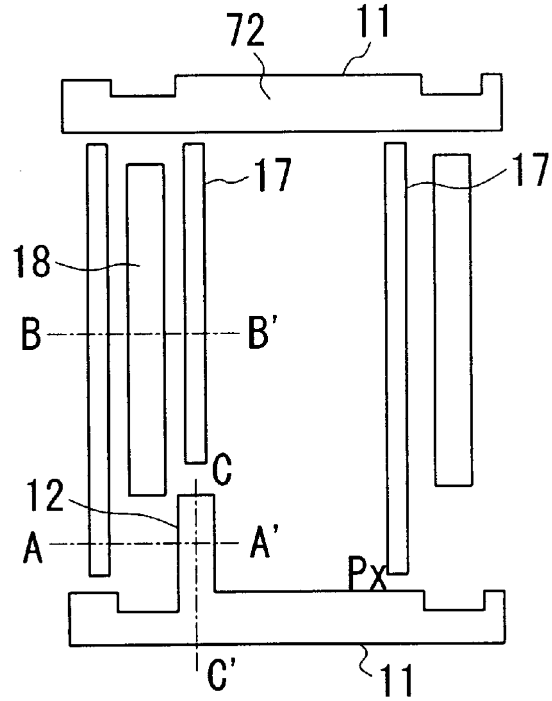
Figure 136B:
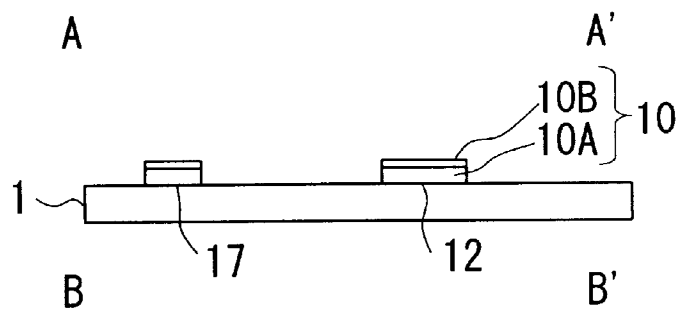
Figure 136C:
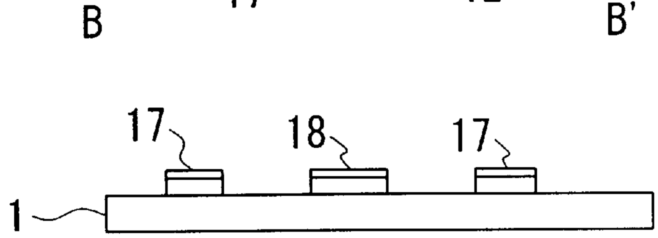
Figure 136D:
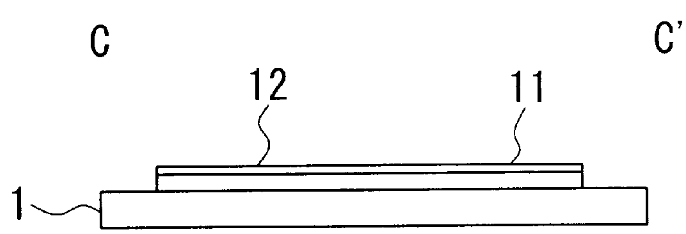

FIG. 136A is a perspective plan view of a one-pixel-region of the active matrix substrate plate in step 1 of the manufacturing process in Embodiment 24, FIG. 136B is a cross sectional view through the plane A–A', and FIG. 136C is a cross sectional view through the plane B–B', and FIG. 136D is a cross section view through the plane C–C'.

Figure 137A:
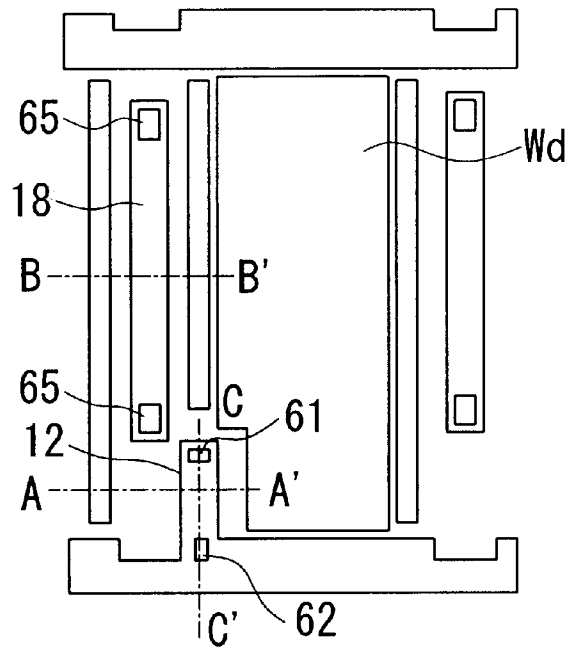
Figure 137B:
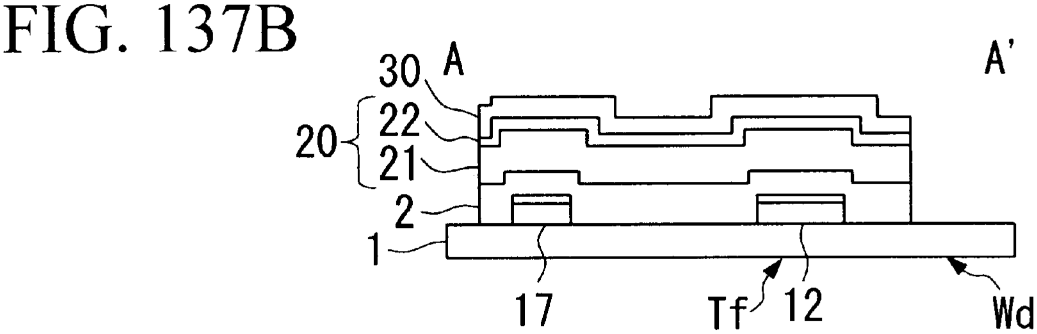
Figure 137C:
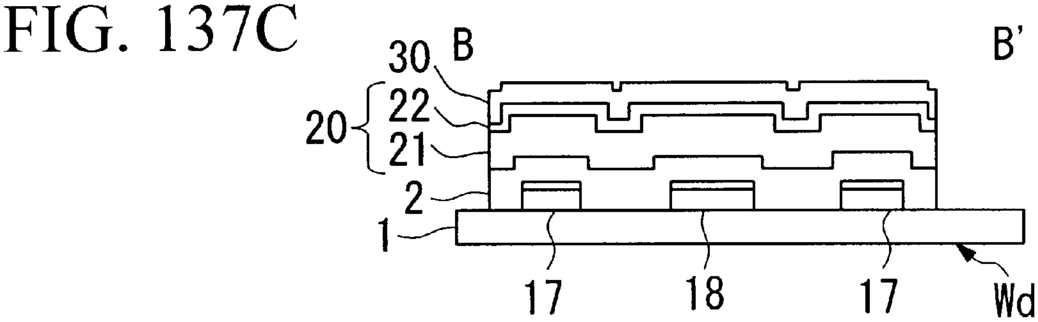
Figure 137D:
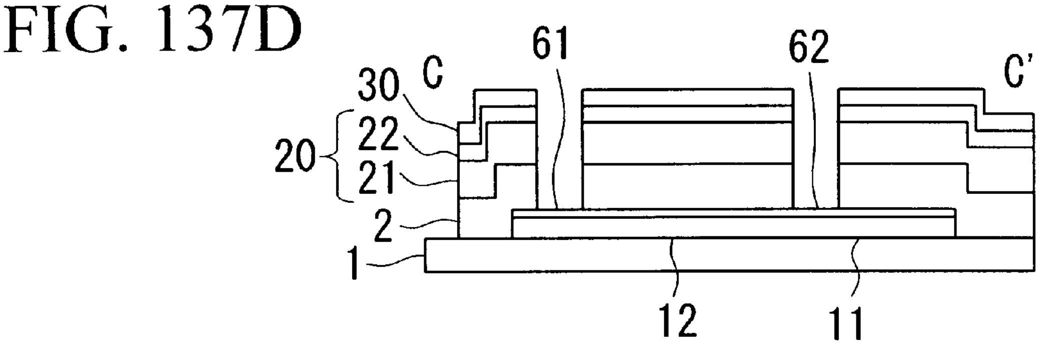

FIG. 137A is a perspective plan view of a one-pixel-region of the active matrix substrate plate in step 2 of the manufacturing process in Embodiment 24, FIG. 137B is a cross sectional view through the plane A–A', and FIG. 137C is a cross sectional view through the plane B–B', and FIG. 137D is a cross section view through the plane C–C'.

Figure 138A:
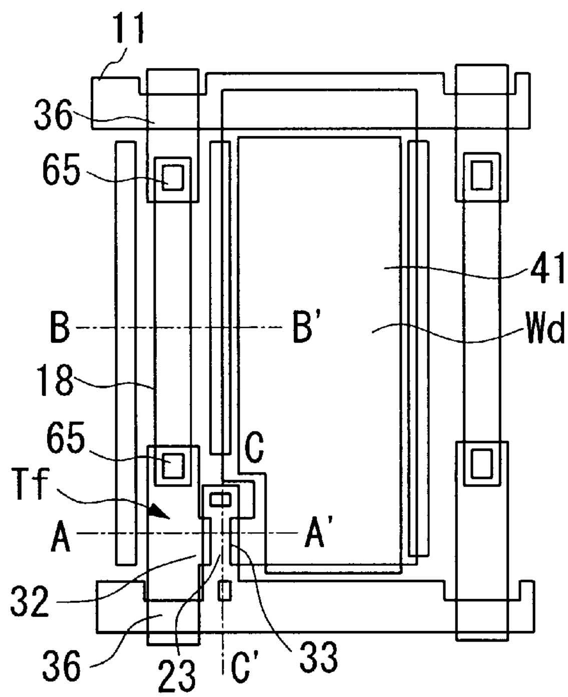
Figure 138B:
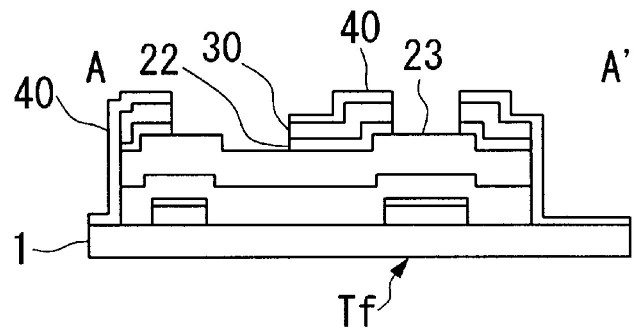
Figure 138C:
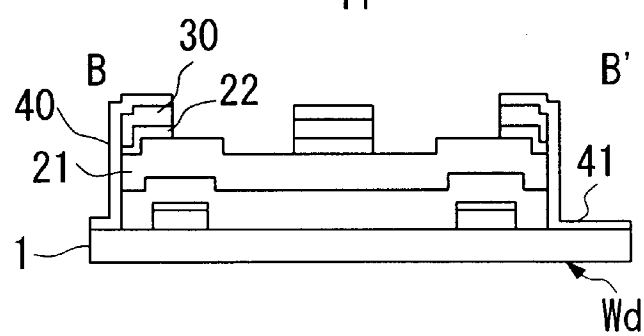
Figure 138D:
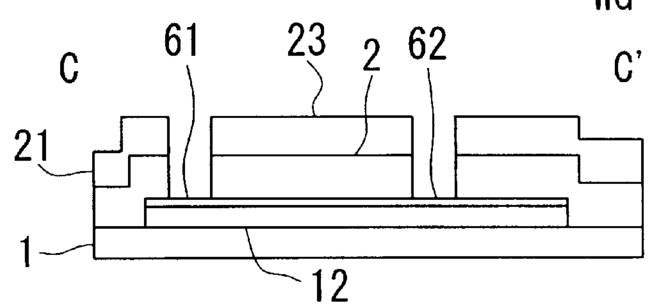

FIG. 138A is a perspective plan view of a one-pixel-region of the active matrix substrate plate in step 3 of the manufacturing process in Embodiment 24, FIG. 138B is a cross sectional view through the plane A–A', and FIG. 138C is a cross sectional view through the plane B–B', and FIG. 138D is a cross section view through the plane C–C'.

Figures 139A, 139B, 139C, 139D:
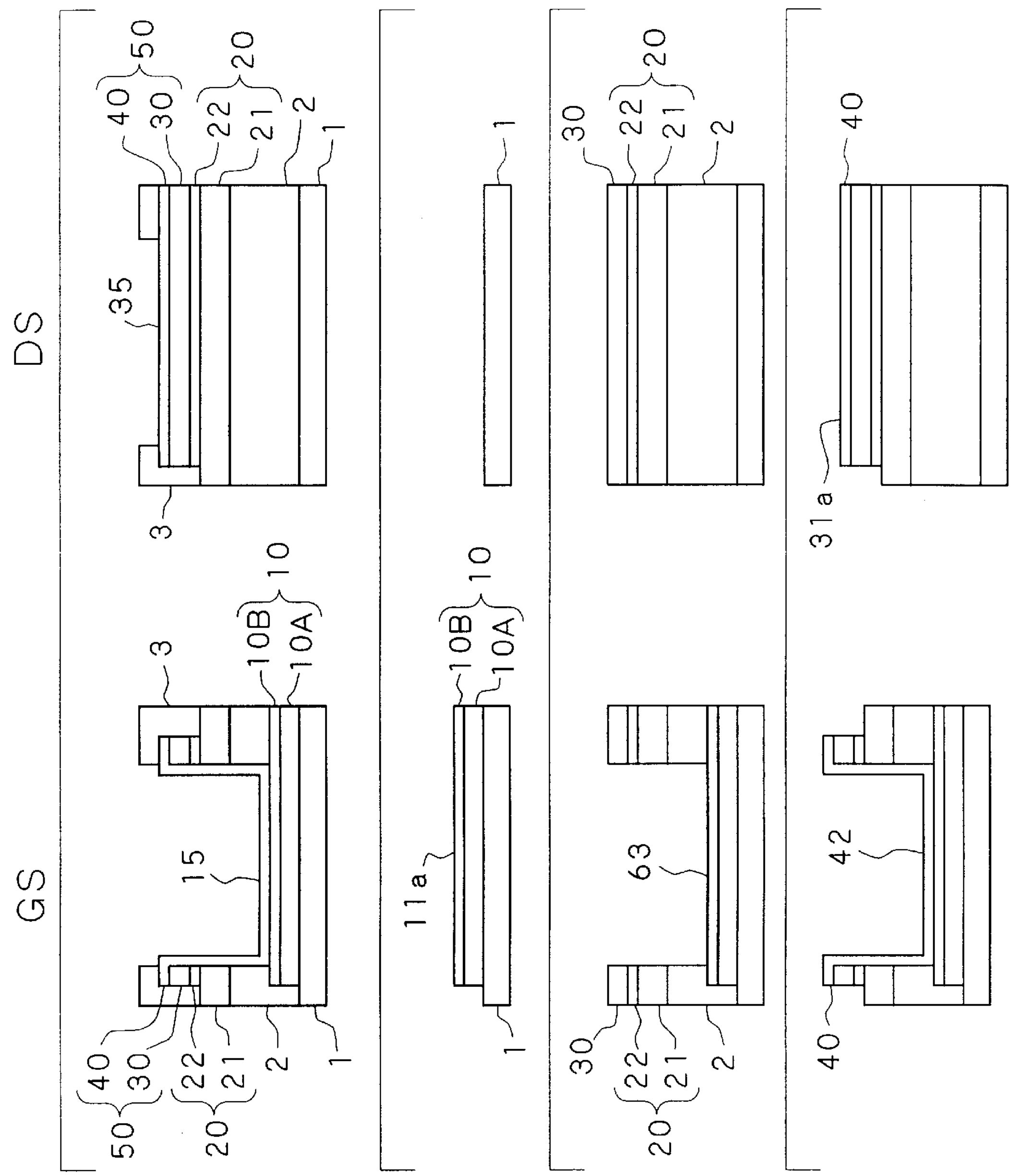

FIG. 139A is a cross sectional view in the longitudinal direction of a terminal section of the active matrix substrate plate in Embodiment 24, and the left side relates to the scanning line terminal section and the right side relates to the signal line terminal section. FIGS. 139B–139D are cross sectional views relating to manufacturing step 1–step 3, respectively.

Figure 140A:
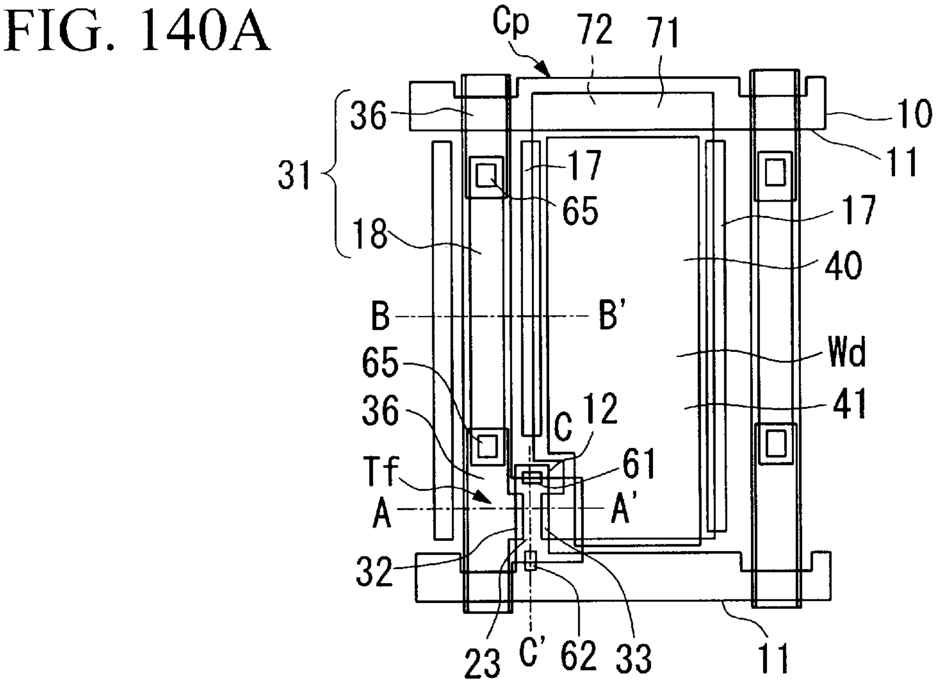
Figure 140B:
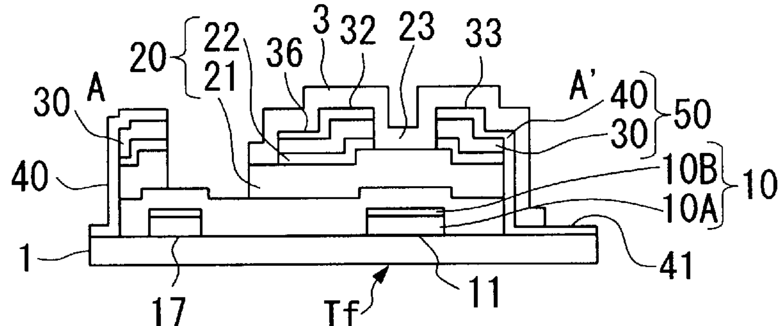
Figure 140C:
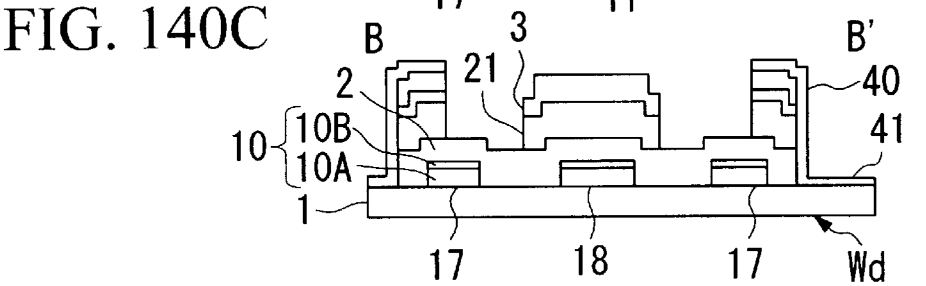
Figure 140D:
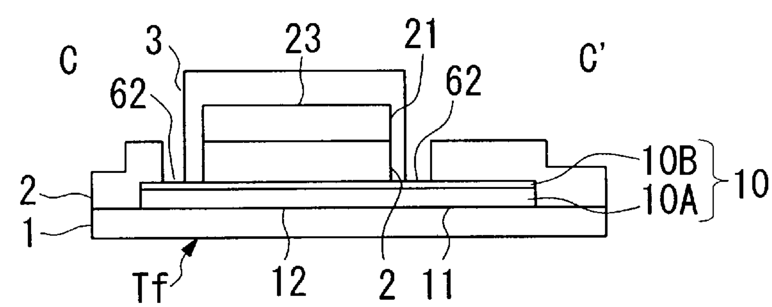

FIG. 140A is a perspective plan view of a one-pixel-region of the active matrix substrate plate in Embodiment 25, FIG. 140B is a cross sectional view through the plane A–A', and FIG. 140C is a cross sectional view through the plane B–B', and FIG. 140D is a cross section view through the plane C–C'.

Figure 141A:
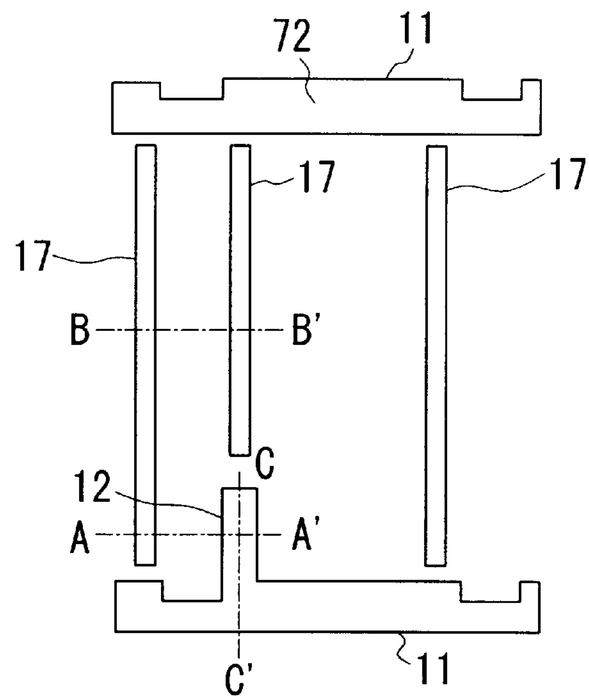
Figure 141B:
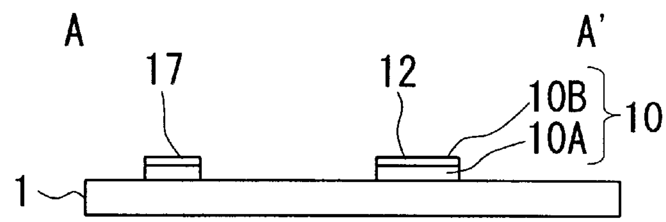
Figure 141C:
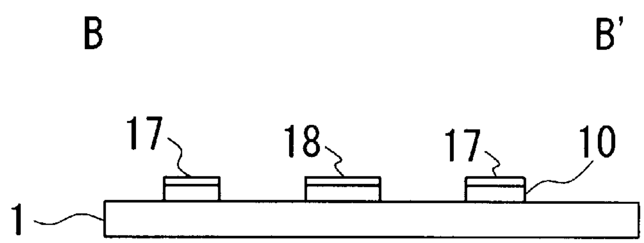
Figure 141D:
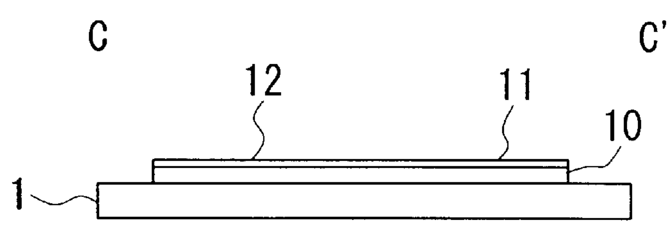

FIG. 141A is a perspective plan view of a one-pixel-region of the active matrix substrate plate in step 1 of the manufacturing process in Embodiment 25, FIG. 141B is a cross sectional view through the plane A–A', and FIG. 141C is a cross sectional view through the plane B–B', and FIG. 141D is a cross section view through the plane C–C'.

Figure 142A:
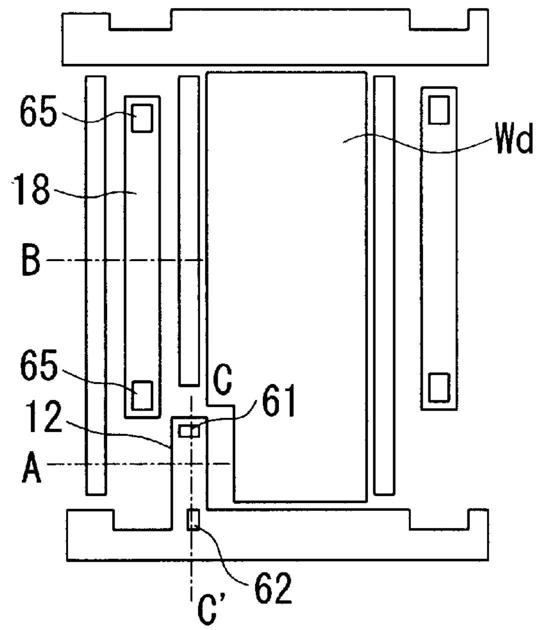
Figure 142B:
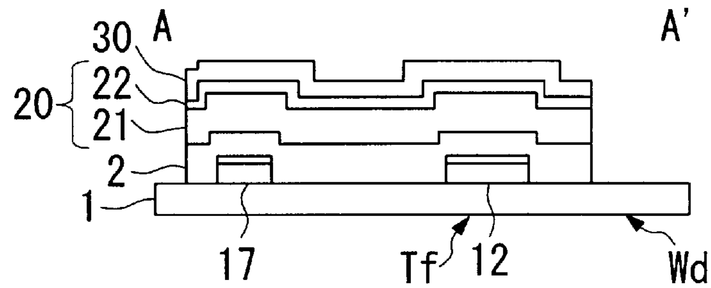
Figure 142C:
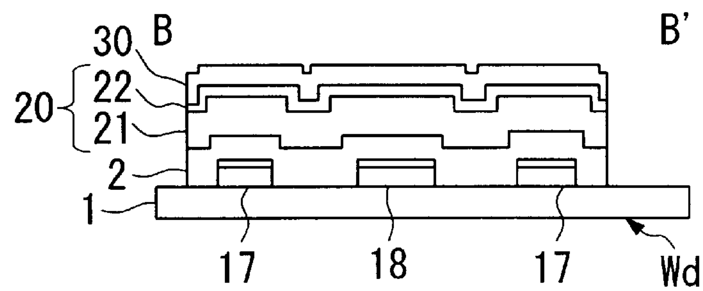
Figure 142D:
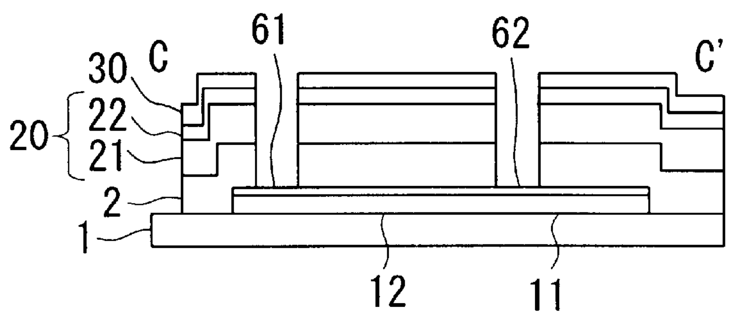

FIG. 142A is a perspective plan view of a one-pixel-region of the active matrix substrate plate in step 2 of the manufacturing process in Embodiment 25, FIG. 142B is a cross sectional view through the plane A–A', and FIG. 142C is a cross sectional view through the plane B–B', and FIG. 142D is a cross section view through the plane C–C'.

Figure 143A:
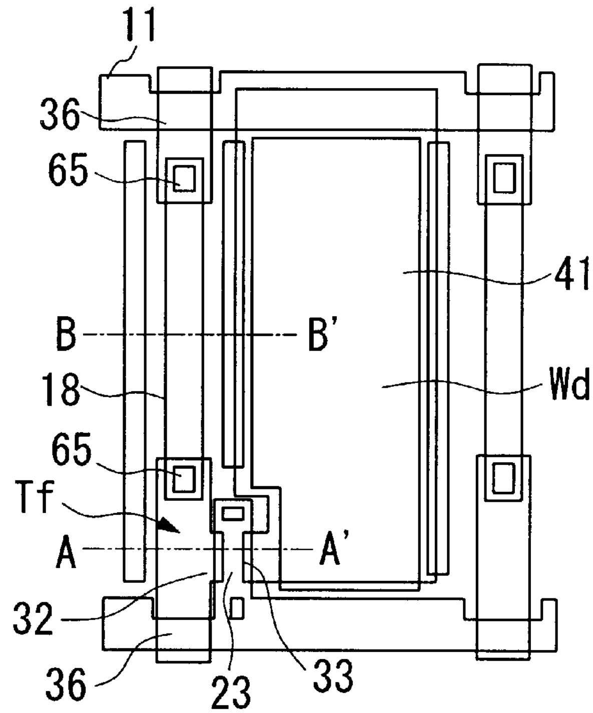
Figure 143B:
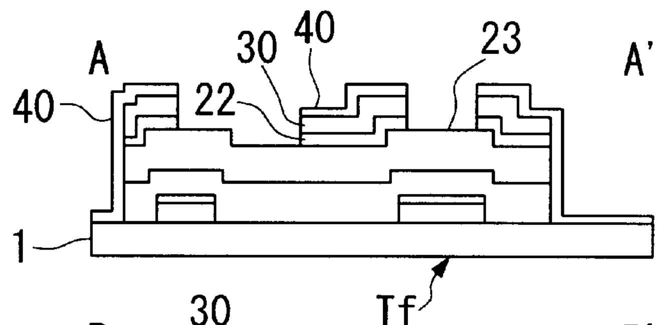
Figure 143C:
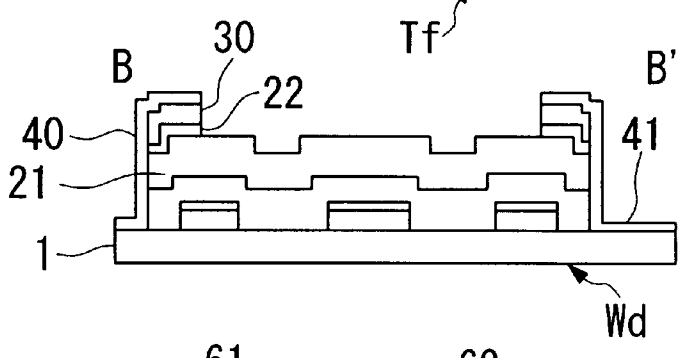
Figure 143D:
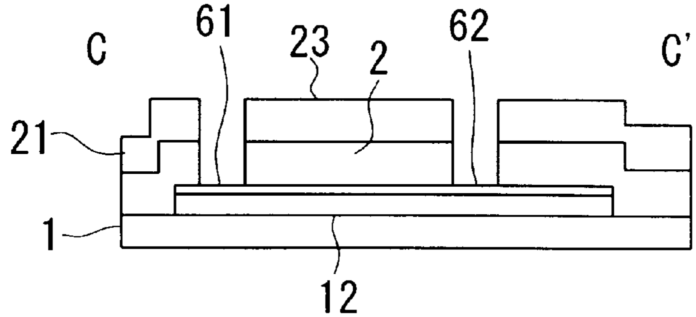

FIG. 143A is a perspective plan view of a one-pixel-region of the active matrix substrate plate in step 3 of the manufacturing process in Embodiment 25, FIG. 143B is a cross sectional view through the plane A–A', and FIG. 143C is a cross sectional view through the plane B–B', and FIG. 143D is a cross section view through the plane C–C'.

Figure 144A:
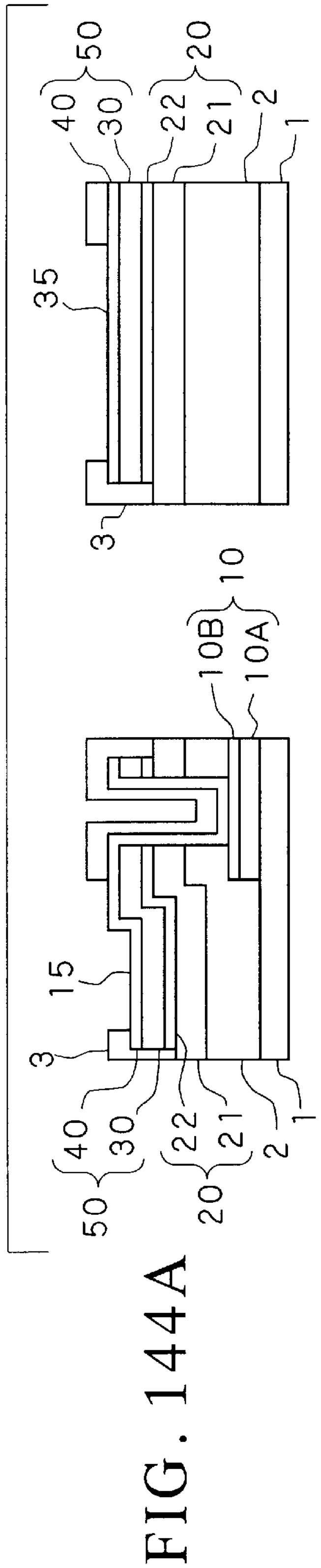
Figure 144B:
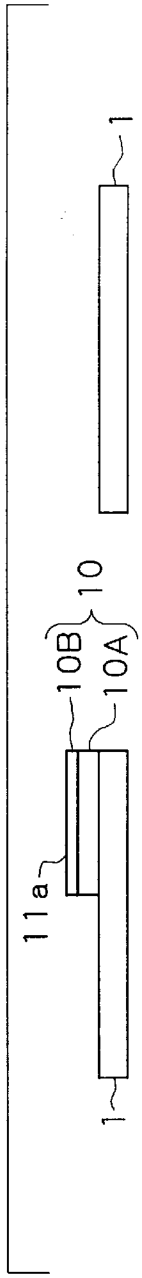
Figure 144C:
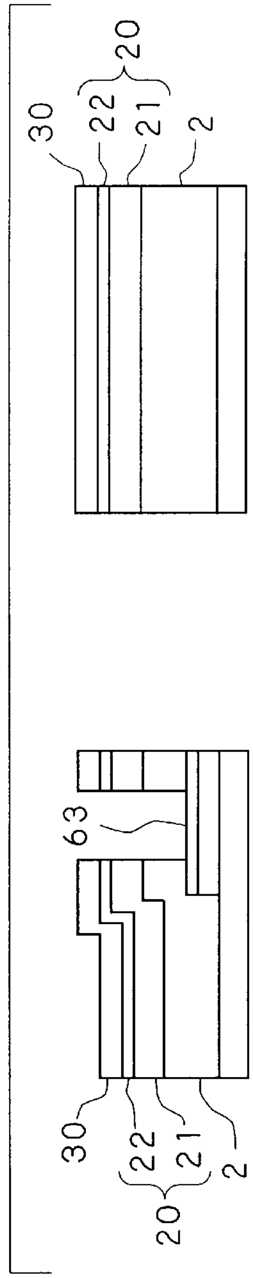
Figure 144D:
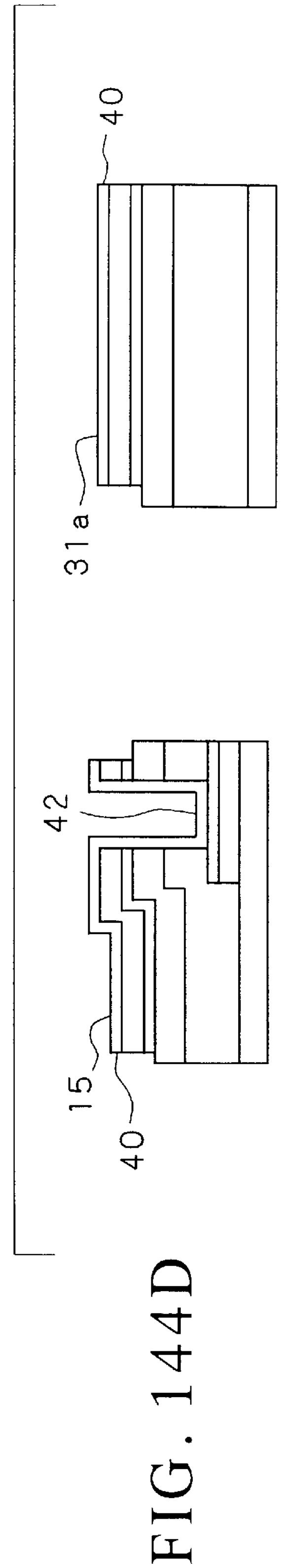

FIG. 144A is a cross sectional view in the longitudinal direction of a terminal section of the active matrix substrate plate in Embodiment 25, and the left side relates to the scanning line terminal section and the right side relates to the signal line terminal section. FIGS. 144B–144D are cross sectional views relating to manufacturing step 1–step 3, respectively.

Figure 145A:
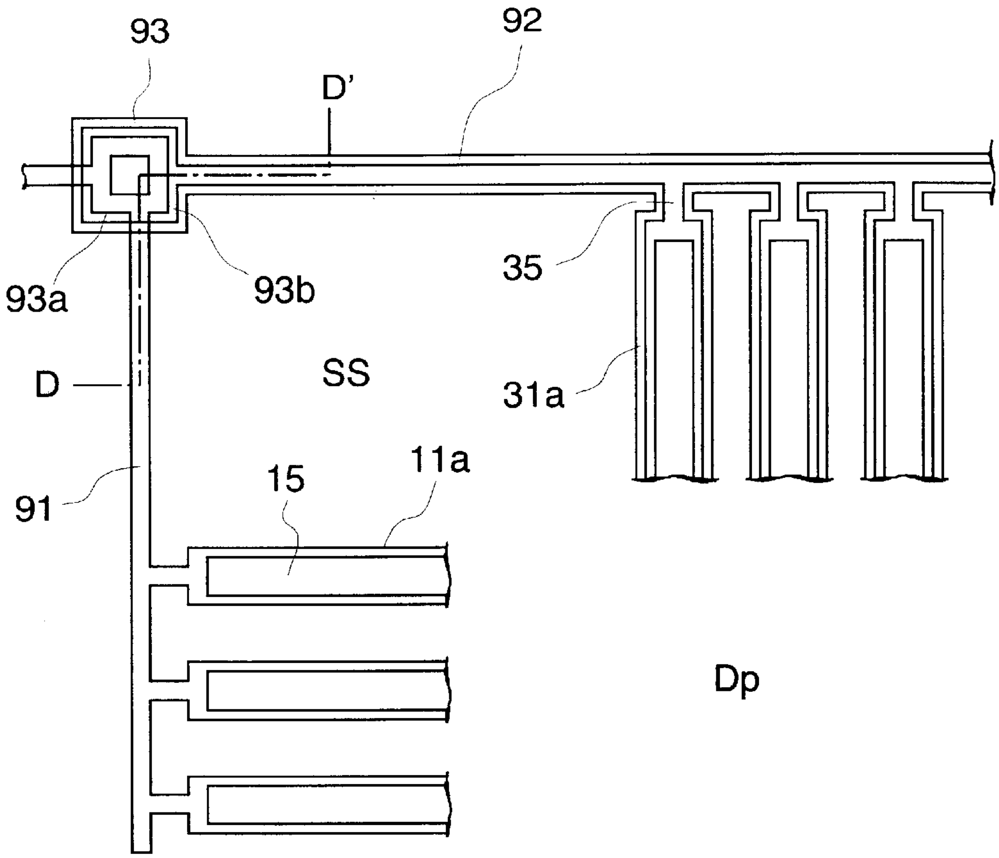

FIG. 145A is a perspective plan view of a portion of the outer peripheral section Ss of the active matrix substrate plate in Embodiment 26, and 145B is a cross sectional view through the plane D–D'.

Figure 146A:
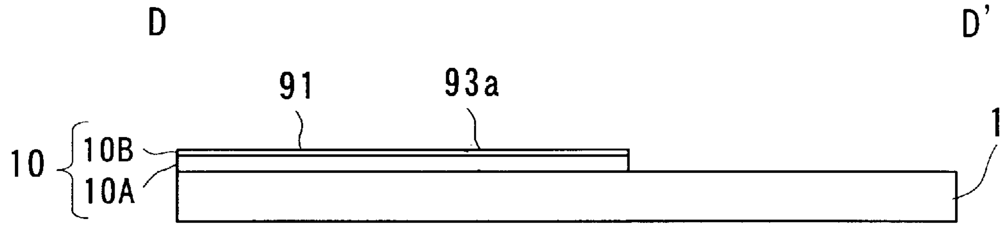
Figure 146B:
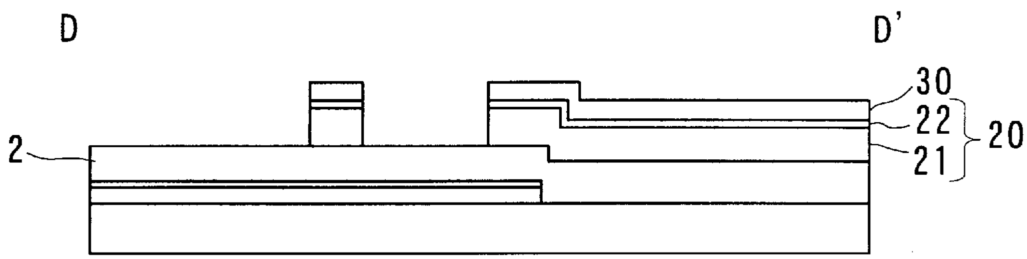
Figure 146C:
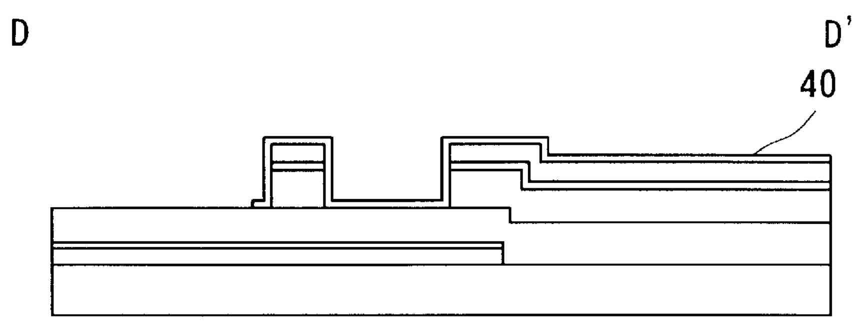

FIGS. 146A–146C are cross sectional views through the plane D–D' to show the process of manufacturing a portion of the outer peripheral section Ss of the active matrix substrate plate in Embodiment 26, and FIGS. 146A–146C are cross sectional views relating to step 1–step 3, respectively.

Figure 147A:
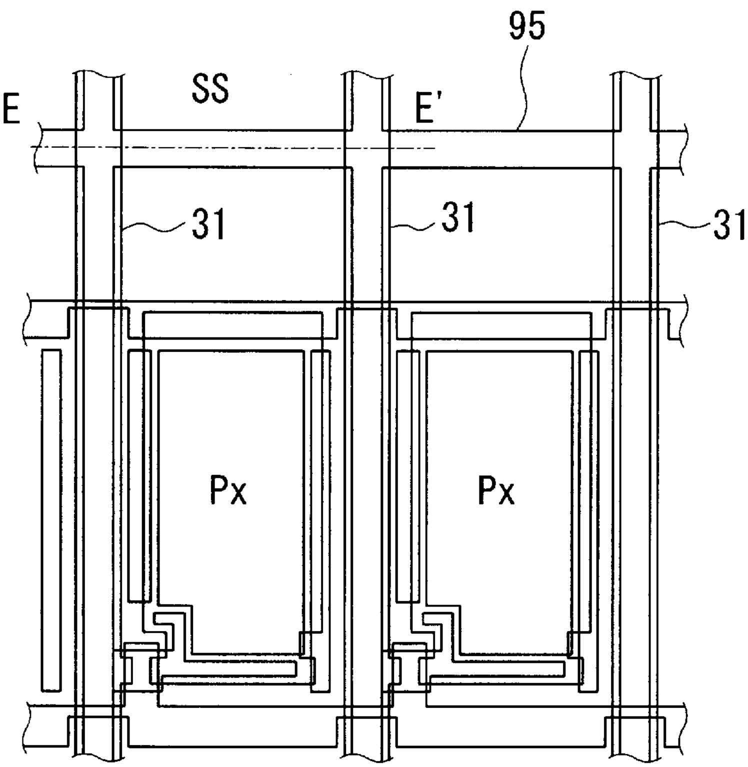
Figure 147B:
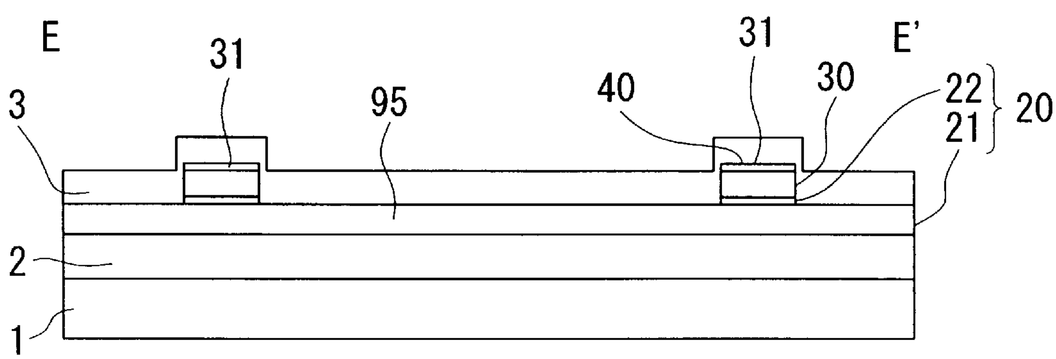

FIG. 147A is a perspective plan view of a portion of two adjacent pixel regions Px and the outer peripheral section Ss of the active matrix substrate plate in Embodiment 27, and FIG. 147B is a cross sectional view through the plane E–E'.

Figure 148A:
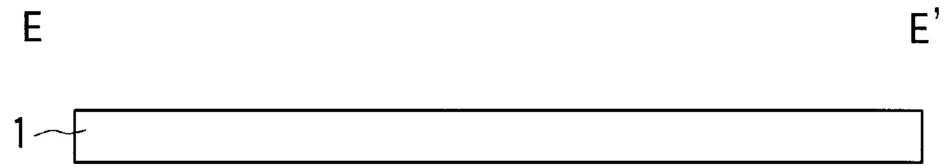

FIG. 148A is a cross sectional view through the plane E–E' to show the process of manufacturing the outer peripheral section Ss of the active matrix substrate plate in Embodiment 27, and FIGS. 148A–148D are cross sectional views of steps 1–3 and a channel-formed TFT.

Figure 149A:
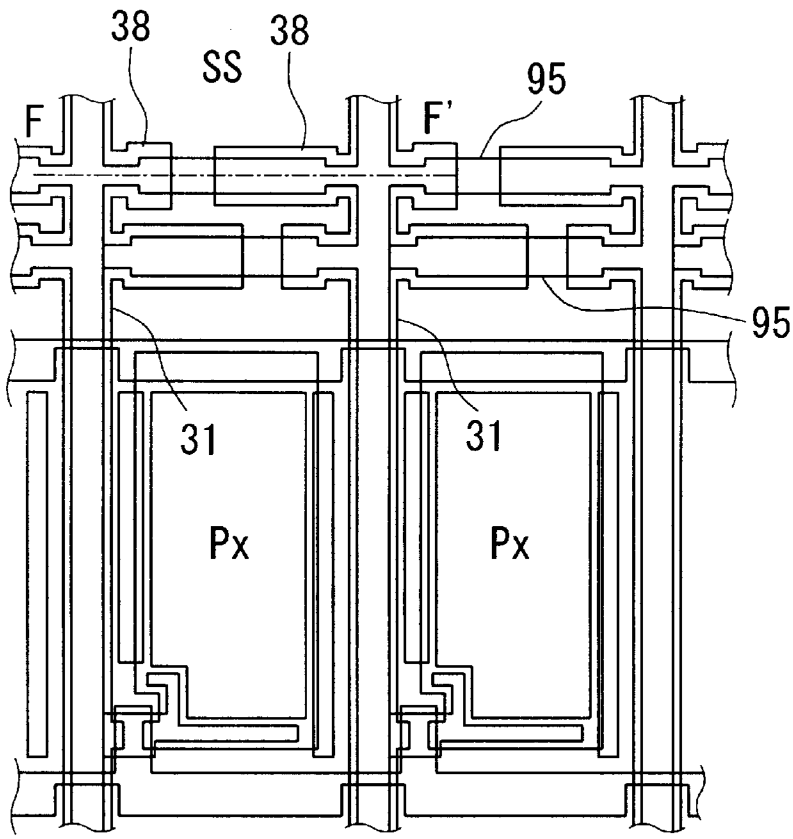
Figure 149B:
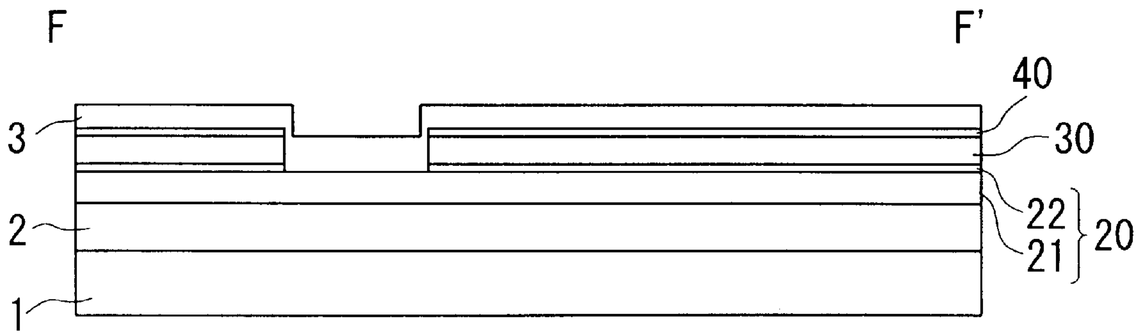

FIG. 149A is a perspective plan view of a portion oft adjacent pixel regions Px in the signal line side and the outer peripheral section Ss of the active matrix substrate plate in Embodiment 28, and FIG. 149B is a cross sectional view through the plane F—F.

FIGS. 150A–150D are cross sectional views through the plane F—F to show the process of manufacturing the outer peripheral section Ss of the active matrix substrate plate in Embodiment 28, and FIGS. 150A–150D are cross sectional views of steps 1–3 and a channel-formed TFT.

Figure 151A:
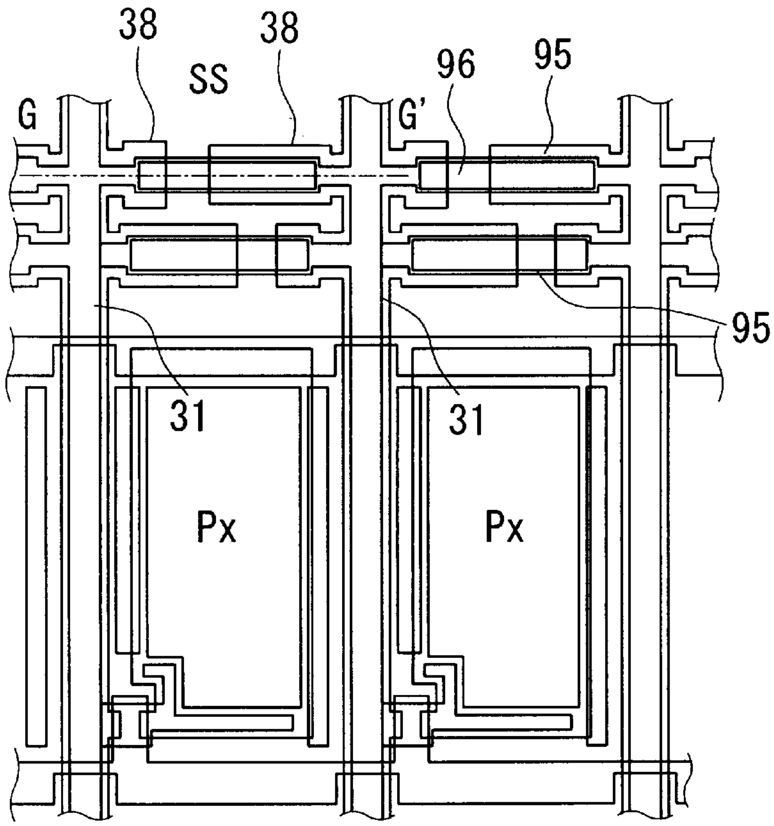
Figure 151B:
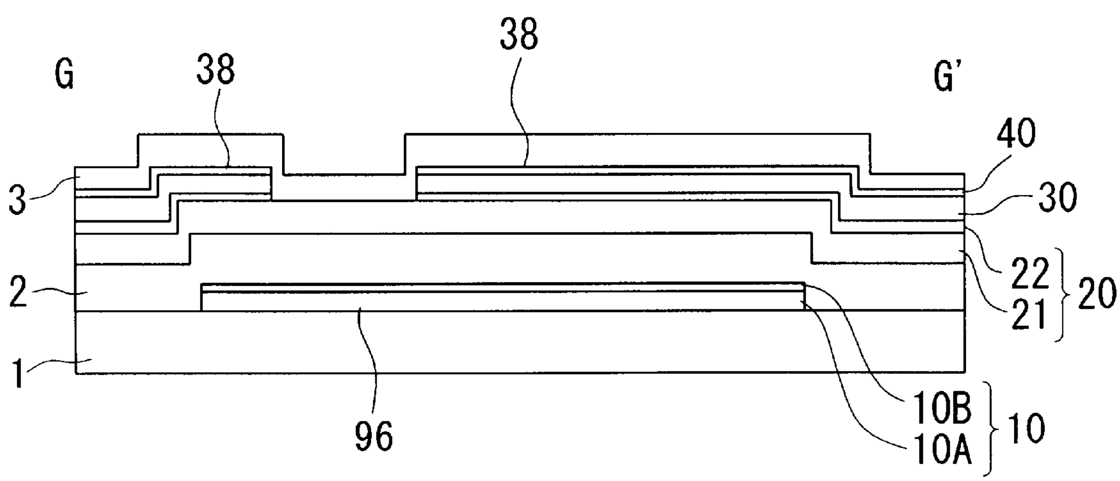

FIG. 151A is a perspective plan view of a portion oft adjacent pixel regions Px in the signal line side and the outer peripheral section Ss of the active matrix substrate plate in Embodiment 29, and FIG. 151B is a cross sectional view through the plane G–G'.

FIGS. 152A–152D are cross sectional views through the plane G–G' to show the process of manufacturing the outer peripheral section Ss of the active matrix substrate plate in Embodiment 29, and FIGS. 152A–152D are cross sectional views of steps 1–3 and a channel-formed TFT.

Figure 153A:
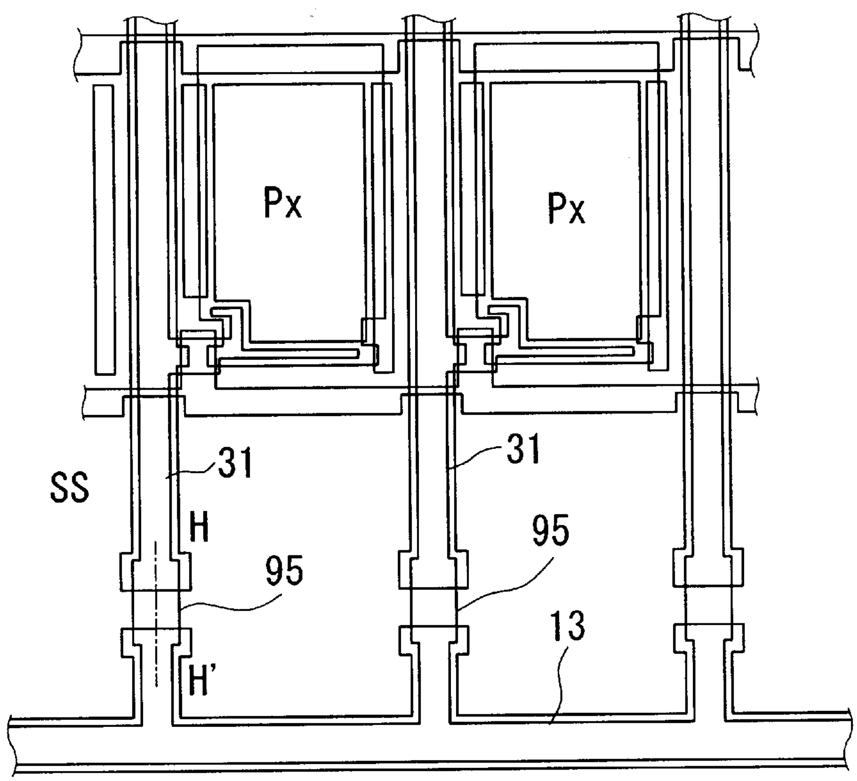
Figure 153B:
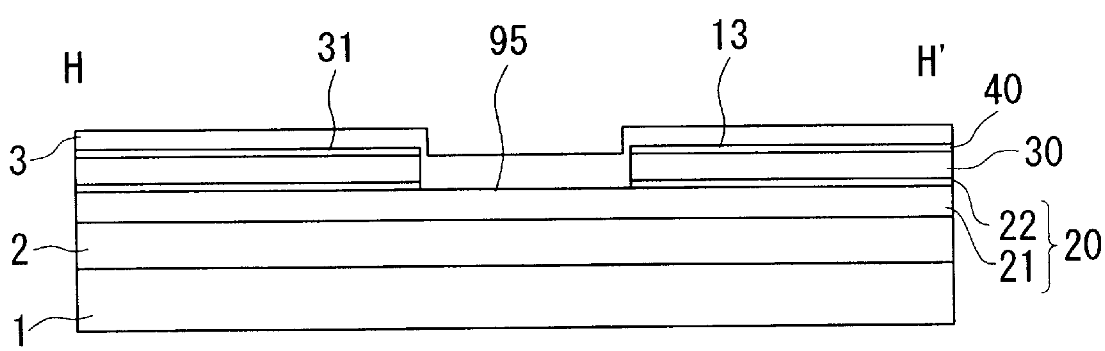

FIG. 153A is a perspective plan view of a portion oft adjacent pixel regions Px in the signal line side and the outer peripheral section Ss of the active matrix substrate plate in Embodiment 30, and FIG. 153B is a cross sectional view through the plane H–H'.

FIGS. 154A–154D are cross sectional views through the plane H–H' to show the process of manufacturing the outer peripheral section Ss of the active matrix substrate plate in Embodiment 30, and FIGS. 154A–154D are cross sectional views of steps 1–3 and a channel-formed TFT.

Figure 155A:
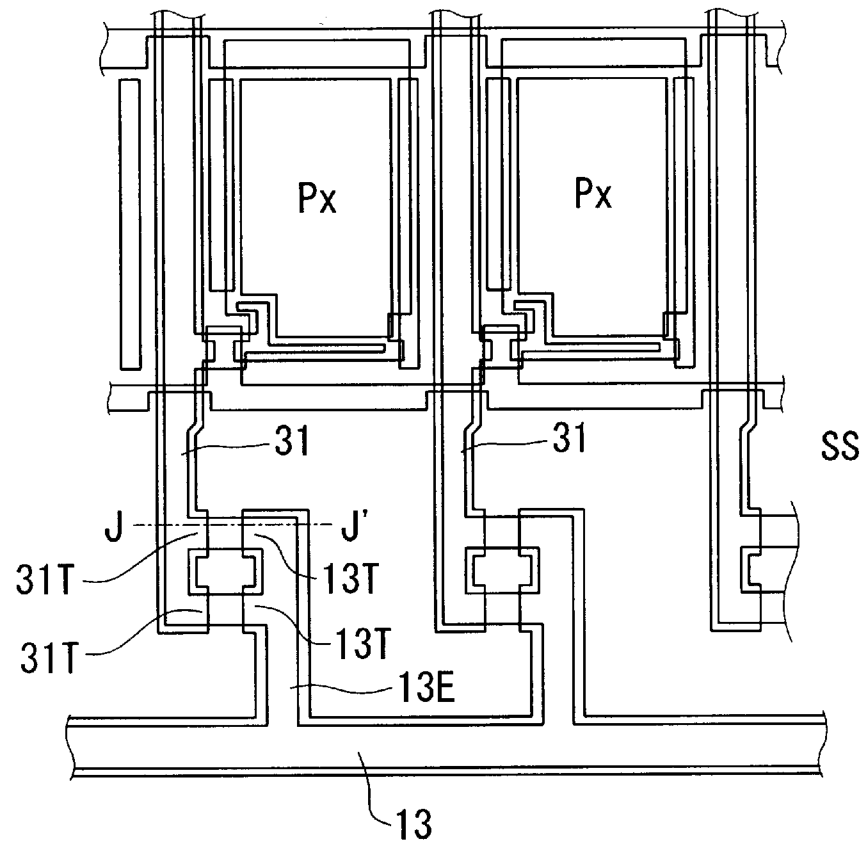
Figure 155B:
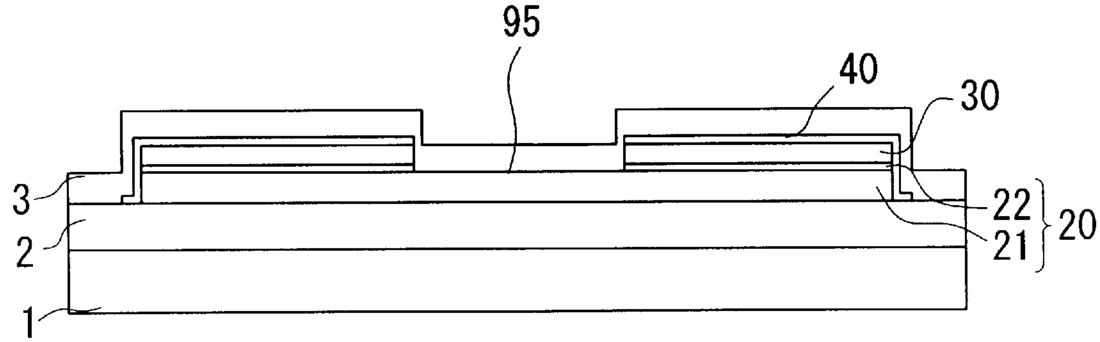

FIG. 155A is a perspective plan view of a portion oft adjacent pixel regions Px in the signal line side and the outer peripheral section Ss of the active matrix substrate plate in Embodiment 31, and FIG. 155B is a cross sectional view through the plane J–J'.

FIGS. 156A–156D are cross sectional views through the plane J–J' to show the process of manufacturing the outer peripheral section Ss of the active matrix substrate plate in Embodiment 31, and FIGS. 156A–156D are cross sectional views of steps 1–3 and a channel-formed TFT.

Figure 157A:
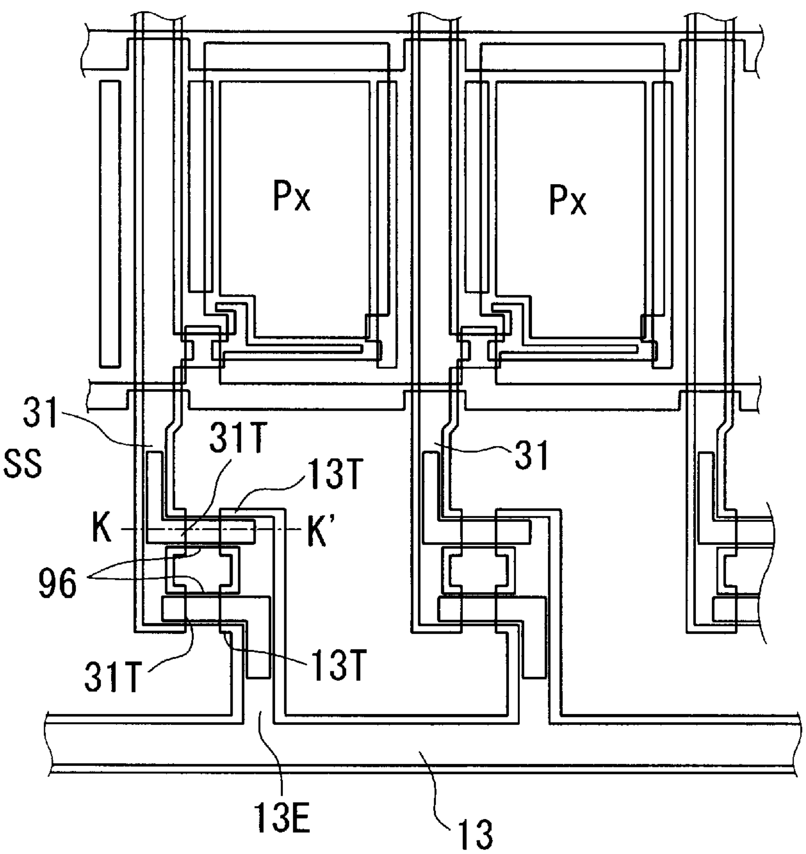
Figure 157B:
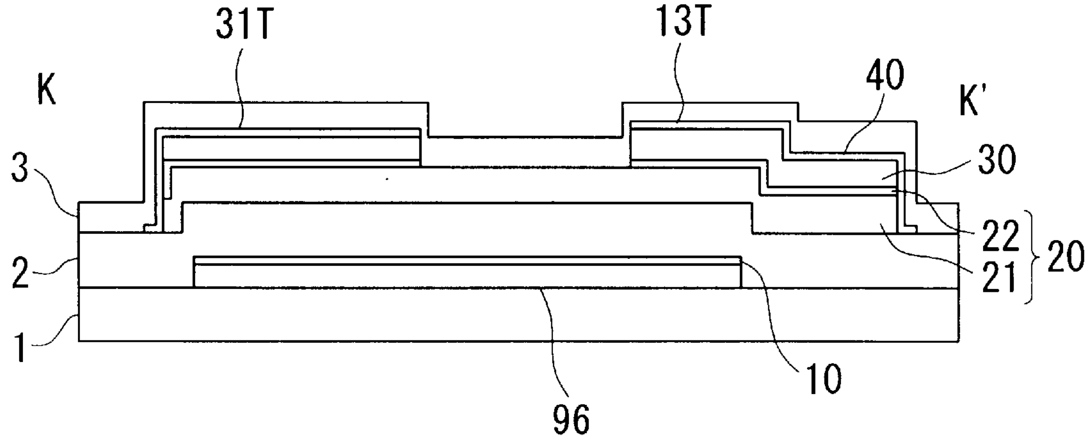

FIG. 157A is a perspective plan view of a portion oft adjacent pixel regions Px in the signal line side and the outer peripheral section Ss of the active matrix substrate plate in Embodiment 32, and FIG. 157B is a cross sectional view through the plane K–K'.

FIGS. 158A–158D are cross sectional views through the plane K–K' to show the process of manufacturing the outer peripheral section Ss of the active matrix substrate plate in Embodiment 32, and FIGS. 158A–158D are cross sectional views of steps 1–3 and a channel-formed TFT.

Figure 159A:
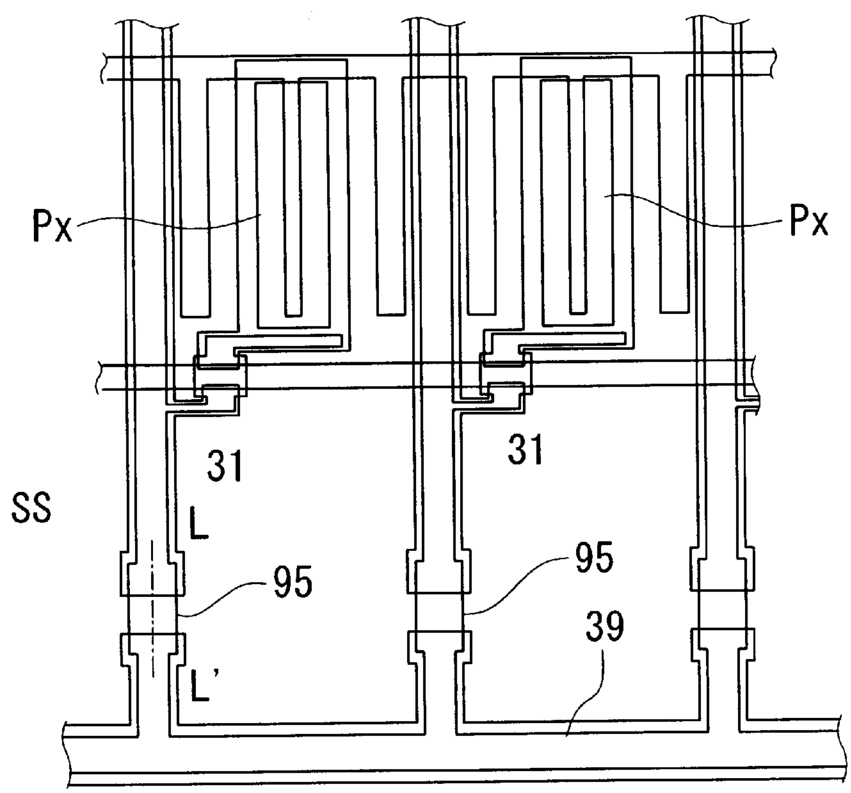
Figure 159B:
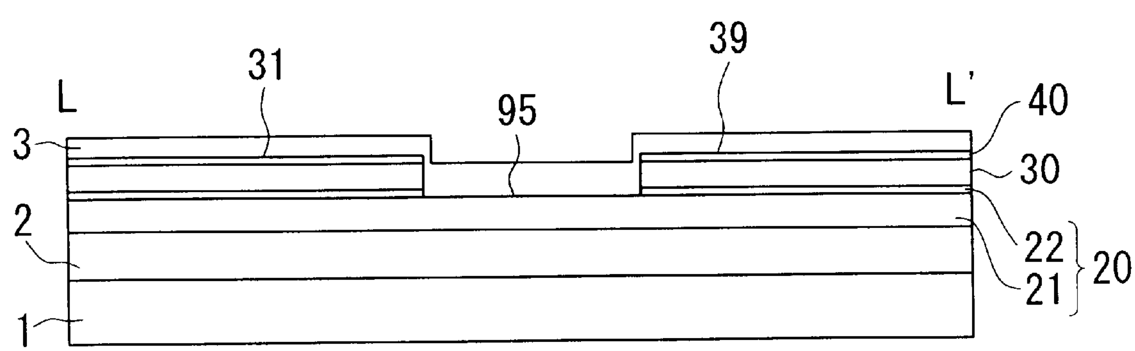

FIG. 159A is a perspective plan view of a portion oft adjacent pixel regions Px in the signal line side and the outer peripheral section Ss of the active matrix substrate plate in Embodiment 33, and FIG. 159B is a cross sectional view through the plane L–L'.

FIGS. 160A–160D are cross sectional views through the plane L–L' to show the process of manufacturing the outer peripheral section Ss of the active matrix substrate plate in Embodiment 33, and FIGS. 160A–160D are cross sectional views of steps 1–3 and a channel-formed TFT.

Figure 161A:
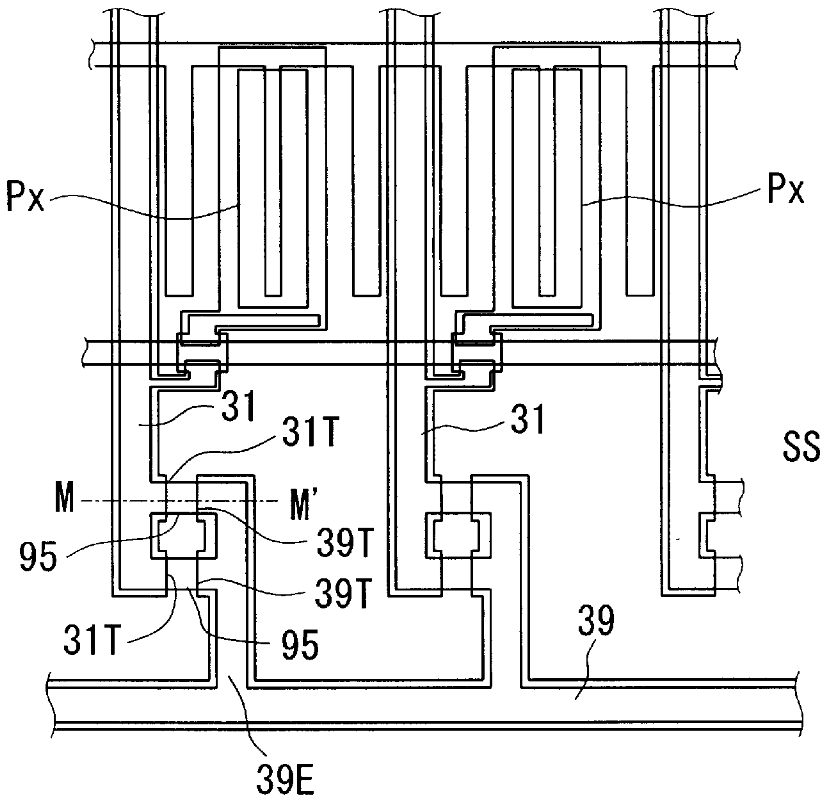
Figure 161B:
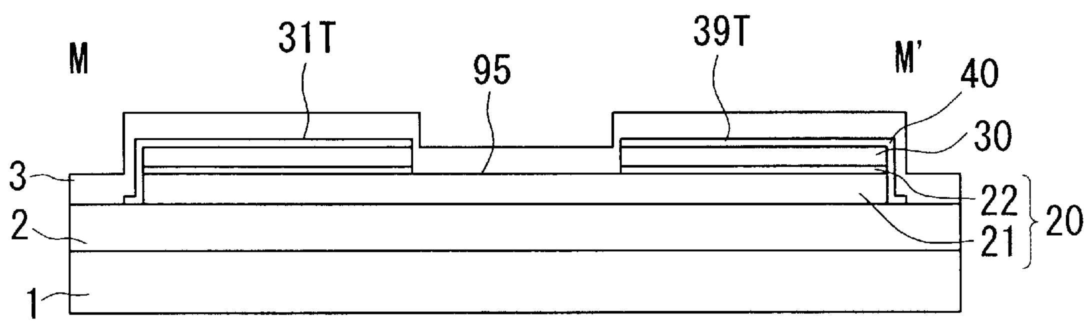

FIG. 161A is a perspective plan view of a portion oft adjacent pixel regions Px in the signal line end side and the outer peripheral section Ss of the active matrix substrate plate in Embodiment 34, and FIG. 161B is a cross sectional view through the plane M–M'.

FIGS. 162A–162D are cross sectional views through the plane M–M' to show the process of manufacturing the outer peripheral section Ss of the active matrix substrate plate in Embodiment 34, and FIGS. 162A–162D are cross sectional views of steps 1–3 and a channel-formed TFT.

Figure 163A:
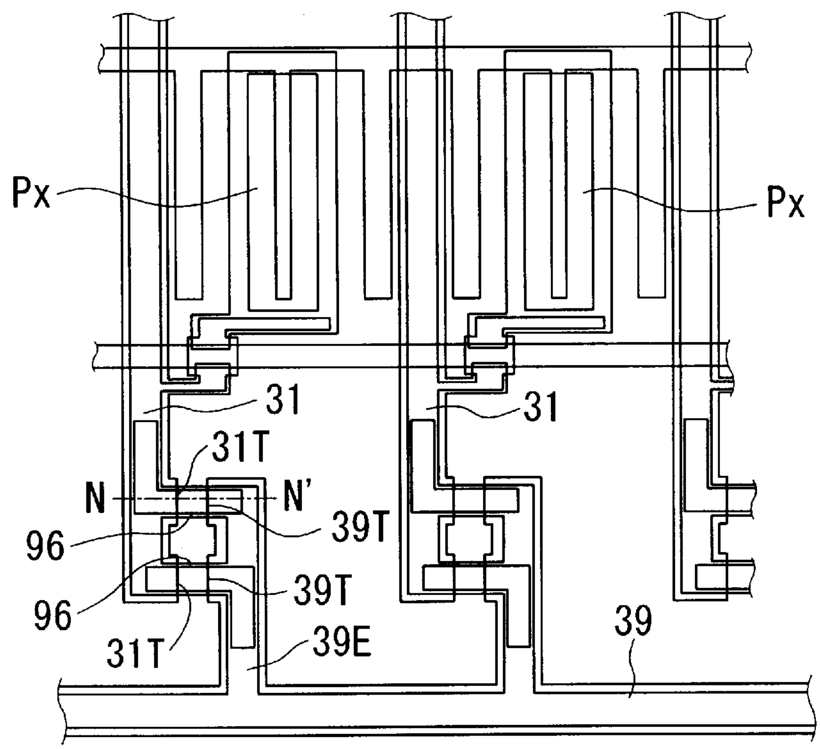
Figure 163B:
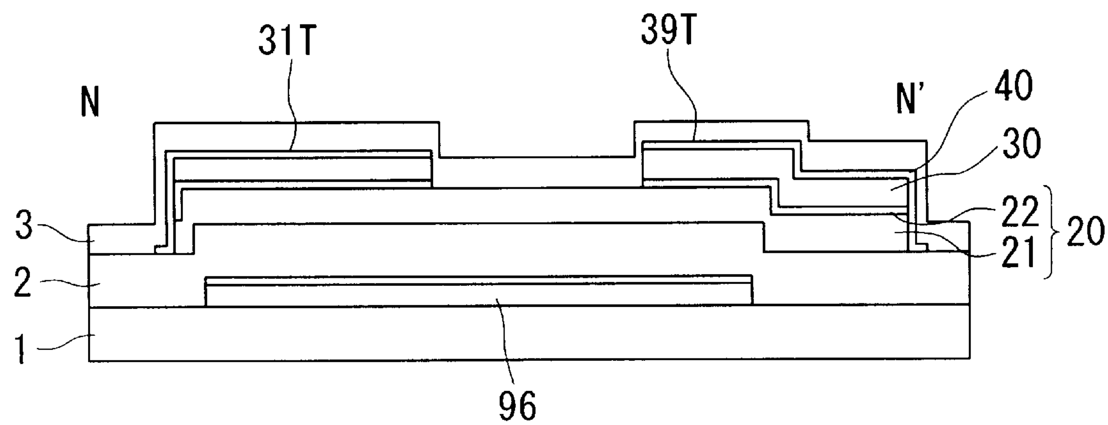

FIG. 163A is a perspective plan view of a portion oft adjacent pixel regions Px in the signal line side and the outer peripheral section Ss of the active matrix substrate plate in Embodiment 35, and FIG. 163B is a cross sectional view through the plane N–N'.

FIGS. 164A–164D are cross sectional views through the plane N–N' to show the process of manufacturing the outer peripheral section Ss of the active matrix substrate plate in Embodiment 35, and FIGS. 164A–164D are cross sectional views of steps 1–3 and a channel-formed TFT.

Figure 165:
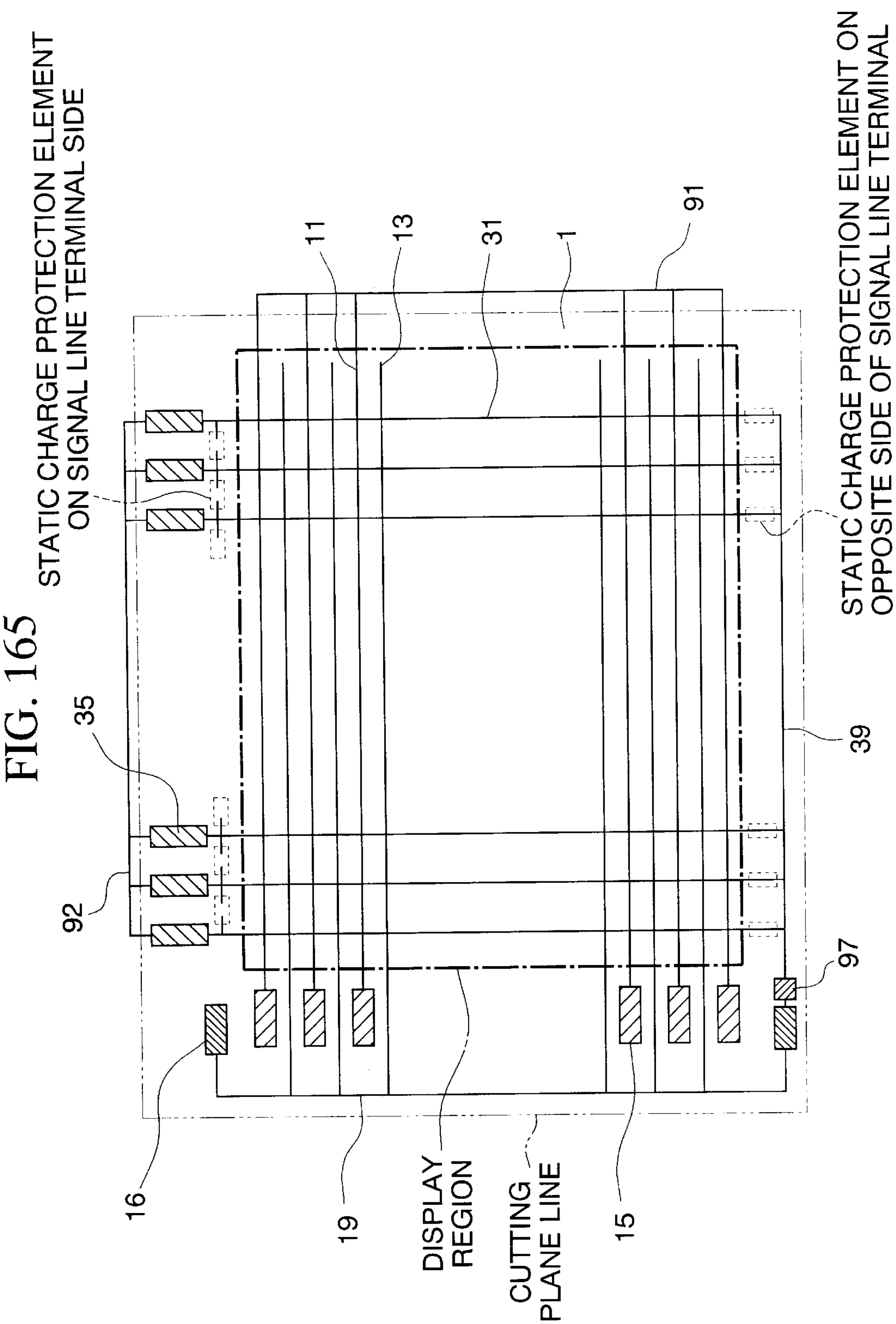

FIG. 165 is a schematic diagram to show the wiring formed on the outer peripheral section Ss of the active matrix substrate plate in Embodiments 33–35.

Figure 166A:
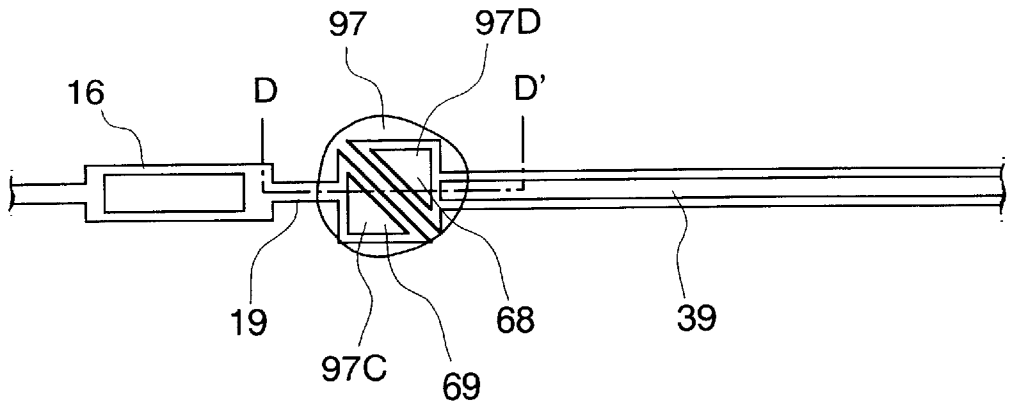
Figure 166B:
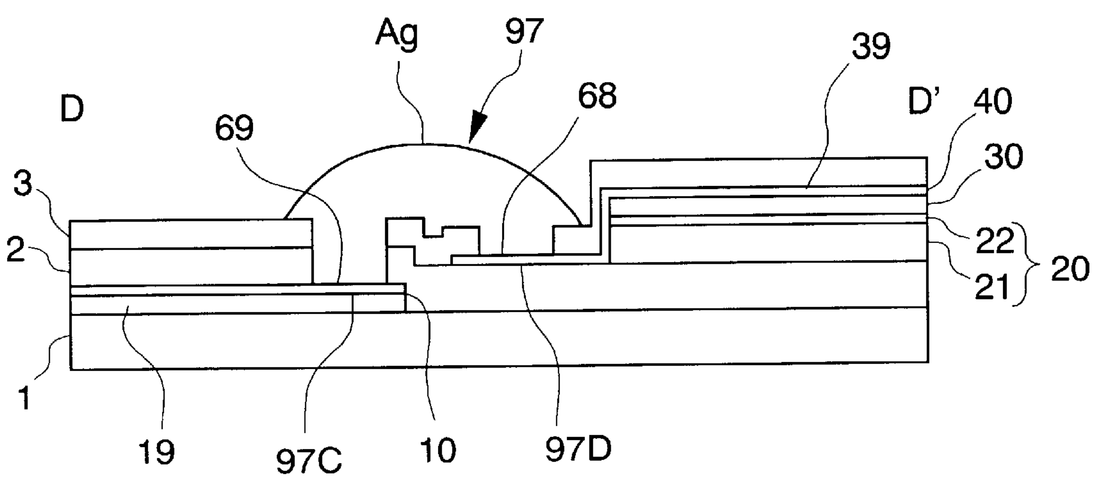

FIG. 166A is a perspective plan view of a silver bead section formed in the outer peripheral section of the active matrix substrate plate in Embodiments 33–35, and FIG. 166B is a cross sectional view through the plane D–D'.

Figure 167A:
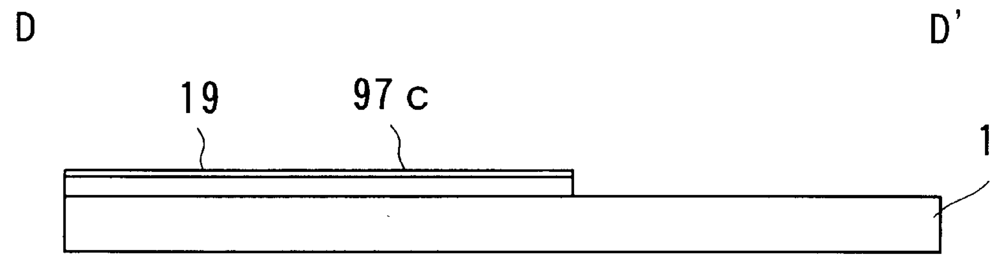
Figure 167B:
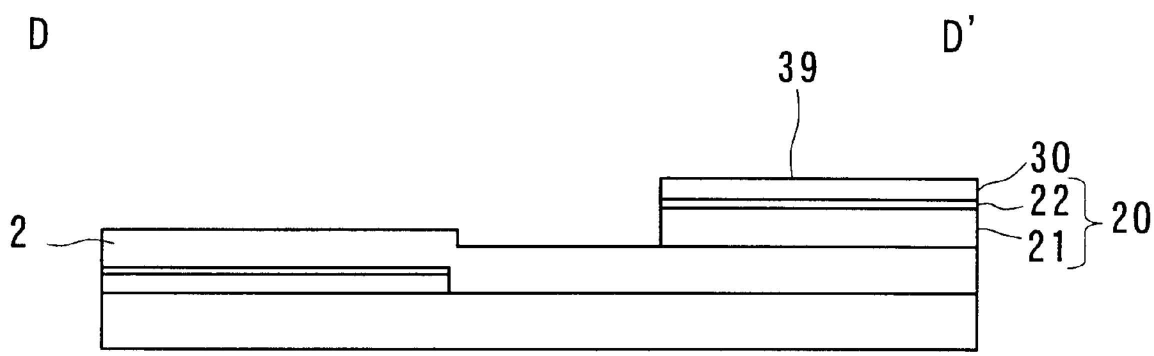
Figure 167C:
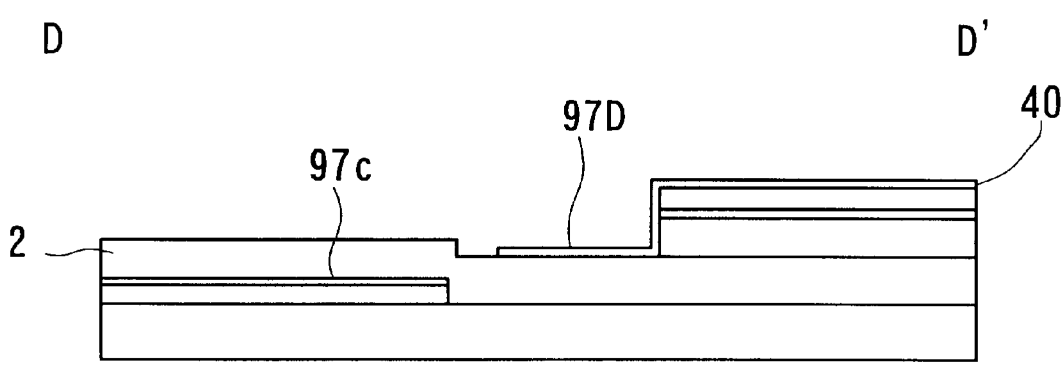

FIGS. 167A–167C are perspective plan views of a silver bead section formed in the outer peripheral section of the active matrix substrate plate in Embodiments 33–35, and FIGS. 167A–167C are cross sectional views related to manufacturing step 1–step 3, respectively.

Figure 168:
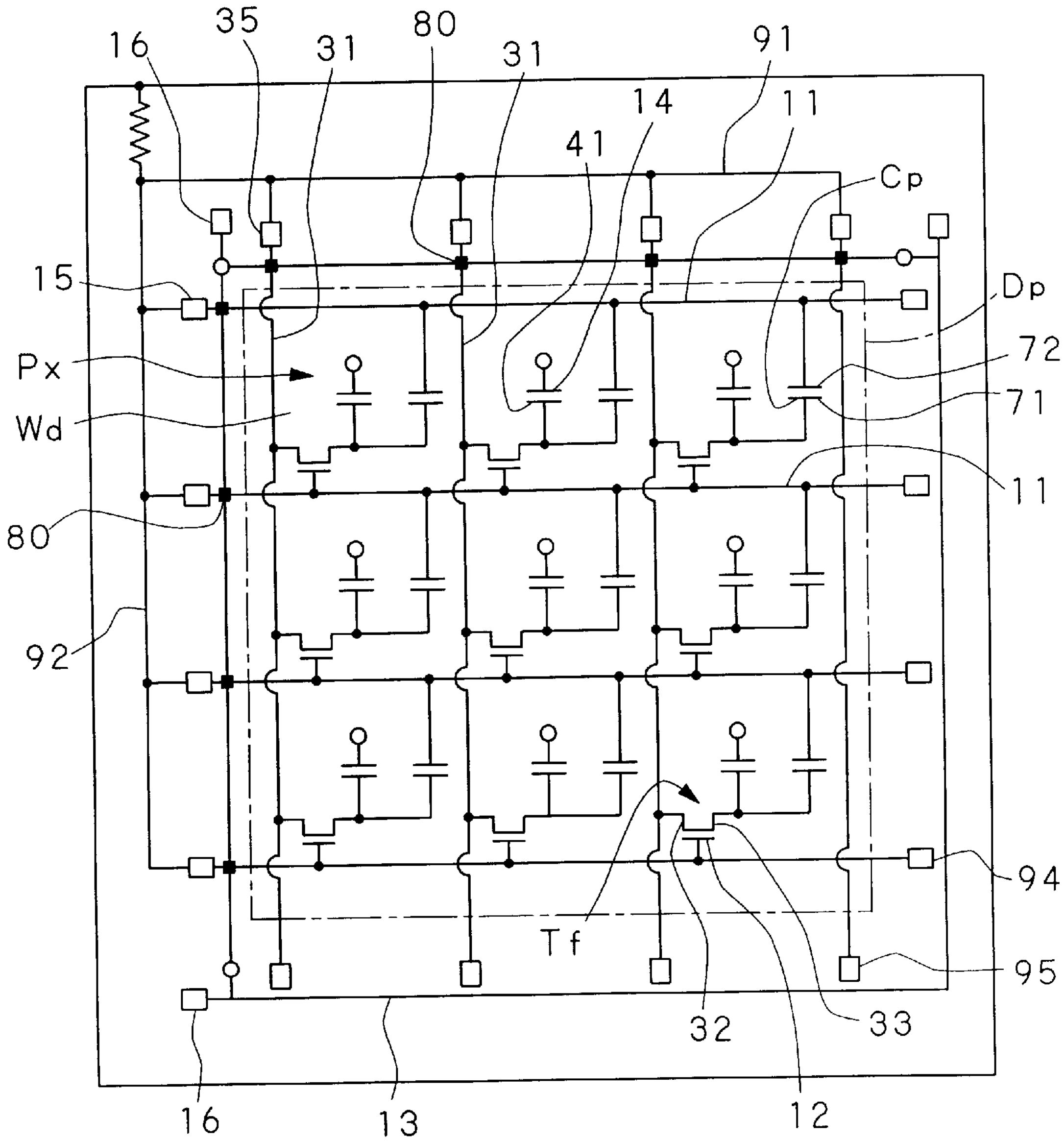

FIG. 168 is a schematic view of the wiring formed on the outer peripheral section Ss of the active matrix substrate plate in Embodiments 36, 37.

Figure 169:
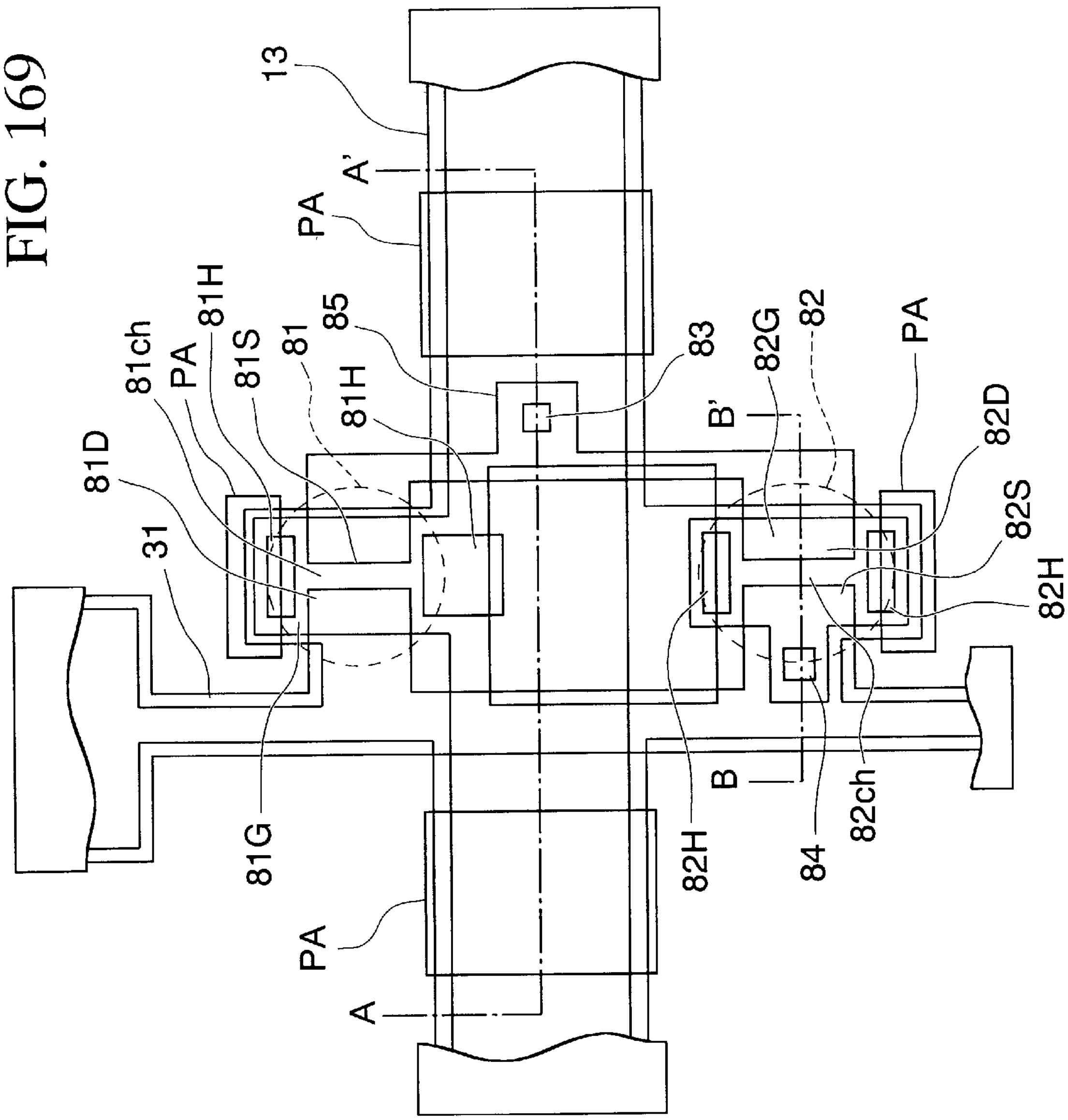

FIG. 169 is a perspective plan view of a protective transistor section formed on the outer peripheral section Ss of the active matrix substrate plate in Embodiment 36.

Figure 170A:
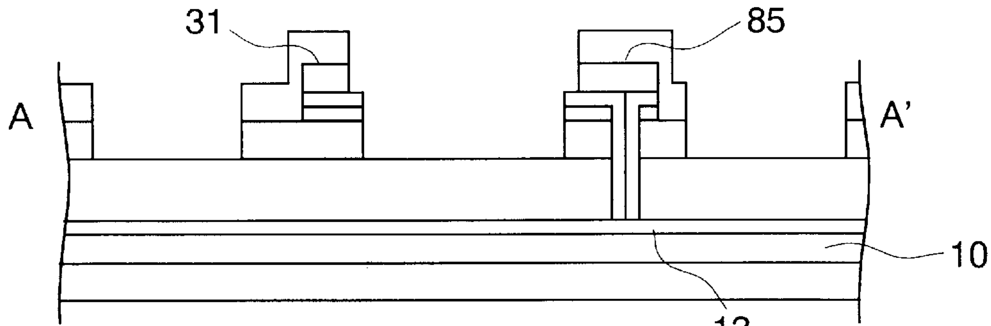

FIG. 170A is a cross sectional view through the plane A–A' of a protective transistor section formed in the peripheral section Ss of the active matrix substrate plate in Embodiment 36, and FIGS. 170B–170E are cross sectional views through the plane A–A' relating to manufacturing step 1–step 3, respectively, and a channel-formed TFT.

Figure 171A:
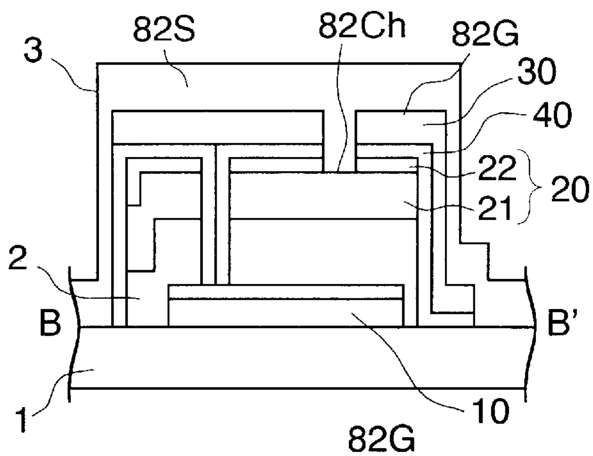

FIG. 171A is a cross sectional view through the plane B–B' of a protective transistor section formed in the peripheral section Ss of the active matrix substrate plate in Embodiment 36, and FIGS. 171B–171E are cross sectional views through the plane B–B' relating to manufacturing step 1–step 3, respectively, and a channel-formed TFT.

Figure 172:
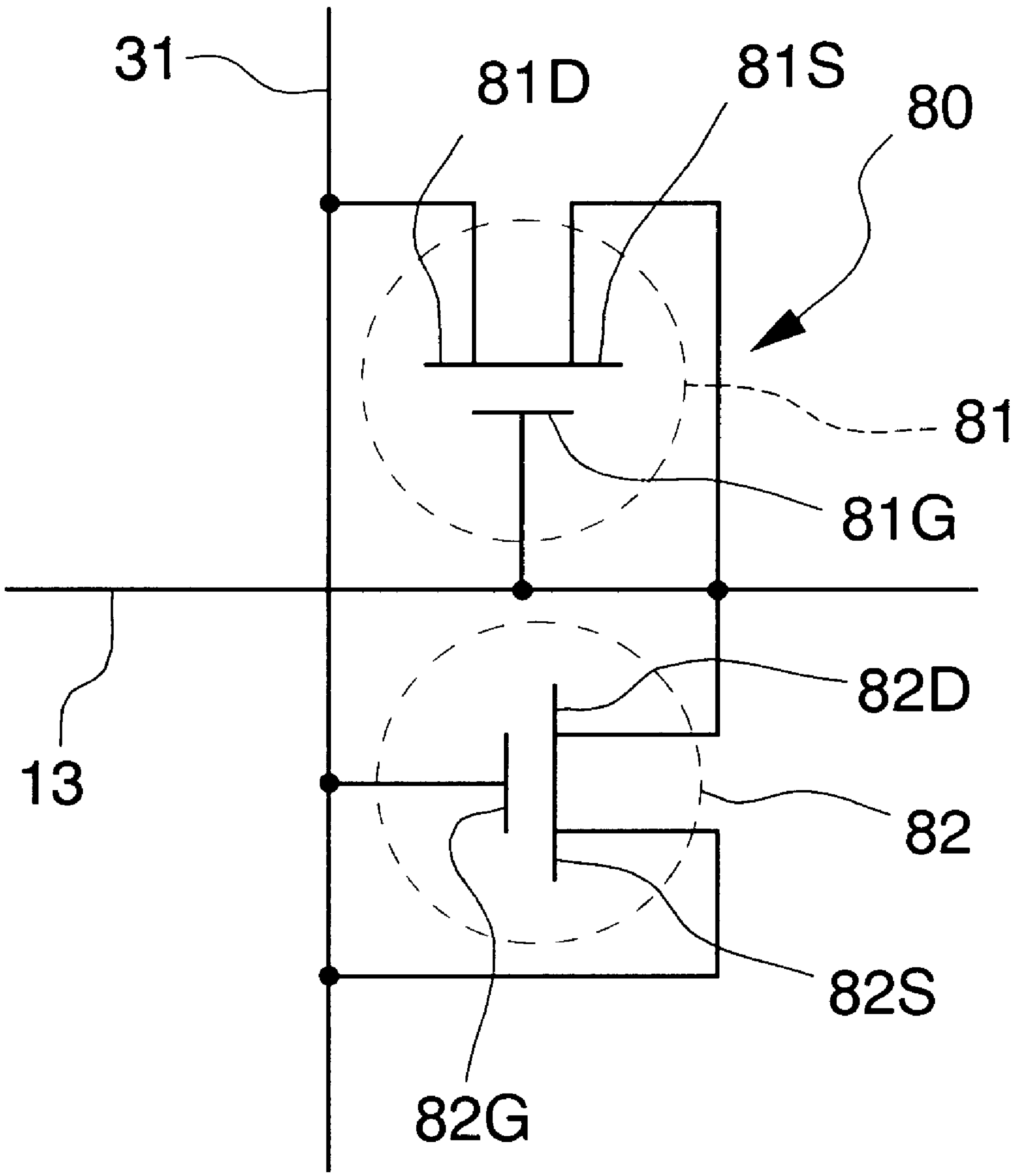

FIG. 172 is an equivalent circuit diagram to show the operation of the protective transistor section of the active matrix substrate plate in Embodiment 36.

Figure 173:
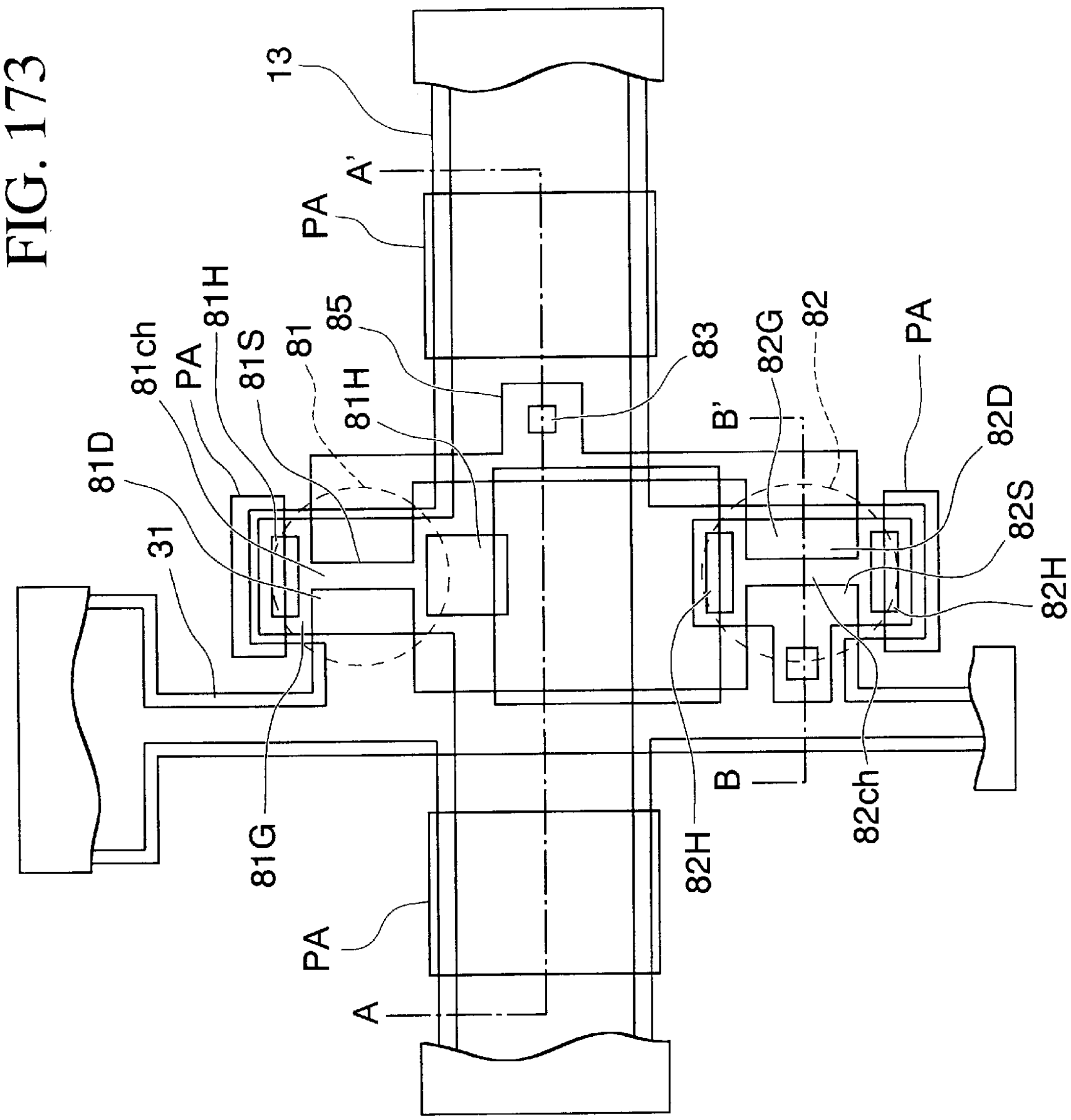

FIG. 173 is a perspective plan view of a protective transistor section formed in the outer peripheral section Ss of the active matrix substrate plate in Embodiment 37.

Figure 174A:
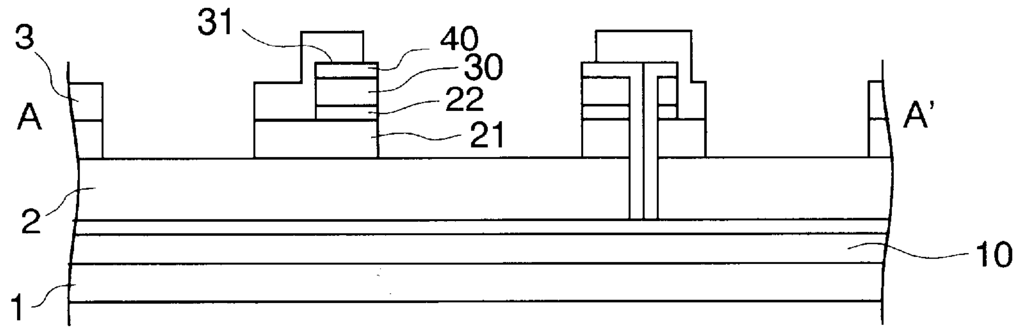

FIG. 174A is a cross sectional view through the plane A–A' of a protective transistor section formed in the peripheral section Ss of the active matrix substrate plate in Embodiment 37, and FIGS. 174B–174E are cross sectional views through the plane A–A' relating to manufacturing step 1–step 3, respectively, and the channel-formed TFT.

Figure 175A:
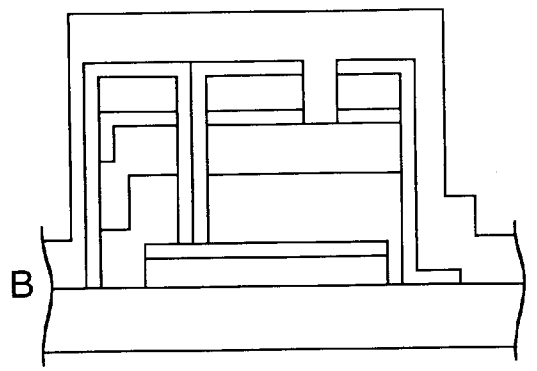

FIG. 175A is a cross sectional view through the plane B–B' of a protective transistor section formed in the peripheral section Ss of the active matrix substrate plate in Embodiment 37, and FIGS. 175B–175E are cross sectional views through the plane B–B' relating to manufacturing step 1–step 3, respectively, and a channel-formed TFT.

Figure 176:
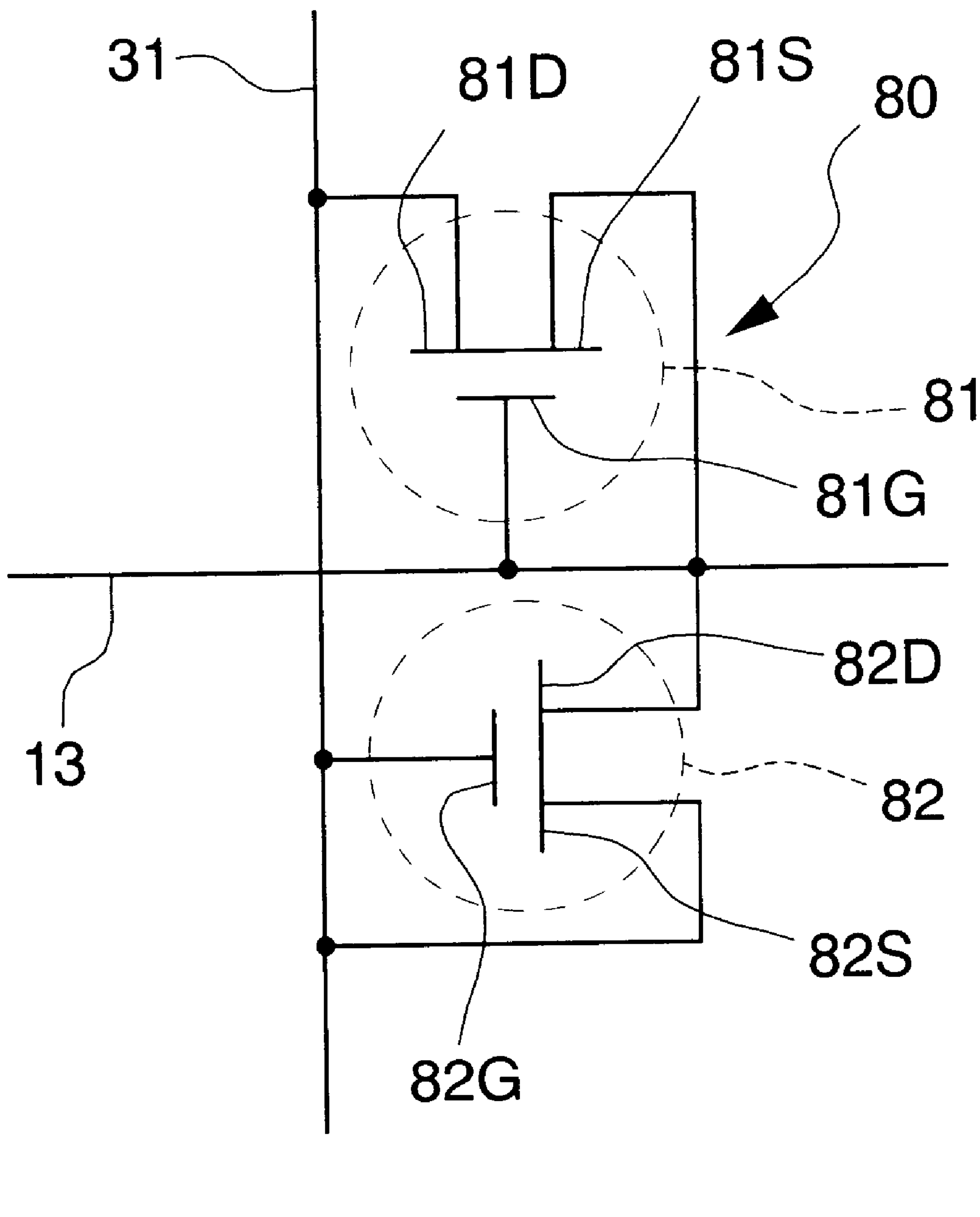

FIG. 176 is an equivalent circuit diagram to show an operation of the protective transistor section of the active matrix substrate plate in Embodiment 37.

Figure 177A:
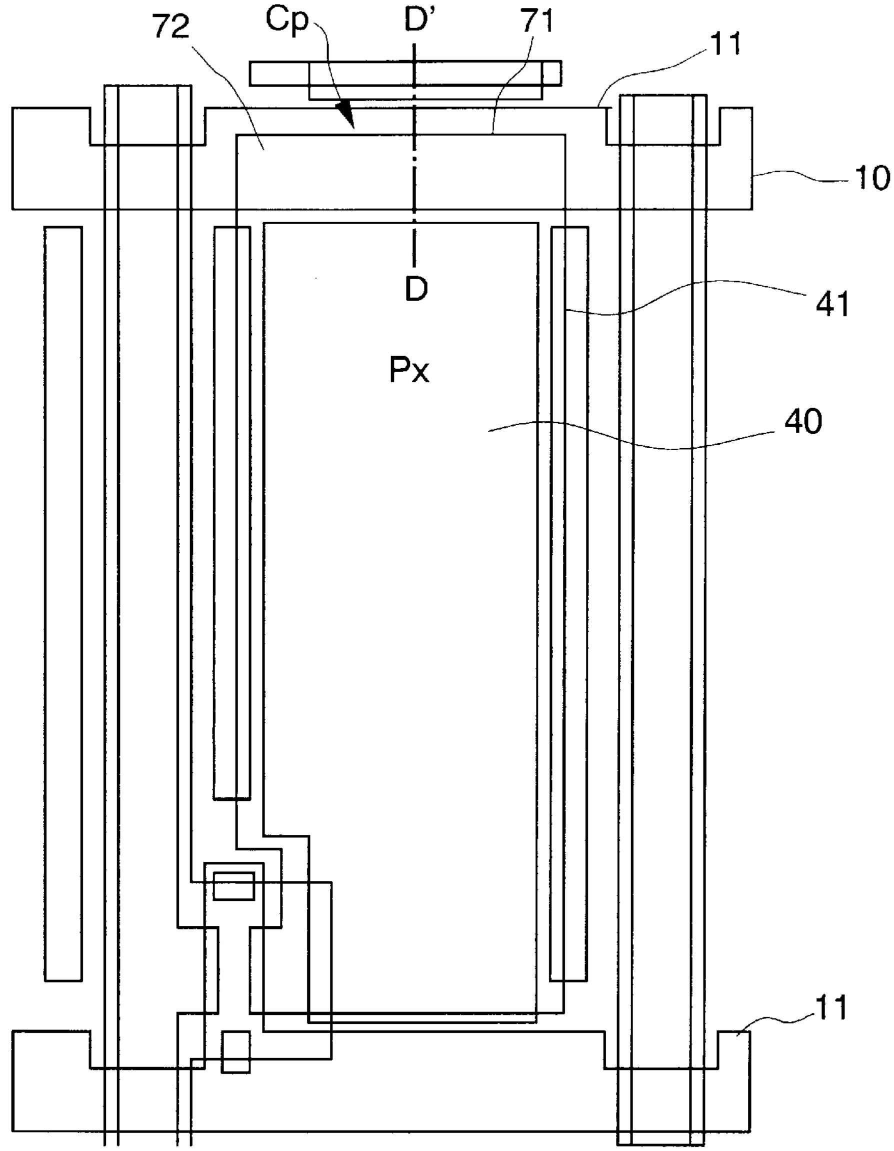
Figure 177B:
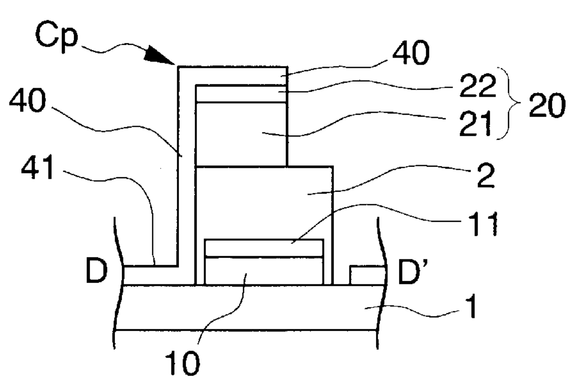

FIG. 177A is a perspective plan view of a one-pixel-region of the active matrix substrate plate in Embodiment 38, and FIG. 177B is a cross sectional view of an accumulation capacitance section Cp through the plane D–D'.

FIGS. 178A–178D are cross sectional views to show the manufacturing steps of the accumulation capacitance section Cp of the active matrix substrate plate in Embodiment 38, and FIGS. 178A–178D are cross sectional views relating to manufacturing step 1–step 3 and a channel-formed TFT.

Figure 179A:
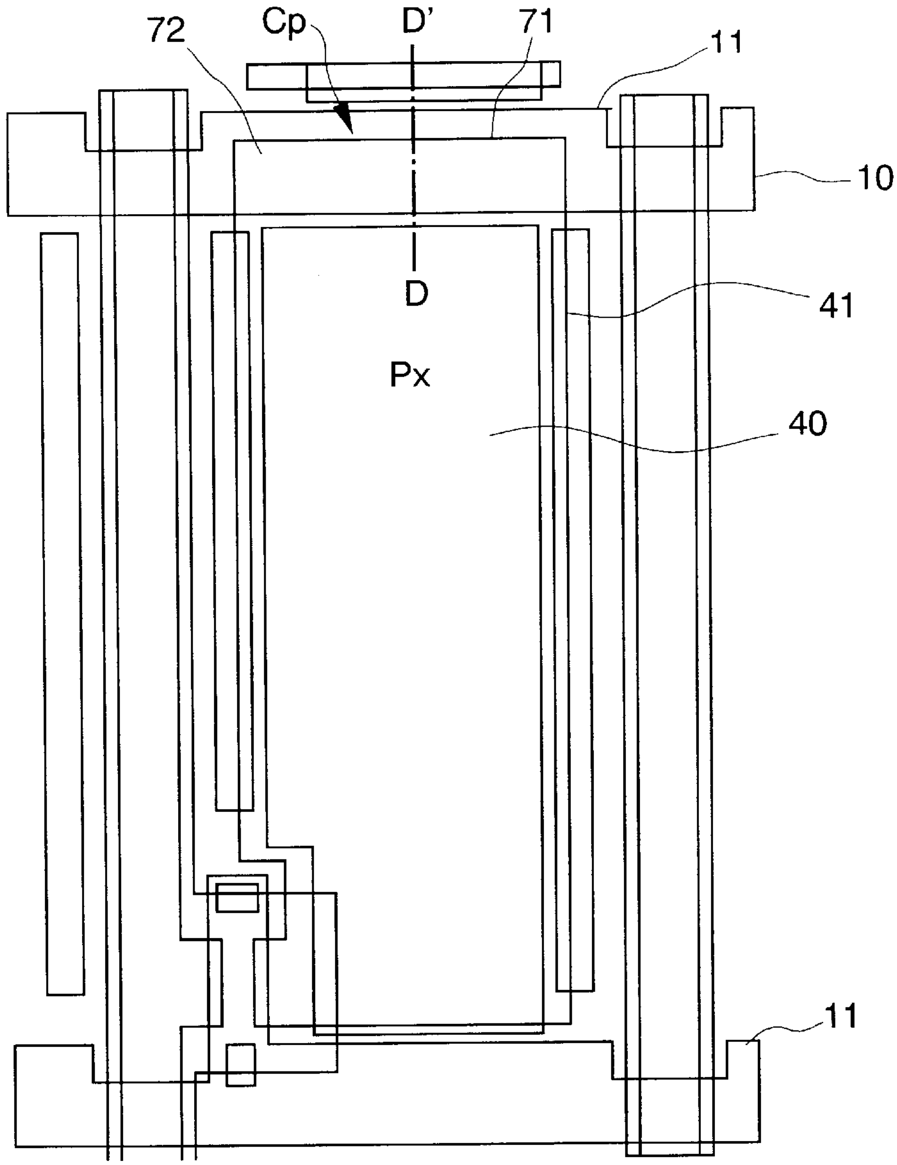
Figure 179B:
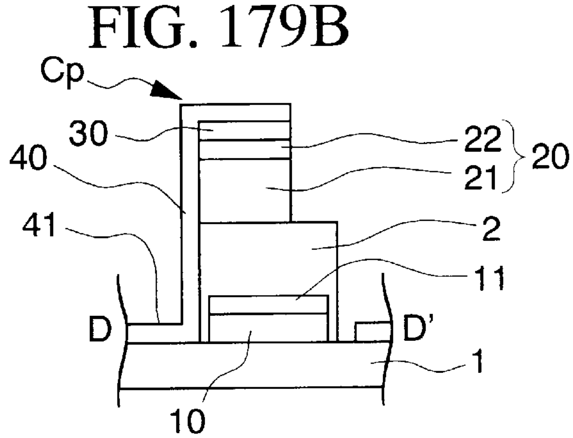

FIG. 179A is a perspective plan view of a one-pixel-region of the active matrix substrate plate in Embodiment 39, and FIG. 179B is a cross sectional view of an accumulation capacitance section Cp through the plane D–D'.

FIGS. 180A–180D are cross sectional views to show the manufacturing steps of the accumulation capacitance section Cp of the active matrix substrate plate in Embodiment 39, and FIGS. 180A–180D are cross sectional views relating to manufacturing step 1–step 3 and a channel-formed TFT.

Figure 181:
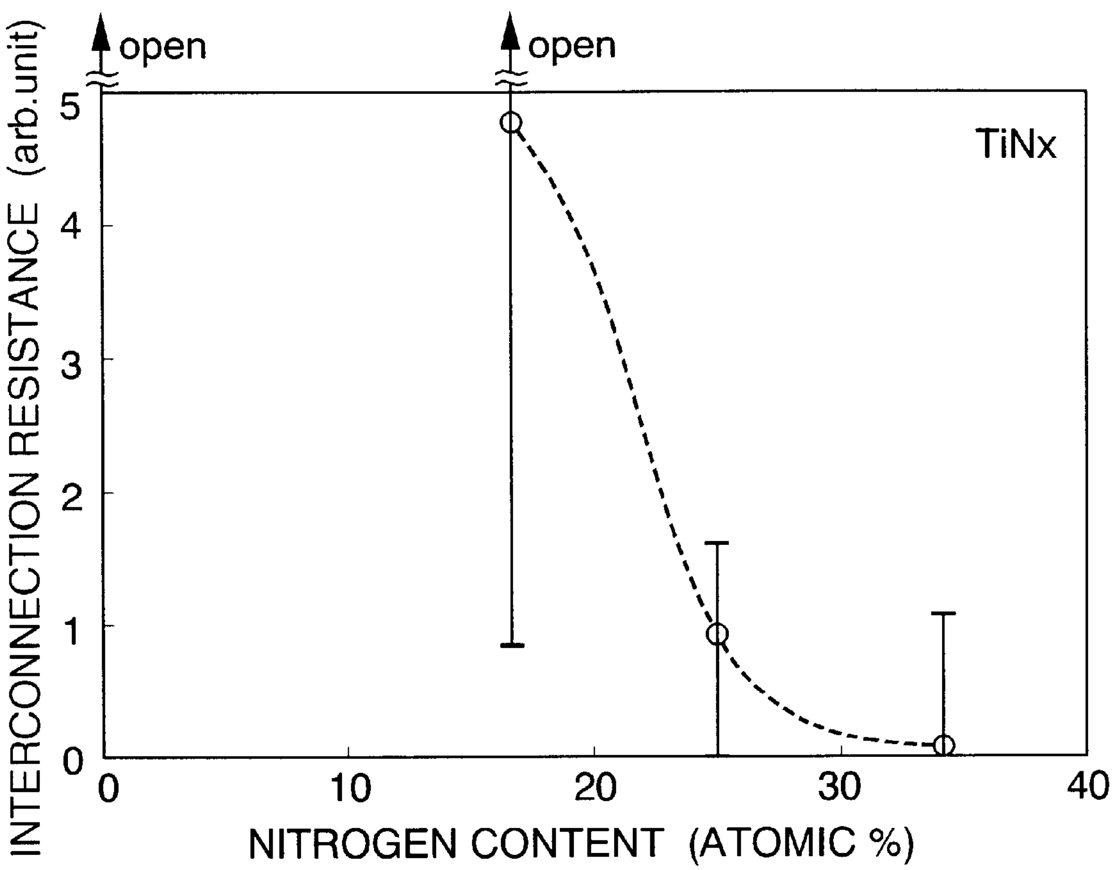

FIG. 181 is a graph to show an example of the relationship between nitrogen content and interconnection resistance.

Figure 182:
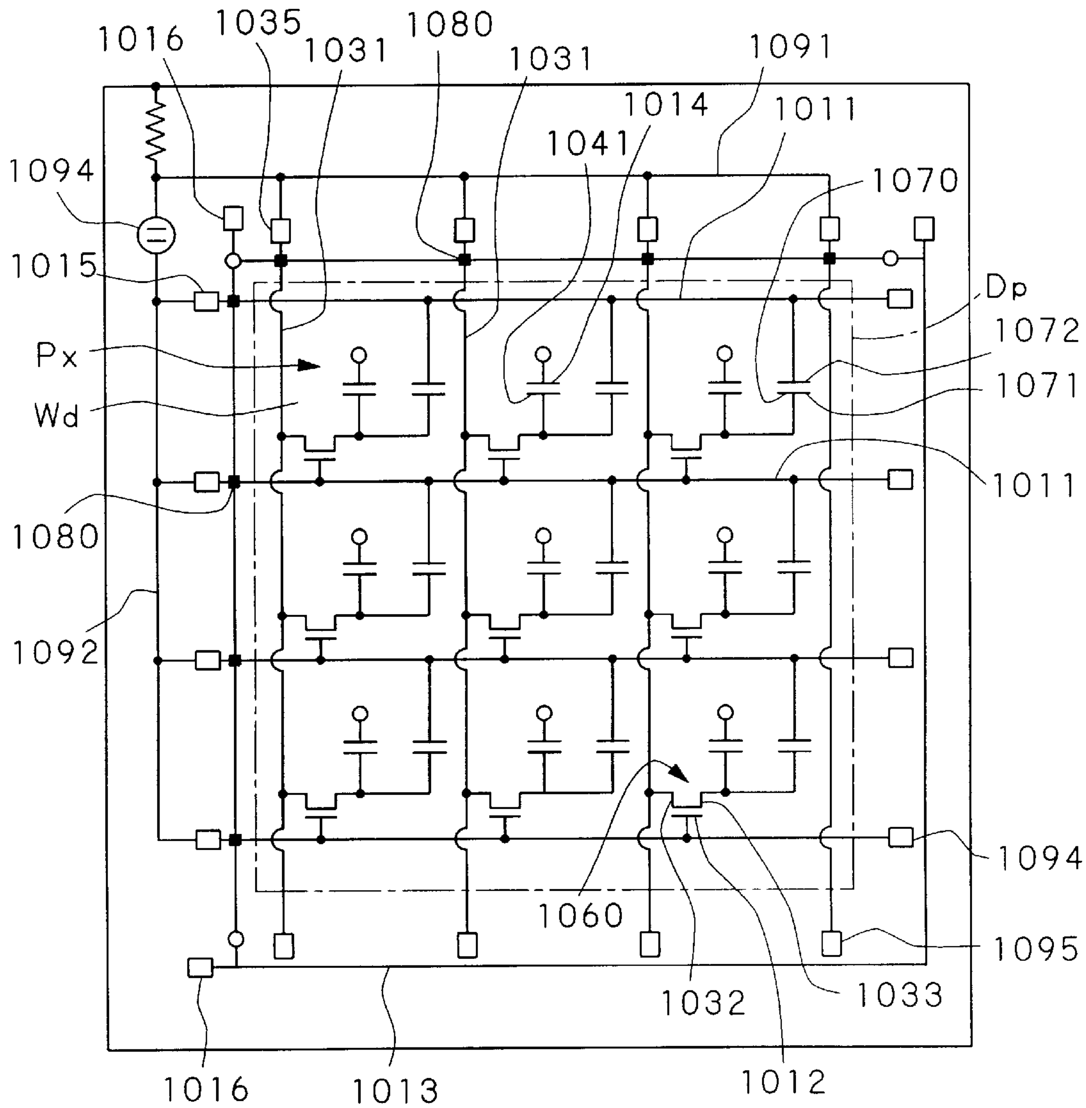

FIG. 182 is a schematic diagram to show an example of the circuit configuration in the active matrix substrate plate.

Figure 183A:
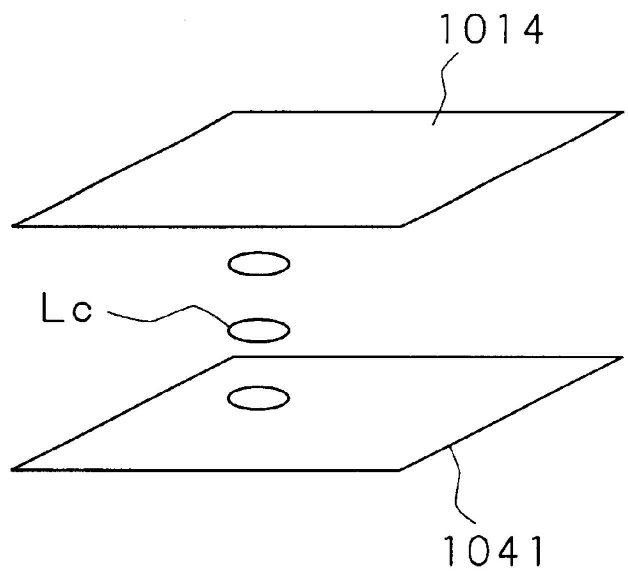
Figure 183B:
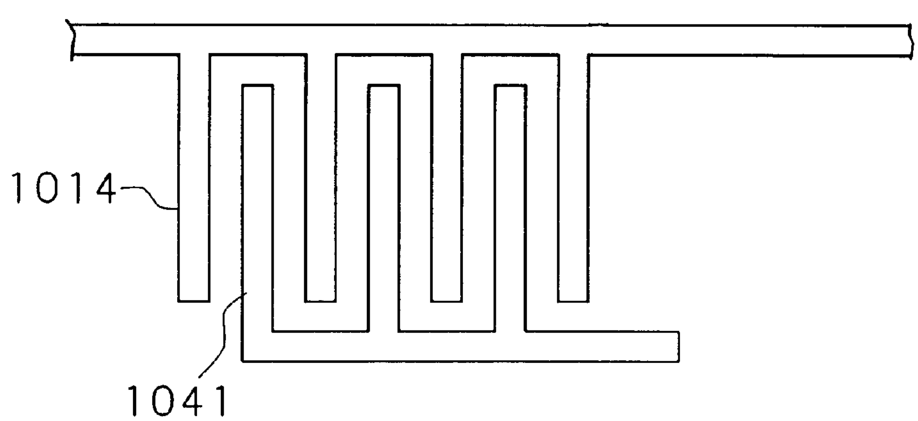
Figure 184A:
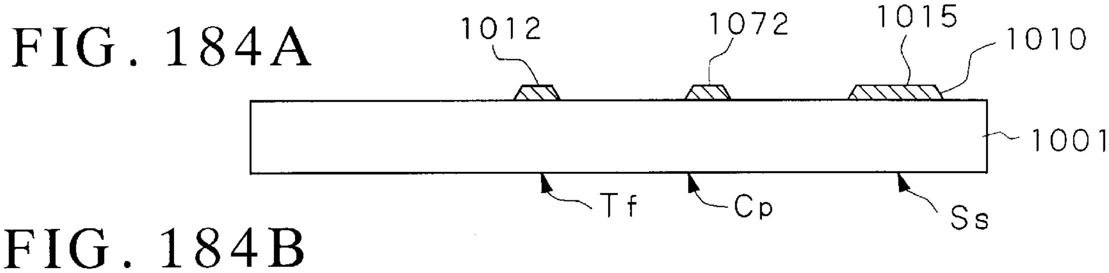
Figure 184B:
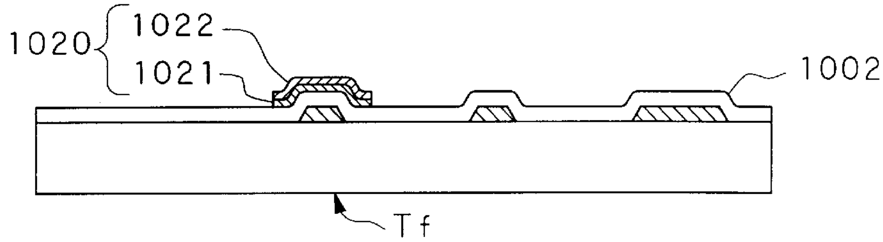
Figure 184C:
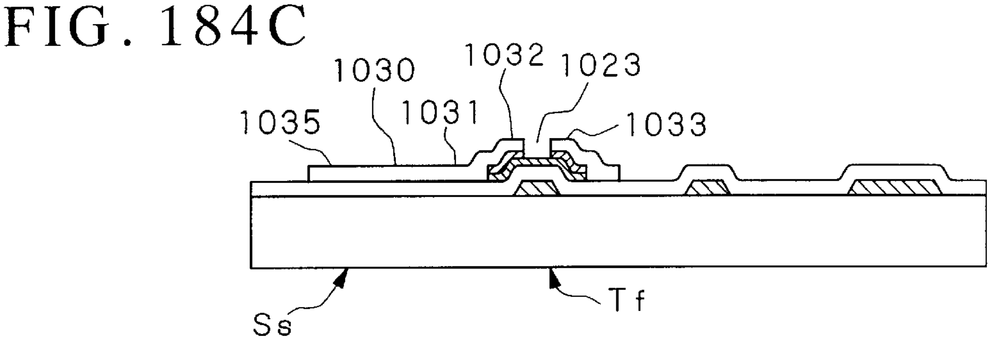
Figure 184D:
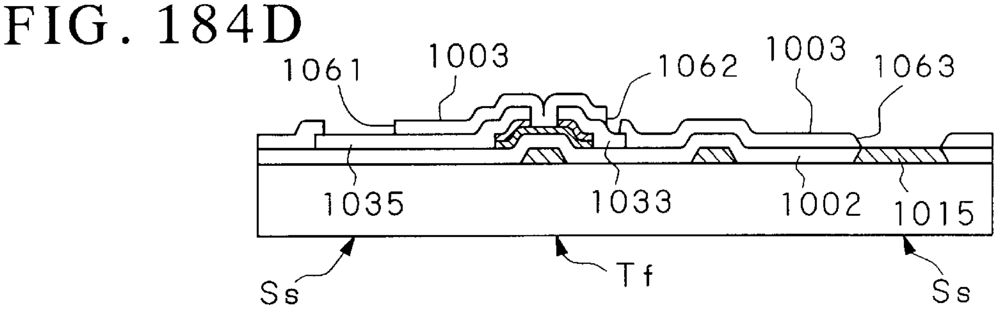
Figure 184E:
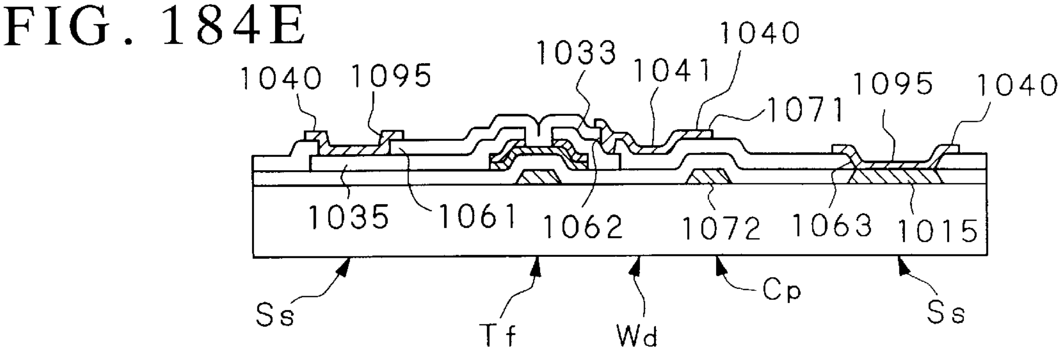

FIGS. 183A–183B are diagrams to show the arrangement of the pixel electrode and the common electrode, and FIG. 183A shows a TN-type active matrix substrate plate and FIG. 183B shows a IPS-type active matrix substrate plate.

FIGS. 184A–184E are cross sectional views to show an example of the manufacturing method of a conventional TN-type active matrix substrate plate and FIGS. 184A–184E are cross sectional views relating to manufacturing step 1–step 5.

DETAILED DESCRIPTION OF THE PREFERRED EMBODIMENTS

Next, preferred embodiments of the present invention will be explained with reference to the drawings, but the present invention is not limited in any way by these embodiments.

Embodiment 1

Figure 1A:
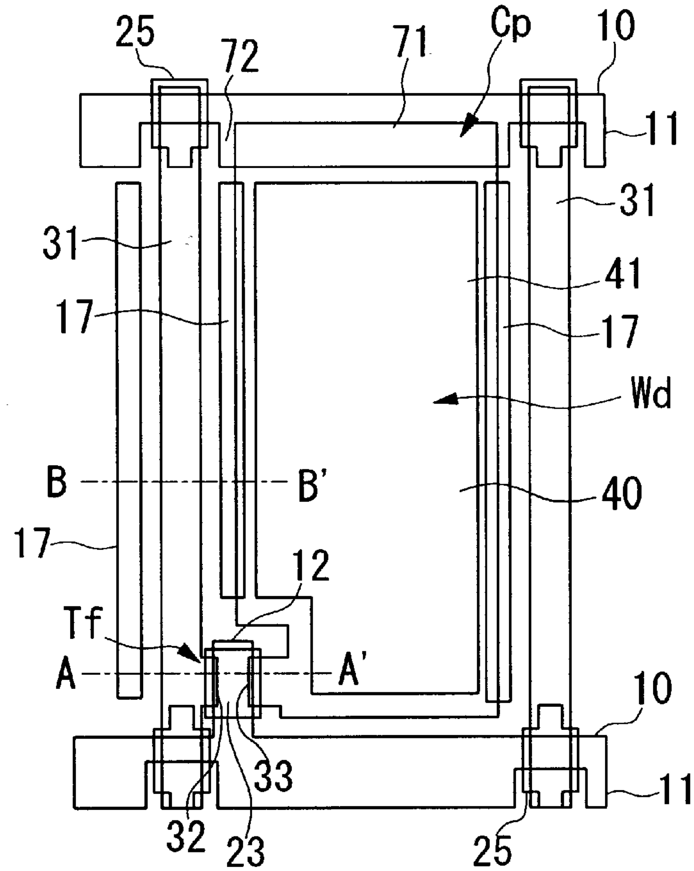
FIG. 1A is a perspective plan view of a one-pixel-region in Embodiment 1 of the present invention.
Figure 1B:
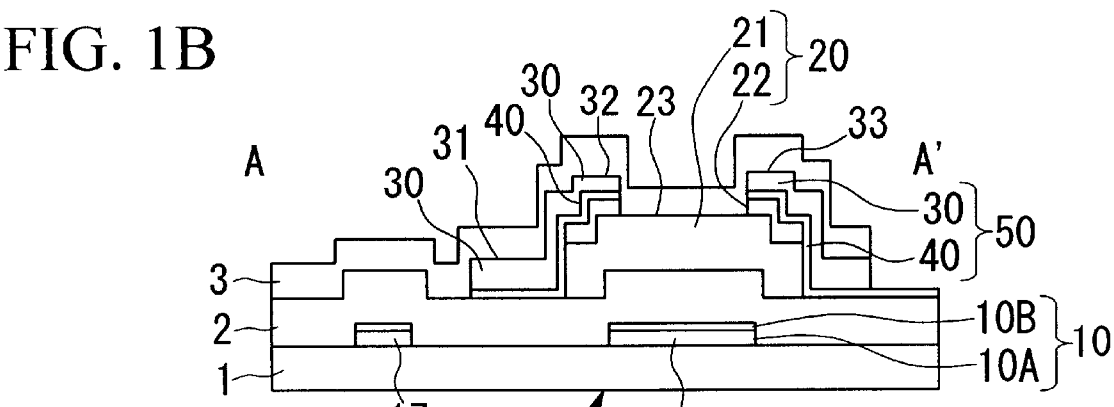
FIG. 1B is a cross sectional view through the plane A–A'.
Figure 1C:
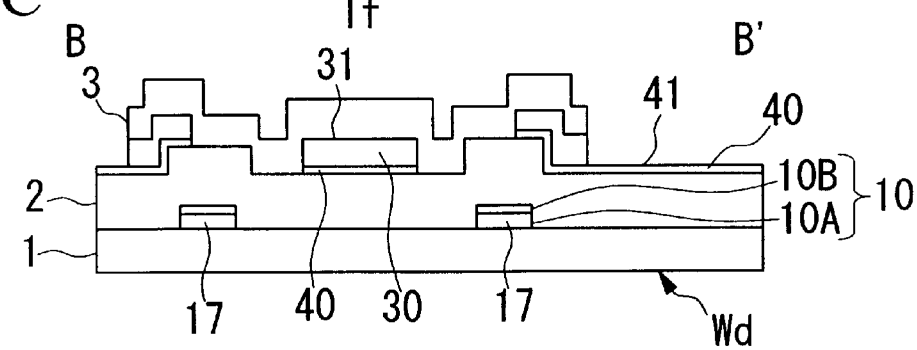
FIG. 1C is a cross sectional view through the plane B–B' in FIG. 1A.
Figure 2A:
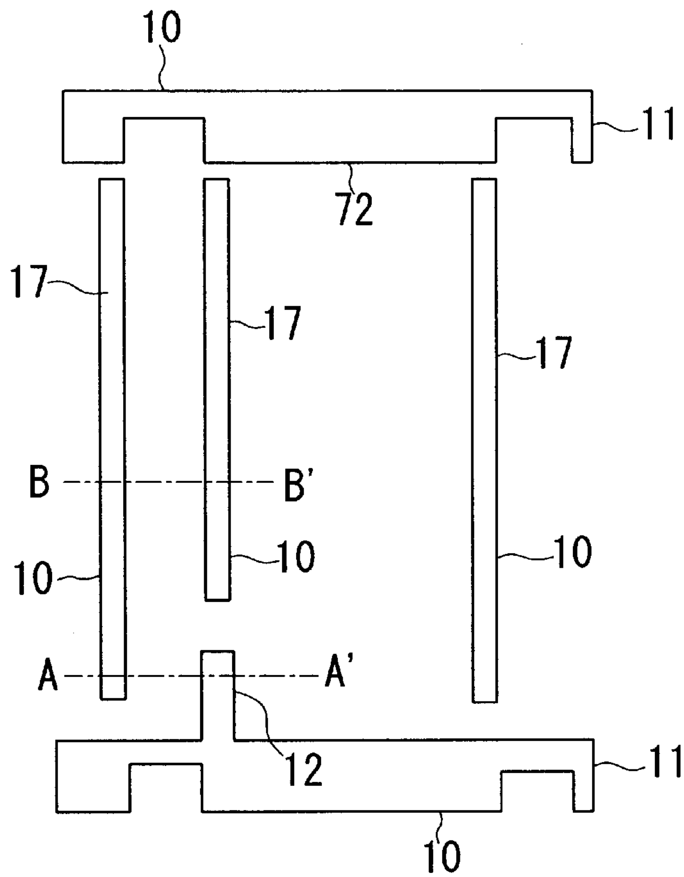
FIG. 2A is a perspective plan view showing a first step of manufacturing the active matrix substrate plate in the one-pixel-region in Embodiment 1.
Figure 2B:
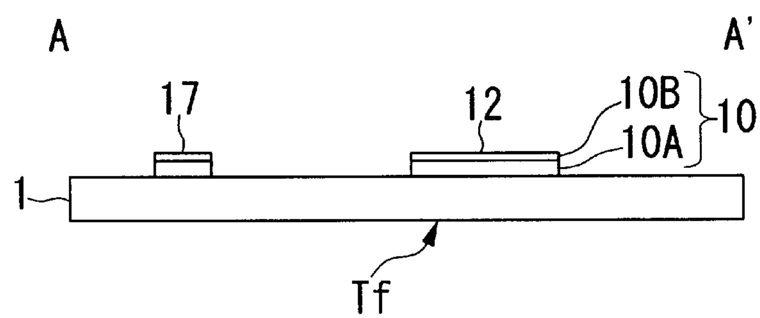
FIG. 2B is a cross sectional view through the plane A–A' in FIG. 1A.
Figure 2C:
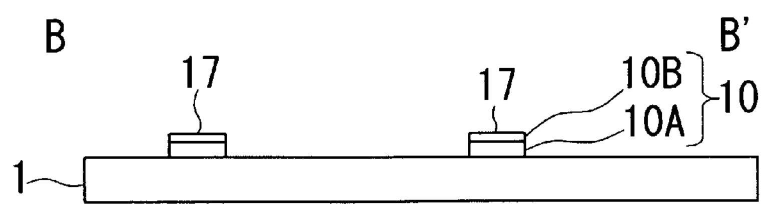
FIG. 2C is a cross sectional view through the plane B–B' in FIG. 1A.
Figure 3A:
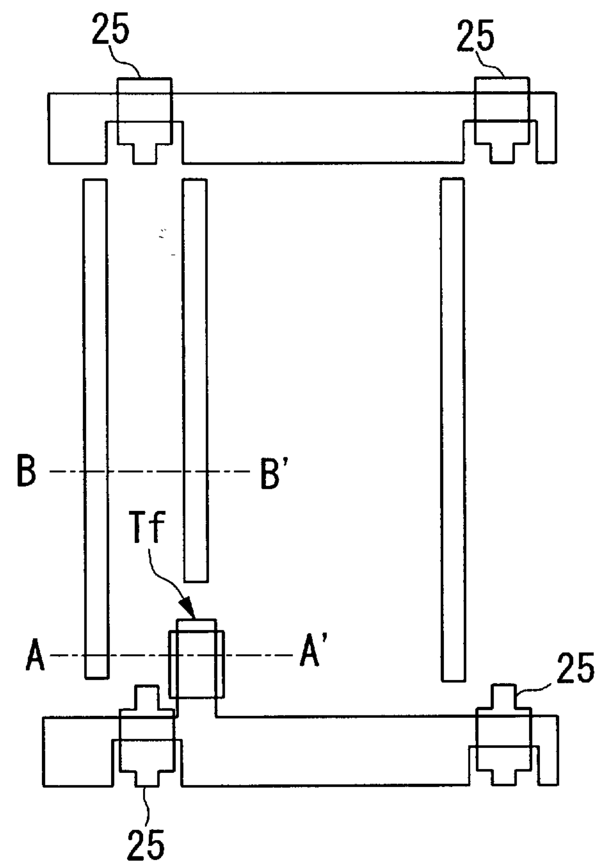
FIG. 3A is a perspective plan view showing a second step of manufacturing the active matrix substrate plate in the one-pixel-region in Embodiment 1.
Figure 3B:
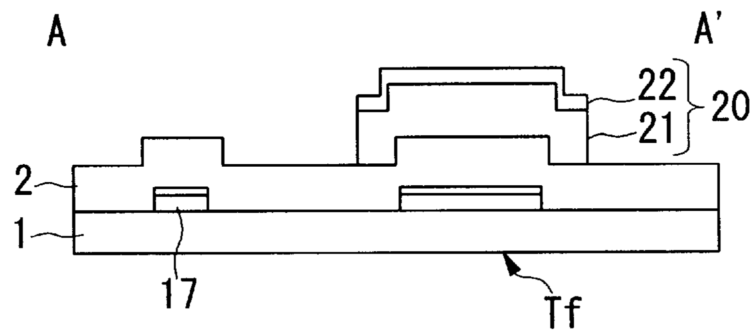
FIG. 3B is a cross sectional view through the plane A–A'.
Figure 3C:
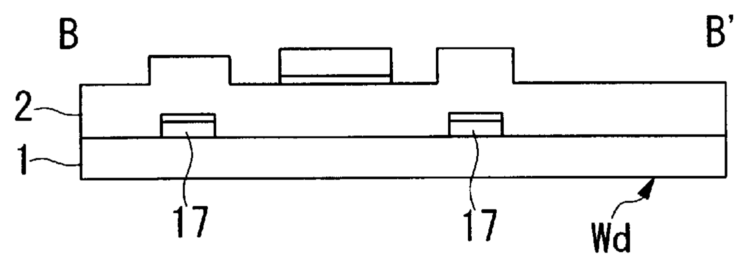
FIG. 3C is a cross sectional view through the plane B–B'.
Figure 4A:
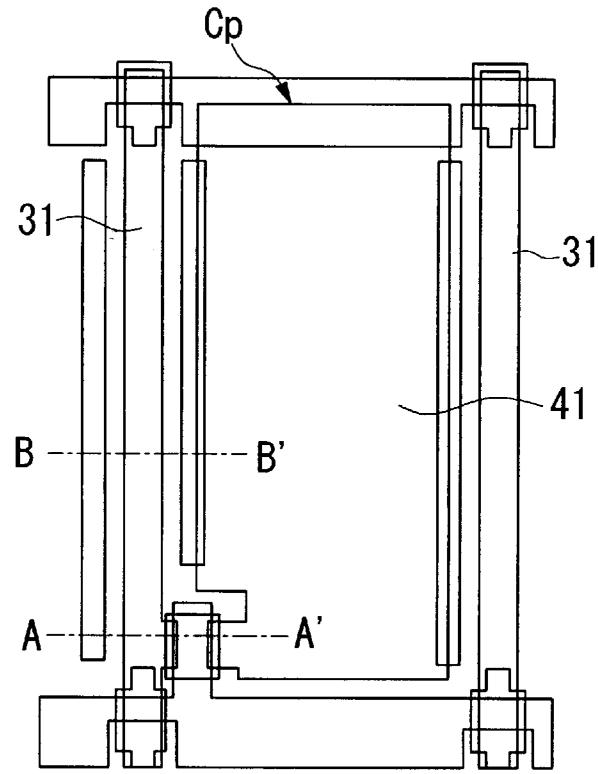
FIG. 4A is a perspective plan view showing a third step of manufacturing the active matrix substrate plate in the one-pixel-region in Embodiment 1.
Figure 4B:
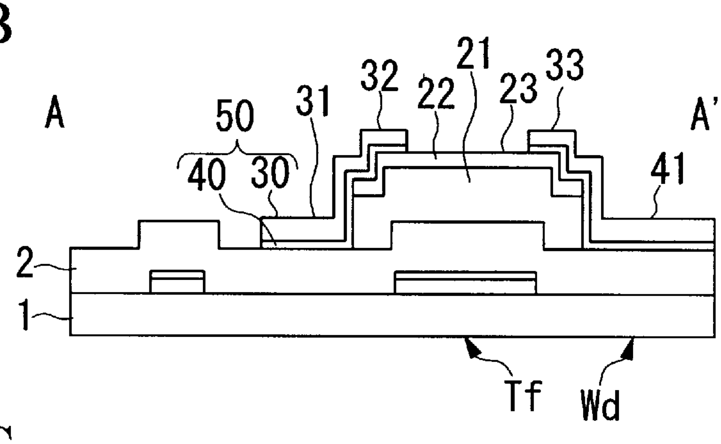
FIG. 4B is a cross sectional view through a plane A–A' in FIG. 4A.
Figure 4C:
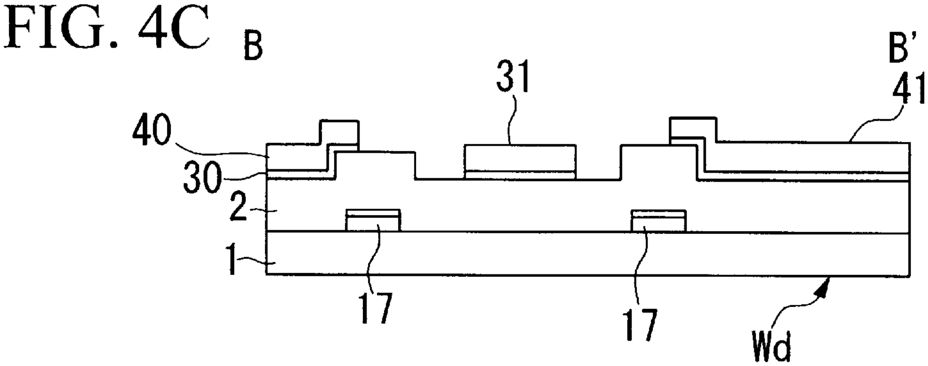
FIG. 4C is a cross sectional view through a plane B–B' in FIG. 4A.

FIG. 1A is a perspective plan view to show a one-pixel-region of the active matrix substrate plate in Embodiment 1, and FIG. 1B is a cross sectional view through the plane A–A', FIG. 1C is the same through the plane B–B'. FIGS. 2A–5B are diagrams to show the manufacturing steps of the active matrix substrate plate, relating to steps 1–3, respectively, and a TFT after the channel has been formed therein. Similar to FIG. 1A, FIGS. 2A, 3A, and 4A are perspective plan views of a one-pixel-region, and FIGS. 2B, 2C, 3B, 3C, 4B, 4C, and FIGS. 5A, 5B are cross sectional views through the planes A–A' and B–B', respectively. Also, FIG. 6A is a cross sectional view of the terminal section of the active matrix substrate plate in the longitudinal direction, in which the left side relates to a cross sectional view at the scanning line terminal location GS and the right side relates to a cross sectional view at the signal line terminal location DS, and FIGS. 6B–6D show manufacturing steps 1–3 for the terminal section part.

The active matrix substrate plate in Embodiment 1 is formed on a glass plate 1, such that a plurality of scanning lines 11 comprised by a first conductor layer 10 and a plurality of signal lines 31 comprised by a second conductor layer 50 are arranged alternatingly at right angles across a gate insulation layer 2, and in the vicinity of TFT section Tf formed in the intersection of the scanning line 11 and the signal line 31, a gate electrode 12 extending from the scanning line 11, a semiconductor layer 20 comprised by the island-shaped amorphous silicon layer 21 and an $n^+$ amorphous silicon layer 22 opposing the gate electrode across the gate insulation layer 2, and a pair of drain electrode 32 and source electrode 33 comprised by a second conductor layer 50 above the semiconductor layer and spaced with a gap of channel gap 23 comprise an inverted staggered structure TFT, and a pixel electrode 41 comprised by a transparent conductive layer 40 is formed in a window section Wd, for transmitting light, which is surrounded by the scanning line 11 and the signal line 31, and the drain electrode 32 is connected to the signal line 31, the source electrode 33 is connected to the pixel electrode 41 to form a TN-type active matrix substrate plate.

In this active matrix substrate plate, the first conductor layer 10 forming the scanning line 11 and the gate electrode 12 is produced by laminating a lower metallic layer 10A comprised of Al or an alloy primarily made of Al, and an upper metallic layer 10B comprised by a high melting point metal such as Ti, Ta, Nb, Cr or alloy of their nitride film. It is preferable that the nitrogen content of the upper metallic layer 10B be not less than 25 atomic percent (a/o). Also, the second conductor layer 50 forming the signal line 31, drain electrode 32, and source electrode 33 is formed by laminating the metallic layer 30 comprised by Cr or Mo on top of the transparent conductive layer 40 comprised by ITO, and the transparent conductive layer 40 below the source electrode 33 extends above the gate insulation layer 2 of the window section Wd to form the pixel electrode 41.

The pixel electrode 41 extends so as to superimpose above the accumulation common electrode 72 formed inside the forestage scanning lines 11 across the gate insulation layer 2 to form an accumulation capacitance electrode 71 to construct the accumulation capacitance section Cp in this pixel region. Also, in this pixel region, a light blocking layer 17 comprised by the first conductor layer 10 is formed so as to superimpose across the gate insulation layer 2 a portion on one perimeter section of the pixel electrode 41. Further, at the location where the scanning line 11 and the signal line 31 intersect, a reinforcing layer 25 comprised by the semiconductor layer 20 is formed between the gate insulation layer 2 and the signal line 31.

The active matrix substrate plate in Embodiment 1 is manufactured according to the following four steps.

(Step 1) as shown in FIGS. 2A–2C and FIG. 6B, the first conductor layer 10 is formed by continual sputtering on the glass plate 1 to form the lower metallic layer 10A comprised by Al of about 200 nm thickness and the upper metallic layer 10B comprised by a nitride film of Ti of about 100 nm thickness, and through photolithographic processes, excepting the scanning line 11, scanning line terminal section 11*a* formed in the scanning line terminal location GS, gate electrode 12 extending from the scanning line 11 to the TFT section Tf within the respective pixel regions, accumulation common electrode 72 formed within the forestage scanning line 11 and the light blocking layer 17, the first conductor layer 10 is removed by etching. In this case, nitride film of Ti is formed by reactive sputtering, and by adjusting Ar gas and nitrogen gas flow rates, nitrogen content is adjusted so that it is not less than 25 a/o.

(Step 2) as shown in FIGS. 3A–3C and FIG. 6C, on the above substrate plate, gate insulation layer 2 comprised by silicon nitride film of about 400 nm thickness are deposited by continually applying plasma CVD, and a semiconductor layer 20 comprised by the amorphous silicon layer 21 of about 250 nm thickness and the $n^+$ amorphous silicon layer 22 of about 50 nm thickness is deposited, and through photolithographic processes, within the respective pixel region, excepting the TFT section Tf and the reinforcing layer 25, the semiconductor layer 20 is removed by etching.

(Step 3) as shown in FIGS. 4A–4C and FIG. 6D, the second conductor layer 50 is deposited by continually sputtering on the above substrate plate to form the transparent conductive layer 40 comprised by ITO of about 50 nm thickness and the metallic layer 30 comprised by Cr of about 200 nm thickness, and through photolithographic processes, excepting the signal line 31, signal line terminal section 31*a* formed in the signal line terminal location DS in the outer peripheral section Ss, common wiring line and common wiring line terminal section (not shown), drain electrode 32 extending from the signal line 31 towards the TFT section Tf, and within the respective pixel regions, pixel electrode 41 in the window section Wd, and source electrode 33 separated from the drain electrode 32 by the opposing channel gap 23 and extending from the pixel electrode 41 to the TFT section Tf, the second conductor layer 50 is removed by etching. In this case, the perimeter of the pixel electrode 41 is extended so as to superimpose on the accumulation common electrode 72 in the accumulation capacitance section Cp to form the accumulation capacitance electrode 71, and both perimeter sections of the pixel electrode adjacent to this perimeter section are formed so that at least a portion will superimpose on the light blocking layer 17.

Figure 5A:
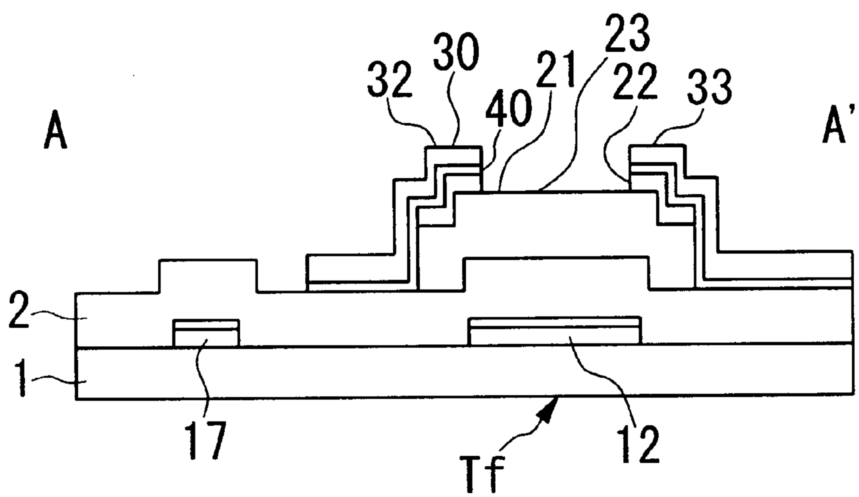
FIGS. 5A–5B are cross sectional views of the TFT after the channel is formed using the manufacturing method in Embodiment 1.
Figure 5B:
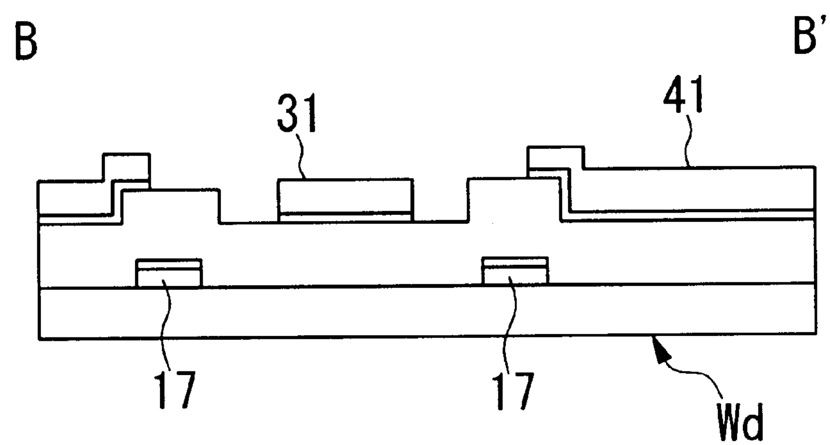
Figure 6A:
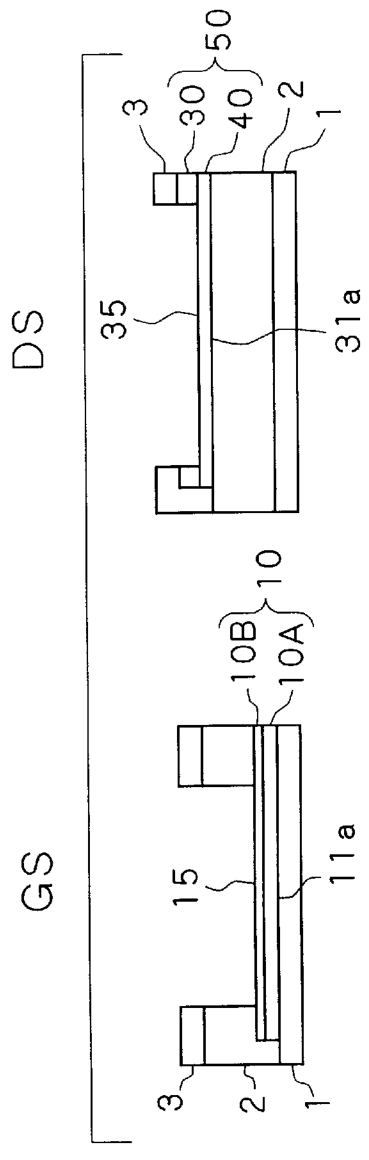
FIG. 6A is a cross sectional view in the longitudinal direction of a terminal section of the active matrix substrate plate in Embodiment 1, and the left side relates to the scanning line terminal section and the right side relates to the signal line terminal section.
Figure 6B:
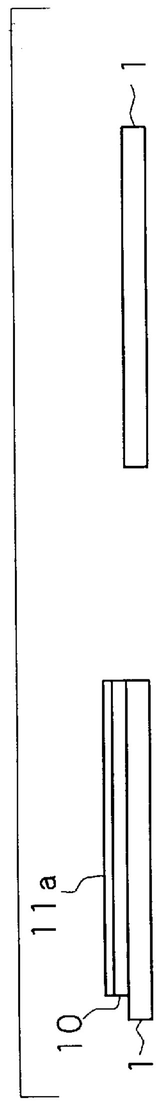
FIGS. 6B–6D are cross sectional views relating to manufacturing step 1–step 3, respectively.
Figure 6C:
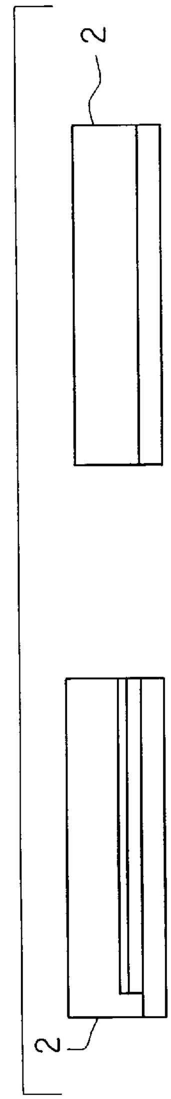
Figure 6D:
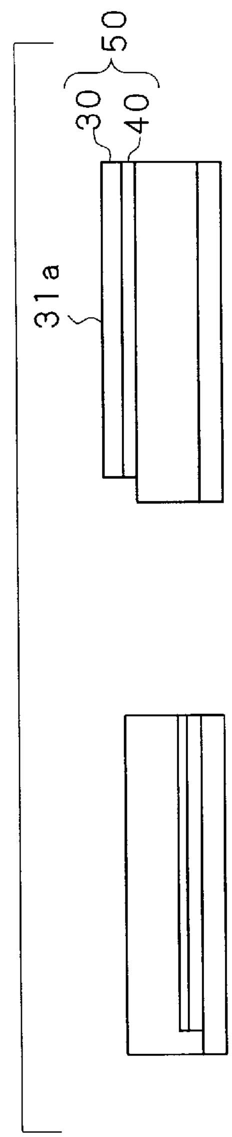

Next, as shown in FIGS. 5A, 5B, after removing its masking pattern or the masking used in the etching process, using the second conductor layer 50 as masking, the exposed $n^+$ amorphous silicon layer 22 is removed by etching to form the channel gap 23. Photolithography is not required for this process.

(Step 4) as shown in FIGS. 1A–1C and FIG. 6A, on the above substrate plate the protective insulation layer 3 of about 150 nm thickness comprised by silicon nitride film is deposited using plasma CVD process, and through photolithographic processes, the pixel electrode 41, signal line terminal section 31*a*, and protective insulation layer 3 above the common wiring line terminal section (not shown), protective insulation layer 3 and gate insulation layer 2 above the scanning line terminal section 11*a* are removed by etching, and using the protective insulation layer 3 with the masking pattern or the masking used for etching removed as masking, removing by etching the metallic layer 30 above the pixel electrode 41 and signal line terminal section 31*a* and the common wiring line terminal section to expose the pixel electrode 41 and the signal line terminal 35 and the common wiring line terminal section (not shown) comprised by the transparent conductive layer 40, and scanning line 15 comprised by the first conductor layer 10. Lastly, the active matrix substrate plate is completed by performing annealing at about 280° C.

In this case, a lamination of Al and a nitride film Ti is used for the first conductor layer, but the first layer may be a three layer structure formed by laying an underlayer of a high melting point metal such as Ti below the Al layer, to form Ti, Al and Ti nitride layers. Also, it may be an alloy film of primarily Al that can suppress hillock of Al—Nd alloy to secure reliability of connection of the terminal section or a film that overlays ITO on Cr.

Also, in the present embodiment, the vertical-type TFT in which the gate electrode extends from the scanning line to the pixel section, but the lateral-type TFT may be used, in which the gate electrode shares a portion of the scanning line.

Productivity and the yield of the TN-type active matrix substrate plate in Embodiment 1 are improved because it can be manufactured in four steps.

Also, because the signal line in this active matrix substrate plate is comprised by laminating the metallic layer and the transparent conductive layer, wiring resistance of the signal line can be reduced and the yield drop due to line severance and the like can be suppressed, and because the source electrode and the pixel electrode are formed integrally by the transparent conductive layer, it is possible to suppress an increase in electrical contact resistance resulting in improved properties.

Also, in this active matrix substrate plate, because the scanning line is comprised by Al and a nitride film of a high melting point metals such as Ti, it is possible to lower wiring resistance of the scanning line and to prevent oxidation of the scanning line terminal section, to secure reliability of connection of scanning line and scanning line driver.

It is preferable that the atomic concentration of nitrogen in the nitride film of a high melting point metals be not lower than 25 a/o. FIG. 181 shows data to support this belief. According to inventors' experiments, it was found that the interconnection resistance decreases significantly when the nitrogen concentration is not lower than 25 a/o. Accordingly, it is possible to attain good reliability of connection at the scanning line terminal section.

Also, because this active matrix substrate plate has a reinforcing layer at the intersection of scanning line and signal line, the dielectric strength of the insulation between scanning line and signal line is improved. Also, because it is constructed so that the pixel electrode at least partially superimposes on the light blocking layer, it is possible to reduce the black matrix of the color filter substrate plate that needs to have a large superpositioning margin, thereby enabling to improve the aperture factor.

Embodiment 2

Figure 7A:
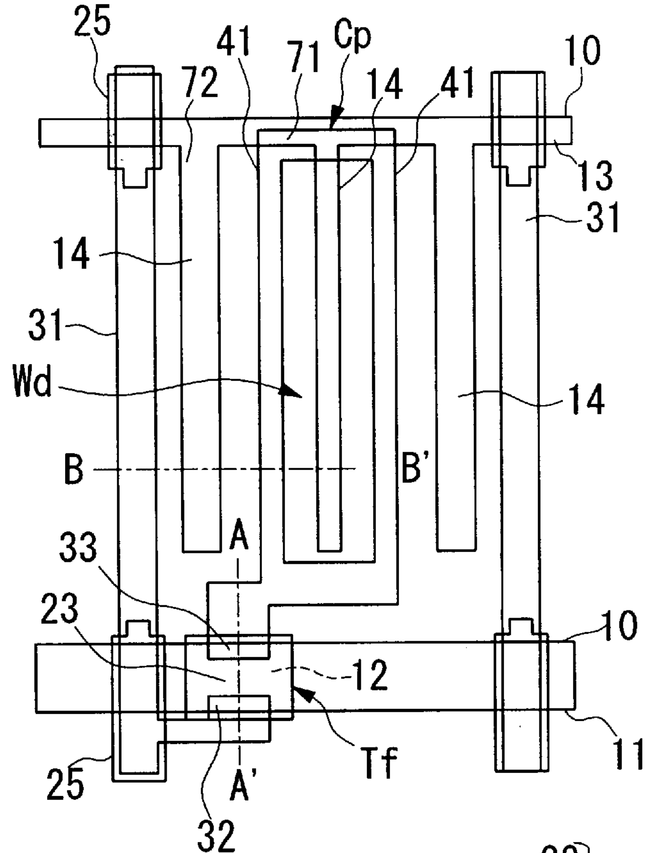
FIG. 7A is a perspective plan view of a one-pixel-region of the active matrix substrate plate in Embodiment 2.
Figure 7B:
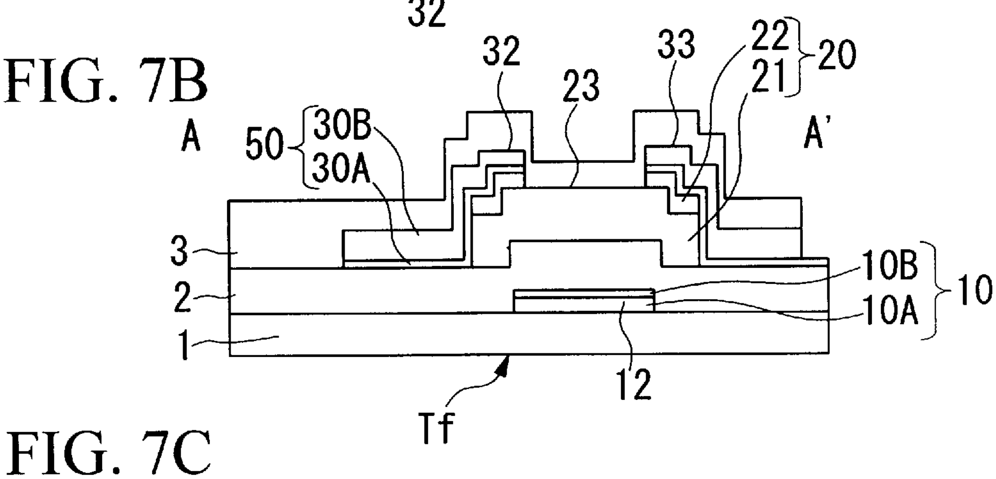
FIG. 7B is a cross sectional view through the plane A–A'.
Figure 7C:
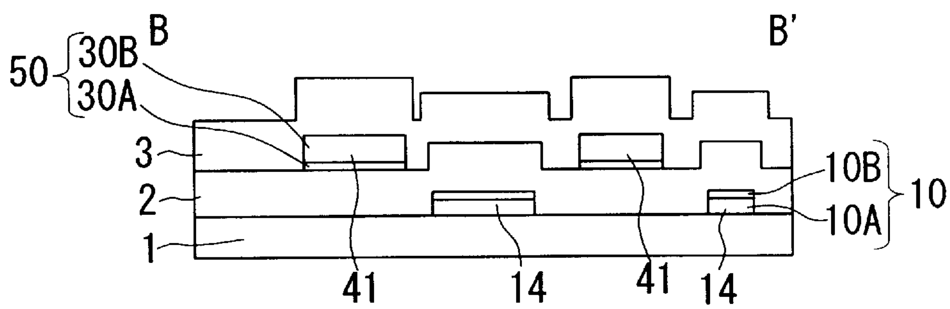
FIG. 7C is a cross sectional view through the plane B–B'.
Figure 8A:
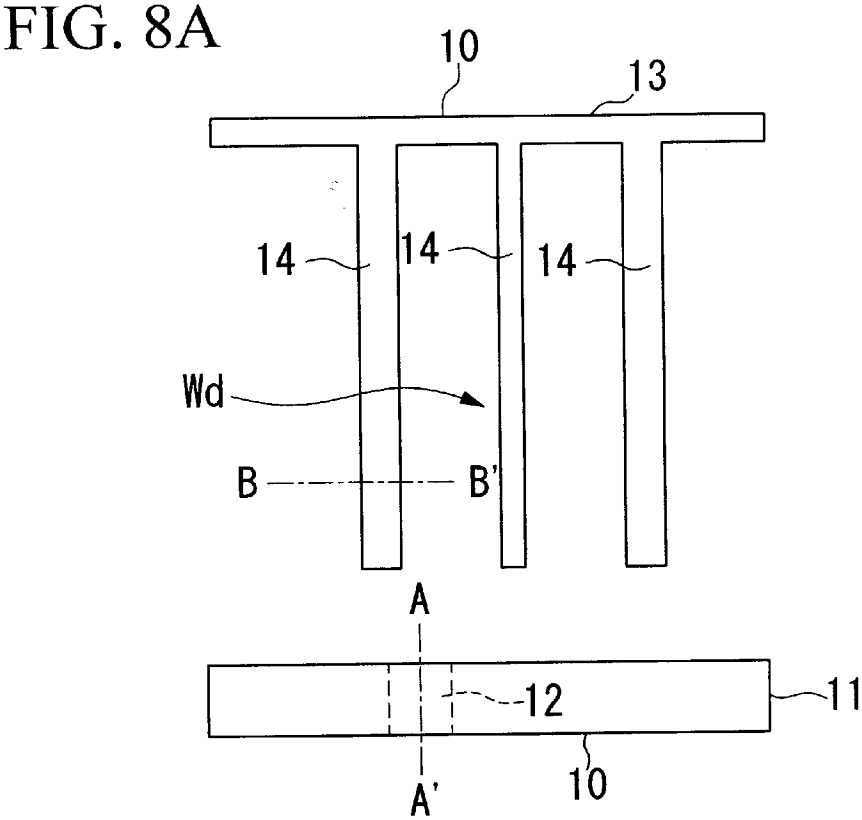
FIG. 8A is a perspective plan view of a one-pixel-region of the active matrix substrate plate in step 1 of the manufacturing method in Embodiment 2.
Figure 8B:
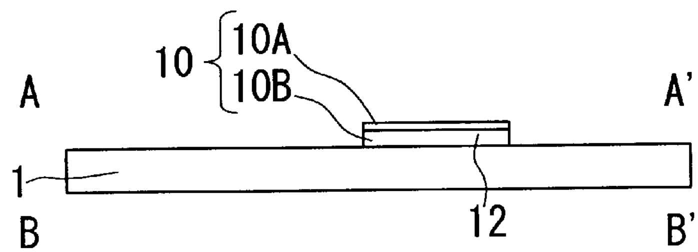
FIG. 8B is a cross sectional view through the plane A–A'.
Figure 8C:
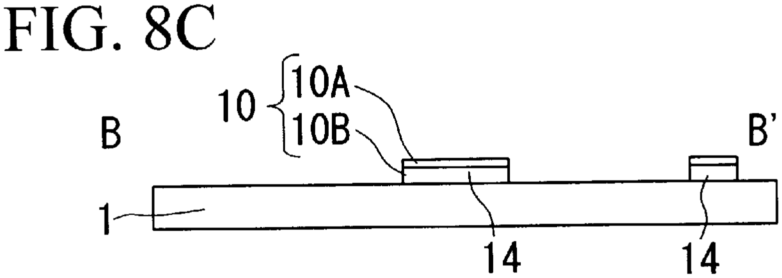
FIG. 8C is a cross sectional view through the plane B–B'.
Figure 9A:
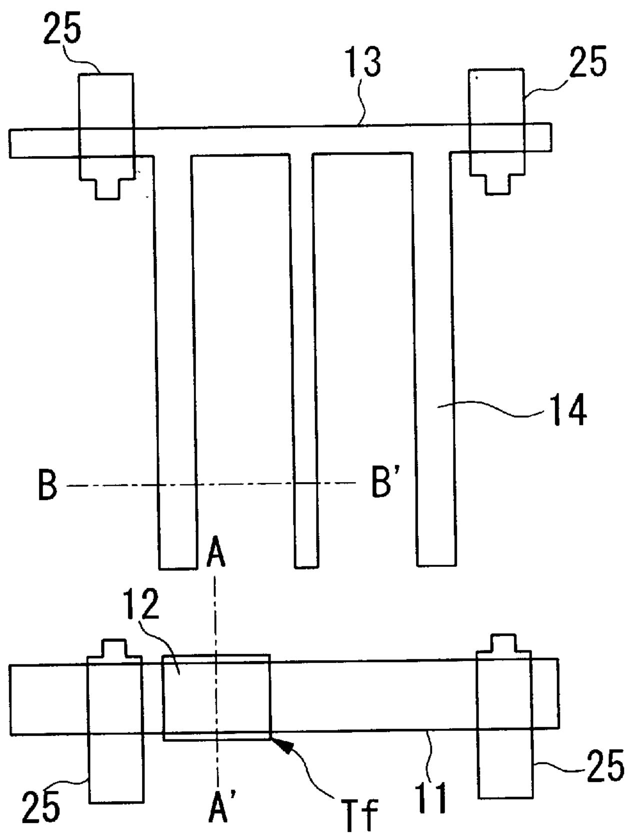
FIG. 9A is a perspective plan view of a one-pixel-region of the active matrix substrate plate in step 2 of the manufacturing method in Embodiment 2.
Figure 9B:
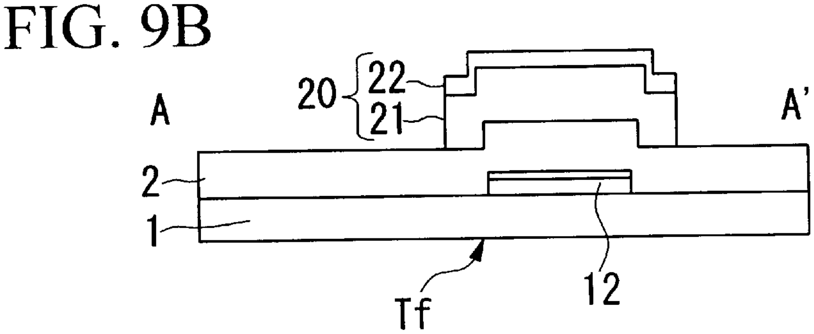
FIG. 9B is a cross sectional view through the plane A–A'.
Figure 9C:
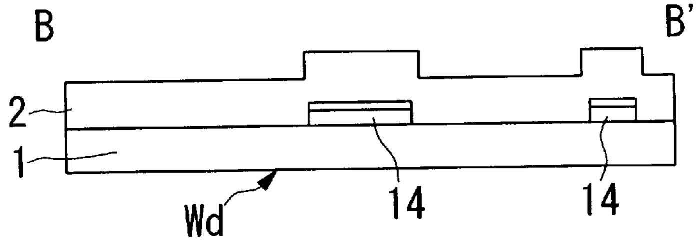
FIG. 9C is a cross sectional view through the plane B–B'.
Figure 10A:
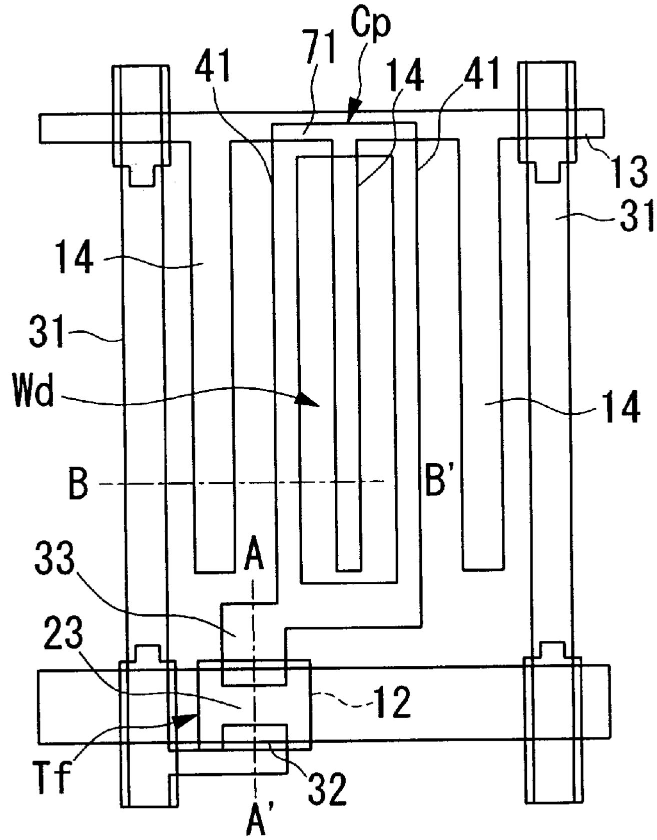
FIG. 10A is a perspective plan view of a one-pixel-region of the active matrix substrate plate in step 3 of the manufacturing method in Embodiment 2.
Figure 10B:
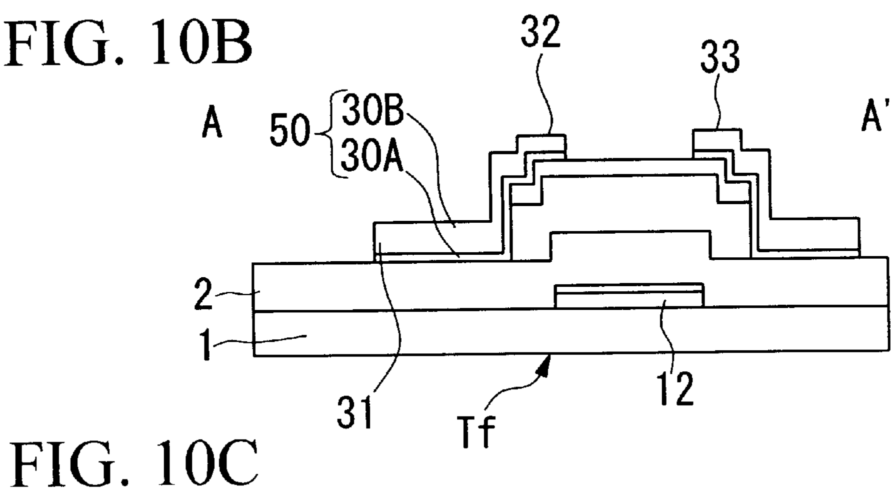
FIG. 10B is a cross sectional view through the plane A–A'.
Figure 10C:
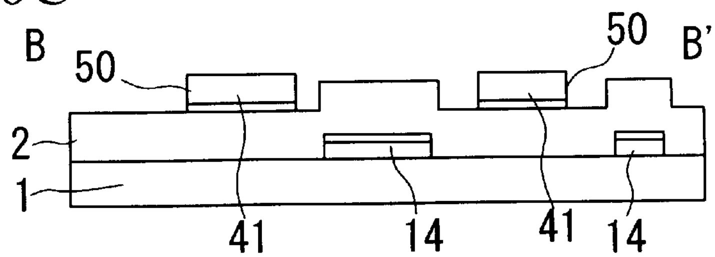
FIG. 10C is a cross sectional view through the plane B–B'.

FIG. 7A is a perspective plan view to show a one-pixel-region of the active matrix substrate plate in Embodiment 2, and FIG. 7B is a cross sectional view through the plane A–A', FIG. 7C is the same through the plane B–B'. FIGS. 8A–11B are diagrams to show the manufacturing steps of the active matrix substrate plate, and refer to steps 1–3, respectively, and a TFT after the channel has been formed therein. Similar to FIG. 7A, FIGS. 8A, 9A, and 10A are perspective plan views of a one-pixel-region, and FIGS. 8B, 8C, 9B, 9C, 10B, and 10C, and FIGS. 11A, 11B are cross sectional views through the planes A–A' and B–B', respectively. FIG. 12A is a cross sectional view of the terminal section of the active matrix substrate plate in the longitudinal direction, in which the left side relates to a cross sectional view at the scanning line terminal location GS, the center relates to a cross sectional view at the signal line terminal location DS, and the right side relates to the common wiring terminal location CS, and FIGS. 12B–12D show manufacturing steps 1–3 for the terminal section part.

The active matrix substrate plate in Embodiment 2 is formed such that, a plurality of scanning lines 11 and common wiring lines 13 comprised by a first conductor layer 10 are arranged alternatingly in parallel on a glass plate 1, a plurality of signal lines 31 are arranged at right angles to the scanning lines 11 across a gate insulation layer 2, and in the vicinity of TFT section Tf formed in the intersection of the scanning line 11 and the signal line 31, a portion of the scanning line 11 acts as gate electrode 12, and this gate electrode 12, an island-shaped amorphous silicon layer 21 and an $n^+$ amorphous silicon layer 22 comprise a semiconductor layer 20 opposing the gate electrode across the gate insulation layer 2, and above this semiconductor layer, a pair of drain electrode 32 and source electrode 33 comprised by a second conductor layer 50 and formed with a gap of channel gap 23 comprise an inverted staggered structure TFT, and in a window section Wd surrounded by the scanning line 11 and the signal line 31 are formed a comb teeth shaped pixel electrode 41 and a comb teeth shaped common electrode 14 opposing the pixel electrode and connecting to the common wiring line 13, and the drain electrode 32 is connected to the signal line 31, the source electrode 33 is connected to the pixel electrode 41, respectively, to form an IPS-type active matrix substrate plate producing a horizontal electrical field between the pixel electrode 41 and the common electrode 14 with respect to the glass plate 1.

Figure 52A:
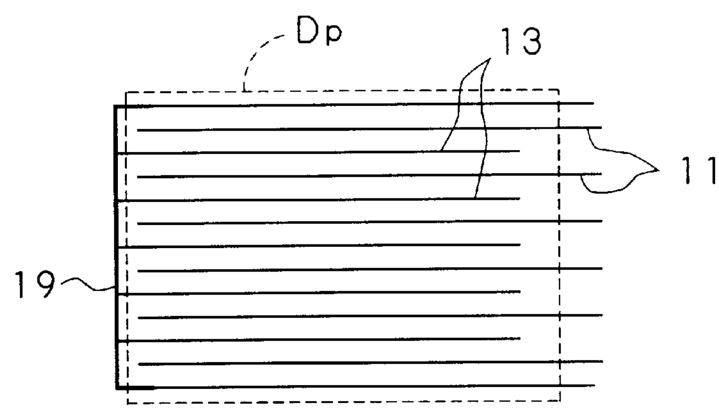
FIGS. 52A–52C are conceptual diagrams of the relative arrangement of the scanning lines and common wiring lines in the IPS type active matrix substrate plate.
Figure 52B:
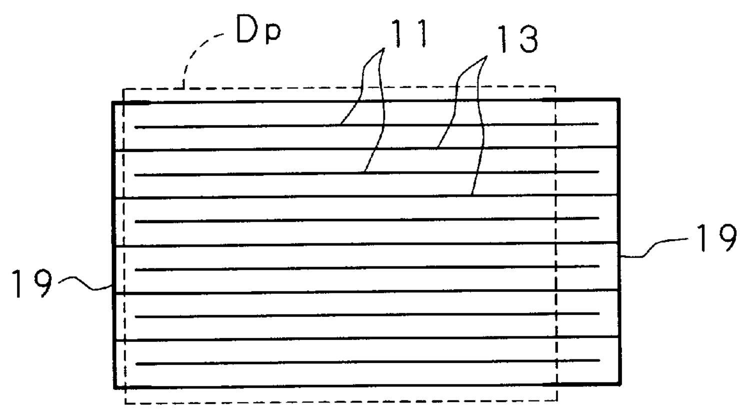
Figure 52C:
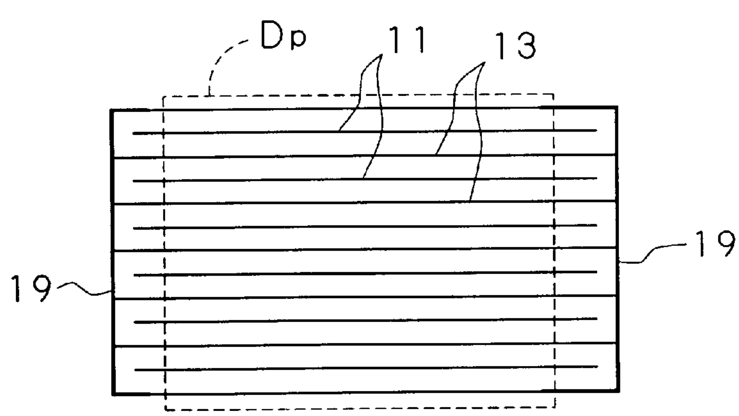

In this active matrix substrate plate, common wiring line 13 and common electrode 14 are formed on the same layer as the scanning line 11, and the common wiring line 13 is formed in such a way that, at least on one perimeter of the glass plate 1, the end section extends outside the end section of the same perimeter of the scanning line 11, and, as shown in FIGS. 52A, 52B, 52C, the end sections of the common wiring line 13 are linked together by a common wiring linking line 19, and are connected to the common wiring linking line 19 to form the common wiring terminal 16. For example, as shown in FIG. 52A, scanning line terminal is formed on one side of the opposing perimeters of the glass plate 1, and when inputting a signal from the scanning line driver to one side, at the outer peripheral section on the beyond the terminal section opposite to the scanning line 11, the common wiring lines 13 are linked to each other by the common wiring linking line 19, and are linked by either one or both of the common wiring linking lines 19 and the common wiring line 13 on the signal line terminal side to form the common wiring line terminal section 16. In this case, each scanning line 11 is connected to a gate-shunt bus line in the outer peripheral section Ss, which is outside the scanning line terminal 15. Also, as shown in FIG. 52B, the end sections of the common wiring line 13 extend outside of both end sections of the scanning lines 11 at both perimeter sections of the glass plate 1 clamping the display surface Dp, and both common wiring end sections may be linked by the common wiring linking line 19. The common wiring line terminal section 16 may be connected to either or both of the common wiring linking line 19. Further, as shown in FIG. 52C, when the scanning line 11 extends both sides to clamp the display surface Dp and the scanning line terminal is formed on each side and signals from the scanning line driver are input from both sides, the common wiring line 13 extends outside of both scanning line start end sections, and its end section is linked by the common wiring linking line 19, and the common wiring terminal 16 is connected to either one or both of the common wiring linking lines. In the case shown in FIGS. 52B, 52C, each of the scanning lines 11 is not connected to the gate-shunt bus line, and is formed independently.

The first conductor layer 10 forming the scanning line 11, gate electrode 12 and common wiring line 13 is produced by laminating a lower metallic layer 10A comprised of Al or an alloy primarily made of Al, and an upper metallic layer 10B comprised by a high melting point metal such as Ti, Ta, Nb, Cr or nitride film of their alloy. It is preferable that the nitrogen content of the upper metallic layer 10B be not lower than 25 atomic percent (a/o). Also, the second conductor layer 50 forming the signal line 31, drain electrode 32, source electrode 33 and pixel electrode 41 is formed by laminating, in each case, an upper metallic layer 30B comprised by Al or an alloy primarily made of Al on top of a lower metallic layer 30A comprised by Mo or Cr.

The pixel electrode 41 forms an accumulation capacitance electrode 71 by linking so that the tip section of the comb teeth shape to superimpose across the gate insulation layer 2 above the common wiring line 13 to oppose the accumulation common electrode 72 sharing a portion of the common wiring line 13 to construct the accumulation capacitance section Cp in this pixel region. Further, at the location where the scanning line 11, common wiring line 13 and the signal line 31 intersect, a reinforcing layer 25 comprised by the semiconductor layer 20 is formed between the gate insulation layer 2 and the signal line 31.

The active matrix substrate plate in Embodiment 2 is manufactured according to the following four steps.

(Step 1) as shown in FIGS. 8A–8C and FIG. 12B, the first conductor layer 10 is formed by continually sputtering on the glass plate 1 to form the lower metallic layer 10A comprised by Al of about 200 nm thickness and the upper metallic layer 10B comprised by a nitride film of Ti of about 100 nm thickness, and through photolithographic processes, excepting the scanning line 11, scanning line terminal section 11*a* formed in the scanning line terminal location GS, common wiring line 13, common wiring linking line (not shown) to bind the common wiring lines 13 in the outer peripheral section Ss, common wiring line terminal section 13*a* connected to the common wiring linking line and formed in the common wiring terminal location CS, and in the respective pixel regions, gate electrode 12 sharing a portion of the scanning line 11, and a plurality of common electrodes 14 extending from the common wiring line 13, the first conductor layer 10 is removed by etching. In this case, nitride film of Ti is formed by reactive sputtering, and by adjusting Ar gas and nitrogen gas flow rates, nitrogen content is adjusted so that it is not lower than 25 a/o.

(Step 2) as shown in FIGS. 9A–9C and FIG. 12C, on the above substrate plate, gate insulation layer 2 comprised by silicon nitride film of about 400 nm thickness is formed by continually applying plasma CVD, and a semiconductor layer 20 comprised by amorphous silicon layer 21 of about 250 nm thickness and $n^+$ amorphous silicon layer 22 of about 50 nm thickness is deposited, and through photolithographic processes, excepting the TFT section Tf and the reinforcing layer 25 within the respective pixel regions, the semiconductor layer 20 is removed by etching.

(Step 3) as shown in FIGS. 10A–10C and FIG. 12D, by continually sputtering on the above substrate plate to deposit the lower metallic layer 30A comprised by Mo of about 50 nm thickness and the upper metallic layer 30A comprised by Al of about 150 nm thickness to form the second conductor layer 50, and through photolithographic processes, excepting the signal line 31, signal line terminal section 31*a* formed in the signal line terminal location DS, drain electrode 32 extending from the signal line 31 above the gate electrode within the respective pixel regions, pixel electrode 41 extending to the window section Wd opposite to the common electrode 14 across the gate insulation layer 2, and source electrode 33 extending from the pixel electrode towards TFT section Tf and separated from the drain electrode 32 by the opposing channel gap 23, the second conductor layer 50 is removed by etching. In this case, a portion of the pixel electrode 41 is extended so as to superimpose on a portion of the common wiring line 13 at the accumulation capacitance section Cp to form the accumulation capacitance electrode 71.

Figure 11A:
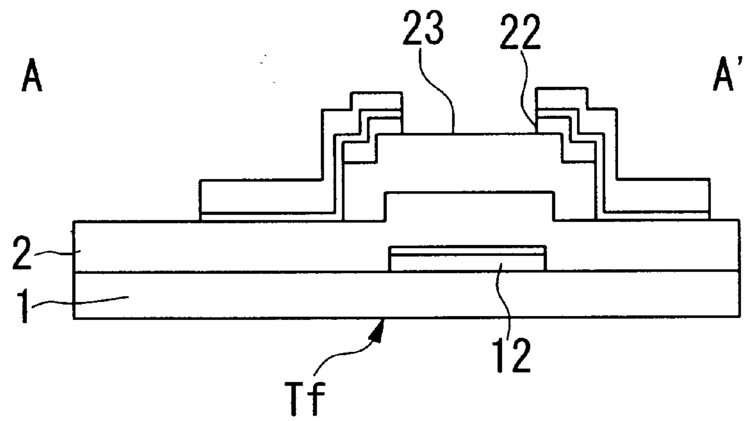
FIGS. 11A–11B are cross sectional views of a channel-formed TFT in active matrix substrate plate manufacturing in Embodiment 2.
Figure 11B:
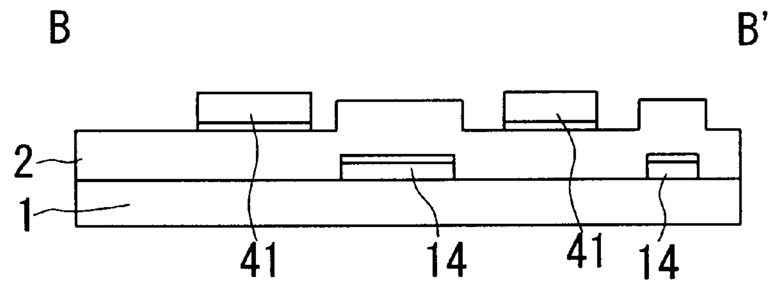
Figures 12A, 12B, 12C, 12D:
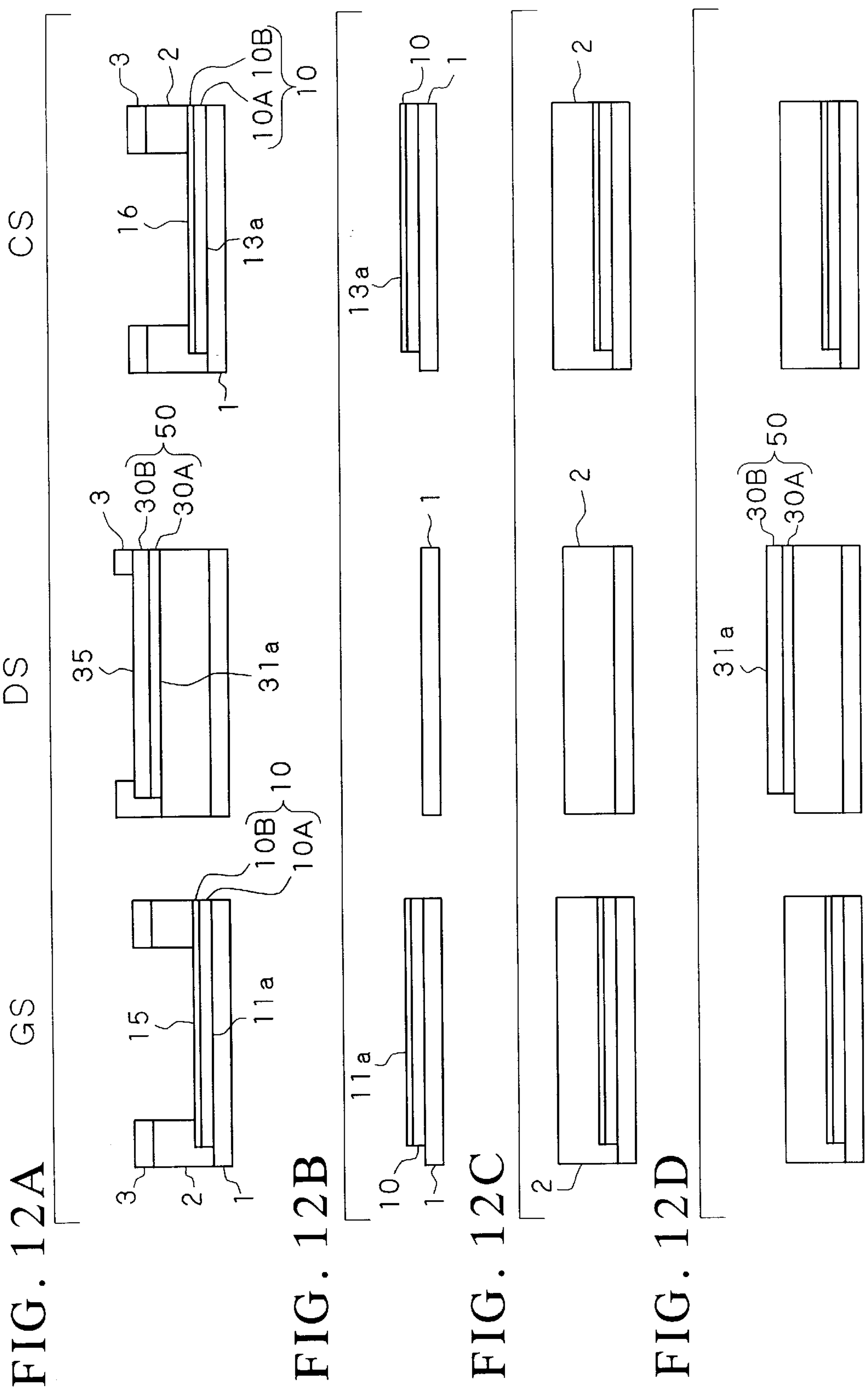
FIG. 12A is a cross sectional view in the longitudinal direction of a terminal section of the active matrix substrate plate in Embodiment 2, and the left side relates to the scanning line terminal section and the center relates to the signal line terminal section and the right side relates to the common wiring line terminal section.
FIGS. 12B–12D are cross sectional views relating to manufacturing step 1–step 3, respectively.

Next, as shown in FIGS. 11A, 11B, using the second conductor layer 50 after removing its masking pattern or the masking used in the etching process, as masking, the exposed $n^+$ amorphous silicon layer 22 is removed by etching to form the channel gap 23.

(Step 4) as shown in FIGS. 7A–7C and FIG. 12A, on the above substrate plate the protective insulation layer 3 of about 300 nm thickness comprised by silicon nitride film is deposited using plasma CVD process, and the protective insulation layer 3 above the signal line terminal section 31*a*, protective insulation layer 3 and gate insulation layer 2 above the scanning line terminal section 11*a* and the common wiring line terminal section 13*a* are removed by etching to expose the signal line terminal section 35 comprised by the second conductor layer 50 and the scanning line terminal 15 and the common wiring terminal 16 comprised by the first conductor layer 10. Lastly, the active matrix substrate plate is completed by performing annealing at about 280° C.

In this case, a lamentation of Al and nitride film of Ti is used for the first conductor layer, and a lamination of Mo and Al is used for the second conductor layer, but the first conductor layer may be a three layer structure which can be formed by laying an underlayer of a high melting point metal such as Ti below the Al layer to form Ti, Al and Ti nitride film layers. Also, it may be an alloy film of primarily Al that can suppress hillock of Al—Nd alloy to secure reliability of connection of the terminal section or a film that overlays ITO on Cr. Also, the second conductor layer may be a laminated film of Mo and Al and a nitride film layer of Ti or a film that overlays ITO on top of Cr.

Also, in the above embodiment, the common wiring terminal and the scanning line terminal have the same structure, but it may utilize the silver bead method to be described later to make the same structure as the signal line terminal.

Productivity and the yield of the IPS-type active matrix substrate plate in Embodiment 2 are improved because it can be manufactured in four steps.

Also, in this active matrix substrate plate, at least in one perimeter section of the glass plate 1, end section of the common wiring is linked to each other by the common wiring linking line, thereby enabling to lead out the common wiring terminal, and IPS-type active matrix substrate plate can be produced independently.

Also, in this active matrix substrate plate, the difference in the height of the common electrode and pixel electrode section is made small, so that orientation control in the paneling step is facilitated.

Also, in this active matrix substrate plate, because the signal line is comprised by laminating the lower metallic layer comprised by Al on top of the lower metallic layer comprised by Mo, it is possible to lower the wiring resistance of the signal line to secure reliability of connection of the signal line driver at the signal line terminal section.

Also, in this active matrix substrate plate, because the scanning line is comprised by Al and a nitride film of a high melting point metals such as Ti, it is possible to lower wiring resistance of the scanning line and to secure reliability of connection of the scanning line driver at the scanning line terminal section as in Embodiment 1.

Also, this active matrix substrate plate has a reinforcing layer at the intersection of scanning line, signal line and common wiring so that the dielectric strength of the insulation between scanning line and common wiring and signal line is improved.

Embodiment 3

Figure 13A:
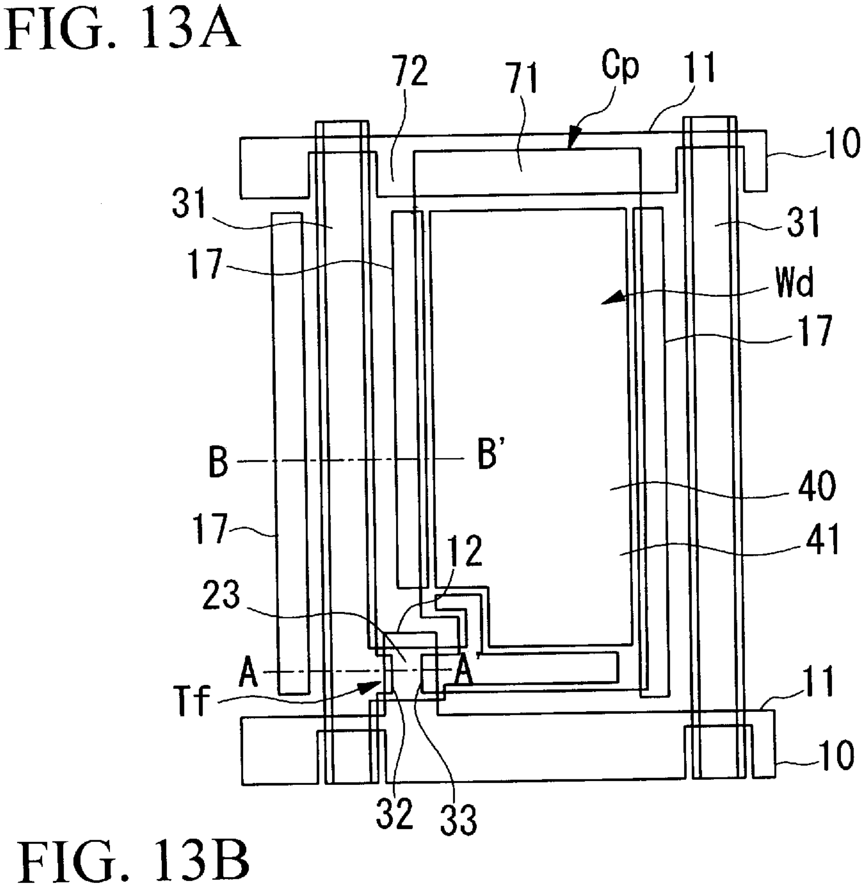
FIG. 13A is a perspective plan view of a one-pixel-region of the active matrix substrate plate in Embodiment 3.
Figure 13B:
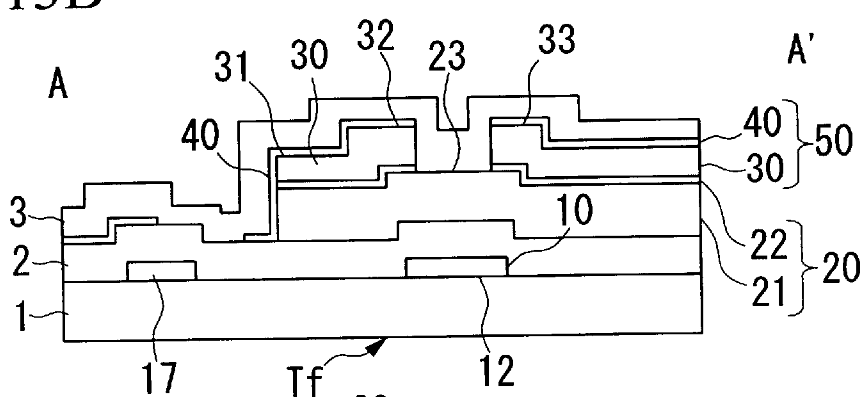
FIG. 13B is a cross sectional view through the plane A–A'.
Figure 13C:
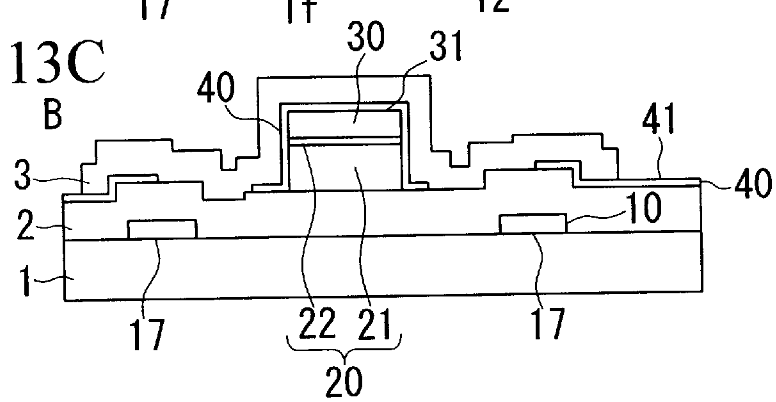
FIG. 13C is a cross sectional view through the plane B–B'.
Figure 14A:
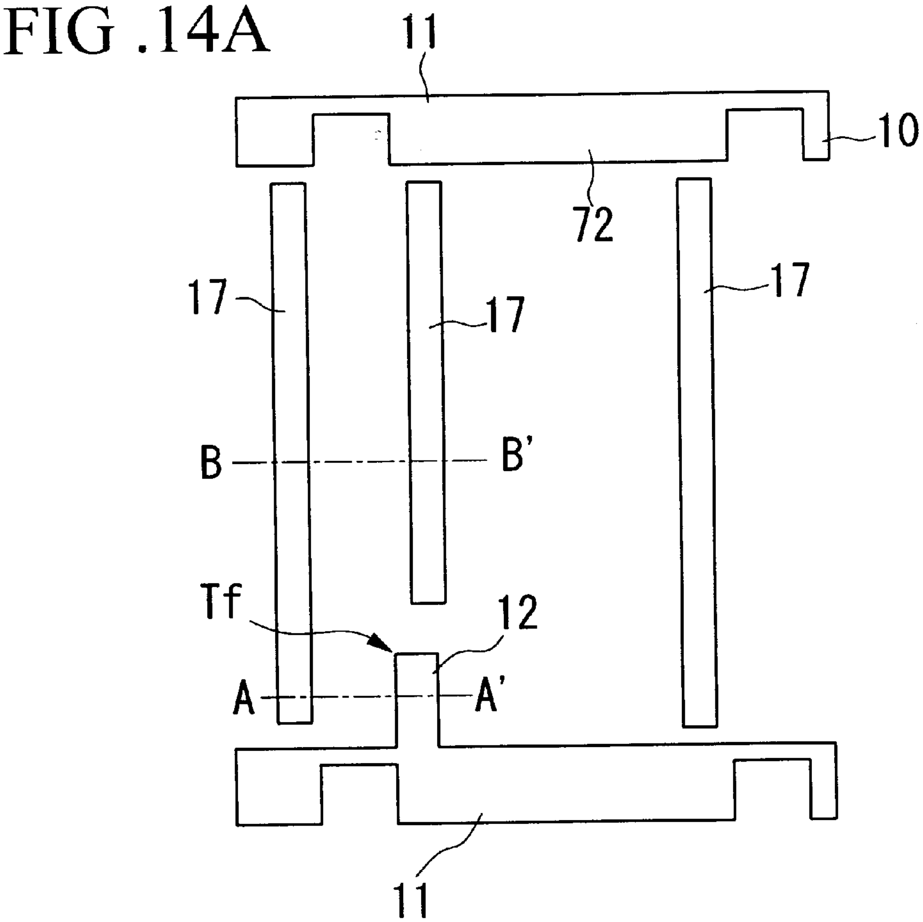
FIG. 14A is a perspective plan view of a one-pixel-region of the active matrix substrate plate in step 1 of the manufacturing method in Embodiment 3.
Figure 14B:
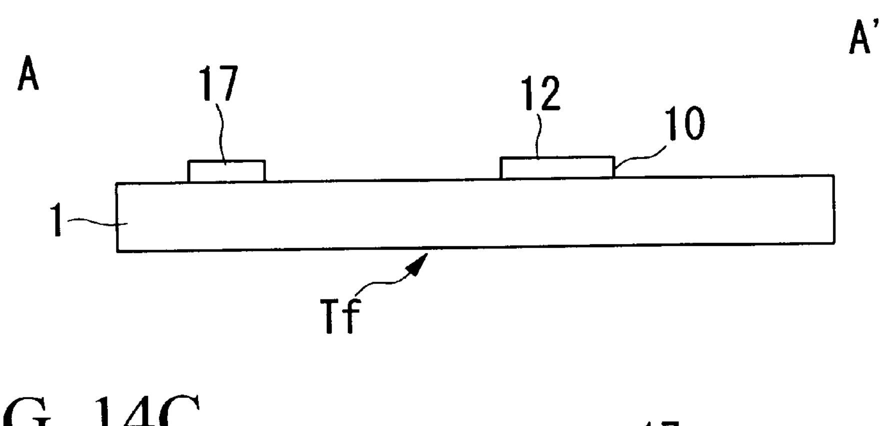
FIG. 14B is a cross sectional view through the plane A–A'.
Figure 14C:
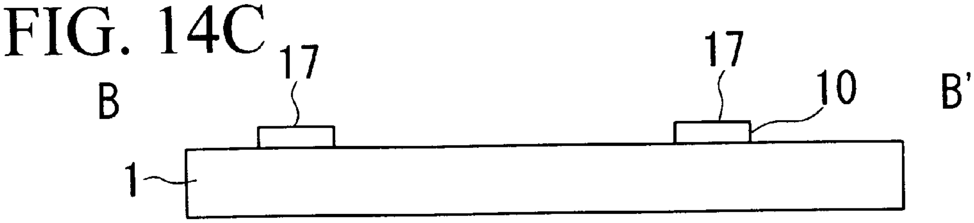
FIG. 14C is a cross sectional view through the plane B–B'.
Figure 15A:
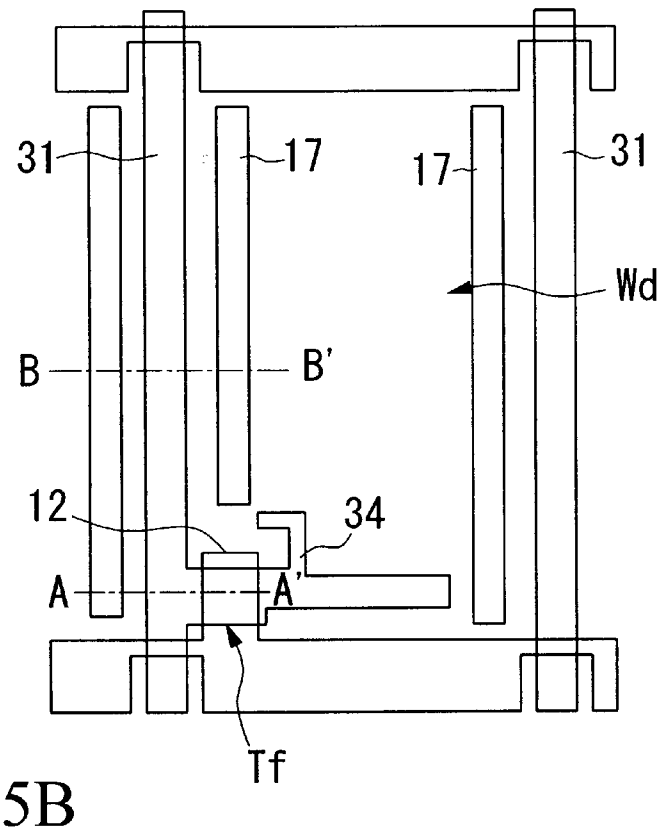
FIG. 15A is a perspective plan view of a one-pixel-region of the active matrix substrate plate in step 2 of the manufacturing method in Embodiment 3.
Figure 15B:
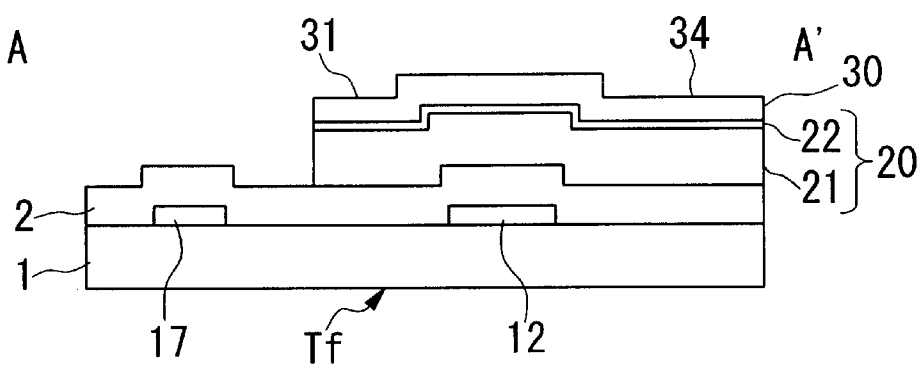
FIG. 15B is a cross sectional view through the plane A–A'.
Figure 15C:
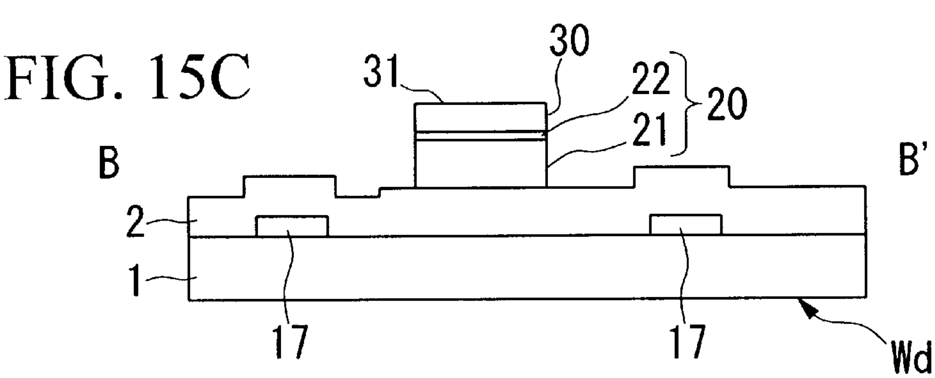
FIG. 15C is a cross sectional view through the plane B–B'.
Figure 16A:
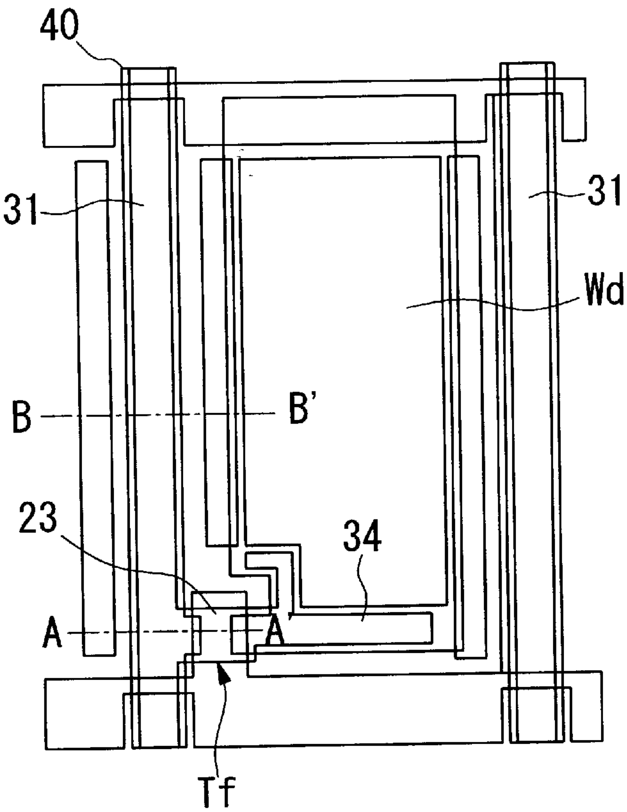
FIG. 16A is a perspective plan view of a one-pixel-region of the active matrix substrate plate in step 3 of the manufacturing method in Embodiment 3.
Figure 16B:
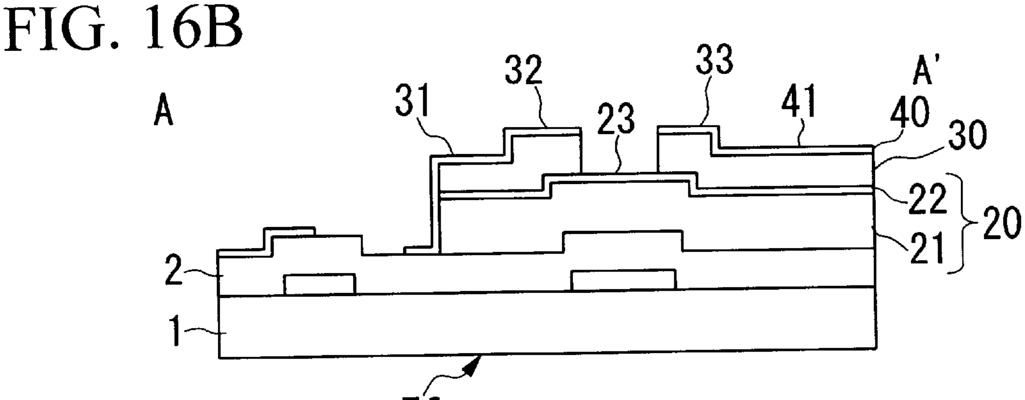
FIG. 16B is a cross sectional view through the plane A–A'.
Figure 16C:
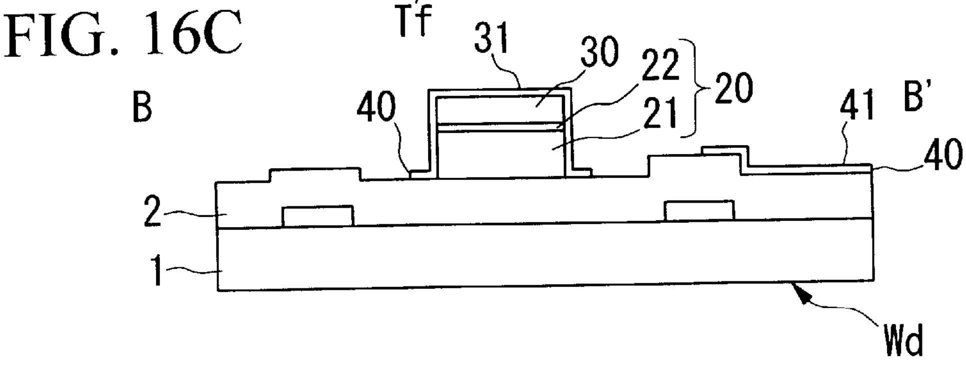
FIG. 16C is a cross sectional view through the plane B–B'.

FIG. 13A is a perspective plan view to show a one-pixel-region of the active matrix substrate plate in Embodiment 3, and FIG. 13B is a cross sectional view through the plane A–A', FIG. 13C is the same through the plane B–B'. FIGS. 14A–17B are diagrams to show the manufacturing steps of the active matrix substrate plate, and refer to steps 1–3, respectively, and a TFT after the channel has been formed therein. Similar to FIG. 13A, FIGS. 14A, 15A, and 16A are perspective plan views of a one-pixel-region, and FIGS. 14B, 14C, 15B, 15C, 16B, 16C, and FIGS. 17A, 17B are cross sectional views through the planes A–A' and B–B', respectively. Also, FIG. 18A is a cross sectional view of the terminal section of the active matrix substrate plate in the longitudinal direction, in which the left side relates to a cross sectional view at the scanning line terminal location GS and the right side relates to a cross sectional view at the signal line terminal location DS, and FIGS. 18B–18D show manufacturing steps 1–3 for the terminal section part.

The active matrix substrate plate in Embodiment 3 is formed on a glass plate 1, such that a plurality of scanning lines 11 comprised by a first conductor layer 10 and a plurality of signal lines 31 comprised by a second conductor layer 50 are arranged at right angles across a gate insulation layer 2, and in the vicinity of TFT section Tf formed in the intersection of the scanning line 11 and the signal line 31, a gate electrode 12 extending from the scanning line 11, a semiconductor layer 20 comprised by the island-shaped amorphous silicon layer 21 and an $n^+$ amorphous silicon layer 22 opposing the gate electrode across the gate insulation layer 2, and a pair of drain electrode 32 and source electrode 33 comprised by a second conductor layer 50 above the semiconductor layer and spaced with a gap of channel gap 23 comprise an inverted staggered structure TFT, and a pixel electrode 41 comprised by a transparent conductive layer 40 is formed in a window section Wd, for transmitting light, which is surrounded by the scanning line 11 and the signal line 31, and the drain electrode 32 is connected to the signal line 31, the source electrode 33 is connected to the pixel electrode 41 to form a TN-type active matrix substrate plate.

In this active matrix substrate plate, the first conductor layer 10 forming the scanning line 11 and the gate electrode 12 is comprised of an alloy of primarily of Al containing Nd, for example. Also, the second conductor layer 50 forming the signal line 31, drain electrode 32, and source electrode 33 is formed by laminating, in each case, the transparent conductive layer 40 comprised by ITO on top of a metallic layer 30 comprised by Cr, and the semiconductor layer 20 of the same shape as the signal line is formed below the signal line 31, and the semiconductor layer 20 and the metallic layer 30 of the signal line are covered by the transparent conductive layer 40. The transparent conductive layer 40 which constitutes the upper layer of the source electrode 33 extends above the gate insulation layer 2 of the window section Wd to form the pixel electrode 41.

The pixel electrode 41 forms an accumulation capacitance electrode 71 by extending so as to superimpose above the accumulation common electrode 72 formed inside the forestage scanning lines 11 across the gate insulation layer 2 to construct the accumulation capacitance section Cp in this pixel region. Also, in this pixel region, a light blocking layer 17 comprised by the first conductor layer 10 is formed so as to superimpose across the gate insulation layer 2 a portion on one perimeter section of the pixel electrode 41.

The active matrix substrate plate in Embodiment 3 is manufactured according to the following four steps.

(Step 1) as shown in FIGS. 14A–14C and FIG. 18B, by continual sputtering on the glass plate 1, an alloy of Al—Nd of about 250 nm thickness is deposited to form the first conductor layer 10, and through photolithographic processes, excepting the scanning line 11, scanning line terminal section 11*a* formed in the scanning line terminal location GS, and, within the respective pixel regions, the gate electrode 12 extending from the scanning line 11 to the TFT section Tf, accumulation common electrode 72 formed within the forestage scanning line 11 and the light blocking layer 17, the first conductor layer 10 is removed by etching.

(Step 2) as shown in FIGS. 15A–15C and FIG. 18C, on the above substrate plate, gate insulation layer 2 comprised by silicon nitride film of about 400 nm thickness is deposited by continually applying plasma CVD, and a semiconductor layer 20 comprised by amorphous silicon layer 21 of about 250 nm thickness and $n^+$ amorphous silicon layer 22 of about 50 nm thickness is deposited, and continuing with the sputtering processes, a metallic layer 30 comprised by Cr of about 200 nm thickness is deposited, and through photolithographic processes, excepting the signal line 31, signal line terminal section 31*a* formed in the signal line terminal location DS, common wiring line and common wiring line terminal section (not shown), and a protrusion section 34 extending from the signal line 31 towards the window section Wd through the TFT section Tf within the respective pixel regions, the metallic layer 30 and the semiconductor layer 20 are successively removed by etching. In this case, on the lateral surface of the signal line 31, below the metallic layer 30, the semiconductor layer 20 comprised by the amorphous silicon layer 21 and the $n^+$ amorphous silicon layer 22 is exposed so as to match the lateral surfaces. Similarly, the metallic layer 30 and the semiconductor layer 20 are laminated on the signal line terminal section 31*a* and the common wiring terminal section.

(Step 3) as shown in FIGS. 16A–16C and FIG. 18D, on the above substrate plate is sputtered a film of ITO of about 50 nm thickness to form the transparent conductive layer 40, and through photolithographic processes, excepting the signal line 31 and the portions covering the lateral surfaces, signal line terminal section 31*a*, common wiring line and common wiring line terminal section (not shown), within the respective pixel regions, drain electrode 32 extending from the signal line 31 towards the TFT section Tf, source electrode 33 separated from the drain electrode 32 by the opposing channel gap 23, and the pixel electrode 41, the transparent conductive layer 40 is removed by etching, followed by removing the exposed metallic layer 30 by etching. In this case, the perimeter of the pixel electrode 41 is extended so as to superimpose on the accumulation common electrode 72 in the accumulation capacitance section Cp to form the accumulation capacitance electrode 71, and both perimeter sections of the pixel electrode adjacent to this perimeter section are formed so that at least a portion will superimpose on the light blocking layer 17.

Figure 17A:
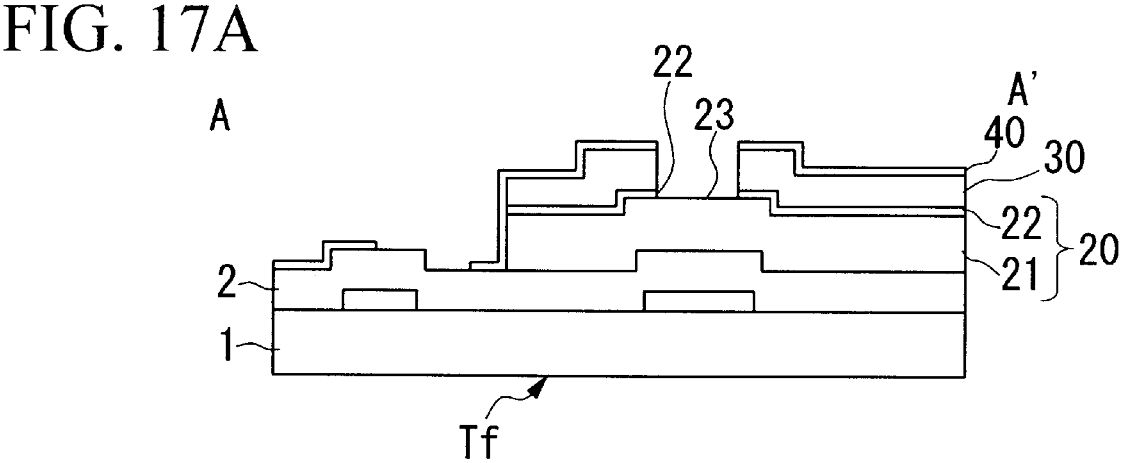
FIGS. 17A–17B are cross sectional views of a channel-formed TFT in active matrix substrate plate manufacturing in Embodiment 3.
Figure 17B:
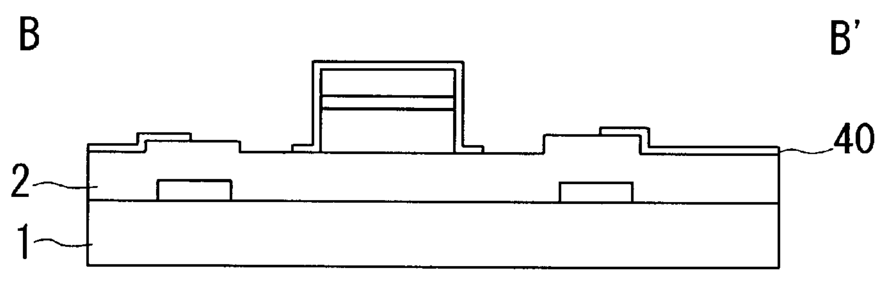
Figures 18A, 18B, 18C, 18D:
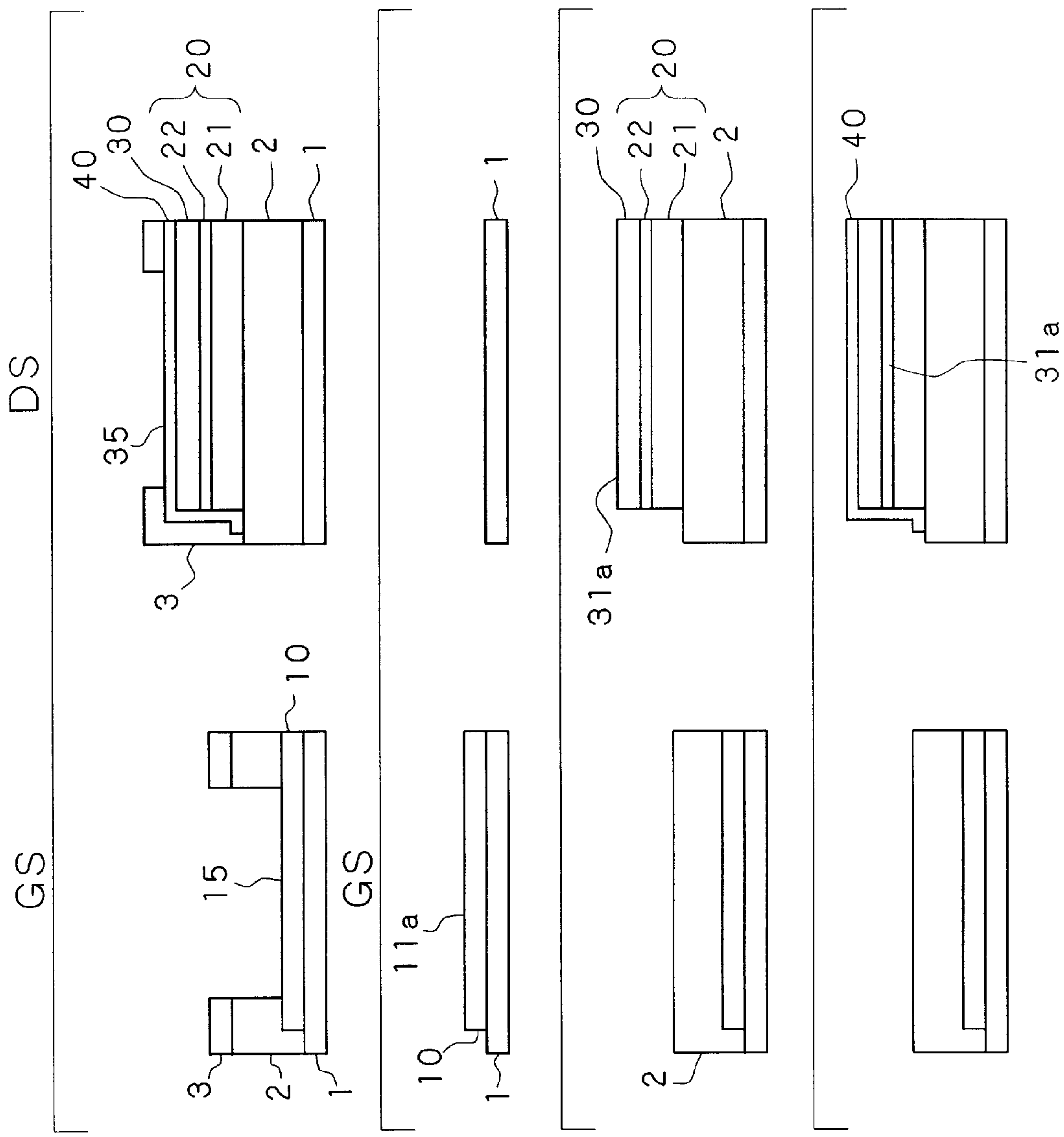
FIG. 18A is a cross sectional view in the longitudinal direction of a terminal section of the active matrix substrate plate in Embodiment 3, and the left side relates to the scanning line terminal section and the right side relates to the signal line terminal section.
FIGS. 18B–18D are cross sectional views relating to manufacturing step 1–step 3, respectively.

Next, as shown in FIGS. 17A, 17B, using the transparent conductive layer 40 after removing its masking pattern or the masking used in the etching process, as masking, the exposed $n^+$ amorphous silicon layer 22 is removed by etching to form the channel gap 23.

(Step 4) as shown in FIGS. 13A–13C and FIG. 18A, on the above substrate plate the protective insulation layer 3 of about 150 nm thickness comprised by silicon nitride film is deposited using plasma CVD process, and through photolithographic processes, the protective insulation layer 3 above pixel electrode 41, the signal line terminal section 31*a*, and the common wiring line terminal section (not shown), the protective insulation layer 3 and the gate insulation layer 2 above the scanning line terminal 11*a* are removed by etching to expose the pixel electrode 41 comprised by the transparent conductive layer 40, the signal line terminal 35 and the common wiring terminal (not shown) comprised by a lamination of the metallic layer 30 and the transparent conductive layer 40, and the scanning line terminal 15 comprised by the first conductor layer 10. Lastly, the active matrix substrate plate is completed by performing annealing at about 280° C.

In this case, the embodiment related to the use of Al—Nd alloy for the first conductor layer, but as in Embodiment 1, it is permissible to use a lamination of a nitride film of Al and a high melting point metal such as and Ti, or a three layer structure which can be formed by laying an underlayer of a high melting point metal such as Ti below the Al layer to form Ti, Al and Ti nitride film layers. Also, it may be an overlay of ITO on Cr. It is preferable that the nitride film of the high melting point metal such as Ti contains a nitrogen concentration not lower than 25 a/o.

In the embodiment, signal line terminal and common wiring terminal are made of a lamination of a metallic layer and a transparent conductive layer, but similar to the pixel electrode, it may be constructed of a transparent conductive layer only. In this case, the metallic layer for the signal line may use a metal having a poor corrosion resistance such as Mo.

Also, in the present embodiment, the vertical-type TFT is used in which the gate electrode extends from the scanning line to the pixel section, but the lateral-type TFT may be used, in which the gate electrode shares a portion of the scanning line.

Productivity and the yield of the TN-type active matrix substrate plate in Embodiment 3 are improved because it can be manufactured in four steps.

Also, in this active matrix substrate plate, because the lateral surface of the semiconductor layer below the signal line is covered by the transparent conductive layer, when etching the $n^+$ amorphous silicon layer forming the channel of the TFT, the amorphous silicon layer of the semiconductor layer can be prevented from being infiltrated in the lateral direction to prevent difficulty of orientation control due to degradation in the protective condition of the protective insulation layer. Also, because the lateral surface of the metallic layer of the signal line is covered over by the transparent conductive layer so that because the photo-resist coating is covering the metallic layer and the semiconductor layer, when etching the transparent conductive layer, even if debris and foreign particles reside on the metallic layer, etching solution does not infiltrate into the interface between the transparent conductive layer and the metallic layer, thereby preventing severing of signal lines.

Also, because the signal line in this active matrix substrate plate is comprised by laminating the metallic layer and the transparent conductive layer, wiring resistance of the signal line can be reduced and the yield drop due to line severance and the like can be suppressed, and because the source electrode and the pixel electrode are formed integrally by the transparent conductive layer, it is possible to suppress an increase in electrical contact resistance resulting in improved properties.

Also, in this active matrix substrate plate, because the scanning lines are formed by Al—Nd alloy, it enables to reduce wiring resistance of the scanning lines and secure reliability of connections with the scanning line driver at the scanning line terminal section.

Also, because this active matrix substrate plate has the semiconductor layer formed below the signal line, the dielectric strength of the insulation between scanning line and signal line is improved. Also, because it is constructed so that the pixel electrode at least partially superimposes on the light blocking layer, it is possible to reduce the black matrix of the color filter substrate plate that needs to have a large superpositioning margin, thereby enabling to improve the aperture factor.

Embodiment 4

Figure 19A:
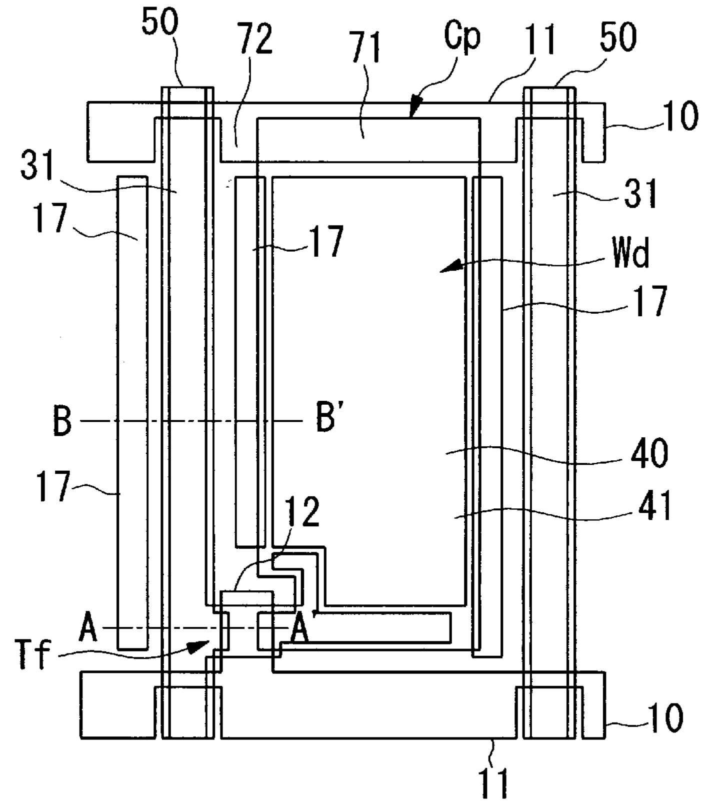
FIG. 19A is a perspective plan view of a one-pixel-region of the active matrix substrate plate in Embodiment 4.
Figure 19B:
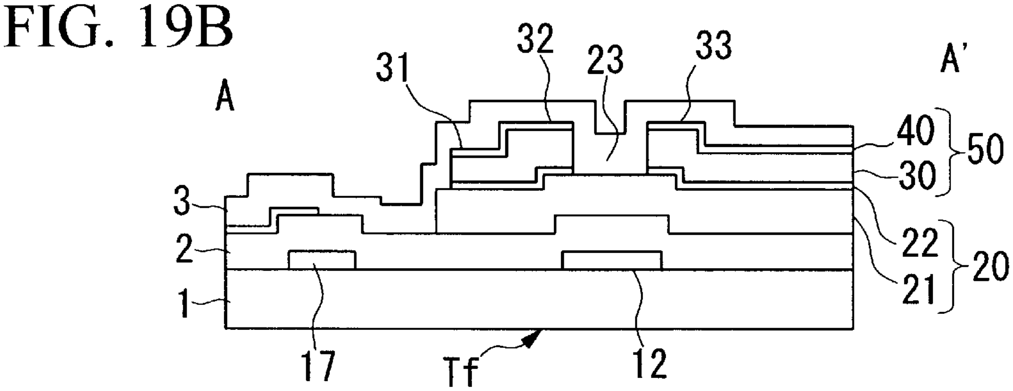
FIG. 19B is a cross sectional view through the plane A–A'.
Figure 19C:
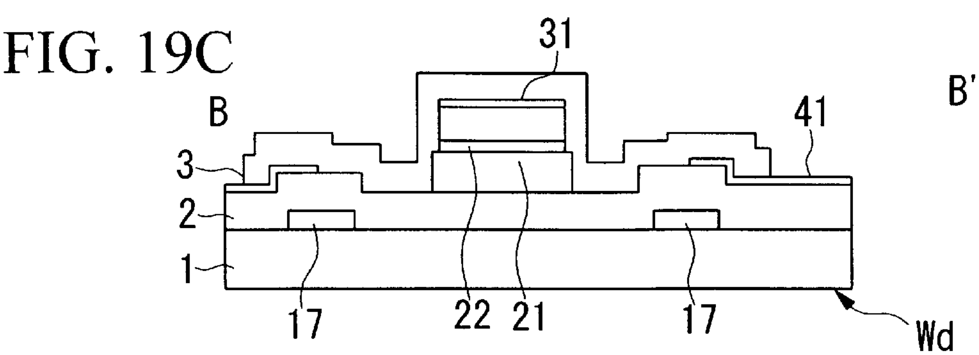
FIG. 19C is a cross sectional view through the plane B–B'.
Figure 20A:
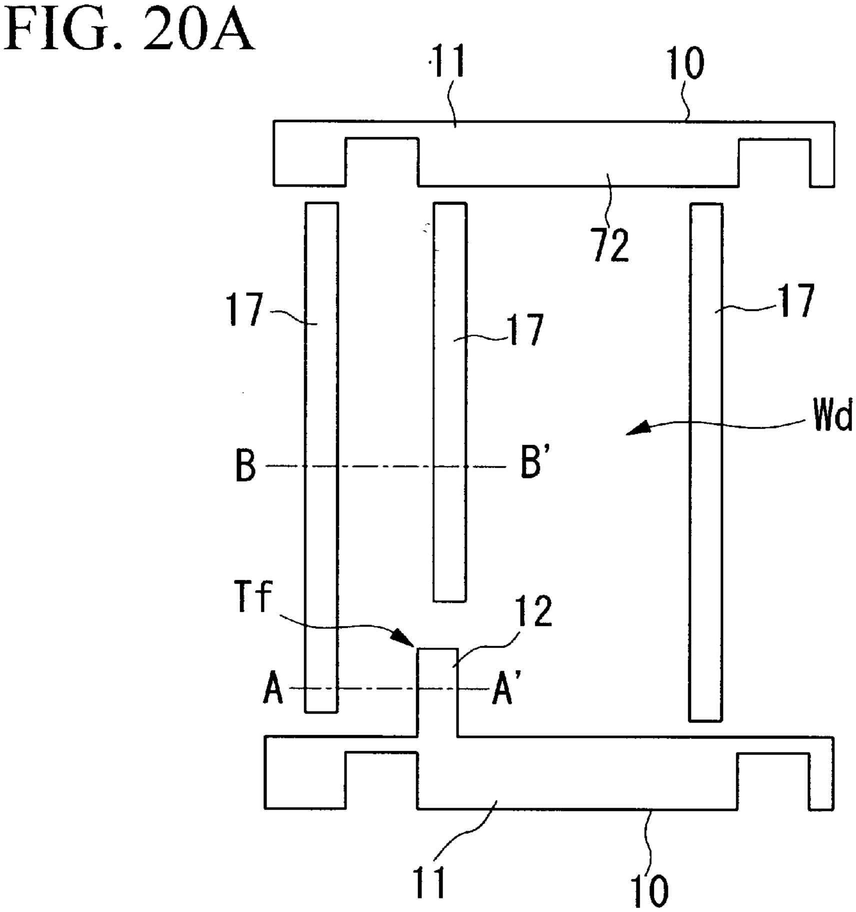
FIG. 20A is a perspective plan view of a one-pixel-region of the active matrix substrate plate in step 1 of the manufacturing method in Embodiment 4.
Figure 20B:
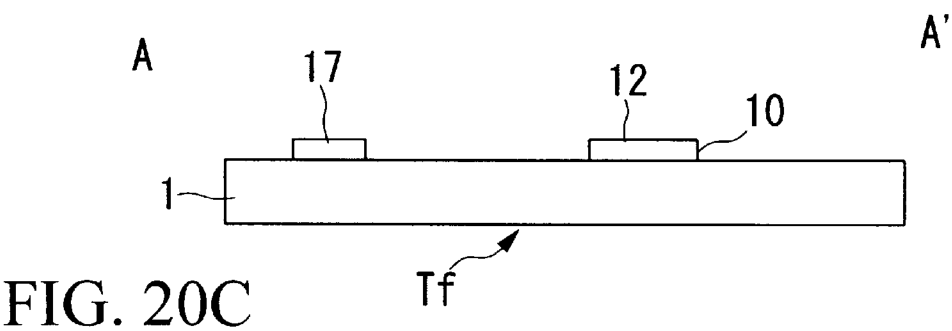
FIG. 20B is a cross sectional view through the plane A–A'.
Figure 20C:
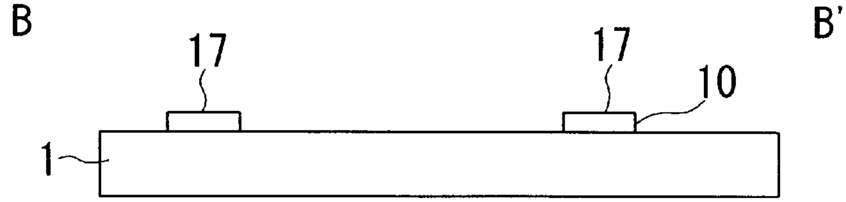
FIG. 20C is a cross sectional view through the plane B–B'.
Figure 21A:
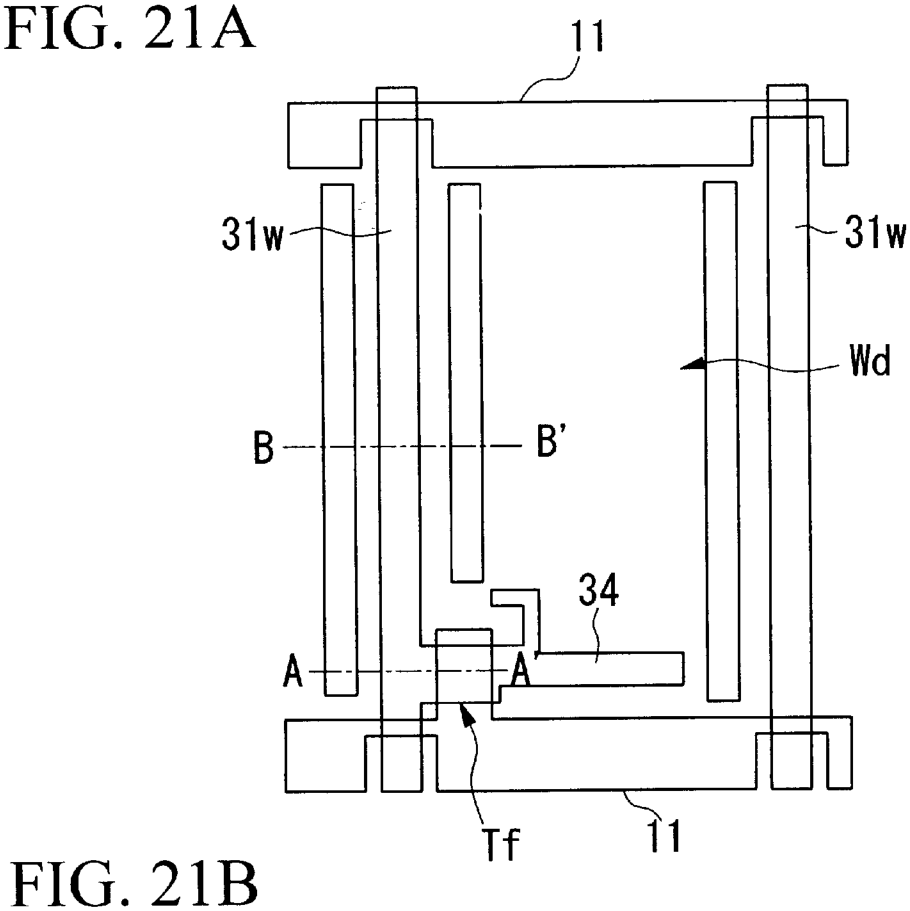
FIG. 21A is a perspective plan view of a one-pixel-region of the active matrix substrate plate in step 2 of the manufacturing method in Embodiment 4.
Figure 21B:
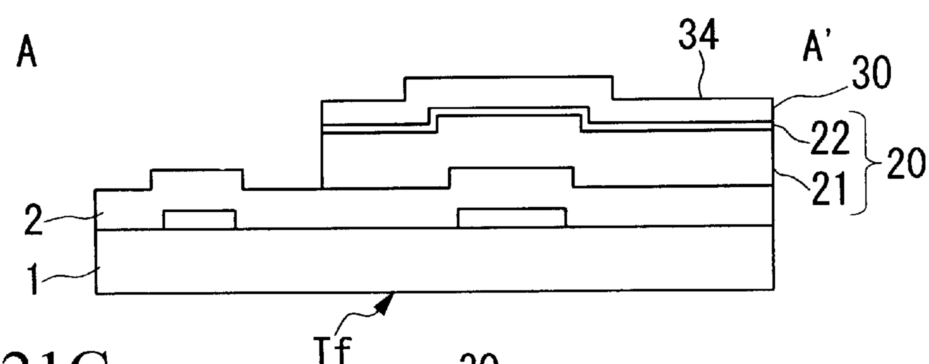
FIG. 21B is a cross sectional view through the plane A–A'.
Figure 21C:
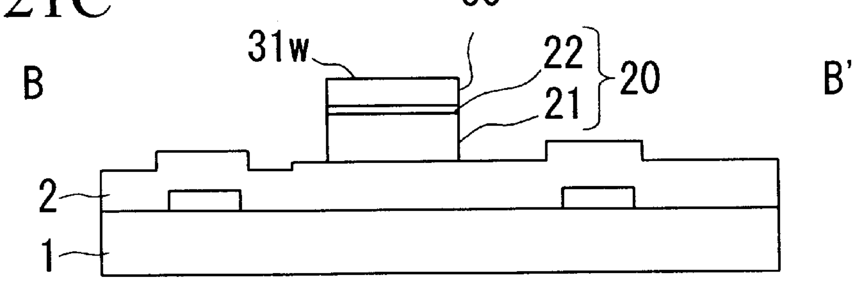
FIG. 21C is a cross sectional view through the plane B–B'.
Figure 22A:
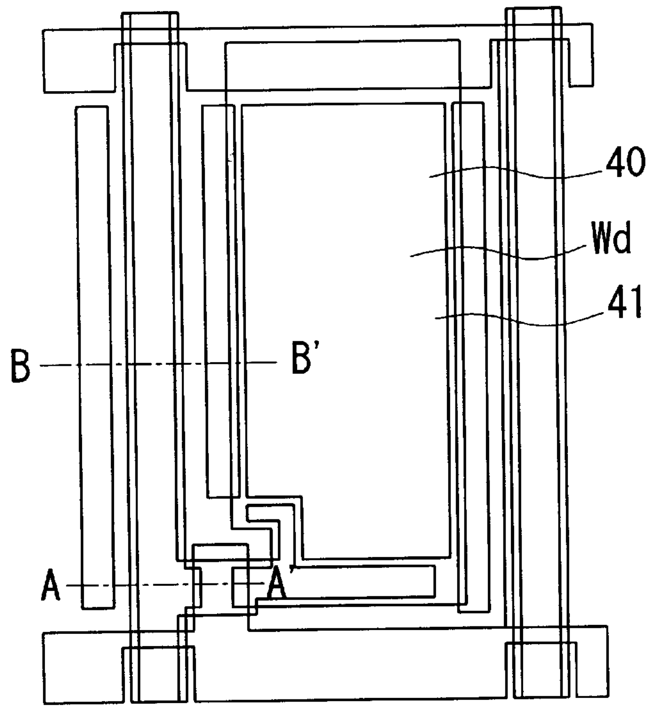
FIG. 22A is a perspective plan view of a one-pixel-region of the active matrix substrate plate in step 3 of the manufacturing method in Embodiment 4.
Figure 22B:
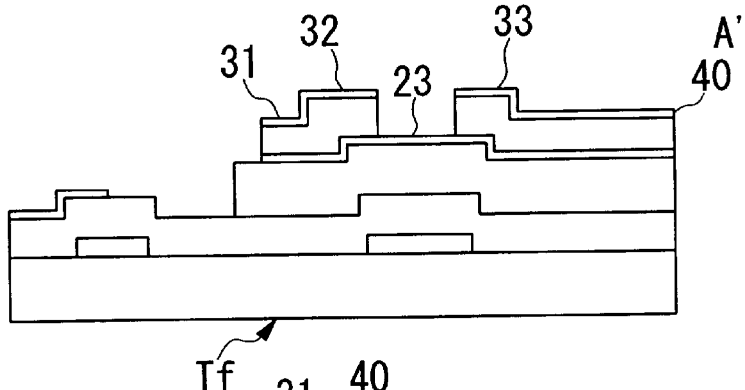
FIG. 22B is a cross sectional view through the plane A–A'.
Figure 22C:
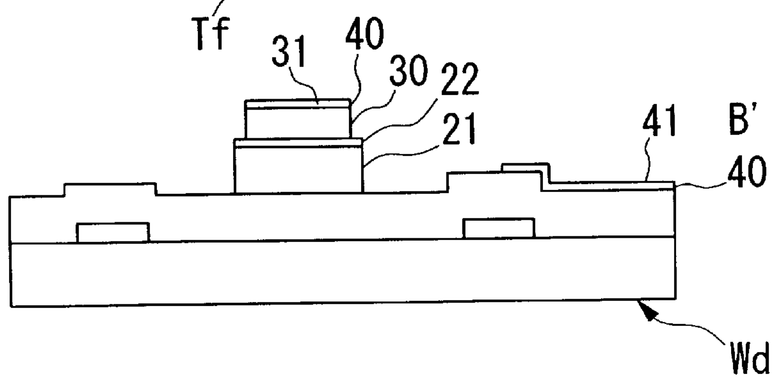
FIG. 22C is a cross sectional view through the plane B–B'.

FIG. 19A is a perspective plan view to show a one-pixel-region of the active matrix substrate plate in Embodiment 4, and FIG. 19B is a cross sectional view through the plane A–A', FIG. 19C is the same through the plane B–B'. FIGS. 20A–23B are diagrams to show the manufacturing steps of the active matrix substrate plate, relating to steps 1–3, respectively, and a TFT after the channel has been formed therein. Similar to FIG. 19A, FIGS. 20A, 21A, and 22A are perspective plan views of a one-pixel-region, and FIGS. 20B, 20C, 21B, 21C, 22B, 22C, and FIGS. 23A, 23B are cross sectional views through the planes A–A' and B–B', respectively. Also, FIG. 24A is a cross sectional view of the terminal section of the active matrix substrate plate in the longitudinal direction, in which the left side relates to a cross sectional view at the scanning line terminal location GS and the right side relates to a cross sectional view at the signal line terminal location DS, and FIGS. 24B–24D show manufacturing steps 1–3 for the terminal section part.

The active matrix substrate plate in Embodiment 4 is formed on a glass plate 1, such that a plurality of scanning lines 11 comprised by the first conductor layer 10 and a plurality of signal lines 31 comprised by the second conductor layer 50 are arranged alternatingly at right angles across a gate insulation layer 2, and in the vicinity of TFT section Tf formed in the intersection of the scanning line 11 and the signal line 31, a gate electrode 12 extending from the scanning line 11, a semiconductor layer 20 comprised by the island-shaped amorphous silicon layer 21 and an $n^+$ amorphous silicon layer 22 opposing the gate electrode across the gate insulation layer 2, and a pair of drain electrode 32 and source electrode 33 comprised by a second conductor layer 50 above the semiconductor layer and spaced with a gap of channel gap 23 comprise an inverted staggered structure TFT, and a pixel electrode 41 comprised by a transparent conductive layer 40 is formed in a window section Wd, for transmitting light, which is surrounded by the scanning line 11 and the signal line 31, and the drain electrode 32 is connected to the signal line 31, the source electrode 33 is connected to the pixel electrode 41 to form a TN-type active matrix substrate plate.

In this active matrix substrate plate, the first conductor layer 10 forming the scanning line 11 and the gate electrode 12 is comprised primarily of Al, and is formed by an alloy containing Nd, for example. Also, the second conductor layer 50 forming the signal line 31, drain electrode 32, and source electrode 33 is formed by laminating, in each case, the transparent conductive layer 40 comprised by ITO on top of a metallic layer 30 comprised by Cr, and the semiconductor layer 20 formed below the signal line 31 is shaped so that an amorphous silicon layer 21 formed in the lower layer has a wider width to produce a 凸-shaped cross section, so that the respective lateral surfaces of the upper layer of the 凸-shaped cross section, which is the $n^+$ amorphous silicon layer 22, and the metallic layer 30 forming the signal line 31 and the transparent conductive layer 40 are aligned, and both lateral surfaces are covered by the protective insulation layer 3. The transparent conductive layer 40 which constitutes the upper layer of the source electrode 33 extends above the gate insulation layer 2 of the window section Wd to form the pixel electrode 41.

The pixel electrode 41 forms an accumulation capacitance electrode 71 by extending so as to superimpose above the accumulation common electrode 72 formed inside the forestage scanning lines 11 across the gate insulation layer 2 to construct the accumulation capacitance section Cp in this pixel region. Also, in this pixel region, a light blocking layer 17 comprised by the first conductor layer 10 is formed so as to superimpose across the gate insulation layer 2 a portion on one perimeter section of the pixel electrode 41.

The active matrix substrate plate in Embodiment 4 is manufactured according to the following four steps.

(Step 1) as shown in FIGS. 20A–20C and FIG. 24B, by continual sputtering on the glass plate 1, an alloy of Al—Nd of about 250 nm thickness is deposited to form the first conductor layer 10, and through photolithographic processes, excepting the scanning line 11, scanning line terminal section 11*a* formed in the scanning line terminal location GS, and within the respective pixel regions, the gate electrode 12 extending from the scanning line 11 to the TFT section Tf, accumulation common electrode 72 formed within the forestage scanning line 11 and the light blocking layer 17, the first conductor layer 10 is removed by etching.

(Step 2) as shown in FIGS. 21A–21C and FIG. 24C, using the plasma CVD process continually on the above substrate plate, gate insulation layer 2 comprised by silicon nitride film of about 400 nm thickness is deposited, and a semiconductor layer 20 comprised by amorphous silicon layer 21 of about 250 nm thickness and $n^+$ amorphous silicon layer 22 of about 50 nm thickness is deposited, and using sputtering processes, a metallic layer 30 comprised by Cr of about 200 nm thickness is deposited, and through photolithographic processes, excepting a portion 31*w* including the signal line 31 and spreading wider on both lateral sides, signal line terminal section 31*a* formed in the signal line terminal location DS, common wiring line and common wiring line terminal section (not shown), and within the respective pixel regions, a protrusion section 34 extending from the signal line 31 towards the window section Wd through the TFT section Tf, the metallic layer 30 and the semiconductor layer 20 are successively removed by etching.

(Step 3) as shown in FIGS. 22A–22C and FIG. 24D, on the above substrate plate is sputtered to form the transparent conductive layer 40 comprised by a film of ITO of about 50 nm thickness, and through photolithographic processes, excepting the signal line 31, signal line terminal section 31*a*, common wiring line and common wiring line terminal section (not shown), and within the respective pixel regions, drain electrode 32 extending from the signal line 31 towards the TFT section Tf, source electrode 33 separated from the drain electrode 32 by the opposing channel gap 23, and the pixel electrode 41 continuing from the source electrode, the transparent conductive layer 40 is removed by etching, followed by removing the exposed metallic layer 30 by etching. In this case, the perimeter of the pixel electrode 41 is extended so as to superimpose on the accumulation common electrode 72 in the accumulation capacitance section Cp to form the accumulation capacitance electrode 71, and both perimeter sections of the pixel electrode adjacent to this perimeter section are formed so that at least a portion will superimpose on the light blocking layer 17.

Figure 23A:
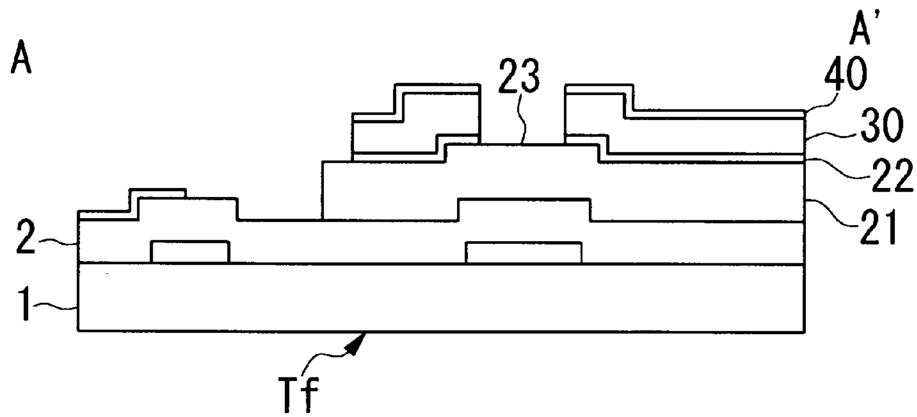
FIGS. 23A–23B are cross sectional views of a channel-formed TFT in active matrix substrate plate manufacturing Embodiment 4.
Figure 23B:
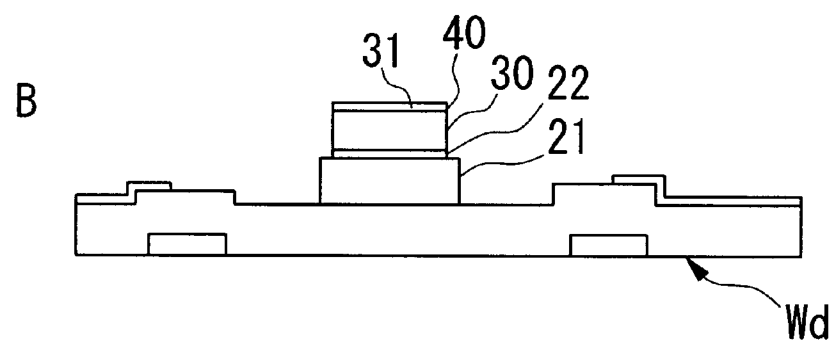
Figures 24A, 24B, 24C, 24D:
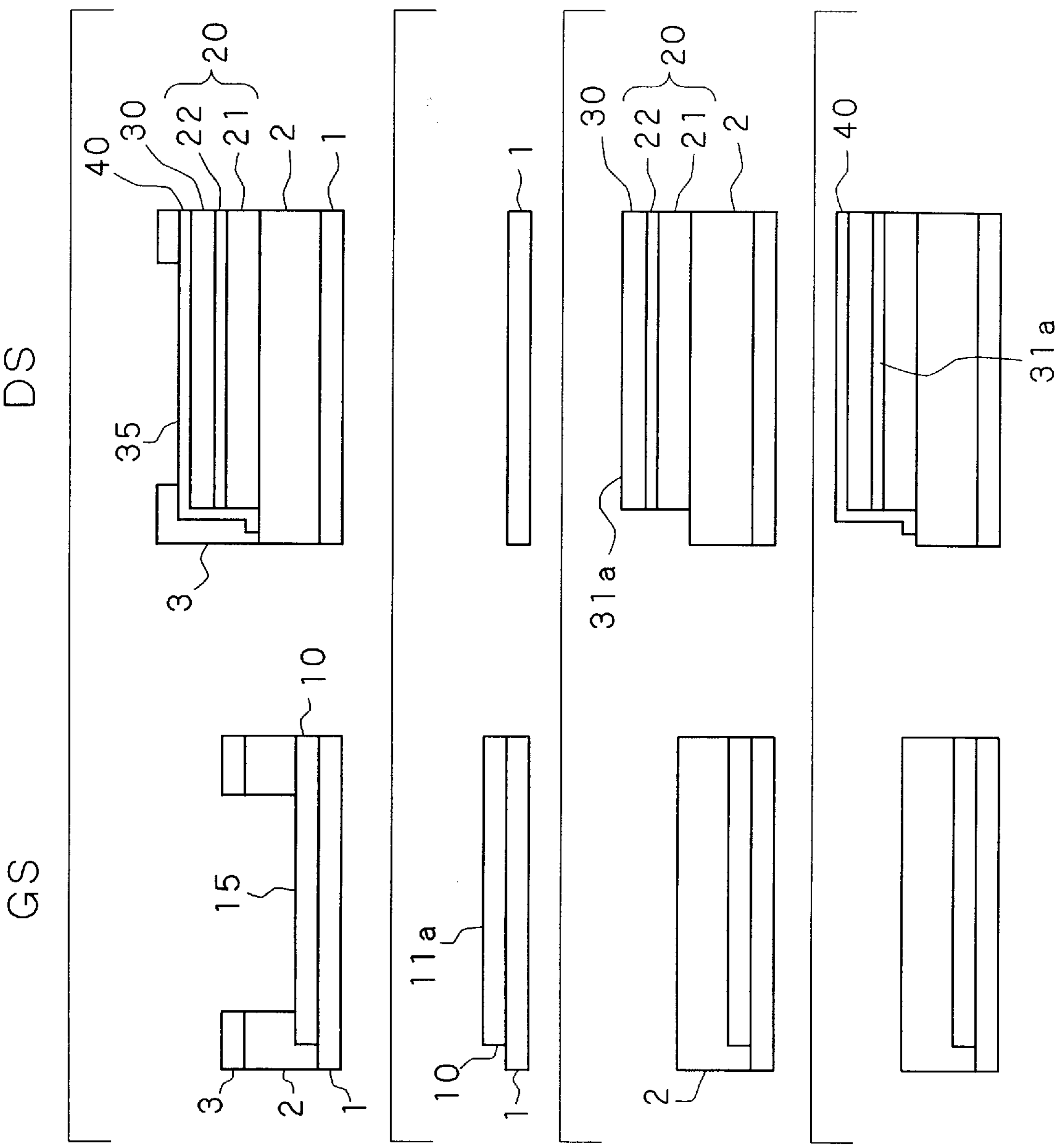
FIG. 24A is a cross sectional view in the longitudinal direction of a terminal section of the active matrix substrate plate in Embodiment 4, and the left side relates to the scanning line terminal section and the right side relates to the signal line terminal section.
FIGS. 24B–24D are cross sectional views relating to manufacturing step 1–step 3, respectively.

Next, as shown in FIGS. 23A, 23B, using the transparent conductive layer 40 after removing its masking pattern or the masking used in the etching process, as masking, the exposed $n^+$ amorphous silicon layer 22 is removed by etching to form the channel gap 23, and the metallic layer 30 remaining on the shoulder section of the signal line 31 and $n^+$ amorphous silicon layer 22 are removed by etching, and the 凸-shaped cross section is formed so that the amorphous silicon layer 21 of the semiconductor layer 20 formed in the lower layer of the signal line 31 would be wider.

(Step 4) as shown in FIGS. 19A–19C and FIG. 24A, on the above substrate plate the protective insulation layer 3 of about 150 nm thickness comprised by silicon nitride film is deposited using plasma CVD process, and through photolithographic processes, the protective insulation layer 3 above the pixel electrode 41 and signal line terminal section 35 and the common wiring line terminal section (not shown), and the protective insulation layer 3 and the gate insulation layer 2 above the scanning line terminal section 11*a* are removed by etching so as to expose the pixel electrode 41 comprised by the transparent conductive layer 40, the signal line terminal 35 and the common wiring terminal (not shown) comprised by a lamination of the metallic layer 30 and the transparent conductive layer 40, and the scanning line terminal 15 comprised by the first conductor layer 10. Lastly, the active matrix substrate plate is completed by performing annealing at about 280° C.

In this case, the embodiment related to the use of Al—Nd alloy for the first conductor layer, but as in Embodiment 1, it is permissible to use a lamination of a nitride film of Al and a high melting point metal such as and Ti, or a three layer structure which can be formed by laying an underlayer of a high melting point metal such as Ti below the Al layer to form Ti, Al and Ti nitride film layers. Also, it may be an overlay of ITO on Cr. It is preferable that the nitride film of the high melting point metal such as Ti contains a nitrogen concentration not lower than 25 a/o.

In the embodiment, signal line terminal and common wiring terminal are made of a lamination of a metallic layer and a transparent conductive layer, but similar to the pixel electrode, it may be constructed of a transparent conductive layer only. In this case, the metallic layer for the signal line may use a metal having a poor corrosion resistance such as Mo.

Also, in the present embodiment, the vertical-type TFT is used in which the gate electrode extends from the scanning line to the pixel section, but the lateral-type TFT may be used, in which the gate electrode shares a portion of the scanning line.

Productivity and the reliability of the TN-type active matrix substrate plate in Embodiment 4 are improved significantly because it can be manufactured in four steps.

Also, in this active matrix substrate plate, because concurrently with the formation of channels for TFT, metallic layer of the signal line is etched using the transparent conductive layer as masking, dimensional control the signal lines is facilitated.

Also, effects regarding lowering of the resistively of scanning and signal lines and the dielectric strength of the insulation layer and improvement in the aperture factor are exactly the same as those in Embodiment 3.

Embodiment 5

Figure 25A:
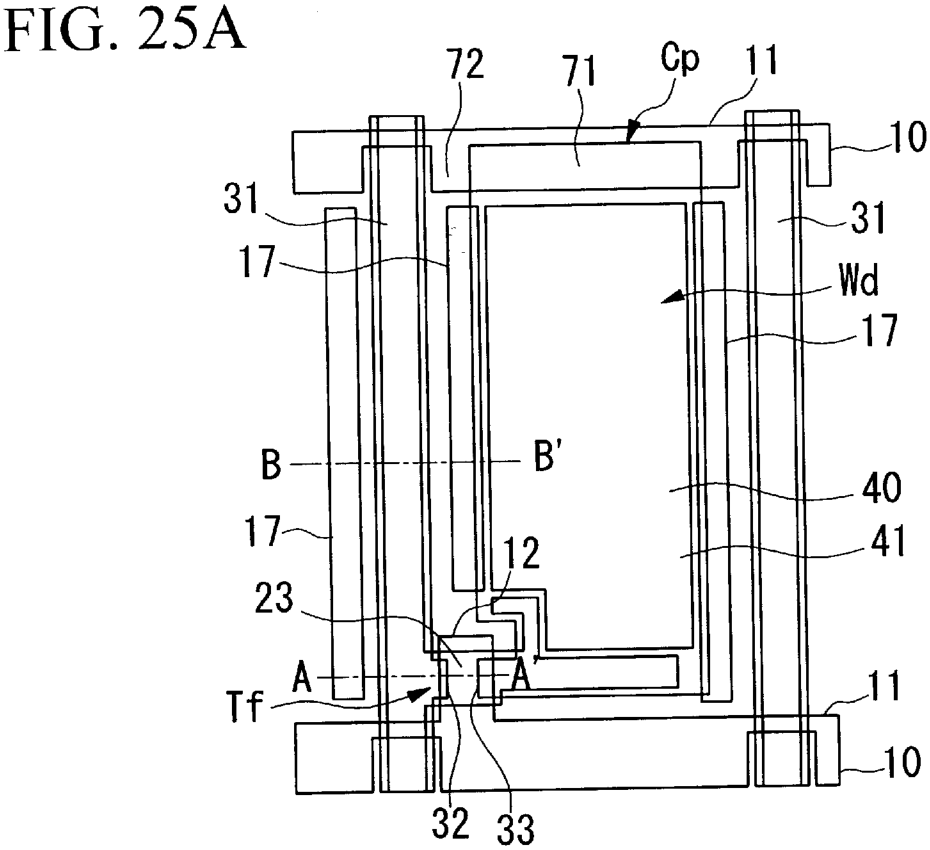
FIG. 25A is a perspective plan view of a one-pixel-region of the active matrix substrate plate in Embodiment 5.
Figure 25B:
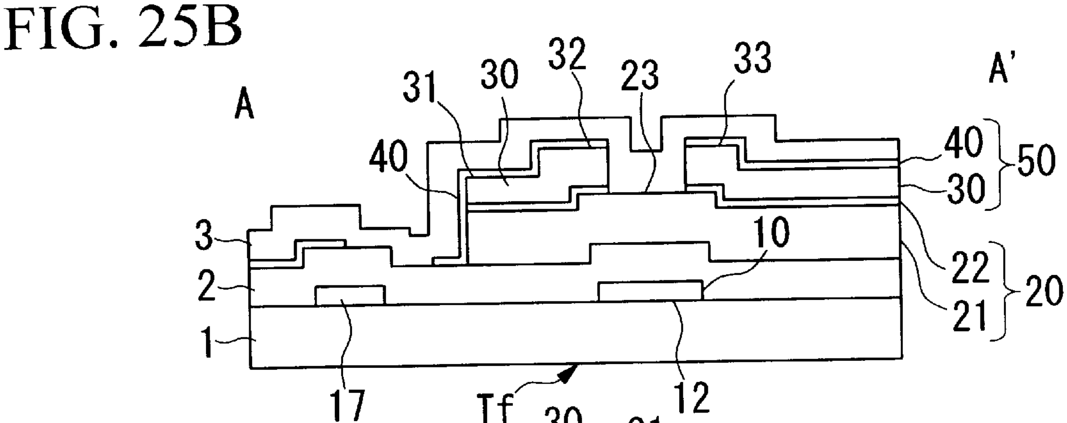
FIG. 25B is a cross sectional view through the plane A–A'.
Figure 25C:
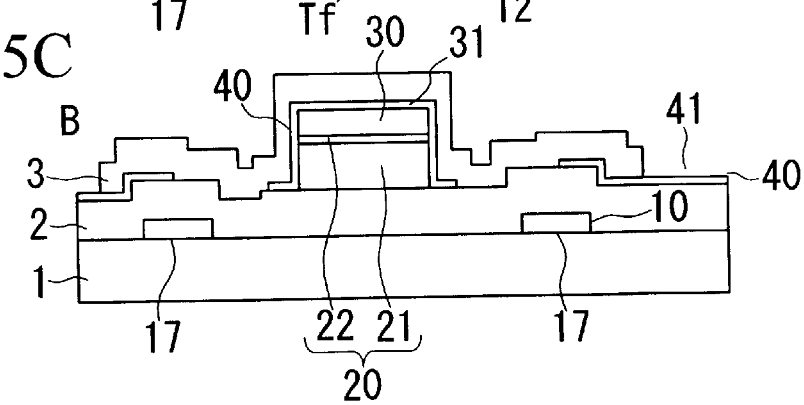
FIG. 25C is a cross sectional view through the plane B–B'.
Figure 26A:
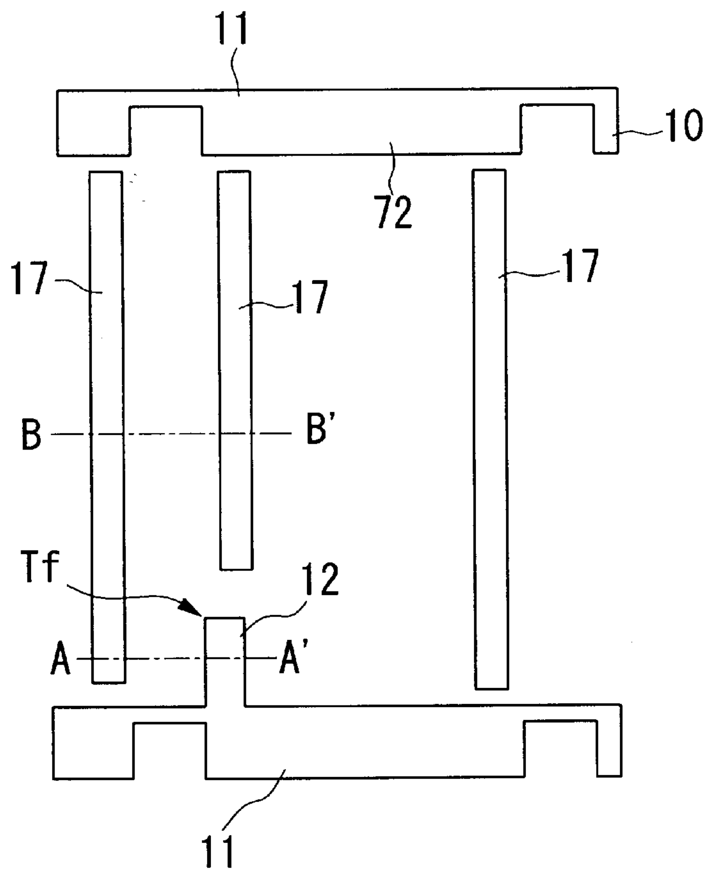
FIG. 26A is a perspective plan view of a one-pixel-region of the active matrix substrate plate in step 1 of the manufacturing method in Embodiment 5.
Figure 26B:
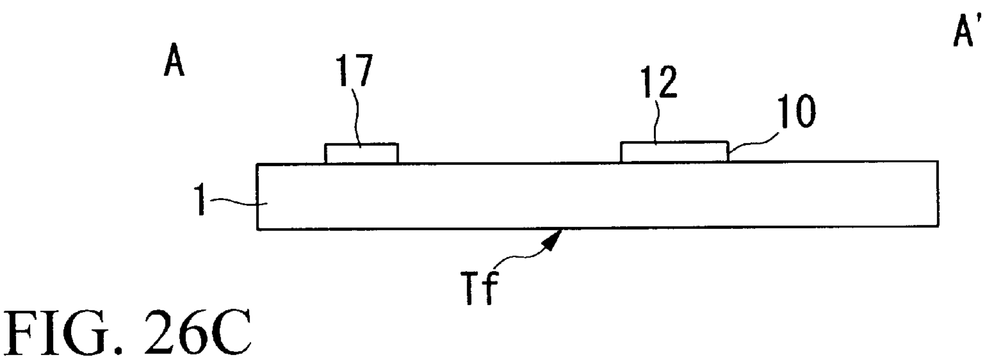
FIG. 26B is a cross sectional view through the plane A–A'.
Figure 26C:
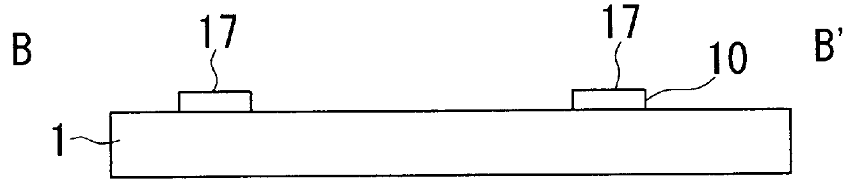
FIG. 26C is a cross sectional view through the plane B–B'.
Figure 27A:
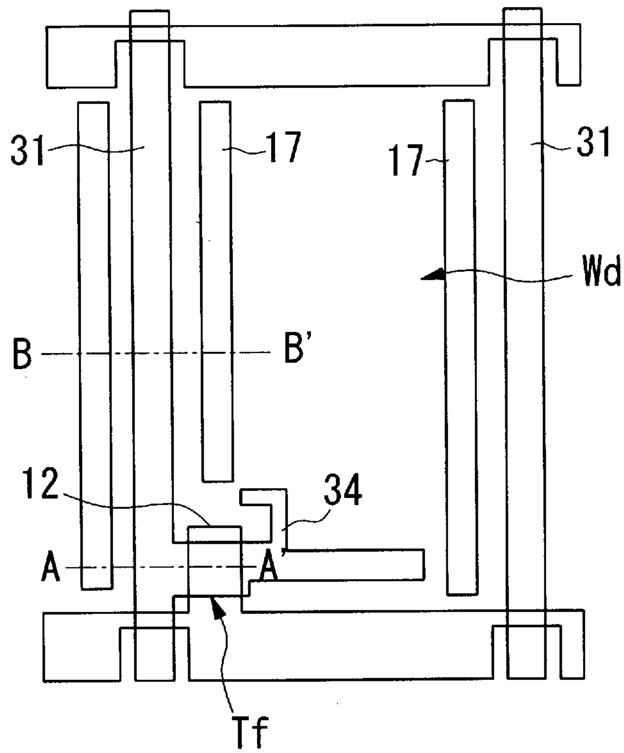
FIG. 27A is a perspective plan view of a one-pixel-region of the active matrix substrate plate in step 2 of the manufacturing method in Embodiment 5.
Figure 27B:
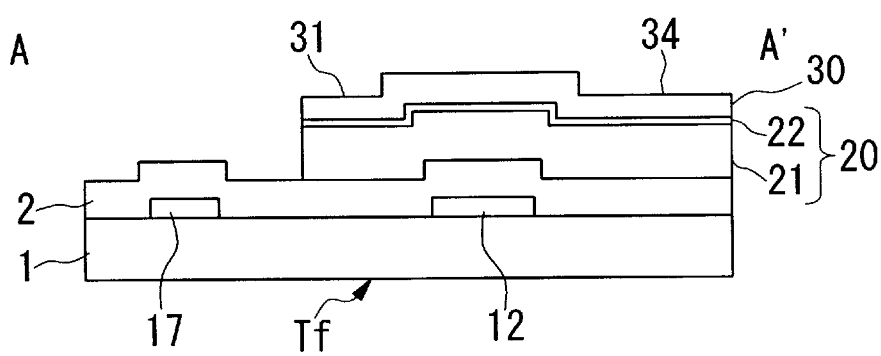
FIG. 27B is a cross sectional view through the plane A–A'.
Figure 27C:
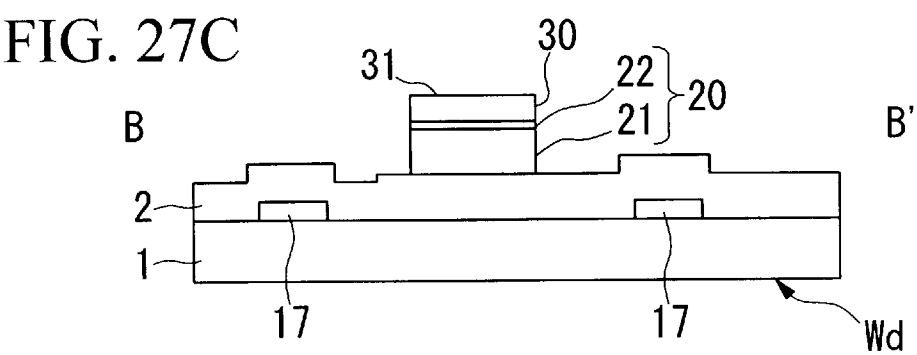
FIG. 27C is a cross sectional view through the plane B–B'.

FIG. 25A is a perspective plan view to show a one-pixel-region of the active matrix substrate plate in Embodiment 5, and FIG. 25B is a cross sectional view through the plane A–A', FIG. 25C is the same through the plane B–B'. FIGS. 26A–28C are diagrams to show the manufacturing steps of the active matrix substrate plate, relating to steps 1–3, respectively. Similar to FIG. 25A, FIGS. 26A, 27A, and 28A are perspective plan views of a one-pixel-region, and FIGS.

Figure 28A:
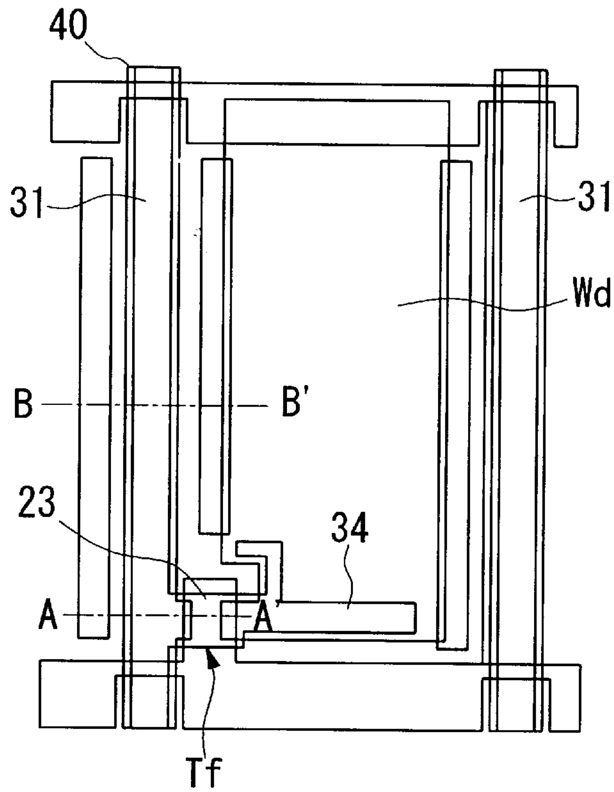
FIG. 28A is a perspective plan view of a one-pixel-region of the active matrix substrate plate in step 3 of the manufacturing method in Embodiment 5.
Figure 28B:
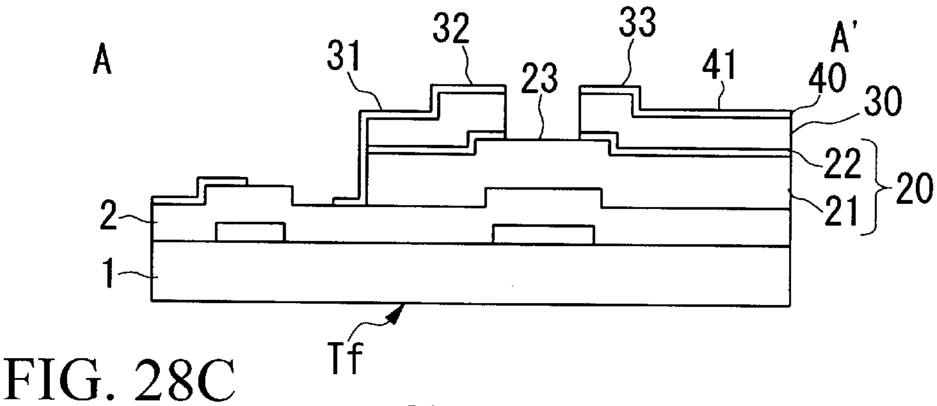
FIG. 28B is a cross sectional view through the plane A–A'.
Figure 28C:
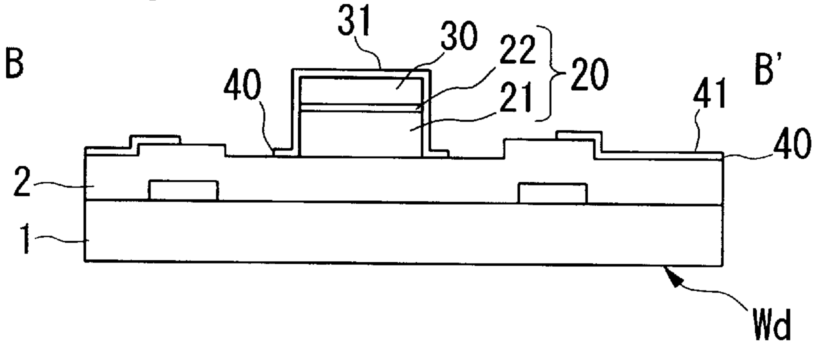
FIG. 28C is a cross sectional view through the plane B–B'.
Figures 29A, 29B, 29C, 29D:
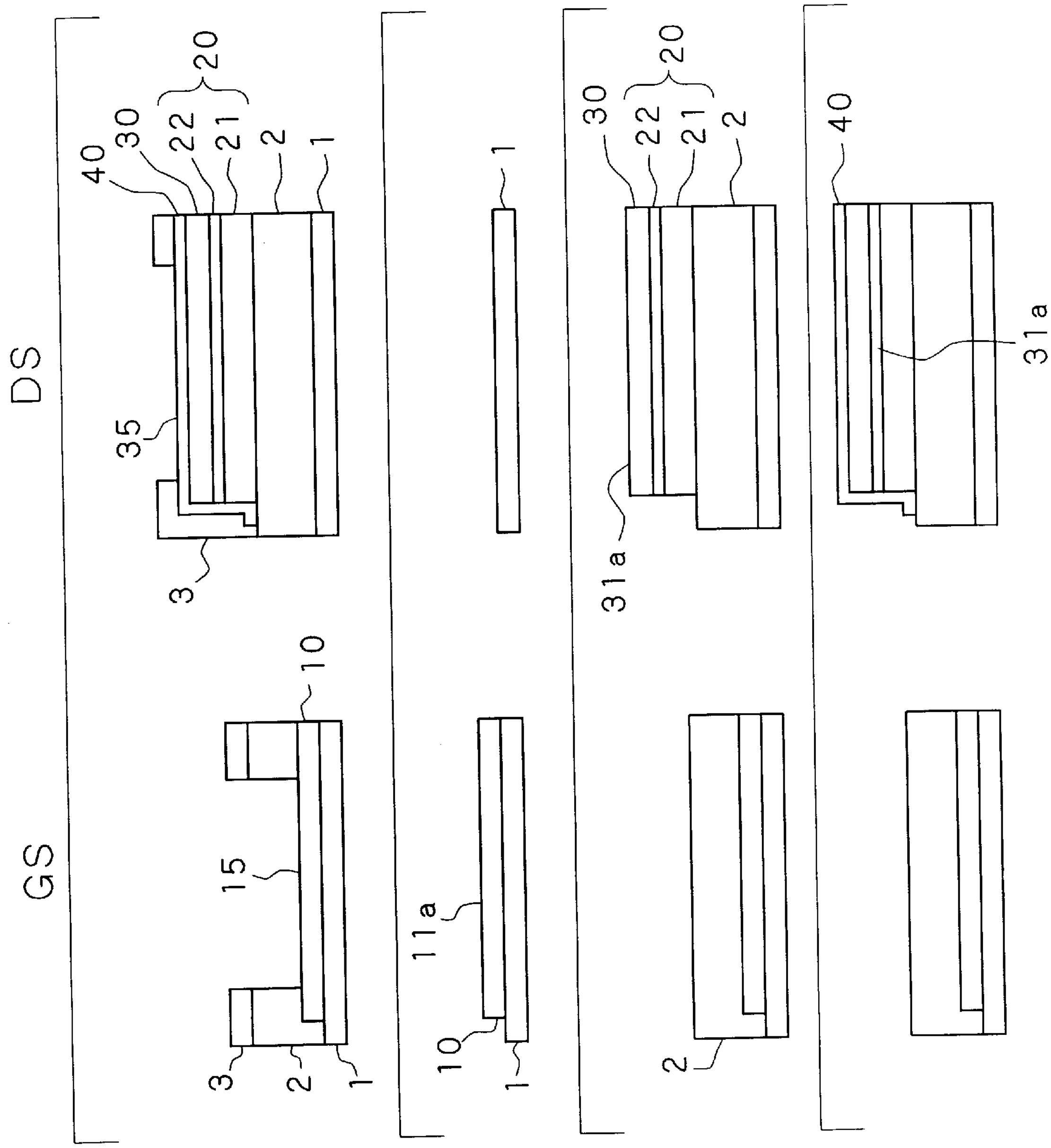
FIG. 29A is a cross sectional view in the longitudinal direction of a terminal section of the active matrix substrate plate in Embodiment 5, and the left side relates to the scanning line terminal section and the right side relates to the signal line terminal section.
FIGS. 29B–29D are cross sectional views relating to manufacturing step 1–step 3, respectively.

26B, 26C, 27B, 27C, and FIGS. 28B, 28C are cross sectional views through the planes A–A' and B–B', respectively. Also, FIG. 29A is a cross sectional view of the terminal section of the active matrix substrate plate in the longitudinal direction, in which the left side relates to a cross sectional view at the scanning line terminal location GS and the right side relates to a cross sectional view at the signal line terminal location DS, and FIGS. 29B–29D show manufacturing steps 1–3 for the terminal section part.

The active matrix substrate plate in Embodiment 5 is formed on a glass plate 1, such that a plurality of scanning lines 11 comprised by the first conductor layer 10 and a plurality of signal lines 31 comprised by the second conductor layer 50 are arranged alternatingly at right angles across a gate insulation layer 2, and in the vicinity of the TFT section Tf formed in the intersection of the scanning line 11 and the signal line 31, a gate electrode 12 extending from the scanning line 11, a semiconductor layer 20 comprised by the island-shaped amorphous silicon layer 21 and an $n^+$ amorphous silicon layer 22 formed by doping with a group V element opposing the gate electrode across the gate insulation layer 2, and a pair of drain electrode 32 and source electrode 33 comprised by a second conductor layer 50 above the semiconductor layer and spaced with a gap of channel gap 23 comprise an inverted staggered structure TFT, and a pixel electrode 41 comprised by a transparent conductive layer 40 is formed in a window section Wd, for transmitting light, which is surrounded by the scanning line 11 and the signal line 31, and the drain electrode 32 is connected to the signal line 31, the source electrode 33 is connected to the pixel electrode 41 to form a TN-type active matrix substrate plate.

In this active matrix substrate plate, the first conductor layer 10 forming the scanning line 11 and the gate electrode 12 is comprised of an alloy of primarily of Al containing Nd, for example. Also, the second conductor layer 50 forming the signal line 31, drain electrode 32, and source electrode 33 is formed by laminating, in each case, the transparent conductive layer 40 comprised by ITO on top of a metallic layer 30 comprised by Cr, and the semiconductor layer 20 of the same shape as the signal line is formed below the signal line 31, and the semiconductor layer 20 and the metallic layer 30 of the signal line are covered by the transparent conductive layer 40. The transparent conductive layer 40 which constitutes the upper layer of the source electrode 33 extends above the gate insulation layer 2 of the window section Wd to form the pixel electrode 41.

In this embodiment, the $n^+$ amorphous silicon layer 22 in the TFT section is formed by doping with a group V element P, and the thickness of ohmic contact layer is in a range of 3–6 nm.

The pixel electrode 41 forms an accumulation capacitance electrode 71 by extending to superimpose above the accumulation common electrode 72 formed inside the forestage scanning lines 11 across the gate insulation layer 2 to construct the accumulation capacitance section Cp in this pixel region. Also, in this pixel region, a light blocking layer 17 comprised by the first conductor layer 10 is formed so as to superimpose across the gate insulation layer 2 a portion on one perimeter section of the pixel electrode 41.

The active matrix substrate plate in Embodiment 5 is manufactured according to the following four steps.

(Step 1) as shown in FIGS. 26A–26C and FIG. 29B, by continual sputtering on the glass plate 1, an alloy of Al—Nd of about 250 nm thickness is deposited to form the first conductor layer 10, and through photolithographic processes, excepting the scanning line 11, scanning line terminal section 11a formed in the scanning line terminal location GS, and the gate electrode 12 extending from the scanning line 11 to the TFT section Tf within the respective pixel regions, accumulation common electrode 72 formed within the forestage scanning line 11 and the light blocking layer 17, the first conductor layer 10 is removed by etching.

(Step 2) as shown in FIGS. 27A–27C and FIG. 29C, on the above substrate plate, gate insulation layer 2 comprised by silicon nitride film of about 400 nm thickness and the amorphous silicon layer 21 of about 100 nm thickness are deposited by continually applying plasma CVD, and using a $PH_3$ plasma phosphorous doping (P-doping) technique under the same vacuum pressure, and after forming an ohmic contact layer comprised by $n^+$ amorphous silicon layer of 3–6 nm thickness on the surface of the amorphous silicon layer 21, a metallic layer 30 comprised by Cr of about 200 nm thickness is sputtered, and through photolithographic processes, excepting the signal line 31, signal line terminal section 31a formed in the signal line terminal location DS, common wiring and common wiring terminal section (not shown), and within the respective pixel regions, the protrusion section 34 extending from the signal line 31 towards the window section Wd through the TFT section Tf, the metallic layer 30 and the semiconductor layer 20 are removed successively by etching.

(Step 3) as shown in FIGS. 28A–28C and FIG. 29D, on the above substrate plate, ITO of about 50 nm thickness is deposited by sputtering to form the transparent conductive layer 40, and through photolithographic processes, excepting the signal line 31, the portion that covers its lateral surfaces, signal line terminal section 31a, common wiring line and common wiring line terminal section (not shown), and within the respective pixel regions, drain electrode 32 extending from the signal line 31 towards the TFT section Tf, source electrode 33 separated from the drain electrode 32 by the opposing channel gap 23, pixel electrode 41, the transparent conductive layer 40 is removed by etching. Next, the exposed metallic layer 30 and the $n^+$ amorphous silicon layer 22 formed by P-doping are successively removed by etching to form the channel gap 23. In this case, the perimeter of the pixel electrode 41 is extended so as to superimpose on the accumulation common electrode 72 in the accumulation capacitance section Cp to form the accumulation capacitance electrode 71, and both perimeter sections of the pixel electrode adjacent to this perimeter section are formed so that at least a portion will superimpose on the light blocking layer 17.

(Step 4) as shown in FIGS. 25A–25C and FIG. 29A, on the above substrate plate the protective insulation layer 3 of about 150 nm thickness comprised by silicon nitride film is deposited using plasma CVD process, and through photolithographic processes, the pixel electrode 41, signal line terminal section 31a, protective insulation layer 3 above the common wiring line terminal section (not shown), protective insulation layer 3 and gate insulation layer 2 above the scanning line terminal 11a are removed by etching to expose the pixel electrode 41 comprised by the transparent conductive layer 40, the signal line terminal 35 and the common wiring line terminal section (not shown) comprised by a lamination of the metallic layer 30 and the transparent conductive layer 40, and the scanning line 15 comprised by the first conductor layer 10. Lastly, the active matrix substrate plate is completed by performing annealing at about 280° C.

In this case, the structure of the signal line in Embodiment 3 is exemplified by an ohmic contact layer of thickness in a range of 3–6 nm, but in the case of Embodiment 4, using the same manufacturing method, it is possible to make an ohmic contact layer having about the same range of thickness.

In this case, the embodiment related to the use of Al—Nd alloy for the first conductor layer, but as in Embodiment 1, it is permissible to use a lamination of a nitride film of Al and a high melting point metal such as and Ti, or a three layer structure which can be formed by laying an underlayer of a high melting point metal such as Ti below the Al layer to form Ti, Al and Ti nitride film layers. Also, it may be an overlay of ITO on Cr. It is preferable that the nitride film of the high melting point metal such as Ti contains a nitrogen concentration not lower than 25 a/o.

In the embodiment, signal line terminal and common wiring terminal are made of a lamination of a metallic layer and a transparent conductive layer, but similar to the pixel electrode, it may be constructed of a transparent conductive layer only. In this case, the metallic layer for the signal line may use a metal having a poor corrosion resistance such as Mo.

Also, in the present embodiment, the vertical-type TFT is used in which the gate electrode extends from the scanning line to the pixel section, but the lateral-type TFT may be used, in which the gate electrode shares a portion of the scanning line.

Productivity and the yield of the TN-type active matrix substrate plate in Embodiment 5 are improved because it can be manufactured in four steps.

Also, because this active matrix substrate plate can be manufactured by etching the ohmic contact layer above the semiconductor layer concurrently with the drain electrode and source electrode at the time of their etching, and the semiconductor layer can be made thin at about 100 nm thickness, productivity can be increased and at the same time, the resistance in the vertical direction of the semiconductor layer can be reduced to improve writing capability of TFT.

Also, in this active matrix substrate plate, as in Embodiment 3, because the lateral surface of the semiconductor layer below the signal line is covered by the transparent conductive layer, when etching the $n^+$ amorphous silicon layer forming the channel of the TFT, the amorphous silicon layer of the semiconductor layer can be prevented from being infiltrated in the lateral direction to prevent difficulty of orientation control due to degradation in the protective condition of the protective insulation layer. Also, because the lateral surface of the metallic layer of the signal line is covered over by the transparent conductive layer so that the photo-resist coating is covering the metallic layer and the semiconductor layer, when etching the transparent conductive layer, even if debris and foreign particles reside on the metallic layer, etching solution does not infiltrate into the interface between the transparent conductive layer and the metallic layer, thereby preventing severing of signal lines.

Also, effects regarding lowering of the resistively of scanning and signal lines and the dielectric strength of the insulation layer and improvement in the aperture factor are exactly the same as those in Embodiment 3.

Embodiment 6

Figure 30A:
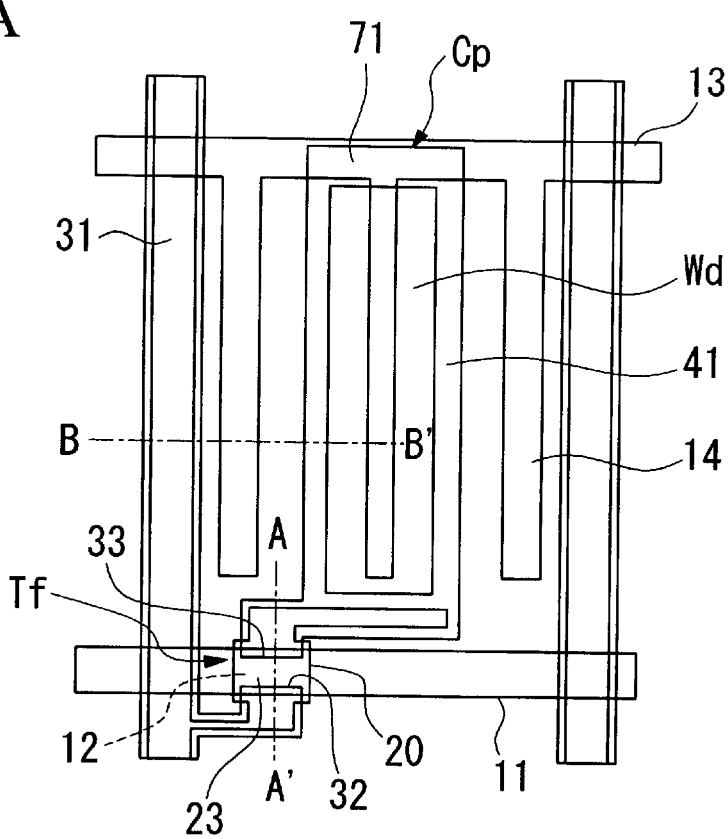
FIG. 30A is a perspective plan view of a one-pixel-region of the active matrix substrate plate in Embodiment 6.
Figure 30B:
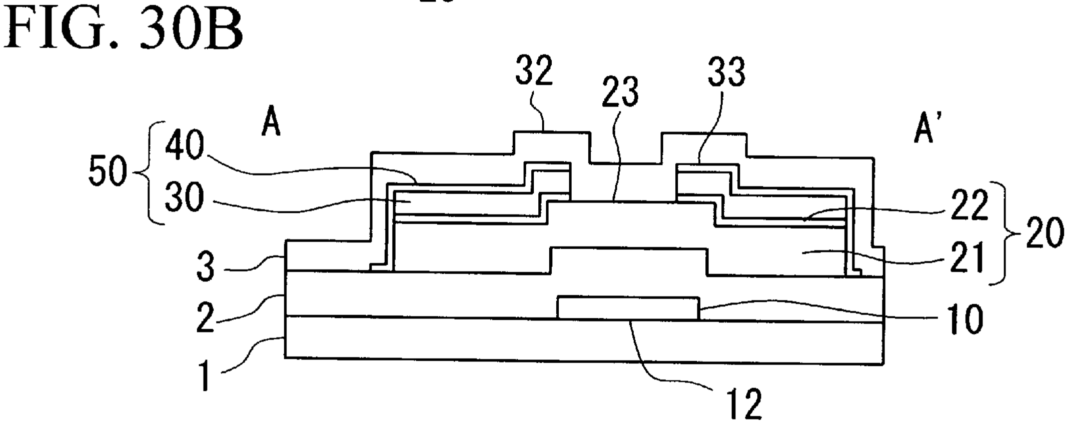
FIG. 30B is a cross sectional view through the plane A–A'.
Figure 30C:
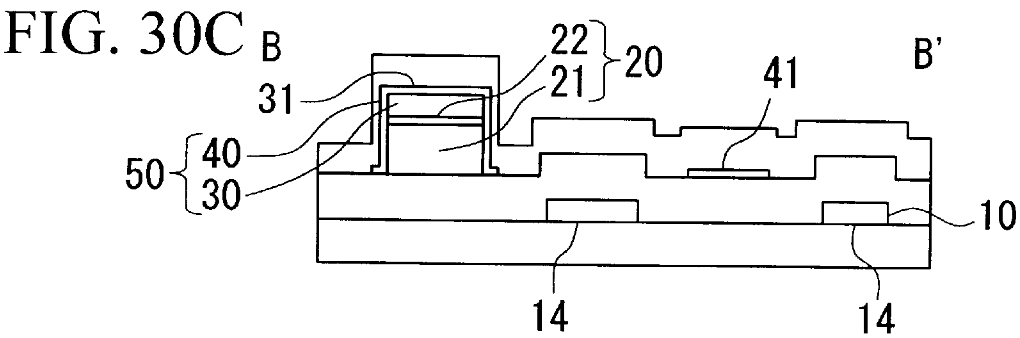
FIG. 30C is a cross sectional view through the plane B–B'.
Figure 31A:
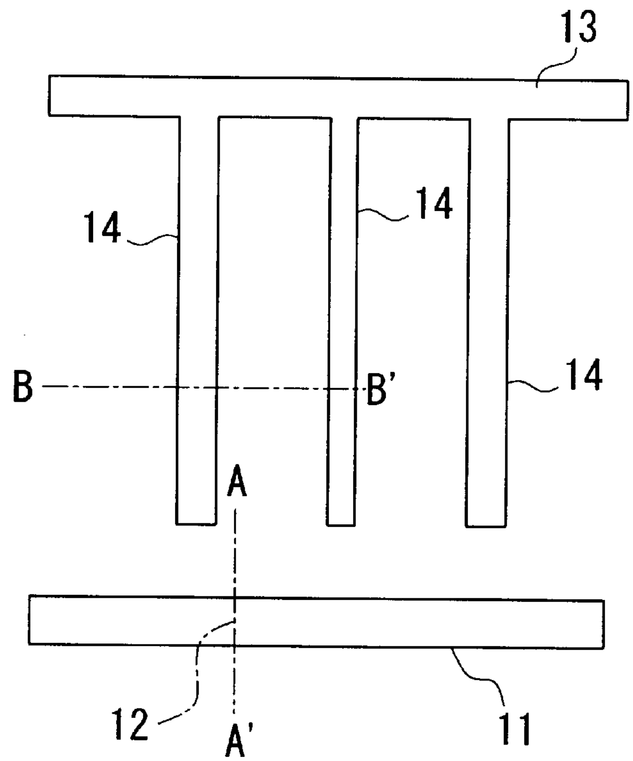
FIG. 31A is a perspective plan view of a one-pixel-region of the active matrix substrate plate in step 1 of the manufacturing method in Embodiment 6.
Figure 31B:
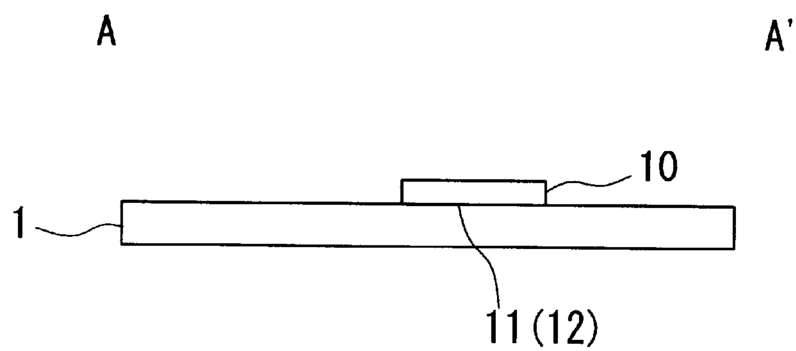
FIG. 31B is a cross sectional view through the plane A–A'.
Figure 31C:
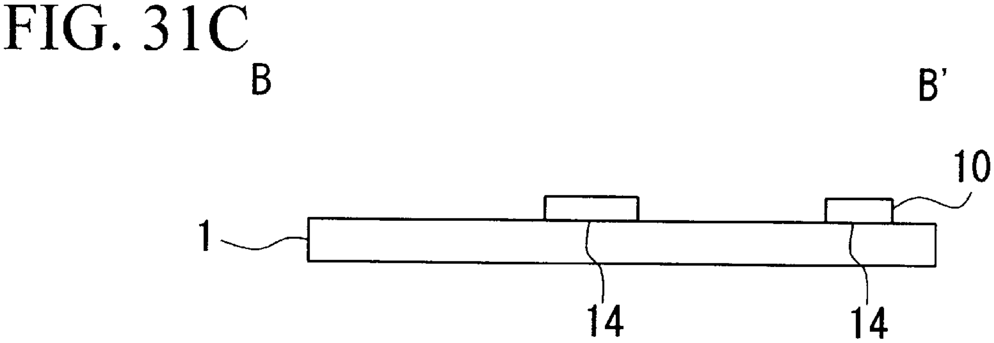
FIG. 31C is a cross sectional view through the plane B–B'.
Figure 32A:
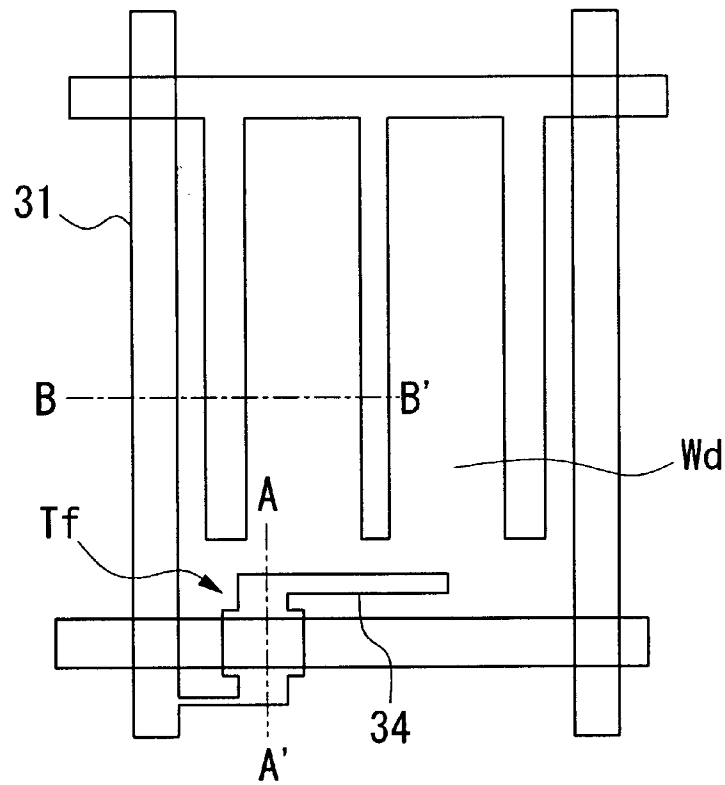
FIG. 32A is a perspective plan view of a one-pixel-region of the active matrix substrate plate in step 2 of the manufacturing method in Embodiment 6.
Figure 32B:
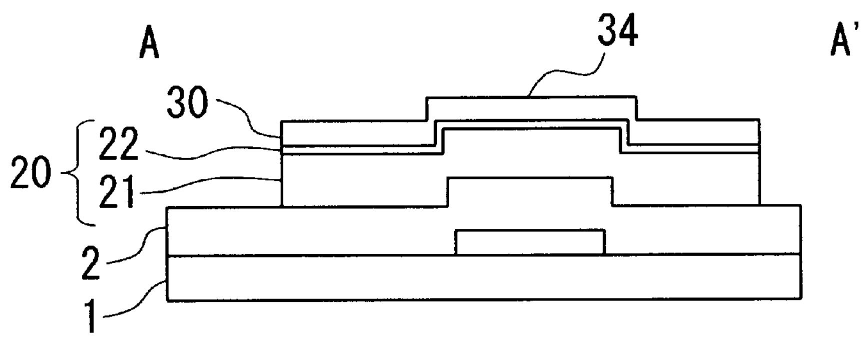
FIG. 32B is a cross sectional view through the plane A–A'.
Figure 32C:
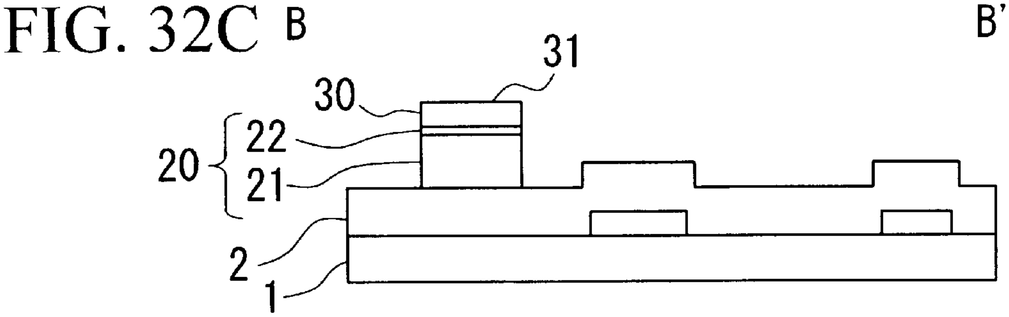
FIG. 32C is a cross sectional view through the plane B–B'.
Figure 33A:
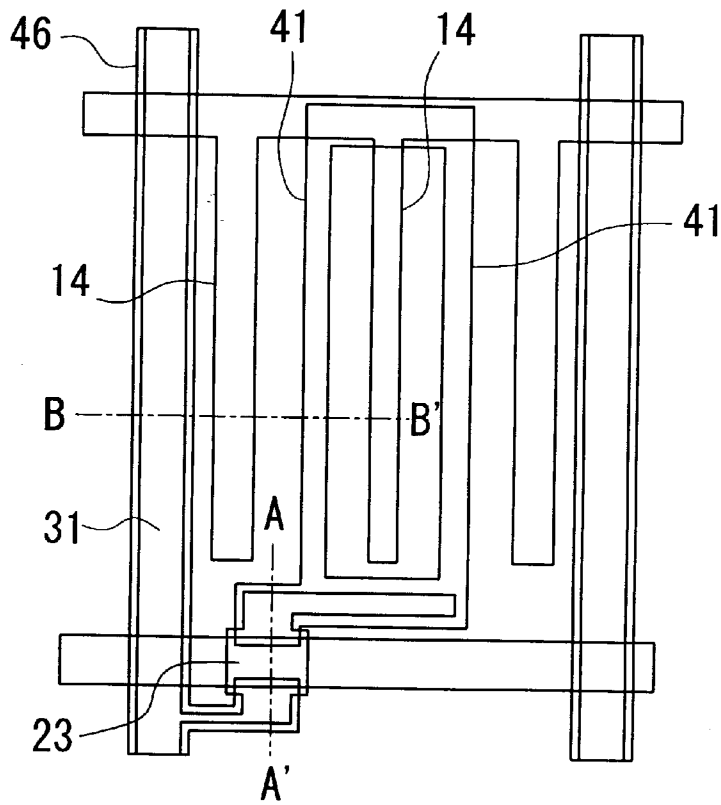
FIG. 33A is a perspective plan view of a one-pixel-region of the active matrix substrate plate in step 3 of the manufacturing method in Embodiment 6.
Figure 33B:
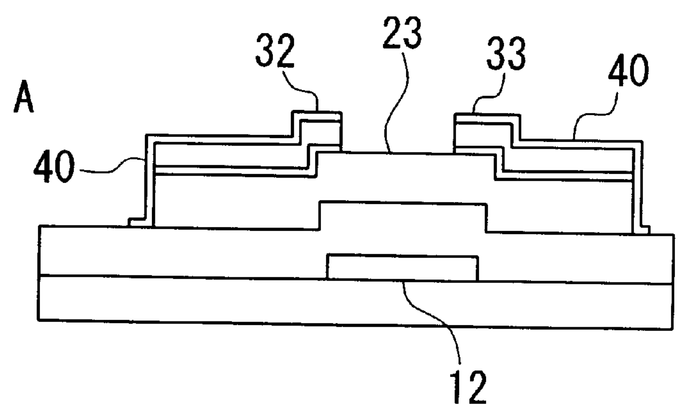
FIG. 33B is a cross sectional view through the plane A–A'.
Figure 33C:
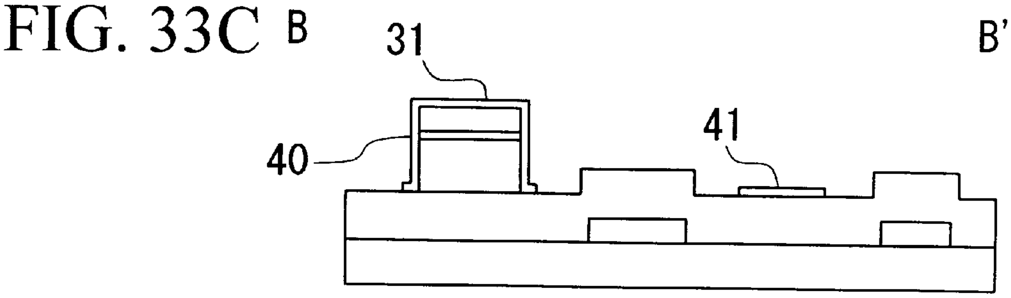
FIG. 33C is a cross sectional view through the plane B–B'.

FIG. 30A is a perspective plan view to show a one-pixel-region of the active matrix substrate plate in Embodiment 6, and FIG. 30B is a cross sectional view through the plane A–A', FIG. 30C is the same through the plane B–B'. FIGS. 31A–34B are diagrams to show the manufacturing steps of the active matrix substrate plate, and refer to steps 1–3, respectively, and a TFT after the channel has been formed therein. Similar to FIG. 30A, FIGS. 31A, 32A, and 33A are perspective plan views of a one-pixel-region, and FIGS. 31B, 31C, 32B, 32C, 33B, 33C and FIGS. 34A, 34B are cross sectional views through the planes A–A' and B–B', respectively. FIG. 35A is a cross sectional view of the terminal section of the active matrix substrate plate in the longitudinal direction, in which the left side relates to a cross sectional view at the scanning line terminal location GS, the center relates to a cross sectional view at the signal line terminal location DS, and the right side relates to the common wiring terminal location CS, and FIGS. 35B–35D show manufacturing steps 1–3 for the terminal section part.

The active matrix substrate plate in Embodiment 6 is formed such that, a plurality of scanning lines 11 and common wiring lines 13 comprised by a first conductor layer 10 are arranged alternatingly in parallel on a glass plate 1, a plurality of signal lines 31 are arranged at right angles to the scanning lines 11 across a gate insulation layer 2, and in the vicinity of TFT section Tf formed in the intersection of the scanning line 11 and the signal line 31, a portion of the scanning line 11 acts as gate electrode 12, and this gate electrode 12, an island-shaped amorphous silicon layer 21 and an $n^+$ amorphous silicon layer 22 comprise a semiconductor layer 20 opposing the gate electrode across the gate insulation layer 2, and above this semiconductor layer, a pair of drain electrode 32 and source electrode 33 comprised by a second conductor layer 50 and formed with a gap of channel gap 23 comprise an inverted staggered structure TFT, and in a window section Wd surrounded by the scanning line 11 and the signal line 31 are formed a comb teeth shaped pixel electrode 41 and a comb teeth shaped common electrode 14 opposing the pixel electrode and connecting to the common wiring line 13, and the drain electrode 32 is connected to the signal line 31, the source electrode 33 is connected to the pixel electrode 41, respectively, to form an IPS-type active matrix substrate plate producing a horizontal electrical field between the pixel electrode 41 and the common electrode 14 with respect to the glass plate 1.

In this active matrix substrate plate, common wiring line 13 and common electrode 14 are formed on the same layer as the scanning line 11, and the common wiring line 13 is formed in such a way that, at least on one perimeter of the glass plate 1, the end section extends outside the end section of the same perimeter of the scanning line 11, and, as shown in FIGS. 52A, 52B, 52C, the end sections of the common wiring line 13 are linked together by a common wiring linking line 19, and are connected to the common wiring linking line 19 to form the common wiring terminal 16. For example, as shown in FIG. 52A, scanning line terminal is formed on one side of the opposing perimeters of the glass plate 1, and when inputting a signal from the scanning line driver to one side, at the outer peripheral section on the beyond the terminal section opposite to the scanning line 11, the common wiring lines 13 are linked to each other by the common wiring linking line 19, and are linked by either one or both of the common wiring linking lines 19 and the common wiring line 13 on the signal line terminal side to form the common wiring line terminal section 16. In this case, each scanning line 11 is connected to a gate-shunt bus line in the outer peripheral section Ss, which is outside the scanning line terminal 15. Also, as shown in FIG. 52B, the end sections of the common wiring line 13 extend outside of both end sections of the scanning lines 11 at both perimeter sections of the glass plate 1 clamping the display surface Dp, and both common wiring end sections may be linked by the common wiring linking line 19. The common wiring line terminal section 16 may be connected to either or both of the common wiring linking line 19. Further, as shown in FIG. 52C, when the scanning line 11 extends both sides to clamp the display surface Dp and the scanning line terminal is formed on each side and signals from the scanning line driver are input from both sides, the common wiring line 13 extends outside of both scanning line start end sections, and its end section is linked by the common wiring linking line 19, and the common wiring terminal 16 is connected to either one or both of the common wiring linking lines. In the case shown in FIGS. 52B, 52C, each of the scanning lines 11 is not connected to the gate-shunt bus line, and is formed independently.

The first conductor layer 10 forming the scanning line 11, gate electrode 12 and common wiring line 13 is comprised of an alloy of primarily of Al containing Nd, for example. Also, the second conductor layer 50 forming the signal line 31, drain electrode 32, source electrode 33 and pixel electrode 41 is formed by laminating, in each case, the metallic layer 30 comprised by Mo or Cr on top of the transparent conductive layer 40 comprised by ITO. The semiconductor layer 20 of the same shape as the signal line is formed below the signal line 31, and the semiconductor layer 20 and the metallic layer 30 of the signal line are covered by the transparent conductive layer 40. The pixel electrode 41 is formed by the transparent conductive layer 40 comprised by ITO.

The pixel electrode 41 forms an accumulation capacitance electrode 71 by extending a part to superimpose across the gate insulation layer 2 above the common wiring line 13 to oppose the accumulation common electrode 72 sharing a portion of the common wiring line 13 to construct the accumulation capacitance section Cp in this pixel region.

The active matrix substrate plate in Embodiment 6 is manufactured according to the following four steps.

(Step 1) as shown in FIGS. 31A–31C and FIG. 35B, by sputtering on the glass plate 1, an alloy of Al—Nd of about 250 nm thickness is deposited to form the first conductor layer 10, and through photolithographic processes, excepting the scanning line 11, scanning line terminal section 11*a* formed in the scanning line terminal location GS, common wiring line 13, common wiring linking line (not shown) to bind the common wiring lines 13 in the outer peripheral section Ss, common wiring line terminal section 13*a* connected to the common wiring linking line and formed in the common wiring terminal location CS, and in the respective pixel regions, gate electrode 12 sharing a portion of the scanning line 11 and a plurality of common electrodes 14 extending from the common wiring line 13, the first conductor layer 10 is removed by etching.

(Step 2) as shown in FIGS. 32A–32C and FIG. 35C, on the above substrate plate, gate insulation layer 2 comprised by silicon nitride film of about 400 nm thickness is formed by continually applying plasma CVD, and a semiconductor layer 20 comprised by amorphous silicon layer 21 of about 250 nm thickness and $n^+$ amorphous silicon layer 22 of about 50 nm thickness is formed, and continuing with sputtering to deposit the metallic layer 30 comprised by Mo of about 250 nm thickness and using photolithographic processes, excepting the signal line 31, signal line terminal section 31*a* formed in the signal line terminal location DS, the protrusion section 34 extending from the signal line 31 towards the window section Wd through the TFT section Tf within the respective pixel region, the metallic layer 30 and the semiconductor layer 20 are removed successively by etching.

(Step 3) as shown in FIGS. 33A–33C and FIG. 35D, by sputtering on the above substrate plate, the transparent conductive layer 40 comprised by ITO of about 50 nm thickness is formed, and through photolithographic processes, excepting the signal line 31 and the portion covering the lateral surface, the portion covering the signal line terminal section 31*a*, and within respective pixel regions, the drain electrode 32 extending from the signal line 31 to the TFT section Tf formed above the gate electrode 12 within the respective pixel regions, pixel electrode 41 extending across the gate insulation layer 2 to the window section Wd opposite to the common electrode 14, and source electrode 33 extending from the pixel electrode 41 towards TFT section Tf and separated from the drain electrode 32 by the opposing channel gap 23, the transparent conductive layer 40 is removed by etching, and the exposed metallic layer 30 is removed by etching. In this case, a portion of the pixel electrode 41 is extended so as to superimpose on a portion of the common wiring line 13 at the accumulation capacitance section Cp to form the accumulation capacitance electrode 71.

Figure 34A:
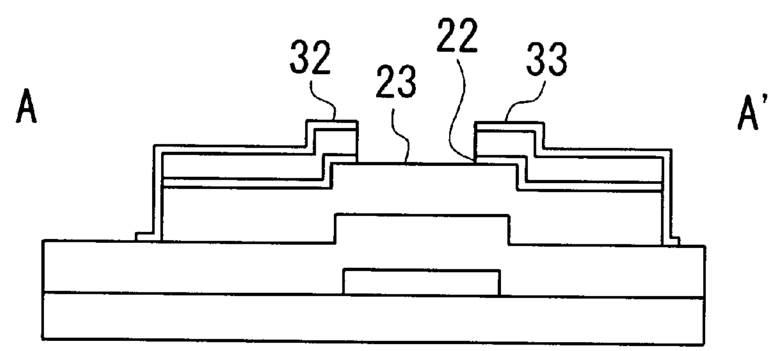
FIGS. 34A–34B are cross sectional views of a channel-formed TFT in active matrix substrate plate manufacturing in Embodiment 6.
Figure 34B:
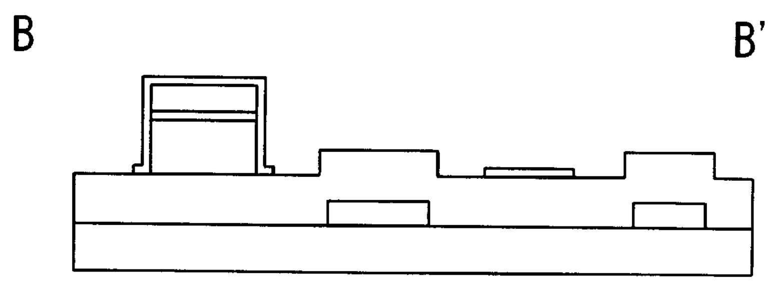
Figures 35A, 35B, 35C, 35D:
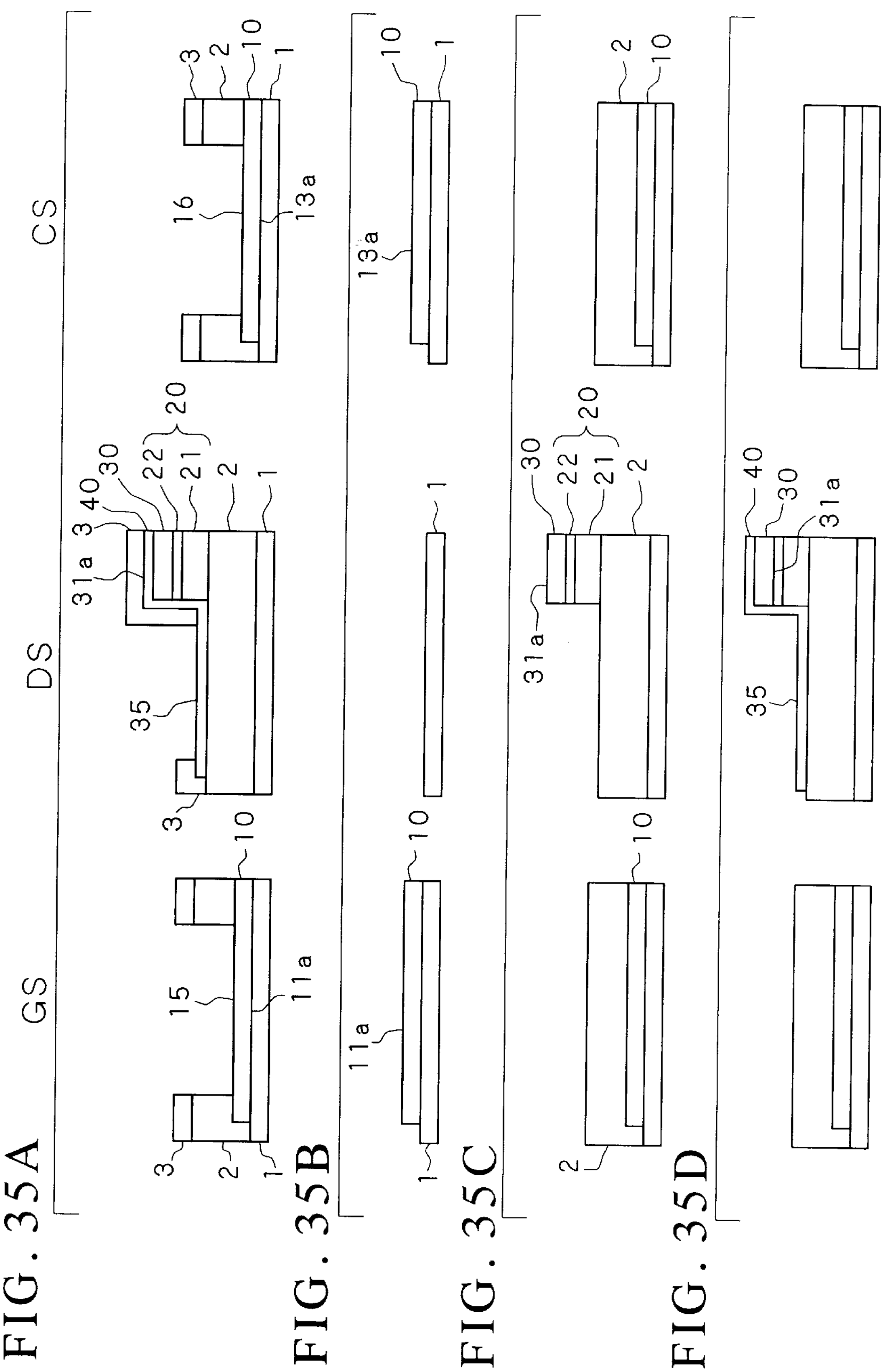
FIG. 35A is a cross sectional view in the longitudinal direction of a terminal section of the active matrix substrate plate in Embodiment 6, and the left side relates to the scanning line terminal section and the center relates to the signal line terminal section and the right side relates to the common wiring line terminal section.
FIGS. 35B–35D are cross sectional views relating to manufacturing step 1–step 3, respectively.

Next, as shown in FIGS. 34A, 34B, using the masking pattern used in the etching process or the transparent conductive layer 40 after removing its masking, the exposed $n^+$ amorphous silicon layer 22 is removed by etching to form the channel gap 23.

(Step 4) as shown in FIGS. 30A–30C and FIG. 35A, on the above substrate plate the protective insulation layer 3 of about 300 nm thickness comprised by silicon nitride film is deposited using plasma CVD process, and through photolithographic processes, the protective insulation layer 3 above the signal line terminal section 31*a*, and the protective insulation layer 3 and the gate insulation layer 2 above the scanning line terminal section 11*a* and the common wiring line terminal section 13*a* are removed by etching to expose the signal line terminal 35 comprised by the transparent conductive layer 40, and the scanning line terminal 15 and the common wiring terminal 16 comprised by the first conductor layer 10. Lastly, the active matrix substrate plate is completed by performing annealing at about 280° C.

In this embodiment, the structure of the signal line is the same as the signal structure used in Embodiment 3, but it may be the same as the signal structure in Embodiment 4.

Also, an alloy of Al—Nd is used for the first conductor layer, but as in Embodiment 1, the first conductor layer 10 may be a lamination of a nitride film of Al and a high melting point metal such as and Ti, or a three layer structure formed by laying an underlayer of a high melting point metal such as Ti below the Al layer, to form Ti, Al and Ti nitride layers. It may be a film made by laminating ITO on top of Cr. It is preferable that the atomic concentration of nitrogen in the nitride film of a high melting point metals be not lower than 25 a/o.

Further, in step 3, instead of the transparent conductive layer, a nitride film of a high melting point metal such as Ti may be used. Also, in step 2, the thickness of the metallic layer 30 may be about 50 nm, and in step 3, instead of the transparent conductive layer, on top of a high melting point metal such as Mo of about 50 nm thickness, for example, a film of about 200 nm thickness comprised by Al or an alloy of primarily Al may be deposited.

Also, in the above embodiment, the common wiring terminal and the scanning line terminal have the same structure, but it may utilize the silver bead method to be described later to make the same structure as the signal line terminal.

Productivity and the yield of the IPS-type active matrix substrate plate in Embodiment 6 are improved because it can be manufactured in four steps.

Also, in this active matrix substrate plate, at least in one perimeter section of the glass plate 1, end sections of the common wiring are linked to each other by the common wiring linking line, thereby enabling to lead out the common wiring terminal, and IPS-type active matrix substrate plate can be produced independently.

Also, in this active matrix substrate plate, the difference in the height of the common electrode and pixel electrode section is made small, so that orientation control in the paneling step is facilitated.

Also, in this active matrix substrate plate, because the pixel electrode is formed by the transparent conductive layer, the aperture factor is improved. Conversely, when a lamination of a nitride film of a non-transparent high melting point metal or high melting point metal and Al or an alloy of primarily Al is used for the pixel electrode, effects of disturbance in orientation can be avoided when a voltage is impressed, and the contrast is improved.

Also, in this active matrix substrate plate, because the lateral surface of the semiconductor layer below the signal line is covered by the transparent conductive layer, the metal nitride film layer, or the metallic layer, when etching the $n^+$ amorphous silicon layer forming the channel of the TFT, the amorphous silicon layer of the semiconductor layer can be prevented from being infiltrated in the lateral direction to prevent difficulty of orientation control due to degradation in the protective condition of the protective insulation layer. Also, because the photo-resist coating is covering the metallic layer of the signal line and the semiconductor layer, when etching the transparent conductive layer, the metal nitride film layer, or the metallic layer in step 3, even if debris and foreign particles reside on the metallic layer, etching solution does not infiltrate into the interface between the transparent conductive layer and the metallic layer, thereby preventing severing of signal lines.

Also, in this active matrix substrate plate, because the scanning line is comprised by an Al—Nd alloy, it is possible to lower the wiring resistance of the scanning line and to secure reliability of connection of the scanning line driver at the scanning line terminal section. Also, when the transparent conductive layer is not used in step 3 in particular, Al or an alloy of primarily Al can be used for the signal line so that wiring resistance of the signal line can be reduced and to secure reliability of connection of the signal line driver at the signal line terminal section.

Also, in this active matrix substrate plate, because the semiconductor layer is formed in the lower layer of the signal line, as in Embodiment 3, dielectric strength of insulation layer of the scanning line, the common wiring and signal line is improved.

Embodiment 7

Figure 36A:
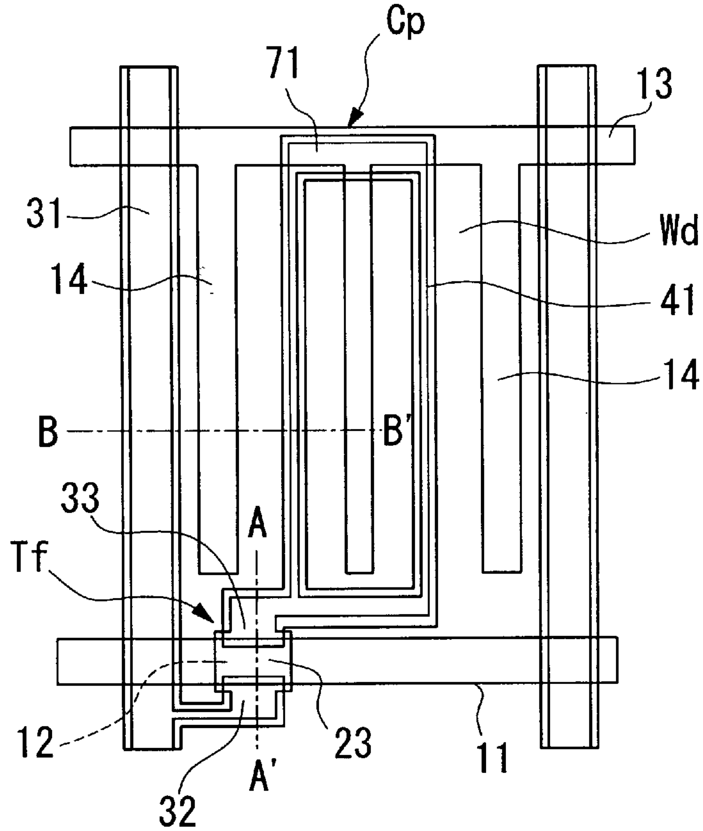
FIG. 36A is a perspective plan view of a one-pixel-region of the active matrix substrate plate in Embodiment 7.
Figure 36B:
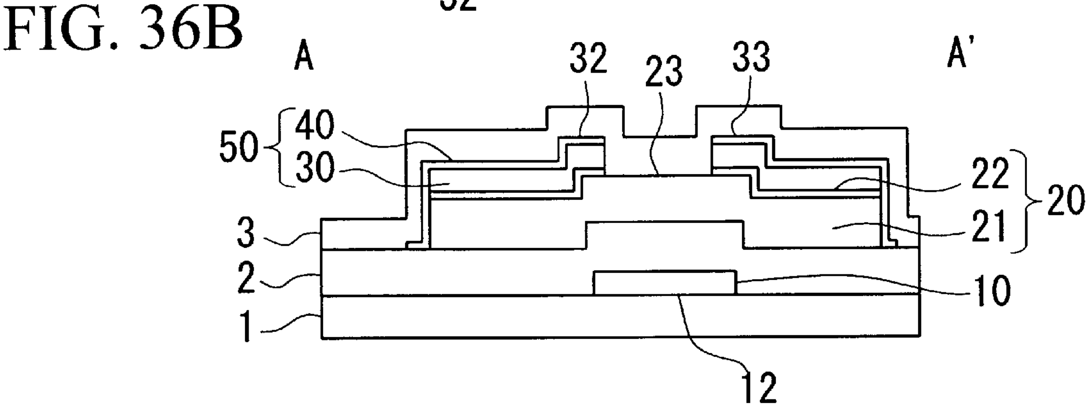
FIG. 36B is a cross sectional view through the plane A–A'.
Figure 36C:
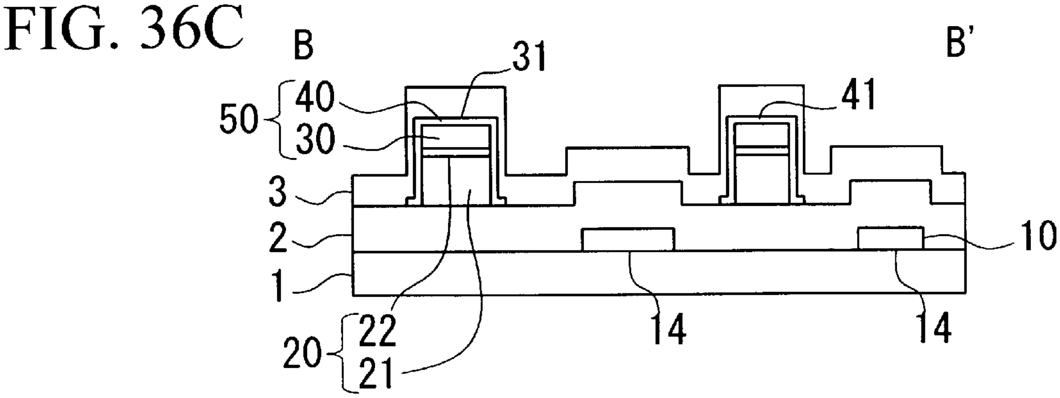
FIG. 36C is a cross sectional view through the plane B–B'.
Figure 37A:
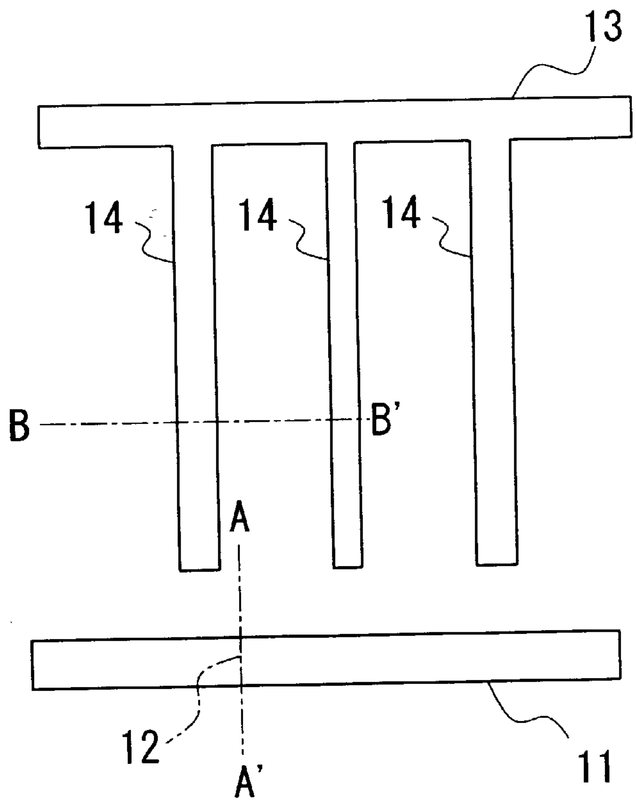
FIG. 37A is a perspective plan view of a one-pixel-region of the active matrix substrate plate in step 1 of the manufacturing method in Embodiment 7
Figure 37B:
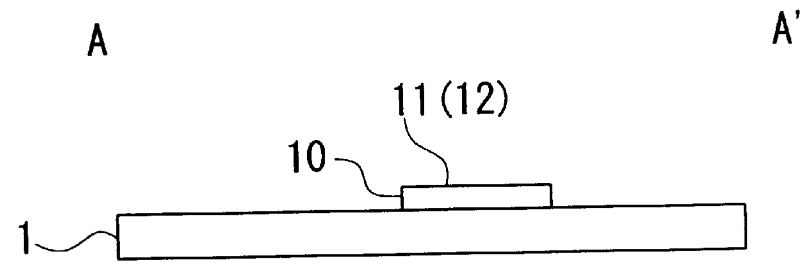
FIG. 37B is a cross sectional view through the plane A–A'.
Figure 37C:
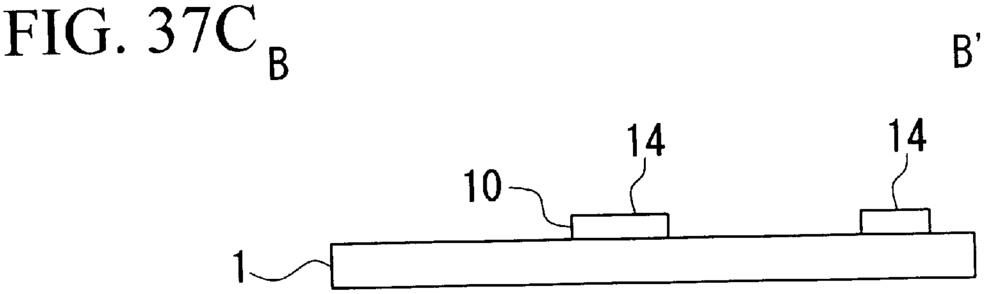
FIG. 37C is a cross sectional view through the plane B–B'.
Figure 38A:
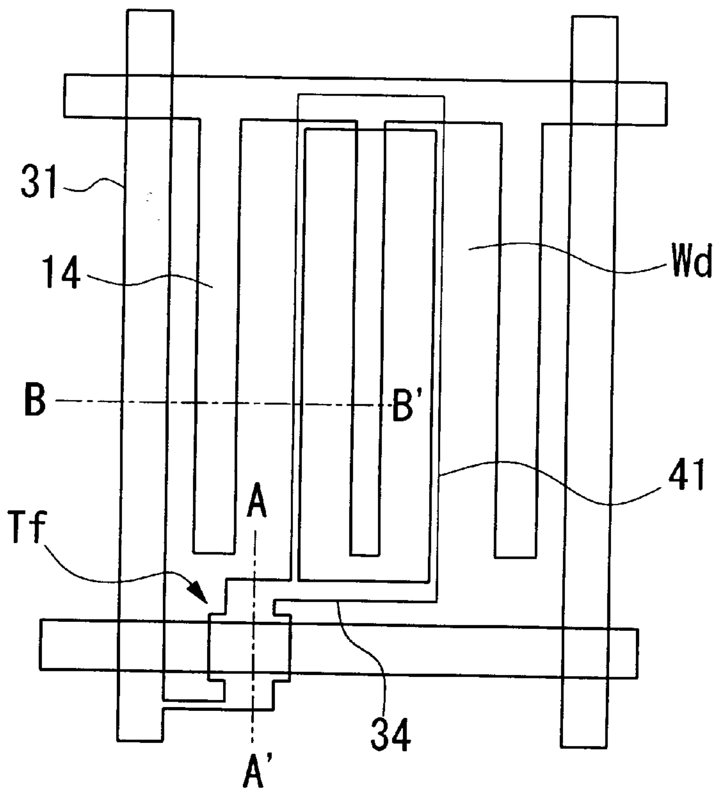
FIG. 38A is a perspective plan view of a one-pixel-region of the active matrix substrate plate in step 2 of the manufacturing method in Embodiment 7.
Figure 38B:
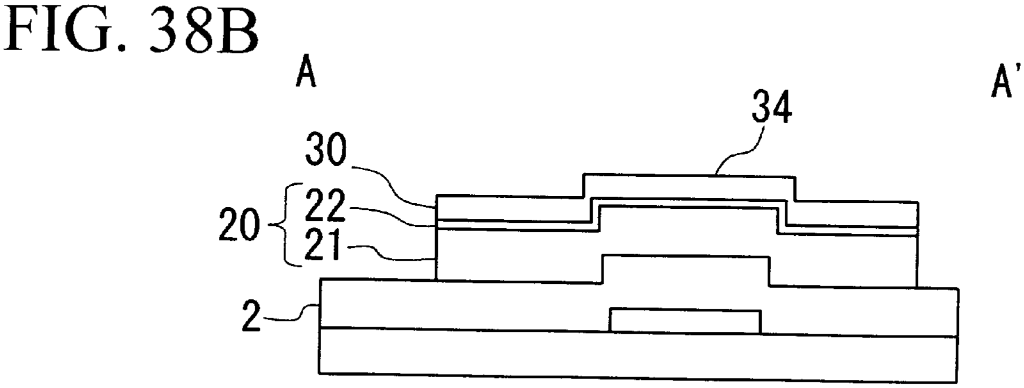
FIG. 38B is a cross sectional view through the plane A–A'.
Figure 38C:
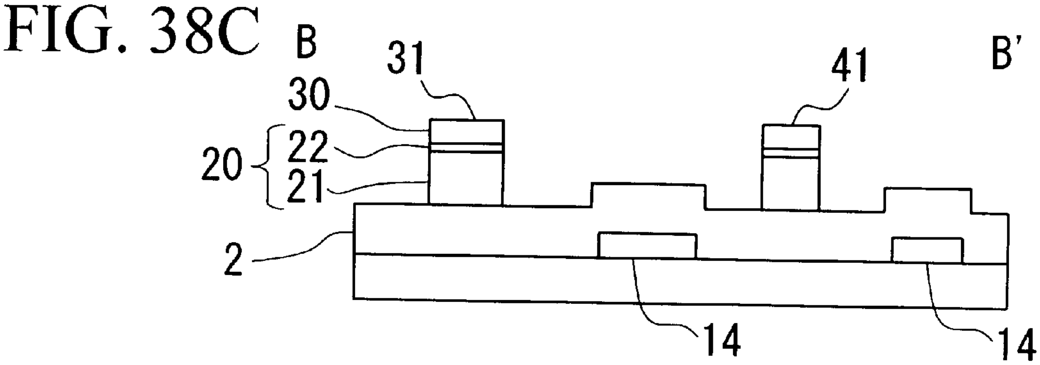
FIG. 38C is a cross sectional view through the plane B–B'.
Figure 39A:
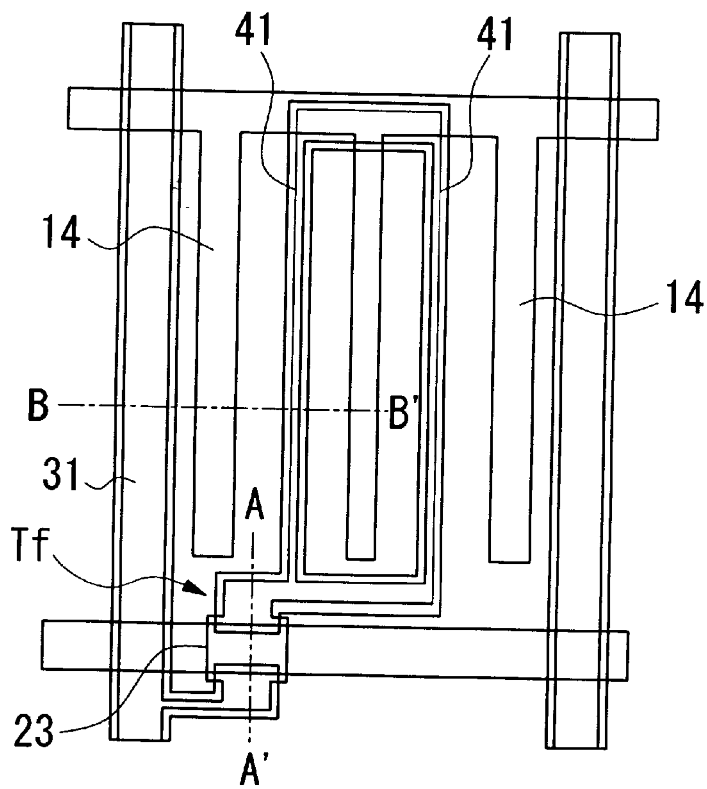
FIG. 39A is a perspective plan view of a one-pixel-region of the active matrix substrate plate in step 3 of the manufacturing method in Embodiment 7.
Figure 39B:
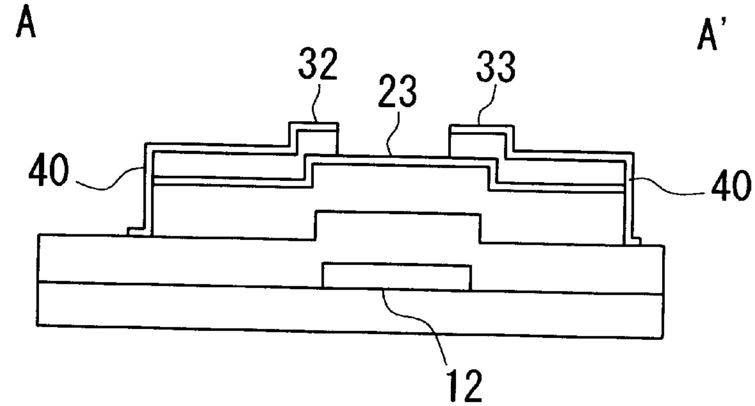
FIG. 39B is a cross sectional view through the plane A–A'.
Figure 39C:
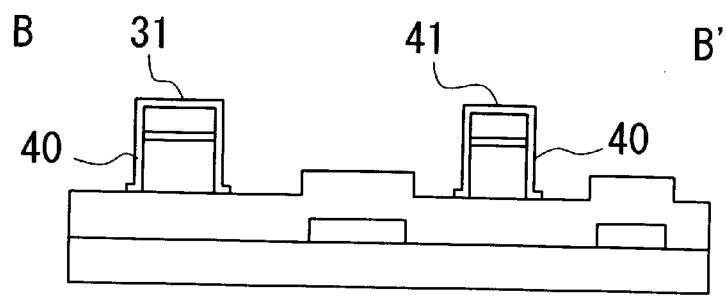
FIG. 39C is a cross sectional view through the plane B–B'.

FIG. 36A is a perspective plan view to show a one-pixel-region of the active matrix substrate plate in Embodiment 7, and FIG. 36B is a cross sectional view through the plane A–A', FIG. 36C is the same through the plane B–B'. FIGS. 37A–40B are diagrams to show the manufacturing steps of the active matrix substrate plate, and refer to steps 1–3, respectively, and a TFT after the channel has been formed therein. Similar to FIG. 36A, FIGS. 37A, 38A, and 39A are perspective plan views of a one-pixel-region, and FIGS. 37B, 37C, 38B, 38C, 39B, and 39C and FIGS. 40A, 40B are cross sectional views through the planes A–A' and B–B', respectively. FIG. 41A is a cross sectional view of the terminal section of the active matrix substrate plate in the longitudinal direction, in which the left side relates to a cross sectional view at the scanning line terminal location GS, the center relates to a cross sectional view at the signal line terminal location DS, and the right side relates to the common wiring terminal location CS, and FIGS. 41B–41D show manufacturing steps 1–3 for the terminal section part.

The active matrix substrate plate in Embodiment 7 is formed such that, a plurality of scanning lines 11 and common wiring lines 13 comprised by the first conductor layer 10 are arranged alternatingly in parallel on a glass plate 1, a plurality of signal lines 31 are arranged at right angles to the scanning lines 11 across a gate insulation layer 2, and in the vicinity of TFT section Tf formed in the intersection of the scanning line 11 and the signal line 31, a portion of the scanning line 11 acts as gate electrode 12, and this gate electrode 12, an island-shaped amorphous silicon layer 21 and an $n^+$ amorphous silicon layer 22 comprise a semiconductor layer 20 opposing the gate electrode across the gate insulation layer 2, and above this semiconductor layer, a pair of drain electrode 32 and source electrode 33 comprised by a second conductor layer 50 and formed with a gap of channel gap 23 comprise an inverted staggered structure TFT, and in a window section Wd surrounded by the scanning line 11 and the signal line 31 are formed a comb teeth shaped pixel electrode 41 and a comb teeth shaped common electrode 14 opposing the pixel electrode and connecting to the common wiring line 13, and the drain electrode 32 is connected to the signal line 31, the source electrode 33 is connected to the pixel electrode 41, respectively, to form an IPS-type active matrix substrate plate producing a horizontal electrical field between the pixel electrode 41 and the common electrode 14 with respect to the glass plate 1.

As in Embodiment 6, in this active matrix substrate plate, common wiring line 13 and common electrode 14 are formed on the same layer as the scanning line 11, and the common wiring line 13 is formed in such a way that, at least on one perimeter of the glass plate 1, the end section extends outside the end section of the same perimeter of the scanning line 11, and, as shown in FIGS. 52A, 52B, 52C, the end sections of the common wiring line 13 are linked together by a common wiring linking line 19, and are connected to the common wiring linking line 19 to form the common wiring terminal 16.

The first conductor layer 10 forming the scanning line 11, gate electrode 12 and common wiring line 13 is comprised by an alloy comprised by primarily Al containing Nd, for example. Also, the second conductor layer 50 forming the signal line 31, drain electrode 32, source electrode 33 and pixel electrode 41 is formed by laminating, in each case, the metallic layer 30 comprised by Cr or Mo on top of the transparent conductive layer 40 comprised by ITO. The semiconductor layer 20 of the same shape as the signal line and the pixel electrode is formed in the lower layer of the signal line 31 and the pixel electrode 41, and the semiconductor layer 20 and the metallic layer 30 of the signal line and the pixel electrode is covered by the transparent conductive layer 40.

The pixel electrode 41 forms an accumulation capacitance electrode 71 by extending a part to superimpose across the gate insulation layer 2 above the common wiring line 13 to oppose the accumulation common electrode 72 sharing a portion of the common wiring line 13 to construct the accumulation capacitance section Cp in this pixel region.

The active matrix substrate plate in Embodiment 7 is manufactured according to the following four steps.

(Step 1) as shown in FIGS. 37A–37C and FIG. 41B, by sputtering on the glass plate 1, an alloy of Al—Nd of about 250 nm thickness is deposited to form the first conductor layer 10, and through photolithographic processes, excepting the scanning line 11, scanning line terminal section 11*a* formed in the scanning line terminal location GS, common wiring line 13, common wiring linking line (not shown) to bind the common wiring lines 13 in the outer peripheral section Ss, common wiring line terminal section 13*a* connected to the common wiring linking line and formed in the common wiring terminal location CS, and in the respective pixel regions, gate electrode 12 sharing a portion of the scanning line 11, and a plurality of common electrodes 14 extending from the common wiring line 13, the first conductor layer 10 is removed by etching.

(Step 2) as shown in FIGS. 38A–38C and FIG. 41C, on the above substrate plate, gate insulation layer 2 comprised by silicon nitride film of about 400 nm thickness is formed by continually applying plasma CVD, and a semiconductor layer 20 comprised by amorphous silicon layer 21 of about 250 nm thickness and $n^+$ amorphous silicon layer 22 of about 50 nm thickness is formed, and continuing with sputtering, the metallic layer 30 comprised by Mo of about 250 nm thickness is deposited, and using photolithographic processes, excepting the signal line 31, signal line terminal section 31*a* formed in the signal line terminal location DS, and within respective pixel regions, the protrusion section 34 extending from the signal line 31 towards the window section Wd through the TFT section Tf, the pixel electrode 41 extending from the protrusion section 34 towards the common electrode 14 across the gate insulation layer 2, the metallic layer 30 and the semiconductor layer 20 are removed successively by etching.

(Step 3) as shown in FIGS. 39A–39C and FIG. 41D, by sputtering on the above substrate plate, the transparent conductive layer 40 comprised by ITO of about 50 nm thickness is formed, and through photolithographic processes, excepting the signal line 31 and the portion covering the lateral surface, the portion covering the signal line terminal section 31*a* formed in the signal line terminal location DS, and within the respective pixel regions, the drain electrode 32 extending from the signal line 31 to the TFT section Tf formed above the gate electrode 12 within the respective pixel regions, the portion covering the pixel electrode 41 extending across the gate insulation layer 2 to the window section Wd opposite to the common electrode 14, and source electrode 33 extending from the pixel electrode 41 towards TFT section Tf and separated from the drain electrode 32 by the opposing channel gap 23, the transparent conductive layer 40 is removed by etching, and next, the exposed metallic layer 30 is removed by etching. In this case, a portion of the pixel electrode 41 is extended so as to superimpose on a portion of the common wiring line 13 at the accumulation capacitance section Cp to form the accumulation capacitance electrode 71.

Figure 40A:
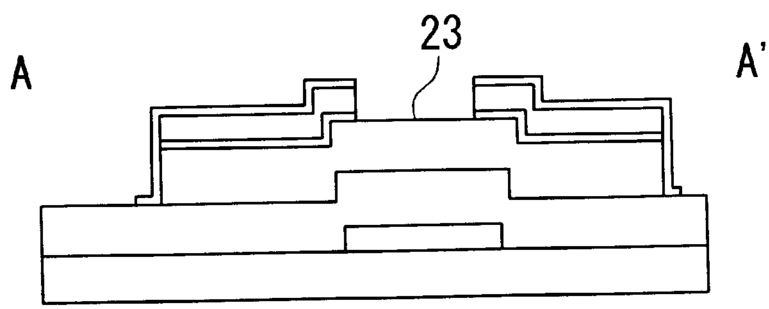
FIGS. 40A–40B are cross sectional views of a channel-formed TFT in active matrix substrate plate manufacturing Embodiment 7.
Figure 40B:
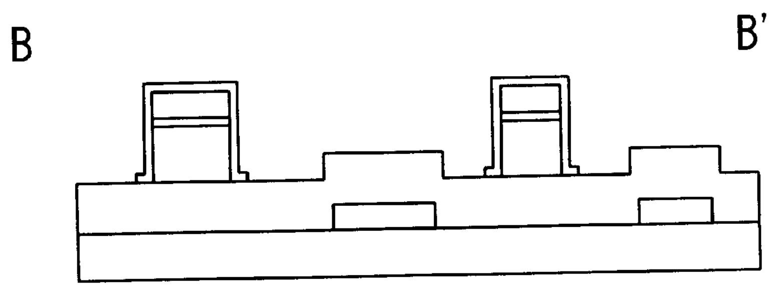
Figures 41A, 41B, 41C, 41D:
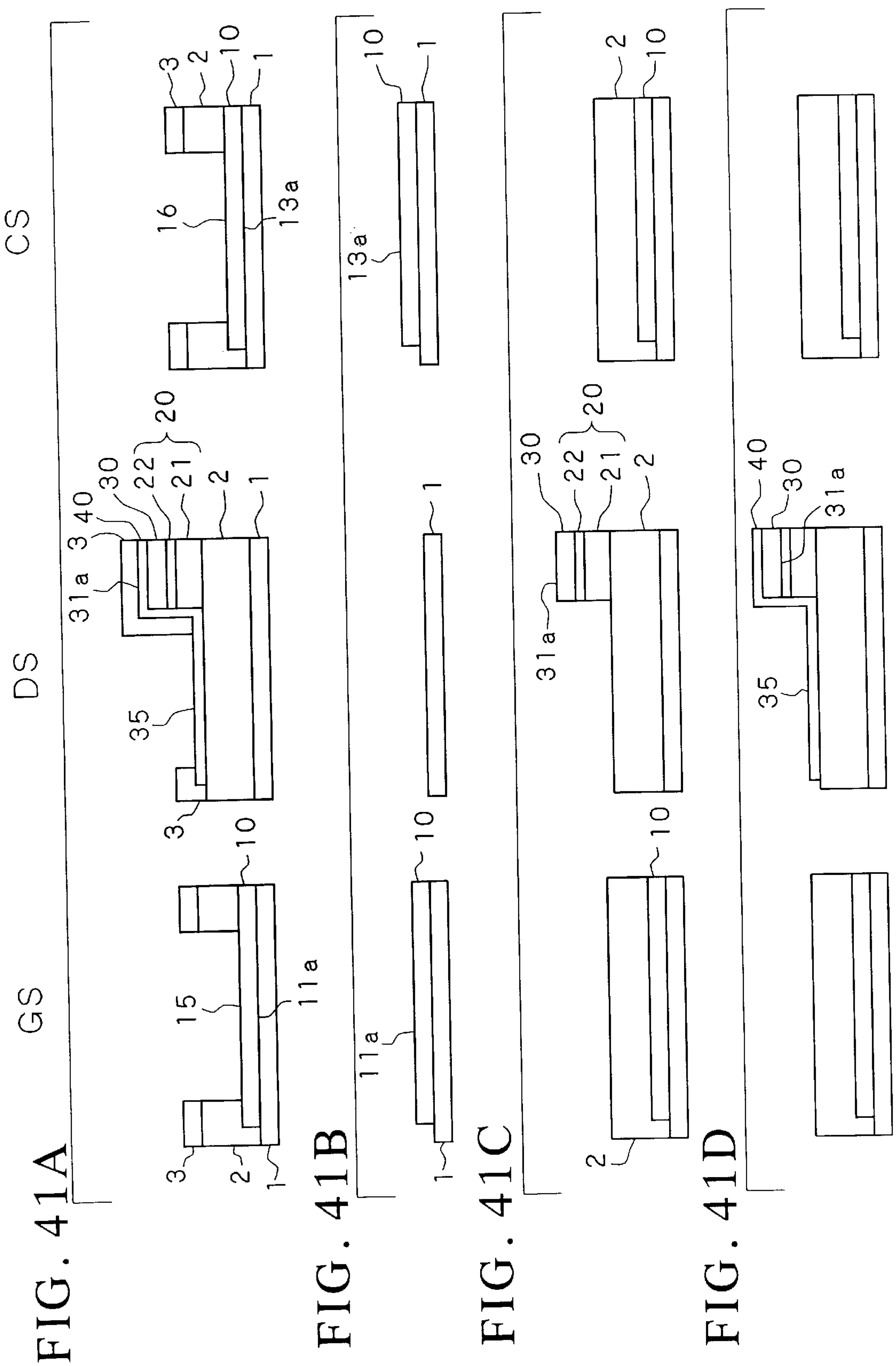
FIG. 41A is a cross sectional view in the longitudinal direction of a terminal section of the active matrix substrate plate in Embodiment 7, and the left side relates to the scanning line terminal section and the center relates to the signal line terminal section and the right side relates to the common wiring line terminal section.
FIGS. 41B–41D are cross sectional views relating to manufacturing step 1–step 3, respectively.

Next, as shown in FIGS. 40A, 40B, using the masking pattern used in the etching process or the transparent conductive layer 40 after removing its masking, the exposed $n^+$ amorphous silicon layer 22 is removed by etching to form the channel gap 23.

(Step 4) as shown in FIGS. 36A–36C and FIG. 41A, on the above substrate plate the protective insulation layer 3 of about 300 nm thickness comprised by silicon nitride film is deposited using plasma CVD process, and through photolithographic processes, the protective insulation layer 3 above the signal line terminal section 31*a*, and the protective insulation layer 3 and the gate insulation layer 2 above the scanning line terminal section 11*a* and the common wiring line terminal section 13*a* are removed by etching to expose the signal line terminal 35 comprised by the transparent conductive layer 40, and the scanning line terminal 15 and the common wiring terminal 16 comprised by the first conductor layer 10. Lastly, the active matrix substrate plate is completed by performing annealing at about 280° C.

In this case, the structure of the signal line is the same as the signal structure used in Embodiment 3, but it may be the same as the signal structure in Embodiment 4.

Also, an alloy of Al—Nd is used for the first conductor layer, but as in Embodiment 1, the first conductor layer 10 may be a lamination of a nitride film of Al and a high melting point metal such as and Ti, or a three layer structure formed by laying an underlayer of a high melting point metal such as Ti below the Al layer, to form Ti, Al and Ti nitride layers. It may be a film made by laminating ITO on top of Cr. It is preferable that the atomic concentration of nitrogen in the nitride film of a high melting point metals be not lower than 25 a/o.

Further, in step 3, instead of the transparent conductive layer, a nitride film of a high melting point metal such as Ti may be used. Also, in step 2, the thickness of the metallic layer 30 may be about 50 nm, and in step 3, instead of the transparent conductive layer, on top of a high melting point metal such as Mo of about 50 nm thickness, for example, a film of about 200 nm thickness comprised by Al or an alloy of primarily Al may be deposited.

Also, in the above embodiment, the common wiring terminal and the scanning line terminal have the same structure, but it may utilize the silver bead method to be described later to make the same structure as the signal line terminal.

Productivity and the yield of the IPS-type active matrix substrate plate in Embodiment 7 are improved because it can be manufactured in four steps.

Also, in this active matrix substrate plate, at least in one perimeter section of the glass plate 1, end sections of the common wiring are linked to each other by the common wiring linking line, thereby enabling to lead out the common wiring terminal, and IPS-type active matrix substrate plate can be produced independently.

Also, effects resulting from covering the signal lines and the semiconductor layer by using a transparent conductive layer or a nitride layer of a metal or a metallic layer, lowering the resistively of scanning and signal lines, improving the reliability of connection at the terminal section and improving the dielectric strength of the insulation layer are exactly the same as those in Embodiment 6.

Embodiment 8

Figure 42A:
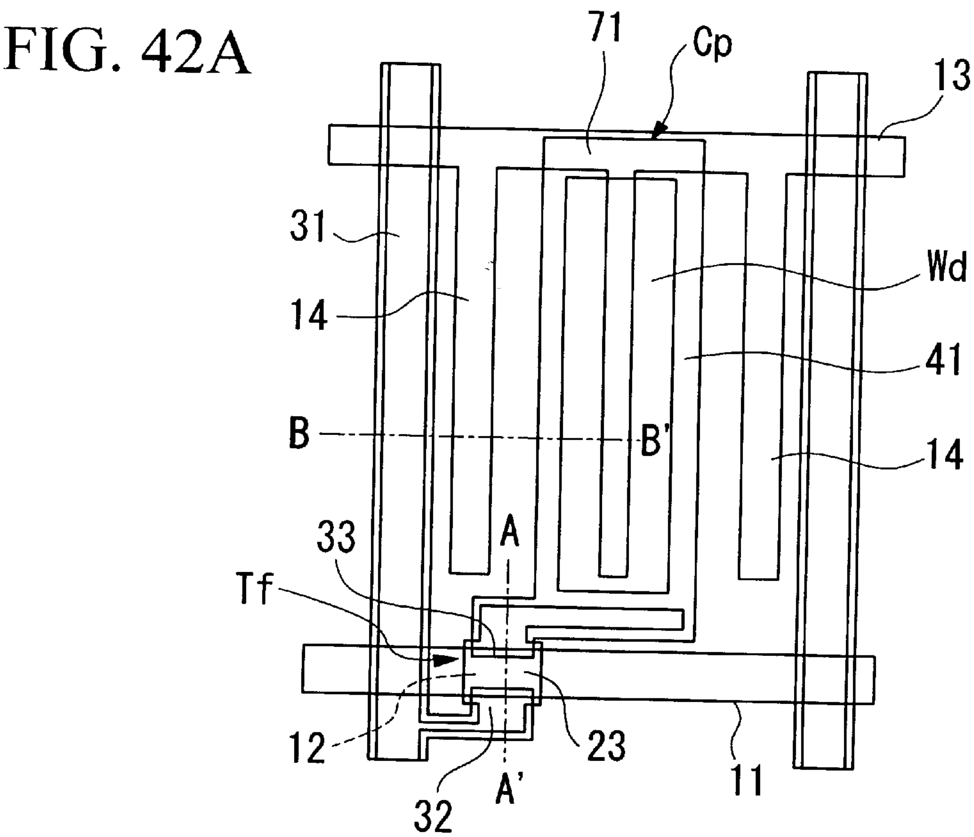
FIG. 42A is a perspective plan view of a one-pixel-region of the active matrix substrate plate in Embodiment 8.
Figure 42B:
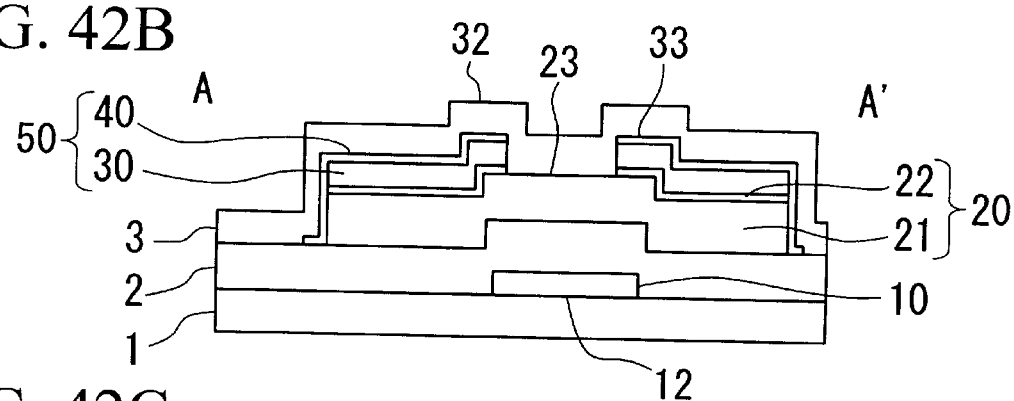
FIG. 42B is a cross sectional view through the plane A–A'.
Figure 42C:
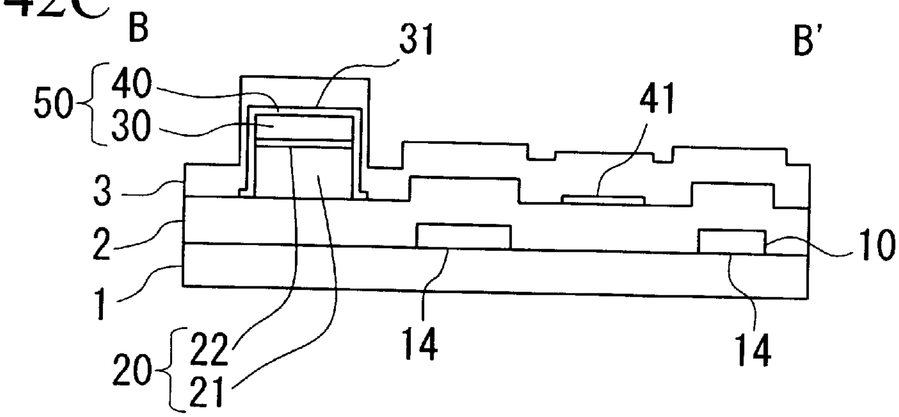
FIG. 42C is a cross sectional view through the plane B–B'.
Figure 43A:
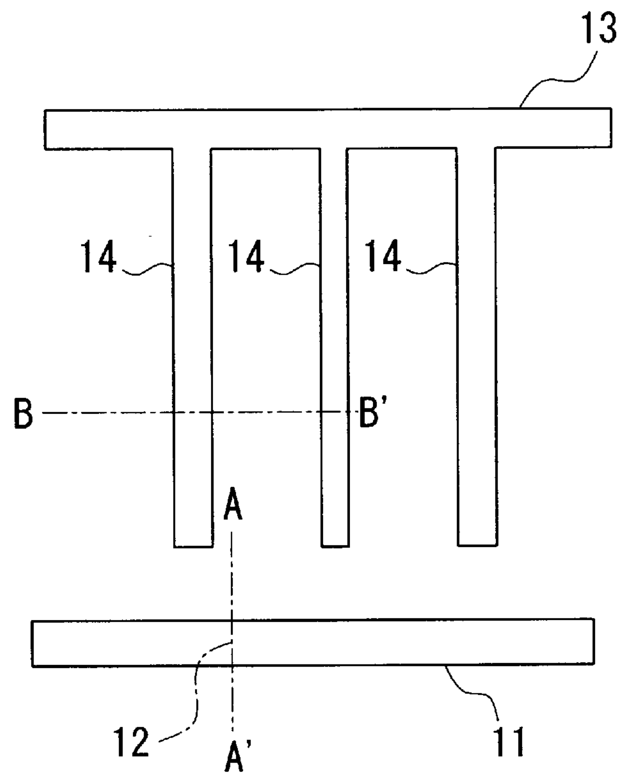
FIG. 43A is a perspective plan view of a one-pixel-region of the active matrix substrate plate in step 1 of the manufacturing method in Embodiment 8.
Figure 43B:
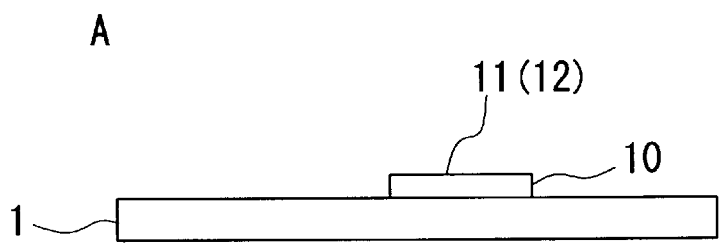
FIG. 43B is a cross sectional view through the plane A–A'.
Figure 43C:
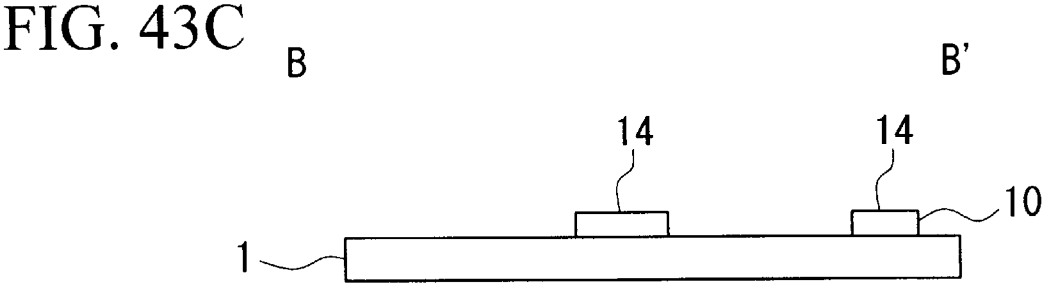
FIG. 43C is a cross sectional view through the plane B–B'.
Figure 44A:
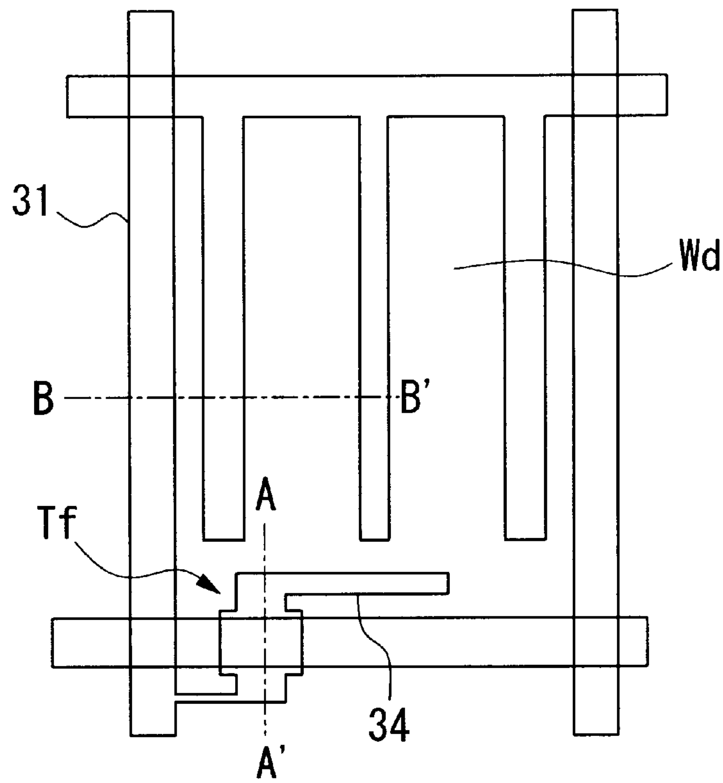
FIG. 44A is a perspective plan view of a one-pixel-region of the active matrix substrate plate in step 2 of the manufacturing method in Embodiment 8.
Figure 44B:
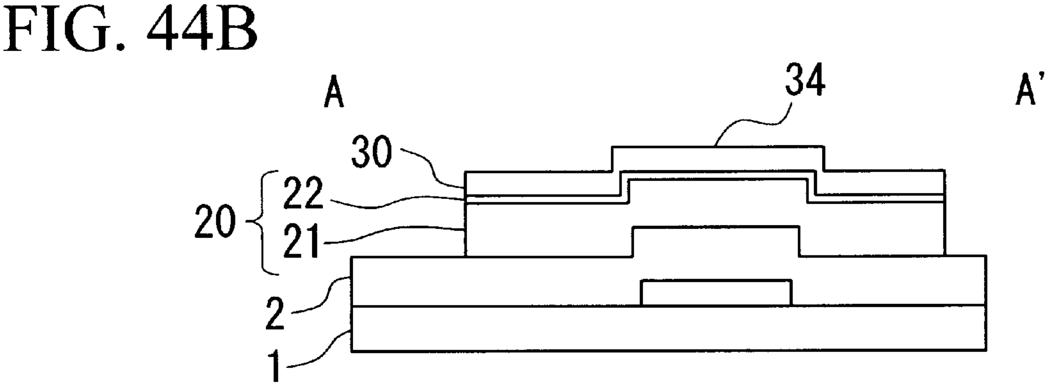
FIG. 44B is a cross sectional view through the plane A–A'.
Figure 44C:
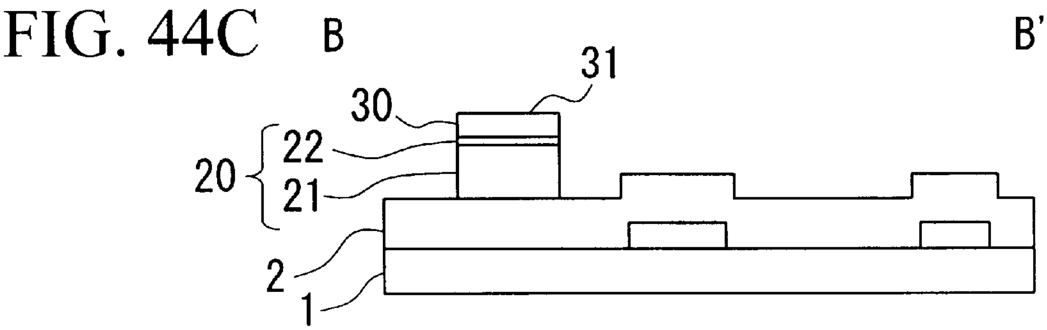
FIG. 44C is a cross sectional view through the plane B–B'.
Figure 45A:
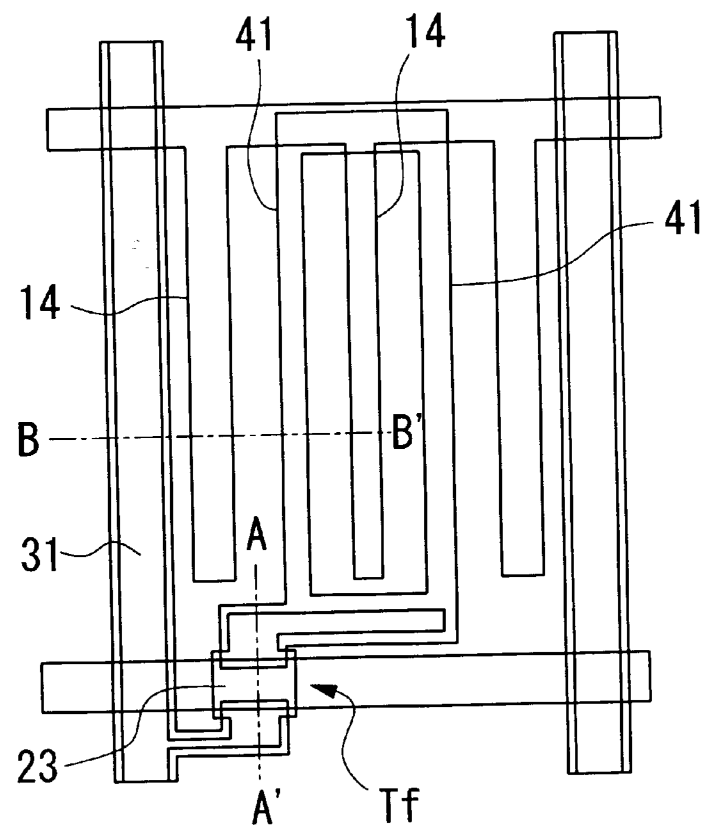
FIG. 45A is a perspective plan view of a one-pixel-region of the active matrix substrate plate in step 3 of the manufacturing method in Embodiment 8.
Figure 45B:
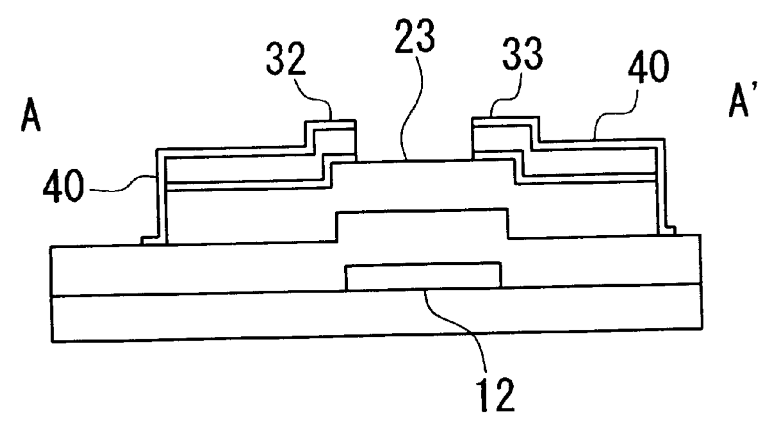
FIG. 45B is a cross sectional view through the plane A–A'.
Figure 45C:
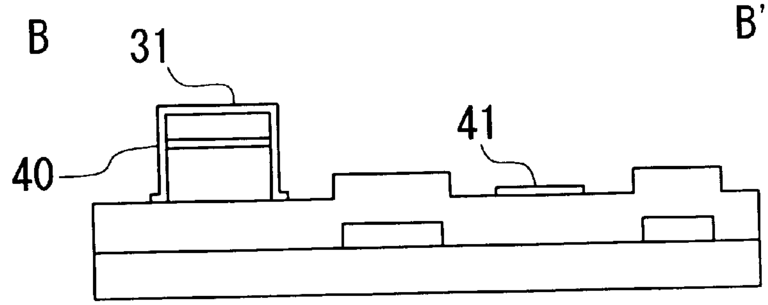
FIG. 45C is a cross sectional view through the plane B–B'.
Figures 46A, 46B, 46C, 46D:
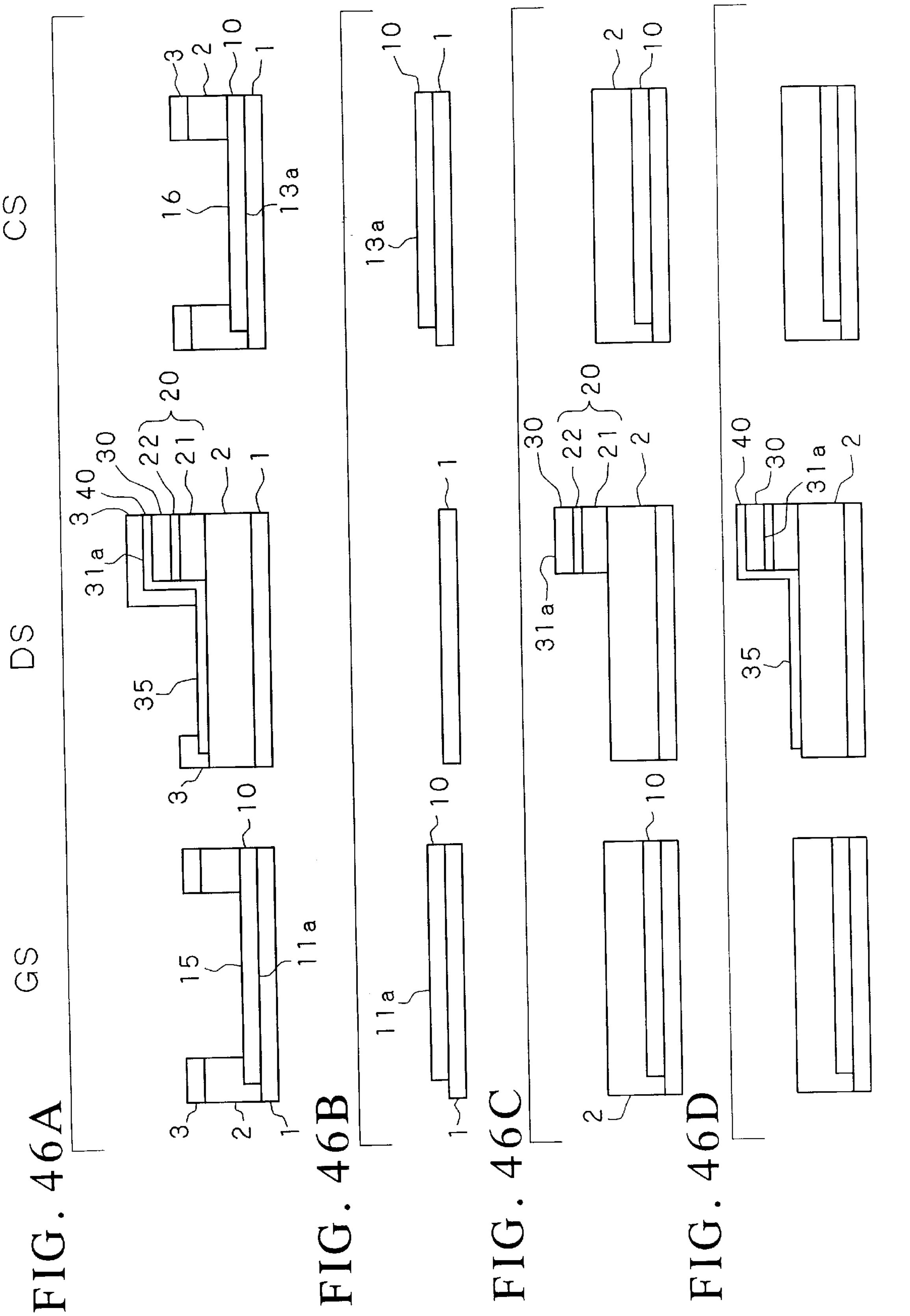
FIG. 46A is a cross sectional view in the longitudinal direction of a terminal section of the active matrix substrate plate in Embodiment 8, and the left side relates to the scanning line terminal section and the center relates to the signal line terminal section and the right side relates to the common wiring line terminal section.
FIGS. 46B–46D are cross sectional views relating to manufacturing step 1–step 3, respectively.

FIG. 42A is a perspective plan view to show a one-pixel-region of the active matrix substrate plate in Embodiment 8, and FIG. 42B is a cross sectional view through the plane A–A', FIG. 42C is the same through the plane B–B'. FIGS. 43A–45C are diagrams to show the manufacturing steps of the active matrix substrate plate, and refer to steps 1–3, respectively. Similar to FIG. 42A, FIGS. 43A, 44A, and 45A are perspective plan views of a one-pixel-region, and FIGS. 43B, 43C, 44B, 44C, 45B, 45C are cross sectional views through the planes A–A' and B–B', respectively. FIG. 46A is a cross sectional view of the terminal section of the active matrix substrate plate in the longitudinal direction, in which the left side relates to a cross sectional view at the scanning line terminal location GS, the center relates to a cross sectional view at the signal line terminal location DS, and the right side relates to the common wiring terminal location CS, and FIGS. 46B–46D show manufacturing steps 1–3 for the terminal section part.

The active matrix substrate plate in Embodiment 8 is formed such that, a plurality of scanning lines 11 and common wiring lines 13 comprised by the first conductor layer 10 are arranged alternatingly in parallel on a glass plate 1, a plurality of signal lines 31 are arranged at right angles to the scanning lines 11 across a gate insulation layer 2, and in the vicinity of TFT section Tf formed in the intersection of the scanning line 11 and the signal line 31, a portion of the scanning line 11 acts as the gate electrode 12, and this gate electrode 12, an island-shaped amorphous silicon layer 21 and an $n^+$ amorphous silicon layer 22 comprise a semiconductor layer 20 opposing the gate electrode across the gate insulation layer 2, and above this semiconductor layer, a pair of drain electrode 32 and source electrode 33 comprised by a second conductor layer 50 and formed with a gap of channel gap 23 comprise an inverted staggered structure TFT, and in a window section Wd surrounded by the scanning line 11 and the signal line 31 are formed a comb teeth shaped pixel electrode 41 and a comb teeth shaped common electrode 14 opposing the pixel electrode and connecting to the common wiring line 13, and the drain electrode 32 is connected to the signal line 31, the source electrode 33 is connected to the pixel electrode 41, respectively, to form an IPS-type active matrix substrate plate producing a horizontal electrical field between the pixel electrode 41 and the common electrode 14 with respect to the glass plate 1.

As in Embodiment 6, in this active matrix substrate plate, common wiring line 13 and common electrode 14 are formed on the same layer as the scanning line 11, and the common wiring line 13 is formed in such a way that, at least on one perimeter of the glass plate 1, the end section extends outside the end section of the same perimeter of the scanning line 11, and, as shown in FIGS. 52A, 52B, and 52C, the end sections of the common wiring line 13 are linked together by a common wiring linking line 19, and are connected to the common wiring linking line 19 to form a common wiring terminal 16.

The first conductor layer 10 forming the scanning line 11, gate electrode 12 and common wiring line 13 is comprised of an alloy of primarily of Al containing Nd, for example. Also, the second conductor layer 50 forming the signal line 31, drain electrode 32, source electrode 33 and pixel electrode 41 is formed by laminating, in each case, the metallic layer 30 comprised by Mo or Cr on top of the transparent conductive layer 40 comprised by ITO. The semiconductor layer 20 of the same shape as the signal line is formed below the signal line 31, and the semiconductor layer 20 and the metallic layer 30 of the signal line are covered by the transparent conductive layer 40. The pixel electrode 41 is formed by the transparent conductive layer 40 comprised by ITO.

In this embodiment, the $n^+$ amorphous silicon layer 22 in the TFT section Tf is formed by doping with a group V element P, and the thickness of ohmic contact layer is in a range of 3–6 nm.

The pixel electrode 41 forms an accumulation capacitance electrode 71 by extending a part to superimpose across the gate insulation layer 2 above the common wiring line 13 to oppose the accumulation common electrode 72 sharing a portion of the common wiring line 13 to construct the accumulation capacitance section Cp in this pixel region.

The active matrix substrate plate in Embodiment 8 is manufactured according to the following four steps.

(Step 1) as shown in FIGS. 43A–43C and FIG. 46B, by sputtering on the glass plate 1, an alloy of Al—Nd of about 250 nm thickness is deposited to form the first conductor layer 10, and through photolithographic processes, excepting the scanning line 11, scanning line terminal section **11*a* formed in the scanning line terminal location GS, common wiring line 13, common wiring linking line (not shown) to bind the common wiring lines 13 in the outer peripheral section Ss, common wiring line terminal section 13*a* connected to the common wiring linking line and formed in the common wiring terminal location CS, and in the respective pixel regions, gate electrode 12 sharing a portion of the scanning line 11, and a plurality of common electrodes 14 extending from the common wiring line 13, the first conductor layer 10** is removed by etching.

(Step 2) as shown in FIGS. 44A–44C and FIG. 46C, on the above substrate plate, gate insulation layer 2 comprised by silicon nitride film of about 400 nm thickness and the amorphous silicon layer 21 of about 100 nm thickness are deposited by continually applying plasma CVD, and using a $PH_3$ plasma P-doping technique under the same vacuum pressure, and after forming an ohmic contact layer comprised by $n^+$ amorphous silicon layer of 3–6 nm thickness on the surface of the amorphous silicon layer 21, a metallic layer 30 comprised by Mo of about 250 nm thickness is sputtered, and through photolithographic processes, excepting the signal line 31, signal line terminal section **31*a* formed in the signal line terminal location DS, and within the respective pixel regions, the protrusion section 34 extending from the signal line 31 towards the window section Wd through the TFT section Tf, the metallic layer 30 and the semiconductor layer 20** are removed successively by etching.

(Step 3) as shown in FIGS. 45A–45C and FIG. 46D, by sputtering on the above substrate plate, ITO of about 50 nm thickness is deposited by sputtering to form the transparent conductive layer 40, and through photolithographic processes, excepting the signal line 31 and the portion covering the lateral surface, the portion covering the signal line terminal section **31*a* formed in the signal line terminal location DS, within the respective pixel regions, drain electrode 32 extending from the signal line 31 to the TFT section Tf formed above the gate electrode 12, the pixel electrode 41 extending across the gate insulation layer 2 to the window section Wd opposite to the common electrode 14, and source electrode 33 extending from the pixel electrode 41 towards TFT section Tf and separated from the drain electrode 32 by the opposing channel gap 23, the transparent conductive layer 40 is removed by etching, and next, the exposed metallic layer 30 and the $n^+$ amorphous silicon layer 22 formed by P-doping are removed by etching to form channel gap 23. In this case, a portion of the pixel electrode 41 is extended so as to superimpose on a portion of the common wiring line 13 at the accumulation capacitance section Cp to form the accumulation capacitance electrode 71**.

(Step 4) as shown in FIGS. 42A–42C and FIG. 46A, on the above substrate plate the protective insulation layer 3 of about 300 nm thickness comprised by silicon nitride film is deposited using plasma CVD process, and through photolithographic processes, the protective insulation layer 3 above the signal line terminal section **31*a*, and the protective insulation layer 3 and the gate insulation layer 2 above the scanning line terminal section 11*a* and the common wiring line terminal section 13*a* are removed by etching to expose the signal line terminal 35 comprised by the transparent conductive layer 40, and the scanning line terminal 15 and the common wiring terminal 16 comprised by the first conductor layer 10**. Lastly, the active matrix substrate plate is completed by performing annealing at about 280° C.

In this case, the structure of the signal line is the same as the signal structure used in Embodiment 3, but it may be the same as the signal structure in Embodiment 4.

Also, an alloy of Al—Nd is used for the first conductor layer, but as in Embodiment 1, a lamination of nitride films of Al and a high melting point metal such as Ti may be used for the first conductor layer, but a three layer structure formed by laying an underlayer of a high melting point metal such as Ti below the Al layer, to form Ti, Al and Ti nitride layers may be used. It may be a film made by laminating ITO on top of Cr. It is preferable that the atomic concentration of nitrogen in the nitride film of a high melting point metals be not lower than 25 a/o.

Further, in step 3, instead of the transparent conductive layer, a nitride film of a high melting point metal such as Ti may be used. Also, in step 2, the thickness of the metallic layer 30 may be about 50 nm, and in step 3, instead of the transparent conductive layer, a film of about 200 nm thickness comprised by Al or an alloy of primarily Al may be deposited on top of a high melting point metal such as Mo of about 50 nm thickness, for example.

Also, in the above embodiment, the common wiring terminal and the scanning line terminal have the same structure, but it may utilize the silver bead method to be described later to make the same structure as the signal line terminal.

Productivity and the yield of the IPS-type active matrix substrate plate in Embodiment 8 are improved because it can be manufactured in four steps.

Also, in this active matrix substrate plate, at least in one perimeter section of the glass plate 1, end sections of the common wiring are linked to each other by the common wiring linking line, thereby enabling to lead out the common wiring terminal, and IPS-type active matrix substrate plate can be produced independently.

Also, in this active matrix substrate plate, the difference in the height of the common electrode and pixel electrode section is made small, so that orientation control in the paneling step is facilitated.

Also, in this active matrix substrate plate, because the pixel electrode is formed by the transparent conductive layer, the aperture factor is improved. Conversely, when a lamination of a nitride film of a non-transparent high melting point metal or high melting point metal and Al or an alloy of primarily Al is used for the pixel electrode, effects of disturbance in orientation can be avoided when a voltage is impressed, and the contrast is improved.

Also, because this active matrix substrate plate can be manufactured by etching the ohmic contact layer above the semiconductor layer concurrently with the drain electrode and source electrode at the time of their etching, and the semiconductor layer can be made thin at about 100 nm thickness, productivity can be increased and at the same time, the resistance in the vertical direction of the semiconductor layer can be reduced to improve writing capability of TFT.

Also, effects resulting from covering the signal lines and the semiconductor layer by using a transparent conductive layer or a nitride layer of a metal or a metallic layer, lowering the resistively of scanning and signal lines, improving reliability of connection at the terminal section and improving the dielectric strength of the insulation layer are exactly the same as those in Embodiment 6.

Embodiment 9

Figure 47A:
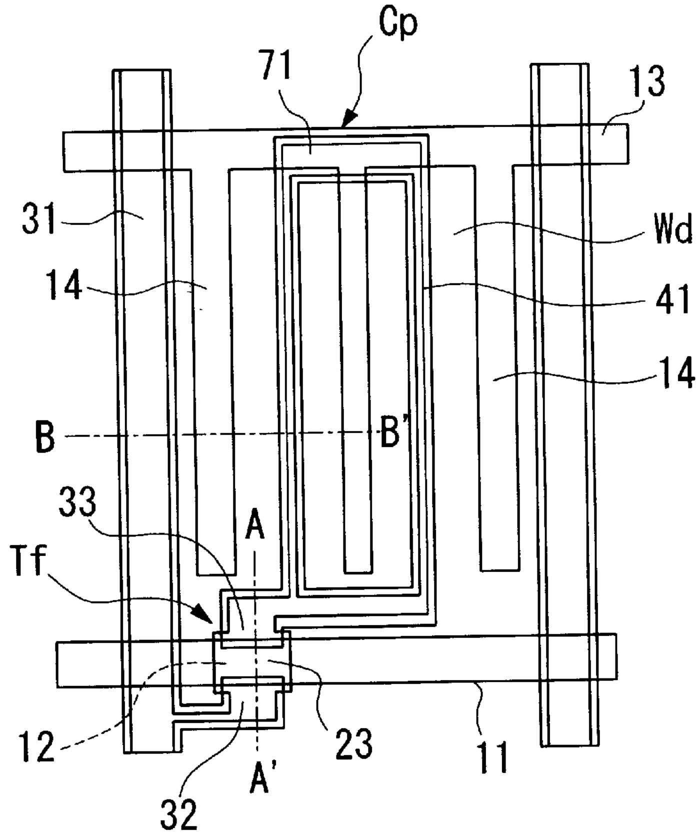
FIG. 47A is a perspective plan view of a one-pixel-region of the active matrix substrate plate in Embodiment 9.
Figure 47B:
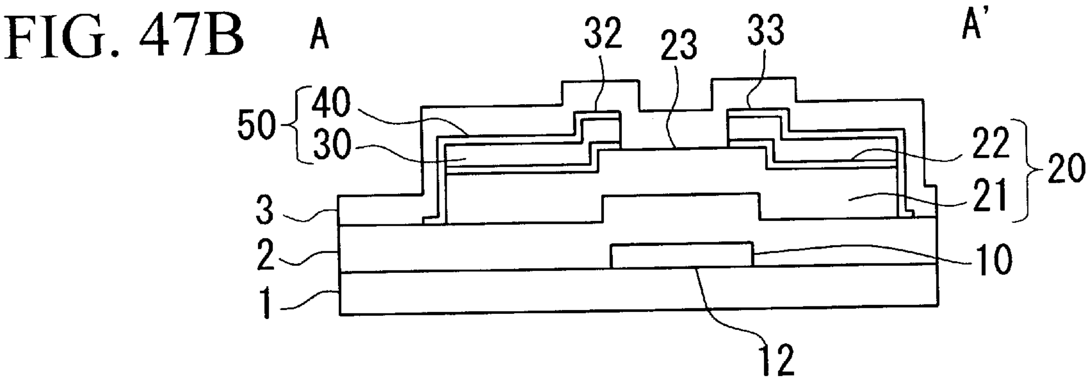
FIG. 47B is a cross sectional view through the plane A–A'.
Figure 47C:
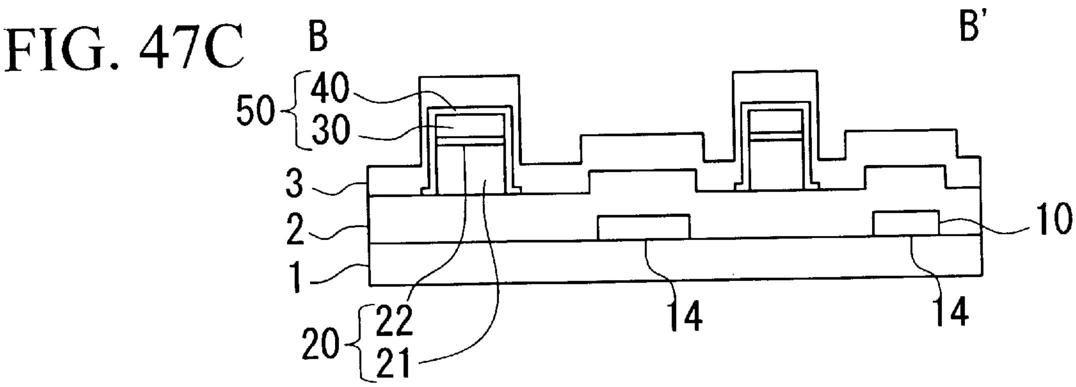
FIG. 47C is a cross sectional view through the plane B–B'.
Figure 48A:
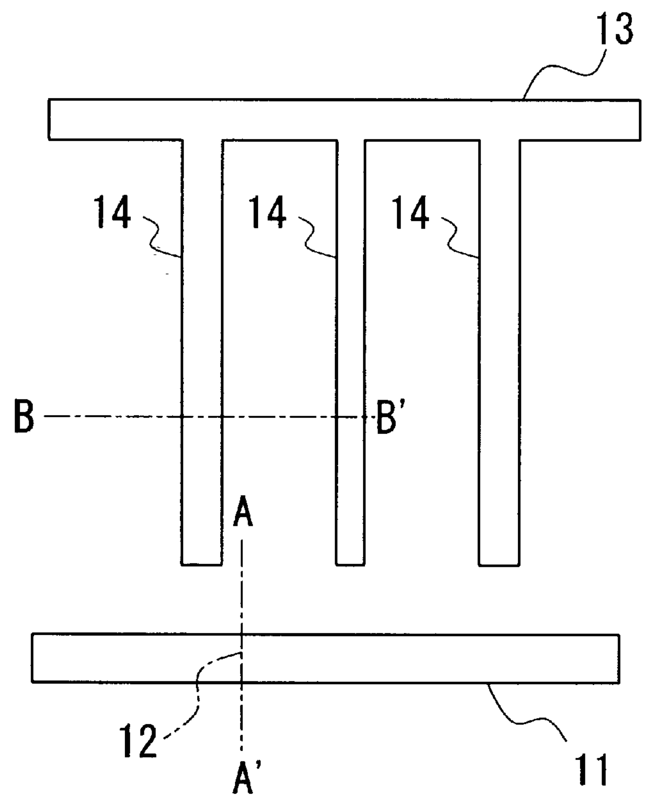
FIG. 48A is a perspective plan view of a one-pixel-region of the active matrix substrate plate in step 1 of the manufacturing method in Embodiment 9.
Figure 48B:
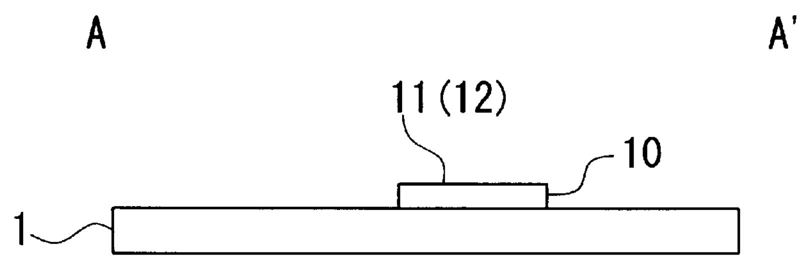
FIG. 48B is a cross sectional view through the plane A–A'.
Figure 48C:
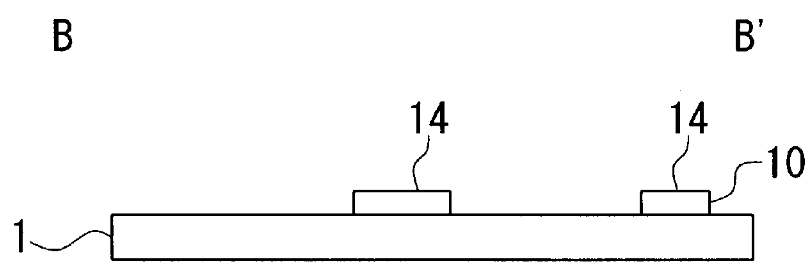
FIG. 48C is a cross sectional view through the plane B–B'.
Figure 49A:
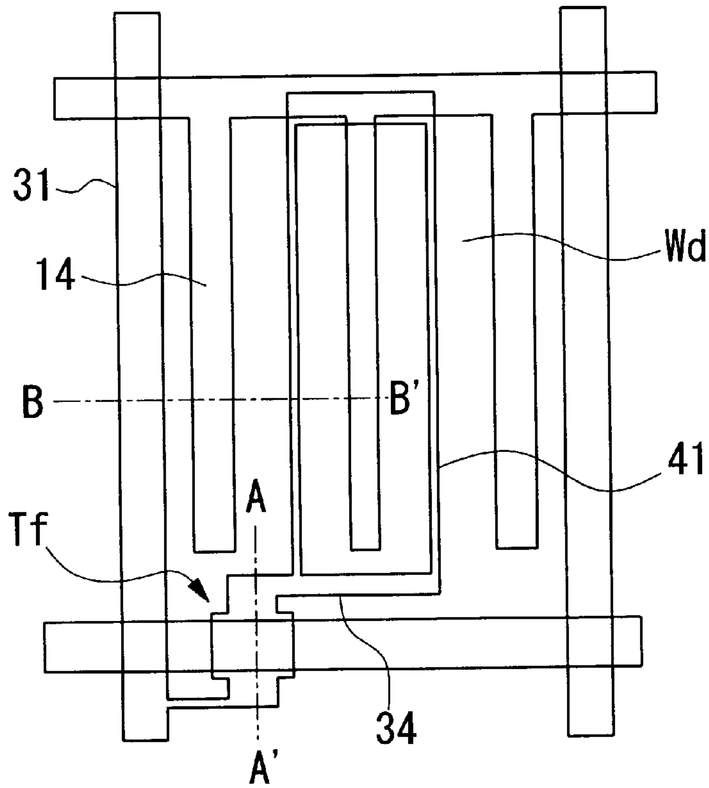
FIG. 49A is a perspective plan view of a one-pixel-region of the active matrix substrate plate in step 2 of the manufacturing method in Embodiment 9.
Figure 49B:
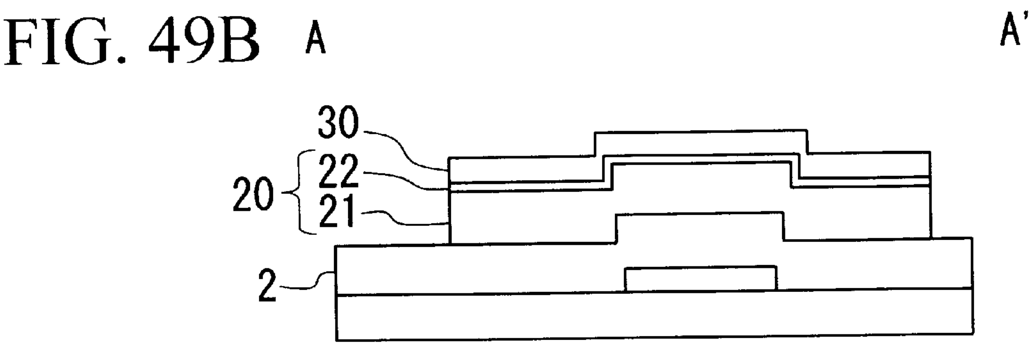
FIG. 49B is a cross sectional view through the plane A–A'.
Figure 49C:
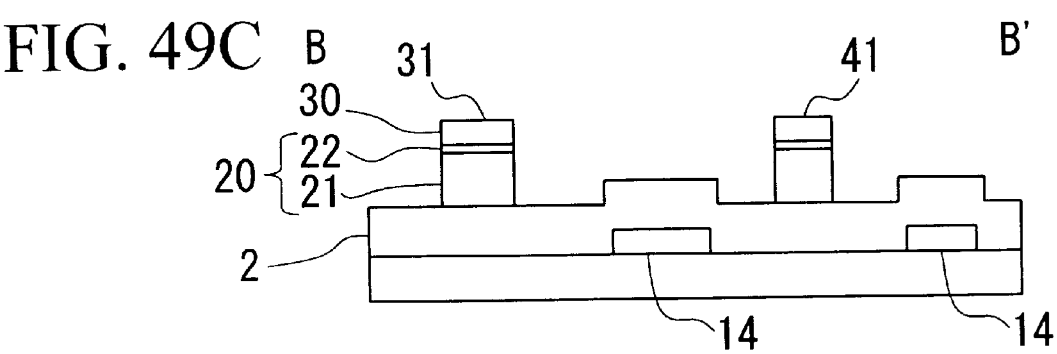
FIG. 49C is a cross sectional view through the plane B–B'.
Figure 50A:
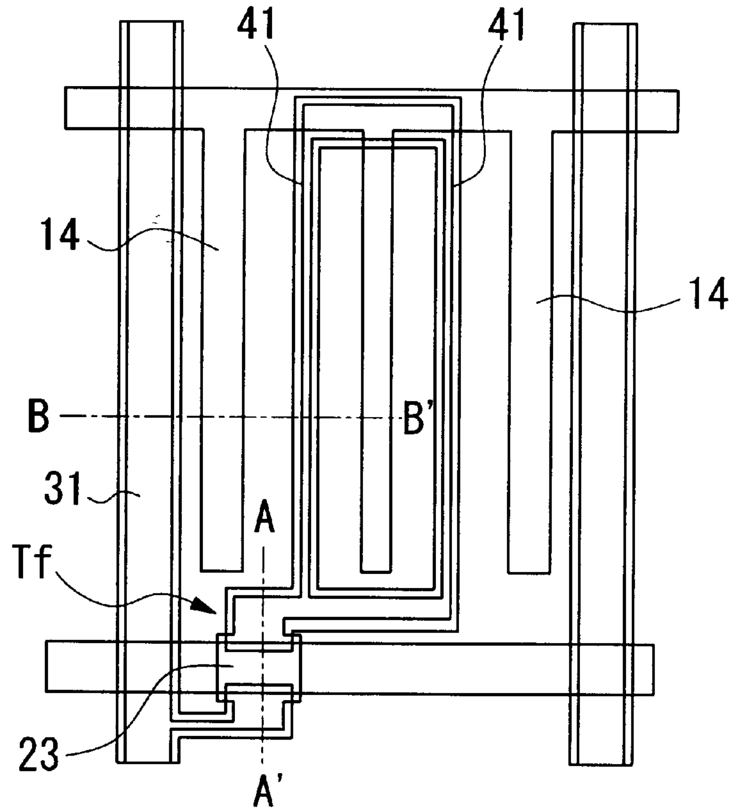
FIG. 50A is a perspective plan view of a one-pixel-region of the active matrix substrate plate in step 3 of the manufacturing method in Embodiment 9.
Figure 50B:
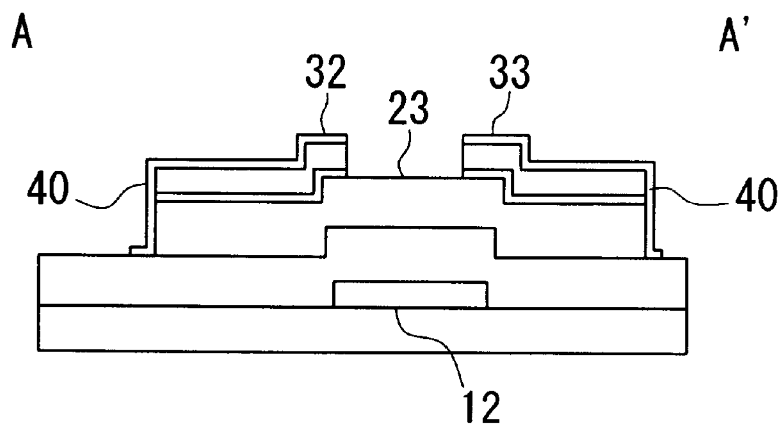
FIG. 50B is a cross sectional view through the plane A–A'.
Figure 50C:
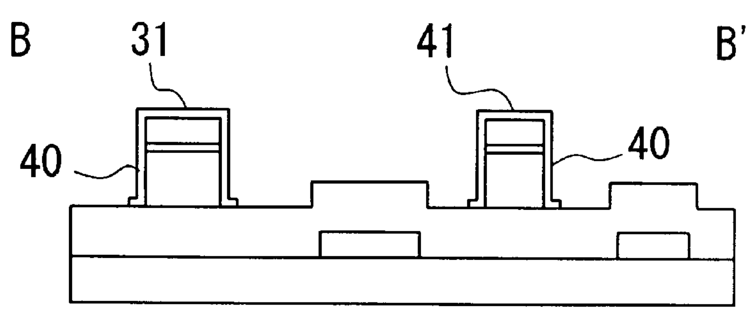
FIG. 50C is a cross sectional view through the plane B–B'.
Figures 51A, 51B, 51C, 51D:
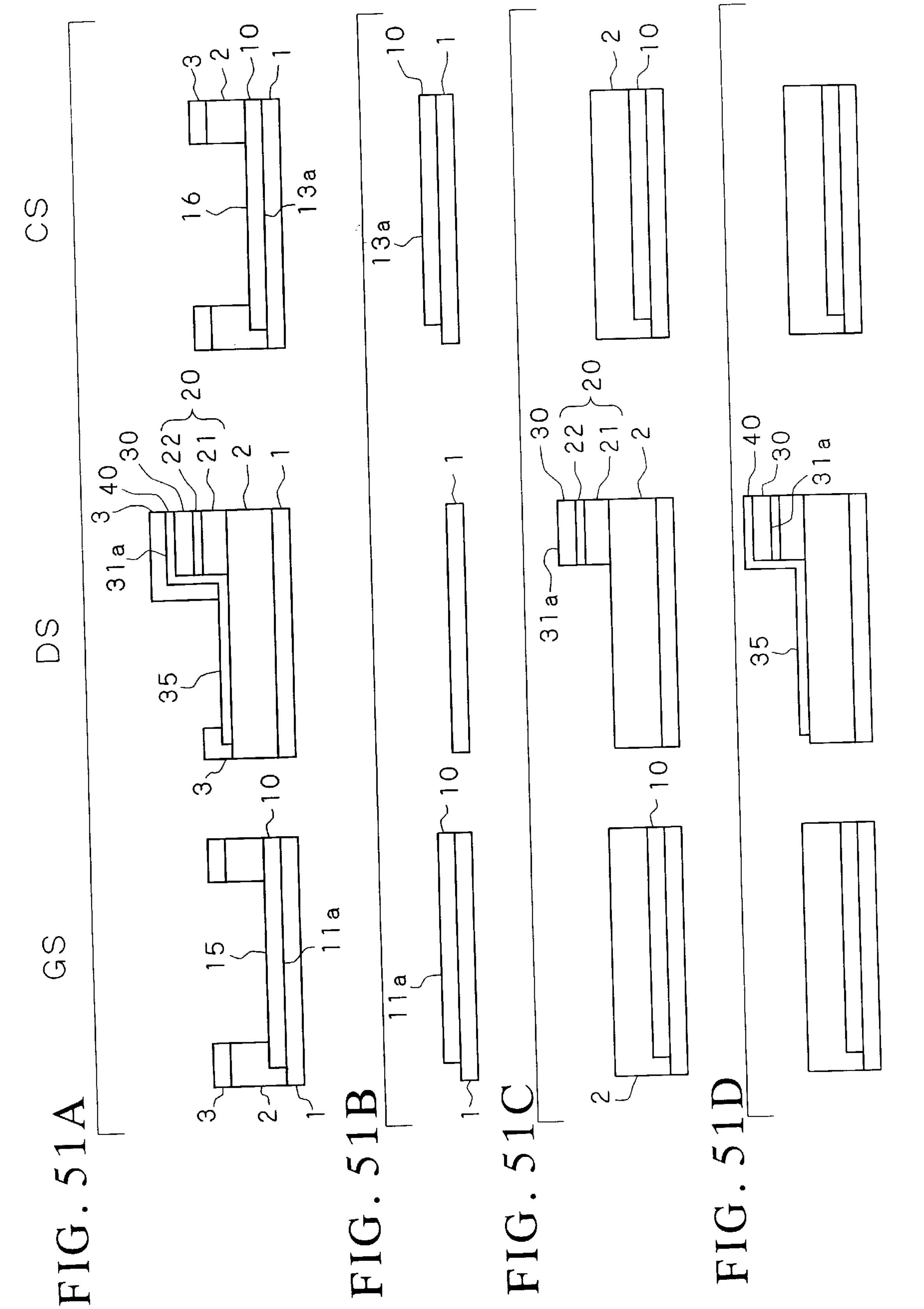
FIG. 51A is a cross sectional view in the longitudinal direction of a terminal section of the active matrix substrate plate in Embodiment 9, and the left side relates to the scanning line terminal section and the center relates to the signal line terminal section and the right side relates to the common wiring line terminal section.
FIGS. 51B–51D are cross sectional views relating to manufacturing step 1–step 3, respectively.

FIG. 47A is a perspective plan view to show a one-pixel-region of the active matrix substrate plate in Embodiment 9, and FIG. 47B is a cross sectional view through the plane A–A', FIG. 47C is the same through the plane B–B'. FIGS. 48A–50C are diagrams to show the manufacturing steps of the active matrix substrate plate, and refer to steps 1–3, respectively. Similar to FIG. 47A, FIGS. 48A, 49A, and 50A are perspective plan views of a one-pixel-region, and FIGS. 48B, 48C, 49B, 49C, and FIGS. 50B, 50C are cross sectional views through the planes A–A' and B–B', respectively. FIG. 51A is a cross sectional view of the terminal section of the active matrix substrate plate in the longitudinal direction, in which the left side relates to a cross sectional view at the scanning line terminal location GS, the center relates to a cross sectional view at the signal line terminal location DS, and the right side relates to the common wiring terminal location CS, and FIGS. 51B–51D show manufacturing steps 1–3 for the terminal section part.

The active matrix substrate plate in Embodiment 9 is formed such that, a plurality of scanning lines 11 and common wiring lines 13 comprised by the first conductor layer 10 are arranged alternatingly on a glass plate 1, a plurality of signal lines 31 are arranged in parallel at right angles to the scanning lines 11 across a gate insulation layer 2, and in the vicinity of TFT section Tf formed in the intersection of the scanning line 11 and the signal line 31, a portion of the scanning line 11 acts as the gate electrode 12 and this gate electrode 12, an island-shaped amorphous silicon layer 21 and an $n^+$ amorphous silicon layer 22 comprise a semiconductor layer 20 opposing the gate electrode across the gate insulation layer 2, and above this semiconductor layer, a pair of drain electrode 32 and source electrode 33 comprised by a second conductor layer 50 and formed with a gap of channel gap 23 comprise an inverted staggered structure TFT, and in a window section Wd surrounded by the scanning line 11 and the signal line 31 are formed a comb teeth shaped pixel electrode 41 and a comb teeth shaped common electrode 14 opposing the pixel electrode and connecting to the common wiring line 13, and the drain electrode 32 is connected to the signal line 31, the source electrode 33 is connected to the pixel electrode 41, respectively, to form an IPS-type active matrix substrate plate producing a horizontal electrical field between the pixel electrode 41 and the common electrode 14 with respect to the glass plate 1.

As in Embodiment 6, in this active matrix substrate plate, common wiring line 13 and common electrode 14 are formed on the same layer as the scanning line 11, and the common wiring line 13 is formed in such a way that, at least on one perimeter of the glass plate 1, the end section extends outside the end section of the same perimeter of the scanning line 11, and, as shown in FIGS. 52A, 52B, and 52C, the end sections of the common wiring line 13 are linked together by a common wiring linking line 19, and are connected to the common wiring linking line 19 to form a common wiring terminal 16.

The first conductor layer 10 forming the scanning line 11, gate electrode 12 and common wiring line 13 is comprised by an alloy comprised by primarily Al containing Nd, for example. Also, the second conductor layer 50 forming the signal line 31, drain electrode 32, source electrode 33 and pixel electrode 41 is formed by laminating, in each case, the metallic layer 30 comprised by Mo or Cr on top of the transparent conductive layer 40 comprised by ITO. The semiconductor layer 20 of the same shape as the signal line and the pixel electrode is formed in the lower layer of the signal line 31 and the pixel electrode 41, and the semiconductor layer 20 and the metallic layer 30 of the signal line and the pixel electrode are covered by the transparent conductive layer 40.

In this embodiment, the $n^+$ amorphous silicon layer 22 in the TFT section Tf is formed by doping with a group V element P, and the thickness of ohmic contact layer is in a range of 3–6 nm.

The pixel electrode 41 forms an accumulation capacitance electrode 71 by extending a part to superimpose across the gate insulation layer 2 above the common wiring line 13 to oppose the accumulation common electrode 72 sharing a portion of the common wiring line 13 to construct the accumulation capacitance section Cp in this pixel region.

The active matrix substrate plate in Embodiment 9 is manufactured according to the following four steps.

(Step 1) as shown in FIGS. 48A–48C and FIG. 51B, by sputtering on the glass plate 1, an alloy of Al—Nd of about 250 nm thickness is deposited to form the first conductor layer 10, and through photolithographic processes, excepting the scanning line 11, scanning line terminal section 11*a* formed in the scanning line terminal location GS, common wiring line 13, common wiring linking line (not shown) to bind the common wiring lines 13 in the outer peripheral section Ss, common wiring line terminal section 13*a* connected to the common wiring linking line and formed in the common wiring terminal location CS, and in the respective pixel regions, gate electrode 12 sharing a portion of the scanning line 11, and a plurality of common electrodes 14 extending from the common wiring line 13, the first conductor layer 10 is removed by etching.

(Step 2) as shown in FIGS. 44A–44C and FIG. 51C, on the above substrate plate, gate insulation layer 2 comprised by silicon nitride film of about 400 nm thickness and the amorphous silicon layer 21 of about 100 nm thickness are deposited by continually applying plasma CVD, and using a $PH_3$ plasma P-doping technique under the same vacuum pressure, and after forming an ohmic contact layer comprised by $n^+$ amorphous silicon layer 22 of 3–6 nm thickness on the surface of the amorphous silicon layer 21, a metallic layer 30 comprised by Mo of about 250 nm thickness is sputtered, and through photolithographic processes, excepting the signal line 31, signal line terminal section 31*a* formed in the signal line terminal location DS, and within the respective pixel regions, the protrusion section 34 extending from the signal line 31 towards the window section Wd through the TFT section Tf, and the pixel electrode 41 extending from the protrusion section 34 opposing the common electrode 14 across the gate insulation 2, the metallic layer 30 and the semiconductor layer 20 are removed successively by etching.

(Step 3) as shown in FIGS. 50A–50C and FIG. 51D, by sputtering on the above substrate plate, ITO of about 50 nm thickness is deposited by sputtering to form the transparent conductive layer 40, and through photolithographic processes, excepting the signal line 31 and the portion covering the lateral surface, the portion covering the signal line terminal section 31*a* formed in the signal line terminal location DS, within the respective pixel regions, drain electrode 32 extending from the signal line 31 to the TFT section Tf formed above the gate electrode 12, the portion covering the pixel electrode 41 extending across the gate insulation layer 2 to the window section Wd opposite to the common electrode 14, and source electrode 33 extending from the pixel electrode 41 towards TFT section Tf and separated from the drain electrode 32 by the opposing channel gap 23, the transparent conductive layer 40 is removed by etching, and next, the exposed metallic layer 30 and the $n^+$ amorphous silicon layer 22 formed by P-doping are removed by etching to form channel gap 23. In this case, a portion of the pixel electrode 41 is extended so as to superimpose on a portion of the common wiring line 13 at the accumulation capacitance section Cp to form the accumulation capacitance electrode 71.

(Step 4) as shown in FIGS. 47A–47C and FIG. 51A, on the above substrate plate the protective insulation layer 3 of about 300 nm thickness comprised by silicon nitride film is deposited using plasma CVD process, and through photolithographic processes, the protective insulation layer 3 above the signal line terminal section 31*a*, and the protective insulation layer 3 and the gate insulation layer 2 above the scanning line terminal section 11*a* and the common wiring line terminal section 13*a* are removed by etching to expose the signal line terminal 35 comprised by the transparent conductive layer 40, and the scanning line terminal 15 and the common wiring terminal 16 comprised by the first conductor layer 10. Lastly, the active matrix substrate plate is completed by performing annealing at about 280° C.

In this case, the structure of the signal line is the same as the signal structure used in Embodiment 3, but it may be the same as the signal structure in Embodiment 4.

Also, an alloy of Al—Nd is used for the first conductor layer, but as in Embodiment 1, a lamination of nitride films of Al and a high melting point metal such as Ti may be used for the first conductor layer, but a three layer structure formed by laying an underlayer of a high melting point metal such as Ti below the Al layer, to form Ti, Al and Ti nitride layers may be used. It may be a film made by laminating ITO on top of Cr. It is preferable that the atomic concentration of nitrogen in the nitride film of a high melting point metals be not lower than 25 a/o.

Further, in step 3, instead of the transparent conductive layer, a nitride film of a high melting point metal such as Ti may be used. Also, in step 2, the thickness of the metallic layer 30 may be about 50 nm, and in step 3, instead of the transparent conductive layer, a film of about 200 nm thickness comprised by Al or an alloy of primarily Al may be deposited on top of a high melting point metal such as Mo of about 50 nm thickness, for example.

Also, in the above embodiment, the common wiring terminal and the scanning line terminal have the same structure, but it may utilize the silver bead method to be described later to make the same structure as the signal line terminal.

Productivity and the yield of the IPS-type active matrix substrate plate in Embodiment 9 are improved because it can be manufactured in four steps.

Also, in this active matrix substrate plate, at least in one perimeter section of the glass plate 1, end sections of the common wiring are linked to each other by the common wiring linking line, thereby enabling to lead out the common wiring terminal, and IPS-type active matrix substrate plate can be produced independently.

Also, as in Embodiment 8, because this active matrix substrate plate can be manufactured by etching the ohmic contact layer above the semiconductor layer concurrently with the drain electrode and source electrode at the time of their etching, and the semiconductor layer can be made thin at about 100 nm thickness, productivity can be increased and at the same time, the resistance in the vertical direction of the semiconductor layer can be reduced to improve writing capability of TFT.

Also, effects resulting from covering the signal lines and the semiconductor layer by using a transparent conductive layer or a nitride layer of a metal or a metallic layer, lowering the resistively of scanning and signal lines, improving reliability of connection at the terminal section and improving the dielectric strength of the insulation layer are exactly the same as those in Embodiment 6.

Embodiment 10

Figure 53A:
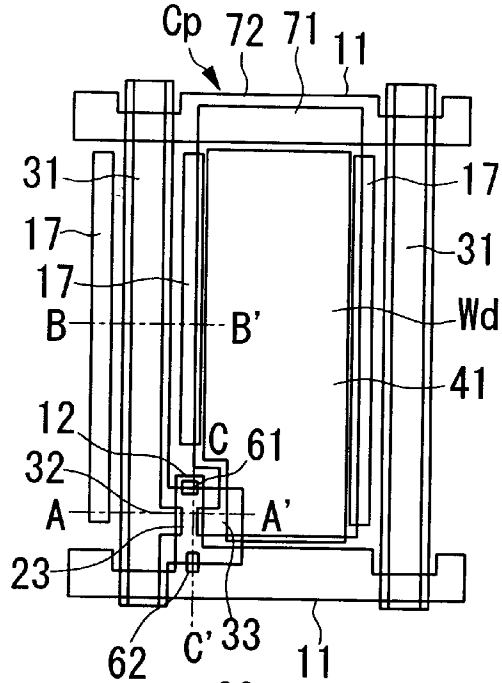
FIG. 53A is a perspective plan view of a one-pixel-region of the active matrix substrate plate in Embodiment 10.
Figure 53B:
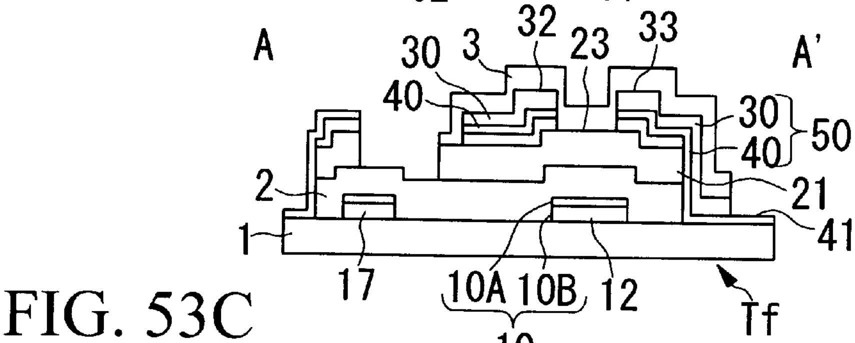
FIG. 53B is a cross sectional view through the plane A–A'.
Figure 53C:
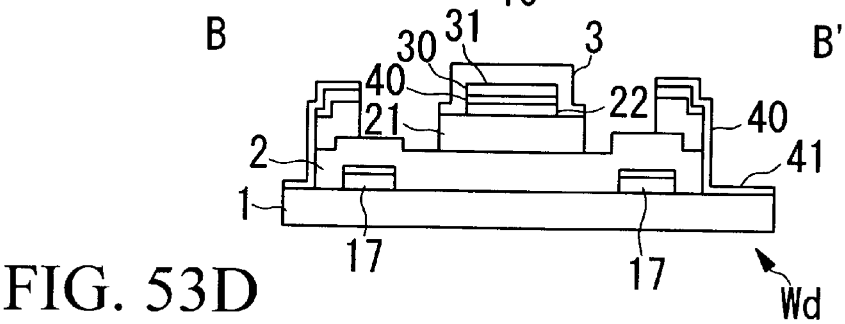
FIG. 53C is a cross sectional view through the plane B–B'.
Figure 53D:
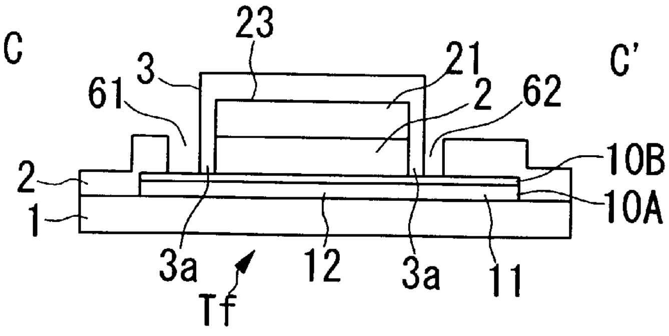
FIG. 53D is a cross section view through the plane C–C'.
Figure 54A:
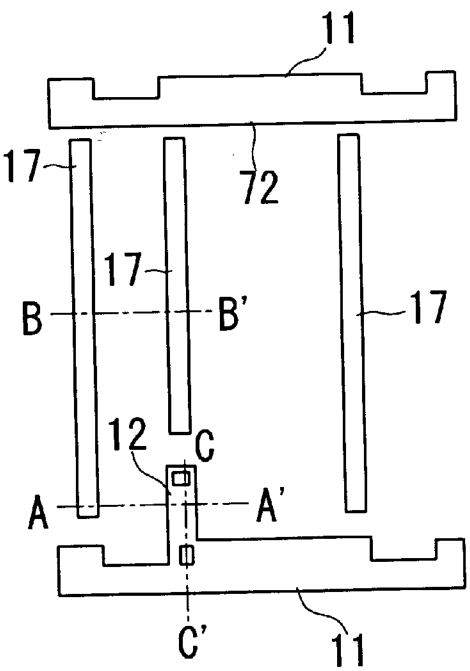
FIG. 54A is a perspective plan view of a one-pixel-region of the active matrix substrate plate in step 1 of the manufacturing process in Embodiment 10.
Figure 54B:
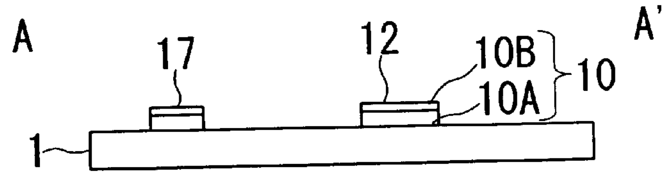
FIG. 54B is a cross sectional view through the plane A–A'.
Figure 54C:
FIG. 54C is a cross sectional view through the plane B–B'.
Figure 54D:
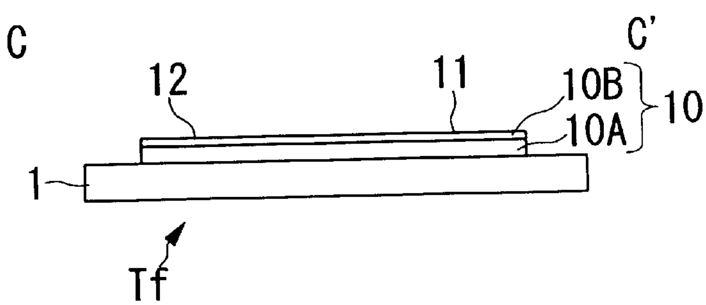
FIG. 54D is a cross section view through the plane C–C'.
Figure 55A:
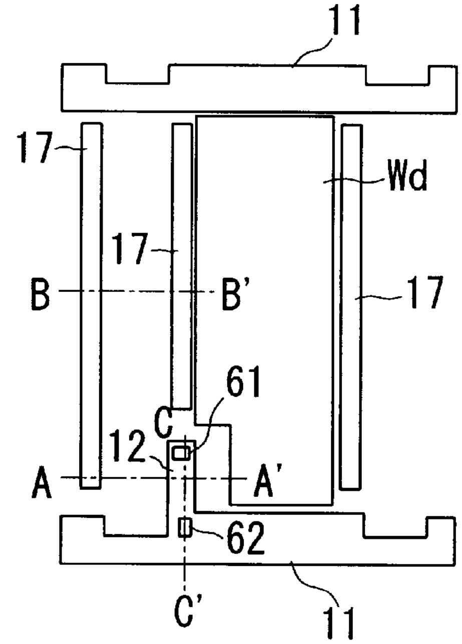
FIG. 55A is a perspective plan view of a one-pixel-region of the active matrix substrate plate in step 2 of the manufacturing process in Embodiment 10.
Figure 55B:
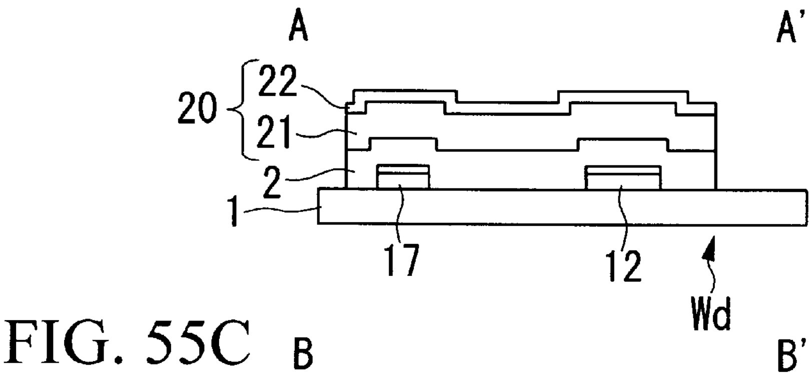
FIG. 55B is a cross sectional view through the plane A–A'.
Figure 55C:
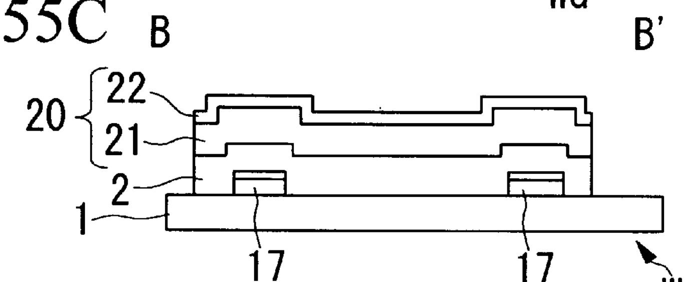
FIG. 55C is a cross sectional view through the plane B–B'.
Figure 55D:
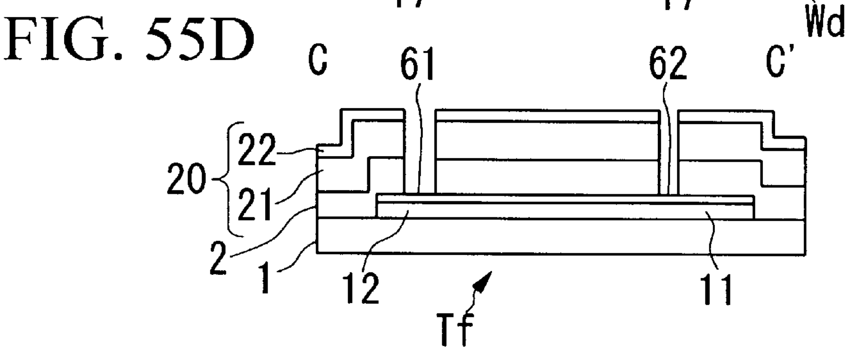
FIG. 55D is a cross section view through the plane C–C'.
Figure 56A:
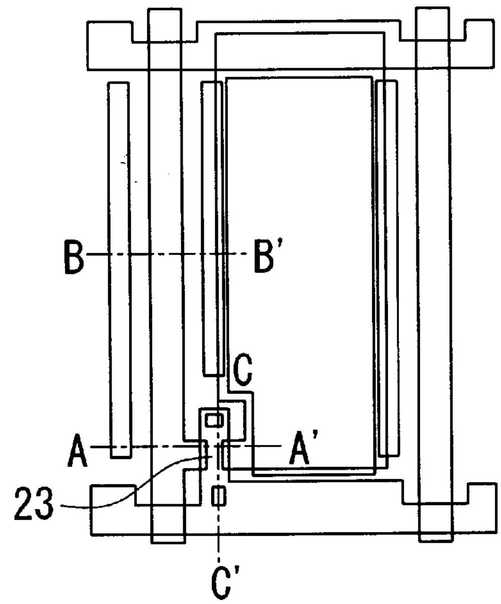
FIG. 56A is a perspective plan view of a one-pixel-region of the active matrix substrate plate in step 3 of the manufacturing process in Embodiment 10.
Figure 56B:
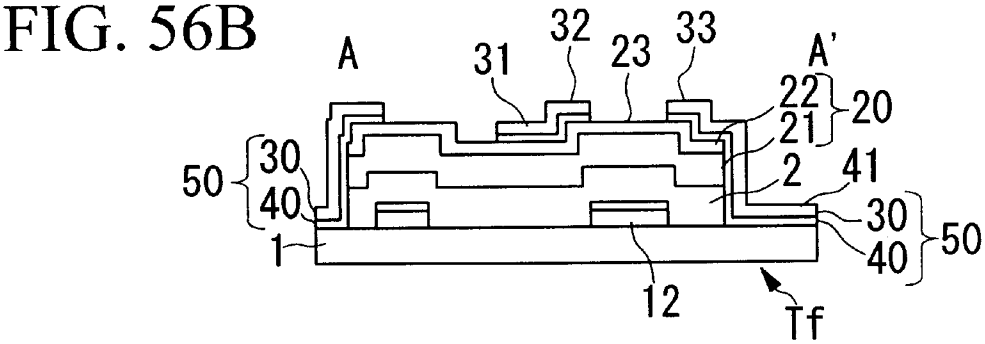
FIG. 56B is a cross sectional view through the plane A–A'.
Figure 56C:
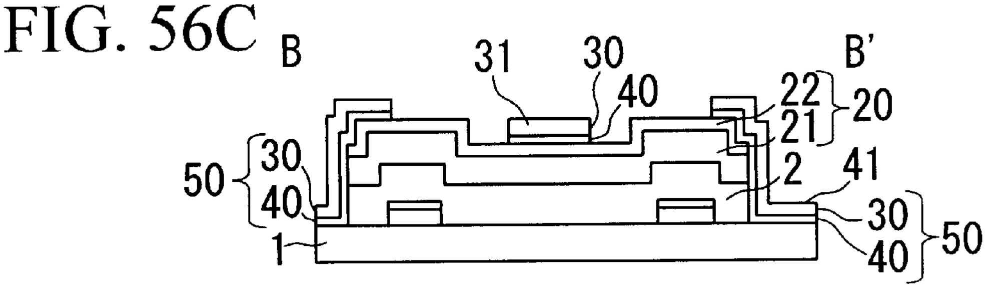
FIG. 56C is a cross sectional view through the plane B–B'.
Figure 56D:
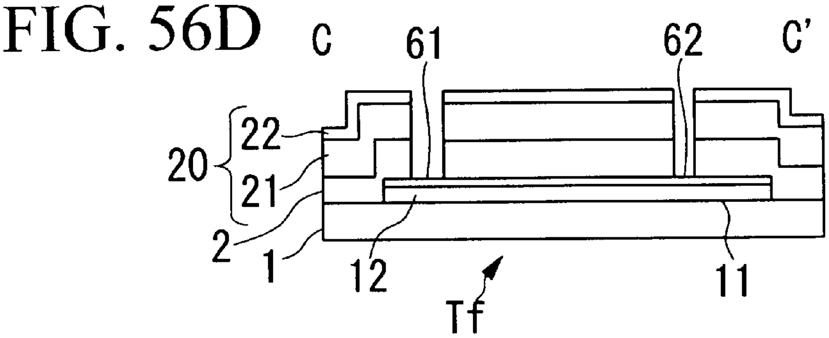
FIG. 56D is a cross section view through the plane C–C'.

FIG. 53A is a perspective plan view to show a one-pixel-region of the active matrix substrate plate in Embodiment 10, and FIG. 53B is a cross sectional view through the plane A–A', FIG. 53C is the same through the plane B–B', and FIG. 53D is the same through the plane C–C'. FIGS. 54A–57C are diagrams to show the manufacturing steps of the active matrix substrate plate, relating to steps 1–3, and a channel-formed TFT, respectively. Similar to FIG. 53A, FIGS. 54A, 55A, and 56A are perspective plan views of a one-pixel-region, and FIGS. 54B–54D, 55B–55D, 56B–56D, and FIGS. 57A–57C are cross sectional views through the planes A–A' and B–B', C–C', respectively. Also, FIG. 58A is a cross sectional view of the terminal section of the active matrix substrate plate in the longitudinal direction, in which the left side relates to a cross sectional view at the scanning line terminal location GS and the right side relates to a cross sectional view at the signal line terminal location DS, and FIGS. 58B–58D show manufacturing steps 1–3 for the terminal section part.

The active matrix substrate plate in Embodiment 10 is formed on a glass plate 1, such that a plurality of scanning lines 11 comprised by the first conductor layer 10 and a plurality of signal lines 31 comprised by the second conductor layer 50 are arranged at right angles across a gate insulation layer 2, and in the vicinity of the TFT section Tf formed in the intersection of the scanning line 11 and the signal line 31, the gate electrode 12 extending from the scanning line 11, a semiconductor layer 20 comprised by the island-shaped amorphous silicon layer 21 and an $n^+$ amorphous silicon layer 22 opposing the gate electrode across the gate insulation layer 2, and a pair of drain electrode 32 and source electrode 33 comprised by a second conductor layer 50 above the semiconductor layer and spaced with a gap of channel gap 23 comprise an inverted staggered structure TFT, and a pixel electrode 41 comprised by a transparent conductive layer 40 is formed in a window section Wd, for transmitting light, which is surrounded by the scanning line 11 and the signal line 31, and the drain electrode 32 is connected to the signal line 31, the source electrode 33 is connected to the pixel electrode 41 to form a TN-type active matrix substrate plate.

In this active matrix substrate plate, the first conductor layer 10 forming the scanning line 11 and the gate electrode 12 is produced by laminating a lower metallic layer 10A comprised by Al or an alloy of primarily Al and an upper metallic layer 10B comprised by a high melting point metal such as Ti, Ta, Nb, Cr or their alloy or their nitride film. In the following Embodiments 10–25, when the first conductor layer has a laminated structure and the uppermost metallic layer is comprised by a nitride film of a high melting point metal, unlike in Embodiments 1–9, the nitrogen concentration in the nitride film may be less than 25 a/o. Also, the second conductor layer 50 forming the signal line 31, drain electrode 32, and source electrode 33 is formed by laminating the metallic layer 30 comprised by Cr or Mo on top of the transparent conductive layer 40 comprised by ITO.

The pixel electrode 41 is constructed such that the second conductor layer 50 comprised by the transparent conductive layer 40 and the metallic layer 30 descends vertically from the source electrode 33 to the glass plate 1 so as to cover the lateral surface of the lamination of the gate insulation layer 2 and the semiconductor layer 20, and the transparent conductive layer 40 formed in the lower layer of the metallic layer 30 extends towards the window section Wd on the glass plate 1.

Also, the lateral surface of the first conductor layer 10 formed above the glass plate 1 concurrently with the scanning line 11 is totally covered by the gate insulation layer 2. Also, a portion of both lateral surfaces of the amorphous silicon layer 21, in the direction of the extending channel gap 23 of the TFT section Tf, is covered by the protective insulation layer 3.

Here, the pixel electrode 41 forms an accumulation capacitance electrode 71 by extending to superimpose above the accumulation common electrode 72 formed inside the forestage scanning lines 11 across the gate insulation layer 2 to construct the accumulation capacitance section Cp in this pixel region. Also, in this pixel region, a light blocking layer 17 comprised by the first conductor layer 10 is formed so as to superimpose across the gate insulation layer 2 a portion on one perimeter section of the pixel electrode 41. Where the scanning line 11 and the signal line 31 intersect, the semiconductor layer 20 is formed and left between the gate insulation layer 2 and the signal line 31.

The active matrix substrate plate in Embodiment 10 is manufactured according to the following four steps.

(Step 1) as shown in FIGS. 54A–54D and FIG. 58B, the first conductor layer 10 is formed by continually sputtering on the glass plate 1 to form the lower metallic layer 10A comprised by Al of about 200 nm thickness and the upper metallic layer 10B comprised by Ti of about 100 nm thickness, and through photolithographic processes, excepting the scanning line 11, scanning line terminal section 11*a* formed in the scanning line terminal location GS, gate electrode 12 extending from the scanning line 11 to the TFT section Tf in the respective pixel regions, accumulation common electrode 72 formed inside the forestage scanning line 11 and the light blocking layer 17, the first conductor layer 10 is removed by etching.

(Step 2) as shown in FIGS. 55A–55D and FIG. 58C, on the above substrate plate, gate insulation layer 2 comprised by silicon nitride film of about 400 nm thickness and the semiconductor layer 20 comprised by the amorphous silicon layer 21 of about 250 nm thickness and the $n^+$ amorphous silicon layer 22 of about 50 nm thickness are deposited by continually applying plasma CVD. Next, through photolithographic processes, excepting the opening section 61 on the longitudinal tip side above the gate electrode 12, opening section 62 formed above the scanning line 11 of the gate electrode base section, and opening section 63 formed above the scanning line terminal section 11*a*, and leaving so as to cover at least the upper surface and an entire lateral surface of the first conductor layer 10 (scanning line 11, scanning line terminal section 11*a*, gate electrode 12, light blocking layer 17) with the gate insulation layer 2, the semiconductor layer 20 and the gate insulation 2 are removed successively by etching. By so doing, the semiconductor layer 20 and the gate insulation layer 2 are removed from the window section Wd to expose the glass plate 1, and at two locations above the gate electrode 12 and scanning line 11 the opening sections 61, 62 are formed to reach the first conductor layer 10, and the opening section 63 is formed above the scanning line terminal section 11*a* to reach the first conductor layer 10.

(Step 3) as shown in FIGS. 56A–56D and FIG. 58D, on the above substrate plate, the transparent conductive layer 40 comprised by ITO of about 50 nm thickness and the metallic layer 30 comprised by Cr of about 200 nm thickness are sputtered continually to form the second conductor layer 50. Next, through photolithographic processes, excepting the signal line 31, signal line terminal section 31*a* formed in the signal line terminal location DS, connection electrode section 42 connecting to the scanning line terminal section 11*a* through the opening 63 formed above the scanning line terminal section 11*a*, common wiring line and common wiring line terminal section (not shown), and within the respective pixel regions, drain electrode 32 extending from the signal line 31 towards the TFT section Tf, pixel electrode 41, source electrode 33 separated from the drain electrode 32 by the opposing channel gap 23 and extending from the pixel electrode towards the TFT section Tf, the second conductor layer 50 is removed by etching. In this case, the perimeter of the pixel electrode 41 are extended so as to superimpose on the accumulation common electrode 72 in the accumulation capacitance section Cp to form the accumulation capacitance electrode 71, and both perimeter sections of the pixel electrode adjacent to this perimeter section are formed so that at least a portion will superimpose respectively on the light blocking layer 17.

Figure 57A:
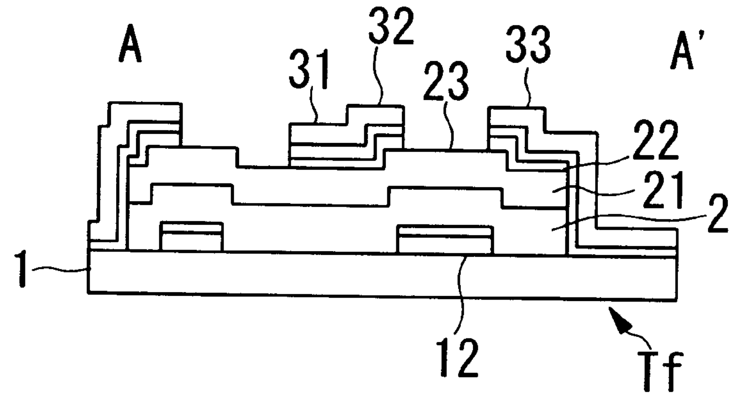
FIGS. 57A–57C are cross sectional views of a channel-formed TFT in active matrix substrate plate manufacturing in Embodiment 10.
Figure 57B:
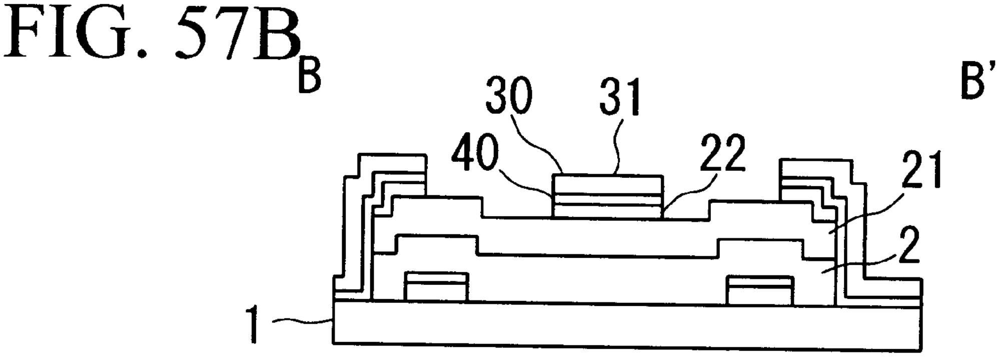
Figure 57C:
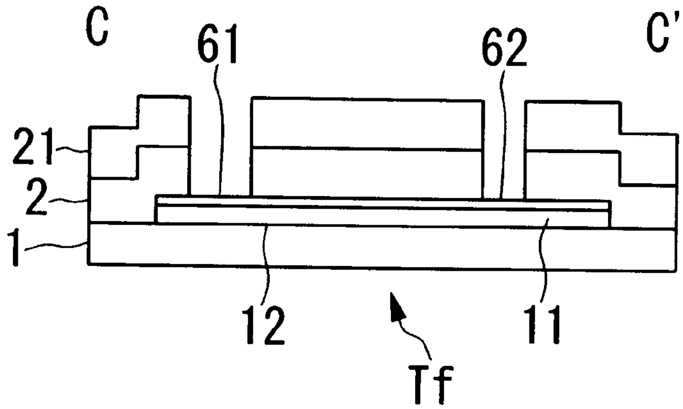
Figures 58A, 58B, 58C, 58D:
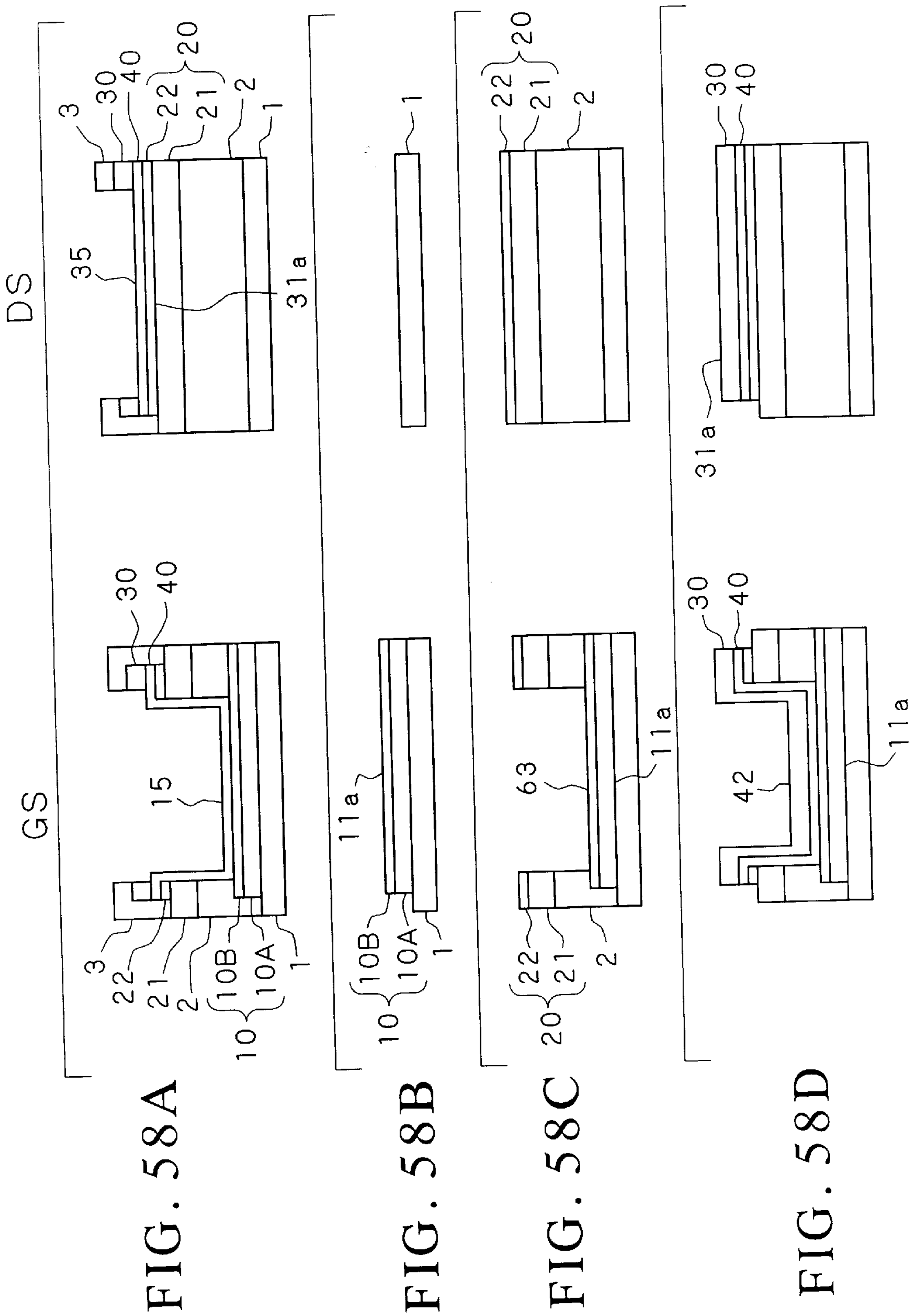
FIG. 58A is a cross sectional view in the longitudinal direction of a terminal section of the active matrix substrate plate in Embodiment 10, and the left side relates to the scanning line terminal section and the right side relates to the signal line terminal section.
FIGS. 58B–58D are cross sectional views relating to manufacturing step 1–step 3, respectively.

Next, as shown in FIGS. 57A–57C, using the second conductor layer 50 after removing its masking pattern or the masking used in the etching process as masking, the exposed $n^+$ amorphous silicon layer 22 is removed by etching. By so doing, channel gap 23 is formed and in the direction of the extending channel gap, the amorphous silicon layer 21 is exposed beyond the opening sections 61, 62.

(Step 4) as shown in FIGS. 53A–53D and FIG. 58A, on the above substrate plate the protective insulation layer 3 of about 150 nm thickness comprised by silicon nitride film is deposited using plasma CVD process, and through photolithographic processes, excepting the protective insulation layer 3 above the pixel electrode 41 and connection electrode section 42 and signal line terminal section 31*a* and the common wiring line terminal section (not shown) and leaving so as to cover at least the upper surface and an entire lateral surface of the signal line 31 with the protective insulation layer 3 and so as to form the semiconductor layer of the TFT section Tf, the protective insulation layer 3 and amorphous silicon layer 21 are removed successively by etching. At this time, the opening sections 61, 62 and the perimeter section of the protective insulation layer 3 are intersected and leaving the protective insulation layer 3 of the TFT section Tf in such a way that the perimeter section of the protective insulation layer descends to cover a portion of the lateral surface of the amorphous silicon layer 21 on the channel gap 23 side exposed at the opening sections 61, 62, the outer protective insulation layer and the amorphous silicon layer are removed by etching. Next, the metallic layer 30 exposed at the opening section formed in the protective insulation layer above the pixel electrode 41 and connection electrode section 42 and signal line terminal section 31*a* and common wiring line terminal section is removed by etching, to expose the pixel electrode 41 and the signal line terminal 35 and the common wiring terminal (not shown) comprised by the transparent conductive layer 40, and above the first conductor layer 10, the scanning line terminal 15 laminated with the transparent conductive layer 40 through the opening section 63 punched through semiconductor layer 20 and gate insulation layer 2. Lastly, the active matrix substrate plate is completed by performing annealing at about 280° C.

In this case, a lamination of a nitride film of Al and Ti is used for the first conductor layer, but the first layer may be a three layer structure formed by laying an underlayer of a high melting point metal such as Ti below the Al layer, to form Ti, Al and Ti nitride layers, or single film layer of Cr may be used.

Also, in the present embodiment, the vertical-type TFT in which the gate electrode extends from the scanning line to the pixel section, but the lateral-type TFT may be used, in which the gate electrode shares a portion of the scanning lines.

Productivity and the yield of the TN-type active matrix substrate plate in Embodiment 10 are improved because it can be manufactured in four steps.

Also, in this active matrix substrate plate, because the conductor layer formed together with the scanning line on top of the transparent insulation substrate plate, excepting the connection section to the transparent conductive layer, is totally covered by the gate insulation layer, during etching of metallic layer of the signal line or the transparent conductive layer, corrosion problems of circuit elements such as the scanning lines in the lower layer and gate electrodes, or shorting of scanning lines and signal lines are prevented, and the yield is improved.

Also, in this active matrix substrate plate, protective transistor can be fabricated so that the TFT in the pixel region can be prevented from unexpected electrical shock during manufacturing. Also, insulation breakdown between the scanning lines and signal lines can be prevented, and the yield is improved.

Also, in this active matrix substrate plate, because a portion of both lateral surfaces of the semiconductor layer in the extending direction of the channel gap of the TFT section is covered by the protective insulation layer, it is possible to prevent charge leaking through the lateral surfaces of the semiconductor layer as the current path, thereby improving the reliability of thin film transistors.

Also, this active matrix substrate plate is able to prevent, during etching of the metallic layer of the signal line and transparent conductive layer, corrosion of the gate electrode and the conductive film in the lower layer of the scanning line caused by infiltration of etching solution into the conductive film through the opening punched through the gate insulation layer above the gate electrode and the semiconductor layer, and the yield is improved.

Also, in this active matrix substrate plate, because the signal line is comprised by laminating the metallic layer and the transparent conductive layer, wiring resistance of the signal line can be reduced and the yield drop due to line severance and the like can be suppressed, and because the source electrode and the pixel electrode are formed integrally by the transparent conductive layer, it is possible to suppress an increase in electrical contact resistance resulting in improved reliability.

Also, in this active matrix substrate plate, because the scanning line is comprised by a lamination of Al and a high melting point metals such as Ti, it is possible to lower the wiring resistance of the scanning line. Also, the connection of the scanning line terminal to the scanning line driver is comprised by ITO, surface oxidation at the terminal section can be prevented to secure reliability of connection at the scanning line driver.

Also, in this active matrix substrate plate, the semiconductor layer is formed in the intersection part of the scanning line and signal line, dielectric strength of insulation between scanning and signal lines is improved. Also, because the pixel electrode and the light blocking layer are formed to superimpose at least partially, it is possible to reduce the black matrix of the color filter substrate plate that needs to have a large superpositioning margin, thereby enabling to improve the aperture factor.

Embodiment 11

Figure 59A:
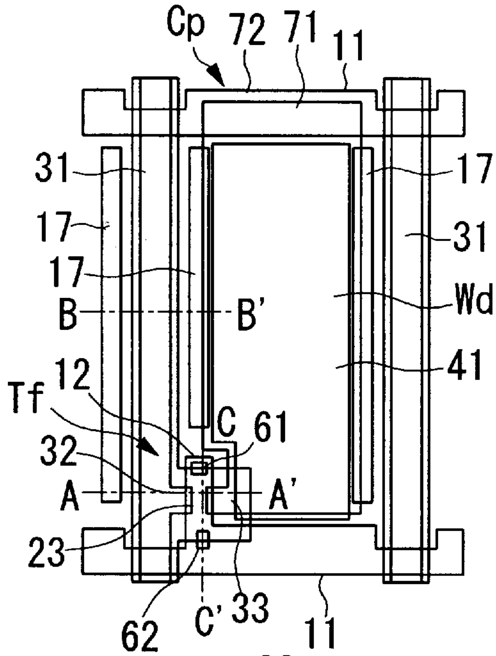
FIG. 59A is a perspective plan view of a one-pixel-region of the active matrix substrate plate in Embodiment 11.
Figure 59B:
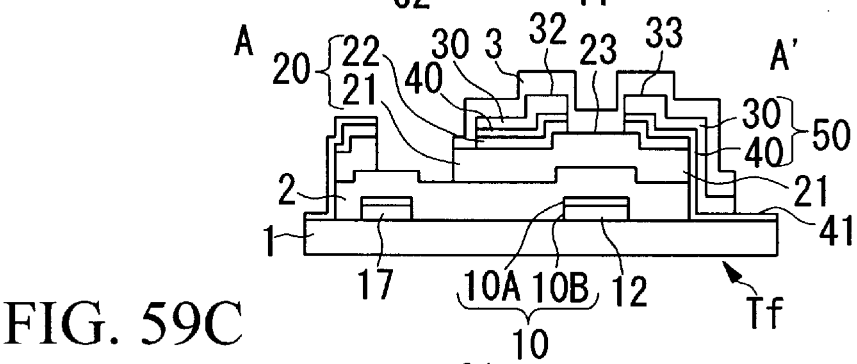
FIG. 59B is a cross sectional view through the plane A–A'.
Figure 59C:
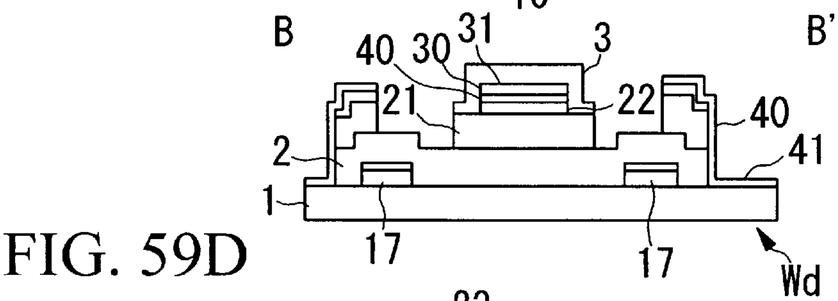
FIG. 59C is a cross sectional view through the plane B–B'.
Figure 59D:
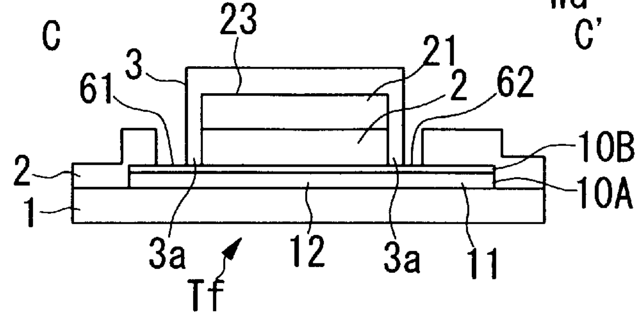
FIG. 59D is a cross section view through the plane C–C'.
Figure 60A:
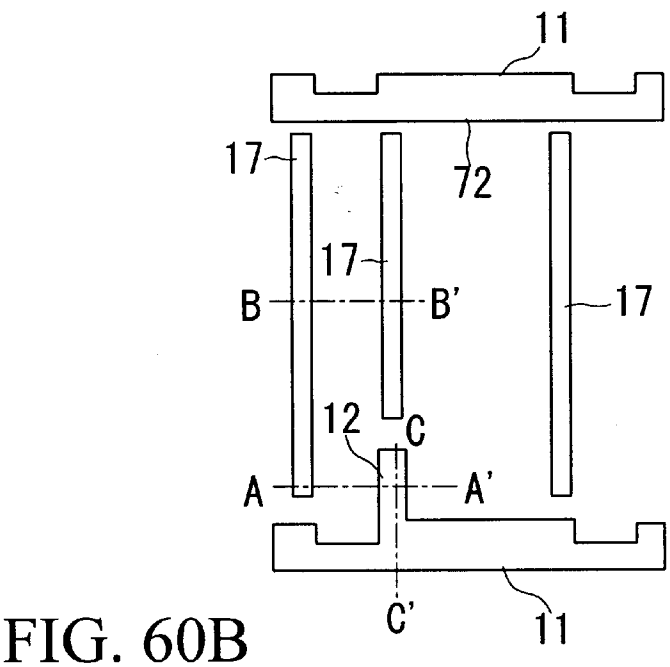
FIG. 60A is a perspective plan view of a one-pixel-region of the active matrix substrate plate in step 1 of the manufacturing process in Embodiment 11.
Figure 60B:
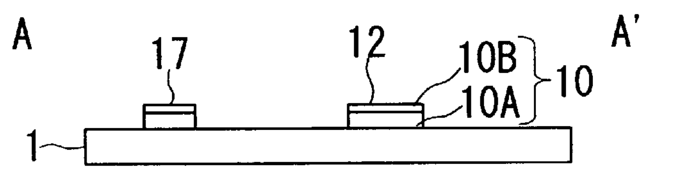
FIG. 60B is a cross sectional view through the plane A–A'.
Figure 60C:
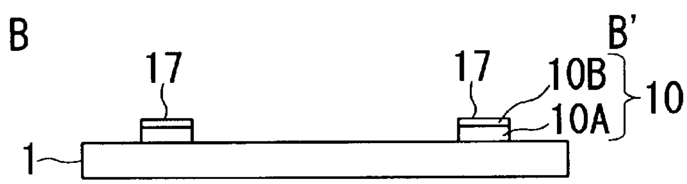
FIG. 60C is a cross sectional view through the plane B–B'.
Figure 60D:
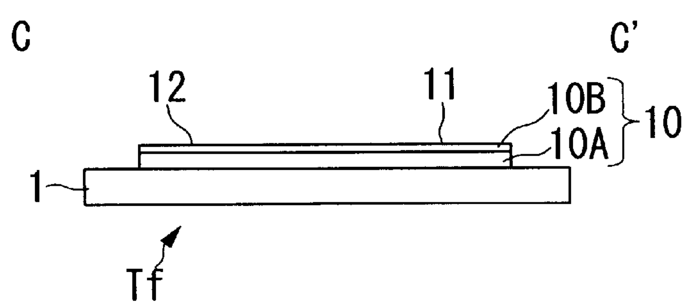
FIG. 60D is a cross section view through the plane C–C'.
Figure 61A:
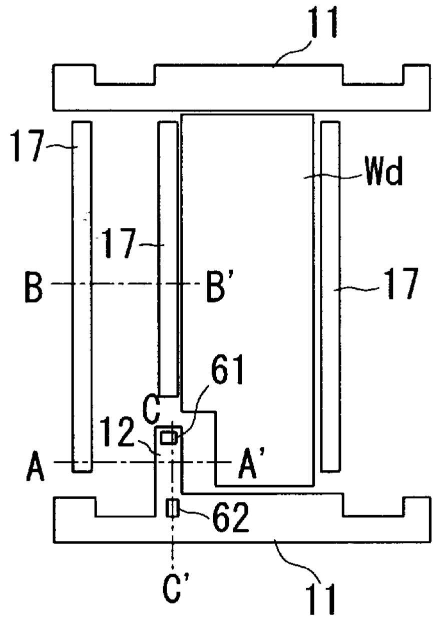
FIG. 61A is a perspective plan view of a one-pixel-region of the active matrix substrate plate in step 2 of the manufacturing process in Embodiment 11.
Figure 61B:
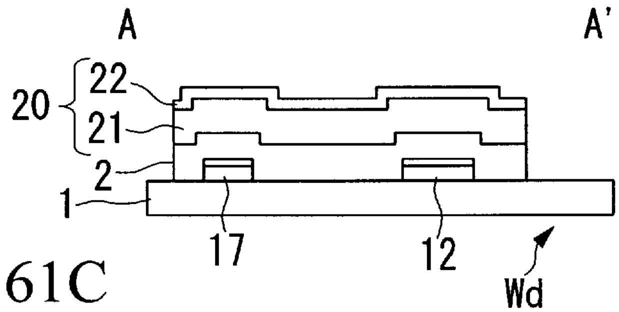
FIG. 61B is a cross sectional view through the plane A–A'.
Figure 61C:
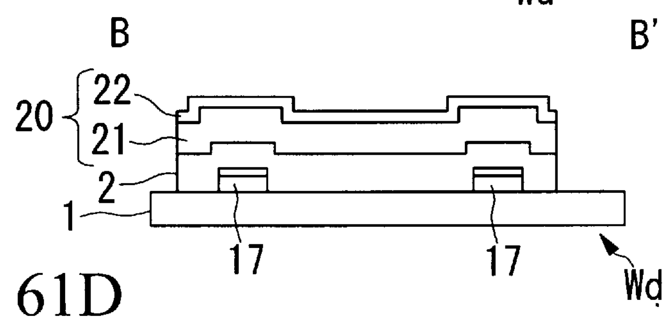
FIG. 61C is a cross sectional view through the plane B–B'.
Figure 61D:
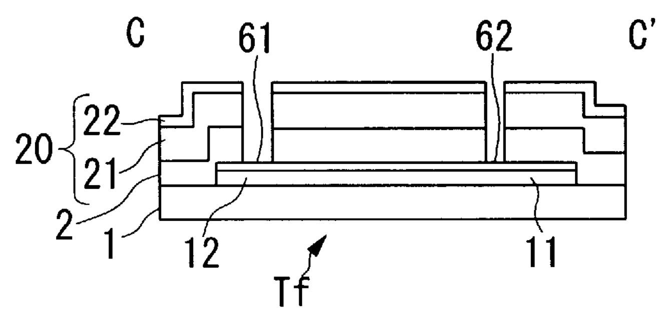
FIG. 61D is a cross section view through the plane C–C'.
Figure 62A:
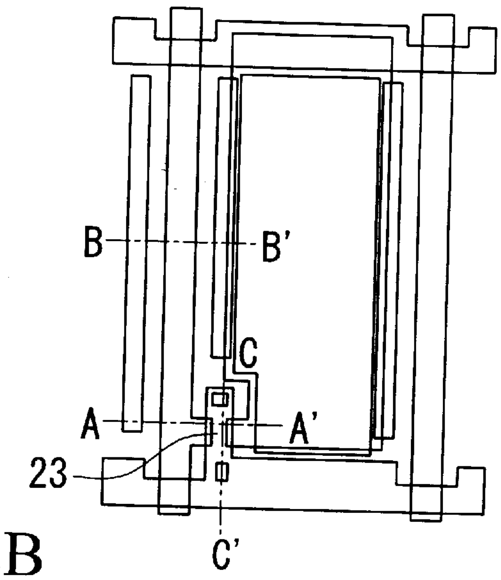
FIG. 62A is a perspective plan view of a one-pixel-region of the active matrix substrate plate in step 3 of the manufacturing process in Embodiment 11.
Figure 62B:
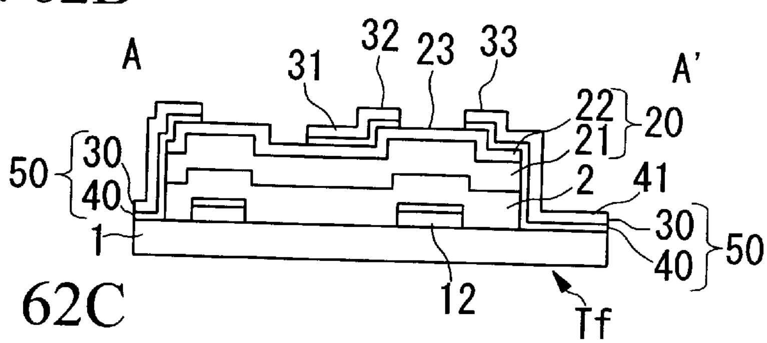
FIG. 62B is a cross sectional view through the plane A–A'.
Figure 62C:
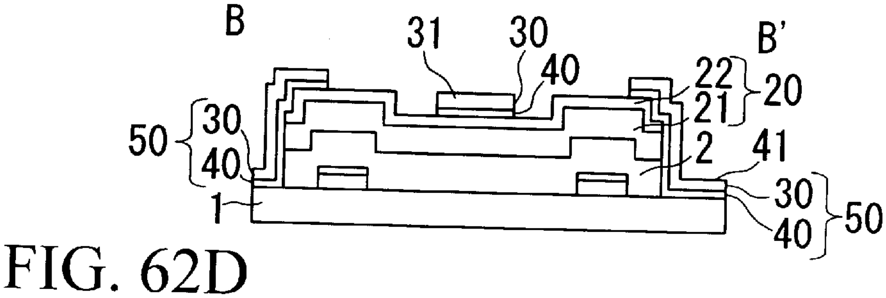
FIG. 62C is a cross sectional view through the plane B–B'.
Figure 62D:
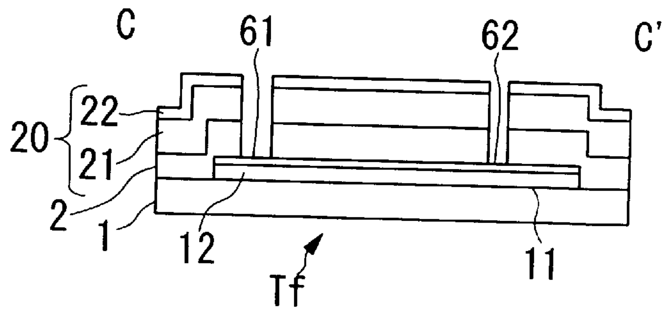
FIG. 62D is a cross section view through the plane C–C'.

FIG. 59A is a perspective plan view to show a one-pixel-region of the active matrix substrate plate in Embodiment 11, and FIG. 59B is a cross sectional view through the plane A–A', FIG. 59C is the same through the plane B–B', FIG. 59D is the same through the plane C–C'. FIGS. 60A–63C are diagrams to show manufacturing steps of the active matrix substrate plate, relating to steps 1–3, and a channel-formed TFT, respectively. Similar to FIG. 59A, FIGS. 60A, 61A, 62A are perspective plan views of a one-pixel-region, and FIGS. 60B–60D, 61B–61D, 62B 62D and FIGS. 63A–63C are cross sectional views through the planes A–A' and B–B', C–C', respectively. Also, FIG. 64A is a cross sectional view of the terminal section of the active matrix substrate plate in the longitudinal direction, in which the left side relates to a cross sectional view at the scanning line terminal location GS and the right side relates to a cross sectional view at the signal line terminal location DS, and FIGS. 64B–64D show manufacturing steps 1–3 for the terminal section part.

The active matrix substrate plate in Embodiment 11 is formed on a glass plate 1, such that a plurality of scanning lines 11 comprised by the first conductor layer 10 and a plurality of signal lines 31 comprised by the second conductor layer 50 are arranged at right angles across a gate insulation layer 2, and in the vicinity of the TFT section Tf formed in the intersection of the scanning line 11 and the signal line 31, the gate electrode 12 extending from the scanning line 11, a semiconductor layer 20 comprised by the island-shaped amorphous silicon layer 21 and an $n^+$ amorphous silicon layer 22 opposing the gate electrode across the gate insulation layer 2, and a pair of drain electrode 32 and source electrode 33 comprised by a second conductor layer 50 above the semiconductor layer and spaced with a gap of channel gap 23 comprise an inverted staggered structure TFT, and a pixel electrode 41 comprised by a transparent conductive layer 40 is formed in a window section Wd, for transmitting light, which is surrounded by the scanning line 11 and the signal line 31, and the drain electrode 32 is connected to the signal line 31, the source electrode 33 is connected to the pixel electrode 41 to form a TN-type active matrix substrate plate.

In this active matrix substrate plate, the first conductor layer 10 forming the scanning line 11 and the gate electrode 12 is produced by laminating a lower metallic layer 10A comprised by Al or an alloy of primarily Al and an upper metallic layer 10B comprised by a high melting point metal such as Ti or its nitride. Also, the second conductor layer 50 comprising the signal line 31, drain electrode 32, source electrode 33 is formed by laminating the metallic layer 30 comprised by Cr or Mo on top of the transparent conductive layer 40 comprised by ITO.

The pixel electrode 41 is constructed such that the second conductor layer 50 comprised by the transparent conductive layer 40 and the metallic layer 30 descends vertically from the source electrode 33 to the glass plate 1 so as to cover the lateral surface of the lamination of the gate insulation layer 2 and the semiconductor layer 20, and the transparent conductive layer 40 formed in the lower layer of the metallic layer 30 extends towards the window section Wd on the glass plate 1.

Also, the lateral surface of the first conductor layer 10 formed above the glass plate 1 concurrently with the scanning line 11 is totally covered by the gate insulation layer 2. Also, a portion of both lateral surfaces of the amorphous silicon layer 21, in the direction of the extending channel gap 23 of the TFT section Tf, is covered by the protective insulation layer 3.

Also, in this embodiment, as in the scanning line terminal section, the opening section of the protective insulation layer 3 is not provided above the connection section of the first conductor layer 10 and the second conductor layer 50.

Here, the pixel electrode 41 forms an accumulation capacitance electrode 71 by extending to superimpose above the accumulation common electrode 72 formed inside the forestage scanning lines 11 across the gate insulation layer 2 to construct the accumulation capacitance section Cp in this pixel region. Also, in this pixel region, a light blocking layer 17 comprised by the first conductor layer 10 is formed so as to superimpose across the gate insulation layer 2 a portion on one perimeter section of the pixel electrode 41. Where the scanning line 11 and the signal line 31 intersect, the semiconductor layer 20 is formed and left between the gate insulation layer 2 and the signal line 31.

The active matrix substrate plate in Embodiment 11 is manufactured according to the following four steps.

(Step 1) as shown in FIGS. 60A–60D and FIG. 64C, the first conductor layer 10 is formed by continually sputtering on the glass plate 1 to form the lower metallic layer 10A comprised by Al of about 200 nm thickness and the upper metallic layer 10B comprised by Ti of about 100 nm thickness, and through photolithographic processes, excepting the scanning line 11, gate electrode 12 extending from the scanning line 11 to the TFT section Tf in the respective pixel regions, accumulation common electrode 72 formed inside the forestage scanning line 11 and the light blocking layer 17, the first conductor layer 10 is removed by etching.

(Step 2) as shown in FIGS. 61A–61D and FIG. 64C, on the above substrate plate, gate insulation layer 2 comprised by silicon nitride film of about 400 nm thickness and the semiconductor layer 20 comprised by the amorphous silicon layer 21 of about 250 nm thickness and the $n^+$ amorphous silicon layer 22 of about 50 nm are deposited by continually applying plasma CVD. Next, through photolithographic processes, excepting the opening section 61 on the longitudinal tip side above the gate electrode 12, opening section 62 formed above the scanning line 11 of the gate electrode base section, and opening section 63 formed above the scanning line end section 11*b*, and leaving so as to cover at least the upper surface and an entire lateral surface of the first conductor layer 10 (scanning line 11, gate electrode 12, light blocking layer 17) with the gate insulation layer 2, the semiconductor layer 20 and the gate insulation 2 are removed successively by etching. By so doing, the semiconductor layer 20 and the gate insulation layer 2 are removed from the window section Wd to expose the glass plate 1 and at two locations above the gate electrode 12 and scanning line 11 the opening sections 61, 62 are formed to reach the first conductor layer 10, and the opening section 63 is formed above the scanning line end section 11*b* to reach the first conductor layer 10.

(Step 3) as shown in FIGS. 62A–62D and FIG. 64D, on the above substrate plate, the transparent conductive layer 40 comprised by ITO of about 50 nm thickness and the metallic layer 30 comprised by Cr of about 200 nm thickness are sputtered continually to form the second conductor layer 50. Next, through photolithographic processes, excepting the signal line 31, signal line terminal section 31*a* formed in the signal line terminal location DS, connection electrode section 42 connecting to the scanning line end section 11*b* through the opening 63 formed above the scanning line terminal section 11*a*, scanning line terminal section 11*a* formed in the scanning line terminal location GS by further extending from the connection electrode, common wiring line and common wiring line terminal section (not shown), and within the respective pixel regions, drain electrode 32 extending from the signal line 31 towards the TFT section Tf, pixel electrode 41, source electrode 33 separated from the drain electrode 32 by the opposing channel gap 23 and extending from the pixel electrode towards the TFT section Tf, the second conductor layer 50 is removed by etching. In this case, the perimeter of the pixel electrode 41 are extended so as to superimpose on the accumulation common electrode 72 in the accumulation capacitance section Cp to form the accumulation capacitance electrode 71, and both perimeter sections of the pixel electrode adjacent to this perimeter section are formed so that at least a portion will superimpose respectively on the light blocking layer 17.

Figure 63A:
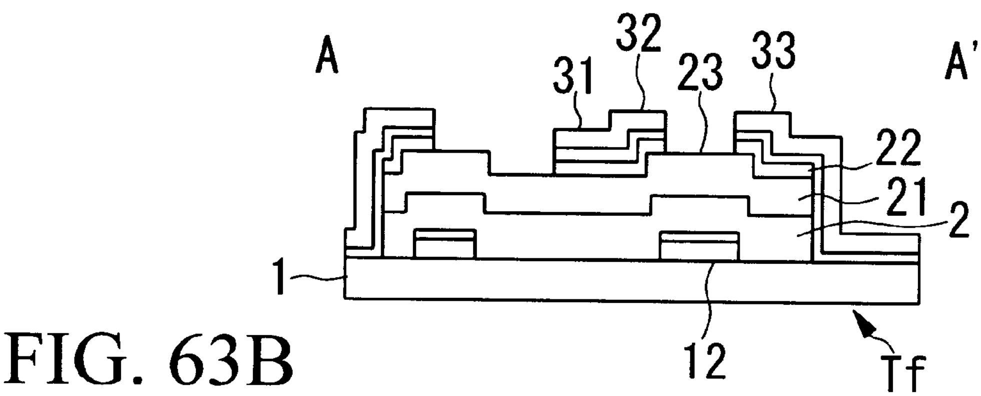
FIGS. 63A–63C are cross sectional views of a channel-formed TFT of the active matrix substrate plate manufacturing in Embodiment 11.
Figure 63B:
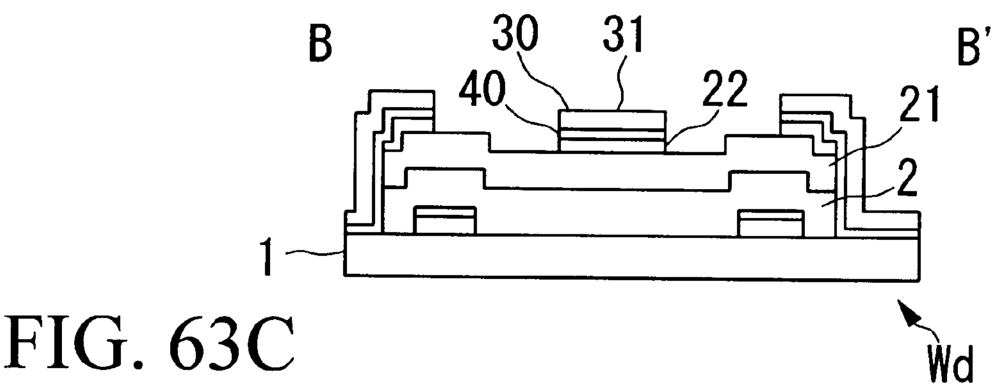
Figure 63C:
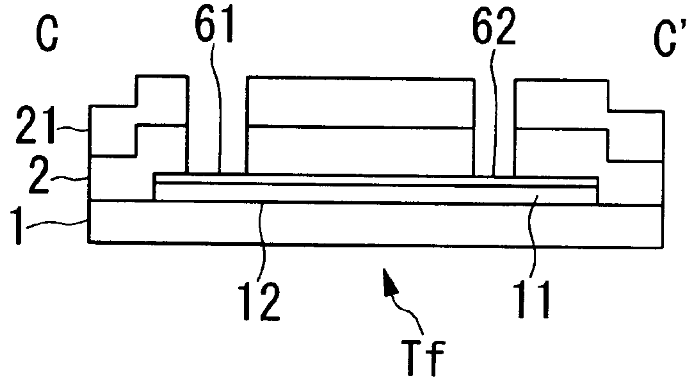
Figures 64A, 64B, 64C, 64D:
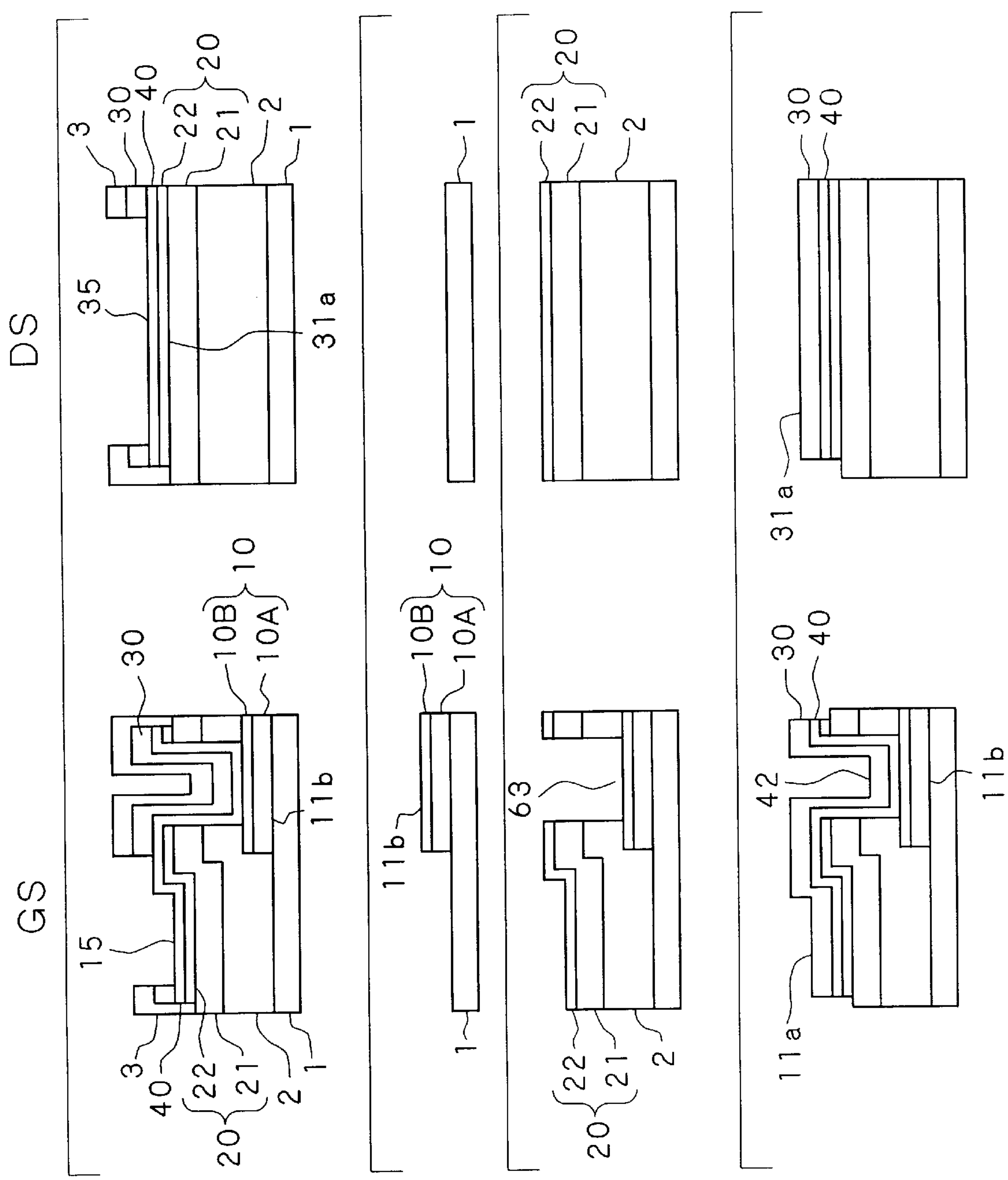
FIG. 64A is a cross sectional view in the longitudinal direction of a terminal section of the active matrix substrate plate in Embodiment 11, and the left side relates to the scanning line terminal section and the right side relates to the signal line terminal section.
FIGS. 64B–64D are cross sectional views relating to manufacturing step 1–step 3, respectively.

Next, as shown in FIGS. 63A–63C, using the second conductor layer 50 after removing its masking pattern or the masking used in the etching process as masking, the exposed $n^+$ amorphous silicon layer 22 is removed by etching. By so doing, channel gap 23 is formed and in the direction of the extending channel gap, the amorphous silicon layer 21 is exposed beyond the openings sections 61, 62.

(Step 4) as shown in FIGS. 59A–59D and FIG. 64A, on the above substrate plate the protective insulation layer 3 of about 150 nm thickness comprised by silicon nitride film is deposited using plasma CVD process, and through photolithographic processes, excepting the protective insulation layer 3 above the pixel electrode 41 and scanning line terminal section 11*a* and signal line terminal section 31*a* and the common wiring line terminal section (not shown) and leaving so as to cover at least the upper surface and an entire lateral surface of the signal line 31 with the protective insulation layer 3 and so as to form the semiconductor layer of the TFT section Tf, the protective insulation layer 3 and amorphous silicon layer 21 are removed successively by etching. At this time, the opening sections 61, 62 and the perimeter section of the protective insulation layer 3 are intersected and leaving the protective insulation layer 3 of the TFT section Tf in such a way that the perimeter section of the protective insulation layer descends to cover a portion of the lateral surface of the amorphous silicon layer 21 on the channel gap 23 side exposed at the opening sections 61, 62, the outer protective insulation layer and the amorphous silicon layer are removed by etching. Next, the metallic layer 30 exposed at the opening section formed in the protective insulation layer above the pixel electrode 41 and scanning line terminal section 11*a* and signal line terminal section 31*a* and common wiring line terminal section is removed by etching, to expose the pixel electrode 41 and the scanning line terminal 15 and the signal line terminal 35, and the common wiring terminal (not shown) comprised by the transparent conductive layer 40. Lastly, the active matrix substrate plate is completed by performing annealing at about 280° C.

In this case, a lamination of a nitride film of Al and Ti is used for the first conductor layer, but the first layer may be a three layer structure formed by laying an underlayer of a high melting point metal such as Ti below the Al layer, to form Ti, Al and Ti nitride layers, or single film layer of Cr or Mo may be used.

Also, in the present embodiment, the vertical-type TFT in which the gate electrode extends from the scanning line to the pixel section, but the lateral-type TFT may be used, in which the gate electrode shares a portion of the scanning lines.

Productivity and the yield of the TN-type active matrix substrate plate in Embodiment 11 are improved because it can be manufactured in four steps.

Also, in this active matrix substrate plate, because the opening section of the protective insulation layer is not provided above the connection section between the first conductor layer and the second conductor layer, even when a same metal is used or different metals are used for the first conductor layer and second conductor layer, if the first conductor layer is not resistant to etching of the metallic layer in the second conductor layer, after the protective insulation layer is opened and when the metal layer in the second conductor layer is to be removed by etching, it is possible to prevent the etching solution to infiltrate through the transparent conductive layer at the connection section and corrode the first conductor layer.

Also, when etching the metallic layer in the signal lines or the transparent conductive layer, effects of preventing infiltration corrosion of the circuit elements of the scanning lines, effects of protection from static charges, improvement in reliability of TFT, lowering of resistance of scanning and signal lines, and improving the dielectric strength of insulation and aperture factor are exactly the same as those in Embodiment 10.

Embodiment 12

Figure 65A:
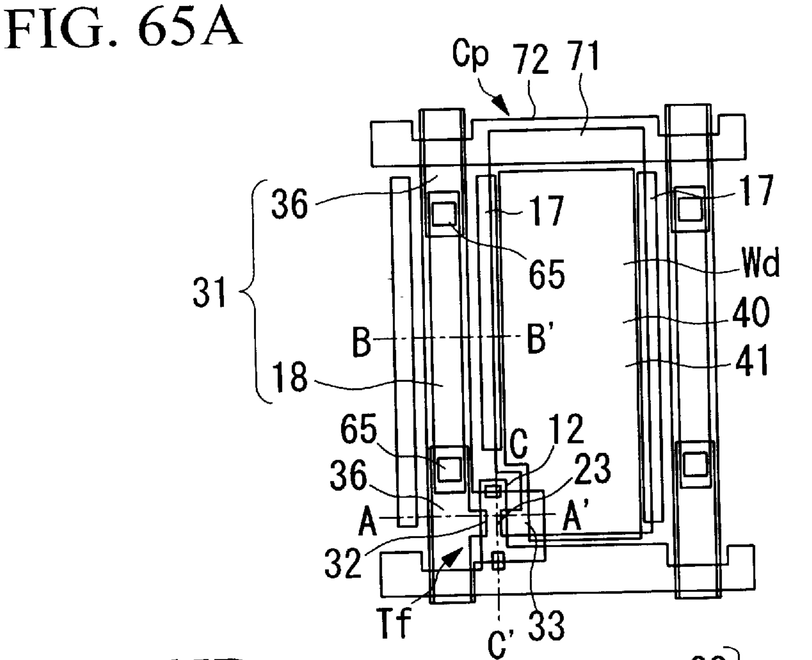
FIG. 65A is a perspective plan view of a one-pixel-region of the active matrix substrate plate in Embodiment 12.
Figure 65B:
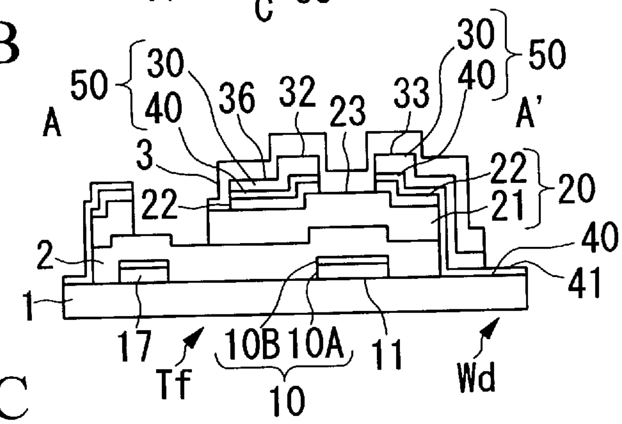
FIG. 65B is a cross sectional view through the plane A–A'.
Figure 65C:
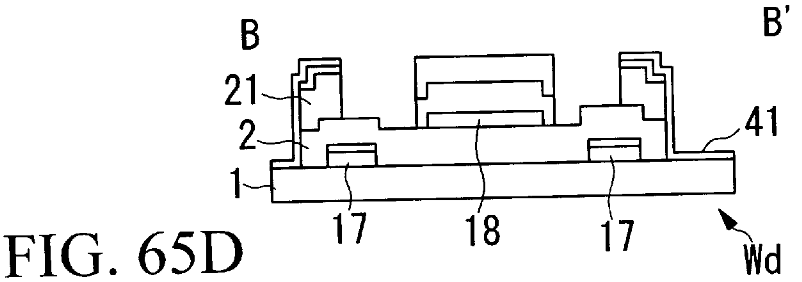
FIG. 65C is a cross sectional view through the plane B–B'.
Figure 65D:
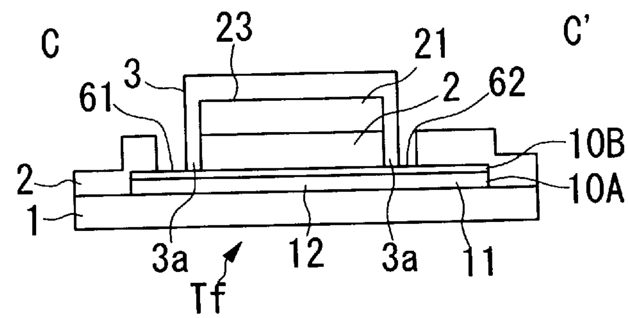
FIG. 65D is a cross section view through the plane C–C'.
Figure 66A:
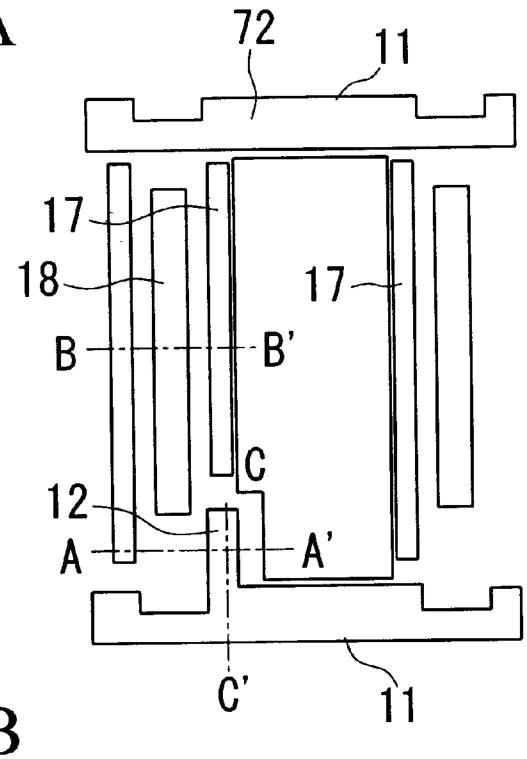
FIG. 66A is a perspective plan view of a one-pixel-region of the active matrix substrate plate in step 1 of the manufacturing process in Embodiment 12.
Figure 66B:
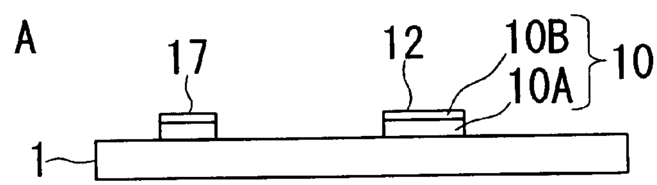
FIG. 66B is a cross sectional view through the plane A–A'.
Figure 66C:
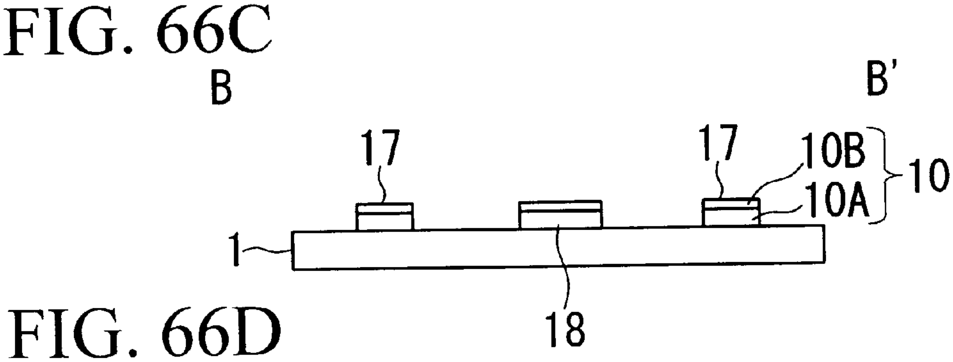
FIG. 66C is a cross sectional view through the plane B–B'.
Figure 66D:
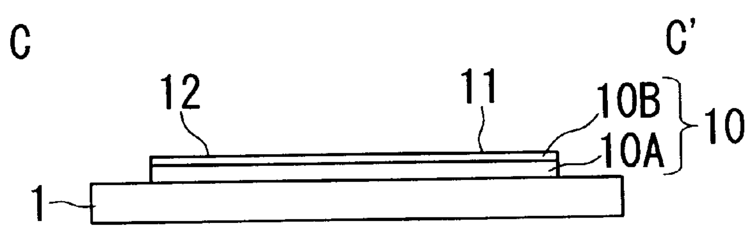
FIG. 66D is a cross section view through the plane C–C'.
Figure 67A:
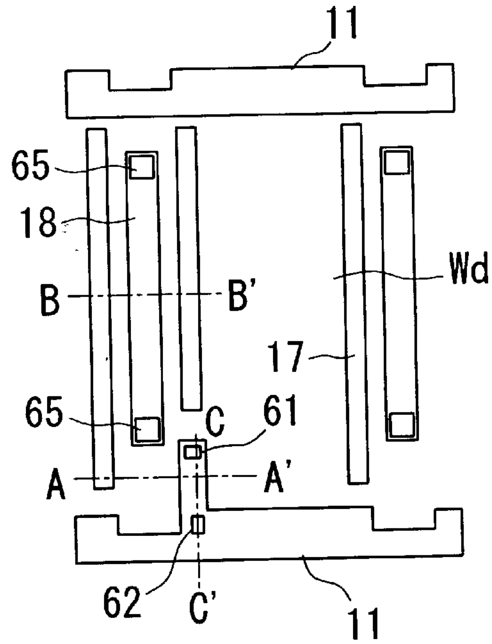
FIG. 67A is a perspective plan view of a one-pixel-region of the active matrix substrate plate in step 2 of the manufacturing process in Embodiment 12.
Figure 67B:
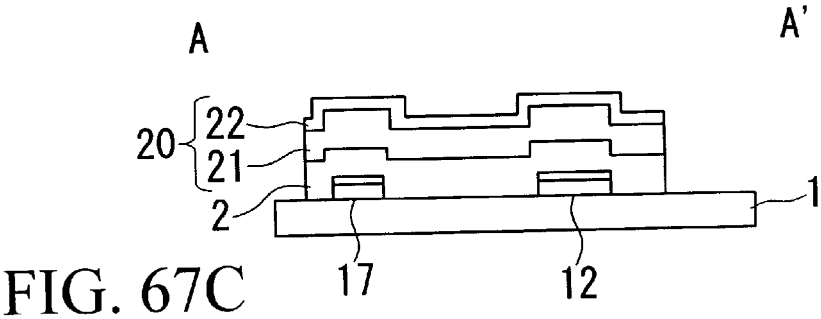
FIG. 67B is a cross sectional view through the plane A–A'.
Figure 67C:
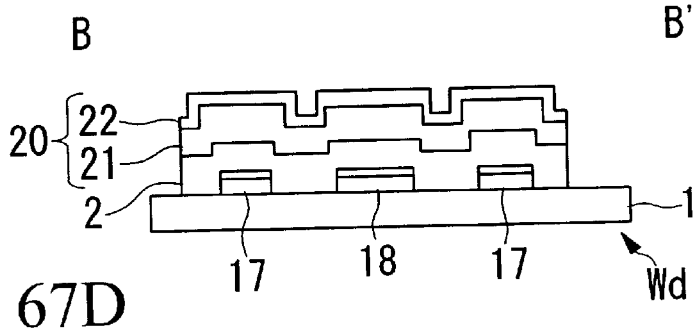
FIG. 67C is a cross sectional view through the plane B–B'.
Figure 67D:
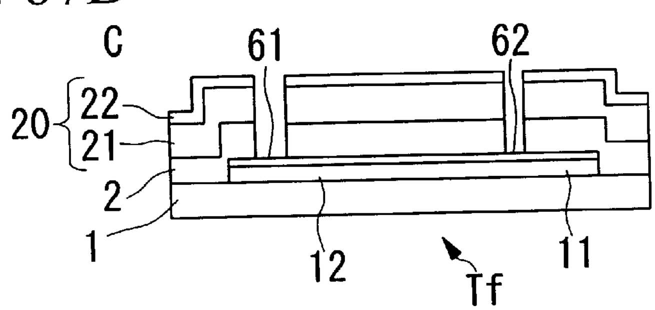
FIG. 67D is a cross section view through the plane C–C'.
Figure 68A:
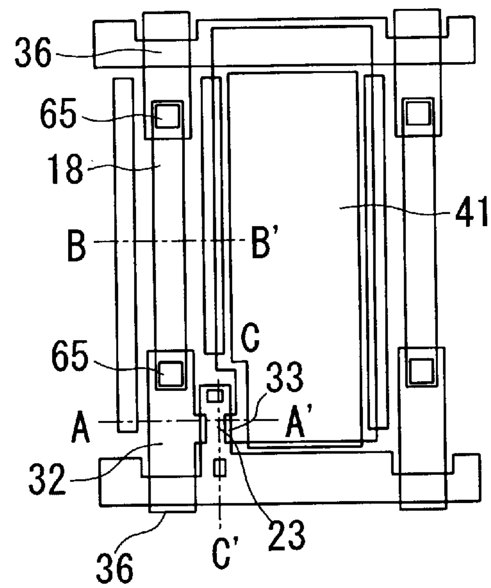
FIG. 68A is a perspective plan view of a one-pixel-region of the active matrix substrate plate in step 3 of the manufacturing process in Embodiment 12.
Figure 68B:
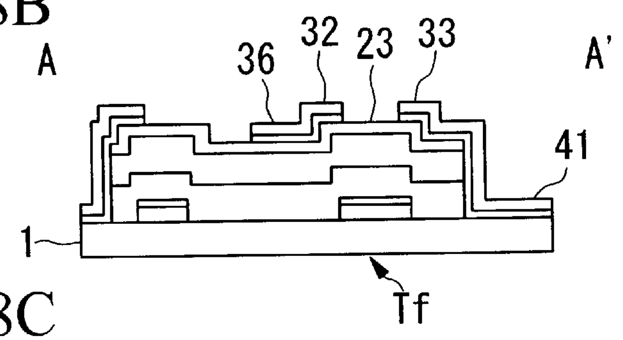
FIG. 68B is a cross sectional view through the plane A–A'.
Figure 68C:
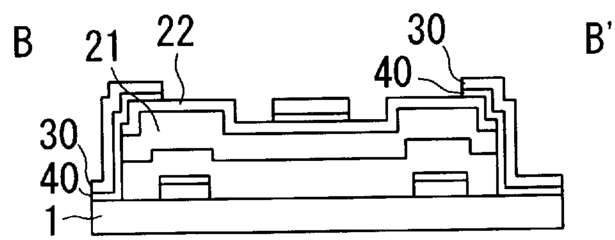
FIG. 68C is a cross sectional view through the plane B–B'.
Figure 68D:
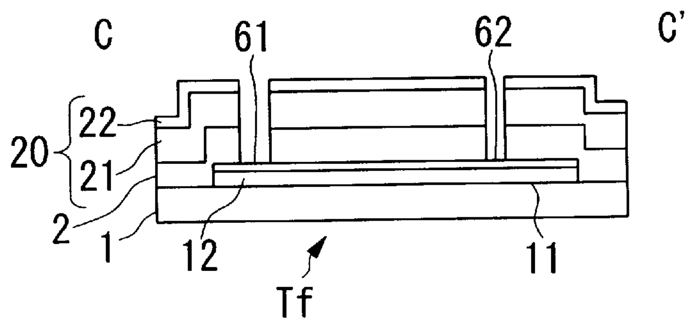
FIG. 68D is a cross section view through the plane C–C'.

FIG. 65A is a perspective plan view to show a one-pixel-region of the active matrix substrate plate in Embodiment 12, and FIG. 65B is a cross sectional view through the plane A–A', FIG. 65C is the same through the plane B–B', and FIG. 65D is the same through the plane C–C'. FIGS. 66A–69C are diagrams to show the manufacturing steps of the active matrix substrate plate, relating to steps 1–3, and a channel-formed TFT, respectively. Similar to FIG. 65A, FIGS. 66A, 67A, and 68A are perspective plan views of a one-pixel-region, and FIGS. 66B–66D, 67B–67D, 68B–68D and FIGS. 69A–69C are cross sectional views through the planes A–A' and B–B', C–C', respectively. Also, FIG. 70A is a cross sectional view of the terminal section of the active matrix substrate plate in the longitudinal direction, in which the left side relates to a cross sectional view at the scanning line terminal location GS and the right side relates to a cross sectional view at the signal line terminal location DS, and FIGS. 70B–70D show manufacturing steps 1–3 for the terminal section part.

The active matrix substrate plate in Embodiment 12 is formed on a glass plate 1, such that a plurality of scanning lines 11 comprised by the first conductor layer 10 and a plurality of signal lines 31 are arranged at right angles, and in the vicinity of the TFT section Tf formed in the intersection of the scanning line 11 and the signal line 31, the gate electrode 12 extending from the scanning line 11, a semiconductor layer 20 comprised by the island-shaped amorphous silicon layer 21 and an $n^+$ amorphous silicon layer 22 opposing the gate electrode across the gate insulation layer 2, and a pair of drain electrode 32 and source electrode 33 comprised by a second conductor layer 50 above the semiconductor layer and spaced with a gap of channel gap 23 comprise an inverted staggered structure TFT, and a pixel electrode 41 comprised by a transparent conductive layer 40 is formed in a window section Wd, for transmitting light, which is surrounded by the scanning line 11 and the signal line 31, and the drain electrode 32 is connected to the signal line 31, the source electrode 33 is connected to the pixel electrode 41 to form a TN-type active matrix substrate plate In this active matrix substrate plate, the signal line 31 is comprised by a lower layer signal line 18 comprised by the first conductor layer 10 formed between the adjacent scanning lines 11 on the glass plate 1 so as not to contact the scanning line 11, and an upper layer signal line 36 comprised by the second conductor layer 50 connected to the lower layer signal line 18, opposing across the scanning line 11 in the adjacent pixel region through the opening section 65, punched through the gate insulation layer 2 and the semiconductor layer 20.

The first conductor layer 10 forming the scanning line 11, gate electrode 12, lower layer signal line 18 is formed by laminating the lower metallic layer 10A comprised by Al or an alloy of primarily Al and the upper metallic layer 10B comprised by a high melting point metal such as Ti or its nitride.

Also, the second conductor layer 50 forming the upper layer signal line 36, drain electrode 32, and source electrode 33 is formed by laminating the metallic layer 30 comprised by Cr or Mo above he transparent conductive layer 40 comprised by ITO.

The pixel electrode 41 is constructed such that the second conductor layer 50 comprised by the transparent conductive layer 40 and the metallic layer 30 descends vertically from the source electrode 33 to the glass plate 1 so as to cover the lateral surface of the lamination of the gate insulation layer 2 and the semiconductor layer 20, and the transparent conductive layer 40 formed in the lower layer of the metallic layer 30 extends towards the window section Wd on the glass plate 1.

Also, the lateral surface of the first conductor layer 10 formed above the glass plate 1 concurrently with the scanning line 11 is totally covered by the gate insulation layer 2. Also, a portion of both lateral surfaces of the amorphous silicon layer 21, in the direction of the extending channel gap 23 of the TFT section Tf, is covered by the protective insulation layer 3.

Here, the pixel electrode 41 forms an accumulation capacitance electrode 71 by extending to superimpose above the accumulation common electrode 72 formed inside the forestage scanning lines 11 across the gate insulation layer 2 to construct the accumulation capacitance section Cp in this pixel region. Also, in this pixel region, a light blocking layer 17 comprised by the first conductor layer 10 is formed so as to superimpose across the gate insulation layer 2 a portion on one perimeter section of the pixel electrode 41. Where the scanning line 11 and the signal line 31 intersect, the semiconductor layer 20 is formed and left between the gate insulation layer 2 and the signal line 31.

The active matrix substrate plate in Embodiment 12 is manufactured according to the following four steps.

(Step 1) as shown in FIGS. 66A–66D and FIG. 70B, the first conductor layer 10 is formed by continually sputtering on the glass plate 1 to form the lower metallic layer 10A comprised by Al of about 200 nm thickness and the upper metallic layer 10B by Ti of about 100 nm thickness, and through photolithographic processes, excepting the scanning line 11, scanning line terminal section 11*a* formed in the scanning line terminal location GS, and within the respective pixel regions, gate electrode 12 extending from the scanning line 11 to the TFT section Tf, lower layer signal line 18 to form a part of the signal line 31 formed between the adjacent scanning lines 11 and not contacting the scanning line 11, accumulation common electrode 72 formed inside the forestage scanning line 11 and the light blocking layer 17, the first conductor layer 10 is removed by etching.

(Step 2) as shown in FIGS. 67A–67D and FIG. 70C, on the above substrate plate, gate insulation layer 2 comprised by silicon nitride film of about 400 nm thickness and the semiconductor layer 20 comprised by the amorphous silicon layer 21 of about 250 nm thickness and the $n^+$ amorphous silicon layer 22 of about 50 nm thickness are deposited by continually applying plasma CVD. Next, through photolithographic processes, excepting the opening section 61 on the longitudinal tip side above the gate electrode 12, opening section 62 above the scanning line 11 of the gate electrode base section, opening section 65 formed above both end sections of the lower layer signal line 18 and opening section 63 formed above the scanning line terminal section 11*a*, and leaving so as to cover at least the upper surface and an entire lateral surface of the first conductor layer 10 (scanning line 11, scanning line terminal section 11*a*, lower layer signal line 18, gate electrode 12, light blocking layer 17) with the gate insulation layer 2, the semiconductor layer 20 and the gate insulation 2 are removed successively by etching. By so doing, the semiconductor layer 20 and the gate insulation layer 2 are removed from the window section Wd to expose the glass plate 1, the opening sections 61, 62, 63, and 65 are formed to reach the first conductor layer 10.

(Step 3) as shown in FIGS. 68A–68D and FIG. 70D, on the above substrate plate, the transparent conductive layer 40 comprised by ITO of about 50 nm thickness and the metallic layer 30 comprised by Cr of about 200 nm thickness are continually sputtered to form the second conductor layer 50. Next, through photolithographic processes, excepting the connection electrode section 42 connecting to the scanning line terminal 11*a* through the opening section 63 above the scanning line terminal section 11*a*, signal line terminal section 31*a* formed in the signal line terminal location DS, upper layer signal line 36 connecting to the lower layer signal line 18 opposing the adjacent pixel region across the scanning line 11 through the opening section 65 punched through the semiconductor layer 20 and the gate insulation layer 2, common wiring line and common wiring line terminal section (not shown), and within the respective pixel regions, drain electrode 32 extending from the upper layer signal line 36 towards the TFT section Tf, pixel electrode 41, source electrode 33 separated from the drain electrode 32 by the opposing channel gap 23 and extending from the pixel electrode to the TFT section Tf, the second conductor layer 50 is removed by etching. In this case, the perimeter of the pixel electrode 41 are extended so as to superimpose on the accumulation common electrode 72 in the accumulation capacitance section Cp to form the accumulation capacitance electrode 71, and both perimeter sections of the pixel electrode adjacent to this perimeter section are formed so that at least a portion will superimpose respectively on the light blocking layer 17.

Figure 69A:
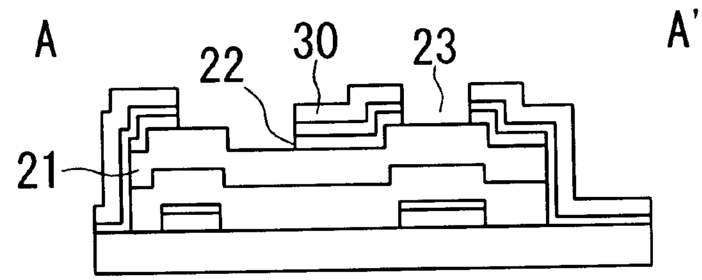
FIGS. 69A–69C are cross sectional views of a channel-formed TFT in active matrix substrate plate manufacturing in Embodiment 12.
Figure 69B:
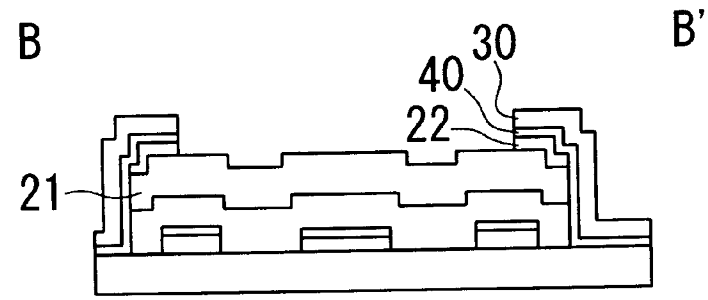
Figure 69C:
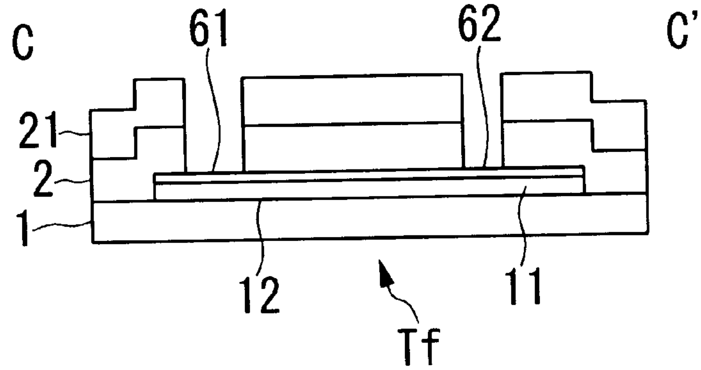
Figures 70A, 70B, 70C, 70D:
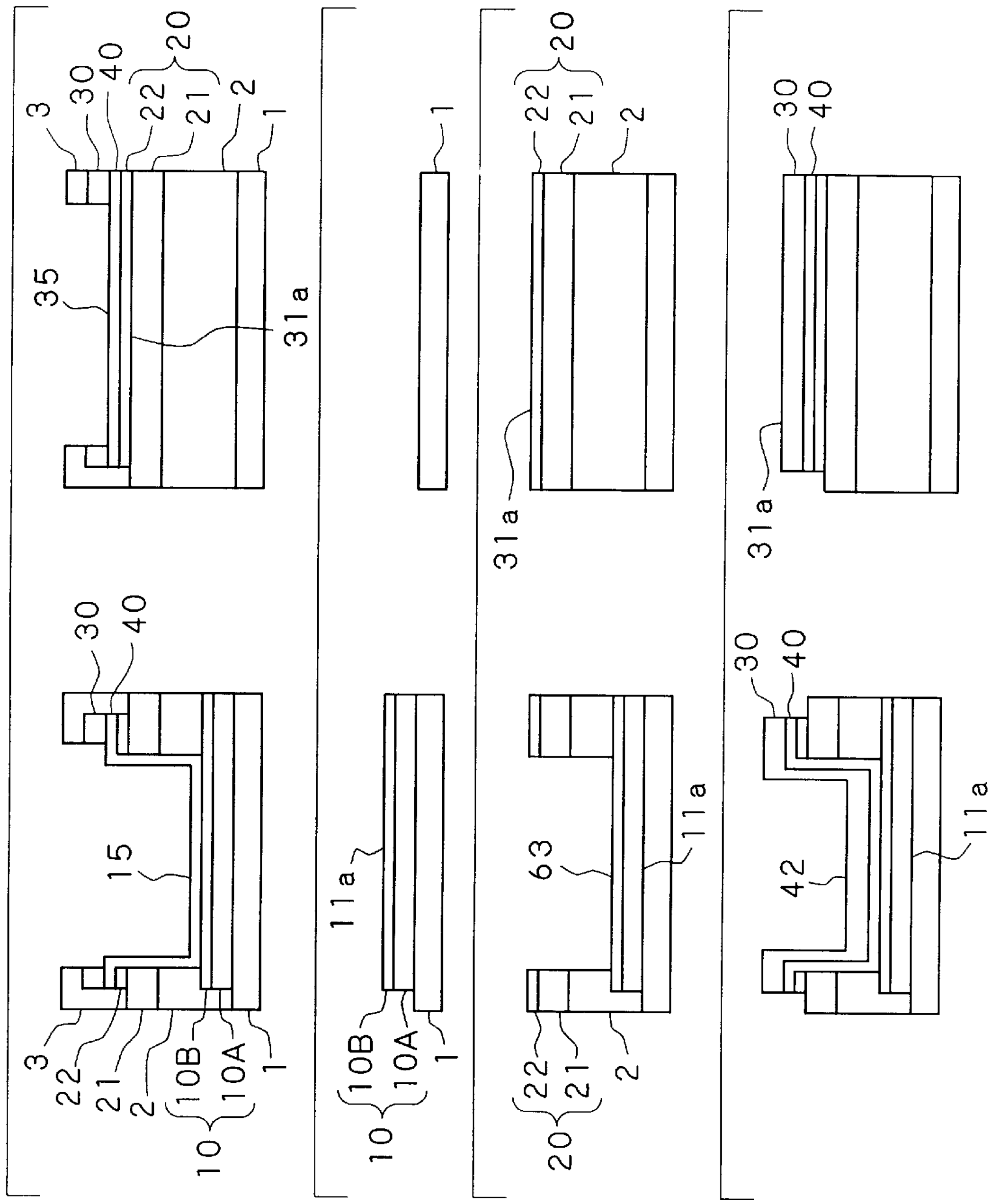
FIG. 70A is a cross sectional view in the longitudinal direction of a terminal section of the active matrix substrate plate in Embodiment 12, and the left side relates to the scanning line terminal section and the right side relates to the signal line terminal section.
FIGS. 70B–70D are cross sectional views relating to manufacturing step 1–step 3, respectively.

Next, as shown in FIGS. 69A–69C, using the second conductor layer 50 after removing its masking pattern or the masking used in the etching process as masking, the exposed $n^+$ amorphous silicon layer 22 is removed by etching. By so doing, channel gap 23 is formed and in the direction of the extending channel gap, the amorphous silicon layer 21 is exposed beyond the opening sections 61, 62.

(Step 4) as shown in FIGS. 65A–65D and FIG. 70A, on the above substrate plate the protective insulation layer 3 of about 150 nm thickness comprised by silicon nitride film is deposited using plasma CVD process, and through photolithographic processes, excepting the protective insulation layer 3 above the pixel electrode 41 and connection electrode section 42 and signal line terminal section 31*a* and the common wiring line terminal section (not shown) and leaving so as to cover at least the upper surface and an entire lateral surface of the upper layer signal line 36 with the protective insulation layer 3 and so as to form the semiconductor layer of the TFT section Tf, the protective insulation layer 3 and amorphous silicon layer 21 are removed successively by etching. At this time, the opening sections 61, 62 and the perimeter section of the protective insulation layer 3 are intersected and leaving the protective insulation layer 3 of the TFT section Tf in such a way that the perimeter section of the protective insulation layer descends to cover a portion of the lateral surface of the amorphous silicon layer 21 on the channel gap 23 side exposed at the opening sections 61, 62, the outer protective insulation layer and the amorphous silicon layer are removed by etching. Next, the metallic layer 30 exposed at the opening section formed in the protective insulation layer 3 above the pixel electrode 41 and connection electrode section 42 and signal line terminal section 31*a* and common wiring line terminal section is removed by etching, to expose the pixel electrode 41 and the signal line terminal 35 and the common wiring terminal (not shown) comprised by the transparent conductive layer 40, and the scanning line 15 laminated with the transparent conductive layer 40 through the opening section 63 punched through semiconductor layer 20 and gate insulation layer 2 above the first conductor layer 10. Lastly, the active matrix substrate plate is completed by performing annealing at about 280° C.

In this case, a lamination of Al and Ti is used for the first conductor layer, but the first layer may be a three layer structure formed by laying an underlayer of a high melting point metal such as Ti below the Al layer, to form Ti, Al and Ti nitride layers, or single film layer of Cr may be used.

Also, in the present embodiment, the vertical-type TFT in which the gate electrode extends from the scanning line to the pixel section, but the lateral-type TFT may be used, in which the gate electrode shares a portion of the scanning lines.

Productivity and the yield of the TN-type active matrix substrate plate in Embodiment 12 are improved because it can be manufactured in four steps.

Also, in this active matrix substrate plate, because a portion of the signal line is formed as the lower layer signal line in a layer different than the pixel electrode, shorting of signal line and pixel electrode is reduced, and the yield is improved.

Also, when etching the metallic layer in the signal lines or the transparent conductive layer, effects of preventing infiltration corrosion of the circuit elements of the scanning lines, effects of protection from static charges, improvement in reliability of TFT, lowering of resistance of scanning and signal lines, and improving the dielectric strength of insulation and aperture factor are exactly the same as those in Embodiment 10.

Embodiment 13

Figure 71A:
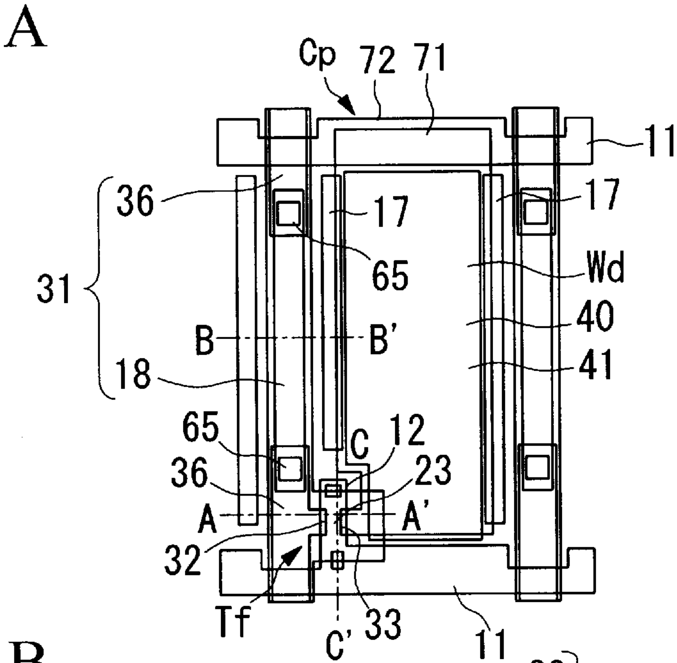
FIG. 71A is a perspective plan view of a one-pixel-region of the active matrix substrate plate in Embodiment 13.
Figure 71B:
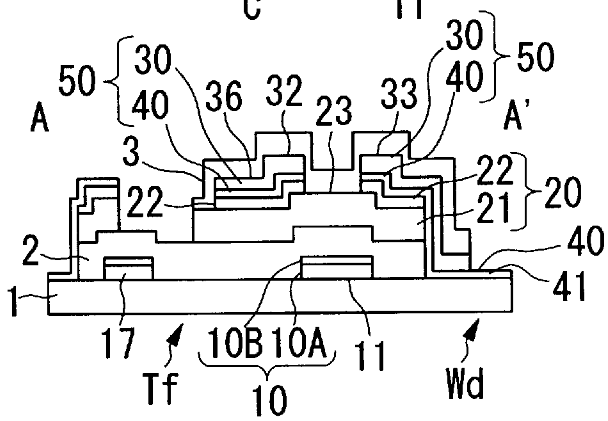
FIG. 71B is a cross sectional view through the plane A–A'.
Figure 71C:
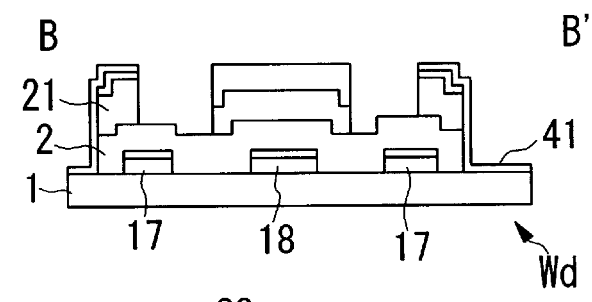
FIG. 71C is a cross sectional view through the plane B–B'.
Figure 71D:
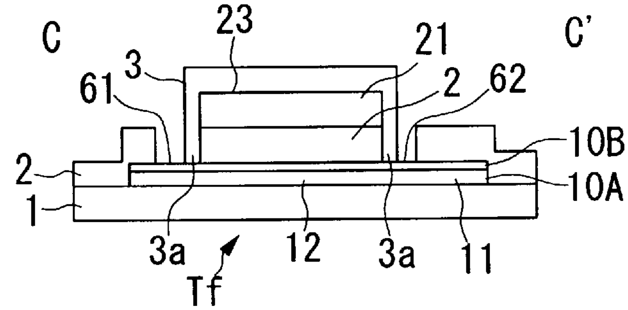
FIG. 71D is a cross section view through the plane C–C'.
Figure 72A:
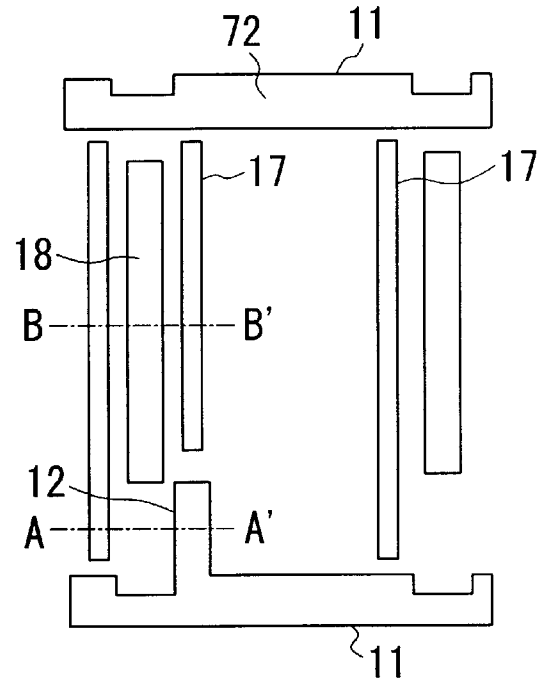
FIG. 72A is a perspective plan view of a one-pixel-region of the active matrix substrate plate in step 1 of the manufacturing process in Embodiment 13.
Figure 72B:
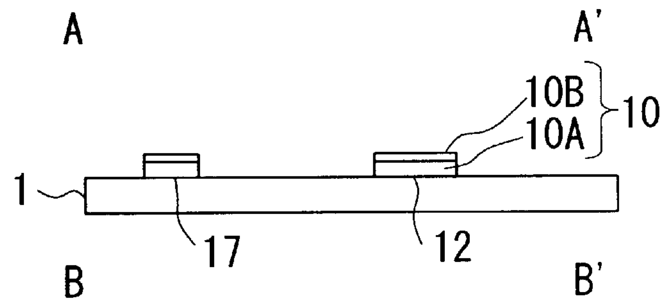
FIG. 72B is a cross sectional view through the plane A–A'.
Figure 72C:
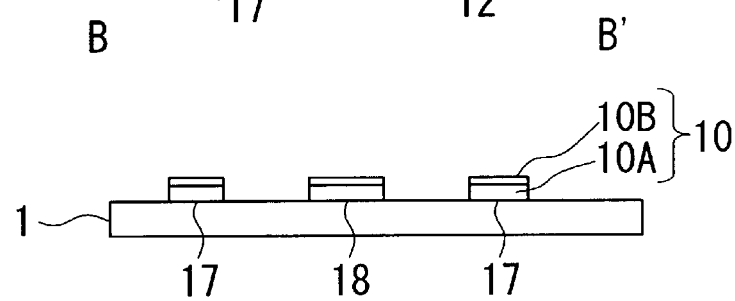
FIG. 72C is a cross sectional view through the plane B–B'.
Figure 72D:
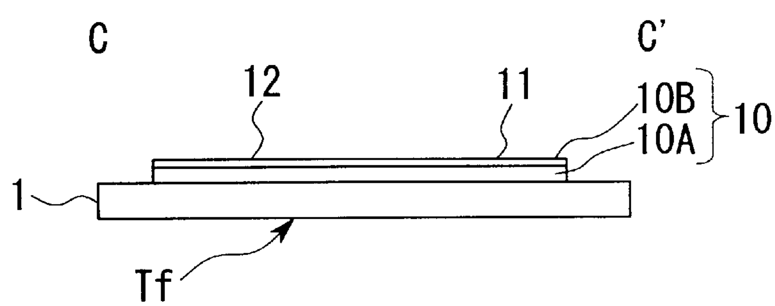
FIG. 72D is a cross section view through the plane C–C'.
Figure 73A:
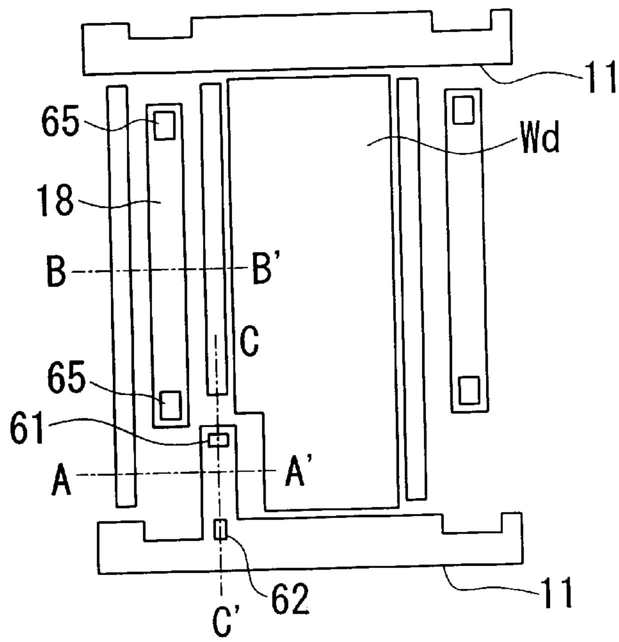
FIG. 73A is a perspective plan view of a one-pixel-region of the active matrix substrate plate in step 3 of the manufacturing process in Embodiment 13.
Figure 73B:
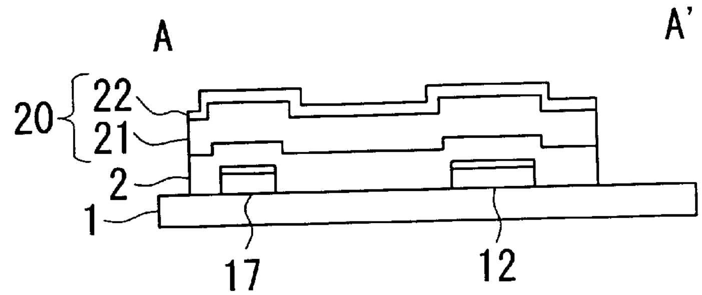
FIG. 73B is a cross sectional view through the plane A–A'.
Figure 73C:
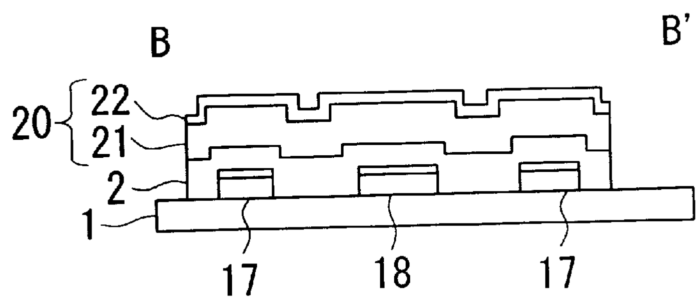
FIG. 73C is a cross sectional view through the plane B–B'.
Figure 73D:
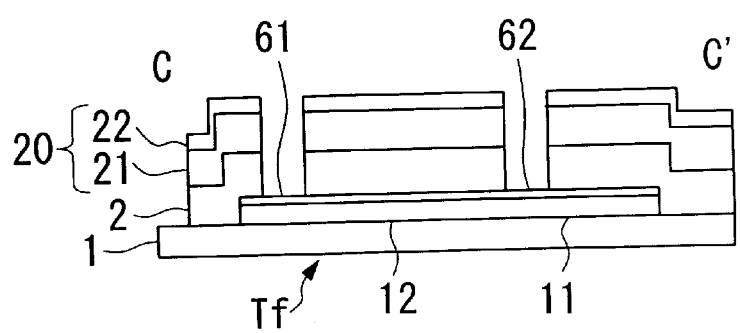
FIG. 73D is a cross section view through the plane C–C'.
Figure 74A:
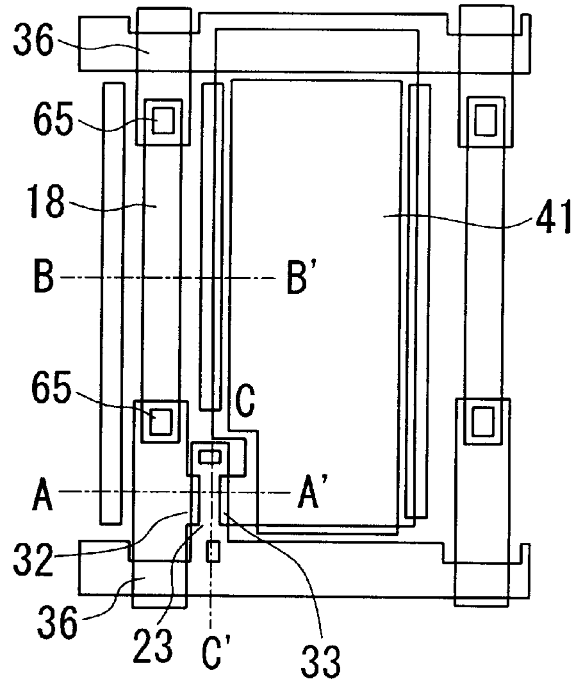
FIG. 74A is a perspective plan view of a one-pixel-region of the active matrix substrate plate in step 3 of the manufacturing process in Embodiment 13.
Figure 74B:
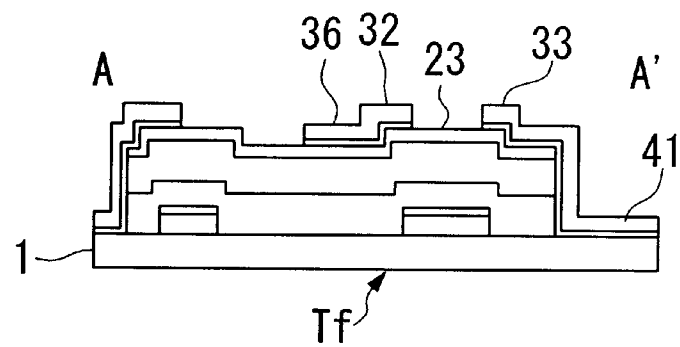
FIG. 74B is a cross sectional view through the plane A–A'.
Figure 74C:
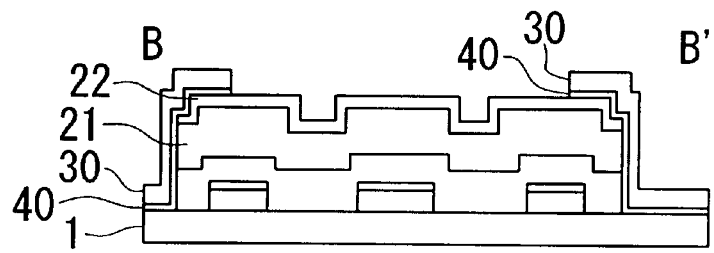
FIG. 74C is a cross sectional view through the plane B–B'.
Figure 74D:
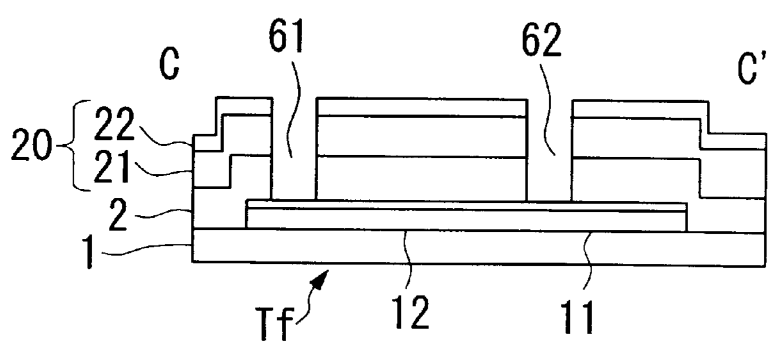
FIG. 74D is a cross section view through the plane C–C'.

FIG. 71A is a perspective plan view to show a one-pixel-region of the active matrix substrate plate in Embodiment 13, and FIG. 71B is a cross sectional view through the plane A–A', FIG. 71C is the same through the plane B–B', FIG. 71D is the same through the plane C–C'. FIGS. 72A–75C are diagrams to show the manufacturing steps of the active matrix substrate plate, relating to steps 1–3, and a channel-formed TFT, respectively. Similar to FIG. 71A, FIGS. 72A, 73A, and 74A are perspective plan views of a one-pixel-region, and FIGS. 72B–72D, 73B–73D, 74B–74D and FIGS. 75A–75C are cross sectional views through the planes A–A' and B–B', C–C', respectively. Also, FIG. 76A is a cross sectional view of the terminal section of the active matrix substrate plate in the longitudinal direction, in which the left side relates to a cross sectional view at the scanning line terminal location GS and the right side relates to a cross sectional view at the signal line terminal location DS, and FIGS. 76B–76D show manufacturing steps 1–3 for the terminal section part.

The active matrix substrate plate in Embodiment 13 is formed on a glass plate 1, such that a plurality of scanning lines 11 comprised by the first conductor layer 10 and a plurality of signal lines 31 are arranged at right angles, and in the vicinity of the TFT section Tf formed in the intersection of the scanning line 11 and the signal line 31, the gate electrode 12 extending from the scanning line 11, a semiconductor layer 20 comprised by the island-shaped amorphous silicon layer 21 and an $n^+$ amorphous silicon layer 22 opposing the gate electrode across the gate insulation layer 2, and a pair of drain electrode 32 and source electrode 33 comprised by a second conductor layer 50 above the semiconductor layer and spaced with a gap of channel gap 23 comprise an inverted staggered structure TFT, and a pixel electrode 41 comprised by a transparent conductive layer 40 is formed in a window section Wd, for transmitting light, which is surrounded by the scanning line 11 and the signal line 31, and the drain electrode 32 is connected to the signal line 31, the source electrode 33 is connected to the pixel electrode 41 to form a TN-type active matrix substrate plate.

In this active matrix substrate plate, the signal line 31 is comprised by the lower layer signal line 18 comprised by the first conductor layer 10 formed between the adjacent scanning lines 11 on the glass plate 1 so as not to contact the scanning line 11, and the upper layer signal line 36 comprised by the second conductor layer 50 connected to the lower layer signal line 18, opposing across the scanning line 11 in the adjacent pixel region through the opening section 65, punched through the gate insulation layer 2 and the semiconductor layer 20.

The first conductor layer 10 forming the scanning line 11, the gate electrode 12, lower layer signal line 18 is formed by laminating the lower metallic layer 10A comprised by Al or an alloy of primarily Al and the upper metallic layer 10B comprised by a high melting point metal such as Ti or its nitride.

Also, the second conductor layer 50 forming the upper layer signal line 36, drain electrode 32, and source electrode 33 is formed by laminating the metallic layer 30 comprised by Cr or Mo on top of the transparent conductive layer 40 comprised by ITO.

The pixel electrode 41 is constructed such that the second conductor layer 50 comprised by the transparent conductive layer 40 and the metallic layer 30 descends vertically from the source electrode 33 to the glass plate 1 so as to cover the lateral surface of the lamination of the gate insulation layer 2 and the semiconductor layer 20, and the transparent conductive layer 40 formed in the lower layer of the metallic layer 30 extends towards the window section Wd on the glass plate 1.

Also, the lateral surface of the first conductor layer 10 formed above the glass plate 1 concurrently with the scanning line 11 is totally covered by the gate insulation layer 2. Also, a portion of both lateral surfaces of the amorphous silicon layer 21, in the direction of the extending channel gap 23 of the TFT section Tf, is covered by the protective insulation layer 3.

Also, in this embodiment, as in the scanning line terminal section, the opening section of the protective insulation layer 3 above the connection section of the first conductor layer 10 and the second conductor layer 50 is not provided.

Here, the pixel electrode 41 forms an accumulation capacitance electrode 71 by extending to superimpose above the accumulation common electrode 72 formed inside the forestage scanning lines 11 across the gate insulation layer 2 to construct the accumulation capacitance section Cp in this pixel region. Also, in this pixel region, a light blocking layer 17 comprised by the first conductor layer 10 is formed so as to superimpose across the gate insulation layer 2 a portion on one perimeter section of the pixel electrode 41. Where the scanning line 11 and the signal line 31 intersect, the semiconductor layer 20 is formed and left between the gate insulation layer 2 and the signal line 31.

The active matrix substrate plate in Embodiment 13 is manufactured according to the following four steps.

(Step 1) as shown in FIGS. 72A–72D and FIG. 76B, the first conductor layer 10 is formed by continually sputtering on the glass plate 1 to form the lower metallic layer 10A comprised by Al of about 200 nm thickness and the upper metallic layer 10B comprised by Ti of about 100 nm thickness, and through photolithographic processes, excepting the scanning line 11, gate electrode 12 extending from the scanning line 11 to the TFT section Tf in the respective pixel regions, lower layer signal line 18 to form a part of the signal line 31 formed between the adjacent scanning lines 11 and not contacting the scanning line 11, accumulation common electrode 72 formed inside the forestage scanning line 11 and the light blocking layer 17, the first conductor layer 10 is removed by etching.

(Step 2) as shown in FIGS. 73A–73D and FIG. 76C, on the above substrate plate, gate insulation layer 2 comprised by silicon nitride film of about 400 nm thickness and the semiconductor layer 20 comprised by the amorphous silicon layer 21 of about 250 nm thickness and the $n^+$ amorphous silicon layer 22 of about 50 nm thickness are deposited by continually applying plasma CVD. Next, through photolithographic processes, excepting the opening section 61 on the longitudinal tip side above the gate electrode 12, opening section 62 above the scanning line 11 of the gate electrode base section, opening section 65 formed above both end sections of the lower layer signal line 18, and terminal opening section 63 formed above the scanning line end section 11*b*, and leaving so as to cover at least the upper surface and an entire lateral surface of the first conductor layer 10 (scanning line 11, gate electrode 12, lower layer signal line 18, light blocking layer 17) with the gate insulation layer 2, the semiconductor layer 20 and the gate insulation 2 are removed successively by etching. By so doing, the semiconductor layer 20 and the gate insulation layer 2 are removed from the window section Wd to expose the glass plate 1 the opening sections 61, 62, 63, and 65 are formed to reach the first conductor layer 10.

(Step 3) as shown in FIGS. 74A–74D and FIG. 76D, on the above substrate plate, the transparent conductive layer 40 comprised by ITO of about 50 nm thickness and the metallic layer 30 comprised by Cr of about 200 nm thickness are sputtered continually to form the second conductor layer 50. Next, through photolithographic processes, excepting the connection electrode section 42 connecting to the scanning line end section 11*b* through the opening section 63 punched through the semiconductor layer 20 and the gate insulation layer 2 above the scanning line end section 11*b*, the scanning line terminal section 11*a* formed in the scanning line terminal location GS by further extending from this connection electrode section, signal line terminal section 31*a* formed in the signal line terminal location DS, the upper layer signal line 36 connecting to the lower layer signal line 18 opposing the adjacent pixel region across the scanning line 11 through the opening section 65 punched through the semiconductor layer 20 and the gate insulation layer 2, common wiring line and common wiring line terminal section (not shown), and within the respective pixel regions, drain electrode 32 extending from the upper layer signal line 36 towards the TFT section Tf, pixel electrode 41, source electrode 33 separated from the drain electrode 32 by the opposing channel gap 23 and extending from this pixel electrode to the TFT section Tf, the second conductor layer 50 is removed by etching. In this case, the perimeter of the pixel electrode 41 are extended so as to superimpose on the accumulation common electrode 72 in the accumulation capacitance section Cp to form the accumulation capacitance electrode 71, and both perimeter sections of the pixel electrode adjacent to this perimeter section are formed so that at least a portion will superimpose respectively on the light blocking layer 17.

Figure 75A:
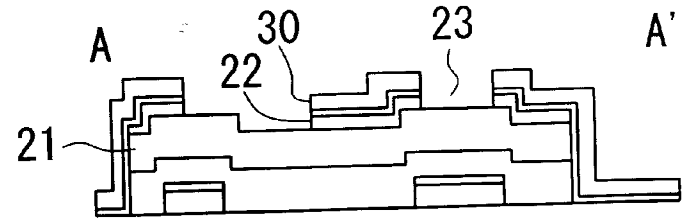
FIGS. 75A–75C are cross sectional views of a channel-formed TFT in active matrix substrate plate manufacturing in Embodiment 13.
Figure 75B:
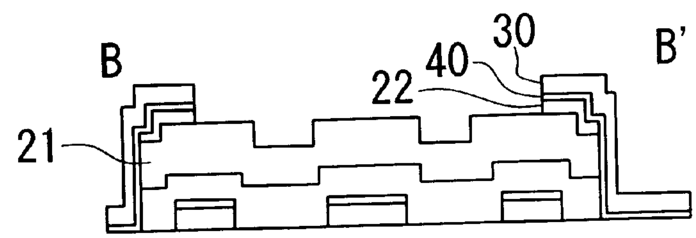
Figure 75C:
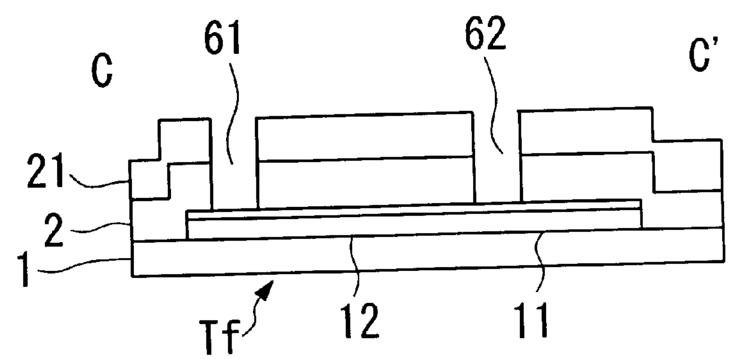
Figures 76A, 76B, 76C, 76D:
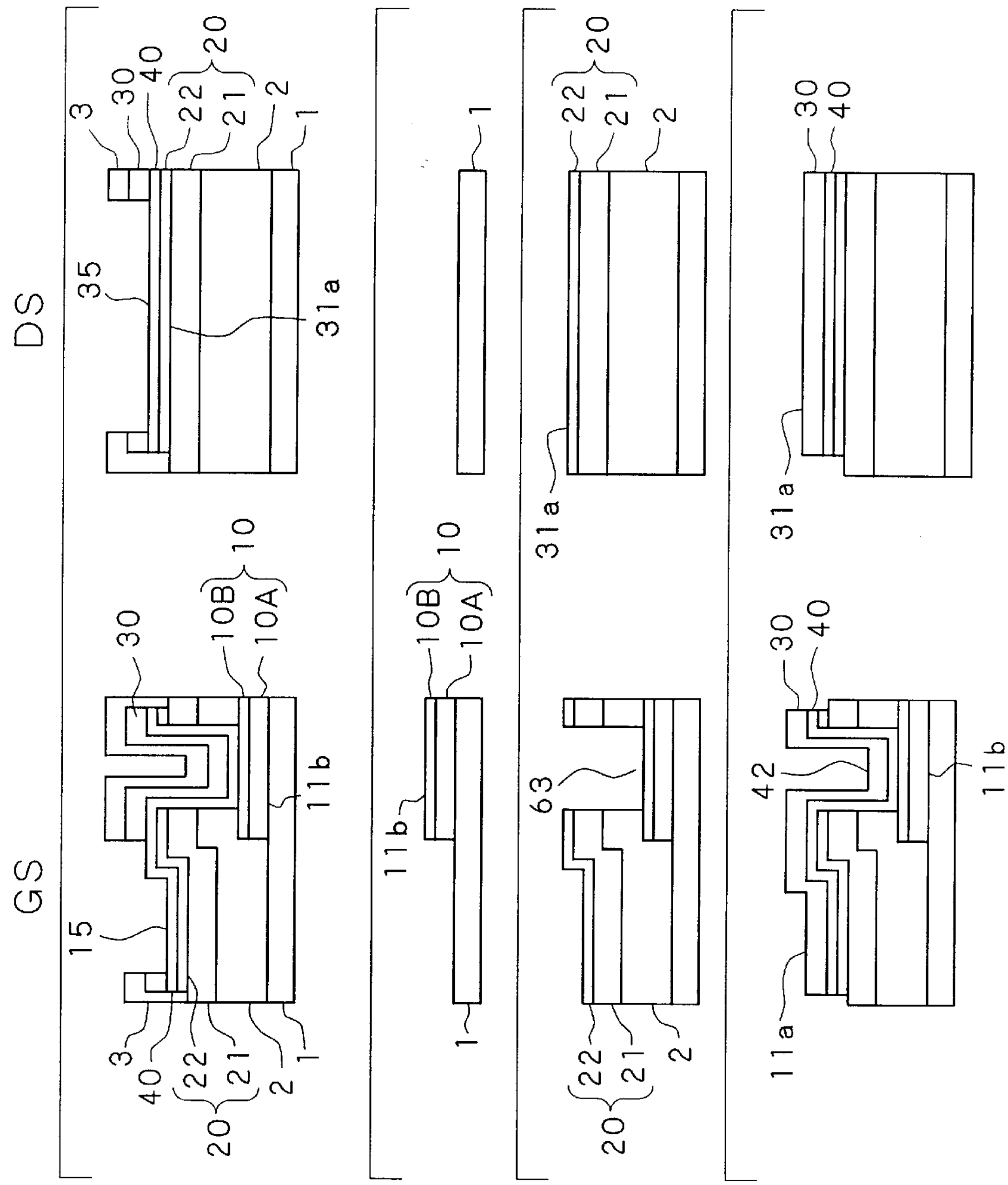
FIG. 76A is a cross sectional view in the longitudinal direction of a terminal section of the active matrix substrate plate in Embodiment 13, and the left side relates to the scanning line terminal section and the right side relates to the signal line terminal section.
FIGS. 76B–76D are cross sectional views relating to manufacturing step 1–step 3, respectively.

Next, as shown in FIGS. 75A–75C, using the second conductor layer 50 after removing its masking pattern or the masking used in the etching process as masking, the exposed $n^+$ amorphous silicon layer 22 is removed by etching. By so doing, channel gap 23 is formed and in the direction of the extending channel gap, the amorphous silicon layer 21 is exposed beyond the opening sections 61, 62.

(Step 4) as shown in FIGS. 71A–71D and FIG. 76A, on the above substrate plate the protective insulation layer 3 of about 150 nm thickness comprised by silicon nitride film is deposited using plasma CVD process, and through photolithographic processes, excepting the protective insulation layer 3 above the pixel electrode 41 and scanning line terminal section 11*a* and signal line terminal section 31*a* and the common wiring line terminal section (not shown), and leaving so as to cover at least the upper surface and an entire lateral surface of the upper layer signal line 36 with the protective insulation layer 3 and so as to form the semiconductor layer of the TFT section Tf, the protective insulation layer 3 and amorphous silicon layer 21 are removed successively by etching. At this time, the opening sections 61, 62 and the perimeter section of the protective insulation layer 3 are intersected and leaving the protective insulation layer 3 of the TFT section Tf in such a way that the perimeter section of the protective insulation layer descends to cover a portion of the lateral surface of the amorphous silicon layer 21 on the channel gap 23 side exposed at the opening sections 61, 62, the outer protective insulation layer and the amorphous silicon layer are removed by etching. Next, the metallic layer 30 exposed at the opening section formed in the protective insulation layer above the pixel electrode 41 and scanning line terminal section 11*a* and signal line terminal section 31*a* and common wiring line terminal section is removed by etching, to expose the pixel electrode 41 and the scanning line terminal 15 and the signal line terminal 35 and the common wiring terminal (not shown), comprised by the transparent conductive layer 40. Lastly, the active matrix substrate plate is completed by performing annealing at about 280° C.

In this case, a lamination of a nitride film of Al and Ti is used for the first conductor layer, but the first layer may be a three layer structure formed by laying an underlayer of a high melting point metal such as Ti below the Al layer, to form Ti, Al and Ti nitride layers, or single film layer of Cr or Mo may be used.

Also, in the present embodiment, the vertical-type TFT in which the gate electrode extends from the scanning line to the pixel section, but the lateral-type TFT may be used, in which the gate electrode shares a portion of the scanning lines.

Productivity and the yield of the TN-type active matrix substrate plate in Embodiment 13 are improved because it can be manufactured in four steps.

Also, in this active matrix substrate plate, because the opening section of the protective insulation layer is not provided above the connection section between the first conductor layer and the second conductor layer, even when a same metal is used or different metals are used for the first conductor layer and second conductor layer, if the first conductor layer is not resistant to etching of the metallic layer in the second conductor layer, after the protective insulation layer is opened and when the metal layer in the second conductor layer is to be removed by etching, it is possible to prevent the etching solution to infiltrate through the transparent conductive layer at the connection section and corrode the first conductor layer.

Also, in this active matrix substrate plate, because a portion of the signal line is formed as the lower layer in a layer different than the pixel electrode signal line, shorting of signal line and pixel electrode is reduced, and the yield is improved.

Also, when etching the metallic layer in the signal lines or the transparent conductive layer, effects of preventing infiltration corrosion of the circuit elements of the scanning lines, effects of protection from static charges, improvement in reliability of TFT, lowering of resistance of scanning and signal lines, and improving the dielectric strength of insulation and aperture factor are exactly the same as those in Embodiment 10.

Embodiment 14

Figure 77A:
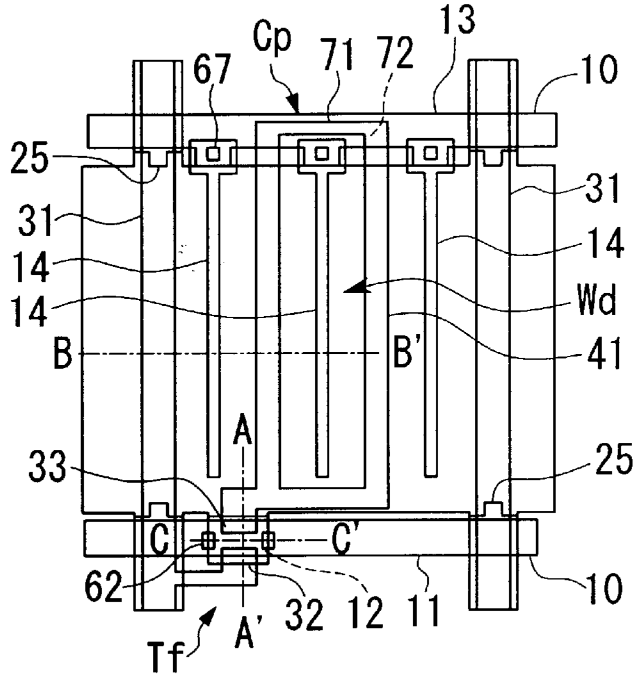
FIG. 77A is a perspective plan view of a one-pixel-region of the active matrix substrate plate in Embodiment 14.
Figure 77B:
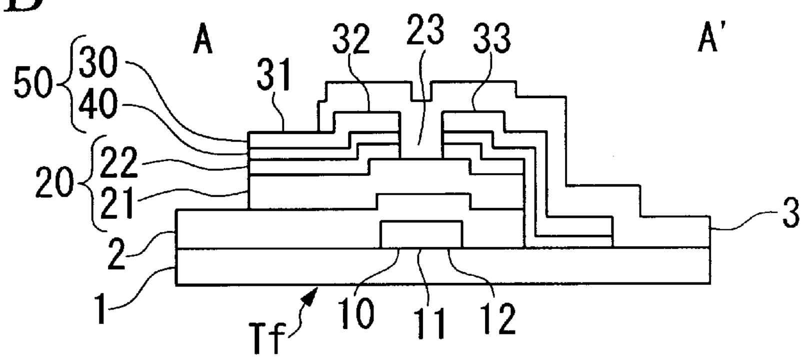
FIG. 77B is a cross sectional view through the plane A–A'.
Figure 77C:
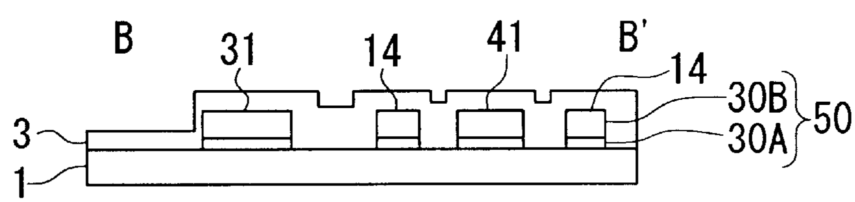
FIG. 77C is a cross sectional view through the plane B–B'.
Figure 77D:
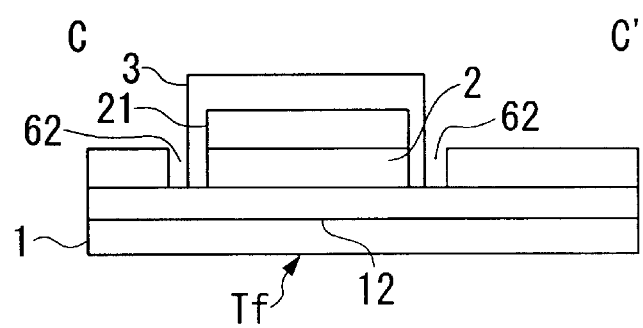
FIG. 77D is a cross section view through the plane C–C'.
Figure 78A:
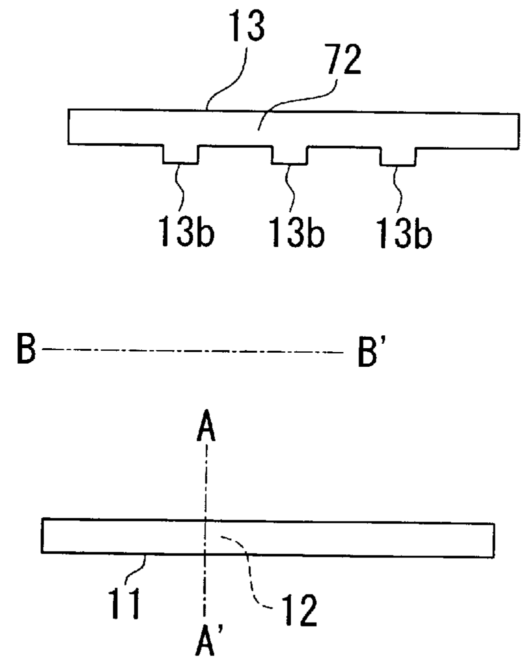
FIG. 78A is a perspective plan view of a one-pixel-region of the active matrix substrate plate in step 1 of the manufacturing process in Embodiment 14.
Figure 78B:
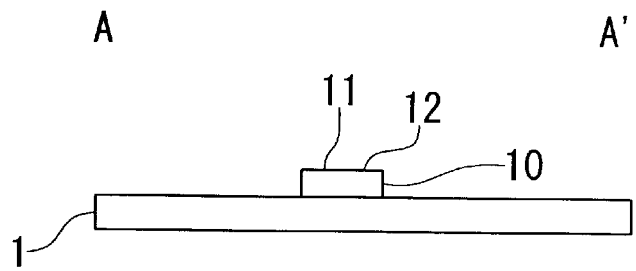
FIG. 78B is a cross sectional view through the plane A–A'.
Figure 78C:
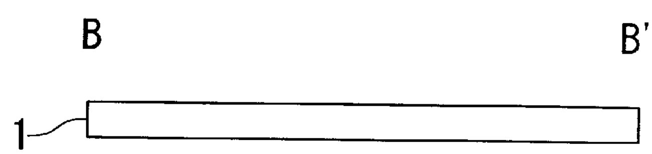
FIG. 78C is a cross sectional view through the plane B–B'.
Figure 78D:
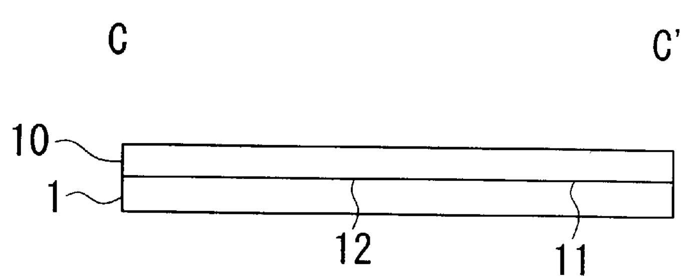
FIG. 78D is a cross section view through the plane C–C'.
Figure 79A:
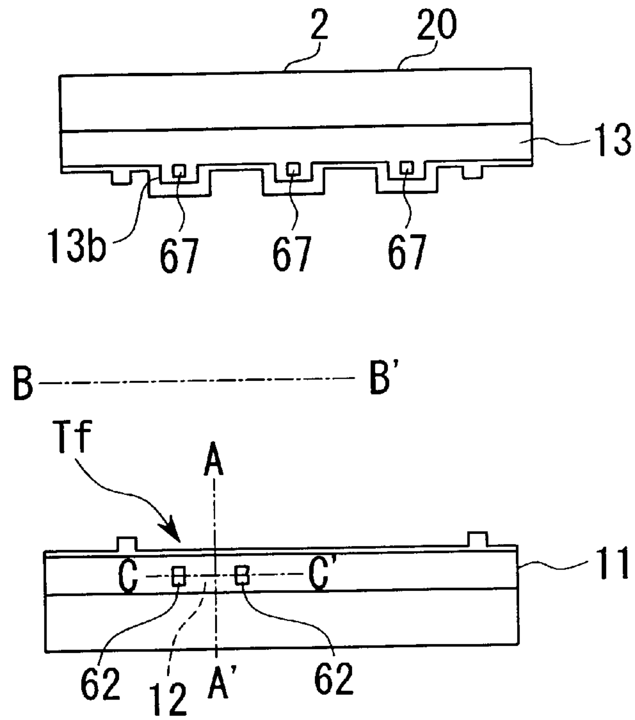
FIG. 79A is a perspective plan view of a one-pixel-region of the active matrix substrate plate in step 2 of the manufacturing process in Embodiment 14.
Figure 79B:
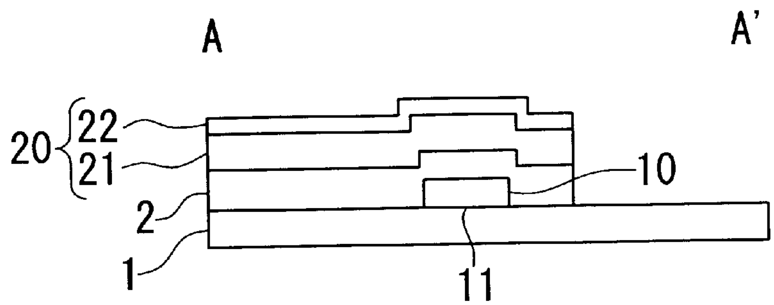
FIG. 79B is a cross sectional view through the plane A–A'.
Figure 79C:
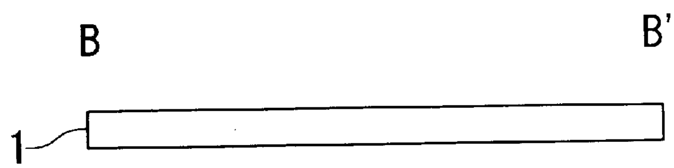
FIG. 79C is a cross sectional view through the plane B–B'.
Figure 79D:
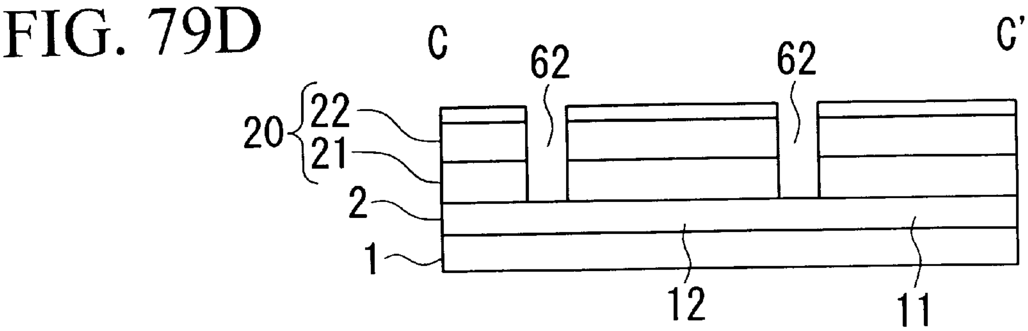
FIG. 79D is a cross section view through the plane C–C'.
Figure 80A:
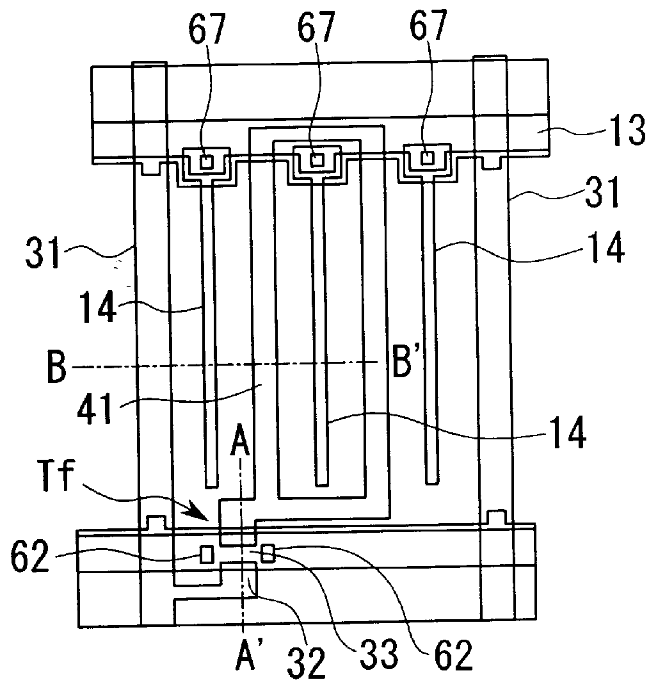
FIG. 80A is a perspective plan view of a one-pixel-region of the active matrix substrate plate in step 3 of the manufacturing process in Embodiment 14.
Figure 80B:
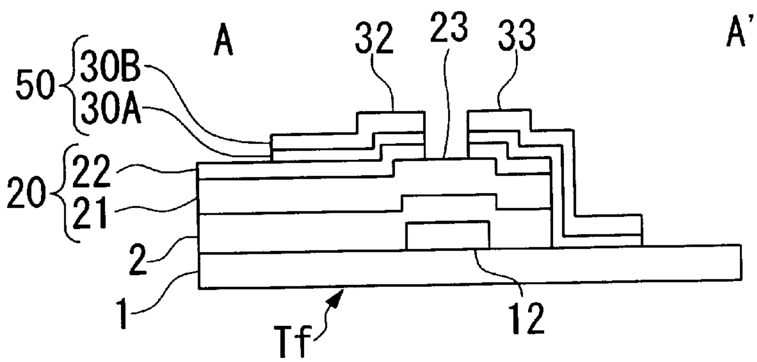
FIG. 80B is a cross sectional view through the plane A–A'.
Figure 80C:
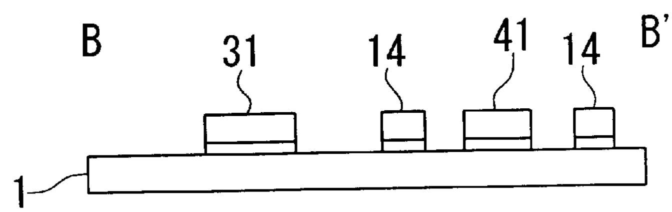
FIG. 80C is a cross sectional view through the plane B–B'.
Figure 80D:
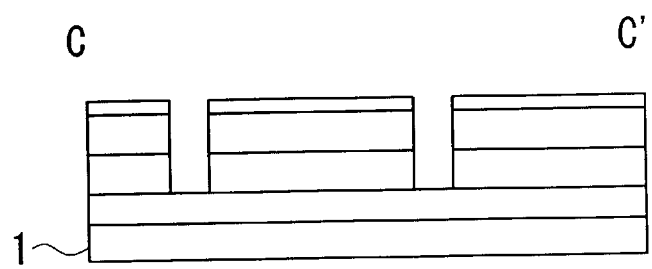
FIG. 80D is a cross section view through the plane C–C'.

FIG. 77A is a perspective plan view to show a one-pixel-region of the active matrix substrate plate in Embodiment 14, and FIG. 77B is a cross sectional view through the plane A–A', FIG. 77C is the same through the plane B–B', and FIG. 77D is the same through the plane C–C'. FIGS. 78A–81C are diagrams to show the manufacturing steps of the active matrix substrate plate, and refer to steps 1–3, and a channel-formed TFT, respectively. Similar to FIG. 77A, FIGS. 78A, 79A, and 80A are perspective plan views of a one-pixel-region, and FIGS. 78B–78D, 79B–79D, 80B–80D and FIGS. 81A–81C are cross sectional views through the planes A–A' and B–B', C–C' respectively. FIG. 82A is a cross sectional view of the terminal section of the active matrix substrate plate in the longitudinal direction, in which the left side relates to a cross sectional view at the scanning line terminal location GS, the center relates to a cross sectional view at the signal line terminal location DS, and the right side relates to the common wiring terminal location CS, and FIGS. 82B–82D show manufacturing steps 1–3 for the terminal section part.

The active matrix substrate plate in Embodiment 14 is formed such that, a plurality of scanning lines 11 and common wiring lines 13 comprised by the first conductor layer 10 are arranged alternatingly in parallel on a glass plate 1, a plurality of signal lines 31 are arranged at right angles to the scanning lines 11 across a gate insulation layer 2, and in the vicinity of TFT section Tf formed in the intersection of the scanning line 11 and the signal line 31, a portion of the scanning line 11 acts as the gate electrode 12 and this gate electrode 12, an island-shaped amorphous silicon layer 21 and an $n^+$ amorphous silicon layer 22 comprise a semiconductor layer 20 opposing the gate electrode across the gate insulation layer 2, and above this semiconductor layer, a pair of drain electrode 32 and source electrode 33 comprised by a second conductor layer 50 and formed with a gap of channel gap 23 comprise an inverted staggered structure TFT, and in a window section Wd surrounded by the scanning line 11 and the signal line 31 are formed a comb teeth shaped pixel electrode 41 and a comb teeth shaped common electrode 14 opposing the pixel electrode and connecting to the common wiring line 13, and the drain electrode 32 is connected to the signal line 31, the source electrode 33 is connected to the pixel electrode 41, respectively, to form an IPS-type active matrix substrate plate producing a horizontal electrical field between the pixel electrode 41 and the common electrode 14 with respect to the glass plate 1.

In this active matrix substrate plate, common electrode 14 and pixel electrode 41 are formed on the same layer as the signal line 31 on the glass plate 1, and the common wiring line 13 formed on the same layer as the scanning line 11 on the glass plate 1 is connected to the common electrode 14 through an opening section 67 formed by punching through the gate insulation layer 2 and the semiconductor layer 20. The signal line 31, scanning line 11 and the common wiring line 13 are insulated at the intersection point by the gate insulation layer 2 and the semiconductor layer 20.

The first conductor layer 10 forming the scanning line 11 and common wiring line 13 is comprised by an alloy of primarily Al containing Nd, for example. Also, the second conductor layer 50 forming the signal line 31, drain electrode 32, source electrode 33, pixel electrode 41 and common electrode 14 is formed by laminating, in each case, the upper metallic layer 30B comprised by Al or an alloy of primarily Al above the lower metallic layer 30A comprised by Cr or Mo.

The common electrode 14 and pixel electrode 41 descend vertically from the base section of the common electrode connected to the common wiring line 13 and from the source electrode 33, so that the second conductor layer 50 covers the lateral surface of the lamination film of the gate insulation layer 2 and semiconductor layer 20 to the glass plate 1, respectively, and further extends above the glass plate towards the window section Wd to form an opposing comb teeth shape.

Also, the lateral surface of the semiconductor layer 10 formed above the glass plate 1 concurrently with the scanning line 11 is totally covered by the gate insulation layer 2. Also, a portion of both lateral surfaces of the amorphous silicon layer 21, in the direction of the extending channel gap 23 of the TFT section Tf, is covered by the protective insulation layer 3.

Here, the pixel electrode 41 forms an accumulation capacitance electrode 71 by extending above the accumulation common electrode 72 formed inside the common wiring line 13 across the gate insulation layer 2 to construct the accumulation capacitance section Cp in this pixel region.

The active matrix substrate plate in Embodiment 14 is manufactured according to the following four steps.

(Step 1) as shown in FIGS. 78A–78C and FIG. 82B, by sputtering on the glass plate 1, an alloy of Al—Nd of about 250 nm thickness is deposited to form the first conductor layer 10, and through photolithographic processes, excepting the scanning line 11, scanning line terminal section 11*a* formed in the scanning line terminal location GS, common wiring line 13, common wiring line terminal section 13*a* formed in the common wiring terminal location CS, and within the respective pixel regions, gate electrode 12 sharing a portion of the scanning line 11 and a plurality of common electrode connection sections 13*b* extending from the common wiring line 13, and the accumulation common electrode 72 formed in the common wiring line, the first conductor layer 10 is removed by etching.

(Step 2) as shown in FIGS. 79A–79C and FIG. 82C, on the above substrate plate, gate insulation layer 2 comprised by silicon nitride film of about 400 nm thickness and the semiconductor layer 20 comprised by the amorphous silicon layer 21 of about 250 nm thickness and the $n^+$ amorphous silicon layer 22 of about 50 nm thickness are deposited by continually applying plasma CVD. Next, through photolithographic processes, excepting the opening section 62 formed in the TFT section Tf above the scanning line 11 so as to clamp the gate electrode 12, common electrode opening sections 67 formed above the respective common electrode connection sections 13*b*, opening section 63 formed on the scanning line terminal section 11*a* and the common wiring line terminal section 13*a*, and an opening section (not shown) formed above the respective common wiring end sections for binding common wiring lines, and leaving so as to cover at least the upper surface and an entire lateral surface of the first conductor layer 10 (scanning line 11, scanning line terminal section 11*a*, common wiring line 13, common wiring line terminal section 13*a*, common electrode connection section 13*b*, gate electrode 12) with the gate insulation layer 2, the semiconductor layer 20 and the gate insulation 2 are removed successively by etching.

(Step 3) as shown in FIGS. 80A–80D and FIG. 82D, after sputtering and etching at a same vacuum pressure, by continually sputtering on the above substrate plate, the second conductor layer 50 is formed by depositing the lower metallic layer 30A comprised by Mo of about 50 nm thickness and the upper metallic layer 30B comprised by Al of about 150 nm thickness. Next, through photolithographic processes, excepting the signal line 31, signal line terminal section 31*a* formed in the signal line terminal location DS, connection electrode section 42 connected to the scanning line terminal section 11*a* through the opening section 63 formed above the scanning line terminal section 11*a*, connection electrode section 42 connected to the common wiring terminal section 13*a* through the opening section 63 formed above the common wiring terminal section 13*a*, common wiring linking line (not shown) for binding each common wiring line through the opening section (not shown) formed above each common wiring line end section and linking to the connection electrode section 42 above the common wiring terminal 13*a*, and within the respective pixel regions, drain electrode 32 extending from the signal line 31 to the TFT section Tf, a plurality of common electrodes 14 whose base section is connected to the common wiring line 13 through the opening section 67 formed above the common electrode connection section 13*b*, pixel electrode 41 extending opposite this common electrode 14, and source electrode 33 extending from this pixel electrode towards TFT section Tf and separated from the drain electrode 32 by the opposing channel gap 23, the second conductor layer 50 is removed by etching. In this case, a portion of the pixel electrode 41 is extended so as to superimpose on a portion of the common wiring line 13 at the accumulation capacitance section Cp to form the accumulation capacitance electrode 71.

Figure 81A:
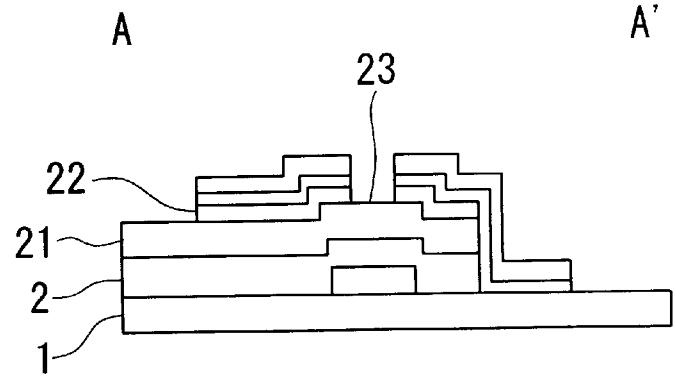
FIGS. 81A–81C are cross sectional views of a channel-formed TFT in active matrix substrate plate manufacturing in Embodiment 14.
Figure 81B:
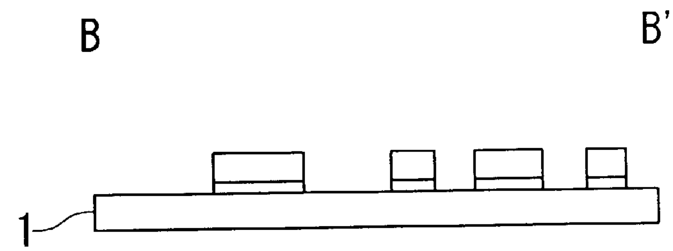
Figure 81C:
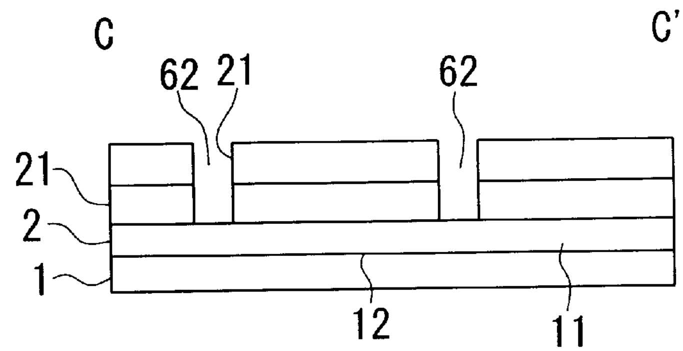
Figure 82A:
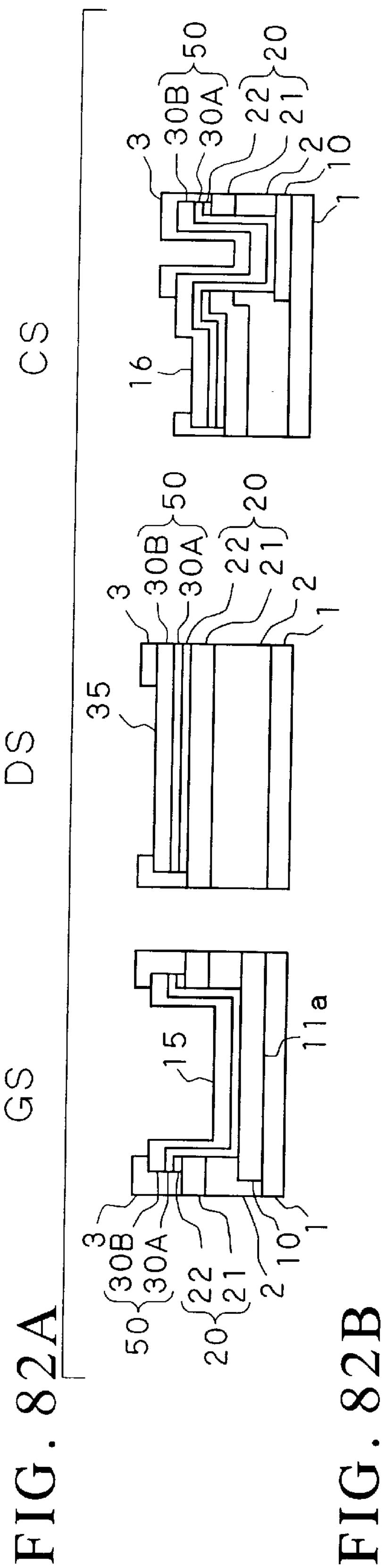
FIG. 82A is a cross sectional view in the longitudinal direction of a terminal section of the active matrix substrate plate in Embodiment 14, and the left side relates to the scanning line terminal section, the center relates to the signal line terminal section and the right side relates to the common wiring line terminal section.
Figure 82B:
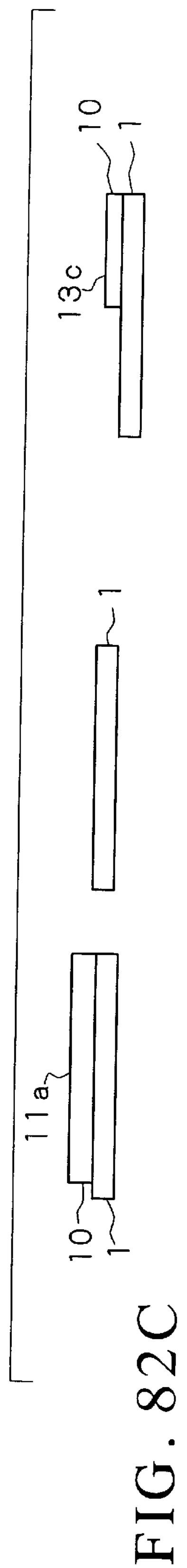
FIGS. 82B–82D are cross sectional views relating to manufacturing step 1–step 3, respectively.
Figure 82C:
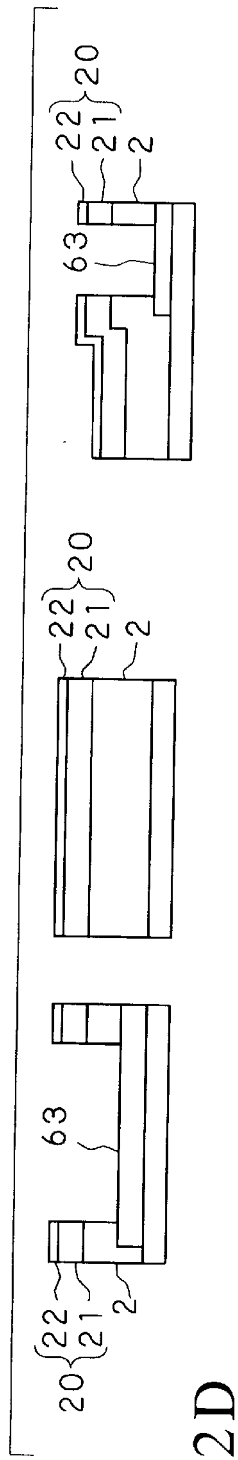
Figure 82D:
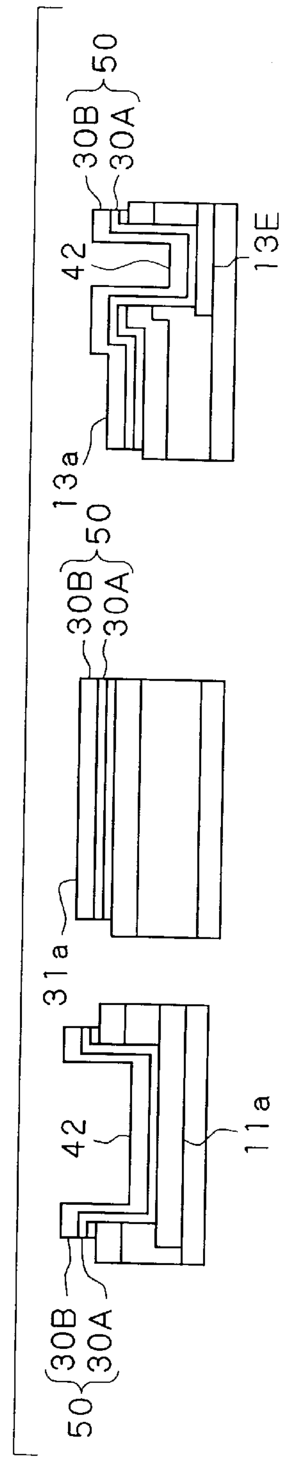

Next, as shown in FIGS. 81A–81C, using the masking pattern used in the etching process or the second conductor layer 50 after removing its masking, the exposed $n^+$ amorphous silicon layer 22 is removed by etching. By so doing, channel gap 23 is formed and in the direction of the extending channel gap, the amorphous silicon layer 21 is exposed beyond the opening 62.

(Step 4) as shown in FIGS. 77A–77D and FIG. 82A, on the above substrate plate the protective insulation layer 3 of about 300 nm thickness comprised by silicon nitride film is deposited using plasma CVD process, and through photolithographic processes, excepting the connection electrode section 42 above the scanning line terminal section 11*a* and common wiring line terminal section 13*a* and the protective insulation layer 3 above signal line terminal section 31*a*, and leaving so as to cover at least the upper surface and an entire lateral surface of the second conductor layer (signal line 31, drain electrode 32, source electrode 33, pixel electrode 41, common wiring linking line) with the protective insulation layer 3 and to form the semiconductor layer 20 of the TFT section Tf, the outer protective insulation layer 3 and amorphous silicon layer 21 are removed successively by etching. At this time, the opening section 62 and the perimeter section of the protective insulation layer 3 are intersected and leaving the protective insulation layer 3 of the TFT section Tf in such a way that the perimeter section of the protective insulation layer descends to cover a portion of the lateral surface of the amorphous silicon layer 21 on the channel gap 23 side exposed at the opening section 62, the outer protective insulation layer and the amorphous silicon layer are removed by etching. By so doing, above the first conductor layer 10, the scanning line terminal 15 and the common wiring terminal 16 laminated with the second conductor layer 50 through the opening section 63 punched through the semiconductor layer 20 and the gate insulation layer 2, and the signal line terminal 35 comprised by the second conductor layer 50 are exposed. Lastly, the active matrix substrate plate is completed by performing annealing at about 280° C.

In this case, an alloy of Al—Nd is used for the first conductor layer, but as in Embodiment 10, a lamination of Al and a high melting point metal such as Ti and their nitrides, or a three layer lamination structure formed by laying an underlayer of a high melting point metal such as Ti below the Al layer, to form, for example, a three layer structure of Ti, Al and Ti may be used. Also, the second conductor layer is a lamination of Al and an alloy of primarily Al on top of Mo or Cr, but a lamination structure having a nitride film of a high melting point metal such as Ti at the topmost layer, for example, from the bottom Ti, Al and Ti nitride layers may be used. It may be a film made by laminating ITO on top of Cr. When using a nitride film layer of a high melting point metal such as Ti in the topmost layer, it is preferable that the atomic concentration of nitrogen in the nitride film be not lower than 25 a/o, as explained in Embodiment 1.

Productivity and the yield of the IPS-type active matrix substrate plate in Embodiment 14 are improved because it can be manufactured in four steps.

Also, in this active matrix substrate plate, because the first conductor layer formed together with the scanning line on top of the transparent insulation substrate plate, excepting the connection section with the second conductor layer, is totally covered by the gate insulation layer, during etching of the second conductor layer, corrosion problems caused by corrosion of circuit elements, such as scanning lines in the lower layer and gate electrodes or shorting of scanning and signal lines can be prevented, and the yield is improved.

Also, in this active matrix substrate plate, protective transistor can be fabricated so that the TFT in the pixel region can be prevented from unexpected electrical shock during manufacturing. Also, insulation breakdown between the scanning lines and signal lines can be prevented to improve the yield.

Also, in this active matrix substrate plate, because a portion of both lateral surfaces of the semiconductor layer in the extending direction of the channel gap of the TFT section is covered by the protective insulation layer, it is possible to prevent charge leaking through the lateral surfaces of the semiconductor layer as the current path, thereby improving the reliability of thin film transistors.

Also, in this active matrix substrate plate, because the difference in the height between the common electrode and the pixel electrode section can be decreased, orientation control during paneling step is facilitated.

Also, in this active matrix substrate plate, because the scanning line and signal line are comprised by a lamination of Al or an alloy of primarily Al, it is possible to lower the wiring resistance of the scanning line and the signal line and to secure reliability of connection of the scanning line driver at the scanning line terminal section, and reliability of connection of signal line and the signal line driver at the signal line terminal.

Also, in this active matrix substrate plate, because the semiconductor layer is formed in the intersection part of the scanning line and signal line, dielectric strength of insulation between scanning lines and signal lines is improved.

Embodiment 15

Figure 83A:
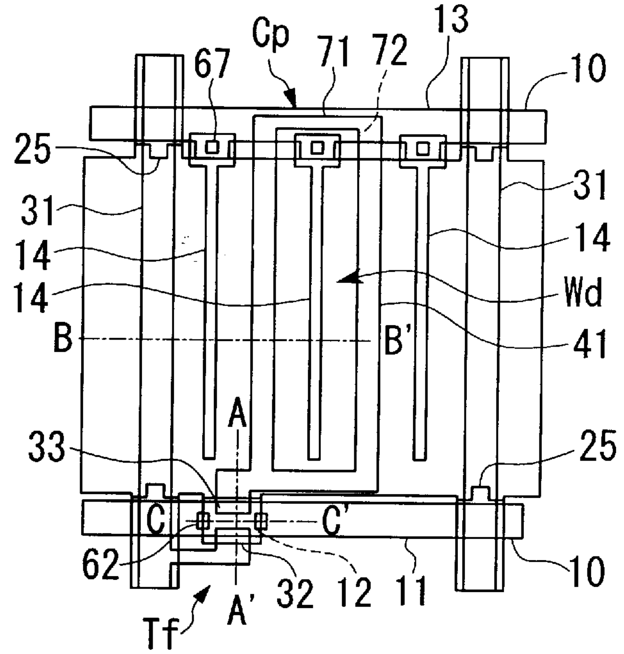
FIG. 83A is a perspective plan view of a one-pixel-region of the active matrix substrate plate in Embodiment 15.
Figure 83B:
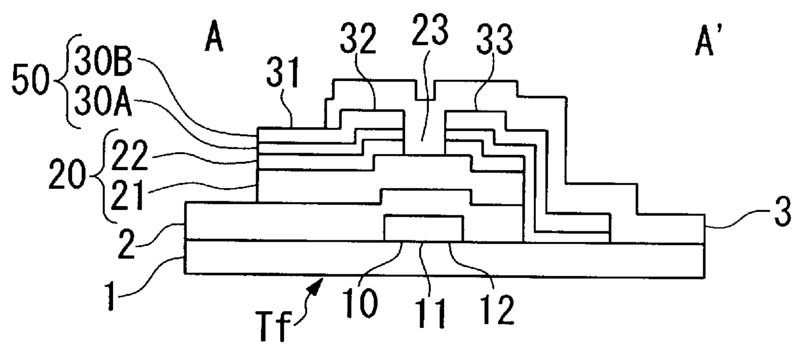
FIG. 83B is a cross sectional view through the plane A–A'.
Figure 83C:
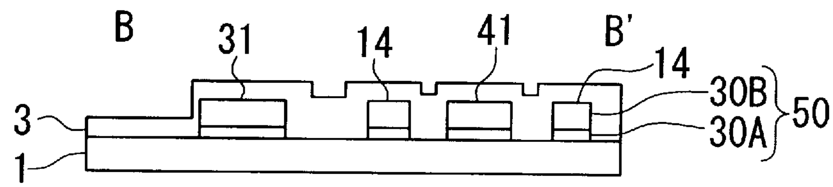
FIG. 83C is a cross sectional view through the plane B–B'.
Figure 83D:
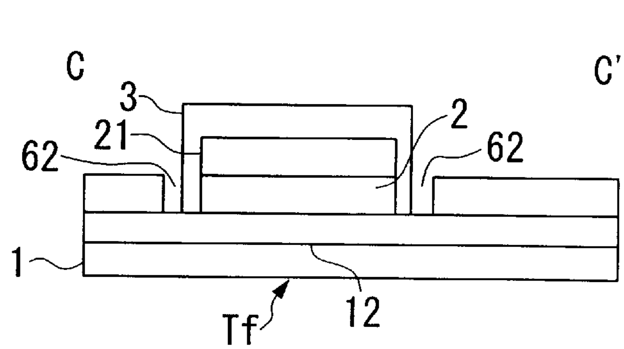
FIG. 83D is a cross section view through the plane C–C'.
Figure 84A:
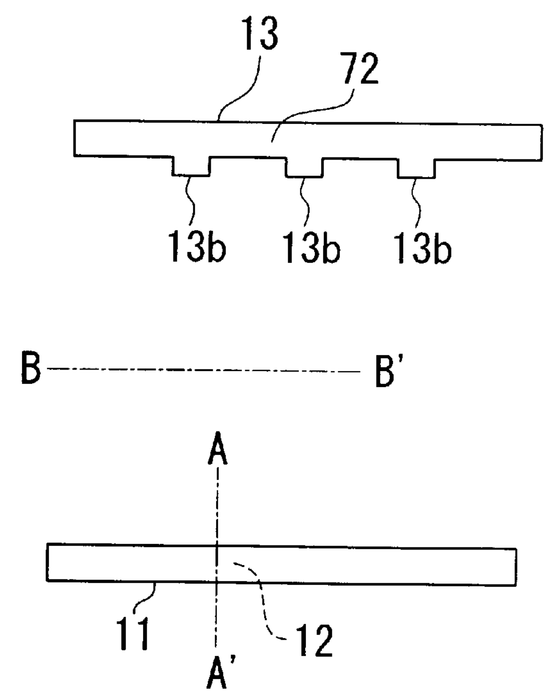
FIG. 84A is a perspective plan view of a one-pixel-region of the active matrix substrate plate in step 1 of the manufacturing process in Embodiment 15.
Figure 84B:
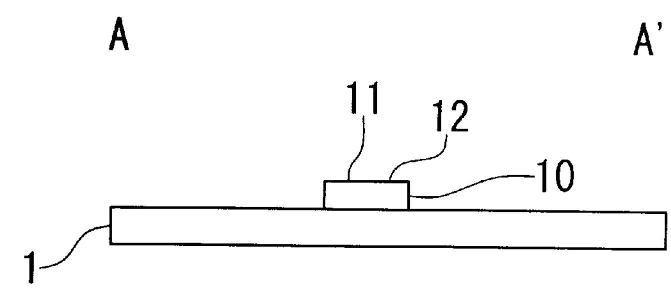
FIG. 84B is a cross sectional view through the plane A–A'.
Figure 84C:
FIG. 84C is a cross sectional view through the plane B–B'.
Figure 84D:
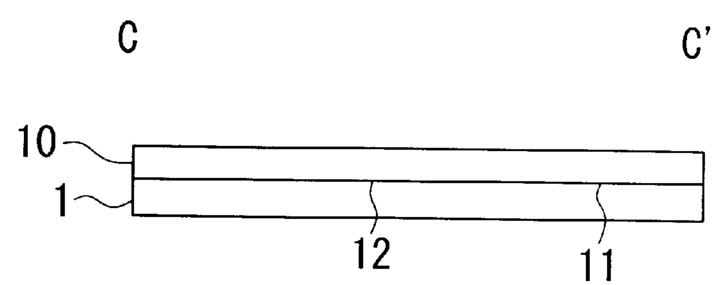
FIG. 84D is a cross section view through the plane C–C'.
Figure 85A:
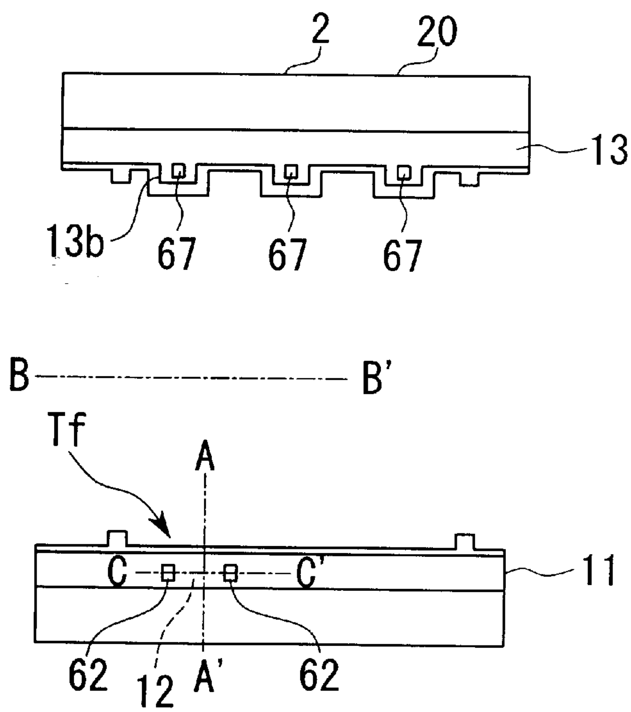
FIG. 85A is a perspective plan view of a one-pixel-region of the active matrix substrate plate in step 2 of the manufacturing process in Embodiment 15.
Figure 85B:
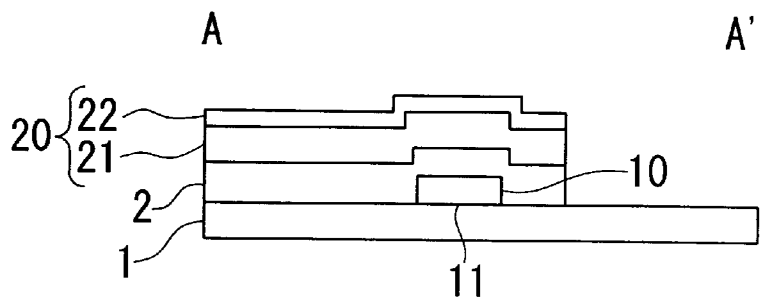
FIG. 85B is a cross sectional view through the plane A–A'.
Figure 85C:
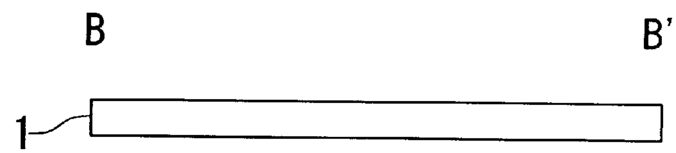
FIG. 85C is a cross sectional view through the plane B–B'.
Figure 85D:
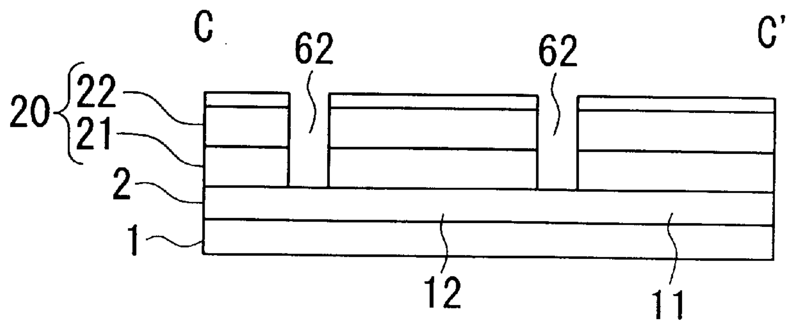
FIG. 85D is a cross section view through the plane C–C'.
Figure 86A:
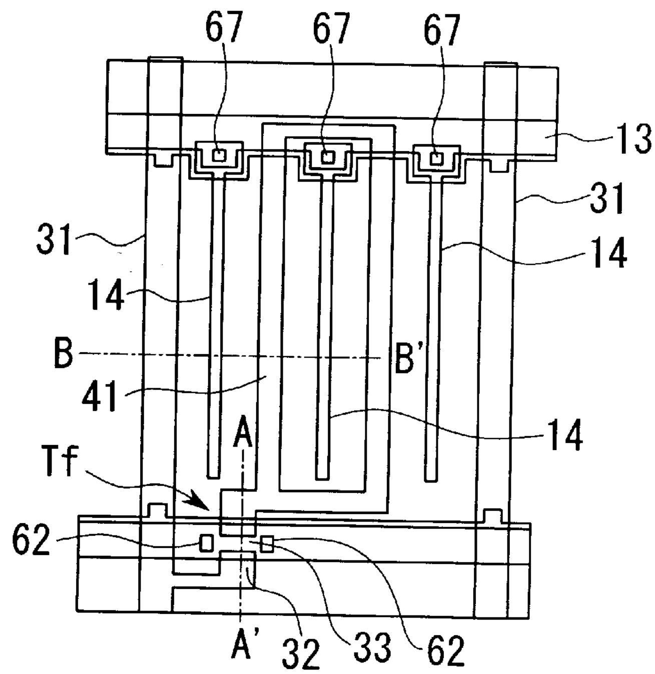
FIG. 86A is a perspective plan view of a one-pixel-region of the active matrix substrate plate in step 3 of the manufacturing process in Embodiment 15.
Figure 86B:
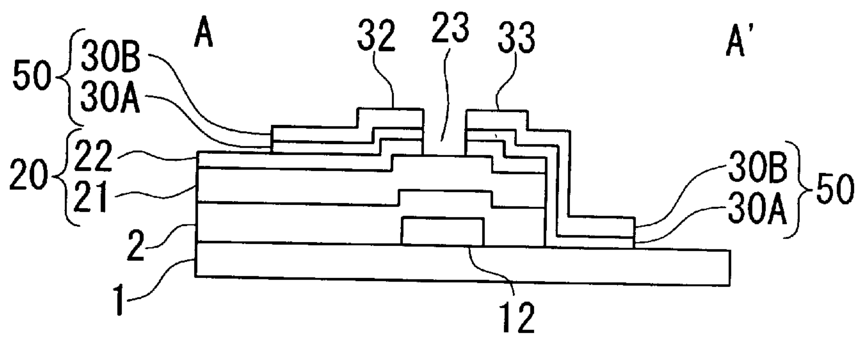
FIG. 86B is a cross sectional view through the plane A–A'.
Figure 86C:
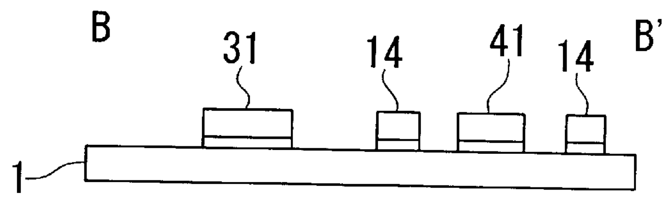
FIG. 86C is a cross sectional view through the plane B–B'.
Figure 86D:
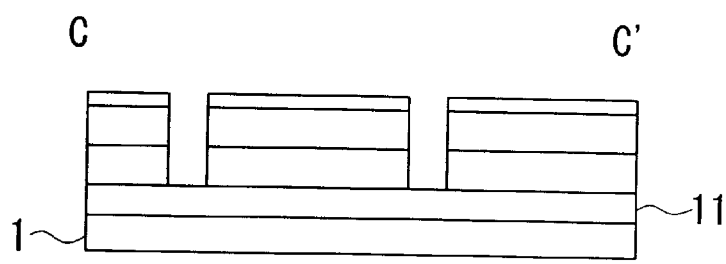
FIG. 86D is a cross section view through the plane C–C'.

FIG. 83A is a perspective plan view to show a one-pixel-region of the active matrix substrate plate in Embodiment 15, and FIG. 83B is a cross sectional view through the plane A–A', FIG. 83C is the same through the plane B–B', and FIG. 83D is the same through the plane C–C'. FIGS. 84A–87C are diagrams to show the manufacturing steps of the active matrix substrate plate, and refer to steps 1–3, and a channel-formed TFT, respectively. Similar to FIG. 83A, FIGS. 84A, 85A, and 86A are perspective plan views of a one-pixel-region, and FIGS. 84B–84D, 85B–85D, 86B–86D and FIGS. 87A–87C are cross sectional views through the planes A–A' and B–B', C–C' respectively. FIG. 88A is a cross sectional view of the terminal section of the active matrix substrate plate in the longitudinal direction, in which the left side relates to a cross sectional view at the scanning line terminal location GS, the center relates to a cross sectional view at the signal line terminal location DS, and the right side relates to the common wiring terminal location CS, and FIGS. 88B–88D show manufacturing steps 1–3 for the terminal section part.

The active matrix substrate plate in Embodiment 15 is formed such that, a plurality of scanning lines 11 and a plurality of common wiring lines 13 comprised by the first conductor layer 10 are arranged alternatingly in parallel on a glass plate 1, a plurality of signal lines 31 are arranged at right angles to the scanning lines 11 across a gate insulation layer 2, and in the vicinity of TFT section Tf formed in the intersection of the scanning line 11 and the signal line 31, a portion of the scanning line 11 acts as the gate electrode 12 and this gate electrode 12, an island-shaped amorphous silicon layer 21 and an $n^+$ amorphous silicon layer 22 comprise a semiconductor layer 20 opposing the gate electrode across the gate insulation layer 2, and above this semiconductor layer, a pair of drain electrode 32 and source electrode 33 comprised by a second conductor layer 50 and formed with a gap of channel gap 23 comprise an inverted staggered structure TFT, and in a window section Wd surrounded by the scanning line 11 and the signal line 31 are formed a comb teeth shaped pixel electrode 41 and a comb teeth shaped common electrode 14 opposing the pixel electrode and connecting to the common wiring line 13, and the drain electrode 32 is connected to the signal line 31, the source-electrode 33 is connected to the pixel electrode 41, respectively, to form an IPS-type active matrix substrate plate producing a horizontal electrical field between the pixel electrode 41 and the common electrode 14 with respect to the glass plate 1.

In this active matrix substrate plate, common electrode 14 and pixel electrode 41 are formed on the same layer as the signal line 31 on the glass plate 1, and the common wiring line 13 formed on the same layer as the scanning line 11 on the glass plate 1 is connected to the common electrode 14 through an opening section 67 formed by punching through the gate insulation layer 2 and the semiconductor layer 20. The signal line 31, scanning line 11 and the common wiring line 13 are insulated at the intersection point by the gate insulation layer 2 and the semiconductor layer 20.

The first conductor layer 10 forming the scanning line 11 and common wiring line 13 is comprised by an alloy of primarily Al containing Nd, for example. Also, the second conductor layer 50 forming the signal line 31, drain electrode 32, source electrode 33, pixel electrode 41 and common electrode 14 is formed by laminating, in each case, the upper metallic layer 30B comprised by Al or an alloy of primarily Al above the lower metallic layer 30A comprised by Cr or Mo.

The common electrode 14 and pixel electrode 41 descend vertically from the base section of the common electrode connected to the common wiring line 13 and from the source electrode 33, so that the second conductor layer 50 covers the lateral surface of the lamination film of the gate insulation layer 2 and semiconductor layer 20 to the glass plate 1, respectively, and further extends above the glass plate towards the window section Wd to form an opposing comb teeth shape.

Also, the lateral surface of the semiconductor layer 10 formed above the glass plate 1 concurrently with the scanning line 11 is totally covered by the gate insulation layer 2. Also, a portion of both lateral surfaces of the amorphous silicon layer 21, in the direction of the extending channel gap 23 of the TFT section Tf, is covered by the protective insulation layer 3.

Here, the pixel electrode 41 forms an accumulation capacitance electrode 71 by extending above the accumulation common electrode 72 formed inside the common wiring line 13 across the gate insulation layer 2 to construct the accumulation capacitance section Cp in this pixel region.

The active matrix substrate plate in Embodiment 15 is manufactured according to the following four steps.

(Step 1) as shown in FIGS. 84A–84D and FIG. 88B, by sputtering on the glass plate 1, an alloy of Al—Nd of about 250 nm thickness is deposited to form the first conductor layer 10, and through photolithographic processes, excepting the scanning line 11, common wiring line 13, and within the respective pixel regions, gate electrode 12 sharing a portion of the scanning line 11 and a plurality of common electrode connection sections 13*b* extending from the common wiring line to the window section Wd, and the accumulation common electrode 72 formed inside the common wiring line, the first conductor layer 10 is removed by etching(Step (Step 2) as shown in FIGS. 85A–85D and FIG. 88C, on the above substrate plate, gate insulation layer 2 comprised by silicon nitride film of about 400 nm thickness and the semiconductor layer 20 comprised by the amorphous silicon layer 21 of about 250 nm thickness and the $n^+$ amorphous silicon layer 22 of about 50 nm thickness are deposited by continually applying plasma CVD. Next, through photolithographic processes, excepting the opening section 62 formed in the TFT section Tf above the scanning line 11 so as to clamp the gate electrode 12, common electrode opening sections 67 formed above the respective common electrode connection sections 13*b*, opening section 63 formed on the scanning line end section 11*b* and the common wiring line end section 13*c*, and an opening section (not shown) formed above the respective common wiring end sections for binding common wiring lines, and leaving so as to cover at least the upper surface and an entire lateral surface of the first conductor layer 10 (scanning line 11, common wiring line 13, common wiring electrode connection section 13*b*, gate electrode 12) with the gate insulation layer 2, the semiconductor layer 20 and the gate insulation 2 are removed successively by etching.

(Step 3) as shown in FIGS. 86A–86D and FIG. 88D, after sputtering and etching at a same vacuum pressure, by continually sputtering on the above substrate plate, the second conductor layer 50 is sputtered to deposit the lower metallic layer 30A comprised by Mo of about 50 nm thickness and the upper metallic layer 30B comprised by Al of about 150 nm thickness. Next, through photolithographic processes, excepting the signal line 31, signal line terminal section 31*a* formed in the signal line terminal location DS, connection electrode section 42 connected to the scanning line end section 11*b* through the opening section 63 formed above the scanning line end section 11*b*, scanning line terminal section 11*a* formed in the scanning terminal location DS by further extending from this connection electrode section, connection electrode section 42 connecting this common wiring end section through the opening section 63 formed above the common wiring end section 13*c* adjacent to the outer peripheral section Ss, common electrode terminal section 13*a* formed in the common wiring start end section CS by further extending from this connection electrode section, common wiring linking line (not shown) for binding each common wiring line through an opening section (not shown) formed above each common wiring end section and linking to the connection electrode section 42 above the common wiring line terminal section 13*c*, and within the respective pixel regions, drain electrode 32 extending from the signal line 31 to the TFT section Tf, a plurality of common electrodes 14 whose base section is connected to the common wiring line 13 through the opening section 67 formed above the common electrode connection section 13*b*, pixel electrode 41 extending opposite this common electrode, and source electrode 33 extending from this pixel electrode towards TFT section Tf and separated from the drain electrode 32 by the opposing channel gap 23, the second conductor layer 50 is removed by etching. In this case, a portion of the pixel electrode 41 is extended so as to superimpose on a portion of the common wiring line 13 at the accumulation capacitance section Cp to form the accumulation capacitance electrode 71.

Figure 87A:
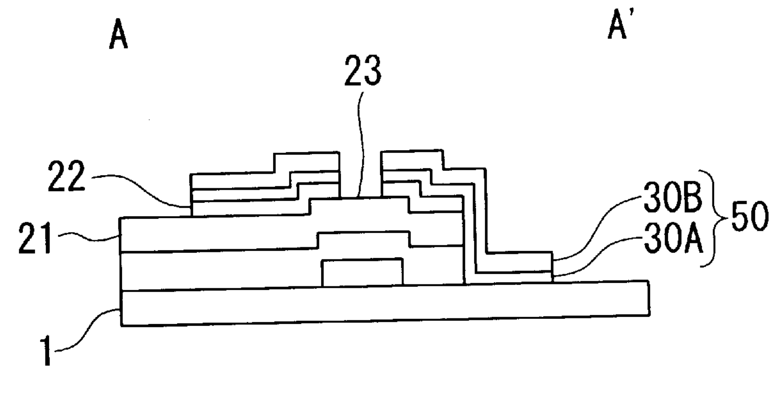
FIGS. 87A–87C are cross sectional views of a channel-formed TFT in active matrix substrate plate manufacturing in Embodiment 15.
Figure 87B:
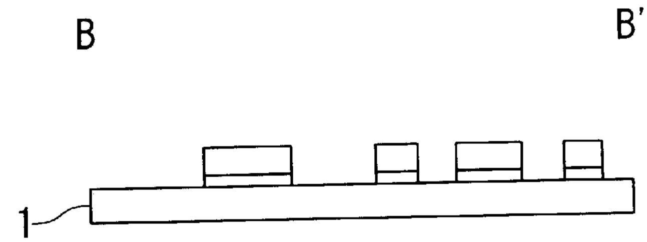
Figure 87C:
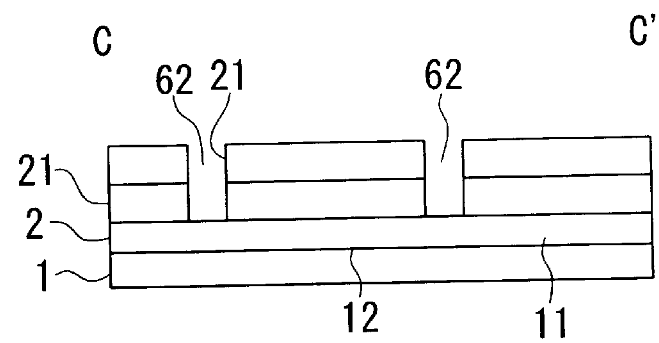
Figures 88A, 88B, 88C, 88D:
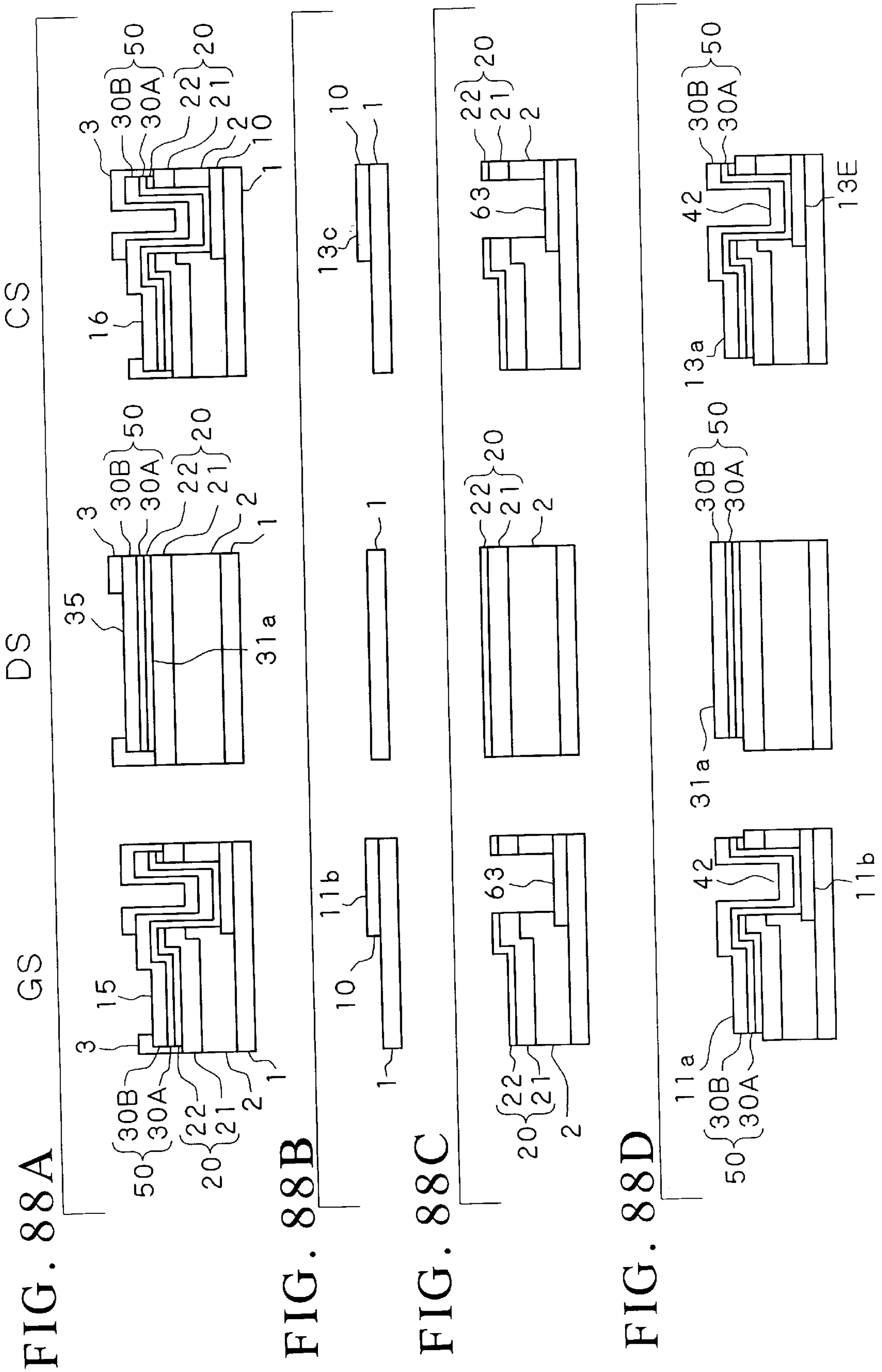
FIG. 88A is a cross sectional view in the longitudinal direction of a terminal section of the active matrix substrate plate in Embodiment 15, and the left side relates to the scanning line terminal section, the center relates to the signal line terminal section and the right side relates to the common wiring line terminal section.
FIGS. 88B–88D are cross sectional views relating to manufacturing step 1–step 3, respectively.

Next, as shown in FIGS. 87A–87C, using the masking pattern used in the etching process or the second conductor layer 50 after removing its masking, the exposed $n^+$ amorphous silicon layer 22 is removed by etching. By so doing, channel gap 23 is formed and in the direction of the extending channel gap, the amorphous silicon layer 21 is exposed beyond the opening 62.

(Step 4) as shown in FIGS. 83A–83D and FIG. 88A, on the above substrate plate the protective insulation layer 3 of about 300 nm thickness comprised by silicon nitride film is deposited using plasma CVD process, and through photolithographic processes, excepting the protective insulation layer 3 above the scanning line terminal section 11*a* and common wiring line terminal section 13*a* and signal line terminal section 31*a*, and leaving so as to cover at least the upper surface) and an entire lateral surface of the second conductor layer (signal line 31, drain electrode 32, source electrode 33, pixel electrode 41, common electrode 14, common wiring linking line) with the protective insulation layer 3 and to form the semiconductor layer 20 of the TFT section Tf, the protective insulation layer 3 and amorphous silicon layer 21 are removed successively by etching. At this time, the opening section 62 and the perimeter section of the protective insulation layer 3 are intersected and leaving the protective insulation layer 3 of the TFT section Tf in such a way that the perimeter section of the protective insulation layer descends to cover a portion of the lateral surface of the amorphous silicon layer 21 on the channel gap 23 side exposed at the opening section 62, the outer protective insulation layer and the amorphous silicon layer are removed by etching. By so doing, the scanning line terminal 15 and the common wiring terminal 16 and the signal line terminal 35 comprised by the second conductor layer are exposed. Lastly, the active matrix substrate plate is completed by performing annealing at about 280° C.

In this case, an alloy of Al—Nd is used for the first conductor layer, but as in Embodiment 10, a lamination of Al and a high melting point metal such as Ti and their nitrides, or a three layer lamination structure formed by laying an underlayer of a high melting point meal such as Ti below the Al layer, to form, for example, a three layer structure of Ti, Al and Ti may be used. Also, the second conductor layer is a lamination of Al and an alloy of primarily Al on top of Mo or Cr, but a lamination structure having a nitride film of a high melting point metal such as Ti at the topmost layer, for example, from the bottom Ti, Al and Ti nitride layers may be used. It may be a film made by laminating ITO on top of Cr. When using a nitride film layer of a high melting point metal such as Ti in the topmost layer, it is preferable that the atomic concentration of nitrogen in the nitride film be not lower than 25 a/o.

Productivity and the yield of the IPS-type active matrix substrate plate in Embodiment 15 are improved because it can be manufactured in four steps.

Effects regarding etching the conductor layer in the signal lines, effects of preventing infiltration corrosion of the circuit elements such as the scanning lines, effects of protection from static charges, improvement in reliability of TFT, effects of facilitating orientation control, lowering of resistance of scanning and signal lines, and improving the dielectric strength of insulation are exactly the same as those in Embodiment 14.

Embodiment 16

Figure 89A:
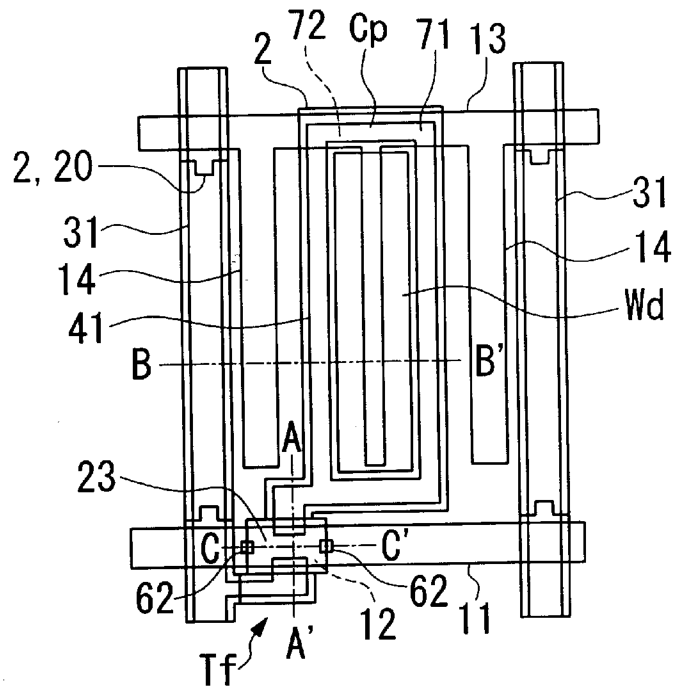
FIG. 89A is a perspective plan view of a one-pixel-region of the active matrix substrate plate in Embodiment 16.
Figure 89B:
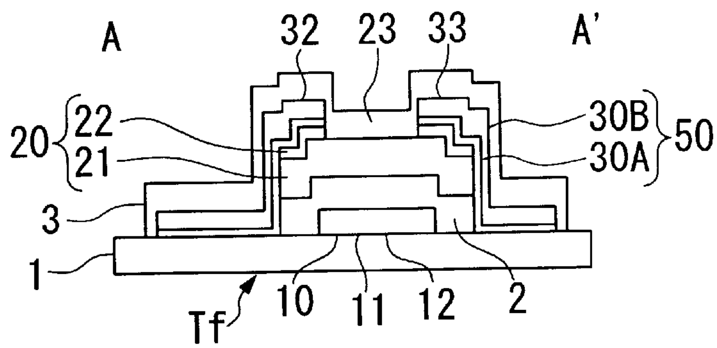
FIG. 89B is a cross sectional view through the plane A–A'.
Figure 89C:
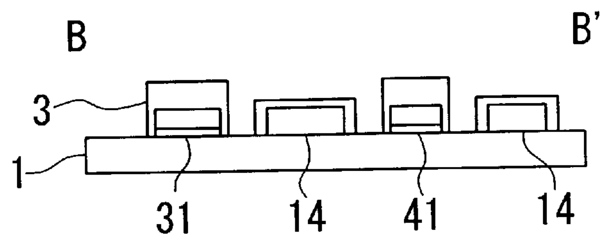
FIG. 89C is a cross sectional view through the plane B–B'.
Figure 89D:
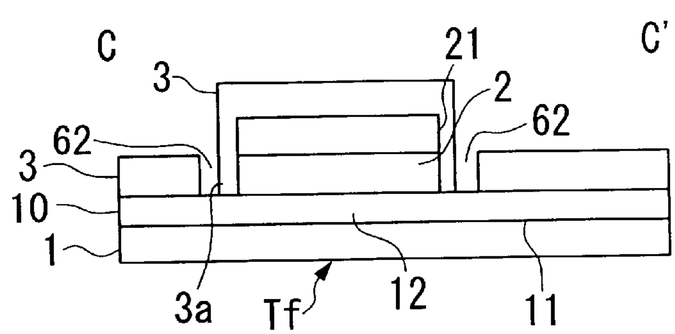
FIG. 89D is a cross section view through the plane C–C'.
Figure 90A:
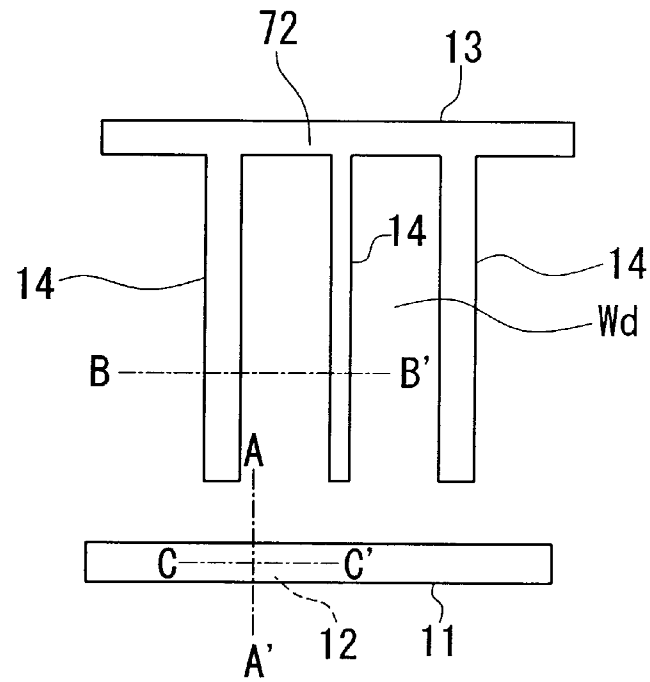
FIG. 90A is a perspective plan view of a one-pixel-region of the active matrix substrate plate in step 1 of the manufacturing process in Embodiment 16.
Figure 90B:
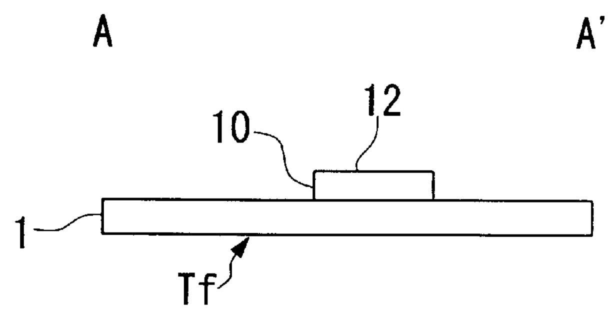
FIG. 90B is a cross sectional view through the plane A–A'.
Figure 90C:
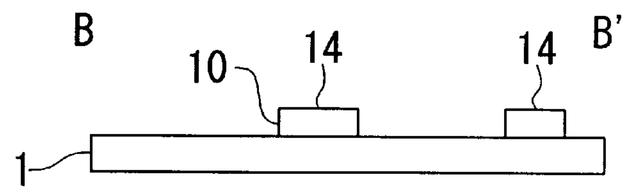
FIG. 90C is a cross sectional view through the plane B–B'.
Figure 90D:
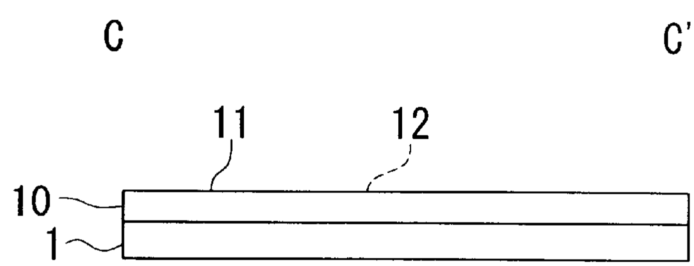
FIG. 90D is a cross section view through the plane C–C'.
Figure 91A:
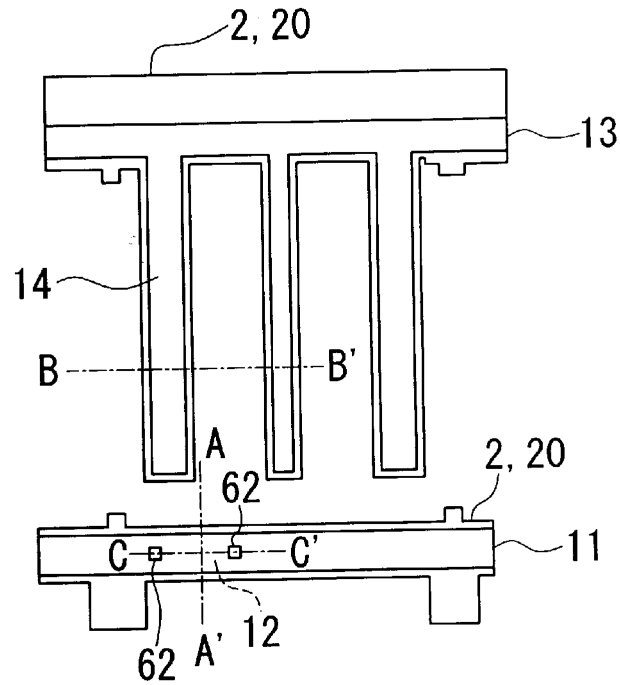
FIG. 91A is a perspective plan view of a one-pixel-region of the active matrix substrate plate in step 2 of the manufacturing process in Embodiment 16.
Figure 91B:
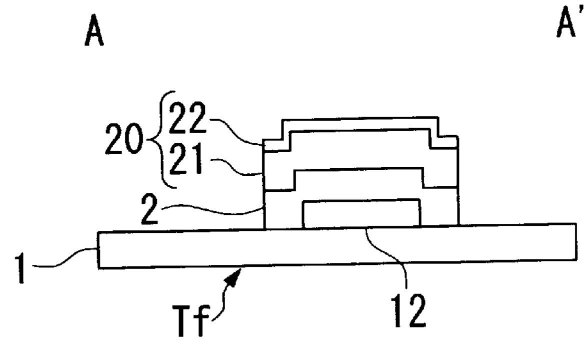
FIG. 91B is a cross sectional view through the plane A–A'.
Figure 91C:
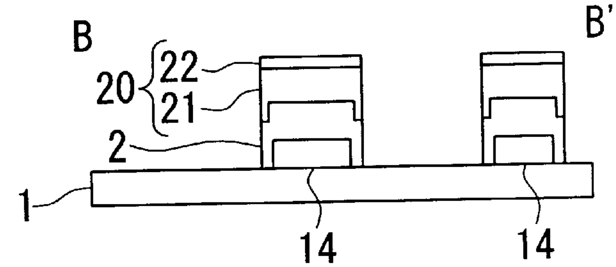
FIG. 91C is a cross sectional view through the plane B–B'.
Figure 91D:
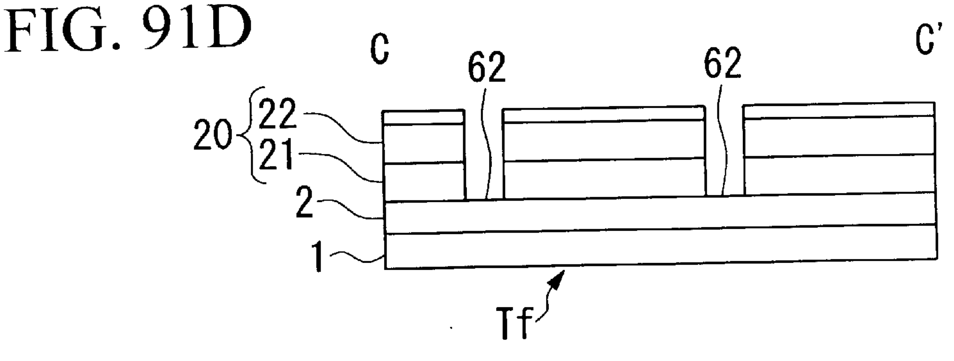
FIG. 91D is a cross section view through the plane C–C'.
Figure 92A:
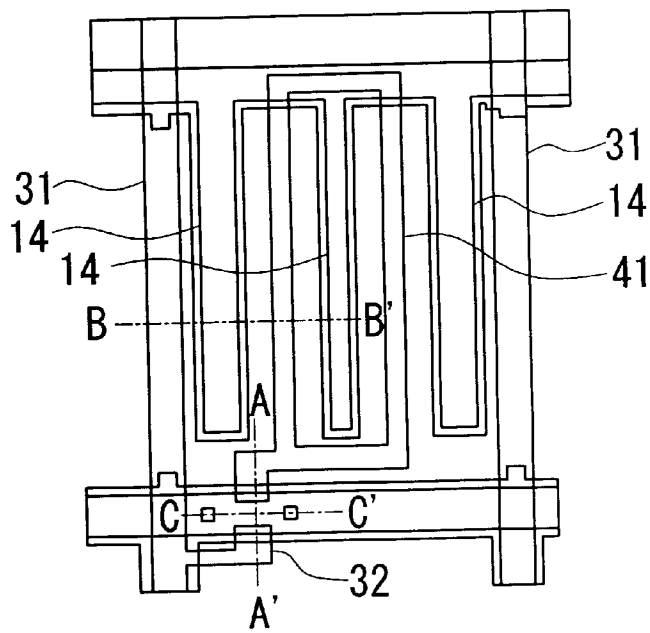
FIG. 92A is a perspective plan view of a one-pixel-region of the active matrix substrate plate in step 3 of the manufacturing process in Embodiment 16.
Figure 92B:
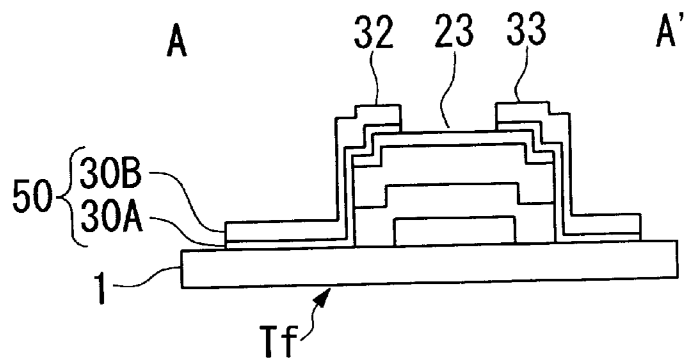
FIG. 92B is a cross sectional view through the plane A–A'.
Figure 92C:
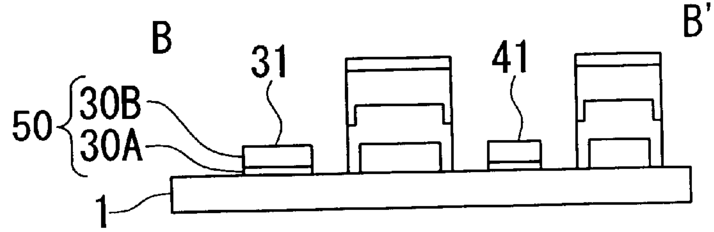
FIG. 92C is a cross sectional view through the plane B–B'.
Figure 92D:
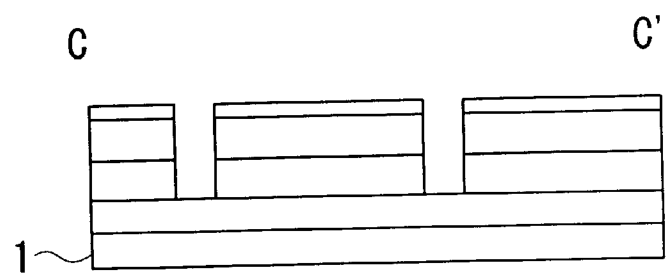
FIG. 92D is a cross section view through the plane C–C'.

FIG. 89A is a perspective plan view to show a one-pixel-region of the active matrix substrate plate in Embodiment 16, and FIG. 89B is a cross sectional view through the plane A–A', FIG. 89C is the same through the plane B–B' and FIG. 89D is the same through the plane C–C'. FIGS. 90A–93C are diagrams to show the manufacturing steps of the active matrix substrate plate, and refer to steps 1–3, and a channel-formed TFT, respectively. Similar to FIG. 89A, FIGS. 90A, 91A, and 92A are perspective plan views of a one-pixel-region, and FIGS. 90B–90D, 91B–91D, 92B–92D and FIGS. 93A–93C are cross sectional views through the planes A–A' and B–B', C–C' respectively. FIG. 94A is a cross sectional view of the terminal section of the active matrix substrate plate in the longitudinal direction, in which the left side relates to a cross sectional view at the scanning line terminal location GS, the center relates to a cross sectional view at the signal line terminal location DS, and the right side relates to the common wiring terminal location CS, and FIGS. 94B–94D show manufacturing steps 1–3 for the terminal section part.

The active matrix substrate plate in Embodiment 16 is formed such that a plurality of scanning lines 11 and a plurality of common wiring lines 13 comprised by the first conductor layer 10 are arranged alternatingly in parallel on a glass plate 1, a plurality of signal lines 31 are arranged at right angles to the scanning lines 11 across a gate insulation layer 2, and in the vicinity of TFT section Tf formed in the intersection of the scanning line 11 and the signal line 31, a portion of the scanning line 11 acts as the gate electrode 12 and this gate electrode 12, an island-shaped amorphous silicon layer 21 and an $n^+$ amorphous silicon layer 22 comprise a semiconductor layer 20 opposing the gate electrode across the gate insulation layer 2, and above this semiconductor layer, a pair of drain electrode 32 and source electrode 33 comprised by a second conductor layer 50 and formed with a gap of channel gap 23 comprise an inverted staggered structure TFT, and in a window section Wd surrounded by the scanning line 11 and the signal line 31 are formed a comb teeth shaped pixel electrode 41 and a comb teeth shaped common electrode 14 opposing the pixel electrode and connecting to the common wiring line 13, and the drain electrode 32 is connected to the signal line 31, the source electrode 33 is connected to the pixel electrode 41, respectively, to form an IPS-type active matrix substrate plate producing a horizontal electrical field between the pixel electrode 41 and the common electrode 14 with respect to the glass plate 1.

In this active matrix substrate plate, common wiring line 13 and common electrode 14 are formed on the same layer as the scanning line 11 on the glass plate 1, and the pixel electrode 41 is formed on the same layer as the signal line 31 on the glass plate 1. The signal line 31, scanning line 11 and the common wiring line 13 are insulated at the intersection point by the gate insulation layer 2 and the semiconductor layer 20.

The first conductor layer 10 forming the scanning line 11, common wiring line 13 and the common electrode 14 is comprised by an alloy of primarily Al containing Nd, for example. The second conductor layer 50 forming the signal line 31, drain electrode 32, source electrode 33, and pixel electrode 41 is formed by laminating the upper metallic layer 30B comprised by Al or an alloy of primarily Al on top of the lower metallic layer 30A comprised by Cr or Mo.

The pixel electrode 41 descends vertically from the source electrode 33 to the glass plate 1 so that the second conductor layer 50 covers the lateral surface of the lamination film of the gate insulation layer 2 and semiconductor layer 20, and further extends above the glass plate towards the window section Wd opposing the common electrode 14 to form a comb teeth shape.

Also, the lateral surface of the first conductor layer 10 formed above the glass plate 1 concurrently with the scanning line 11 is totally covered by the gate insulation layer 2. Also, a portion of both lateral surfaces of the amorphous silicon layer 21, in the direction of the extending channel gap 23 of the TFT section Tf, is covered by the protective insulation layer 3.

Here, the pixel electrode 41 forms an accumulation capacitance electrode 71 by extending to superimpose above the accumulation common electrode 72 formed inside the common wiring line 13 across the gate insulation layer 2 to construct the accumulation capacitance section Cp in this pixel region.

The active matrix substrate plate in Embodiment 16 is manufactured according to the following four steps.

(Step 1) as shown in FIGS. 90A–90D and FIG. 94B, by sputtering on the glass plate 1, an alloy of Al—Nd of about 250 nm thickness is deposited to form the first conductor layer 10, and through photolithographic processes, excepting the scanning line 11, scanning line terminal section 11*a* formed in the scanning line terminal location GS, common wiring line 13, common wiring line terminal section 13*a* formed in the common wiring terminal location CS, and within the respective pixel regions, gate electrode 12 sharing a portion of the scanning line 11 and a plurality of common electrodes 14 extending from the common wiring line to the window section Wd, and the accumulation common electrode 72 formed inside the common wiring line, the first conductor layer 10 is removed by etching.

(Step 2) as shown in FIGS. 91A–91D and FIG. 94C, on the above substrate plate, gate insulation layer 2 comprised by silicon nitride film of about 400 nm thickness and the semiconductor layer 20 comprised by the amorphous silicon layer 21 of about 250 nm thickness and the $n^+$ amorphous silicon layer 22 of about 50 nm thickness are deposited by continually applying plasma CVD. Next, through photolithographic processes, excepting the opening section 62 formed in the TFT section Tf above the scanning line 11 so as to clamp the gate electrode 12, opening section 63 formed on the scanning line terminal section 11*a* and the common wiring line terminal section 13*a*, and an opening section (not shown) formed above the respective common wiring end sections for binding common wiring lines, and leaving so as to cover at least the upper surface and an entire lateral surface of the first conductor layer 10 (scanning line 11, scanning line terminal section 11*a*, common wiring line 13, common wiring line terminal section 13*a*, common electrode 14, gate electrode 12) with the gate insulation layer 2, the semiconductor layer 20 and the gate insulation 2 are removed successively by etching.

(Step 3) as shown in FIGS. 92A–92D and FIG. 94D, after sputtering and etching at a same vacuum pressure, by continually sputtering on the above substrate plate, the second conductor layer 50 is formed by depositing the lower metallic layer 30A comprised by Mo of about 50 nm thickness and the upper metallic layer 30B comprised by Al of about 150 nm thickness. Next, through photolithographic processes, excepting the signal line 31, signal line terminal section 31*a* formed in the signal line terminal location DS, connection electrode section 42 connected to the scanning line terminal section 11*a* through the opening section 63 formed above the scanning line terminal section 11*a*, connection electrode section 42 connected to the common wiring terminal section 13*a* through the-opening section 63 formed above the common wiring terminal section 13*a*, common wiring linking line (not shown) for binding each common wiring line through the opening section (not shown) formed above each common wiring line end section and linking to the connection electrode section 42 above the common wiring terminal section 13*a*, and within the respective pixel regions, drain electrode 32 extending from the signal line 31 to the TFT section Tf, pixel electrode 41 extending opposite this common electrode 14, and source electrode 33 extending from this pixel electrode towards TFT section Tf and separated from the drain electrode 32 by the opposing channel gap 23, the second conductor layer 50 is removed by etching. In this case, a portion of the pixel electrode 41 is extended so as to superimpose on a portion of the common wiring line 13 at the accumulation capacitance section Cp to form the accumulation capacitance electrode 71.

Figure 93A:
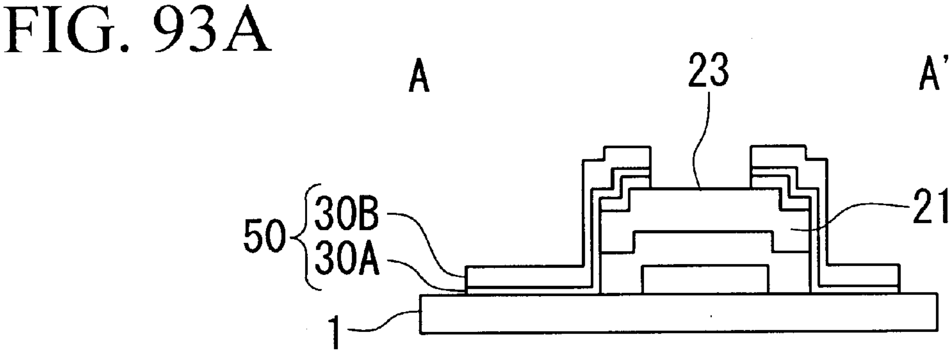
FIGS. 93A–93C are cross sectional views of a channel-formed TFT in active matrix substrate plate manufacturing in Embodiment 16.
Figure 93B:
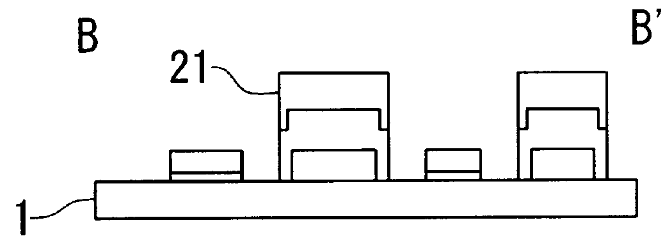
Figure 93C:
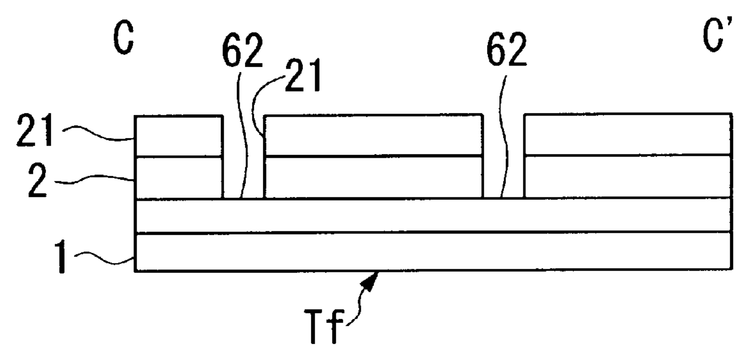
Figures 94A, 94B, 94C, 94D:
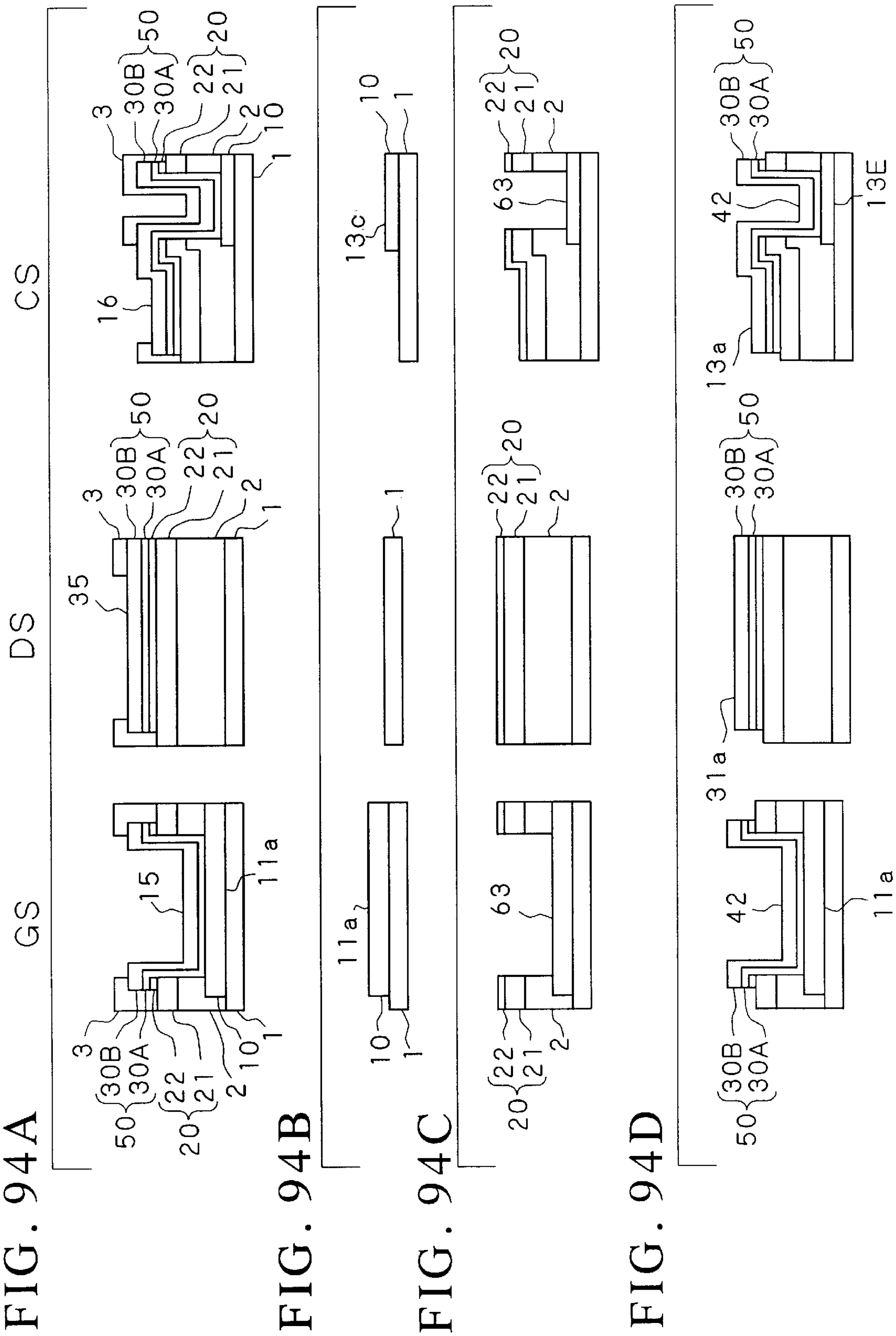
FIG. 94A is a cross sectional view in the longitudinal direction of a terminal section of the active matrix substrate plate in Embodiment 16, and the left side relates to the scanning line terminal section, the center relates to the signal line terminal section and the right side relates to the common wiring line terminal section.
FIGS. 94B–94D are cross sectional views relating to manufacturing step 1–step 3, respectively.

Next, as shown in FIGS. 93A–93C, using the masking pattern used in the etching process or the second conductor layer 50 after removing its masking, the exposed $n^+$ amorphous silicon layer 22 is removed by etching. By so doing, channel gap 23 is formed and in the direction of the extending channel gap, the amorphous silicon layer 21 is exposed beyond the opening 62.

(Step 4) as shown in FIGS. 91A–91D and FIG. 94A, on the above substrate plate the protective insulation layer 3 of about 300 nm thickness comprised by silicon nitride film is deposited using plasma CVD process, and through photolithographic processes, excepting the connection electrode section 42 above the scanning line terminal section 11*a* and common wiring line terminal section 13*a* and the protective insulation layer 3 above signal line terminal section 31*a*, and leaving so as to cover at least the upper surface and an entire lateral surface of the second conductor layer (signal line 31, drain electrode 32, source electrode 33, pixel electrode 41, common wiring linking line) with the protective insulation layer 3 and to form the semiconductor layer 20 of the TFT section Tf, the outer protective insulation layer 3 and amorphous silicon layer 21 are removed successively by etching. By doing so, the opening section 62 and the perimeter section of the protective insulation layer 3 are intersected and leaving the protective insulation layer 3 of the TFT section Tf in such a way that the perimeter section of the protective insulation layer descends to cover a portion of the lateral surface of the amorphous silicon layer 21 on the channel gap 23 side exposed at the opening section 62, the outer protective insulation layer and the amorphous silicon layer are removed by etching. By so doing, above the first conductor layer 10, the scanning line terminal 15 and the common wiring terminal 16 laminated with the second conductor layer 50 through the opening section 63 punched through the semiconductor layer 20 and the gate insulation layer 2, and the signal line terminal 35 comprised by the second conductor layer 50 are exposed. Lastly, the active matrix substrate plate is completed by performing annealing at about 280° C.

In this case, an alloy of Al—Nd is used for the first conductor layer, but as in Embodiment 10, a lamination of Al and a high melting point metal such as Ti and their nitrides, or a three layer lamination structure formed by laying an underlayer of a high melting point metal such as Ti below the Al layer, to form, for example, a three layer structure of Ti, Al and Ti may be used. Also, the second conductor layer is a lamination of Al and an alloy of primarily Al on top of Mo or Cr, but a lamination structure having a nitride film of a high melting point metal such as Ti at the topmost layer, for example, from the bottom Ti, Al and Ti nitride layers may be used. It may be a film made by laminating ITO on top of Cr. When using a nitride film layer of a high melting point metal such as Ti in the topmost layer, it is preferable that the atomic concentration of nitrogen in the nitride film be not lower than 25 a/o.

Productivity and the yield of the IPS-type active matrix substrate plate in Embodiment 16 are improved because it can be manufactured in four steps.

Also, in this active matrix substrate plate, the common electrode and the pixel electrode are formed on different layers, shorting between the common electrode and pixel electrode can be prevented, and the yield can be improved.

Effects of preventing infiltration corrosion of the circuit elements such as the scanning lines when etching the conductor layer, effects of protection from static charges, improvement in reliability of TFT, lowering of resistance of scanning and signal lines, and improving the dielectric strength of insulation are exactly the same as those in Embodiment 14.

Embodiment 17

Figure 95A:
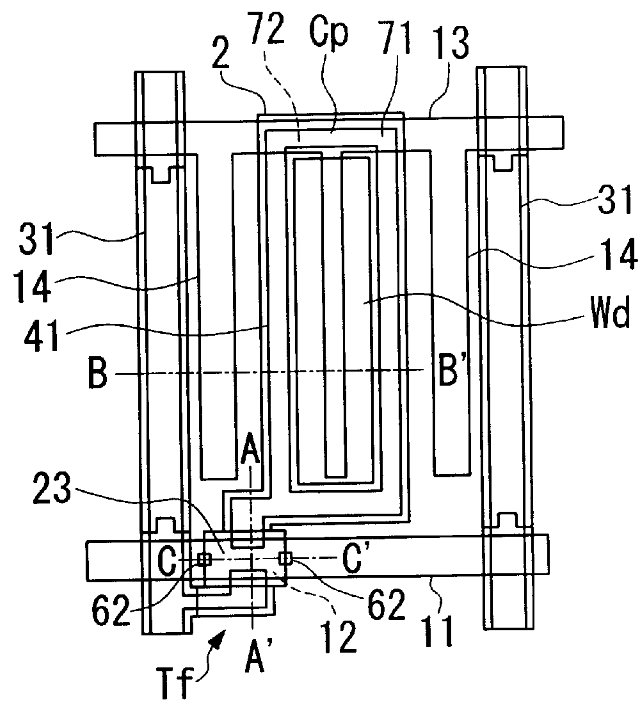
FIG. 95A is a perspective plan view of a one-pixel-region of the active matrix substrate plate in Embodiment 17.
Figure 95B:
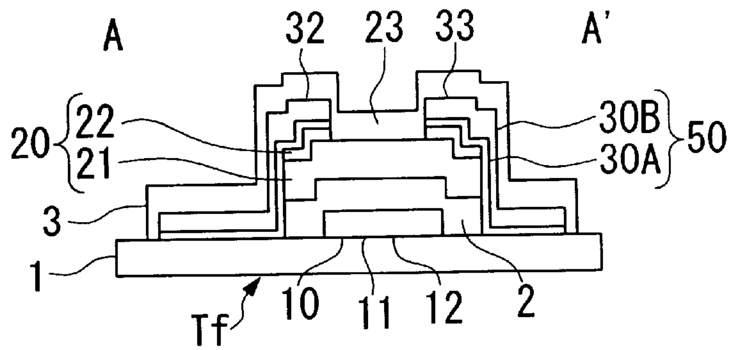
FIG. 95B is a cross sectional view through the plane A–A'.
Figure 95C:
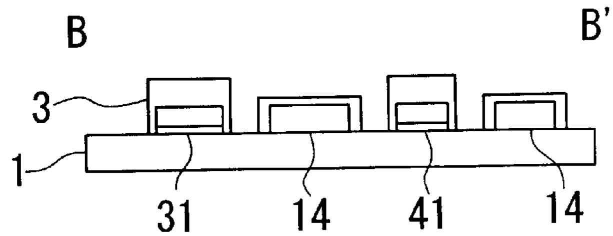
FIG. 95C is a cross sectional view through the plane B–B'.
Figure 95D:
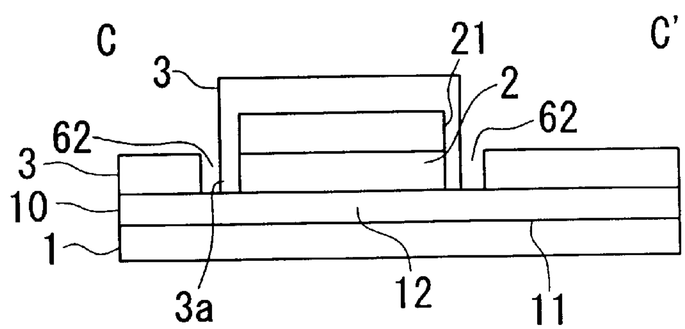
FIG. 95D is a cross section view through the plane C–C'.
Figure 96A:
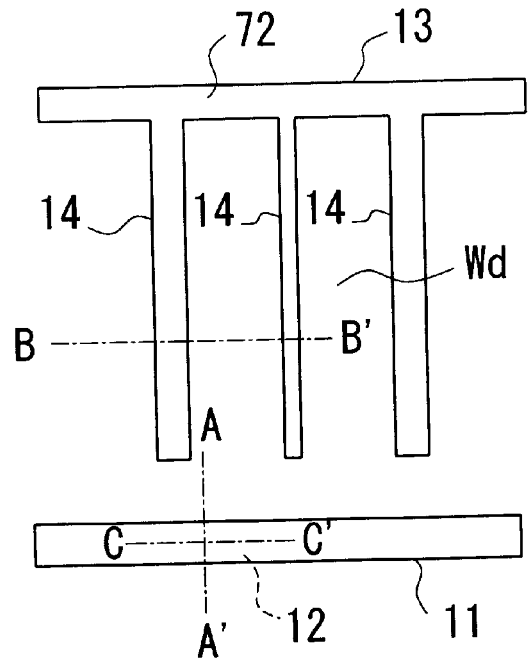
FIG. 96A is a perspective plan view of a one-pixel-region of the active matrix substrate plate in step 1 of the manufacturing process in Embodiment 17.
Figure 96B:
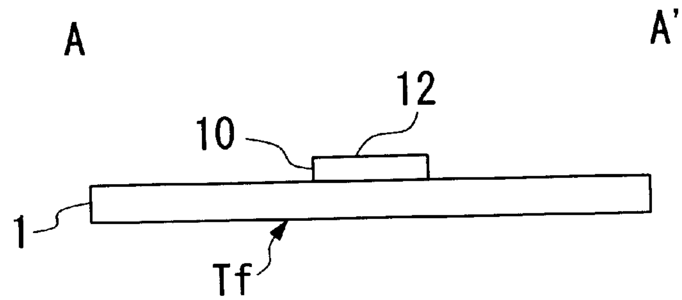
FIG. 96B is a cross sectional view through the plane A–A'.
Figure 96C:
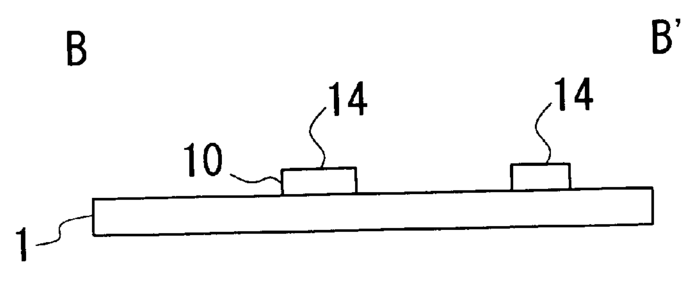
FIG. 96C is a cross sectional view through the plane B–B'.
Figure 96D:
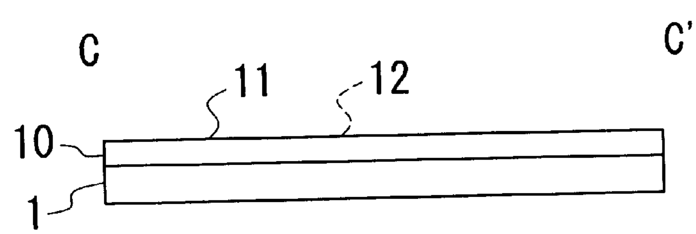
FIG. 96D is a cross section view through the plane C–C'.
Figure 97A:
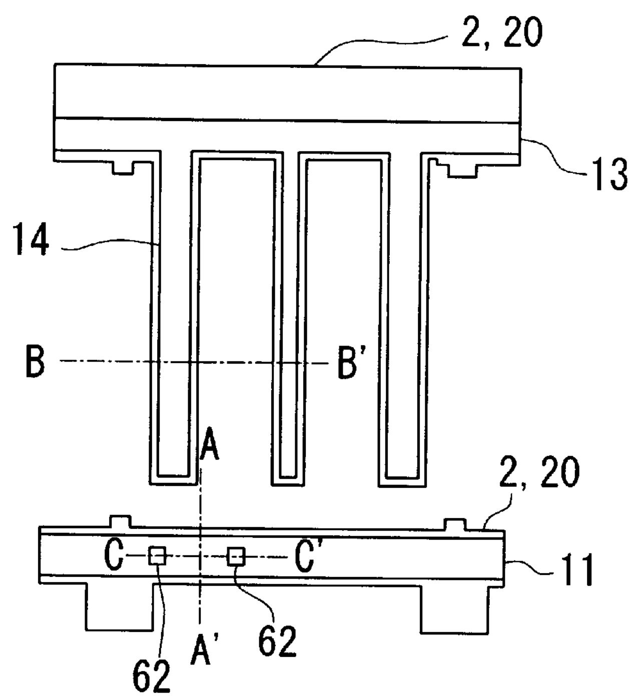
FIG. 97A is a perspective plan view of a one-pixel-region of the active matrix substrate plate in step 2 of the manufacturing process in Embodiment 17.
Figure 97B:
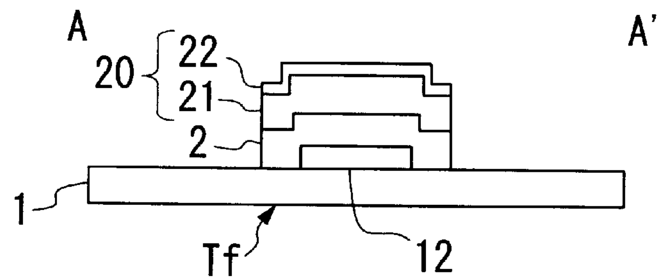
FIG. 97B is a cross sectional view through the plane A–A'.
Figure 97C:
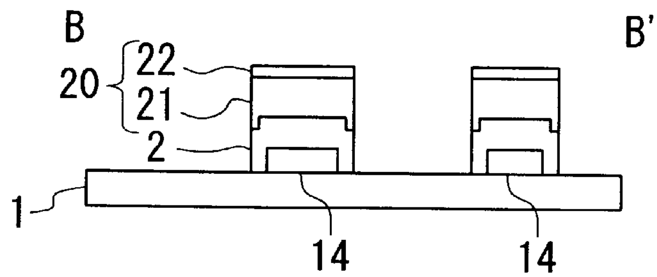
FIG. 97C is a cross sectional view through the plane B–B'.
Figure 97D:
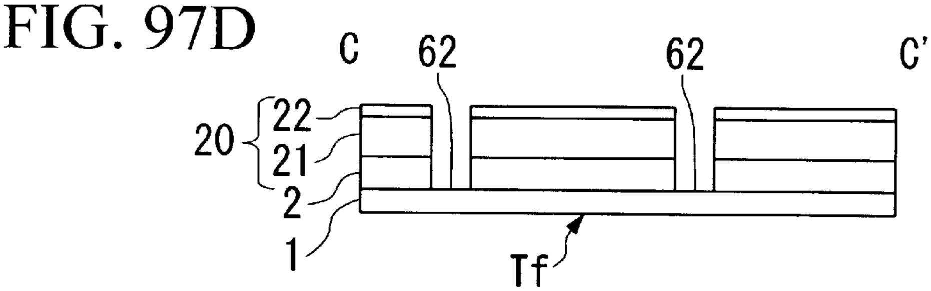
FIG. 97D is a cross section view through the plane C–C'.
Figure 98A:
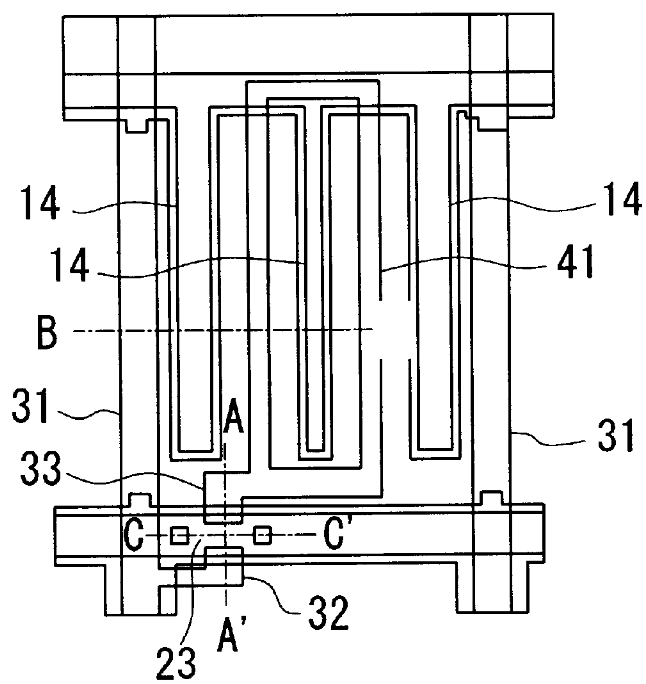
FIG. 98A is a perspective plan view of a one-pixel-region of the active matrix substrate plate in step 3 of the manufacturing process in Embodiment 17.
Figure 98B:
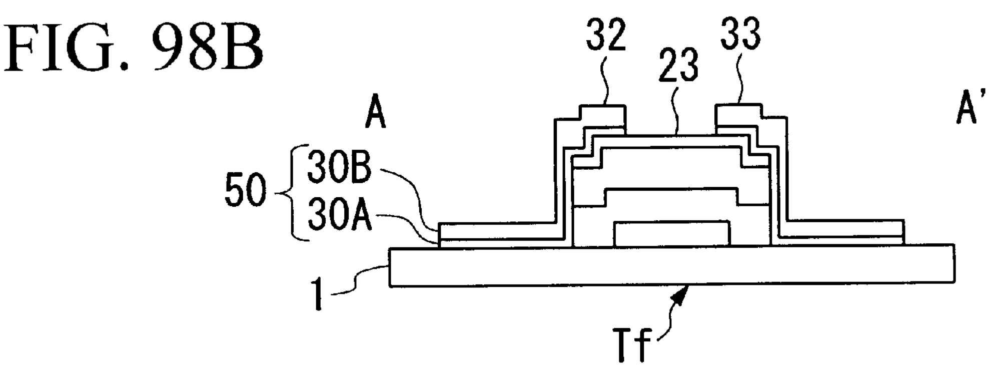
FIG. 98B is a cross sectional view through the plane A–A'.
Figure 98C:
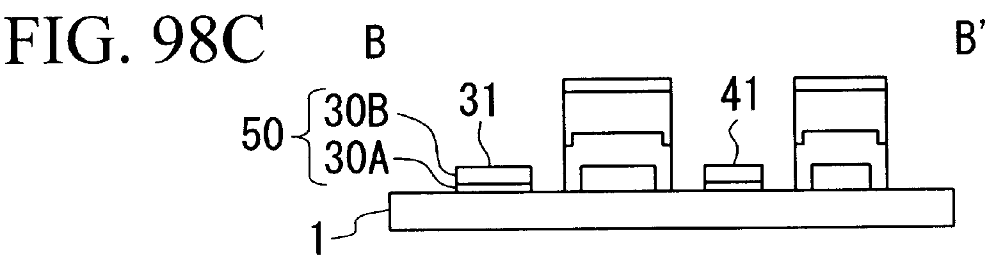
FIG. 98C is a cross sectional view through the plane B–B'.
Figure 98D:
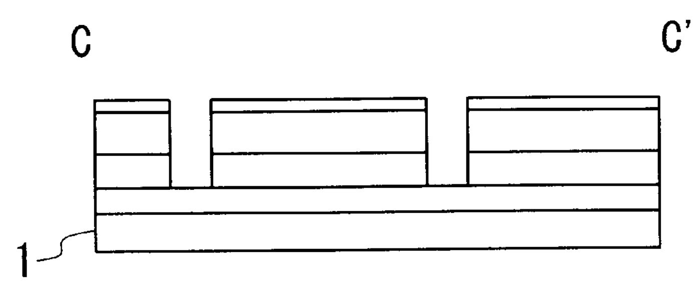
FIG. 98D is a cross section view through the plane C–C'.

FIG. 95A is a perspective plan view to show a one-pixel-region of the active matrix substrate plate in Embodiment 17, and FIG. 95B is a cross sectional view through the plane A–A', FIG. 95C is the same through the plane B–B' and FIG. 95D is the same through the plane C–C'. FIGS. 96A–99C are diagrams to show the manufacturing steps of the active matrix substrate plate, and refer to steps 1–3, and a channel-formed TFT, respectively. Similar to FIG. 95A, FIGS. 96A, 97A, and 98A are perspective plan views of a one-pixel-region, and FIGS. 96B–96D, 97B–97D, 98B–98D and FIGS. 99A–99C are cross sectional views through the planes A–A' and B–B', C–C' respectively. FIG. 100A is a cross sectional view of the terminal section of the active matrix substrate plate in the longitudinal direction, in which the left side relates to a cross sectional view at the scanning line terminal location GS, the center relates to a cross sectional view at the signal line terminal location DS, and the right side relates to the common wiring terminal location CS, and FIGS. 100B–100D show manufacturing steps 1–3 for the terminal section part.

The active matrix substrate plate in Embodiment 17 is formed such that a plurality of scanning lines 11 and common wiring lines 13 comprised by the first conductor layer 10 are arranged alternatingly in parallel on a glass plate 1, a plurality of signal lines 31 are arranged at right angles to the scanning lines 11 across a gate insulation layer 2, and in the vicinity of TFT section Tf formed in the intersection of the scanning line 11 and the signal line 31, a portion of the scanning line 11 acts as the gate electrode 12 and this gate electrode 12, an island-shaped amorphous silicon layer 21 and an $n^+$ amorphous silicon layer 22 comprise a semiconductor layer 20 opposing the gate electrode across the gate insulation layer 2, and above this semiconductor layer, a pair of drain electrode 32 and source electrode 33 comprised by a second conductor layer 50 and formed with a gap of channel gap 23 comprise an inverted staggered structure TFT, and in a window section Wd surrounded by the scanning line 11 and the signal line 31 are formed a comb teeth shaped pixel electrode 41 and a comb teeth shaped common electrode 14 opposing the pixel electrode and connecting to the common wiring line 13, and the drain electrode 32 is connected to the signal line 31, the source electrode 33 is connected to the pixel electrode 41, respectively, to form an IPS-type active matrix substrate plate producing a horizontal electrical field between the pixel electrode 41 and the common electrode 14 with respect to the glass plate 1.

In this active matrix substrate plate, common wiring line 13 and common electrode 14 are formed on the same layer as the scanning line 11 on the glass plate 1, and the pixel electrode 41 is formed on the same layer as the signal line 31 on the glass plate 1. The signal line 31, scanning line 11 and the common wiring line 13 are insulated at the intersection point by the gate insulation layer 2 and the semiconductor layer 20.

The first conductor layer 10 forming the scanning line 11, common wiring line 13 and the common electrode 14 is comprised by an alloy of primarily Al containing Nd, for example. The second conductor layer 50 forming the signal line 31, drain electrode 32, source electrode 33, and pixel electrode 41 is formed by laminating the upper metallic layer 30B comprised by Al or an alloy of primarily Al on top of the lower metallic layer 30A comprised by Cr or Mo.

The pixel electrode 41 descends vertically from the source electrode 33 to the glass plate 1 so that the second conductor layer 50 covers the lateral surface of the lamination film of the gate insulation layer 2 and semiconductor layer 20, and further extends above the glass plate towards the window section Wd opposing the common electrode 14 to form a comb teeth shape.

Also, the lateral surface of the first conductor layer 10 formed above the glass plate 1 concurrently with the scanning line 11 is totally covered by the gate insulation layer 2. Also, a portion of both lateral surfaces of the amorphous silicon layer 21, in the direction of the extending channel gap 23 of the TFT section Tf, is covered by the protective insulation layer 3.

Here, the pixel electrode 41 forms an accumulation capacitance electrode 71 by extending to superimpose above the accumulation common electrode 72 formed inside the common wiring line 13 across the gate insulation layer 2 to construct the accumulation capacitance section Cp in this pixel region.

The active matrix substrate plate in Embodiment 17 is manufactured according to the following four steps.

(Step 1) as shown in FIGS. 96A–96D and FIG. 100B, by sputtering on the glass plate 1, an alloy of Al—Nd of about 250 nm thickness is deposited to form the first conductor layer 10, and through photolithographic processes, excepting the scanning line 11, common wiring line 13, and within the respective pixel regions, gate electrode 12 sharing a portion of the scanning line 11 and a plurality of common electrodes 14 extending from the common wiring line to the window section Wd, and the accumulation common electrode 72 formed inside the common wiring line, the first conductor layer 10 is removed by etching.

(Step 2) as shown in FIGS. 97A–97D and FIG. 100C, on the above substrate plate, gate insulation layer 2 comprised by silicon nitride film of about 400 nm thickness and the semiconductor layer 20 comprised by the amorphous silicon layer 21 of about 250 nm thickness and the $n^+$ amorphous silicon layer 22 of about 50 nm thickness are deposited by continually applying plasma CVD. Next, through photolithographic processes, excepting the opening section 62 formed in the TFT section Tf above the scanning line 11 so as to clamp the gate electrode 12, opening section 63 formed on the scanning end section 11*b* and the common wiring end section 13*c*, and an opening section (not shown) formed above the respective common wiring end sections for binding respective common wiring line, and leaving so as to cover at least the upper surface and an entire lateral surface of the first conductor layer 10 (scanning line 11, common wiring line 13, common electrode 14, gate electrode 12) with the gate insulation layer 2, the semiconductor layer 20 and the gate insulation 2 are removed successively by etching.

(Step 3) as shown in FIGS. 98A–98D and FIG. 100D, after sputtering and etching at a same vacuum pressure, by continually sputtering on the above substrate plate, the second conductor layer 50 is formed by depositing the lower metallic layer 30A comprised by Mo of about 50 nm thickness and the upper metallic layer 30B comprised by Al of about 150 nm thickness. Next, through photolithographic processes, excepting the signal line 31, signal line terminal section 3 la formed in the signal line terminal location DS, connection electrode section 42 connected to the scanning line end section through the opening section 63 formed above the scanning line end section 11*b*, scanning line terminal section 11*a* formed in the scanning line terminal location GS by extending further from this connection electrode section, connection electrode section 42 connecting to this common wiring end section through the opening section 63 formed above the common wiring end section 13*c* adjacent to the outer perimeter section Ss, common wiring line terminal section 13*a* formed in the common wiring terminal location CS by extending further from this connection electrode section, common wiring linking line (not shown) for binding each common wiring line through the opening section (not shown) formed above each common wiring end section and linking to the connection electrode section 42 above the common wiring end section 13*c*, and within the respective pixel regions, drain electrode 32 extending from the signal line 31 to the TFT section Tf, pixel electrode 41 extending opposite this common electrode 14, and source electrode 33 extending from this pixel electrode towards TFT section Tf and separated from the drain electrode 32 by the opposing channel gap 23, the second conductor layer 50 is removed by etching. In this case, a portion of the pixel electrode 41 is extended so as to superimpose on a portion of the common wiring line 13 at the accumulation capacitance section Cp to form the accumulation capacitance electrode 71.

Figure 99A:
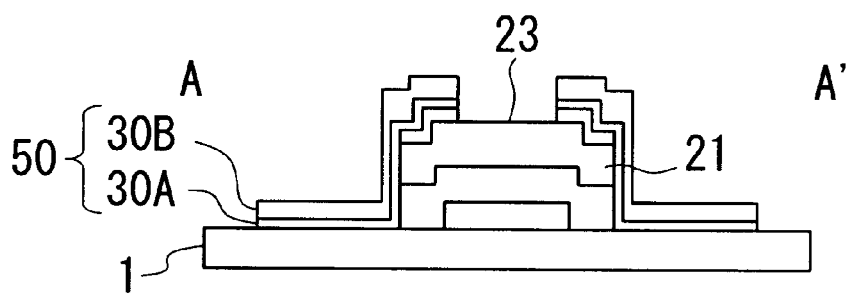
FIGS. 99A–99C are cross sectional views of a channel-formed TFT in active matrix substrate plate manufacturing in Embodiment 17.
Figure 99B:
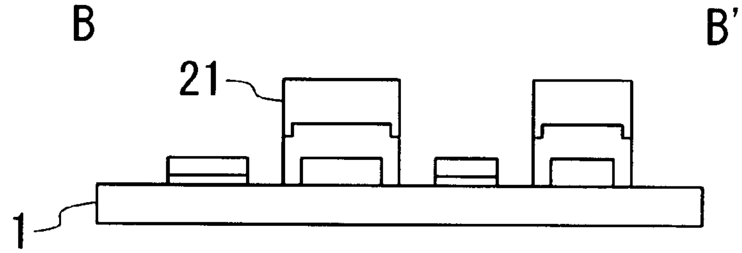
Figure 99C:
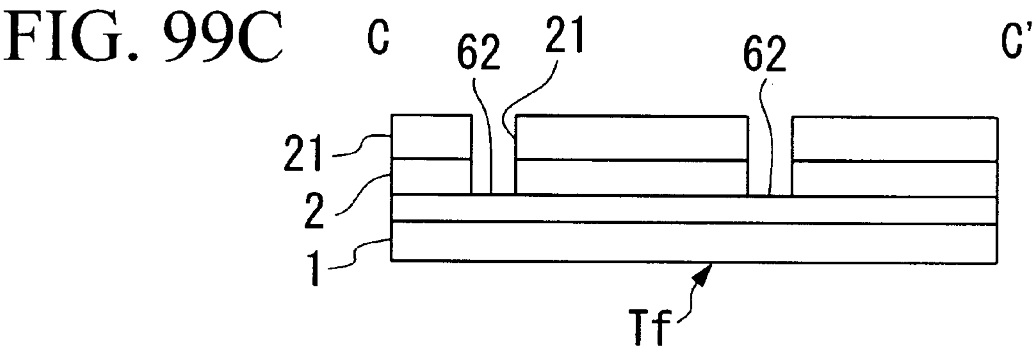
Figures 100A, 100B, 100C, 100D:
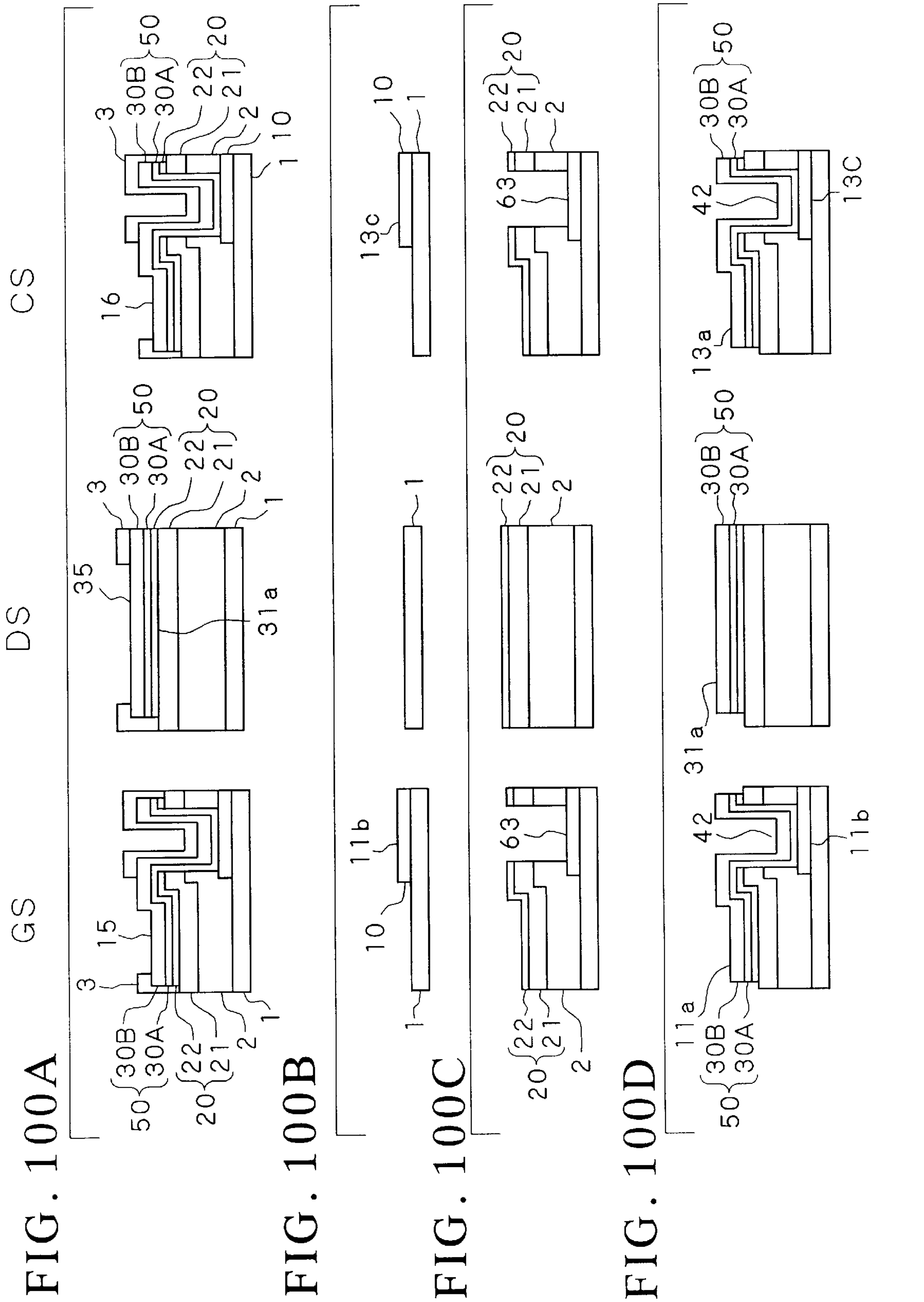
FIG. 100A is a cross sectional view in the longitudinal direction of a terminal section of the active matrix substrate plate in Embodiment 17, and the left side relates to the scanning line terminal section, the center relates to the signal line terminal section and the right side relates to the common wiring line terminal section.
FIGS. 100B–100D are cross sectional views relating to manufacturing step 1–step 3, respectively.

Next, as shown in FIGS. 99A–99C, using the masking pattern used in the etching process or the second conductor layer 50 after removing its masking, the exposed $n^+$ amorphous silicon layer 22 is removed by etching. By so doing, channel gap 23 is formed and in the direction of the extending channel gap, the amorphous silicon layer 21 is exposed beyond the opening 62.

(Step 4) as shown in FIGS. 95A–95D and FIG. 100A, on the above substrate plate the protective insulation layer 3 of about 300 nm thickness comprised by silicon nitride film is deposited using plasma CVD process, and through photolithographic processes, excepting the protective insulation layer 3 above the scanning line terminal section 11*a* and common wiring line terminal section 13*a* and signal line terminal section 31*a*, and leaving so as to cover at least the upper surface and an entire lateral surface of the second conductor layer (signal line 31, drain electrode 32, source electrode 33, pixel electrode 41, common wiring linking line) with the protective insulation layer 3 and to form the semiconductor layer 20 of the TFT section Tf, the outer protective insulation layer 3 and amorphous silicon layer 21 are removed successively by etching. By doing so, the opening section 62 and the perimeter section of the protective insulation layer 3 are intersected and leaving the protective insulation layer 3 of the TFT section Tf in such a way that the perimeter section of the protective insulation layer descends to cover a portion of the lateral surface of the amorphous silicon layer 21 on the channel gap 23 side exposed at the opening section 62, the outer protective insulation layer and the amorphous silicon layer are removed by etching. By so doing, the scanning line terminal 15 and the signal line terminal 35 and the common wiring terminal 16 comprised by the second conductor layer are exposed. Lastly, the active matrix substrate plate is completed by performing annealing at about 280° C.

In this case, an alloy of Al—Nd is used for the first conductor layer, but as in Embodiment 10, a lamination of Al and a high melting point metal such as Ti and their nitrides, or a three layer lamination structure formed by laying an underlayer of a high melting point metal such as Ti below the Al layer, to form, for example, a three layer structure of Ti, Al and Ti may be used. Also, the second conductor layer is a lamination of Al and an alloy of primarily Al on top of Mo or Cr, but a lamination structure having a nitride film of a high melting point metal such as Ti at the topmost layer, for example, from the bottom Ti, Al and Ti nitride layers may be used. It may be a film made by laminating ITO on top of Cr. When using a nitride film layer of a high melting point metal such as Ti in the topmost layer, it is preferable that the atomic concentration of nitrogen in the nitride film be not lower than 25 a/o.

Productivity and the yield of the IPS-type active matrix substrate plate in Embodiment 17 are improved because it can be manufactured in four steps.

Also, in this active matrix substrate plate, the common electrode and the pixel electrode are formed on different layers, shorting between the common electrode and pixel electrode can be prevented, and the yield can be improved.

Effects of preventing infiltration corrosion of the circuit elements such as the scanning lines when etching the conductor layer, effects of protection from static charges, improvement in reliability of TFT, lowering of resistance of scanning and signal lines, and improving the dielectric strength of insulation are exactly the same as those in Embodiment 14.

Embodiment 18

Figure 101A:
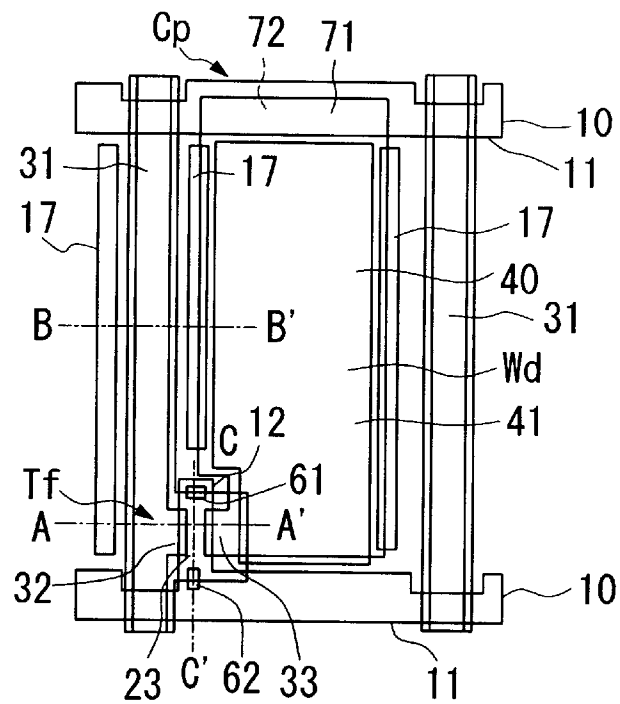
FIG. 101A is a perspective plan view of a one-pixel-region of the active matrix substrate plate in Embodiment 18.
Figure 101B:
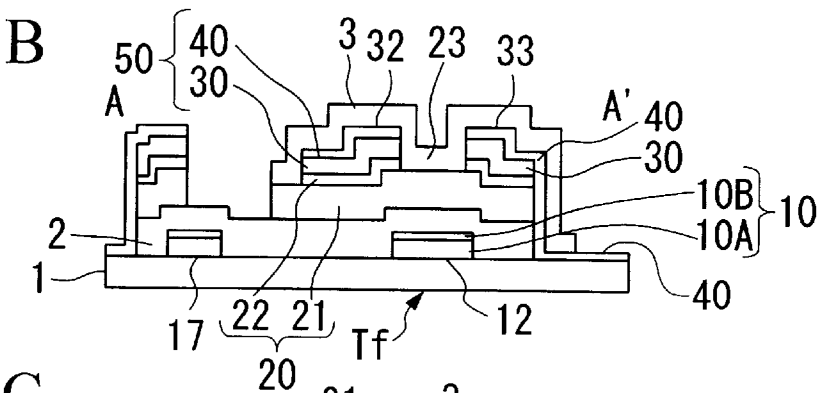
FIG. 101B is a cross sectional view through the plane A–A'.
Figure 101C:
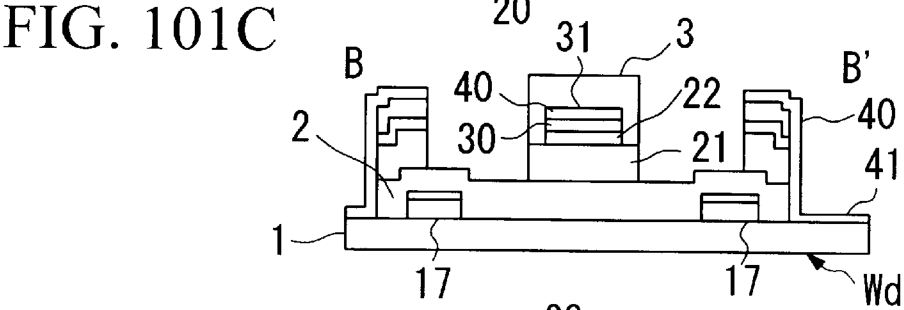
FIG. 101C is a cross sectional view through the plane B–B'.
Figure 101D:
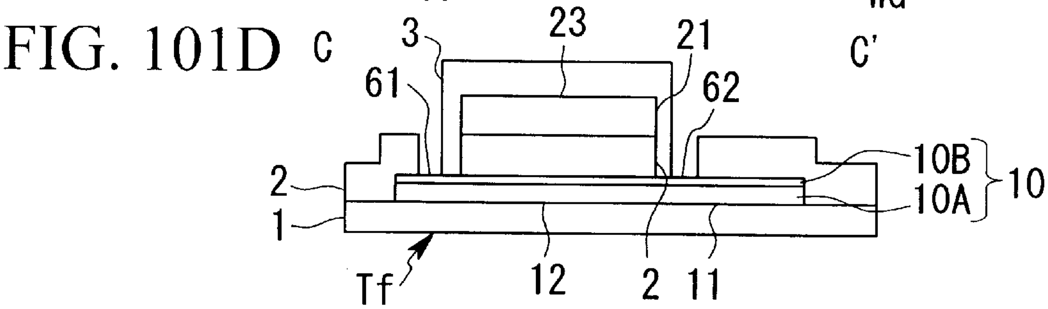
FIG. 101D is a cross section view through the plane C–C'.
Figure 102A:
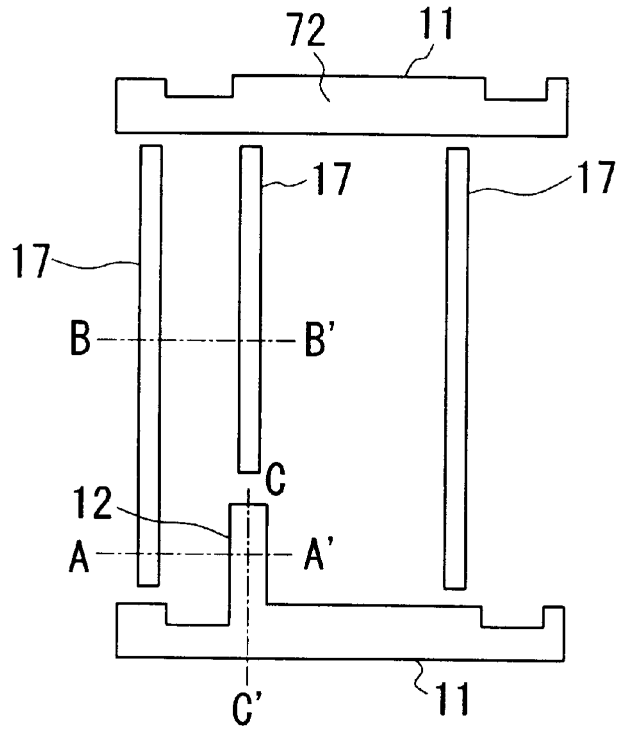
FIG. 102A is a perspective plan view of a one-pixel-region of the active matrix substrate plate in step 1 of the manufacturing process in Embodiment 18.
Figure 102B:
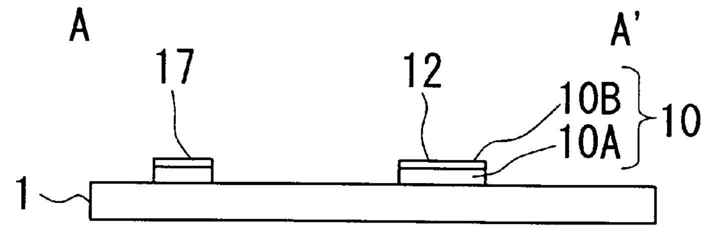
FIG. 102B is a cross sectional view through the plane A–A'.
Figure 102C:
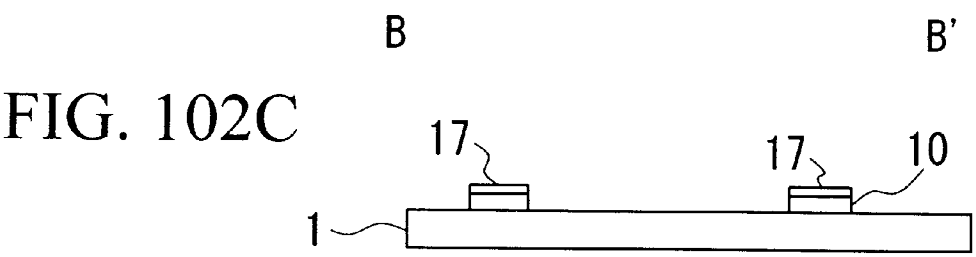
FIG. 102C is a cross sectional view through the plane B–B'.
Figure 102D:
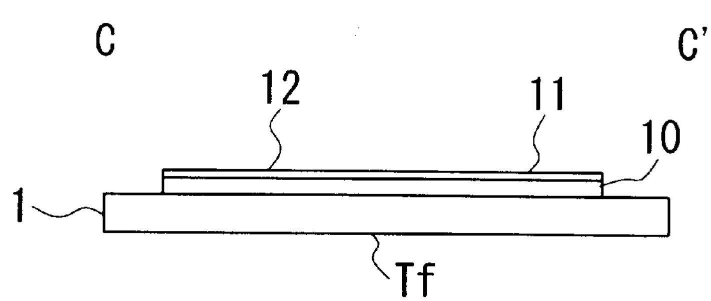
FIG. 102D is a cross section view through the plane C–C'.
Figure 103A:
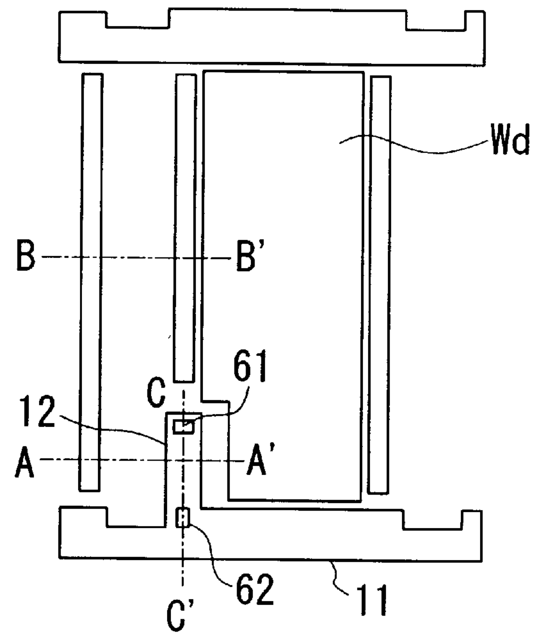
FIG. 103A is a perspective plan view of a one-pixel-region of the active matrix substrate plate in step 2 of the manufacturing process in Embodiment 18.
Figure 103B:
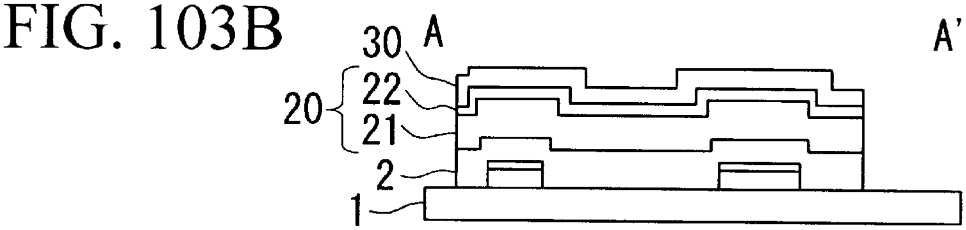
FIG. 103B is a cross sectional view through the plane A–A'.
Figure 103C:
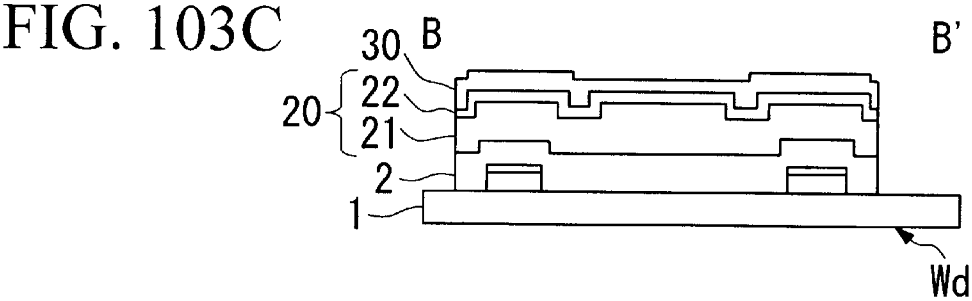
FIG. 103C is a cross sectional view through the plane B–B'.
Figure 103D:
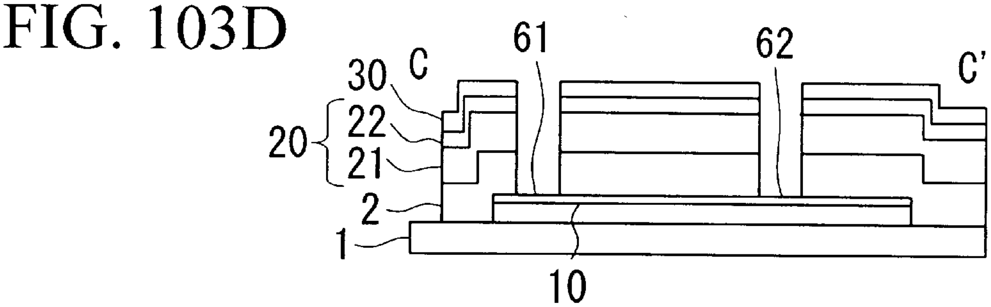
FIG. 103D is a cross section view through the plane C–C'.
Figure 104A:
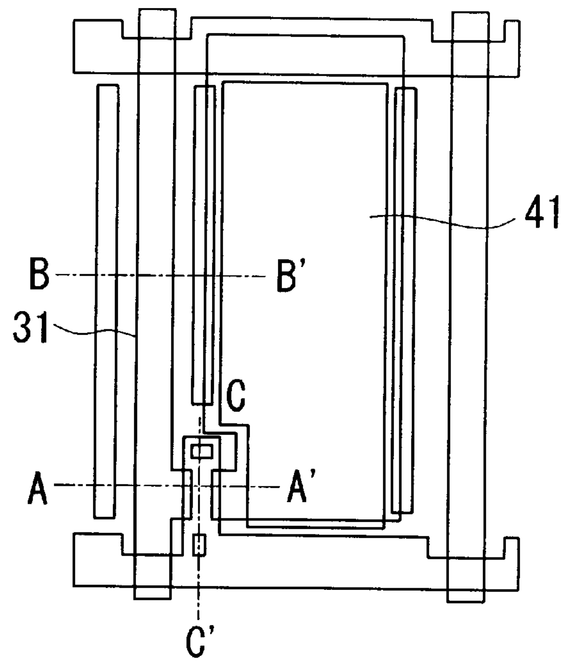
FIG. 104A a perspective plan view of a one-pixel-region of the active matrix substrate plate in step 3 of the manufacturing process in Embodiment 18.
Figure 104B:
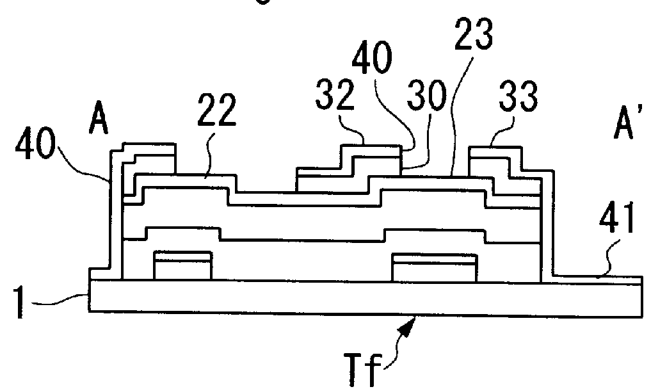
FIG. 104B is a cross sectional view through the plane A–A'.
Figure 104C:
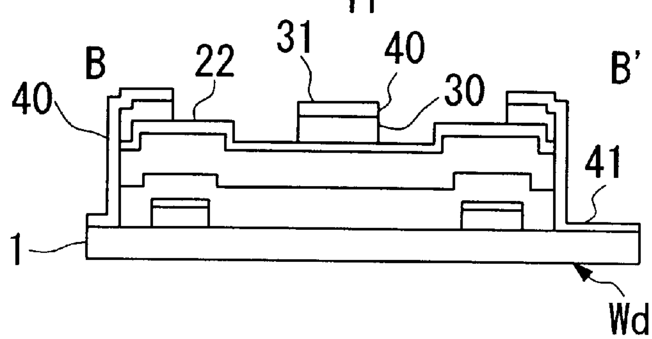
FIG. 104C is a cross sectional view through the plane B–B'.
Figure 104D:
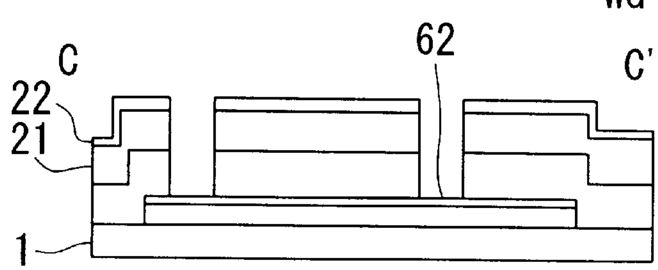
FIG. 104D is a cross section view through the plane C–C'.

FIG. 101A is a perspective plan view to show a one-pixel-region of the active matrix substrate plate in Embodiment 18, and FIG. 101B is a cross sectional view through the plane A–A', FIG. 101C is the same through the plane B–B' and FIG. 101D is the same through the plane C–C'. FIGS. 102A–105C are diagrams to show the manufacturing steps of the active matrix substrate plate, and refer to steps 1–3, and a channel-formed TFT, respectively. Similar to FIG. 110A, FIGS. 102A, 103A, and 104A are perspective plan views of a one-pixel-region, and FIGS. 102B–102D, 103B–103D, 104B–104D and FIGS. 105A–105C are cross sectional views through the planes A–A' and B–B', C–C' respectively. FIG. 106A is a cross sectional view of the terminal section of the active matrix substrate plate in the longitudinal direction, in which the left side relates to a cross sectional view at the scanning line terminal location GS, and the right side relates to the signal line terminal location DS, and FIGS. 106B–106D show manufacturing steps 1–3 for the terminal section part.

The active matrix substrate plate in Embodiment 18 is formed on a glass plate 1, such that, a plurality of scanning lines 11 comprised by the first conductor layer 10 and a plurality of signal lines 31 comprised by the second conductor layer 50 are arranged at right angles across the gate insulation layer 2, and in the vicinity of the TFT section Tf formed in the intersection of the scanning line 11 and the signal line 31, the gate electrode 12 extending from the scanning line 11, a semiconductor layer 20 comprised by the island-shaped amorphous silicon layer 21 and an $n^+$ amorphous silicon layer 22 opposing the gate electrode across the gate insulation layer 2, and a pair of drain electrode 32 and source electrode 33 comprised by a second conductor layer 50 above the semiconductor layer and spaced with a gap of channel gap 23 comprise an inverted staggered structure TFT, and a pixel electrode 41 comprised by a transparent conductive layer 40 is formed in a window section Wd, for transmitting light, which is surrounded by the scanning line 11 and the signal line 31, and the drain electrode 32 is connected to the signal line 31, the source electrode 33 is connected to the pixel electrode 41 to form a TN-type active matrix substrate plate.

In this active matrix substrate plate, the first conductor layer 10 forming the scanning line 11 and the gate electrode 12 is formed by laminating a lower metallic layer 10A comprised by Al or an alloy of primarily Al and an upper metallic layer 10B comprised by a high melting point metal such as Ti, Ta, Nb, Cr or their alloy or their nitride film. Also, the second conductor layer 50 forming the signal line 31, drain electrode 32, and source electrode 33 is formed by laminating the transparent conductive layer 40 comprised by ITO above the metallic layer 30 comprised by Cr.

The pixel electrode 41 descends vertically to the glass plate 1 so that the transparent conductive layer 40 above the source electrode 33 covers the lateral surface of the lamination film of the gate insulation layer 2, semiconductor layer 20 and metallic layer 30, and further extends above the glass plate 1 towards the window section Wd.

Also, the lateral surface of the first conductor layer 10 formed above the glass plate 1 concurrently with the scanning line 11 is totally covered by the gate insulation layer 2. Also, a portion of both lateral surfaces of the amorphous silicon layer 21, in the direction of the extending channel gap 23 of the TFT section Tf, is covered by the protective insulation layer 3.

Here, the pixel electrode 41 forms an accumulation capacitance electrode 71 by extending to superimpose above the accumulation common electrode 72 formed inside the forestage scanning line 11 across the gate insulation layer 2 to construct the accumulation capacitance section Cp in this pixel region. Also, in this pixel region, a light blocking layer 17 comprised by the first conductor layer 10 is formed so as to superimpose across the gate insulation layer 2 a portion on one perimeter section of the pixel electrode 41.

The active matrix substrate plate in Embodiment 18 is manufactured according to the following four steps.

(Step 1) as shown in FIGS. 102A–102D and FIG. 106B, the first conductor layer 10 is formed by continual sputtering on the glass plate 1 to form the lower metallic layer 10A comprised by Al of about 200 nm thickness and the upper metallic layer 10B comprised by a nitride film of Ti of about 100 nm thickness, and through photolithographic processes, excepting the scanning line 11, scanning line terminal section 11*a* formed in the scanning line terminal location GS, gate electrode 12 extending from the scanning line 11 to the TFT section Tf within the respective pixel regions, accumulation common electrode 72 formed within the forestage scanning line 11 and the light blocking layer 17, the first conductor layer 10 is removed by etching.

(Step 2) as shown in FIGS. 103A–103D and FIG. 106C, on the above substrate plate, by continually applying plasma CVD, gate insulation layer 2 comprised by silicon nitride film of about 400 nm thickness and the semiconductor layer 20 comprised by the amorphous silicon layer 21 of about 250 nm thickness and the $n^+$ amorphous silicon layer 22 of about 50 nm thickness are deposited, and continuing, the metallic layer 30 of Cr of about 200 nm thickness is deposited by sputtering. Next, through photolithographic processes, excepting the opening section 61 formed in the longitudinal tip side above the gate electrode 12, opening section 62 formed above the scanning line 11 of the gate electrode base section, opening section 63 formed above the scanning line terminal section 11*a*, and leaving so as to cover at least the upper surface and an entire lateral surface of the first conductor layer 10 (scanning line 11, scanning line terminal section 11*a*, gate electrode 12, light blocking layer 17) with the gate insulation layer 2, the metallic layer 30, semiconductor layer 20 and the gate insulation 2 are removed successively by etching. Accordingly, the metallic layer 30 and semiconductor layer 20 and the gate insulation layer 2 are removed from the window section Wd to expose the glass plate 1, and the opening sections 61, 62 are formed in two locations above the gate electrode 12 and the scanning line 11 to reach the first conductor layer 10 and the opening section 63 is formed above the scanning line terminal section 11*a* to reach the first conductor layer 10.

(Step 3) as shown in FIGS. 104A–104D and FIG. 106D, by sputtering on the above substrate plate the transparent conductive layer 40 comprised by ITO of about 50 nm thickness is formed, and through photolithographic processes, excepting the signal line 31, signal line terminal section 31*a* formed in the signal line terminal location DS, connection electrode section 42 connecting to the scanning line terminal section 11*a* through the opening section 63 formed above the scanning line terminal section 11*a*, common wiring line and common wiring line terminal section (not shown), and within the respective pixel regions, drain electrode 32 extending from the signal line to the TFT section Tf, pixel electrode 41, and source electrode 33 extending from the pixel electrode 41 towards TFT section Tf and separated from the drain electrode 32 by the opposing channel gap 23, the transparent conductive layer 40 is removed by etching, and next, the exposed metallic layer 30 is removed by etching. In this case, the perimeter section of the pixel electrode 41 is extended so as to superimpose on the accumulation common electrode 72 at the accumulation capacitance section Cp to form the accumulation capacitance electrode 71, and both perimeter sections of the pixel electrode adjacent to this perimeter section are formed so that at least a portion will superimpose respectively on the light blocking layer 17.

Figure 105A:
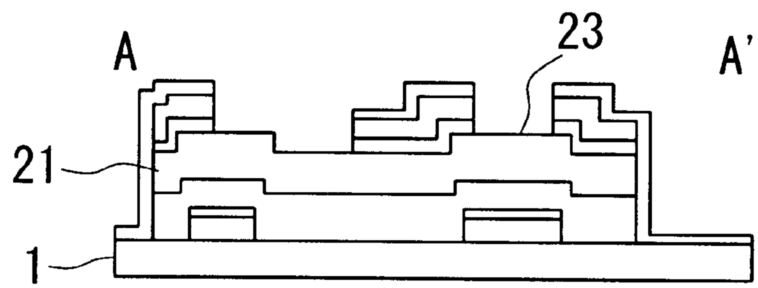
FIGS. 105A–105C are cross sectional views of a channel-formed TFT in active matrix substrate plate manufacturing in Embodiment 18.
Figure 105B:
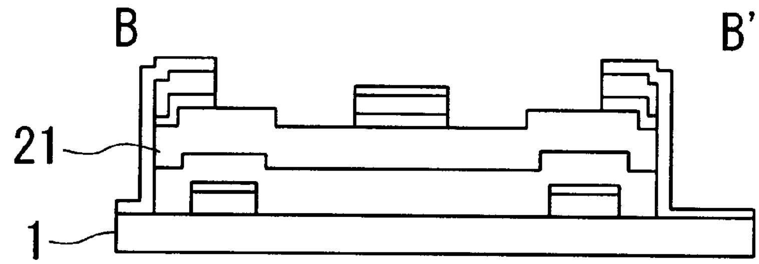
Figure 105C:
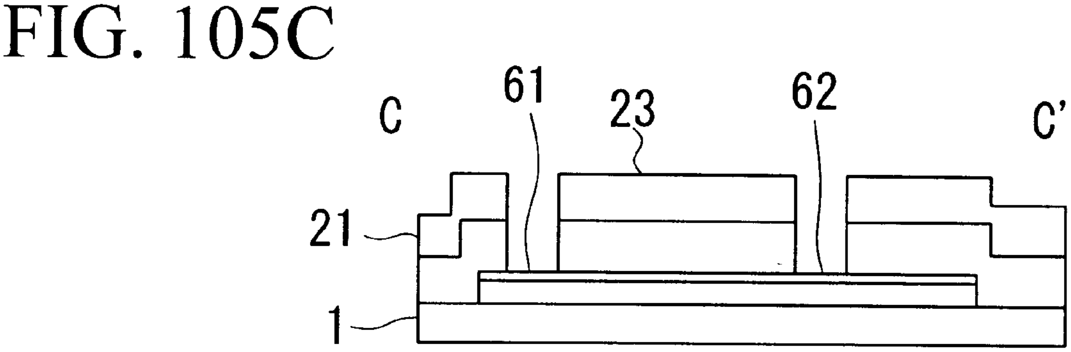
Figure 106A:
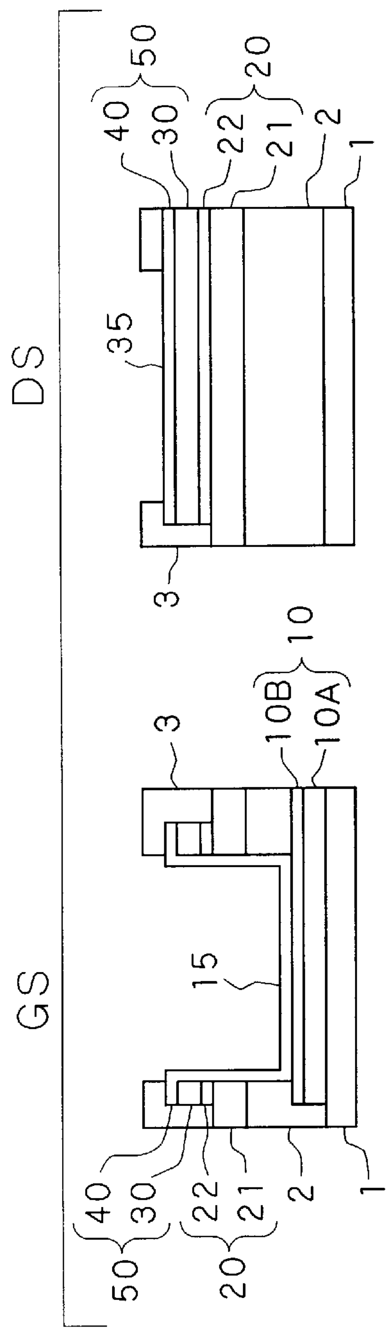
FIG. 106A is a cross sectional view in the longitudinal direction of a terminal section of the active matrix substrate plate in Embodiment 18 and the left side relates to the scanning line terminal section and the right side relates to the signal line terminal section.
Figure 106B:
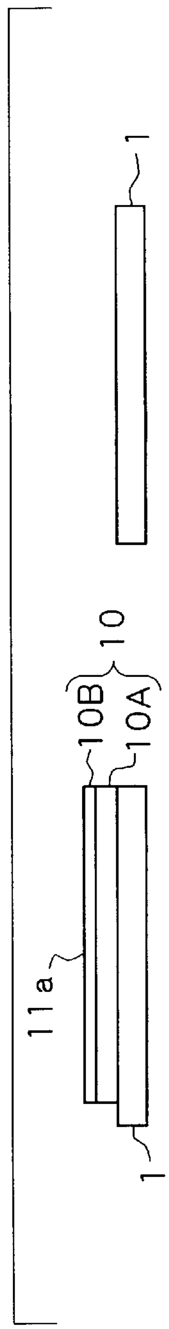
FIGS. 106B–106D are cross sectional views relating to manufacturing step 1–step 3, respectively.
Figure 106C:
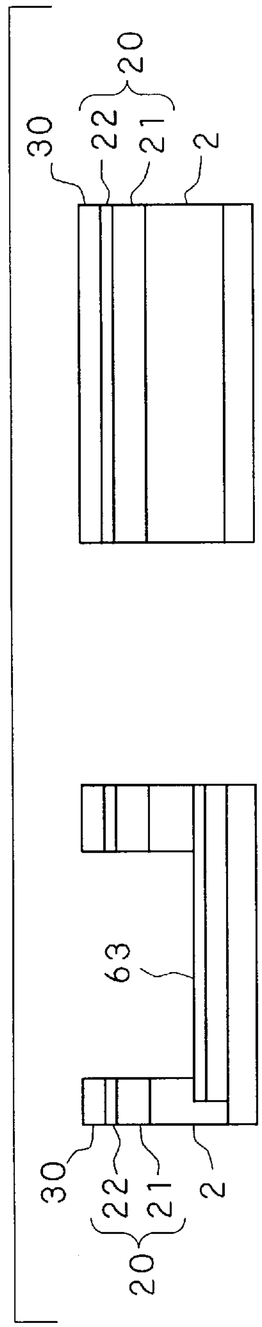
Figure 106D:
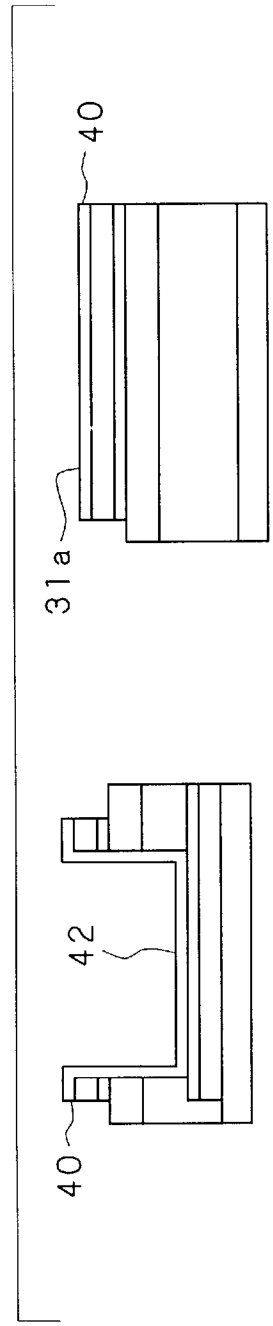

Next, as shown in FIGS. 105A–105C, using the masking pattern used in the etching process or the transparent conductive layer 40 after removing its masking, the exposed $n^+$ amorphous silicon layer 22 is removed by etching. By so doing, channel gap 23 is formed and in the direction of the extending channel gap, the amorphous silicon layer 21 is exposed beyond the openings 61, 62.

(Step 4) as shown in FIGS. 101A–101D and FIG. 106A, on the above substrate plate the protective insulation layer 3 of about 150 nm thickness comprised by silicon nitride film is formed using plasma CVD process, and through photolithographic processes, excepting the connection electrode section 42 above the pixel electrode 41 and scanning line terminal section 11*a* and the protective insulation layer 3 above the signal line terminal section 31*a* and common wiring line terminal section (not shown), and leaving so as to cover at least the upper surface and an entire lateral surface of the signal line 31 with the protective insulation layer 3 and so as to form the semiconductor layer 20 of the TFT section Tf, the protective insulation layer 3 and amorphous silicon layer 21 are removed successively by etching. At this time, the opening sections 61, 62 and the perimeter section of the protective insulation layer 3 are intersected and leaving the protective insulation layer 3 of the TFT section Tf in such a way that the perimeter section of the protective insulation layer descends to cover a portion of the lateral surface of the amorphous silicon layer 21 on the channel gap 23 side exposed at the opening sections 61, 62, the outer protective insulation layer and the amorphous silicon layer are removed by etching. By so doing, the pixel electrode 41 comprised by the transparent conductive layer 40, signal line terminal 35 and the common wiring terminal (not shown) comprised by a lamination of the metallic layer 30 and the transparent conductive layer 40, and the scanning line terminal 15 laminated with the transparent conductive layer 40 through the opening section 63 punched through metallic layer 30, semiconductor layer 20 and gate insulation layer 2 above the first conductor layer 10 are exposed. Lastly, the active matrix substrate plate is completed by performing annealing at about 280° C.

In this case, a lamination of a nitride film of Al and Ti is used for the first conductor layer, but the first layer may be a three layer structure formed by laying an underlayer of a high melting point metal such as Ti below the Al layer, to form Ti, Al and Ti nitride layers, or single film layer of Cr may be used.

Also, in the present embodiment, the vertical-type TFT in which the gate electrode extends from the scanning line to the pixel section, but the lateral-type TFT may be used, in which the gate electrode shares a portion of the scanning lines.

Productivity and the yield of the TN-type active matrix substrate plate in Embodiment 18 are improved because it can be manufactured in four steps.

Also, in this active matrix substrate plate, because the conductor layer formed together with the scanning line on top of the transparent insulation substrate plate, excepting the connection section to the transparent conductive layer, is totally covered by the gate insulation layer, during etching of the metallic layer of the signal line or the transparent conductive layer, corrosion problems of circuit elements such as the scanning lines in the lower layer and gate electrodes, or shorting of scanning lines and signal lines are prevented, and the yield is improved.

Also, in this active matrix substrate plate, protective transistor can be fabricated so that the TFT in the pixel region can be prevented from unexpected electrical shock during manufacturing. Also, insulation breakdown between the scanning lines and signal lines can be prevented, and the yield is improved.

Also, in this active matrix substrate plate, because a portion of both lateral surfaces of the semiconductor layer in the extending direction of the channel gap of the TFT section is covered by the protective insulation layer, it is possible to prevent charge leaking through the lateral surfaces of the semiconductor layer as the current path, thereby improving the reliability of thin film transistors.

Also, this active matrix substrate plate is able to prevent, during etching of the metallic layer of the signal line and transparent conductive layer, corrosion of the gate electrode and the conductive film in the lower layer of the scanning line caused by infiltration of etching solution into the conductive film through the opening punched through the gate insulation layer above the gate electrode and the semiconductor layer, and the yield is improved.

Also, in this active matrix substrate plate, because the signal line is comprised by laminating the metallic layer and the transparent conductive layer, wiring resistance of the signal line can be reduced and the yield drop due to line severance and the like can be suppressed, and because the source electrode and the pixel electrode are formed integrally by the transparent conductive layer, it is possible to suppress an increase in electrical contact resistance resulting in improved reliability.

Also, in this active matrix substrate plate, because the scanning line is comprised by a lamination of Al and a high melting point metals such as Ti, it is possible to lower the wiring resistance of the scanning line. Also, the connection of the scanning line terminal to the scanning line driver is formed by ITO, surface oxidation at the terminal section can be prevented to secure reliability of connection to the scanning line driver.

Also, in this active matrix substrate plate, the semiconductor layer is formed in the lower layer of the signal line, dielectric strength of insulation between the scanning line and signal line is increased. Also, because the pixel electrode and the light blocking layer are formed to superimpose at least partially, it is possible to reduce the black matrix of the color filter substrate plate that needs to have a large superpositioning margin, thereby enabling to improve the aperture factor.

Embodiment 19

Figure 107A:
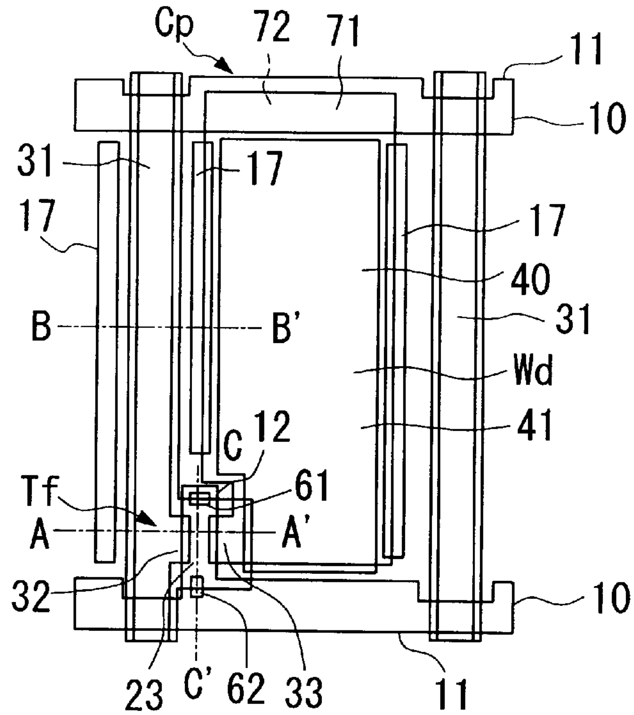
FIG. 107A is a perspective plan view of a one-pixel-region of the active matrix substrate plate in Embodiment 19.
Figure 107B:
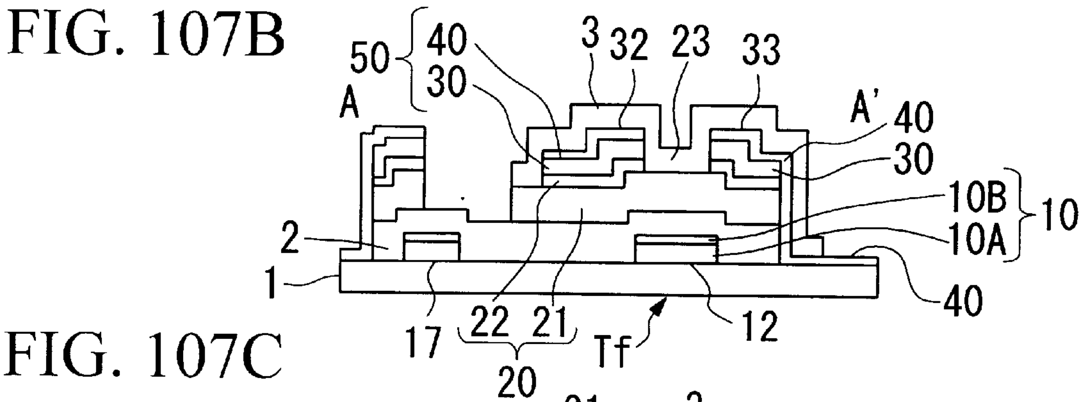
FIG. 107B is a cross sectional view through the plane A–A'.
Figure 107C:
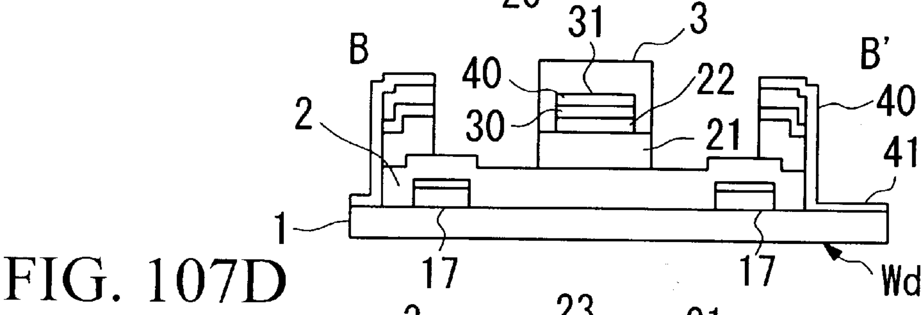
FIG. 107C is a cross sectional view through the plane B–B'.
Figure 107D:
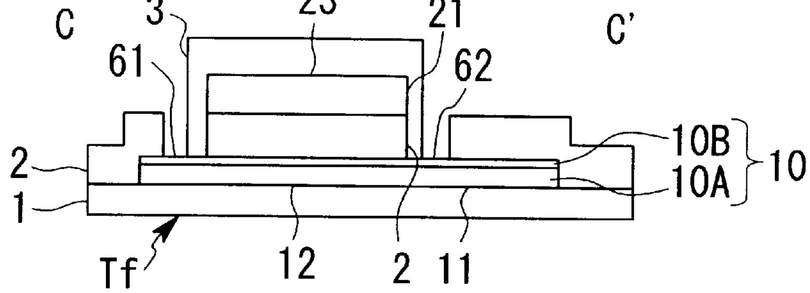
FIG. 107D is a cross section view through the plane C–C'.
Figure 108A:
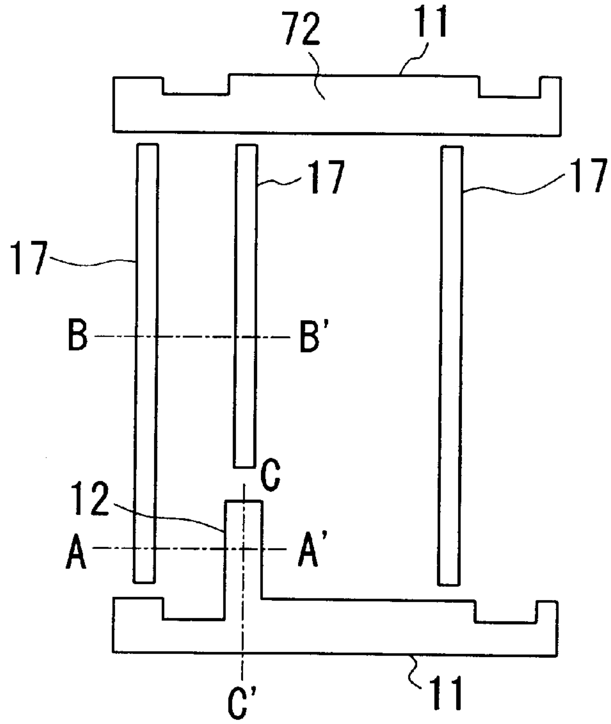
FIG. 108A is a perspective plan view of a one-pixel-region of the active matrix substrate plate in step 1 of the manufacturing process in Embodiment 19.
Figure 108B:
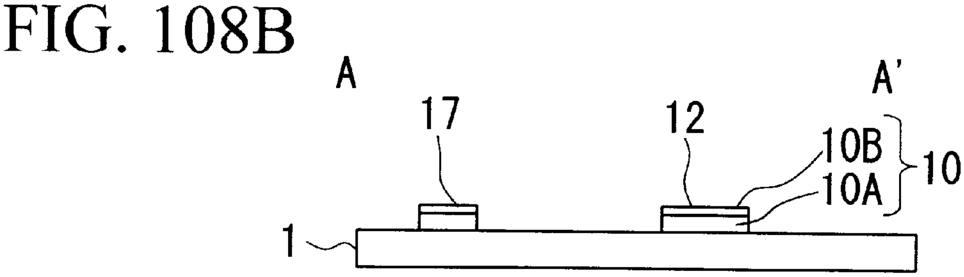
FIG. 108B is a cross sectional view through the plane A–A'.
Figure 108C:
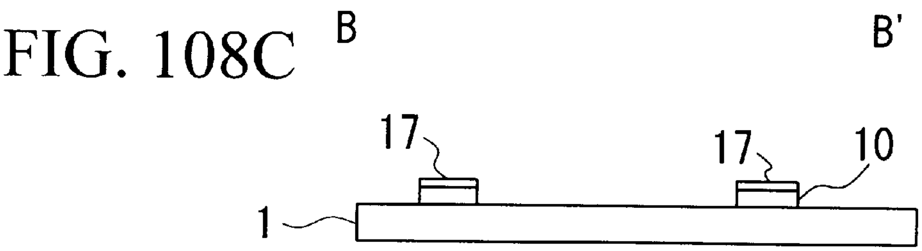
FIG. 108C is a cross sectional view through the plane B–B'.
Figure 108D:
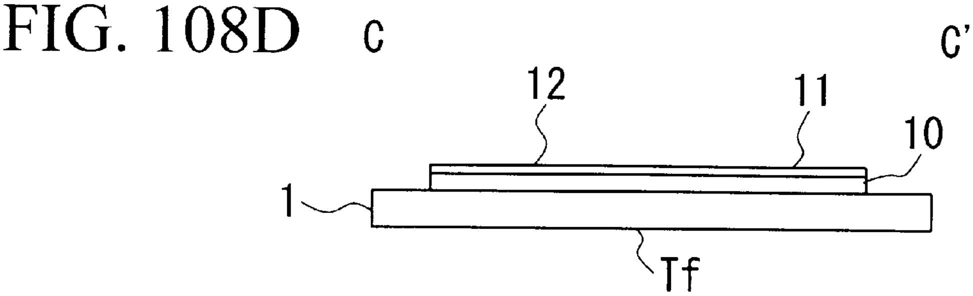
FIG. 108D is a cross section view through the plane C–C'.
Figure 109A:
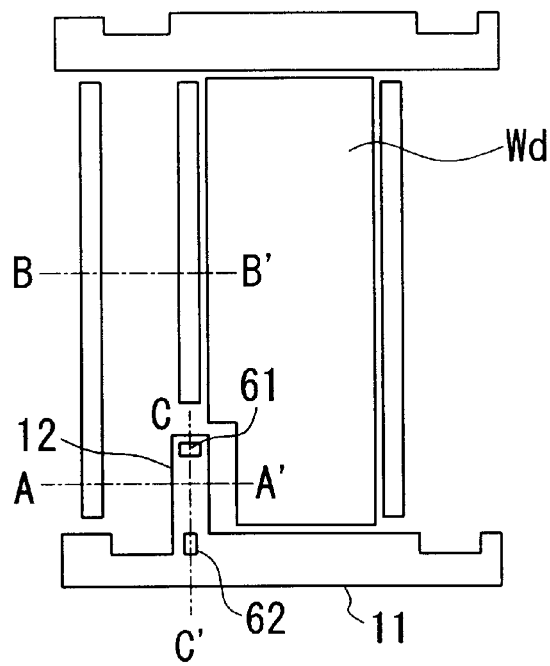
FIG. 109A is a perspective plan view of a one-pixel-region of the active matrix substrate plate in step 2 of the manufacturing process in Embodiment 19.
Figure 109B:
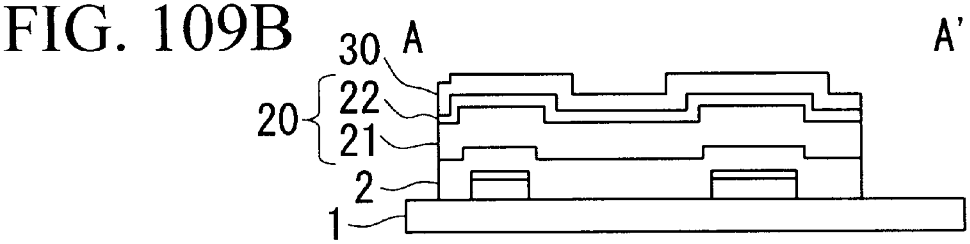
FIG. 109B is a cross sectional view through the plane A–A'.
Figure 109C:
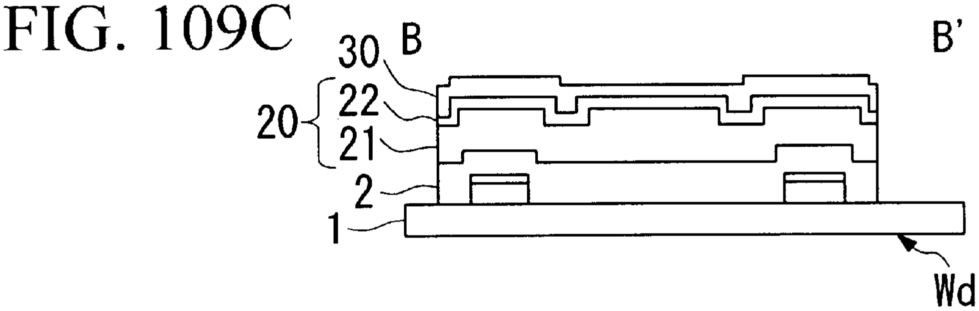
FIG. 109C is a cross sectional view through the plane B–B'.
Figure 109D:
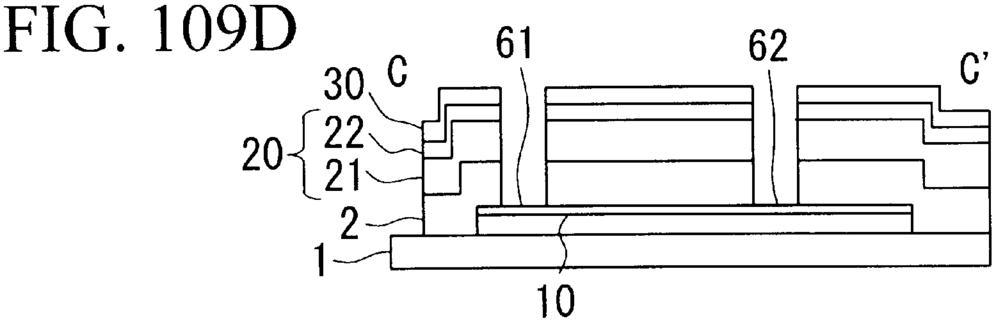
FIG. 109D is a cross section view through the plane C–C'.
Figure 110A:
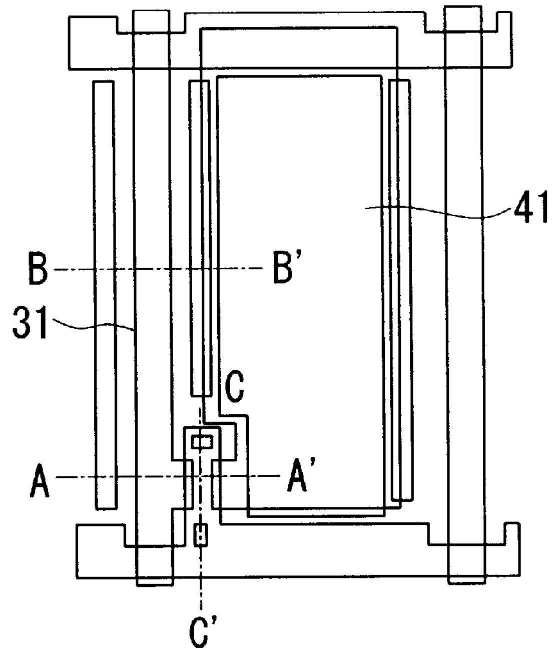
FIG. 110A is a perspective plan view of a one-pixel-region of the active matrix substrate plate in step 3 of the manufacturing process in Embodiment 19.
Figure 110B:
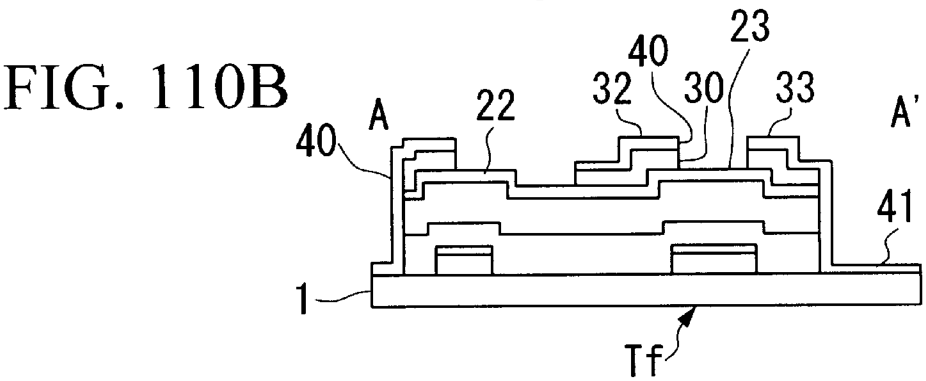
FIG. 110B is a cross sectional view through the plane A–A'.
Figure 110C:
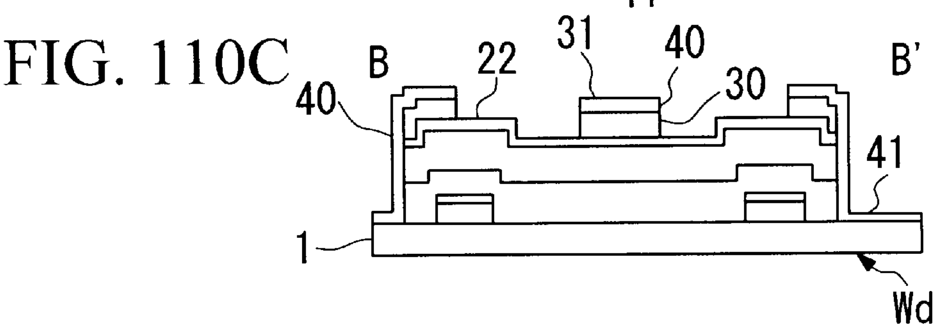
FIG. 110C is a cross sectional view through the plane B–B'.
Figure 110D:
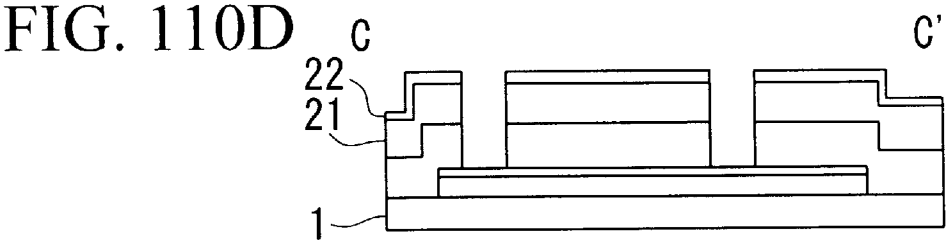
FIG. 110D is a cross section view through the plane C–C'.

FIG. 107A is a perspective plan view to show a one-pixel-region of the active matrix substrate plate in Embodiment 19 and FIG. 107B is a cross sectional view through the plane A–A', FIG. 107C is the same through the plane B–B' and FIG. 107D is the same through the plane C–C'. FIGS. 108A–111C are diagrams to show the manufacturing steps of the active matrix substrate plate, and refer to steps 1–3, and a channel-formed TFT, respectively. Similar to FIG. 107A, FIGS. 108A, 109A, and 110A are perspective plan views of a one-pixel-region, and FIGS. 108B–108D, 109B–109D, 110B–110D and FIGS. 111A–111C are cross sectional views through the planes A–A' and B–B', C–C' respectively. FIG. 112A is a cross sectional view of the terminal section of the active matrix substrate plate in the longitudinal direction, in which the left side relates to a cross sectional view at the scanning line terminal location GS, and the right side relates to the signal line terminal location DS, and FIGS. 112B–112D show manufacturing steps 1–3 for the terminal section part.

The active matrix substrate plate in Embodiment 19 is formed on a glass plate 1, such that, a plurality of scanning lines 11 comprised by the first conductor layer 10 and a plurality of signal lines 31 comprised by the second conductor layer 50 are arranged at right angles across the gate insulation layer 2, and in the vicinity of the TFT section Tf formed in the intersection of the scanning line 11 and the signal line 31, the gate electrode 12 extending from the scanning line 11, a semiconductor layer 20 comprised by the island-shaped amorphous silicon layer 21 and an $n^+$ amorphous silicon layer 22 opposing the gate electrode across the gate insulation layer 2, and a pair of drain electrode 32 and source electrode 33 comprised by a second conductor layer 50 above the semiconductor layer and spaced with a gap of channel gap 23 comprise an inverted staggered structure TFT, and a pixel electrode 41 comprised by a transparent conductive layer 40 is formed in a window section Wd, for transmitting light, which is surrounded by the scanning line 11 and the signal line 31, and the drain electrode 32 is connected to the signal line 31, the source electrode 33 is connected to the pixel electrode 41 to form a TN-type active matrix substrate plate.

In this active matrix substrate plate, the first conductor layer 10 forming the scanning line 11 and the gate electrode 12 is formed by laminating a lower metallic layer 10A comprised by Al or an alloy of primarily Al and an upper metallic layer 10B comprised by a high melting point metal such as Ti or its nitride film. Also, the second conductor layer 50 forming the signal line 31, drain electrode 32, and source electrode 33 is formed by laminating the transparent conductive layer 40 comprised by ITO above the metallic layer 30 comprised by Cr.

The pixel electrode 41 descends vertically to the glass plate 1 so that the transparent conductive layer 40 above the source electrode 33 covers the lateral surface of the lamination film of the gate insulation layer 2, semiconductor layer 20 and metallic layer 30, and further extends above the glass plate 1 towards the window section Wd.

Also, the lateral surface of the first conductor layer 10 formed above the glass plate 1 concurrently with the scanning line 11 is totally covered by the gate insulation layer 2. Also, a portion of both lateral surfaces of the amorphous silicon layer 21, in the direction of the extending channel gap 23 of the TFT section Tf, is covered by the protective insulation layer 3.

Here, the pixel electrode 41 forms an accumulation capacitance electrode 71 by extending to superimpose above the accumulation common electrode 72 formed inside the forestage scanning line 11 across the gate insulation layer 2 to construct the accumulation capacitance section Cp in this pixel region. Also, in this pixel region, a light blocking layer 17 comprised by the first conductor layer 10 is formed so as to superimpose across the gate insulation layer 2 a portion on one perimeter section of the pixel electrode 41.

The active matrix substrate plate in Embodiment 19 is manufactured according to the following four steps.

(Step 1) as shown in FIGS. 108A–108D and FIG. 112B, the first conductor layer 10 is formed by continual sputtering on the glass plate 1 to form the lower metallic layer 10A comprised by Al of about 200 nm thickness and the upper metallic layer 10B comprised by a nitride film of Ti of about 100 nm thickness, and through photolithographic processes, excepting the scanning line 11, gate electrode 12 extending from the scanning line 11 to the TFT section Tf within the respective pixel regions, accumulation common electrode 72 formed within the forestage scanning line 11 and the light blocking layer 17, the first conductor layer 10 is removed by etching.

(Step 2) as shown in FIGS. 109A–109D and FIG. 112C, on the above substrate plate, by continually applying plasma CVD, gate insulation layer 2 comprised by silicon nitride film of about 400 nm thickness and the semiconductor layer 20 comprised by the amorphous silicon layer 21 of about 250 nm thickness and the $n^+$ amorphous silicon layer 22 of about 50 nm thickness are deposited, and continuing, the metallic layer 30 of Cr of about 200 nm thickness is deposited by sputtering. Next, through photolithographic processes, excepting the opening section 61 formed in the longitudinal tip side above the gate electrode 12, opening section 62 formed above the scanning line 11 of the gate electrode base section, opening section 63 formed above the scanning line end section 11*b*, and leaving so as to cover at least the upper surface and an entire lateral surface of the first conductor layer 10 (scanning line 11, gate electrode 12, light blocking layer 17) with the gate insulation layer 2, the metallic layer 30, semiconductor layer 20 and the gate insulation 2 are removed successively by etching. Accordingly, the metallic layer 30 and semiconductor layer 20 and the gate insulation layer 2 are removed from the window section Wd to expose the glass plate 1, and the opening sections 61, 62 are formed in two locations above the gate electrode 12 and the scanning line 11 to reach the first conductor layer 10 and the opening section 63 is formed above the scanning line end section 11*b* to reach the first conductor layer 10.

(Step 3) as shown in FIGS. 110A–110D and FIG. 112D, by sputtering on the above substrate plate the transparent conductive layer 40 comprised by ITO of about 50 nm thickness is formed, and through photolithographic processes, excepting the signal line 31, signal line terminal section 31*a* formed in the signal line terminal location DS, connection electrode section 42 connecting to the scanning line end section 11*b* through the opening section 63 formed above the scanning line end section 11*b*, scanning line terminal section 11*a* extending above the metallic layer 30 from the connection electrode section to the scanning line terminal location GS, common wiring line and common wiring line terminal section (not shown), and within the respective pixel regions, drain electrode 32 extending from the signal line to the TFT section Tf, pixel electrode 41, and source electrode 33 extending from the pixel electrode 41 towards TFT section Tf and separated from the drain electrode 32 by the opposing channel gap 23, the transparent conductive layer 40 is removed by etching, and next, the exposed metallic layer 30 is removed by etching. In this case, the perimeter section of the pixel electrode 41 is extended so as to superimpose on the accumulation common electrode 72 at the accumulation capacitance section Cp to form the accumulation capacitance electrode 71, and both perimeter sections of the pixel electrode adjacent to this perimeter section are formed so that at least a portion will superimpose respectively on the light blocking layer 17.

Figure 111A:
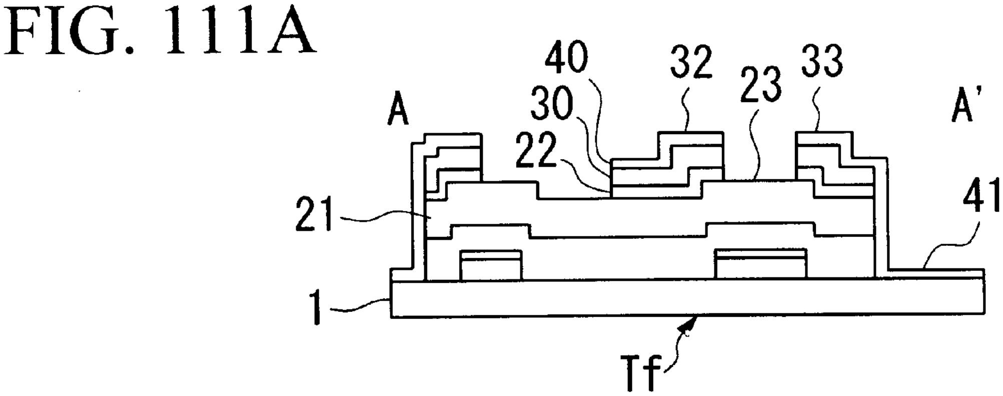
FIGS. 111A–111C are cross sectional views of a channel-formed TFT in active matrix substrate plate manufacturing in Embodiment 19.
Figure 111B:
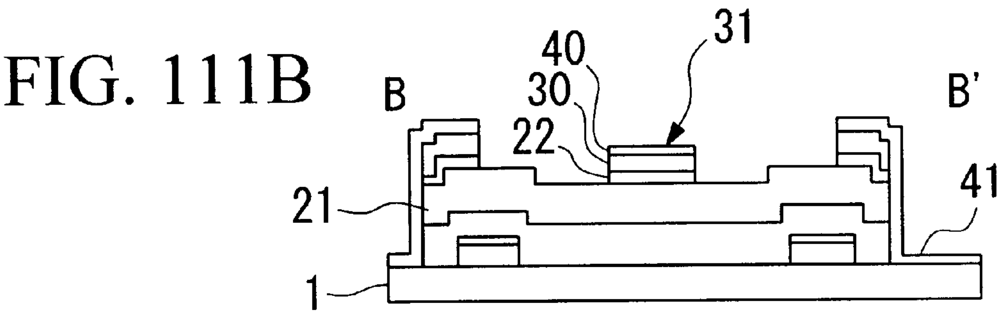
Figure 111C:
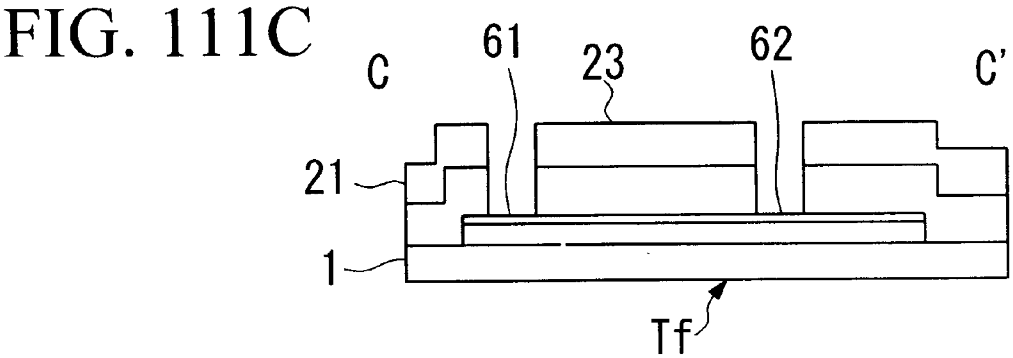
Figures 112A, 112B, 112C, 112D:
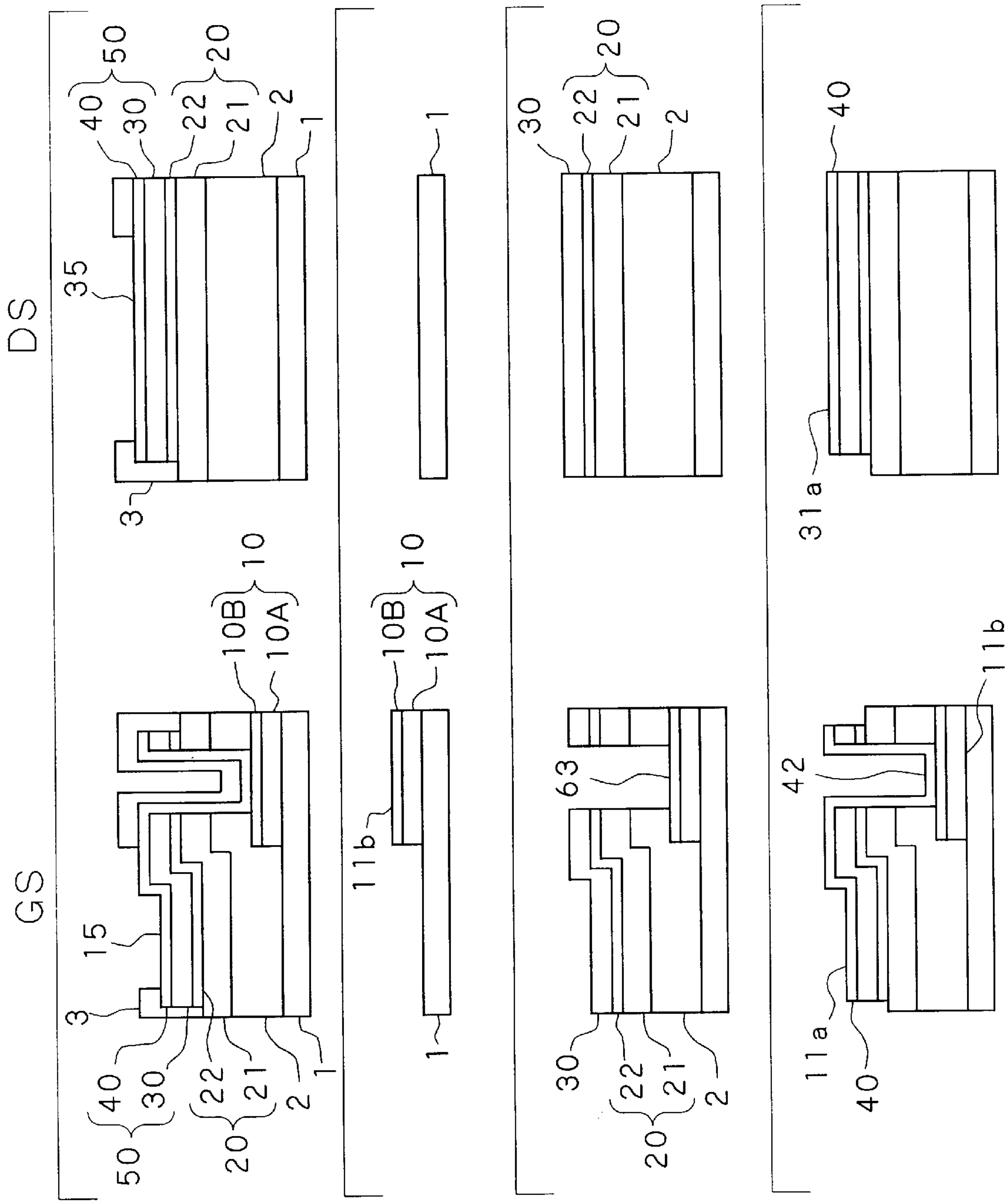
FIG. 112A is a cross sectional view in the longitudinal direction of a terminal section of the active matrix substrate plate in Embodiment 19, and the left side relates to the scanning line terminal section and the right side relates to the signal line terminal section.
FIGS. 112B–112D are cross sectional views relating to manufacturing step 1–step 3, respectively.

Next, as shown in FIGS. 111A–111C, using the masking pattern used in the etching process or the transparent conductive layer 40 after removing its masking, the exposed $n^+$ amorphous silicon layer 22 is removed by etching. By so doing, channel gap 23 is formed and in the direction of the extending channel gap, the amorphous silicon layer 21 is exposed beyond the openings 61, 62.

(Step 4) as shown in FIGS. 107A–107D and FIG. 112A, on the above substrate plate the protective insulation layer 3 of about 150 nm thickness comprised by silicon nitride film is formed using plasma CVD process, and through photolithographic processes, excepting the protective insulation layer 3 above the pixel electrode 41 and scanning line terminal section 11*a* and signal line terminal section 31*a* and common wiring line terminal section (not shown), and leaving so as to cover at least the upper surface and an entire lateral surface of the signal line 31 with the protective insulation layer 3 and so as to form the semiconductor layer 20 of the TFT section Tf, the protective insulation layer 3 and amorphous silicon layer 21 are removed successively by etching. At this time, the opening sections 61, 62 and the perimeter section of the protective insulation layer 3 are intersected and leaving the protective insulation layer 3 of the TFT section Tf in such a way that the perimeter section of the protective insulation layer descends to cover a portion of the lateral surface of the amorphous silicon layer 21 on the channel gap 23 side exposed at the opening sections 61, 62, the outer protective insulation layer and the amorphous silicon layer are removed by etching. By so doing, the pixel electrode 41 comprised by the transparent conductive layer 40, signal line terminal 35 and the scanning line terminal 15 and the common wiring terminal (not shown) comprised by a laminated film of metallic layer 30 and transparent conductive layer 40 are exposed. Lastly, the active matrix substrate plate is completed by performing annealing at about 280° C.

In this case, a lamination of a nitride film of Al and Ti is used for the first conductor layer, but the first layer may be a three layer structure formed by laying an underlayer of a high melting point metal such as Ti below the Al layer, to form Ti, Al and Ti nitride layers, or single film layer of Cr or Mo may be used.

Also, in the present embodiment, the vertical-type TFT in which the gate electrode extends from the scanning line to the pixel section, but the lateral-type TFT may be used, in which the gate electrode shares a portion of the scanning lines.

Productivity and the yield of the TN-type active matrix substrate plate in Embodiment 19 are improved because it can be manufactured in four steps.

Effects of preventing infiltration corrosion of the circuit elements such as the scanning lines when etching the metallic layer in the signal lines or etching the transparent conductive layer, effects of protection from static charges, improvement in reliability of TFT, lowering of resistance of scanning and signal lines, and improving the dielectric strength of insulation or aperture factor are exactly the same as those in Embodiment 18.

Embodiment 20

Figure 113A:
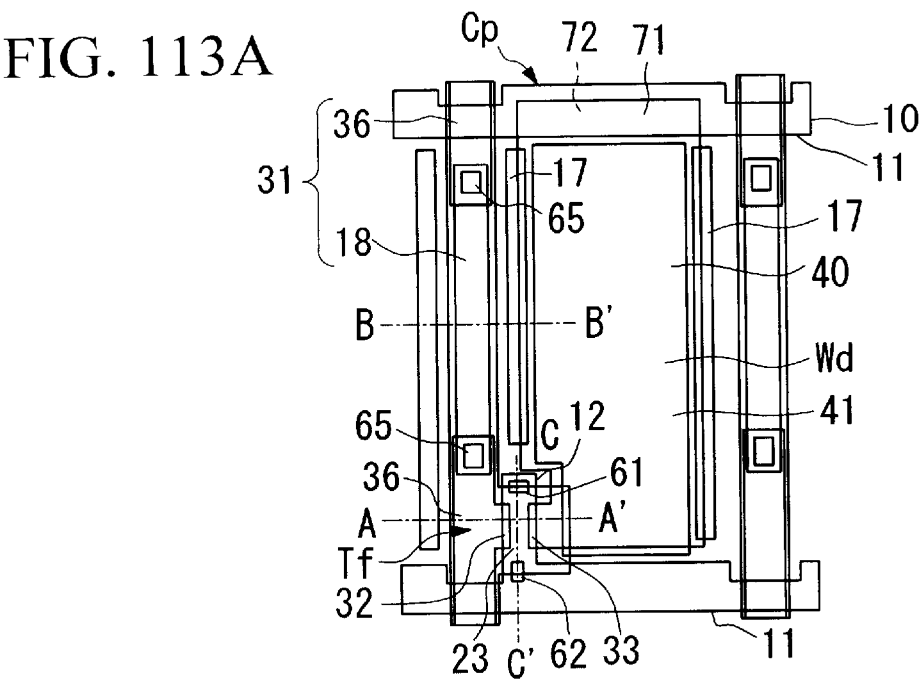
FIG. 113A is a perspective plan view of a one-pixel-region of the active matrix substrate plate in Embodiment 20.
Figure 113B:
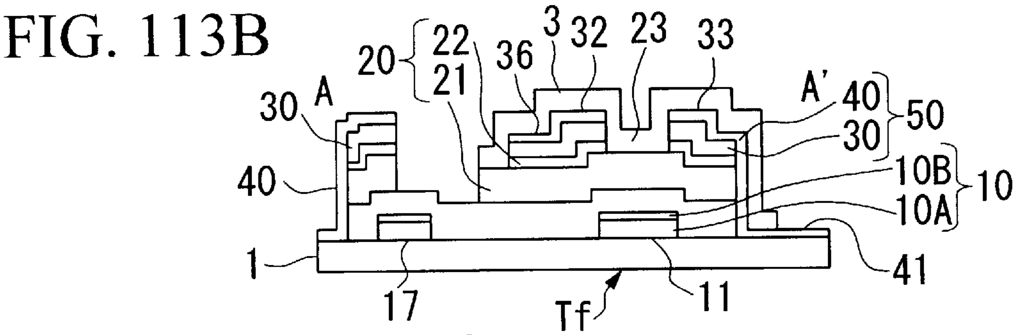
FIG. 113B is a cross sectional view through the plane A–A'.
Figure 113C:
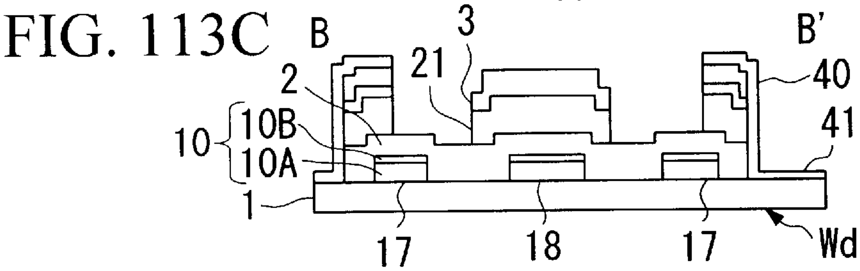
FIG. 113C is a cross sectional view through the plane B–B'.
Figure 113D:
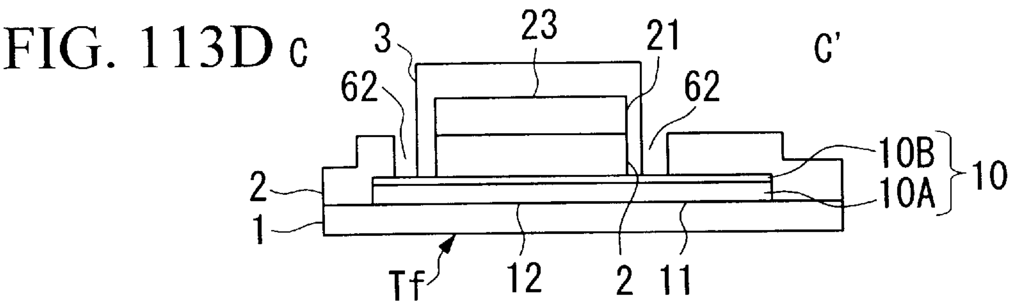
FIG. 113D is a cross section view through the plane C–C'.
Figure 114A:
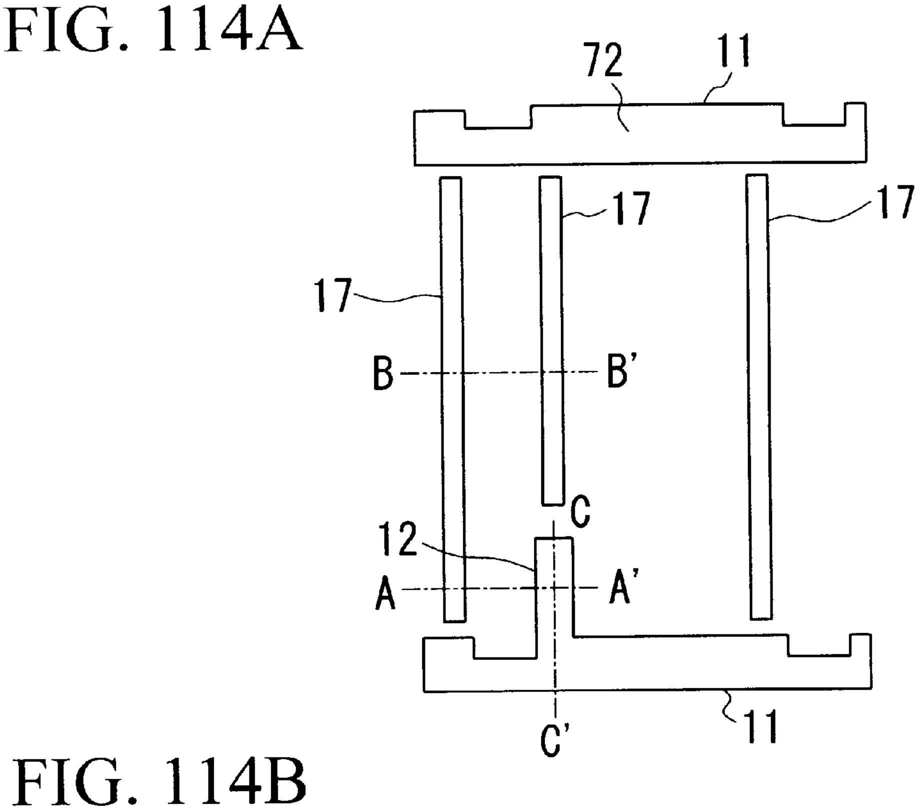
FIG. 114A is a perspective plan view of a one-pixel-region of the active matrix substrate plate in step 1 of the manufacturing process in Embodiment 20.
Figure 114B:
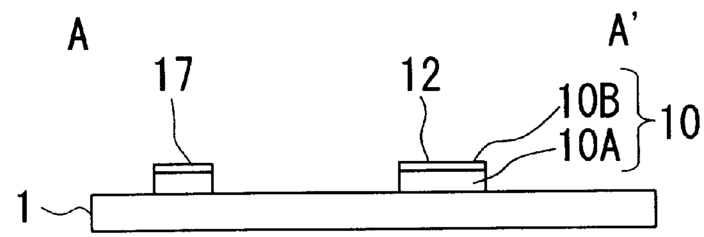
FIG. 114B is a cross sectional view through the plane A–A'.
Figure 114C:
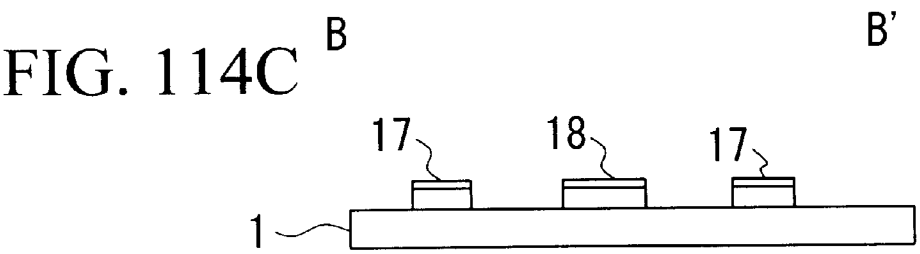
FIG. 114C is a cross sectional view through the plane B–B'.
Figure 114D:
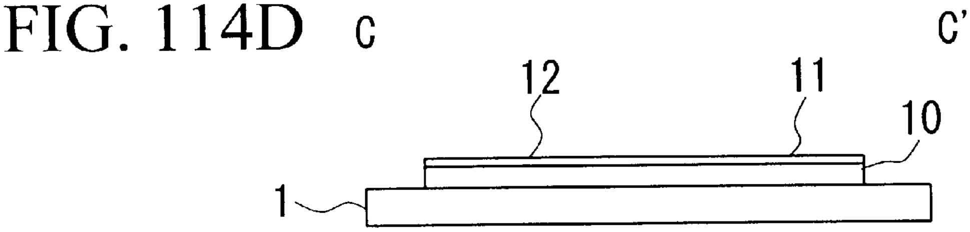
FIG. 114D is a cross section view through the plane C–C'.
Figure 115A:
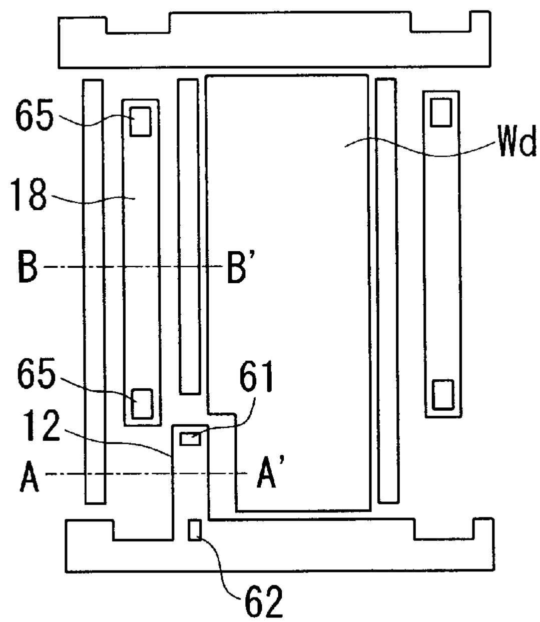
FIG. 115A is a perspective plan view of a one-pixel-region of the active matrix substrate plate in step 2 of the manufacturing process in Embodiment 20.
Figure 115B:
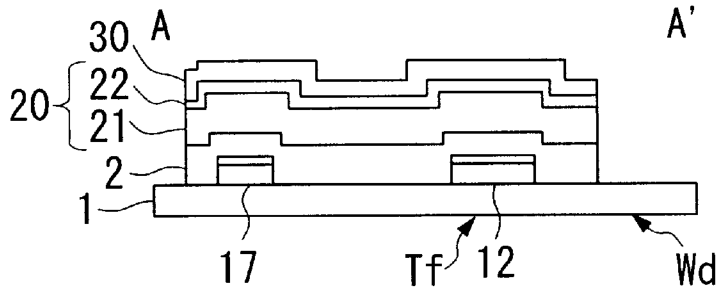
FIG. 115B is a cross sectional view through the plane A–A'.
Figure 115C:
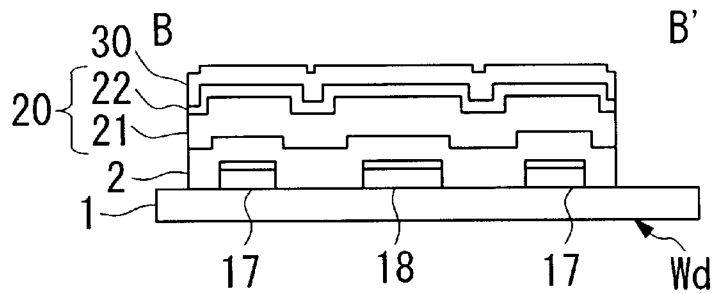
FIG. 115C is a cross sectional view through the plane B–B'.
Figure 115D:
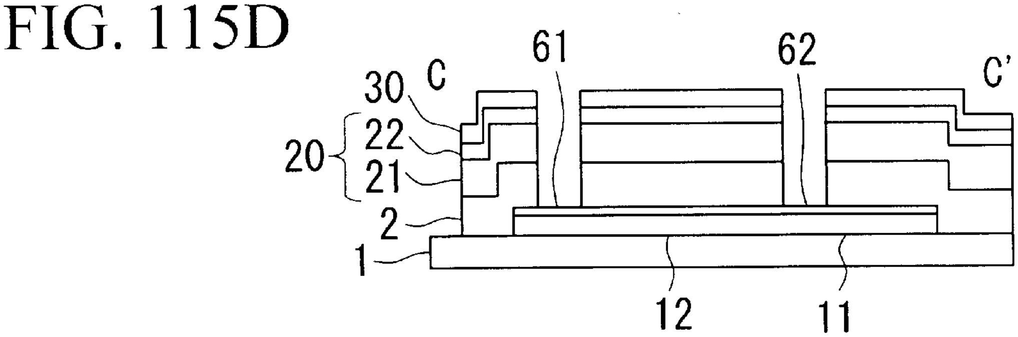
FIG. 115D is a cross section view through the plane C–C'.
Figure 116A:
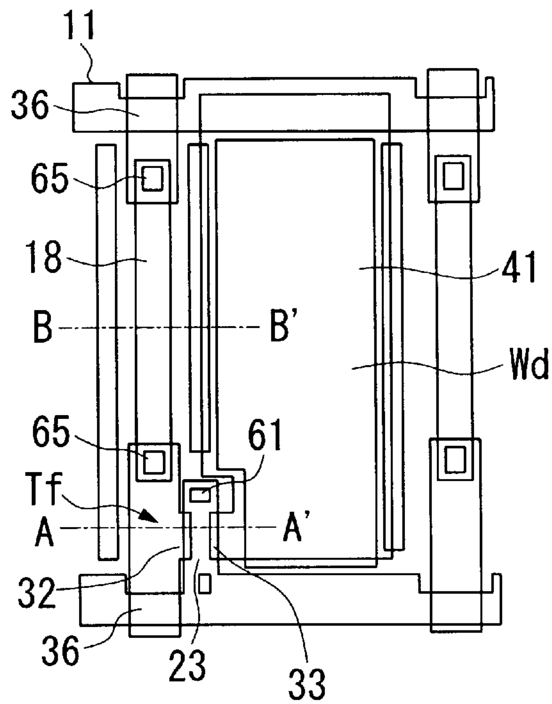
FIG. 116A is a perspective plan view of a one-pixel-region of the active matrix substrate plate in step 3 of the manufacturing process in Embodiment 20.
Figure 116B:
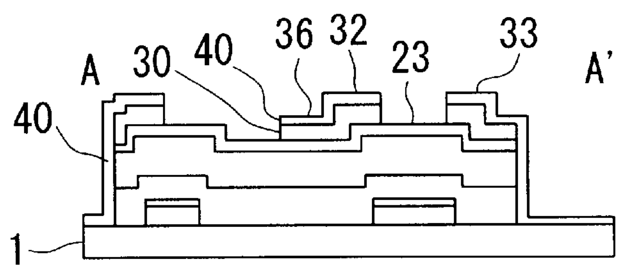
FIG. 116B is a cross sectional view through the plane A–A'.
Figure 116C:
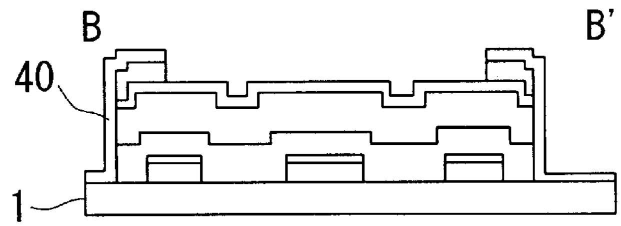
FIG. 116C is a cross sectional view through the plane B–B'.
Figure 116D:
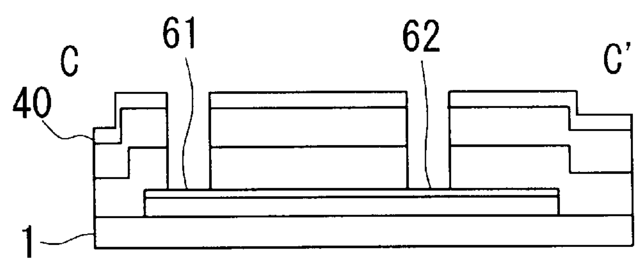
FIG. 116D is a cross section view through the plane C–C'.

FIG. 113A is a perspective plan view to show a one-pixel-region of the active matrix substrate plate in Embodiment 20, and FIG. 113B is a cross sectional view through the plane A–A', FIG. 113C is the same through the plane B–B' and FIG. 113D is the same through the plane C–C'. FIGS. 114A–117C are diagrams to show the manufacturing steps of the active matrix substrate plate, and refer to steps 1–3, and a channel-formed TFT, respectively. Similar to FIG. 113A, FIGS. 114A, 115A, and 116A are perspective plan views of a one-pixel-region, and FIGS. 114B–114D, 115A–115D, 116B–116D and FIGS. 117A–117C are cross sectional views through the planes A–A' and B–B', C–C' respectively. FIG. 118A is a cross sectional view of the terminal section of the active matrix substrate plate in the longitudinal direction, in which the left side relates to a cross sectional view at the scanning line terminal location GS, and the right side relates to the signal line terminal location DS, and FIGS. 118B–118D show manufacturing steps 1–3 for the terminal section part.

The active matrix substrate plate in Embodiment 20 is formed on a glass plate 1 such that, a plurality of scanning lines 11 comprised by the first conductor layer 10 and a plurality of signal lines 31 are arranged at right angles, and in the vicinity of the TFT section Tf formed in the intersection of the scanning line 11 and the signal line 31, the gate electrode 12 extending from the scanning line 11, a semiconductor layer 20 comprised by the island-shaped amorphous silicon layer 21 and an $n^+$ amorphous silicon layer 22 opposing the gate electrode across the gate insulation layer 2, and a pair of drain electrode 32 and source electrode 33 comprised by a second conductor layer 50 above the semiconductor layer and spaced with a gap of channel gap 23 comprise an inverted staggered structure TFT, and a pixel electrode 41 comprised by a transparent conductive layer 40 is formed in a window section Wd, for transmitting light, which is surrounded by the scanning line 11 and the signal line 31, and the drain electrode 32 is connected to the signal line 31, the source electrode 33 is connected to the pixel electrode 41 to form a TN-type active matrix substrate plate.

In this active matrix substrate plate, the signal line 31 is formed by a lower layer signal line 18 comprised by the first conductor layer 10 formed between the adjacent scanning lines 11 on the glass plate 1 so as not to contact the scanning line 11, and the upper layer signal line 36 comprised by the second conductor layer 50 whose transparent conductive layer 40 connects to the lower layer signal line 18 opposing the adjacent pixel region across the scanning line 11 through the opening section 65 punched through the metallic layer 30, the semiconductor layer 20 and the gate insulation layer 2.

The first conductor layer 10 forming the scanning line 11, the gate electrode 12, lower layer signal line 18 is formed by laminating the lower metallic layer 10A comprised by Al or an alloy of primarily Al and the upper metallic layer 10B comprised by a high melting point metal such as Ti or its nitride film.

Also, the second conductor layer 50 forming the upper layer signal line 36, drain electrode 32, and source electrode 33 is formed by laminating the transparent conductive layer 40 comprised by ITO above the metallic layer 30 comprised by Cr.

The pixel electrode 41 descends vertically to the glass plate 1 so that the transparent conductive layer 40 above the source electrode 33 covers the lateral surface of the lamination film of the gate insulation layer 2, semiconductor layer 20 and metallic layer 30, and further extends above the glass plate 1 towards the window section Wd.

Also, the lateral surface of the first conductor layer 10 formed above the glass plate 1 concurrently with the scanning line 11 is totally covered by the gate insulation layer 2. Also, a portion of both lateral surfaces of the amorphous silicon layer 21, in the direction of the extending channel gap 23 of the TFT section Tf, is covered by the protective insulation layer 3.

Here, the pixel electrode 41 forms an accumulation capacitance electrode 71 by extending to superimpose above the accumulation common electrode 72 formed inside the forestage scanning lines 11 across the gate insulation layer 2 to construct the accumulation capacitance section Cp in this pixel region. Also, in this pixel region, a light blocking layer 17 comprised by the first conductor layer 10 is formed so as to superimpose across the gate insulation layer 2 a portion on one perimeter section of the pixel electrode 41.

The active matrix substrate plate in Embodiment 20 is manufactured according to the following four steps.

(Step 1) as shown in FIGS. 114A–114D and FIG. 118B, the first conductor layer 10 is formed by continual sputtering on the glass plate 1 to form the lower metallic layer 10A comprised by Al of about 200 nm thickness and the upper metallic layer 10B comprised by a nitride film of Ti of about 100 nm thickness, and through photolithographic processes, excepting the scanning line 11, scanning line terminal section 11*a* formed in the scanning line terminal location GS, gate electrode 12 extending from the scanning line 11 to the TFT section Tf within the respective pixel regions, lower layer signal line 18 to form a part of the signal line 31 formed between the adjacent scanning lines so as not to contact the scanning line, accumulation common electrode 72 formed within the forestage scanning line 11 and the light blocking layer 17, the first conductor layer 10 is removed by etching.

(Step 2) as shown in FIGS. 115A–115D and FIG. 118C, on the above substrate plate, by continually applying plasma CVD, gate insulation layer 2 comprised by silicon nitride film of about 400 nm thickness and the semiconductor layer 20 comprised by the amorphous silicon layer 21 of about 250 nm thickness and the $n^+$ amorphous silicon layer 22 of about 50 nm thickness are deposited, and continuing, the metallic layer 30 of Cr of about 200 nm thickness is deposited by sputtering. Next, through photolithographic processes, excepting the opening section 61 formed in the longitudinal tip side above the gate electrode 12, opening section 62 formed above the scanning line 11 of the gate electrode base section, opening section 65 formed in both end sections of the lower layer signal line 18, opening section 63 formed above the scanning line terminal section 11*a*, and leaving so as to cover at least the upper surface and an entire lateral surface of the first conductor layer 10 (scanning line 11, scanning line terminal section 11*a*, gate electrode 12, lower layer signal line 18, light blocking layer 17) with the gate insulation layer 2, the metallic layer 30, semiconductor layer 20 and the gate insulation 2 are removed successively by etching. By so doing, the metallic layer 30 and semiconductor layer 20 and the gate insulation layer 2 are removed from the window section Wd to expose the glass plate 1, and the opening sections 61, 62, 63, 65 are formed to reach the first conductor layer 10.

(Step 3) as shown in FIGS. 116A–116D and FIG. 118D, by sputtering on the above substrate plate the transparent conductive layer 40 comprised by ITO of about 50 nm thickness is formed, and through photolithographic processes, excepting the connection electrode section 42 connecting to the scanning line terminal section 11*a* through the opening section 63 formed above the scanning line terminal section 11*a*, signal line terminal section 31*a* formed in the signal line terminal location DS, upper layer signal line 36 connecting to the lower layer signal line 18 through the opening section 65 punched through the metallic layer 30, semiconductor layer 20 and gate insulation layer 2, common wiring line and common wiring line terminal section (not shown), within the respective pixel regions, drain electrode 32 extending from the upper layer signal line 36 to the TFT section Tf, pixel electrode 41, and source electrode 33 extending from the pixel electrode 41 towards TFT section Tf and separated from the drain electrode 32 by the opposing channel gap 23, the transparent conductive layer 40 is removed by etching, and next, the exposed metallic layer 30 is removed by etching. In this case, the perimeter section of the pixel electrode 41 is extended so as to superimpose on the accumulation common electrode 72 at the accumulation capacitance section Cp to form the accumulation capacitance electrode 71, and both perimeter sections of the pixel electrode adjacent to this perimeter section are formed so that at least a portion will superimpose respectively on the light blocking layer 17.

Figure 117A:
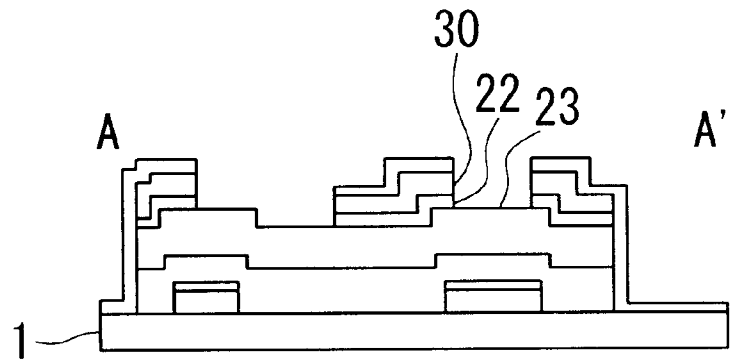
FIGS. 117A–117C are cross sectional views of a channel-formed TFT in active matrix substrate plate manufacturing in Embodiment 20.
Figure 117B:
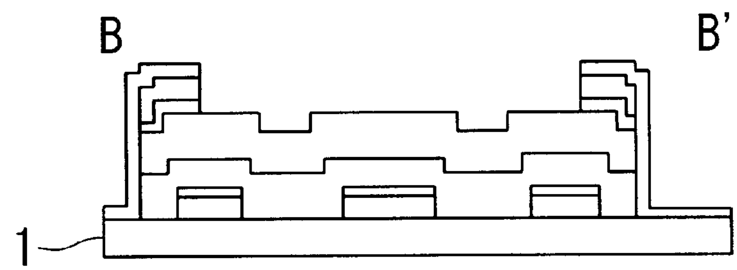
Figure 117C:
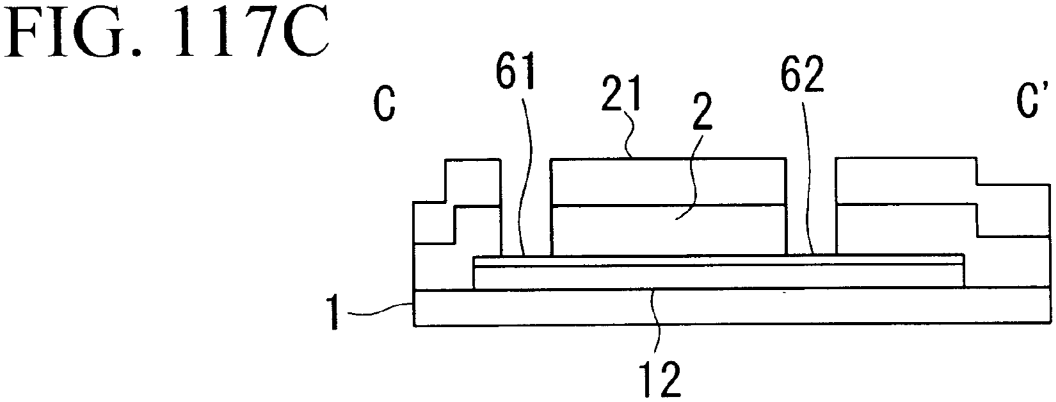
Figures 118A, 118B, 118C, 118D:
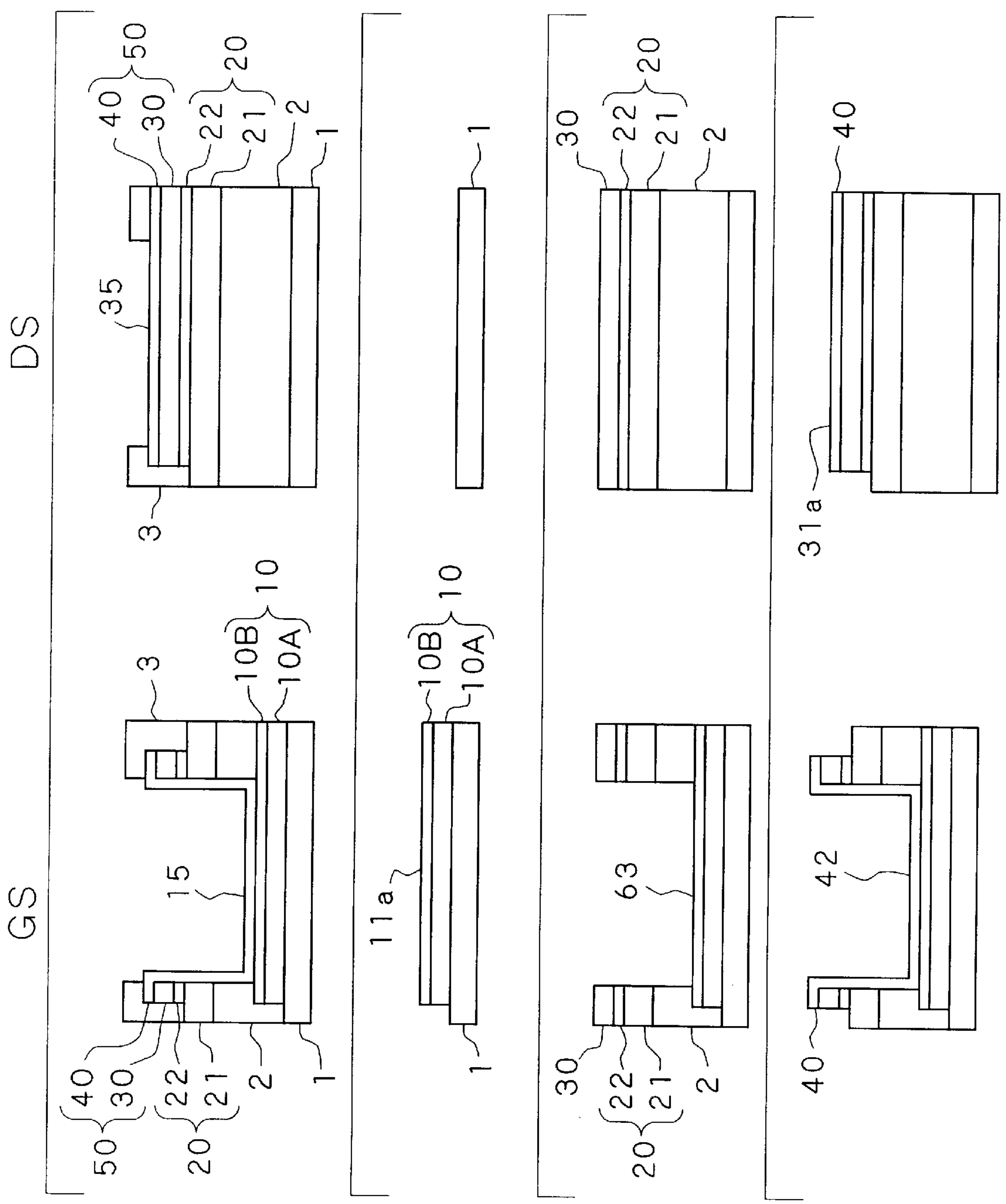
FIG. 118A is a cross sectional view in the longitudinal direction of a terminal section of the active matrix substrate plate in Embodiment 20, and the left side relates to the scanning line terminal section and the right side relates to the signal line terminal section.
FIGS. 118B–118D are cross sectional views relating to manufacturing step 1–step 3, respectively.

Next, as shown in FIGS. 117A–117C, using the masking pattern used in the etching process or the transparent conductive layer 40 after removing its masking, the exposed $n^+$ amorphous silicon layer 22 is removed by etching. By so doing, channel gap 23 is formed and in the direction of the extending channel gap, the amorphous silicon layer 21 is exposed beyond the opening sections 61, 62.

(Step 4) as shown in FIGS. 113A–113D and FIG. 118A, on the above substrate plate the protective insulation layer 3 of about 150 nm thickness comprised by silicon nitride film is deposited using plasma CVD process, and through photolithographic processes, excepting the connection electrode section 42 above the pixel electrode 41 and scanning line terminal section 11*a* and the protective insulation layer 3 above the signal line terminal section 31*a* and common wiring line terminal section (not shown), and leaving so as to cover at least the upper surface and an entire lateral surface of the upper layer signal line 36 with the protective insulation layer 3 and so as to form the semiconductor layer of the TFT section Tf, the protective insulation layer 3 and amorphous silicon layer 21 are removed successively by etching. At this time, the opening sections 61, 62 and the perimeter section of the protective insulation layer 3 are intersected and leaving the protective insulation layer 3 of the TFT section Tf in such a way that the perimeter section of the protective insulation layer descends to cover a portion of the lateral surface of the amorphous silicon layer 21 on the channel gap 23 side exposed at the opening sections 61, 62, the outer protective insulation layer and the amorphous silicon layer are removed by etching. By so doing, the pixel electrode 41 comprised by the transparent conductive layer 40, signal line terminal 35 and the common wiring terminal (not shown) comprised by a lamination of the metallic layer 30 and the transparent conductive layer 40, and, above the first conductor layer 10, the scanning line terminal 15 laminated with the transparent conductive layer 40 through the opening section 63 punched through the metallic layer 30 and semiconductor layer 20 and gate insulation layer 2 are exposed. Lastly, the active matrix substrate plate is completed by performing annealing at about 280° C.

In this case, a lamination of a nitride film of Al and Ti is used for the first conductor layer, but the first layer may be a three layer structure formed by laying an underlayer of a high melting point metal such as Ti below the Al layer, to form Ti, Al and Ti nitride layers, or single film layer of Cr may be used.

Also, in the present embodiment, the vertical-type TFT in which the gate electrode extends from the scanning line to the pixel section, but the lateral-type TFT may be used, in which the gate electrode shares a portion of the scanning lines.

Productivity and the yield of the TN-type active matrix substrate plate in Embodiment 20 are improved because it can be manufactured in four steps.

Also, in this active matrix substrate plate, the lower layer signal line serving as a portion of the signal line is formed in a different layer than the pixel electrode, shorting between the signal line and pixel electrode can be prevented, and the yield can be improved.

Effects of preventing infiltration corrosion of the circuit elements such as the scanning lines when etching the metallic layer of the signal lines or the transparent conductive layer, effects of protection from static charges, improvement in reliability of TFT, lowering of resistance of scanning and signal lines, and improving the dielectric strength of insulation or aperture factor are exactly the same as those in Embodiment 18.

Embodiment 21

Figure 119A:
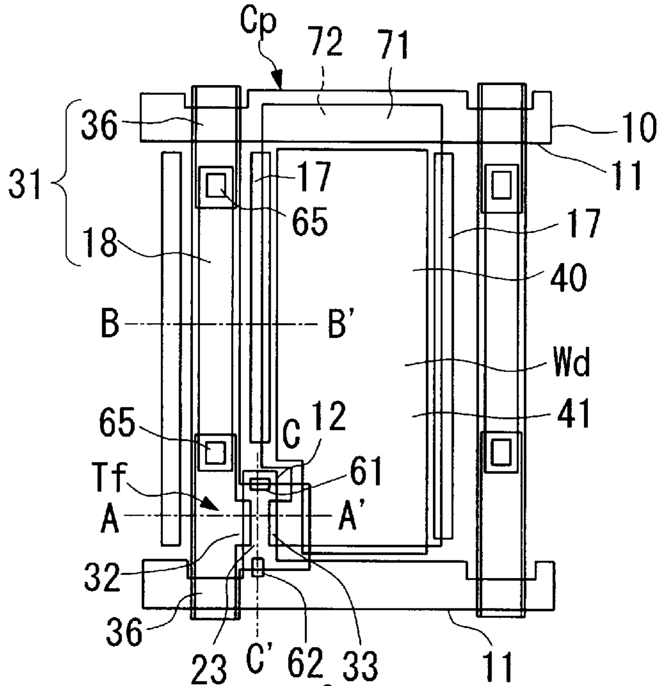
FIG. 119A is a perspective plan view of a one-pixel-region of the active matrix substrate plate in Embodiment 21.
Figure 119B:
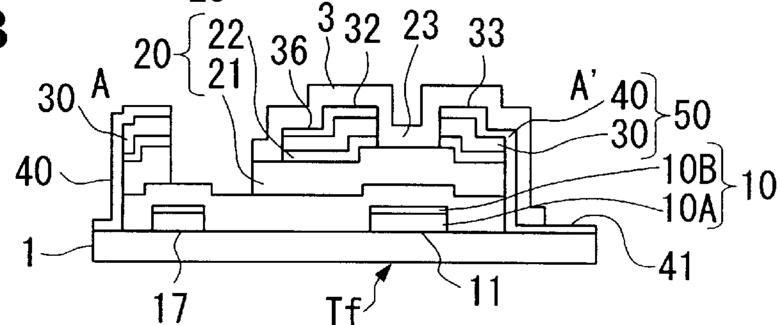
FIG. 119B is a cross sectional view through the plane A–A'.
Figure 119C:
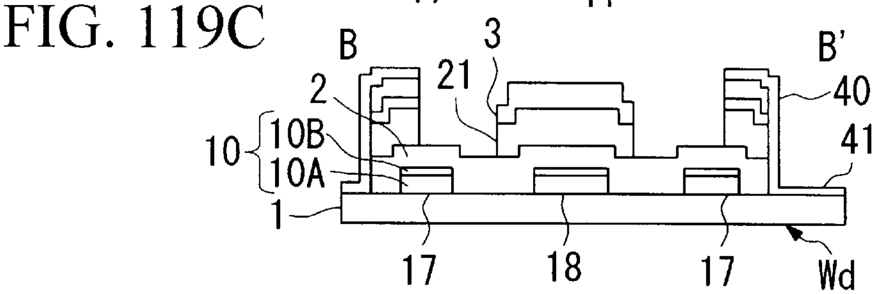
FIG. 119C is a cross sectional view through the plane B–B'.
Figure 119D:
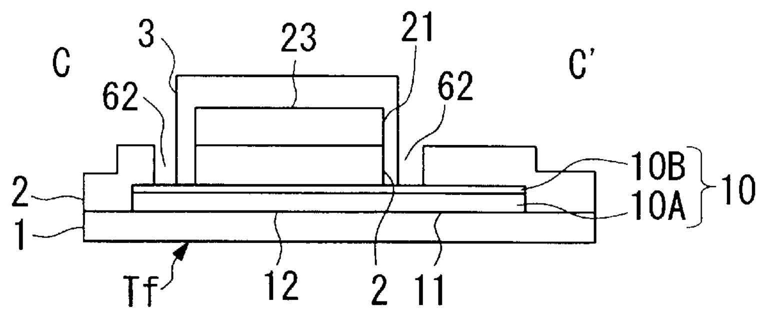
FIG. 119D is a cross section view through the plane C–C'.
Figure 120A:
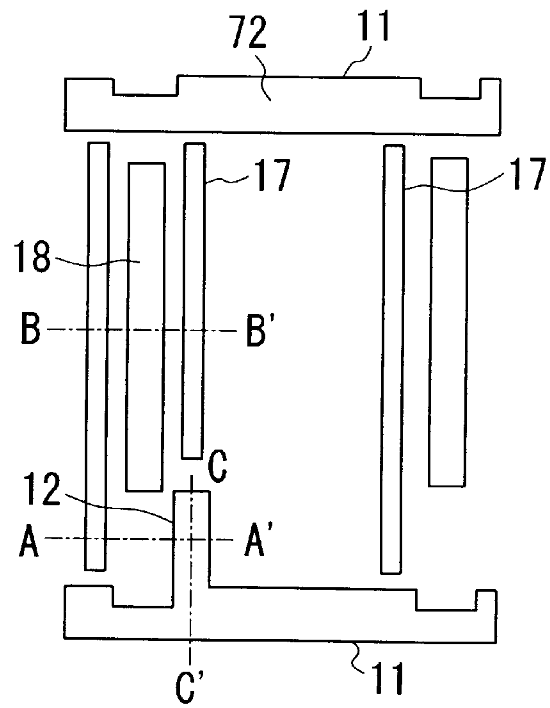
Figure 120B:
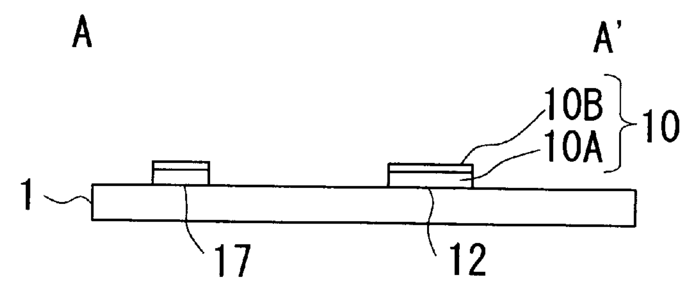
Figure 120C:
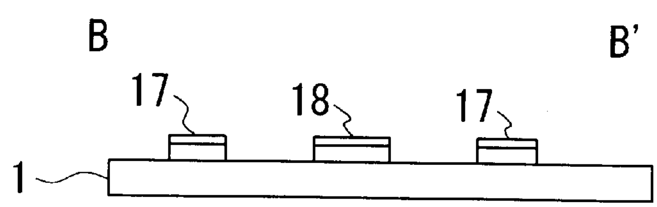
Figure 120D:
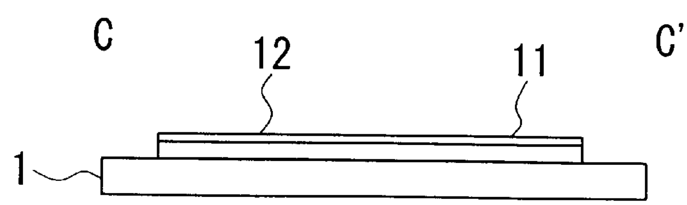
Figure 121A:
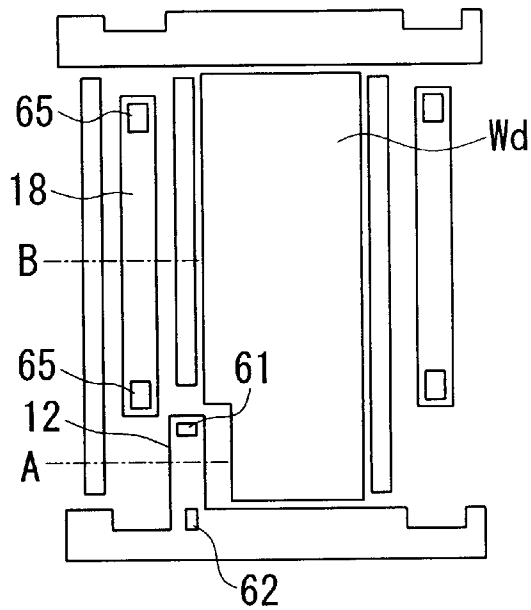
Figure 121B:
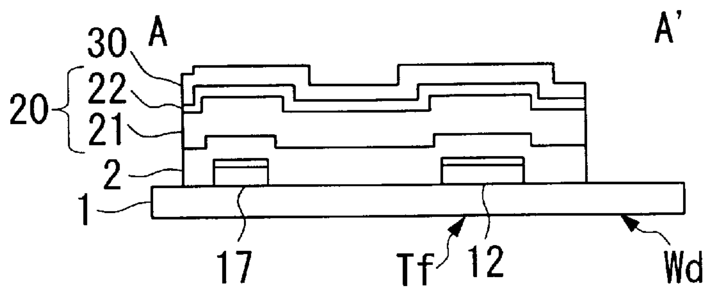
Figure 121C:
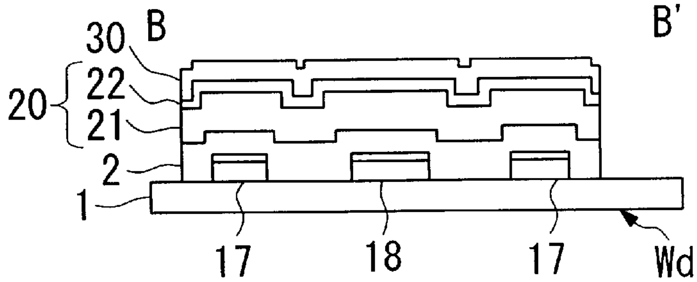
Figure 121D:
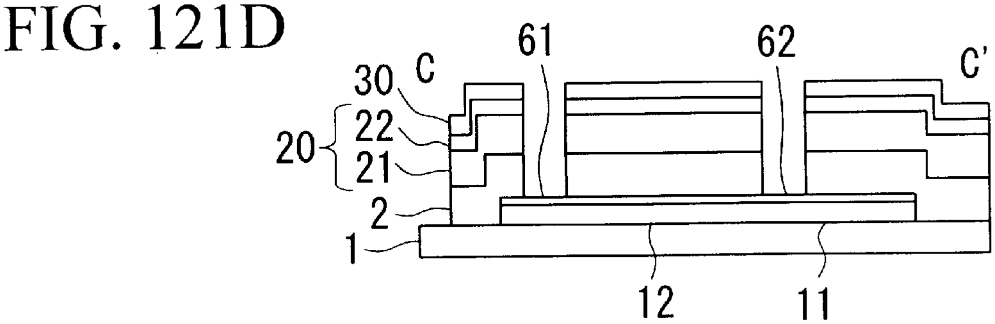
Figure 122A:
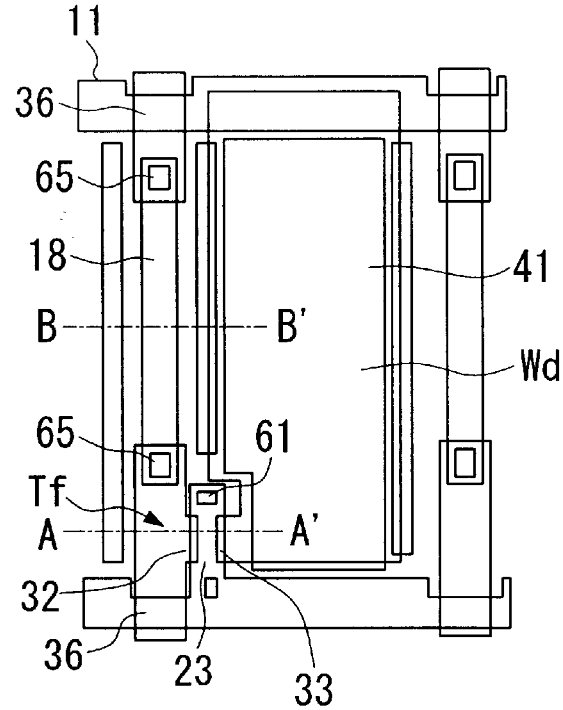
Figure 122B:
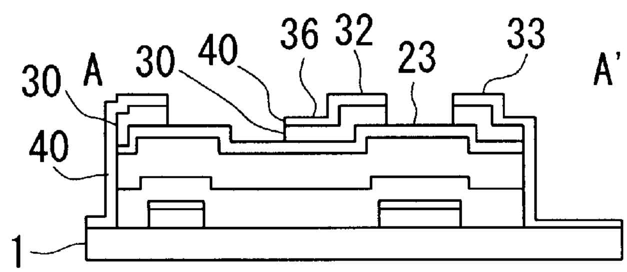
Figure 122C:
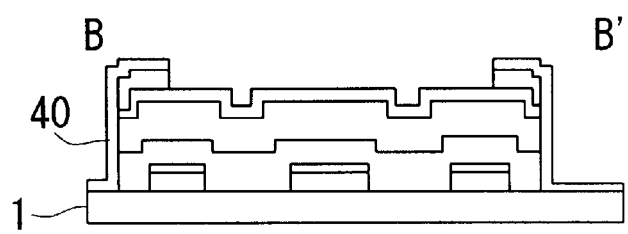
Figure 122D:
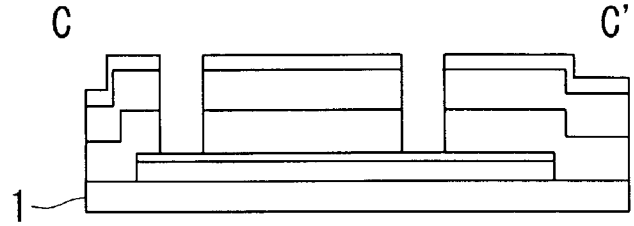

FIG. 119A is a perspective plan view to show a one-pixel-region of the active matrix substrate plate in Embodiment 21, and FIG. 119B is a cross sectional view through the plane A–A', FIG. 119C is the same through the plane B–B' and FIG. 119D is the same through the plane C–C'. FIGS. 120A–123C are diagrams to show the manufacturing steps of the active matrix substrate plate, and refer to steps 1–3, and a channel-formed TFT, respectively. Similar to FIG. 119A, FIGS. 120A, 121A, and 122A are perspective plan views of a one-pixel-region, and FIGS. 120B–120D, 121B–121D, 122B–122D and FIGS. 123A–123C are cross sectional views through the planes A–A' and B–B', C–C' respectively. FIG. 124A is a cross sectional view of the terminal section of the active matrix substrate plate in the longitudinal direction, in which the left side relates to a cross sectional view at the scanning line terminal location GS, and the right side relates to the signal line terminal location DS, and FIGS. 124B–124D show manufacturing steps 1–3 for the terminal section part.

The active matrix substrate plate in Embodiment 21 is formed on a glass plate 1 such that, a plurality of scanning lines 11 comprised by the first conductor layer 10 and a plurality of signal lines 31 are arranged at right angles, and in the vicinity of the TFT section Tf formed in the intersection of the scanning line 11 and the signal line 31, the gate electrode 12 extending from the scanning line 11, a semiconductor layer 20 comprised by the island-shaped amorphous silicon layer 21 and an $n^+$ amorphous silicon layer 22 opposing the gate electrode across the gate insulation layer 2, and a pair of drain electrode 32 and source electrode 33 comprised by a second conductor layer 50 above the semiconductor layer and spaced with a gap of channel gap 23 comprise an inverted staggered structure TFT, and a pixel electrode 41 comprised by a transparent conductive layer 40 is formed in a window section Wd, for transmitting light, which is surrounded by the scanning line 11 and the signal line 31, and the drain electrode 32 is connected to the signal line 31, the source electrode 33 is connected to the pixel electrode 41 to form a TN-type active matrix substrate plate.

In this active matrix substrate plate, the signal line 31 is formed by a lower layer signal line 18 comprised by the first conductor layer 10 formed between the adjacent scanning lines 11 on the glass plate 1 so as not to contact the scanning line 11, and the upper layer signal line 36 comprised by the second conductor layer 50 whose transparent conductive layer 40 connects to the lower layer signal line 18 opposing the adjacent pixel region across the scanning line 11, through the opening section 65 punched through the metallic layer 30 the semiconductor layer 20 and the gate insulation layer 2.

The first conductor layer 10 forming the scanning line 11, the gate electrode 12, lower layer signal line 18 is formed by laminating the lower metallic layer 10A comprised by Al or an alloy of primarily Al and the upper metallic layer 10B comprised by a high melting point metal such as Ti or its nitride film.

Also, the second conductor layer 50 forming the upper layer signal line 36, drain electrode 32, and source electrode 33 is formed by laminating the transparent conductive layer 40 comprised by ITO above the metallic layer 30 comprised by Cr.

The pixel electrode 41 descends vertically to the glass plate 1 so that the transparent conductive layer 40 above the source electrode 33 covers the lateral surface of the lamination film of the gate insulation layer 2, semiconductor layer 20 and metallic layer 30, and further extends above the glass plate 1 towards the window section Wd.

Also, the lateral surface of the first conductor layer 10 formed above the glass plate 1 concurrently with the scanning line 11 is totally covered by the gate insulation layer 2. Also, a portion of both lateral surfaces of the amorphous silicon layer 21, in the direction of the extending channel gap 23 of the TFT section Tf, is covered by the protective insulation layer 3.

Here, the pixel electrode 41 forms an accumulation capacitance electrode 71 by extending to superimpose above the accumulation common electrode 72 formed inside the forestage scanning lines 11 across the gate insulation layer 2 to construct the accumulation capacitance section Cp in this pixel region. Also, in this pixel region, a light blocking layer 17 comprised by the first conductor layer 10 is formed so as to superimpose across the gate insulation layer 2 a portion on one perimeter section of the pixel electrode 41.

The active matrix substrate plate in Embodiment 21 is manufactured according to the following four steps.

(Step 1) as shown in FIGS. 120A–120D and FIG. 124B, the first conductor layer 10 is formed by continual sputtering on the glass plate 1 to form the lower metallic layer 10A comprised by Al of about 200 nm thickness and the upper metallic layer 10B comprised by a nitride film of Ti of about 100 nm thickness, and through photolithographic processes, excepting the scanning line 11, scanning line terminal section 11*a* formed in the scanning line terminal location GS, gate electrode 12 extending from the scanning line 11 to the TFT section Tf within the respective pixel regions, lower layer signal line 18 to form a part of the signal line 31 formed between the adjacent scanning lines so as not to contact the scanning line, accumulation common electrode 72 formed within the forestage scanning line 11 and the light blocking layer 17, the first conductor layer 10 is removed by etching.

(Step 2) as shown in FIGS. 121A–121D and FIG. 124C, on the above substrate plate, by continually applying plasma CVD, gate insulation layer 2 comprised by silicon nitride film of about 400 nm thickness and the semiconductor layer 20 comprised by the amorphous silicon layer 21 of about 250 nm thickness and the $n^+$ amorphous silicon layer 22 of about 50 nm thickness are deposited, and continuing, the metallic layer 30 of Cr of about 200 nm thickness is deposited by sputtering. Next, through photolithographic processes, excepting the opening section 61 formed in the longitudinal tip side above the gate electrode 12, opening section 62 formed above the scanning line 11 of the gate electrode base section, opening section 65 formed in both end sections of the lower layer signal line 18, opening section 63 formed above the scanning line end section 11*b*, and leaving so as to cover at least the upper surface and an entire lateral surface of the first conductor layer 10 (scanning line 11, gate electrode 12, lower layer signal line 18, light blocking layer 17) with the gate insulation layer 2, the metallic layer 30, semiconductor layer 20 and the gate insulation 2 are removed successively by etching. By so doing, the metallic layer 30 and semiconductor layer 20 and the gate insulation layer 2 are removed from the window section Wd to expose the glass plate 1, and the opening sections 61, 62, 63, 65 are formed to reach the first conductor layer 10.

(Step 3) as shown in FIGS. 122A–122D and FIG. 124D, by sputtering on the above substrate plate the transparent conductive layer 40 comprised by ITO of about 50 nm thickness is formed, and through photolithographic processes, excepting the connection electrode section 42 connecting to the scanning line end section 11*b* through the opening section 63 formed above the scanning line end section 11*b*, scanning line terminal section 11*a* extending from the connection electrode section at the scanning line terminal location GS across the metallic layer 30, signal line terminal section 31*a* formed in the signal line terminal location DS, upper layer signal line 36 connecting to the lower layer signal line 18 through the opening section 65 punched through the metallic layer 30, semiconductor layer 20 and gate insulation layer 2, common wiring line and common wiring line terminal section (not shown), within the respective pixel regions, drain electrode 32 extending from the upper layer signal line 36 to the TFT section Tf, pixel electrode 41, and source electrode 33 extending from the pixel electrode 41 towards TFT section Tf and separated from the drain electrode 32 by the opposing channel gap 23, the transparent conductive layer 40 is removed by etching, and next, the exposed metallic layer 30 is removed by etching. In this case, the perimeter section of the pixel electrode 41 is extended so as to superimpose on the accumulation common electrode 72 at the accumulation capacitance section Cp to form the accumulation capacitance electrode 71, and both perimeter sections of the pixel electrode adjacent to this perimeter section are formed so that at least a portion will superimpose respectively on the light blocking layer 17.

Figure 123A:
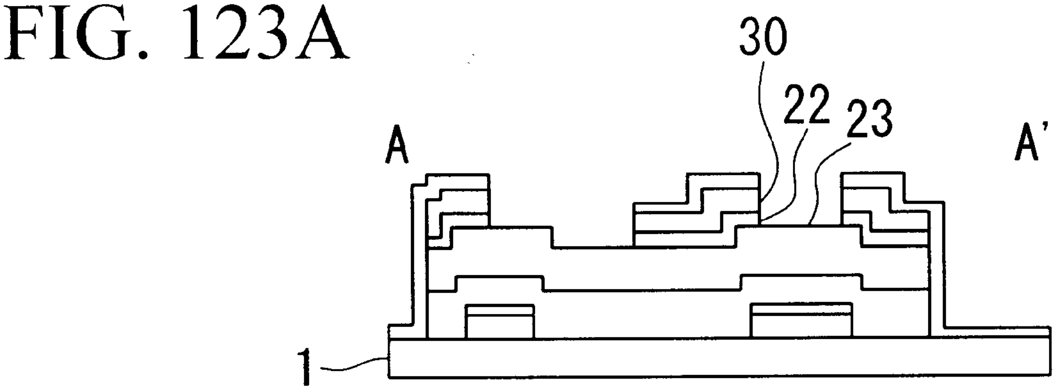
Figure 123B:
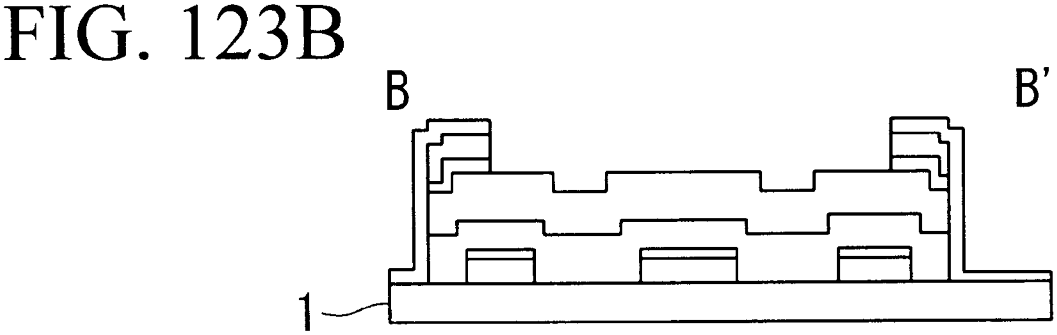
Figure 123C:
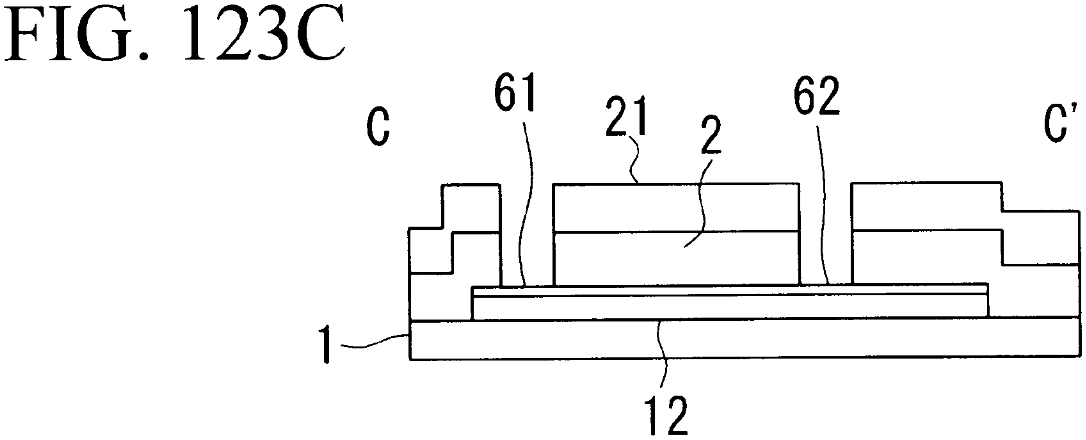
Figures 124A, 124B, 124C, 124D:
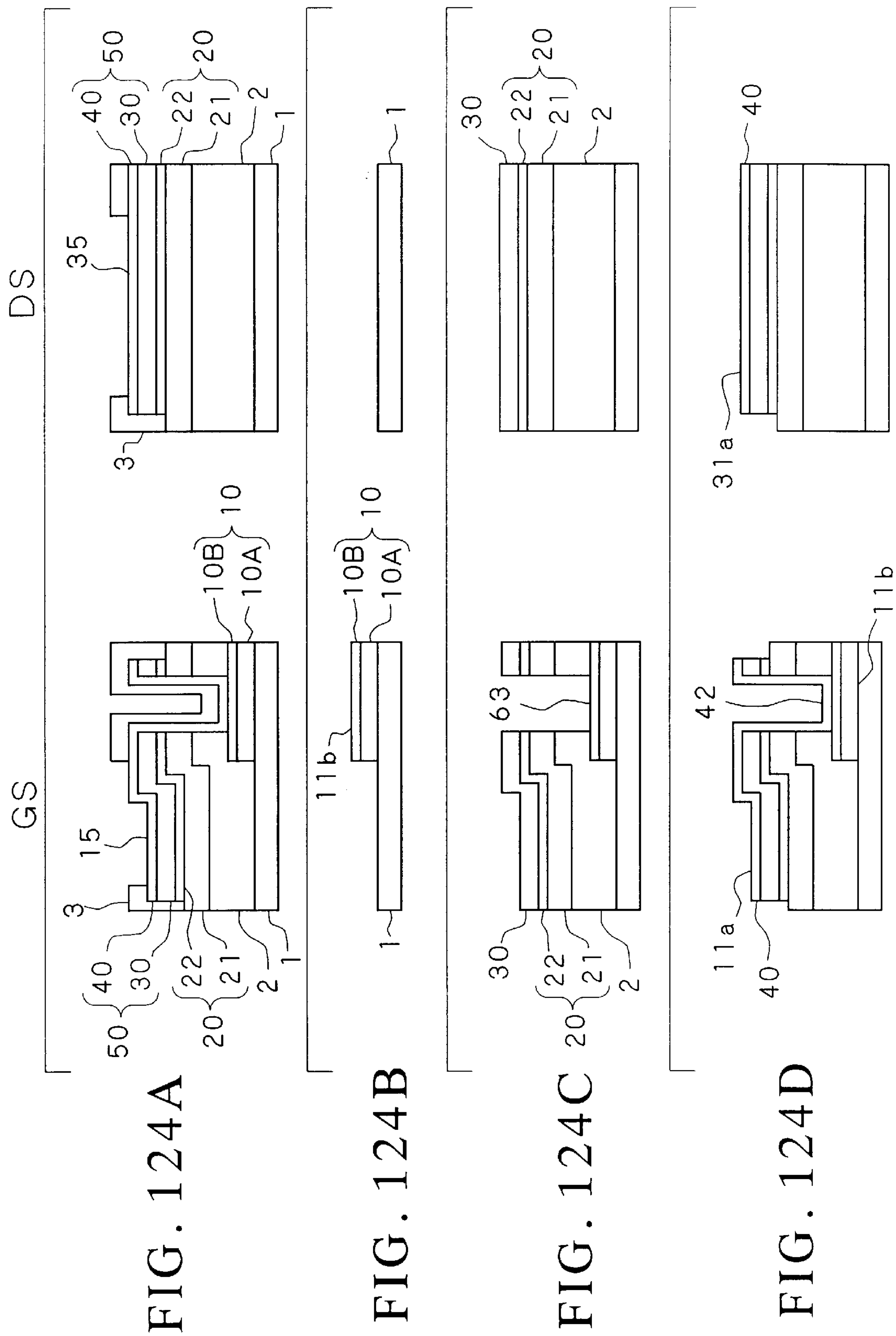

Next, as shown in FIGS. 123A–123C, using the masking pattern used in the etching process or the transparent conductive layer 40 after removing its masking, the exposed $n^+$ amorphous silicon layer 22 is removed by etching. By so doing, channel gap 23 is formed and in the direction of the extending channel gap, the amorphous silicon layer 21 is exposed beyond the opening sections 61, 62.

(Step 4) as shown in FIGS. 119A–119D and FIG. 123A, on the above substrate plate the protective insulation layer 3 of about 150 nm thickness comprised by silicon nitride film is deposited using plasma CVD process, and through photolithographic processes, excepting the protective insulation layer 3 above the pixel electrode 41 and scanning line terminal section 11*a* and the signal line terminal section 31*a* and common wiring line terminal section (not shown), and leaving so as to cover at least the upper surface and an entire lateral surface of the upper layer signal line 36 with the protective insulation layer 3 and so as to form the semiconductor layer of the TFT section Tf, the protective insulation layer 3 and amorphous silicon layer 21 are removed successively by etching. At this time, the opening sections 61, 62 and the perimeter section of the protective insulation layer 3 are intersected, and leaving the protective insulation layer 3 of the TFT section Tf in such a way that the perimeter section of the protective insulation layer descends to cover a portion of the lateral surface of the amorphous silicon layer 21 on the channel gap 23 side exposed at the opening sections 61, 62, the outer protective insulation layer and the amorphous silicon layer are removed by etching. By so doing, the pixel electrode 41 comprised by the transparent conductive layer 40, the scanning line terminal 15 and the signal line terminal 35 and the common wiring terminal (not shown) comprised by a lamination of the metallic layer 30 and the transparent conductive layer 40 are exposed. Lastly, the active matrix substrate plate is completed by performing annealing at about 280° C.

In this case, a lamination of a nitride film of Al and Ti is used for the first conductor layer, but the first layer may be a three layer structure formed by laying an underlayer of a high melting point metal such as Ti below the Al layer, to form Ti, Al and Ti nitride layers, or single film layer of Cr or Mo may be used.

Also, in the present embodiment, the vertical-type TFT in which the gate electrode extends from the scanning line to the pixel section, but the lateral-type TFT may be used, in which the gate electrode shares a portion of the scanning lines.

Productivity and the yield of the TN-type active matrix substrate plate in Embodiment 21 are improved because it can be manufactured in four steps.

Also, in this active matrix substrate plate, the lower layer signal line serving as a portion of the signal line is formed in a different layer than the pixel electrode, shorting between the signal line and pixel electrode can be prevented, and the yield can be improved.

Effects of preventing infiltration corrosion of the circuit elements such as the scanning lines when etching the metallic layer of the signal lines or the transparent conductive layer, effects of protection from static charges, improvement in reliability of TFT, lowering of resistance of scanning and signal lines, and improving the dielectric strength of insulation or aperture factor are exactly the same as those in Embodiment 18.

Embodiment 22

Figures 125A, 125B, 125C, 125D:
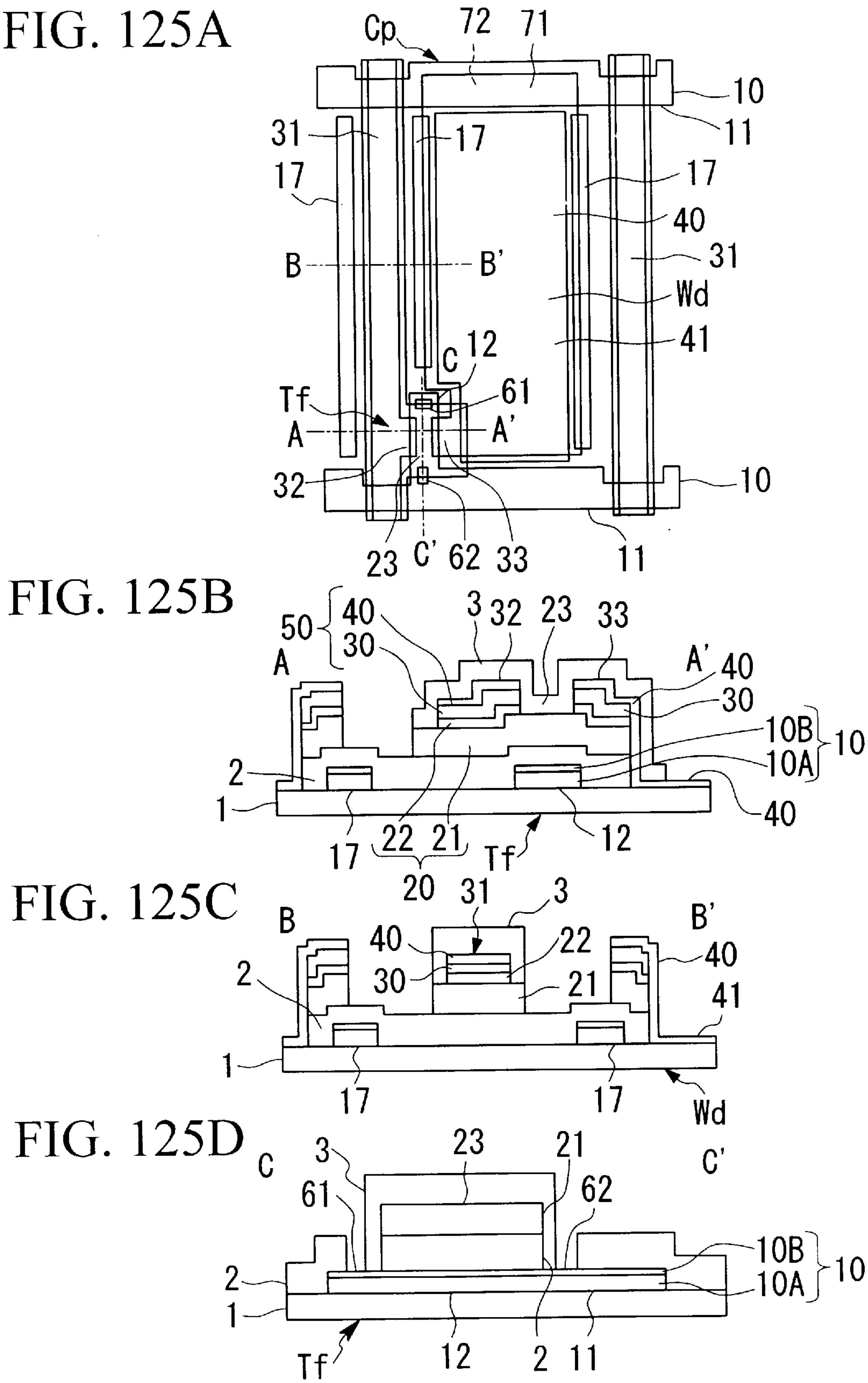
Figure 126A:
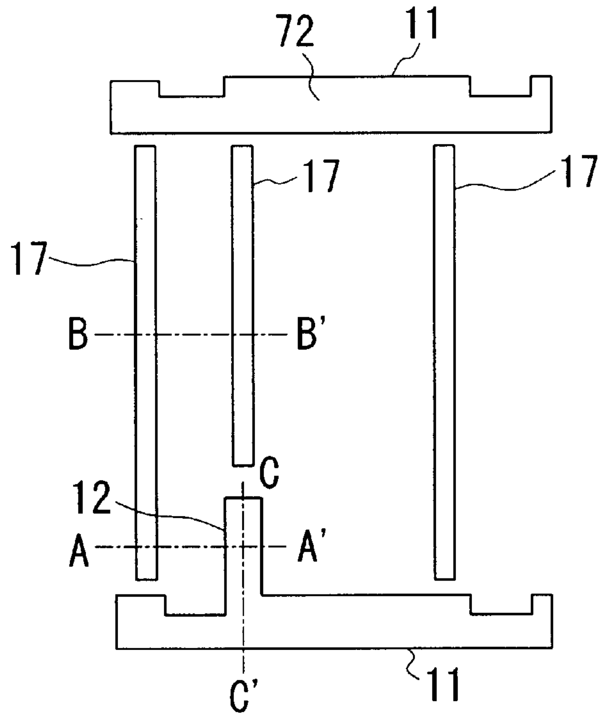
Figure 126B:
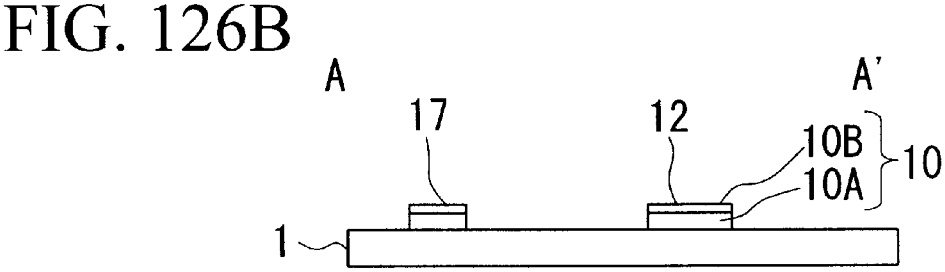
Figure 126C:
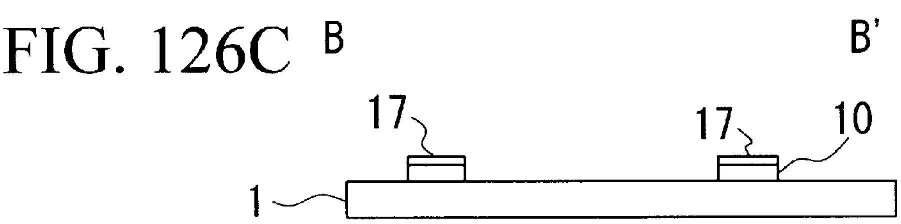
Figure 126D:
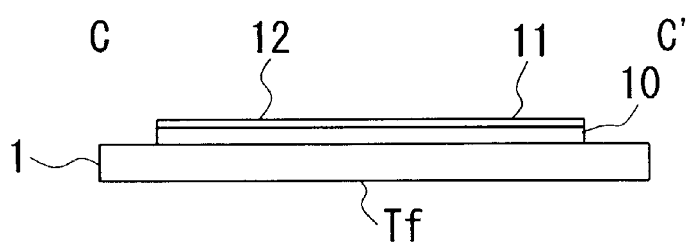
Figure 127A:
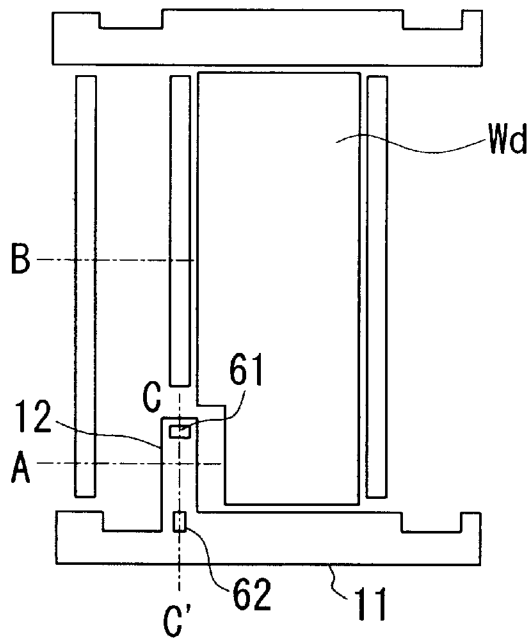
Figure 127B:
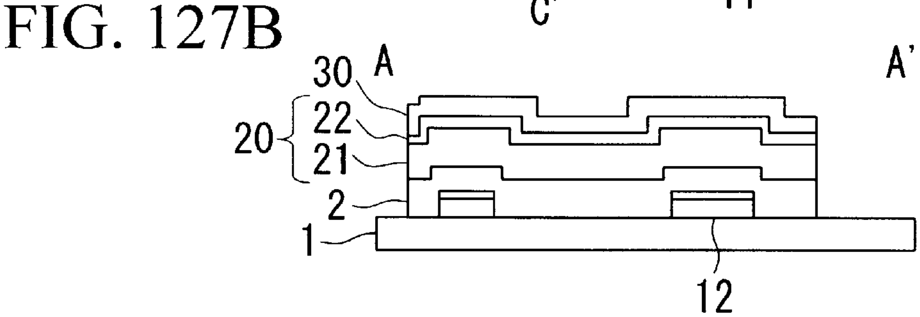
Figure 127C:
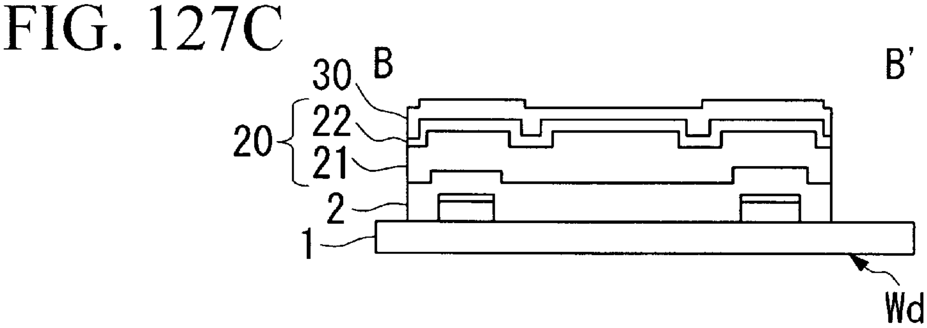
Figure 127D:
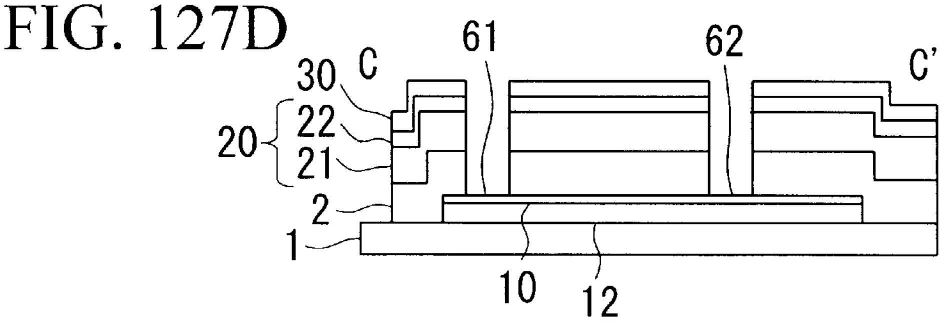
Figure 128A:
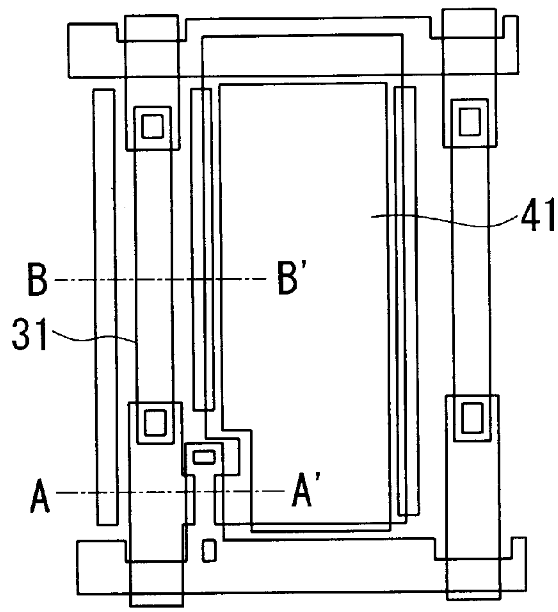
Figure 128B:
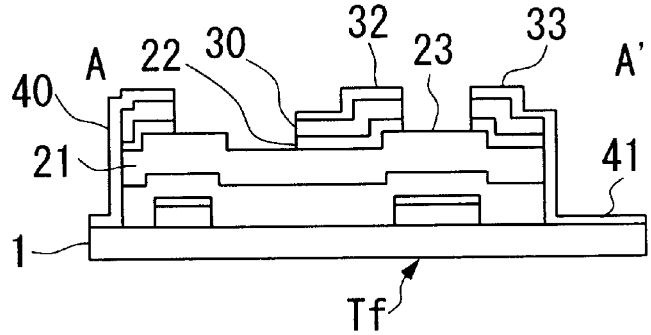
Figure 128C:
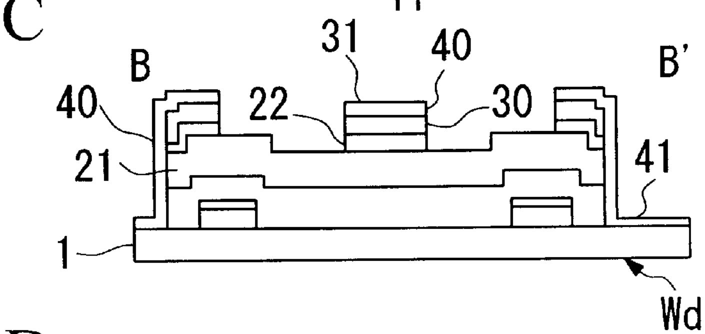
Figure 128D:
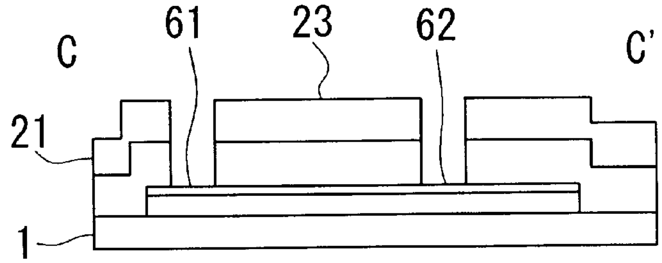
Figure 129A:
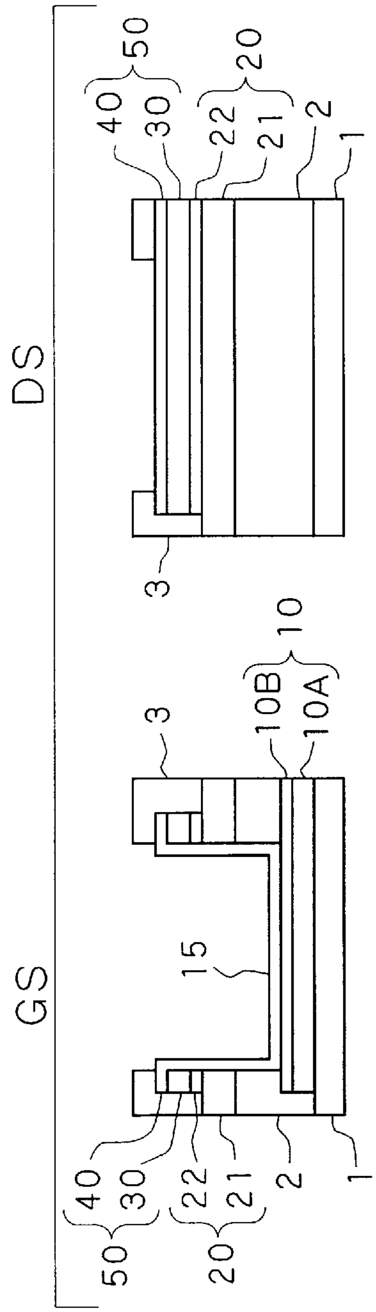
Figure 129B:
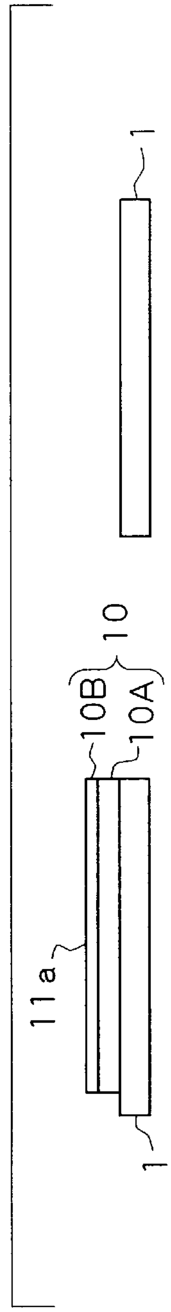
Figure 129C:
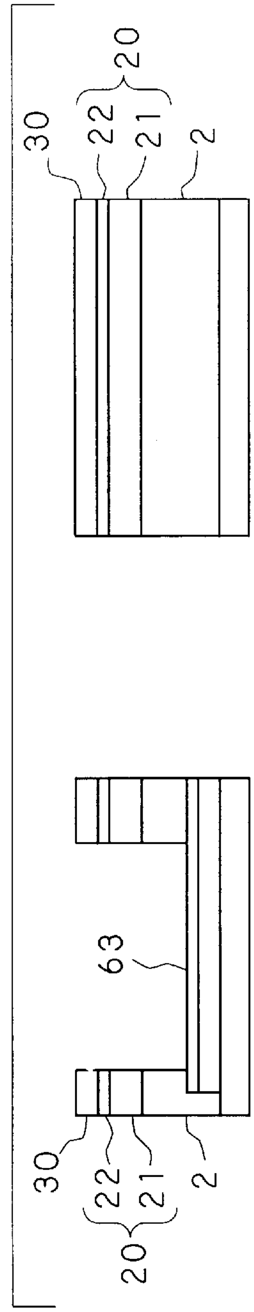
Figure 129D:
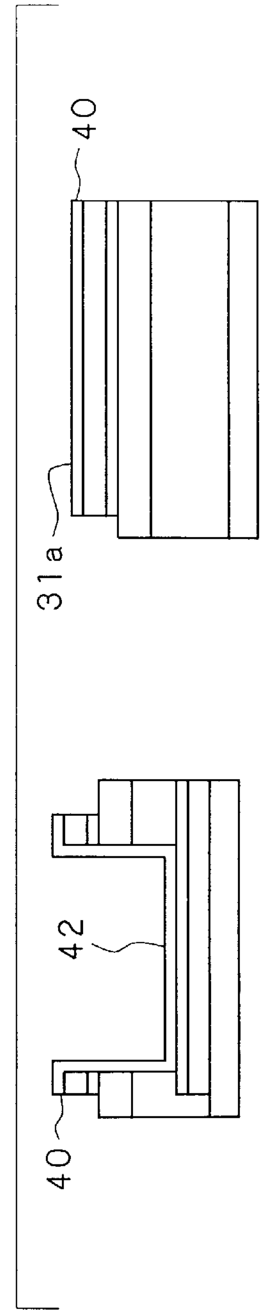

FIG. 125A is a perspective plan view to show a one-pixel-region of the active matrix substrate plate in Embodiment 22, and FIG. 125B is a cross sectional view through the plane A–A', FIG. 125C is the same through the plane B–B' and FIG. 125D is the same through the plane C–C'. FIGS. 126A–128D are diagrams to show the manufacturing steps of the active matrix substrate plate, and refer to steps 1–3, and a channel-formed TFT, respectively. Similar to FIG. 125A, FIGS. 126A, 127A, and 128A are perspective plan views of a one-pixel-region, and FIGS. 126B–126D, 127B–127D, 128B–128D are cross sectional views through the planes A–A' and B–B', C–C' respectively. FIG. 129A is a cross sectional view of the terminal section of the active matrix substrate plate in the longitudinal direction, in which the left side relates to a cross sectional view at the scanning line terminal location GS, and the right side relates to the signal line terminal location DS, and FIGS. 129B–129D show manufacturing steps 1–3 for the terminal section part.

The active matrix substrate plate in Embodiment 22 is formed on a glass plate 1, such that a plurality of scanning lines 11 comprised by the first conductor layer 10 and a plurality of signal lines 31 comprised by the second conductor layer 50 are arranged at right angles across the gate insulation layer 2, and in the vicinity of the TFT section Tf formed in the intersection of the scanning line 11 and the signal line 31, the gate electrode 12 extending from the scanning line 11, a semiconductor layer 20 comprised by the island-shaped amorphous silicon layer 21 and an $n^+$ amorphous silicon layer 22 opposing the gate electrode across the gate insulation layer 2, and a pair of drain electrode 32 and source electrode 33 comprised by a second conductor layer 50 above the semiconductor layer and spaced with a gap of channel gap 23 comprise an inverted staggered structure TFT, and a pixel electrode 41 comprised by a transparent conductive layer 40 is formed in a window section Wd, for transmitting light, which is surrounded by the scanning line 11 and the signal line 31, and the drain electrode 32 is connected to the signal line 31, the source electrode 33 is connected to the pixel electrode 41 to form a TN-type active matrix substrate plate.

As in Embodiment 18, in this active matrix substrate plate, the first conductor layer 10 forming the scanning line 11 and the gate electrode 12 is produced by laminating a lower metallic layer 10A comprised by Al or an alloy of primarily Al and an upper metallic layer 10B comprised by a high melting point metal such as Ti, Ta, Nb, Cr or their alloy or their nitride film. Also, the second conductor layer 50 forming the signal line 31, drain electrode 32, and source electrode 33 is formed by laminating the transparent conductive layer 40 comprised by ITO above the metallic layer 30 comprised by Cr.

The pixel electrode 41 descends vertically to the glass plate 1 so that the transparent conductive layer 40 above the source electrode 33 covers the lateral surface of the lamination film of the gate insulation layer 2, semiconductor layer 20 and metallic layer 30, and further extends above the glass plate 1 towards the window section Wd.

Also, the lateral surface of the first conductor layer 10 above the glass plate 1 formed concurrently with the scanning line 11 is totally covered by the gate insulation layer 2. Also, a portion of both lateral surfaces of the amorphous silicon layer 21, in the direction of the extending channel gap 23 of the TFT section Tf, is covered by the protective insulation layer 3.

This embodiment differs from Embodiment 18 in that the $n^+$ amorphous silicon layer 22 in the TFT section Tf is formed by phosphorous doping (P-doping), which is an element in Group V, and the thickness of the ohmic contact layer is limited to a range of 3–6 nm.

The pixel electrode 41 forms an accumulation capacitance electrode 71 by extending to superimpose above the accumulation common electrode 72 formed inside the forestage scanning line 11 across the gate insulation layer 2 to construct the accumulation capacitance section Cp in this pixel region. Also, in this pixel region, a light blocking layer 17 comprised by the first conductor layer 10 is formed so as to superimpose across the gate insulation layer 2 a portion on one perimeter section of the pixel electrode 41.

The active matrix substrate plate in Embodiment 22 is manufactured according to the following four steps.

(Step 1) as shown in FIGS. 126A–126D and FIG. 129B, the first conductor layer 10 is formed by continually sputtering on the glass plate 1 to form the lower metallic layer 10A comprised by Al of about 200 nm thickness and the upper metallic layer 10B comprised by Ti of about 100 nm thickness, and through photolithographic processes, excepting the scanning line 11, scanning line terminal section 11*a* formed in the scanning line terminal location GS, gate electrode 12 extending from the scanning line 11 to the TFT section Tf in the respective pixel regions, accumulation common electrode 72 formed inside the forestage scanning line 11 and the light blocking layer 17, the first conductor layer 10 is removed by etching.

(Step 2) as shown in FIGS. 127A–127D and FIG. 129C, on the above substrate plate, gate insulation layer 2 comprised by silicon nitride film of about 400 nm thickness and the amorphous silicon layer 21 of about 100 nm thickness are deposited by continually applying plasma CVD, and using a $PH_3$ plasma P-doping technique under the same vacuum pressure, and after forming an ohmic contact layer comprised by $n^+$ amorphous silicon layer of 3–6 nm thickness on the surface of the amorphous silicon layer 21, a metallic layer 30 comprised by Cr of about 200 nm thickness is sputtered. Next, through photolithographic processes, excepting the opening section 61 formed in the longitudinal tip side above the gate electrode 12, opening section 62 formed above the scanning line 11 of the gate electrode base section, opening section 63 formed above the scanning line terminal section 11*a*, and leaving so as to cover at least the upper surface and an entire lateral surface of the first conductor layer 10 (scanning line 11, scanning line terminal section 11*a*, gate electrode 12, light blocking layer 17) with the gate insulation layer 2, the metallic layer 30 and the semiconductor layer 20 and the gate insulation 2 are removed successively by etching. Accordingly, the metallic layer 30 and semiconductor layer 20 and the gate insulation layer 2 are removed from the window section Wd to expose the glass plate 1, and the opening sections 61, 62 are formed in two locations above the gate electrode 12 and the scanning line 11 to reach the first conductor layer 10 and the opening section 63 is formed above the scanning line terminal section 11*a* to reach the first conductor layer 10.

(Step 3) as shown in FIGS. 128A–128D and FIG. 129D, by sputtering on the above substrate plate, the transparent conductive layer 40 comprised by ITO of about 50 nm thickness is formed, and through photolithographic processes, excepting the signal line 31, signal line terminal section 31*a* formed in the signal line terminal location DS, connection electrode section 42 connecting to the scanning line terminal section 11*a* through the opening section 63 formed above the scanning line terminal section 11*a*, common wiring line and common wiring line terminal section (not shown), and within the respective pixel regions, drain electrode 32 extending from the signal line to the TFT section Tf, pixel electrode 41, and source electrode 33 extending from the pixel electrode 41 towards TFT section Tf and separated from the drain electrode 32 by the opposing channel gap 23, the transparent conductive layer 40 is removed by etching, and next, the exposed metallic layer 30 and $n^+$ amorphous silicon layer 22 are removed successively by etching. By so doing, channel gap 23 is formed and in the direction of the extending channel gap, the amorphous silicon layer 21 is exposed beyond the opening sections 61, 62. In this case, the perimeter section of the pixel electrode 41 is extended so as to superimpose on the accumulation common electrode 72 at the accumulation capacitance section Cp to form the accumulation capacitance electrode 71, and both perimeter sections of the pixel electrode adjacent to this perimeter section are formed so that at least a portion will superimpose respectively on the light blocking layer 17.

(Step 4) as shown in FIGS. 125A–125D and FIG. 129A, on the above substrate plate the protective insulation layer 3 of about 150 nm thickness comprised by silicon nitride film is formed using plasma CVD process, and through photolithographic processes, excepting the connection electrode section 42 above the pixel electrode 41 and scanning line terminal section 11*a* and the protective insulation layer 3 above the signal line terminal section 31*a* and common wiring line terminal section (not shown), and leaving so as to cover at least the upper surface and an entire lateral surface of the signal line 31 with the protective insulation layer 3 and so as to form the semiconductor layer 20 of the TFT section Tf, the protective insulation layer 3 and amorphous silicon layer 21 are removed successively by etching. At this time, the opening sections 61, 62 and the perimeter section of the protective insulation layer 3 are intersected, and leaving the protective insulation layer 3 of the TFT section Tf in such a way that the perimeter section of the protective insulation layer descends to cover a portion of the lateral surface of the amorphous silicon layer 21 on the channel gap 23 side exposed at the opening sections 61, 62, the outer protective insulation layer and the amorphous silicon layer are removed by etching. By so doing, the pixel electrode 41 comprised by the transparent conductive layer 40, signal line terminal 35 and the common wiring terminal (not shown) comprised by a lamination of the metallic layer 30 and the transparent conductive layer 40, and the scanning line terminal 15 laminated with the transparent conductive layer 40 through the opening section 63 punched through metallic layer 30, semiconductor layer 20 and gate insulation layer 2 above the first conductor layer 10 are exposed. Lastly, the active matrix substrate plate is completed by performing annealing at about 280° C.

In this case, a lamination of a nitride film of Al and Ti is used for the first conductor layer, but the first layer may be a three layer structure formed by laying an underlayer of a high melting point metal such as Ti below the Al layer, to form Ti, Al and Ti nitride layers, or single film layer of Cr may be used.

Also, in the present embodiment, the vertical-type TFT in which the gate electrode extends from the scanning line to the pixel section, but the lateral-type TFT may be used, in which the gate electrode shares a portion of the scanning lines.

Productivity and the yield of the TN-type active matrix substrate plate in Embodiment 22 are improved because it can be manufactured in four steps.

Also, because this active matrix substrate plate can be manufactured by etching the ohmic contact layer above the semiconductor layer concurrently with the drain electrode and source electrode at the time of etching operation, and the semiconductor layer can be made thin at about 100 nm thickness, productivity can be increased and at the same time, the resistance in the vertical direction of the semiconductor layer can be reduced to improve writing capability of TFT.

Effects of preventing infiltration corrosion of the circuit elements such as the scanning lines when etching the metallic layer in the signal lines or etching the transparent conductive layer, effects of protection from static charges, improvement in reliability of TFT, lowering of resistance of scanning and signal lines, and improving the dielectric strength of insulation or aperture factor are exactly the same as those in Embodiment 18.

Embodiment 23

Figure 130A:
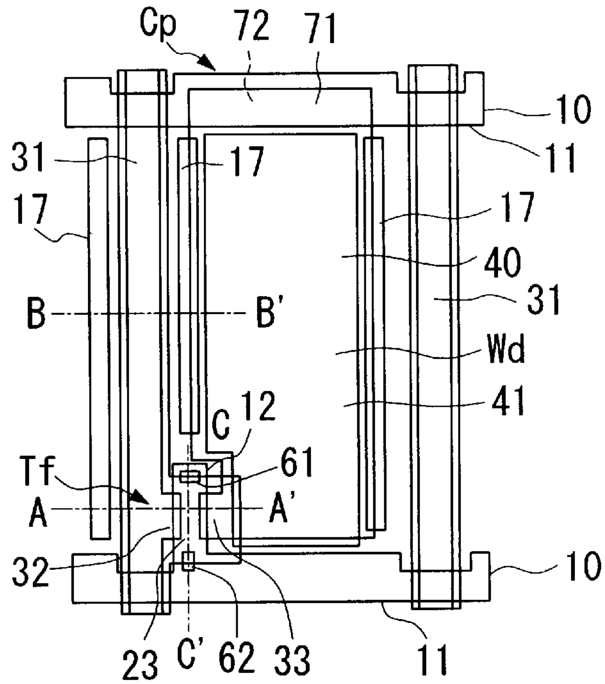
Figure 130B:
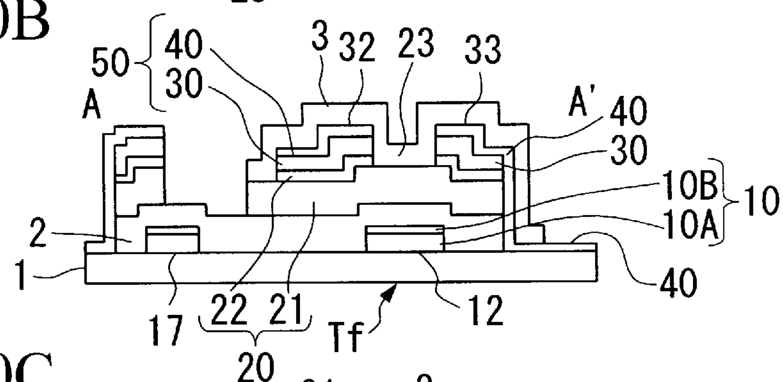
Figure 130C:
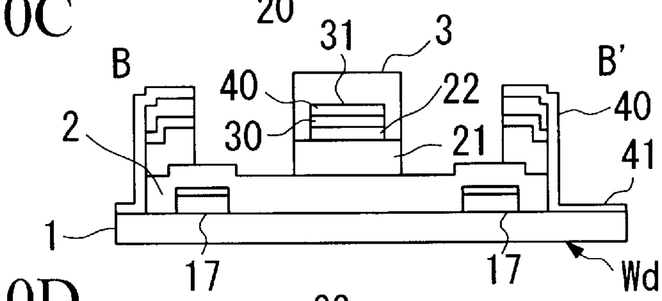
Figure 130D:
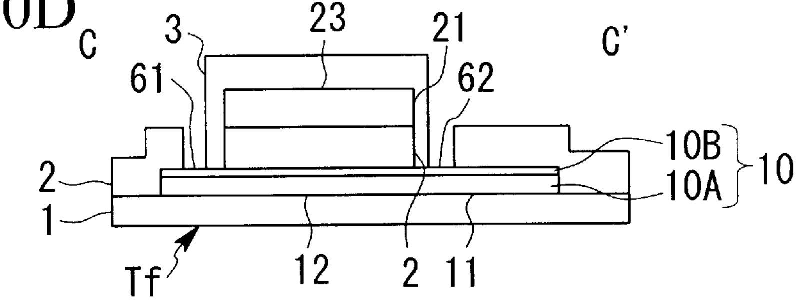
Figure 131A:
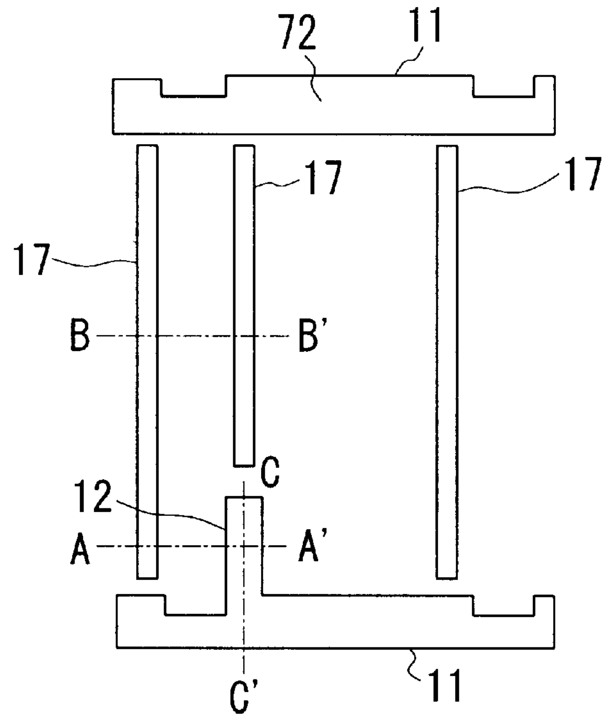
Figure 131B:
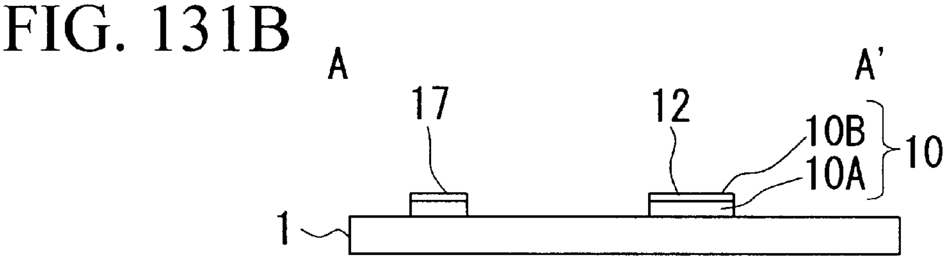
Figure 131C:
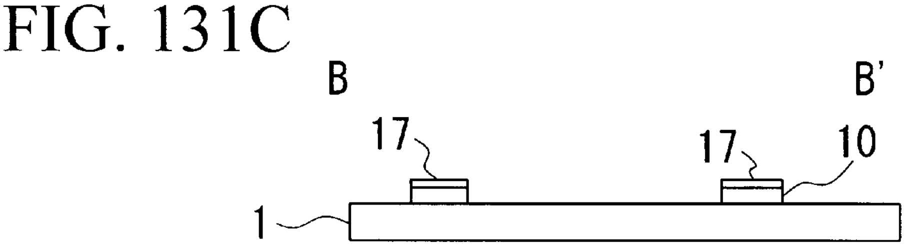
Figure 131D:
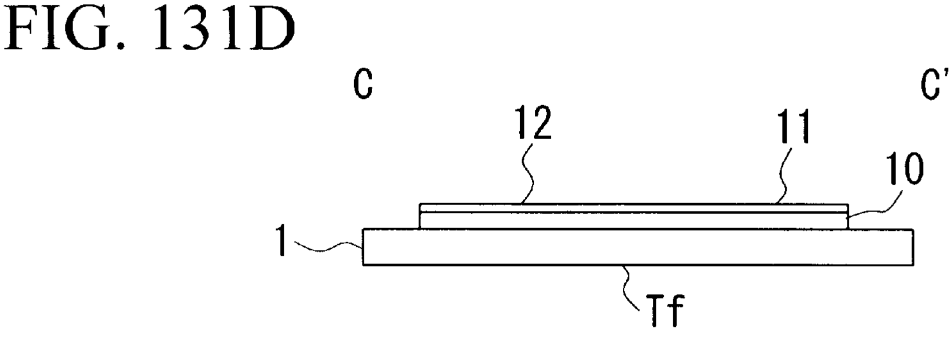

FIG. 130A is a perspective plan view to show a one-pixel-region of the active matrix substrate plate in Embodiment 23, and FIG. 130B is a cross sectional view through the plane A–A', FIG. 130C is the same through the plane B–B' and FIG. 130D is the same through the plane C–C'. FIGS. 131A–133D are diagrams to show the manufacturing steps of the active matrix substrate plate, and refer to steps 1–3, respectively. Similar to FIG. 130A, FIGS. 131A, 132A, and 133A are perspective plan views of a one-pixel-region, and FIGS. 131B–131D, 132B–132D, and 133B–133D are cross sectional views through the planes A–A' and B–B', C–C' respectively. FIG. 134A is a cross sectional view of the terminal section of the active matrix substrate plate in the longitudinal direction, in which the left side relates to a cross sectional view at the scanning line terminal location GS, and the right side relates to the signal line terminal location DS, and FIGS. 134B–134D show manufacturing steps 1–3 for the terminal section part.

The active matrix substrate plate in Embodiment 23 is formed on a glass plate 1, such that a plurality of scanning lines 11 comprised by the first conductor layer 10 and a plurality of signal lines 31 comprised by the second conductor layer 50 are arranged at right angles across the gate insulation layer 2, and in the vicinity of the TFT section Tf formed in the intersection of the scanning line 11 and the signal line 31, the gate electrode 12 extending from the scanning line 11, a semiconductor layer 20 comprised by the island-shaped amorphous silicon layer 21 and an $n^+$ amorphous silicon layer 22 opposing the gate electrode across the gate insulation layer 2, and a pair of drain electrode 32 and source electrode 33 comprised by a second conductor layer 50 above the semiconductor layer and spaced with a gap of channel gap 23 comprise an inverted staggered structure TFT, and a pixel electrode 41 comprised by a transparent conductive layer 40 is formed in a window section Wd, for transmitting light, which is surrounded by the scanning line 11 and the signal line 31, and the drain electrode 32 is connected to the signal line 31, the source electrode 33 is connected to the pixel electrode 41 to form a TN-type active matrix substrate plate.

As in Embodiment 19, in this active matrix substrate plate, the first conductor layer 10 forming the scanning line 11 and the gate electrode 12 is produced by laminating a lower metallic layer 10A comprised by Al or an alloy of primarily Al and an upper metallic layer 10B comprised by a high melting point metal such as Ti or their nitride film. Also, the second conductor layer 50 forming the signal line 31, drain electrode 32, and source electrode 33 is formed by laminating the transparent conductive layer 40 comprised by ITO above the metallic layer 30 comprised by Cr.

The pixel electrode 41 descends vertically to the glass plate 1 so that the transparent conductive layer 40 above the source electrode 33 covers the lateral surface of the lamination film of the gate insulation layer 2, semiconductor layer 20 and metallic layer 30, and further extends above the glass plate 1 towards the window section Wd.

Also, the lateral surface of the first conductor layer 10 above the glass plate 1 formed concurrently with the scanning line 11 is totally covered by the gate insulation layer 2. Also, a portion of both lateral surfaces of the amorphous silicon layer 21, in the direction of the extending channel gap 23 of the TFT section Tf, is covered by the protective insulation layer 3.

This embodiment differs from Embodiment 19 in that the $n^+$ amorphous silicon layer 22 in the TFT section Tf is formed by phosphorous doping (P-doping), which is an element in Group V, and the thickness of the ohmic contact layer is limited to a range of 3–6 nm.

The pixel electrode 41 forms an accumulation capacitance electrode 71 by extending to superimpose above the accumulation common electrode 72 formed inside the forestage scanning line 11 across the gate insulation layer 2 to construct the accumulation capacitance section Cp in this pixel region. Also, in this pixel region, a light blocking layer 17 comprised by the first conductor layer 10 is formed so as to superimpose across the gate insulation layer 2 a portion on one perimeter section of the pixel electrode 41.

The active matrix substrate plate in Embodiment 23 is manufactured according to the following four steps.

(Step 1) as shown in FIGS. 131A–131D and FIG. 134B, the first conductor layer 10 is formed by continually sputtering on the glass plate 1 to form the lower metallic layer 10A comprised by Al of about 200 nm thickness and the upper metallic layer 10B comprised by Ti of about 100 nm thickness, and through photolithographic processes, excepting the scanning line 11, gate electrode 12 extending from the scanning line 11 to the TFT section Tf in the respective pixel regions, accumulation common electrode 72 formed within the forestage scanning line 11 and the light blocking layer 17, the first conductor layer 10 is removed by etching.

(Step 2) as shown in FIGS. 132A–132D and FIG. 134C, on the above substrate plate, gate insulation layer 2 comprised by silicon nitride film of about 400 nm thickness and the amorphous silicon layer 21 of about 100 nm thickness are deposited by continually applying plasma CVD, and using a $PH_3$ plasma P-doping technique under the same vacuum pressure, and after forming an ohmic contact layer comprised by $n^+$ amorphous silicon layer of 3–6 nm thickness on the surface of the amorphous silicon layer 21, a metallic layer 30 comprised by Cr of about 200 nm thickness is sputtered. Next, through photolithographic processes, excepting the opening section 61 formed in the longitudinal tip side above the gate electrode 12, opening section 62 formed above the scanning line 11 of the gate electrode base section, opening section 63 formed above the scanning line end section 11*b*, and leaving so as to cover at least the upper surface and an entire lateral surface of the first conductor layer 10 (scanning line 11, gate electrode 12, light blocking layer 17) with the gate insulation layer 2, the metallic layer 30, semiconductor layer 20 and the gate insulation 2 are removed successively by etching. Accordingly, the metallic layer 30 and semiconductor layer 20 and the gate insulation layer 2 are removed from the window section Wd to expose the glass plate 1, the opening sections 61, 62 are formed in two locations above the gate electrode 12 and the scanning line 11 to reach the first conductor layer 10 and the opening section 63 is formed above the scanning line end section 11*b* to reach the first conductor layer 10.

(Step 3) as shown in FIGS. 133A–133D and FIG. 134D, by sputtering on the above substrate plate, the transparent conductive layer 40 comprised by ITO of about 50 nm thickness is formed, and through photolithographic processes, excepting the signal line 31, signal line terminal section 31*a* formed in the signal line terminal location DS, connection electrode section 42 connecting to the scanning line end section 11*b* through the opening section 63 formed above the scanning line end section 11*b*, scanning line terminal section 11*a* formed by extending above the metallic layer 30 from the connection electrode section to the scanning line terminal location GS, common wiring line and common wiring terminal (not shown), and within the respective pixel regions, drain electrode 32 extending from the signal line to the TFT section Tf, pixel electrode 41, and source electrode 33 extending from the pixel electrode 41 towards TFT section Tf and separated from the drain electrode 32 by the opposing channel gap 23, the transparent conductive layer 40 is removed by etching, and next, the exposed metallic layer 30 and no amorphous silicon layer 22 are removed by etching. By so doing, channel gap 23 is formed and in the direction of the extending channel gap, the amorphous silicon layer 21 is exposed beyond the opening sections 61, 62. In this case, the perimeter section of the pixel electrode 41 is extended so as to superimpose on the accumulation common electrode 72 at the accumulation capacitance section Cp to form the accumulation capacitance electrode 71, and both perimeter sections of the pixel electrode adjacent to this perimeter section are formed so that at least a portion will superimpose respectively on the light blocking layer 17.

(Step 4) as shown in FIGS. 130A–130D and FIG. 134A, on the above substrate plate the protective insulation layer 3 of about 150 nm thickness comprised by silicon nitride film is formed using plasma CVD process, and through photolithographic processes, excepting the protective insulation layer 3 above the pixel electrode 41 and the scanning line terminal section 11*a* and the signal line terminal section 31*a* and the common wiring line terminal section (not shown), and leaving so as to cover at least the upper surface and an entire lateral surface of the signal line 31 with the protective insulation layer 3 and so as to form the semiconductor layer 20 of the TFT section Tf, the protective insulation layer 3 and amorphous silicon layer 21 are removed successively by etching. At this time, the opening sections 61, 62 and the perimeter section of the protective insulation layer 3 are intersected, and leaving the protective insulation layer 3 of the TFT section Tf in such a way that the perimeter section of the protective insulation layer descends to cover a portion of the lateral surface of the amorphous silicon layer 21 on the channel gap 23 side exposed at the opening sections 61, 62, the outer protective insulation layer and the amorphous silicon layer are removed by etching. By so doing, the pixel electrode 41 comprised by the transparent conductive layer 40, the signal line terminal 35 and the scanning line terminal 15 and the common wiring terminal (not shown) comprised by a lamination of the metallic layer 30 and the transparent conductive layer 40 are exposed. Lastly, the active matrix substrate plate is completed by performing annealing at about 280° C.

In this case, a lamination of a nitride film of Al and Ti is used for the first conductor layer, but the first layer may be a three layer structure formed by laying an underlayer of a high melting point metal such as Ti below the Al layer, to form Ti, Al and Ti nitride layers, or single film layer of Cr may be used.

Also, in the present embodiment, the vertical-type TFT in which the gate electrode extends from the scanning line to the pixel section, but the lateral-type TFT may be used, in which the gate electrode shares a portion of the scanning lines.

Productivity and the yield of the TN-type active matrix substrate plate in Embodiment 23 are improved because it can be manufactured in four steps.

Also, because this active matrix substrate plate can be manufactured by etching the ohmic contact layer above the semiconductor layer concurrently with the drain electrode and source electrode at the time of etching operation, and the semiconductor layer can be made thin at about 100 nm thickness, productivity can be increased and at the same time, the resistance in the vertical direction of the semiconductor layer can be reduced to improve writing capability of TFT.

Effects of preventing infiltration corrosion of the circuit elements such as the scanning lines when etching the metallic layer in the signal lines or etching the transparent conductive layer, effects of protection from static charges, improvement in reliability of TFT, lowering of resistance of scanning and signal lines, and improving the dielectric strength of insulation or aperture factor are exactly the same as those in Embodiment 19.

Embodiment 24

FIG. 135A is a perspective plan view to show a one-pixel-region of the active matrix substrate plate in Embodiment 24, and FIG. 135B is a cross sectional view through the plane A–A', FIG. 135C is the same through the plane B–B' and FIG. 135D is the same through the plane C–C'. FIGS. 136A–138D are diagrams to show the manufacturing steps of the active matrix substrate plate, and refer to steps 1–3, respectively. Similar to FIG. 135A, FIGS. 136A, 137A, and 138A are perspective plan views of a one-pixel-region, and FIGS. 136B–136D, 137B–137D, and 138B–138D are cross sectional views through the planes A–A' and B–B', C–C' respectively. FIG. 139A is a cross sectional view of the terminal section of the active matrix substrate plate in the longitudinal direction, in which the left side relates to a cross sectional view at the scanning line terminal location GS, and the right side relates to the signal line terminal location DS, and FIGS. 139B–139D show manufacturing steps 1–3 for the terminal section part.

The active matrix substrate plate in Embodiment 24 is formed on a glass plate 1 such that, a plurality of scanning lines 11 comprised by the first conductor layer 10 and a plurality of signal lines 31 are arranged at right angles, and in the vicinity of the TFT section Tf formed in the intersection of the scanning line 11 and the signal line 31, the gate electrode 12 extending from the scanning line 11, a semiconductor layer 20 comprised by the island-shaped amorphous silicon layer 21 and an $n^+$ amorphous silicon layer 22 opposing the gate electrode across the gate insulation layer 2, and a pair of drain electrode 32 and source electrode 33 comprised by a second conductor layer 50 above the semiconductor layer and spaced with a gap of channel gap 23 comprise an inverted staggered structure TFT, and a pixel electrode 41 comprised by a transparent conductive layer 40 is formed in a window section Wd, for transmitting light, which is surrounded by the scanning line 11 and the signal line 31, and the drain electrode 32 is connected to the signal line 31, the source electrode 33 is connected to the pixel electrode 41 to form a TN-type active matrix substrate plate.

As in Embodiment 20, in this active matrix substrate plate, the signal line 31 is formed by a lower layer signal line 18 comprised by the first conductor layer 10 formed between the adjacent scanning lines 11 on the glass plate 1 so as not to contact the scanning line 11, and an upper layer signal line 36 comprised by the second conductor layer 50 whose transparent conductive layer 40 contacts the lower layer signal line 18 opposing the adjacent pixel region across the scanning line 11 through the opening section 65 punched through the metallic layer 30, the semiconductor layer 20 and the gate insulation layer 2.

The first conductor layer 10 forming the scanning line 11, gate electrode 12 is produced by laminating a lower metallic layer 10A comprised by Al or an alloy of primarily Al and an upper metallic layer 10B comprised by a high melting point metal such as Ti or their nitride film. Also, the second conductor layer 50 forming the signal line 31, drain electrode 32, and source electrode 33 is formed by laminating the transparent conductive layer 40 comprised by ITO above the metallic layer 30 comprised by Cr.

The pixel electrode 41 descends vertically to the glass plate 1 so that the transparent conductive layer 40 above the source electrode 33 covers the lateral surface of the lamination film of the gate insulation layer 2, semiconductor layer 20 and metallic layer 30, and further extends above the glass plate 1 towards the window section Wd.

Also, the lateral surface of the first conductor layer 10 above the glass plate 1 formed concurrently with the scanning line 11 is totally covered by the gate insulation layer 2. Also, a portion of both lateral surfaces of the amorphous silicon layer 21, in the direction of the extending channel gap 23 of the TFT section Tf, is covered by the protective insulation layer 3.

This embodiment differs from Embodiment 20 in that the $n^+$ amorphous silicon layer 22 in the TFT section Tf is formed by phosphorous doping (P-doping), which is an element in Group V, and the thickness of the ohmic contact layer is limited to a range of 3–6 nm.

The pixel electrode 41 forms an accumulation capacitance electrode 71 by extending to superimpose above the accumulation common electrode 72 formed inside the forestage scanning line 11 across the gate insulation layer 2 to construct the accumulation capacitance section Cp in this pixel region. Also, in this pixel region, a light blocking layer 17 comprised by the first conductor layer 10 is formed so as to superimpose across the gate insulation layer 2 a portion on one perimeter section of the pixel electrode 41.

The active matrix substrate plate in Embodiment 24 is manufactured according to the following four steps.

(Step 1) as shown in FIGS. 136A–136D and FIG. 139B, the first conductor layer 10 is formed by continually sputtering on the glass plate 1 to form the lower metallic layer 10A comprised by Al of about 200 nm thickness and the upper metallic layer 10B comprised by Ti of about 100 nm thickness, and through photolithographic processes, excepting the scanning line 11, scanning line terminal section 11*a* formed in the scanning line terminal location GS, gate electrode 12 extending from the scanning line 11 to the TFT section Tf in the respective pixel regions, lower layer signal line 18 to form a part of the signal line 31 formed between the adjacent scanning lines so as not to touch the scanning line, accumulation common electrode 72 formed inside the forestage scanning line 11 and the light blocking layer 17, the first conductor layer 10 is removed by etching.

(Step 2) as shown in FIGS. 137A–137D and FIG. 139C, on the above substrate plate, gate insulation layer 2 comprised by silicon nitride film of about 400 nm thickness and the amorphous silicon layer 21 of about 100 nm thickness are deposited by continually applying plasma CVD, and using a $PH_3$ plasma P-doping technique under the same vacuum pressure, and after forming an ohmic contact layer comprised by $n^+$ amorphous silicon layer of 3–6 nm thickness on the surface of the amorphous silicon layer 21, a metallic layer 30 comprised by Cr of about 200 nm thickness is sputtered. Next, through photolithographic processes, excepting the opening section 61 formed in the longitudinal tip side above the gate electrode 12, opening section 62 formed above the scanning line 11 of the gate electrode base section, opening section 65 formed above both end sections of the lower layer signal line 18, and the opening section 63 formed above the scanning line terminal section 11*a*, and leaving so as to cover at least the upper surface and an entire lateral surface of the first conductor layer 10 (scanning line 11, scanning line terminal section 11*a*, gate electrode 12, lower layer signal line 18, light blocking layer 17) with the gate insulation layer 2, the metallic layer 30 and the semiconductor layer 20 and the gate insulation 2 are removed successively by etching. Accordingly, the metallic layer 30 and semiconductor layer 20 and the gate insulation layer 2 are removed from the window section Wd to expose the glass plate 1, the opening sections 61, 62, 63, 65 are formed to reach the first conductor layer 10.

(Step 3) as shown in FIGS. 138A–138D and FIG. 139D, by sputtering on the above substrate plate, the transparent conductive layer 40 comprised by ITO of about 50 nm thickness is formed, and through photolithographic processes, excepting the connection electrode section 42 connecting to the scanning line terminal section 11*a* through the opening section 63 formed above the scanning line terminal section 11*a*, signal line terminal section 31*a* formed in the signal line terminal location DS, upper layer signal line 36 connecting to the lower layer signal line 18 opposing the adjacent pixel region across the scanning line 11 through the opening section 65 punched through the metallic layer 30 and the semiconductor layer 20 and the gate insulation layer 2, common wiring line and common wiring line terminal section (not shown), and within the respective pixel regions, drain electrode 32 extending from the upper layer signal line 36 to the TFT section Tf, pixel electrode 41, and source electrode 33 extending from the pixel electrode 41 towards TFT section Tf and separated from the drain electrode 32 by the opposing channel gap 23, the transparent conductive layer 40 is removed by etching, and next, the exposed metallic layer 30 and the $n^+$ amorphous silicon layer 22 are removed successively by etching. By so doing, channel gap 23 is formed and in the direction of the extending channel gap, the amorphous silicon layer 21 is exposed beyond the opening sections 61, 62. In this case, the perimeter section of the pixel electrode 41 is extended so as to superimpose on the accumulation common electrode 72 at the accumulation capacitance section Cp to form the accumulation capacitance electrode 71, and both perimeter sections of the pixel electrode adjacent to this perimeter section are formed so that at least a portion will superimpose respectively on the light blocking layer 17.

(Step 4) as shown in FIGS. 135A–135D and FIG. 139A, on the above substrate plate the protective insulation layer 3 of about 150 nm thickness comprised by silicon nitride film is formed using plasma CVD process, and through photolithographic processes, excepting the protective insulation layer 3 above the pixel electrode 41 and the connection electrode section 42 and the signal line terminal section 31*a* and common wiring line terminal section (not shown), and leaving so as to cover at least the upper surface and an entire lateral surface of the upper layer signal line 36 with the protective insulation layer 3 and so as to form the semiconductor layer 20 of the TFT section Tf, the protective insulation layer 3 and amorphous silicon layer 21 are removed successively by etching. At this time, the opening sections 61, 62 and the perimeter section of the protective insulation layer 3 are intersected, and leaving the protective insulation layer 3 of the TFT section Tf in such a way that the perimeter section of the protective insulation layer descends to cover a portion of the lateral surface of the amorphous silicon layer 21 on the channel gap 23 side exposed at the opening sections 61, 62, the outer protective insulation layer and the amorphous silicon layer are removed by etching. By so doing, the pixel electrode 41 comprised by the transparent conductive layer 40, signal line terminal 35 and the common wiring terminal (not shown) comprised by a lamination of the metallic layer 30 and the transparent conductive layer 40, and the scanning line terminal 15 laminated with the transparent conductive layer 40 through the opening section 63 punched through metallic layer 30, semiconductor layer 20 and gate insulation layer 2 above the first conductor layer 10 are exposed. Lastly, the active matrix substrate plate is completed by performing annealing at about 280° C.

In this case, a lamination of a nitride film of Al and Ti is used for the first conductor layer, but the first layer may be a three layer structure formed by laying an underlayer of a high melting point metal such as Ti below the Al layer, to form Ti, Al and Ti nitride layers, or single film layer of Cr may be used.

Also, in the present embodiment, the vertical-type TFT in which the gate electrode extends from the scanning line to the pixel section, but the lateral-type TFT may be used, in which the gate electrode shares a portion of the scanning lines.

Productivity and the yield of the TN-type active matrix substrate plate in Embodiment 24 are improved because it can be manufactured in four steps.

Also, because this active matrix substrate plate can be manufactured by etching the ohmic contact layer above the semiconductor layer concurrently with the drain electrode and source electrode at the time of etching operation, and the semiconductor layer can be made thin at about 100 nm thickness, productivity can be increased and at the same time, the resistance in the vertical direction of the semiconductor layer can be reduced to improve writing capability of TFT.

Effects regarding reducing short circuiting of signal line and pixel electrode, effects of preventing infiltration corrosion of the circuit elements such as the scanning lines when etching the metallic layer in the signal lines or etching the transparent conductive layer, effects of protection from static charges, improvement in reliability of TFT, lowering of resistance of scanning and signal lines, and improving the dielectric strength of insulation or aperture factor are exactly the same as those in Embodiment 20.

Embodiment 25

FIG. 140A is a perspective plan view to show a one-pixel-region of the active matrix substrate plate in Embodiment 25, and FIG. 140B is a cross sectional view through the plane A–A', FIG. 140C is the same through the plane B–B' and FIG. 140D is the same through the plane C–C'. FIGS. 141A–143D are diagrams to show the manufacturing steps of the active matrix substrate plate, and refer to steps 1–3, respectively. Similar to FIG. 140A, FIGS. 141A, 142A, and 143A are perspective plan views of a one-pixel-region, and FIGS. 141B–141D, 142B–142D, and 143B–143D are cross sectional views through the planes A–A' and B–B', C–C' respectively. FIG. 144A is a cross sectional view of the terminal section of the active matrix substrate plate in the longitudinal direction, in which the left side relates to a cross sectional view at the scanning line terminal location GS, and the right side relates to the signal line terminal location DS, and FIGS. 144B–144D show manufacturing steps 1–3 for the terminal section part.

The active matrix substrate plate in Embodiment 25 is formed on a glass plate 1 such that, a plurality of scanning lines 11 comprised by the first conductor layer 10 and a plurality of signal lines 31 are arranged at right angles, and in the vicinity of the TFT section Tf formed in the intersection of the scanning line 11 and the signal line 31, the gate electrode 12 extending from the scanning line 11, a semiconductor layer 20 comprised by the island-shaped amorphous silicon layer 21 and an $n^+$ amorphous silicon layer 22 opposing the gate electrode across the gate insulation layer 2, and a pair of drain electrode 32 and source electrode 33 comprised by a second conductor layer 50 above the semiconductor layer and spaced with a gap of channel gap 23 comprise an inverted staggered structure TFT, and a pixel electrode 41 comprised by a transparent conductive layer 40 is formed in a window section Wd, for transmitting light, which is surrounded by the scanning line 11 and the signal line 31, and the drain electrode 32 is connected to the signal line 31, the source electrode 33 is connected to the pixel electrode 41 to form a TN-type active matrix substrate plate.

As in Embodiment 21, in this active matrix substrate plate, the signal line 31 is formed by a lower layer signal line 18 comprised by the first conductor layer 10 formed between the adjacent scanning lines 11 on the glass plate 1 so as not to contact the scanning line 11, and an upper layer signal line 36 comprised by the second conductor layer 50 whose transparent conductive layer 40 contacts the lower layer signal line 18 opposing the adjacent pixel region across the scanning line 11 through the opening section 65 punched through the metallic layer 30, the semiconductor layer 20 and the gate insulation layer 2.

The first conductor layer 10 forming the scanning line 11, gate electrode 12 is produced by laminating a lower metallic layer 10A comprised by Al or an alloy of primarily Al and an upper metallic layer 10B comprised by a high melting point metal such as Ti or their nitride film. Also, the second conductor layer 50 forming the signal line 31, drain electrode 32, and source electrode 33 is formed by laminating the transparent conductive layer 40 comprised by ITO above the metallic layer 30 comprised by Cr.

The pixel electrode 41 descends vertically to the glass plate 1 so that the transparent conductive layer 40 above the source electrode 33 covers the lateral surface of the lamination film of the gate insulation layer 2, semiconductor layer 20 and metallic layer 30, and further extends above the glass plate 1 towards the window section Wd.

Also, the lateral surface of the first conductor layer 10 above the glass plate 1 formed concurrently with the scanning line 11 is totally covered by the gate insulation layer 2. Also, a portion of both lateral surfaces of the amorphous silicon layer 21, in the direction of the extending channel gap 23 of the TFT section Tf, is covered by the protective insulation layer 3.

This embodiment differs from Embodiment 21 in that the $n^+$ amorphous silicon layer 22 in the TFT section Tf is formed by phosphorous doping (P-doping), which is an element in Group V, and the thickness of the ohmic contact layer is limited to a range of 3–6 nm.

The pixel electrode 41 forms an accumulation capacitance electrode 71 by extending to superimpose above the accumulation common electrode 72 formed inside the forestage scanning line 11 across the gate insulation layer 2 to construct the accumulation capacitance section Cp in this pixel region. Also, in this pixel region, a light blocking layer 17 comprised by the first conductor layer 10 is formed so as to superimpose across the gate insulation layer 2 a portion on one perimeter section of the pixel electrode 41.

The active matrix substrate plate in Embodiment 25 is manufactured according to the following four steps.

(Step 1) as shown in FIGS. 141A–141D and FIG. 144B, the first conductor layer 10 is formed by continually sputtering on the glass plate 1 to form the lower metallic layer 10A comprised by Al of about 200 nm thickness and the upper metallic layer 10B comprised by Ti of about 100 nm thickness, and through photolithographic processes, excepting the scanning line 11, gate electrode 12 extending from the scanning line 11 to the TFT section Tf in the respective pixel regions, lower layer signal line 18 to form a part of the signal line 31 formed between the adjacent scanning lines so as not to touch the scanning line, accumulation common electrode 72 formed inside the forestage scanning line 11 and the light blocking layer 17, the first conductor layer 10 is removed by etching.

(Step 2) as shown in FIGS. 142A–142D and FIG. 144C, on the above substrate plate, gate insulation layer 2 comprised by silicon nitride film of about 400 nm thickness and the amorphous silicon layer 21 of about 100 nm thickness are deposited by continually applying plasma CVD, and using a $PH_3$ plasma P-doping technique under the same vacuum pressure, and after forming an ohmic contact layer comprised by $n^+$ amorphous silicon layer of 3–6 nm thickness on the surface of the amorphous silicon layer 21, a metallic layer 30 comprised by Cr of about 200 nm thickness is sputtered. Next, through photolithographic processes, excepting the opening section 61 formed in the longitudinal tip side above the gate electrode 12, opening section 62 formed above the scanning line 11 of the gate electrode base section, opening section 65 formed above both end sections of the lower layer signal line 18, and the opening section 63 formed above the scanning line end section 11*b*, and leaving so as to cover at least the upper surface and an entire lateral surface of the first conductor layer 10 (scanning line 11, gate electrode 12, lower layer signal line 18, light blocking layer 17) with the gate insulation layer 2, the metallic layer 30 and the semiconductor-layer 20 and the gate insulation 2 are removed successively by etching. Accordingly, the metallic layer 30 and semiconductor layer 20 and the gate insulation layer 2 are removed from the window section Wd to expose the glass plate 1, the opening sections 61, 62, 63, 65 are formed to reach the first conductor layer 10.

(Step 3) as shown in FIGS. 143A–143D and FIG. 144D, by sputtering on the above substrate plate, the transparent conductive layer 40 comprised by ITO of about 50 nm thickness is formed, and through photolithographic processes, excepting the connection electrode section 42 connecting to the scanning line end section 11*b* through the opening section 63 formed above the scanning line end section 11*b*, signal line terminal section 31*a* formed in the signal line terminal location DS, common wiring line and common wiring terminal (not shown), upper layer signal line 36 connecting to the lower layer signal line 18 opposing the adjacent pixel region across the scanning line 11 through the opening section 65 punched through the metallic layer 30 and the semiconductor layer 20 and the gate insulation layer 2, scanning line terminal section 11*a* formed by extending further from this connection electrode section above the metallic layer 30 to the scanning line terminal location GS, and within the respective pixel regions, drain electrode 32 extending from the signal line to the TFT section Tf, pixel electrode 41, and source electrode 33 extending from the pixel electrode 41 towards TFT section Tf and separated from the drain electrode 32 by the opposing channel gap 23, the transparent conductive layer 40 is removed by etching, and next, the exposed metallic layer 30 and the $n^+$ amorphous silicon layer 22 are removed successively by etching. By so doing, channel gap 23 is formed and in the direction of the extending channel gap, the amorphous silicon layer 21 is exposed beyond the opening sections 61, 62. In this case, the perimeter section of the pixel electrode 41 is extended so as to superimpose on the accumulation common electrode 72 at the accumulation capacitance section Cp to form the accumulation capacitance electrode 71, and both perimeter sections of the pixel electrode adjacent to this perimeter section are formed so that at least a portion will superimpose respectively on the light blocking layer 17.

(Step 4) as shown in FIGS. 140A–140D and FIG. 144A, on the above substrate plate the protective insulation layer 3 of about 150 nm thickness comprised by silicon nitride film is formed using plasma CVD process, and through photolithographic processes, excepting the protective insulation layer 3 above the pixel electrode 41 and the signal line terminal section 31*a* and common wiring line terminal section (not shown), and leaving so as to cover at least the upper surface and an entire lateral surface of the upper layer signal line 36 with the protective insulation layer 3 and so as to form the semiconductor layer 20 of the TFT section Tf, the protective insulation layer 3 and amorphous silicon layer 21 are removed successively by etching. At this time, the opening sections 61, 62 and the perimeter section of the protective insulation layer 3 are intersected, and leaving the protective insulation layer 3 of the TFT section Tf in such a way that the perimeter section of the protective insulation layer descends to cover a portion of the lateral surface of the amorphous silicon layer 21 on the channel gap 23 side exposed at the opening sections 61, 62, the outer protective insulation layer and the amorphous silicon layer are removed by etching. By so doing, the pixel electrode 41 comprised by the transparent conductive layer 40, signal line terminal 35 and the scanning line terminal 15 and the common wiring terminal (not shown) comprised by a lamination of the metallic layer 30 and the transparent conductive layer 40 are exposed. Lastly, the active matrix substrate plate is completed by performing annealing at about 280° C.

In this case, a lamination of a nitride film of Al and Ti is used for the first conductor layer, but the first layer may be a three layer structure formed by laying an underlayer of a high melting point metal such as Ti below the Al layer, to form Ti, Al and Ti nitride layers, or single film layer of Cr may be used.

Also, in the present embodiment, the vertical-type TFT in which the gate electrode extends from the scanning line to the pixel section, but the lateral-type TFT may be used, in which the gate electrode shares a portion of the scanning lines.

Productivity and the yield of the TN-type active matrix substrate plate in Embodiment 25 are improved because it can be manufactured in four steps.

Also, because this active matrix substrate plate can be manufactured by etching the ohmic contact layer above the semiconductor layer concurrently with the drain electrode and source electrode at the time of etching operation, and the semiconductor layer can be made thin at about 100 nm thickness, productivity can be increased and at the same time, the resistance in the vertical direction of the semiconductor layer can be reduced to improve writing capability of TFT.

Effects regarding reducing short circuiting of signal line and pixel electrode, effects of preventing infiltration corrosion of the circuit elements such as the scanning lines when etching the metallic layer in the signal lines or etching the transparent conductive layer, effects of protection from static charges, improvement in reliability of TFT, lowering of resistance of scanning and signal lines, and improving the dielectric strength of insulation or aperture factor are exactly the same as those in Embodiment 21.

Embodiment 26

Figure 145B:
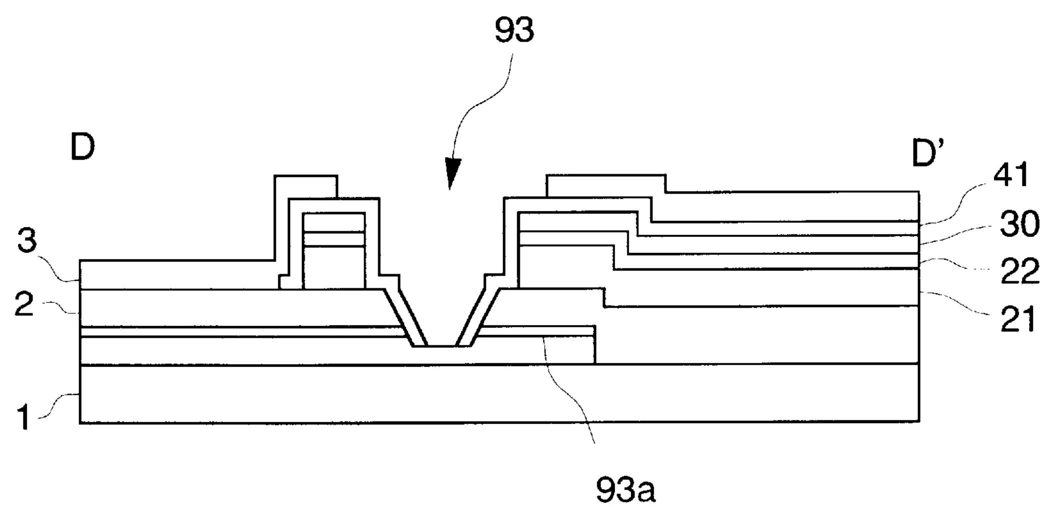

FIG. 145A is a perspective plan view of a portion of the outer peripheral section Ss of the active matrix substrate plate in Embodiment 26, FIG. 145B is a cross sectional view through the plane D–D', FIGS. 146A–146C are cross sectional views through the plane D–D' to show the manufacturing steps of the outer peripheral section Ss, and refer to steps 1–3, respectively.

In the active matrix substrate plate in Embodiment 26 are formed the gate-shunt bus line 91 for linking the individual scanning lines 11 on the outside of the display surface Dp where the pixel regions are formed in a matrix form and the drain-shunt bus line 92 for linking the respective signal lines 31, and the gate-shunt bus line 91 and the drain-shunt bus line 92 are connected at the superposition section 93.

The structure and method for manufacturing the display surface Dp and the terminal section of this active matrix substrate plate are the same as those presented in Embodiment 3, and therefore, their explanations are omitted. However, in Embodiments 26–35, the examples are based on the first conductor layer 10 comprising the scanning lines 11, gate electrodes 12 is comprised by laminating the lower metallic layer 10A comprised by Al and the upper metallic layer 10B comprised by a nitride film of a high melting point metal such as Ti.

The active matrix substrate plate is manufactured according to the following four steps contained in the manufacturing steps described in Embodiment 3.

(Step 1) as shown in FIGS. 145A, 146A, the first conductor layer 10 is formed by continually sputtering Al of about 200 nm thickness on the glass plate 1 to form the lower metallic layer 10A and a nitride film of Ti of about 100 nm thickness to form the upper metallic layer 10B, and through photolithographic processes, excepting the gate-shunt bus line 91 linking individual scanning lines 11 at the outside of the scanning line terminal section 11*a* and the gate-side superposition section 93*a* formed in one end section of the gate-shunt bus line, the first conductor layer 10 is removed by etching.

(Step 2) as shown in FIG. 146B, by continually applying plasma CVD on the above substrate plate, a gate insulation layer 2 comprised by a silicon nitride film of about 400 nm thickness and the semiconductor layer 20 comprised by the amorphous silicon layer 21 of about 250 nm thickness and $n^+$ amorphous silicon layer 22 of about 50 nm thickness are formed, and using sputtering, the metallic layer 30 comprised by Cr of about 200 nm thickness is deposited, and through photolithographic processes, the metallic layer 30 above the gate-side superposition section 93*a* and the semiconductor layer 20 are removed by etching.

(Step 3) as shown in FIG. 146C, the transparent conductive layer 40 comprised by ITO of about 50 nm thickness is formed by sputtering on the above substrate plate, and through photolithographic processes, excepting the drain-shunt bus line 92 linking the respective signal lines 31 on the outside of the signal line terminal section 35*a* and the drain-side superposition section 93*b* formed in such a way to oppose one end of the drain-shunt bus line across the gate-side superposition section 93*a* and the gate insulation layer 2, the transparent conductive layer 40 and the metallic layer 30 are removed successively by etching, and then the exposed $n^+$ amorphous silicon layer 22 is removed by etching.

(Step 4) as shown in FIGS. 145A, 145B, by applying plasma CVD, the protective insulation layer 3 comprised by the silicon nitride film of about 150 nm thickness is formed on the above substrate plate, and through photolithographic processes, the protective insulation layer 3 above the gate-shunt bus line 91 and the drain-shunt bus line 92 and the superposition section 93 is removed by etching. Next, the superposition section 93 is irradiated with a laser beam to punch through the gate insulation layer 2 and to fuse and short the gate-shunt bus line 91 and drain-shunt bus line 92.

The gate-shunt bus line 91 and drain-shunt bus line 92 are severed and removed in subsequent manufacturing steps.

Here, in this example, the gate-shunt bus line and drain-shunt bus line are shorted using a laser beam, it is possible to obtain shorting using the silver bead technique to be described later. This technique has an advantage that shorting is obtained with high reproducibility.

In this embodiment, although the method of manufacturing is based on making the peripheral circuits related to Embodiment 3, exactly the same process may be adopted in Embodiments 4–9. Also, in Embodiments 1 and 2, similar peripheral circuits may be manufactured according to the method.

In the active matrix substrate plate in Embodiment 26, gate-shunt bus line and drain-shunt bus line can be fused readily so that if in the subsequent steps for severing and removal, even if unexpected electrical shock is applied during the manufacturing process, scanning lines and signal lines are prevented from developing a potential difference to prevent shorting between the scanning lines and signal lines due to insulation breakdown.

Embodiment 27

FIG. 147A is a perspective plan view of the two adjacent pixel regions Px of the signal line input side and a portion of the outer peripheral section Ss of the active matrix substrate plate in Embodiment 27, FIG. 147B is a cross sectional view through the plane E–E', FIGS. 148A–148D are cross sectional views through the plane E–E' to show the manufacturing steps of the outer peripheral section Ss, and refer to steps 1–3, respectively, and a channel-formed TFT.

In the active matrix substrate plate in Embodiment 27, in the outer periphery Ss of the signal line input side, the signal line 31 is linked to each other by the high resistance line 95 comprised by amorphous silicon.

The structure and method for manufacturing the display surface Dp and the terminal section of this active matrix substrate plate are the same as those presented in Embodiment 3, and therefore, their explanations are omitted here.

The active matrix substrate plate is manufactured according to the following four steps contained in the manufacturing steps described in Embodiment 3.

(Step 1) as shown in FIG. 148A, the first conductor layer 10 is formed by continually sputtering Al of about 200 nm thickness on the glass plate 1 to form the lower metallic layer 10A and a nitride film of Ti of about 100 nm thickness to form the upper metallic layer 10B, and through photolithographic processes, at least the portion of the first conductor layer 10 where the high resistance line 95 is to be formed is removed by etching.

Figure 148B:
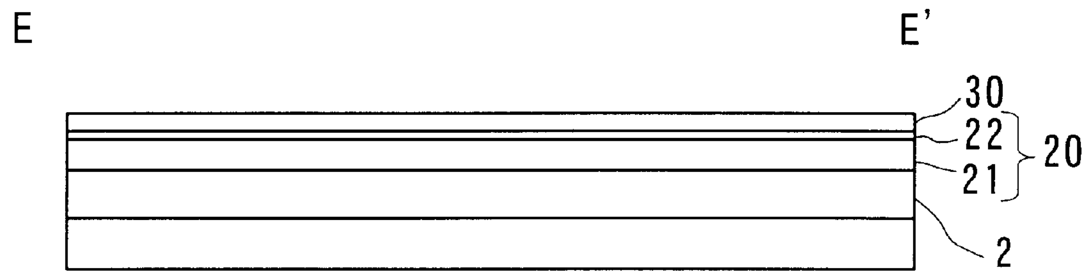

(Step 2) as shown in FIG. 148B, by continually applying plasma CVD on the above substrate plate, a gate insulation layer 2 comprised by a silicon nitride film of about 400 nm thickness and the semiconductor layer 20 comprised by the amorphous silicon layer 21 of about 250 nm thickness and $n^+$ amorphous silicon layer 22 of about 50 nm thickness are formed, and using sputtering, the metallic layer 30 comprised by Cr of about 200 nm thickness is deposited, and through photolithographic processes, excepting at least the portions where the signal line 31 in the outer peripheral section Ss and the high resistance line 95 are to be formed, the metallic layer 30 and the semiconductor layer 20 are removed successively by etching.

Figure 148C:
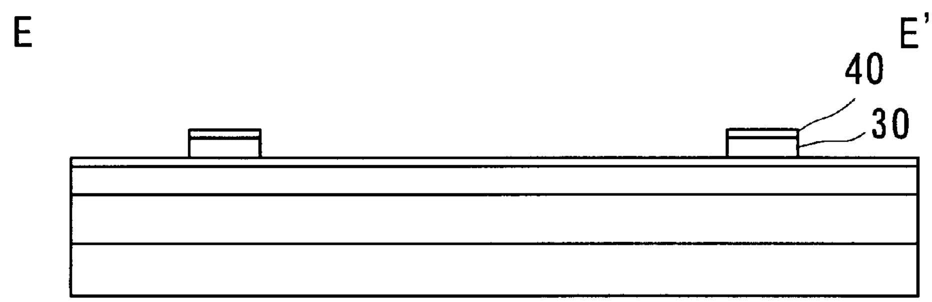

(Step 3) as shown in FIG. 148C, the transparent conductive layer 40 comprised by ITO of about 50 nm thickness is formed by sputtering on the above substrate plate, and through photolithographic processes, leaving so as to cover the signal line 31, the transparent conductive layer 40 is removed by etching, and then the exposed metallic layer 30 is removed by etching.

Figure 148D:
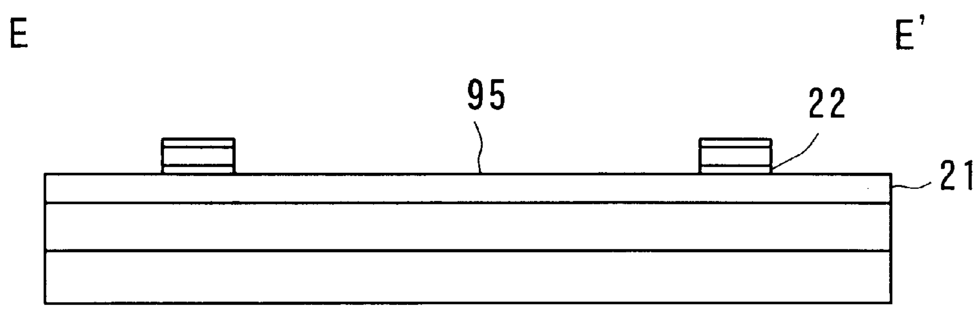

Next, as shown in FIG. 148D, concurrently with forming the channel gap of the TFT section Tf, the $n^+$ amorphous silicon layer 22 is removed by etching to expose the portion of the amorphous silicon layer 21 that will form the high resistance line 95. Accordingly, the high resistance line 95 connected to the signal line 31 can be formed integrally without increasing the number of manufacturing steps.

(Step 4) as shown in FIGS. 147A, 147B, the protective insulation layer 3 comprised by the silicon nitride film of about 150 nm thickness is formed on the above substrate plate by plasma CVD (although photolithographic processes are employed, openings are not formed in the protective insulation layer 3 in this region).

In this case, each signal line is linked with a single high resistance line, but a number of high resistance lines may be provided.

In this embodiment, although the method of manufacturing is based on making the static charge protection element related to Embodiment 3, exactly the same process may be adopted in Embodiments 4–9. Also, in Embodiments 1 and 2, similar static charge protection elements may be manufactured according to the method.

In the active matrix substrate plate in Embodiment 27, even if unexpected electrical shock is applied during subsequent manufacturing processes, because the potential can be dispersed in the adjacent signal lines, it is possible to prevent shorting between the scanning lines and signal lines due to insulation breakdown and to prevent changes in the properties of TFT in the pixel region.

Embodiment 28

FIG. 149A is a perspective plan view of the two adjacent pixel regions Px of the signal line input side and a portion of the outer peripheral section Ss of the active matrix substrate plate in Embodiment 28, FIG. 149B is a cross sectional view through the plane F—F, FIGS. 150A–150D are cross sectional views through the plane F—F to show the manufacturing steps of the outer peripheral section Ss, and refer to steps 1–3, respectively, and a channel-formed TFT.

In the active matrix substrate plate in Embodiment 28, in the outer peripheral section Ss of the signal line input side, the signal lines 31 are linked to each other by the high resistance line 95 comprised by amorphous silicon. Further, this embodiment differs from Embodiment 27 in that a signal line extension section 38 is provided to extend from each signal line 31 to the adjacent signal line above the high resistance line 95. Also, the high resistance line 95 is provided in pairs, and the signal line extension section 38 is provided asymmetrically left to right between the adjacent signal lines about the vertical signal line and in a point symmetry to each other.

The structure and method for manufacturing the display surface Dp and the terminal section of this active matrix substrate plate are the same as those presented in Embodiment 3, and therefore, their explanations are omitted here.

The active matrix substrate plate is manufactured according to the following four steps contained in the manufacturing steps described in Embodiment 3.

Figure 150A:
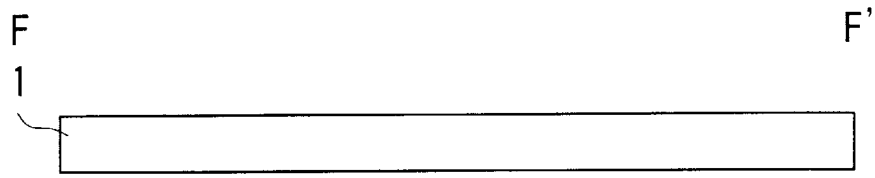

(Step 1) as shown in FIG. 150A, the first conductor layer 10 is formed by continually sputtering Al of about 200 nm thickness on the glass plate 1 to form the lower metallic layer 10A and a nitride film of Ti of about 100 nm thickness to form the upper metallic layer 10B, and through photolithographic processes, at least the portion of the first conductor layer 10 where the high resistance line 95 is to be formed is removed by etching.

Figure 150B:
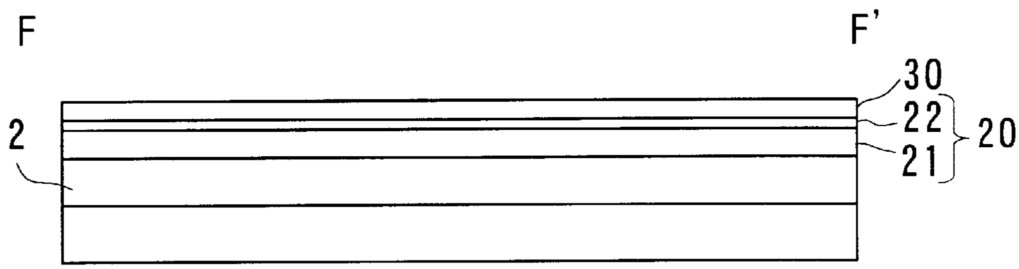

(Step 2) as shown in FIG. 150B, by continually applying plasma CVD on the above substrate plate, a gate insulation layer 2 comprised by a silicon nitride film of about 400 nm thickness and the semiconductor layer 20 comprised by the amorphous silicon layer 21 of about 250 nm thickness and $n^+$ amorphous silicon layer 22 of about 50 nm thickness are formed, and using sputtering, the metallic layer 30 comprised by Cr of about 200 nm thickness is deposited, and through photolithographic processes, excepting at least the portions where the signal line 31 in the outer peripheral section Ss and the high resistance line 95 are to be formed, the metallic layer 30 and the semiconductor layer 20 are removed successively by etching.

Figure 150C:
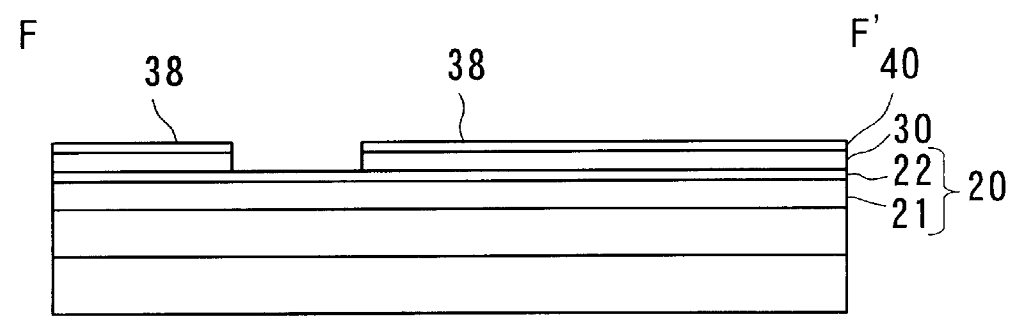

(Step 3) as shown in FIG. 150C, the transparent conductive layer 40 comprised by ITO of about 50 nm thickness is formed by sputtering on the above substrate plate, and through photolithographic processes, leaving so as to cover each signal line 31 and each signal line extension section 38 extending non-contactingly from each signal line to the adjacent signal line above the amorphous silicon layer 21 for forming the high resistance line 95, the transparent conductive layer 40 is removed by etching, and then the exposed metallic layer 30 is removed by etching.

Figure 150D:
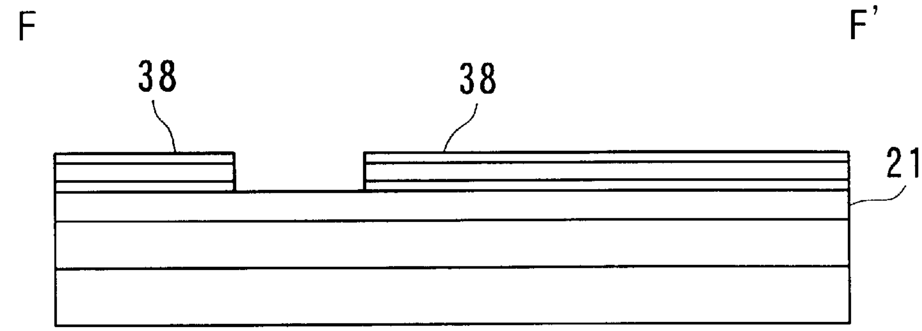

Next, as shown in FIG. 150D, concurrently with forming the channel gap of the TFT section Tf, the $n^+$ amorphous silicon layer 22 is removed by etching to expose the portion of the amorphous silicon layer 21 that will form the high resistance line 95. Accordingly, the high resistance line 95 connected to the signal line 31 can be formed integrally without increasing the number of manufacturing steps.

(Step 4) as shown in FIGS. 149A, 149B, the protective insulation layer 3 comprised by the silicon nitride film of about 150 nm thickness is formed on the above substrate plate by plasma CVD (although photolithographic processes are employed, openings are not formed in the protective insulation layer 3 in this region).

In this case, each signal line is linked with two high resistance lines, but it is obvious that single high resistance lines may be used, and in such a case, the signal line extension section is provided symmetrically on left and right, and more than three high resistance lines may be provided.

In this embodiment, although the method of manufacturing is based on making the static charge protection element related to Embodiment 3, exactly the same process may be adopted in Embodiments 4–9. Also, in Embodiments 1 and 2, similar static charge protection elements may be manufactured according to the method.

In the active matrix substrate plate in Embodiment 28, because the signal line extension section is provided to extend towards the adjacent signal line, the length of the high resistance line in the linking section is shortened, and by providing two high resistance lines, it is possible to lower the resistance value of the high resistance line. For this reason, even if unexpected electrical shock is applied during subsequent manufacturing processes, because the potential can be dispersed effectively in the adjacent signal lines, it is possible to prevent shorting between the scanning lines and signal lines due to insulation breakdown and to prevent changes in the properties of TFT in the pixel region.

Embodiment 29

FIG. 151A is a perspective plan view of the two adjacent pixel regions Px of the signal line input side and a portion of the outer peripheral section Ss of the active matrix substrate plate in Embodiment 29, FIG. 51B is a cross sectional view through the plane G–G', FIGS. 152A–152D are cross sectional views through the plane G–G' to show the manufacturing steps of the outer peripheral section Ss, and refer to steps 1–3, respectively, and a channel-formed TFT.

In the active matrix substrate plate in Embodiment 29, as in Embodiment 28, in the outer peripheral section Ss of the signal line input side, the signal line extension section 38 extending towards the signal line adjacent to the signal line 31 is provided, and a floating electrode 96 comprised by the first conductor layer 10 is formed non-contactingly between the adjacent signal lines 31, and the end section of individual floating electrode 96 is disposed so as to superimpose on the opposite signal line extension section 38 across the gate insulation layer 2 and the amorphous silicon layer 21. The signal line extension sections 38 are provided asymmetrically left to right between the adjacent signal lines about the vertical signal line and in a point symmetry to each other.

The structure and method for manufacturing the display surface Dp and the terminal section of this active matrix substrate plate are the same as those presented in Embodiment 3, and therefore, their explanations are omitted here.

The active matrix substrate plate is manufactured according to the following four steps contained in the manufacturing steps described in Embodiment 3.

Figure 152A:
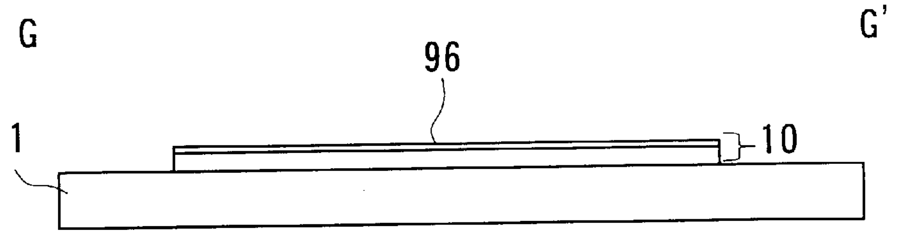

(Step 1) as shown in FIG. 152A, the first conductor layer 10 is formed by continually sputtering Al of about 200 nm thickness on the glass plate 1 to form the lower metallic layer 10A and a nitride film of Ti of about 100 nm thickness to form the upper metallic layer 10B, and through photolithographic processes, excepting the floating electrode 96 extending non-contactingly between the adjacent signal lines, the first conductor layer 10 is removed by etching.

Figure 152B:
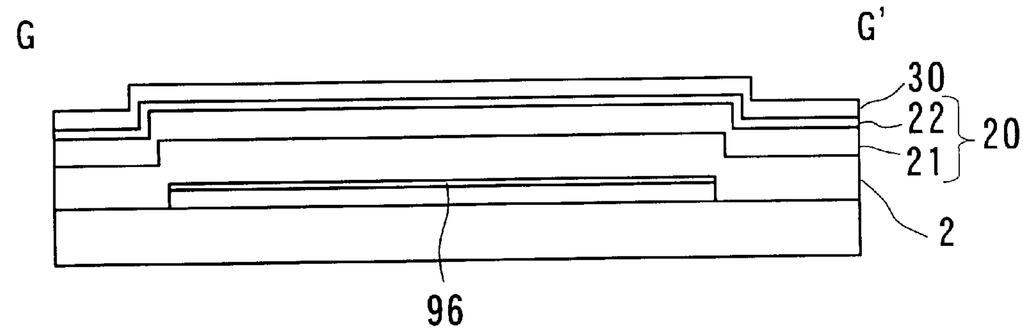

(Step 2) as shown in FIG. 152B, by continually applying plasma CVD on the above substrate plate, a gate insulation layer 2 comprised by a silicon nitride film of about 400 nm thickness and the semiconductor layer 20 comprised by the amorphous silicon layer 21 of about 250 nm thickness and $n^+$ amorphous silicon layer 22 of about 50 nm thickness are formed, and using sputtering, the metallic layer 30 comprised by Cr of about 200 nm thickness is deposited, and through photolithographic processes, leaving so as to cover at least the floating electrode 96, and leaving the signal line 31 in the outer peripheral section Ss and the signal line extension section 38 extending towards the adjacent signal line, and the space sections therebetween, the metallic layer 30 and the semiconductor layer 20 are removed successively by etching.

Figure 152C:
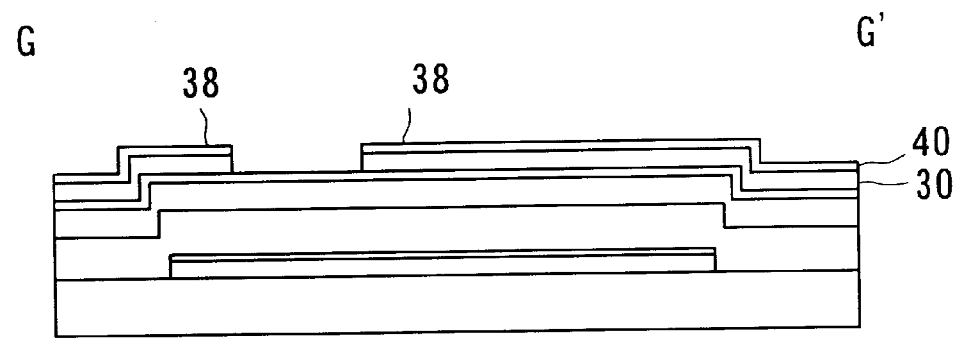

(Step 3) as shown in FIG. 152C, the transparent conductive layer 40 comprised by ITO of about 50 nm thickness is formed by sputtering on the above substrate plate, and through photolithographic processes, leaving so as to cover each signal line 31 and each signal line extension section 38, the transparent conductive layer 40 is removed by etching, and then the exposed metallic layer 30 is removed by etching.

Figure 152D:
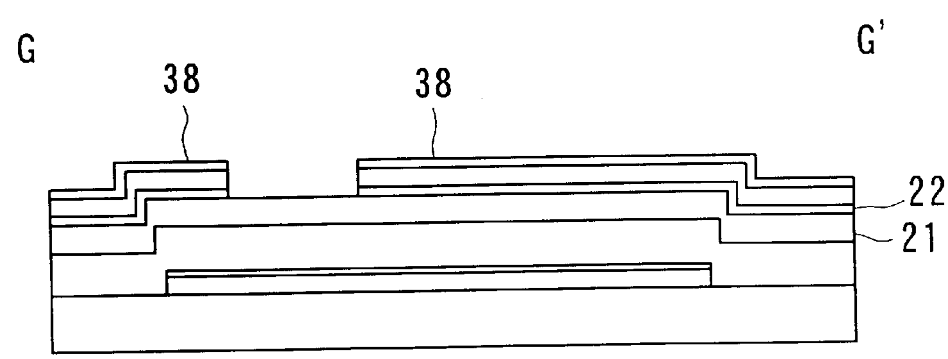

Next, as shown in FIG. 152D, concurrently with forming the channel gap of the TFT section Tf, the $n^+$ amorphous silicon layer 22 is removed by etching to expose the portion of the amorphous silicon layer 21 in the space section of the opposing signal line extension section 38.

(Step 4) as shown in FIGS. 151A, 151B, the protective insulation layer 3 comprised by the silicon nitride film of about 150 nm thickness is formed on the above substrate plate by plasma CVD (although photolithographic processes are employed, openings are not formed in the protective insulation layer 3 in this region).

In this case, two static charge protection elements having floating electrodes serving as the gate electrodes are provided in parallel, but one or more than two pieces may be provided.

In this embodiment, although the method of manufacturing is based on making the static charge protection element related to Embodiment 3, exactly the same process may be adopted in Embodiments 4–9. Also, in Embodiments 1 and 2, similar static charge protection elements may be manufactured according to the method.

In the active matrix substrate plate in Embodiment 29, the static charge protection element having the floating electrode as the gate electrode serves as the protective transistor so that, even if unexpected electrical shock is applied during subsequent manufacturing processes, because the potential can be dispersed effectively in the adjacent signal lines as in Embodiment 28, it is possible to prevent shorting between the scanning lines and signal lines due to insulation breakdown and to prevent changes in the properties of TFT in the pixel region.

Embodiment 30

FIG. 153A is a perspective plan view of the two adjacent pixel regions Px of the signal line end side and a portion of the outer peripheral section Ss of the active matrix substrate plate in Embodiment 30, FIG. 153B is a cross sectional view through the plane H–H', FIGS. 154A–154D are cross sectional views through the plane H–H' to show the manufacturing steps of the outer peripheral section Ss, and refer to steps 1–3, respectively, and a channel-formed TFT.

In the active matrix substrate plate in Embodiment 30, in the outer peripheral section Ss of the signal line end side, the end sections of each signal line 31 and common wiring line 13 are linked by the high resistance line 95 comprised by amorphous silicon.

The structure and method for manufacturing the display surface Dp and the terminal section of this active matrix substrate plate are the same as those presented in Embodiment 3, and therefore, their explanations are omitted here.

The active matrix substrate plate is manufactured according to the following four steps contained in the manufacturing steps described in Embodiment 3.

Figure 154A:
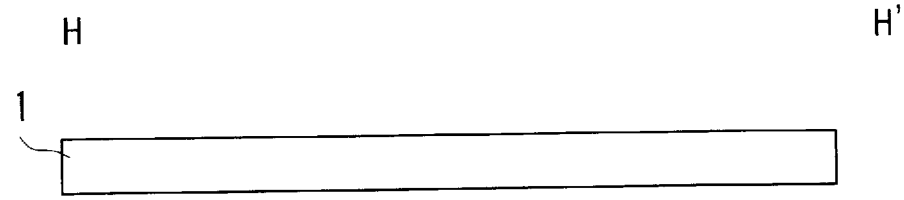

(Step 1) as shown in FIG. 154A, the first conductor layer 10 is formed by continually sputtering Al of about 200 nm thickness on the glass plate 1 to form the lower metallic layer 10A and a nitride film of Ti of about 100 nm thickness to form the upper metallic layer 10B, and through photolithographic processes, at least the portion of the first conductor layer 10 where the high resistance line 95 is to be formed is removed by etching.

Figure 154B:
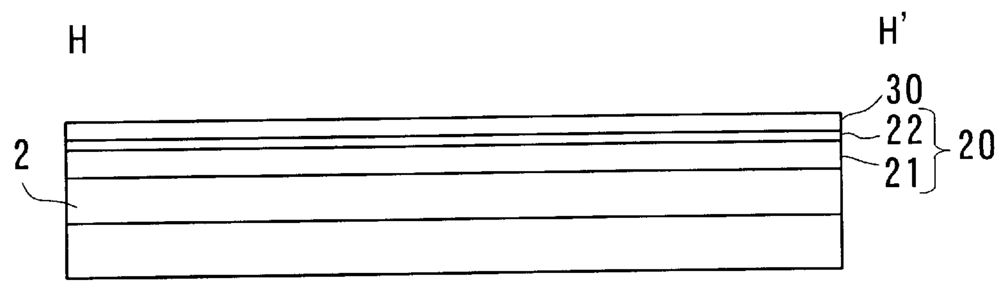

(Step 2) as shown in FIG. 154B, by continually applying plasma CVD on the above substrate plate, a gate insulation layer 2 comprised by a silicon nitride film of about 400 nm thickness and the semiconductor layer 20 comprised by the amorphous silicon layer 21 of about 250 nm thickness and $n^+$ amorphous silicon layer 22 of about 50 nm thickness are deposited, and using sputtering the metallic layer 30 comprised by Cr of about 200 nm thickness is deposited, and through photolithographic processes, excepting at least the signal line 31 in the outer peripheral section Ss, high resistance line 95, and the portion opposing the end section of the signal line 31 to form the common wiring line 13, the metallic layer 30 and the semiconductor layer 20 are removed successively by etching.

Figure 154C:
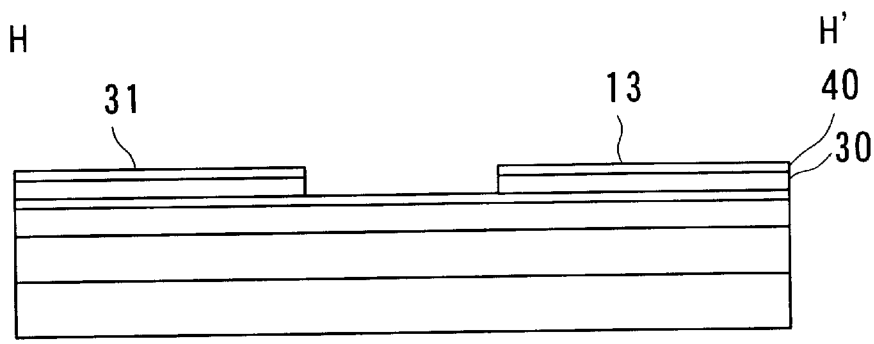

(Step 3) as shown in FIG. 154C, the transparent conductive layer 40 comprised by ITO of about 50 nm thickness is formed by sputtering on the above substrate plate, and through photolithographic processes, leaving so as to cover each signal line 31 and common wiring line 13, the transparent conductive layer 40 is removed by etching, and then the exposed metallic layer 30 is removed by etching.

Figure 154D:
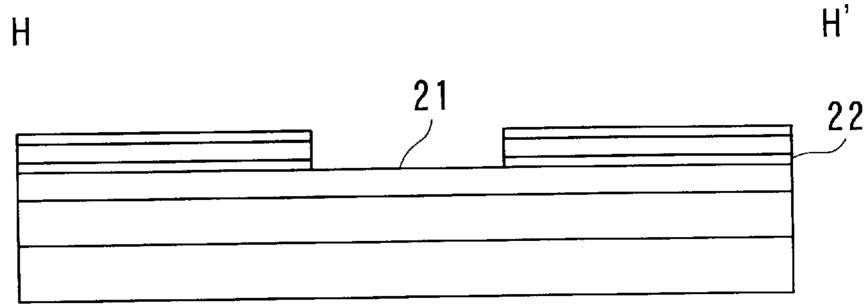

Next, as shown in FIG. 154D, concurrently with forming the channel gap of the TFT section Tf, the $n^+$ amorphous silicon layer 22 is removed by etching to expose the portion of the amorphous silicon layer 21 to form the high resistance section 95 in the space section between the end section of signal line 31 and the common wiring 13. Accordingly, the high resistance line 95 connected to the end section of signal line 31 and the common wiring line 13 is formed integrally, without increasing the number of processing steps.

(Step 4) as shown in FIGS. 153A, 153B, the protective insulation layer 3 comprised by the silicon nitride film of about 150 nm thickness is formed on the above substrate plate by plasma CVD (although photolithographic processes are employed, openings are not formed in the protective insulation layer 3 in this region).

In this case, each signal line and common wiring line are linked by one high resistance line, but several high resistance lines may be provided.

In this embodiment, although the method of manufacturing is based on making the static charge protection element related to Embodiment 3, exactly the same process may be adopted in Embodiments 4–9. Also, in Embodiments 1 and 2, similar static charge protection element may be manufactured according to the method.

In the active matrix substrate plate in Embodiment 30, even if unexpected electrical shock is applied to a signal line during subsequent manufacturing processes, because the potential can be dispersed effectively in the common wiring lines, it is possible to prevent shorting between the scanning lines and signal lines due to insulation breakdown and to prevent changes in the properties of TFT in the pixel region.

Embodiment 31

FIG. 155A is a perspective plan view of the two adjacent pixel regions Px of the signal line end side and a portion of the outer peripheral section Ss of the active matrix substrate plate in Embodiment 31, FIG. 155B is a cross sectional view through the plane J–J', FIGS. 156A–156D are cross sectional views through the plane J–J' to show the manufacturing steps of the outer peripheral section Ss, and refer to steps 1–3, respectively, and a channel-formed TFT.

In the active matrix substrate plate in Embodiment 31, in the outer peripheral section Ss of the signal line end side, at the end section of each of the signal line 31 are disposed two lateral end sections 31T, and also, extending from the common wiring line 13 extending at right angles to the signal line is a common wiring line extension section 13E having the lateral end sections 13T opposing the lateral sections 31T of the signal line across the space section. The two lateral end sections 31T of the signal line 31 and the opposing lateral end sections 13T of the common wiring line 13 are mutually linked by the high resistance lines 95 comprised by amorphous silicon. Also, two parallel high resistance line 95 are provided and the lateral end sections 31T and 13T are formed symmetrically left to right between end section of the signal line 31 and the common wiring line extension section 13E about the vertical signal line.

The structure and method for manufacturing the display surface Dp and the terminal section of this active matrix substrate plate are the same as those presented in Embodiment 3, and therefore, their explanations are omitted here.

The active matrix substrate plate is manufactured according to the following four steps contained in the manufacturing steps described in Embodiment 3.

Figure 156A:
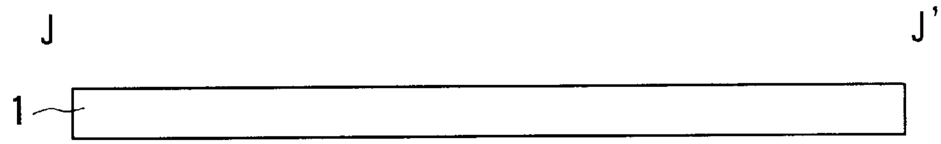

(Step 1) as shown in FIG. 156A, the first conductor layer 10 is formed by continually sputtering Al of about 200 nm thickness on the glass plate 1 to form the lower metallic layer 10A and a nitride film of Ti of about 100 nm thickness to form the upper metallic layer 10B, and through photolithographic processes, at least the portion of the first conductor layer 10 where the high resistance line 95 is to be formed is removed by etching.

Figure 156B:
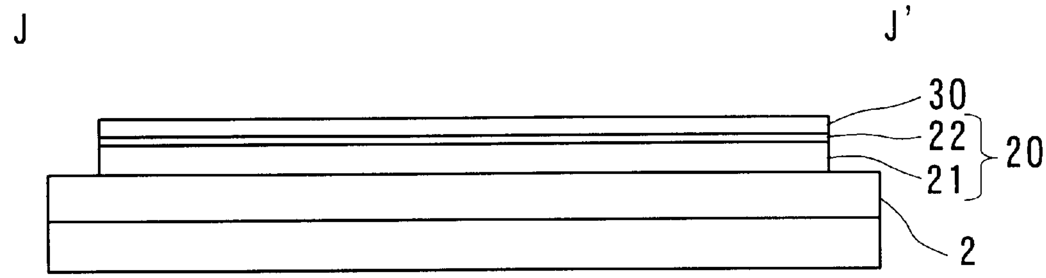

(Step 2) as shown in FIG. 156B, by continually applying plasma CVD on the above substrate plate, a gate insulation layer 2 comprised by a silicon nitride film of about 400 nm thickness and the semiconductor lay 20 comprised by the amorphous silicon layer 21 of about 250 nm thickness and $n^+$ amorphous silicon layer 22 of about 50 nm thickness are formed, and using sputtering the metallic layer 30 comprised by Cr of about 200 nm thickness is deposited, and through photolithographic processes, excepting the signal line 31 in the outer peripheral section Ss, lateral end section 31T of the signal line, lateral end section 13T of the common wiring line, common wiring line extension section 13E, and the portion to be formed as common wiring line 13, the metallic layer 30 and the semiconductor layer 20 are removed successively by etching.

Figure 156C:
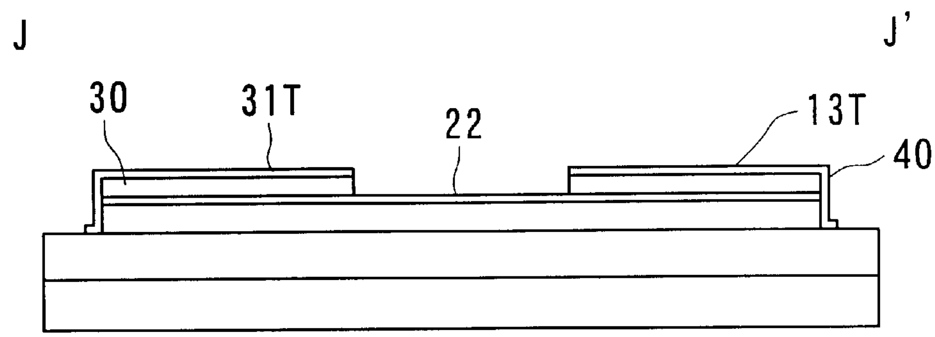

(Step 3) as shown in FIG. 156C, the transparent conductive layer 40 comprised by ITO of about 50 nm thickness is formed by sputtering on the above substrate plate, and through photolithographic processes, leaving so as to cover each signal line 31, common wiring line 13, and common wiring line extension section 13E, and so as to form the space section between the signal line lateral end section 31T and the common wiring line lateral end section 13T the transparent conductive layer 40 is removed by etching, and then the metallic layer 30 exposed at the space section is removed by etching.

Figure 156D:
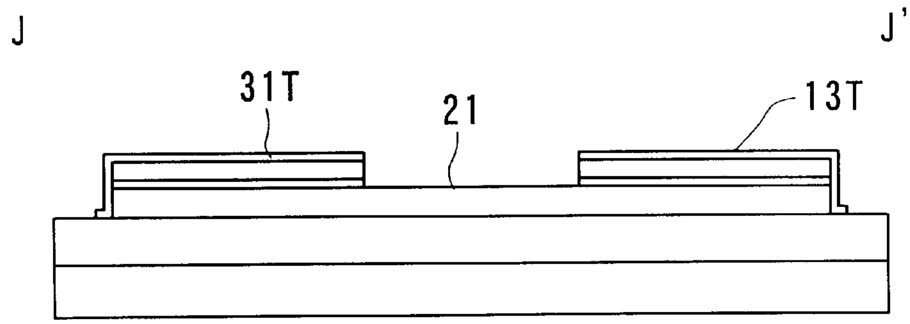

Next, as shown in FIG. 156D, concurrently with forming the channel gap of the TFT section Tf, the $n^+$ amorphous silicon layer 22 is removed by etching to expose the portion of the amorphous silicon layer 21 to form the high resistance line 95 in the space section between the signal line lateral end section 31T and the common wiring line lateral end section 13T. Accordingly, the high resistance line 95 connected integrally to the signal line lateral end section 31T and the common wiring line lateral end section 13T can be formed integrally, without increasing the number of processing steps.

(Step 4) as shown in FIGS. 155A, 155B, the protective insulation layer 3 comprised by the silicon nitride film of about 150 nm thickness is formed on the above substrate plate by plasma CVD (although photolithographic processes are employed, openings are not formed in the protective insulation layer 3 in this region).

In this case, each signal line lateral end section and common wiring line lateral end section are linked by two high resistance lines, but it is obvious that one high resistance line can be used, or more than two high resistance lines can be used.

In this embodiment, although the method of manufacturing is based on making the static charge protection element related to Embodiment 3, exactly the same process may be adopted in Embodiments 4–9. Also, in Embodiments 1 and 2, similar static charge protection elements may be manufactured according to the method.

In the active matrix substrate plate in Embodiment 31, the signal line lateral end section and the common wiring line lateral end section are extended, respectively, from each of the signal lines and the common wiring line extension sections, so that the length of the high resistance line from the linking section is shortened. By providing two high resistance lines, it is possible to lower the resistance value of the high resistance line, and even if unexpected electrical shock is applied during subsequent manufacturing processes, because the potential can be dispersed effectively in the common wiring lines, it is possible to prevent shorting between the scanning lines and signal lines due to insulation breakdown and to prevent changes in the properties of TFT in the pixel region.

Embodiment 32

FIG. 157A is a perspective plan view of the two adjacent pixel regions Px of the signal line end side and a portion of the outer peripheral section Ss of the active matrix substrate plate in Embodiment 32, FIG. 157B is a cross sectional view through the plane K–K', FIGS. 158A–158D are cross sectional views through the plane K–K' to show the manufacturing steps of the outer peripheral section Ss, and refer to steps 1–3, respectively, and a channel-formed TFT.

In the active matrix substrate plate in Embodiment 32, in the outer peripheral section Ss of the signal line end side, at the end section of each of the signal line 31 are disposed two lateral end sections 31T, and also, extending from the common wiring line 13 extending at right angles to the signal line is a common wiring line extension section 13E having lateral end sections 13T opposing the lateral sections 31T of the signal line across the space section. And a floating electrode 96 comprised by the first conductor layer 10 is formed on the glass plate 1, and the end section of individual floating electrode 96 is disposed so as to superimpose on the opposite signal line lateral end section 31T and the common wiring line lateral end section 13T across the gate insulation layer 2 and the amorphous silicon layer 21. These lateral end sections are symmetrically formed left to right between the end section of signal line 31 and the common wiring line extension section 13E about the vertical signal line.

The structure and method for manufacturing the display surface Dp and the terminal section of this active matrix substrate plate are the same as those presented in Embodiment 3, and therefore, their explanations are omitted here.

The active matrix substrate plate is manufactured according to the following four steps contained in the manufacturing steps described in Embodiment 3.

Figure 158A:
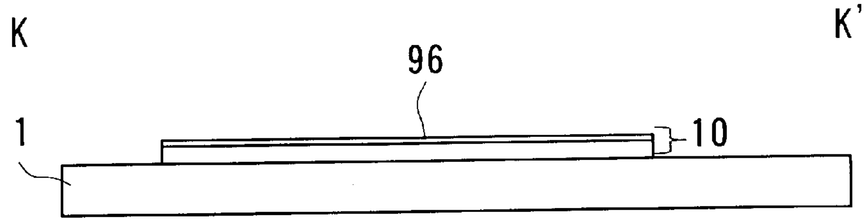

(Step 1) as shown in FIG. 158A, the first conductor layer 10 is formed by continually sputtering Al of about 200 nm thickness on the glass plate 1 to form the lower metallic layer 10A and a nitride film of Ti of about 100 nm thickness to form the upper metallic layer 10B, and through photolithographic processes, excepting the floating electrode 96 extending in such a way that the both end sections respectively superimpose on the signal line lateral end section 31T and the common wiring line lateral end section 13T, the first conductor layer 10 is removed by etching.

Figure 158B:
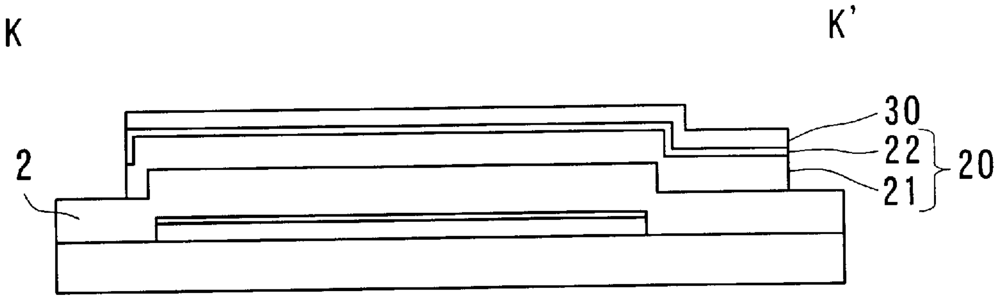

(Step 2) as shown in FIG. 158B, by continually applying plasma CVD on the above substrate plate, a gate insulation layer 2 comprised by a silicon nitride film of about 400 nm thickness and the semiconductor layer 20 comprised by the amorphous silicon layer 21 of about 250 nm thickness and $n^+$ amorphous silicon layer 22 of about 50 nm thickness are formed, and using sputtering the metallic layer 30 comprised by Cr of about 200 nm thickness is deposited, and through photolithographic processes, excepting at least the signal line 31 in the outer peripheral section Ss, signal line lateral end section 31T, common wiring line lateral end section 13T, common wiring line extension section 13E and the portion to form the common wiring line 13, the metallic layer 30 and the semiconductor layer 20 are removed successively by etching.

Figure 158C:
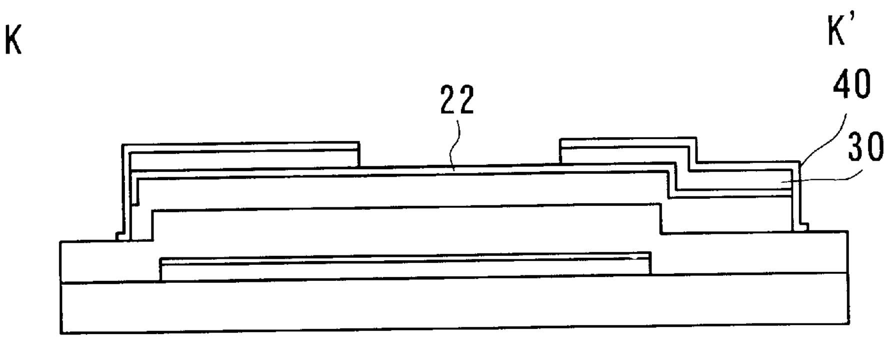

(Step 3) as shown in FIG. 158C, the transparent conductive layer 40 comprised by ITO of about 50 nm thickness is formed by sputtering on the above substrate plate, and through photolithographic processes, leaving so as to cover each signal line 31, common wiring line 13, and common wiring line extension section 13E, and so as to form the space section between the signal line lateral end section 31T and the common wiring line lateral end section 13T, the transparent conductive layer 40 is removed by etching, and then the metallic layer 30 exposed in the space section is removed by etching.

Figure 158D:
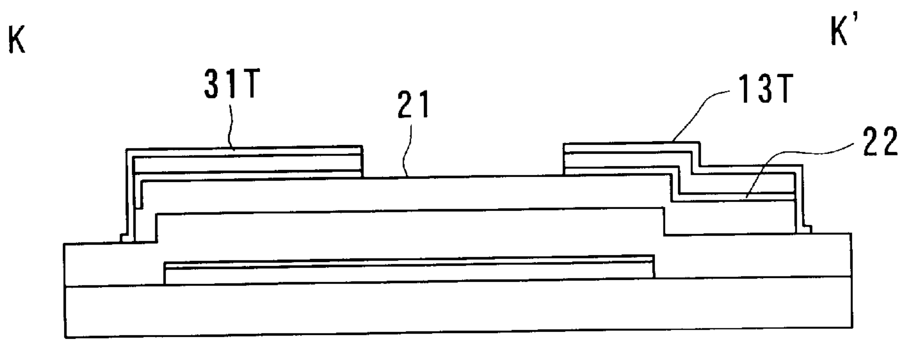

Next, as shown in FIG. 158D, concurrently with forming the channel gap of the TFT section Tf, the $n^+$ amorphous silicon layer 22 is removed by etching to expose the amorphous silicon layer 21 in the space section between the signal line lateral end section 31T and the common wiring line lateral end section 13T.

(Step 4) as shown in FIGS. 157A, 157B, the protective insulation layer 3 comprised by the silicon nitride film of about 150 nm thickness is formed on the above substrate plate by plasma CVD (although photolithographic processes are employed, openings are not formed in the protective insulation layer 3 in this region).

In this case, two static charge protection elements having floating electrodes serving as the gate electrodes are provided in parallel, but one or more than two pieces may be provided.

In this embodiment, although the method of manufacturing is based on making the static charge protection element related to Embodiment 3, exactly the same process may be adopted in Embodiments 4–9. Also, in Embodiments 1 and 2, similar static charge protection elements may be manufactured according to the method.

In the active matrix substrate plate in Embodiment 32, the static charge protection element having the floating electrode as the gate electrode serves as the protective transistor so that, even if unexpected electrical shock is applied during subsequent manufacturing processes, because the potential can be dispersed effectively in the adjacent signal lines as in Embodiment 31, it is possible to prevent shorting between the scanning lines and signal lines due to insulation breakdown and to prevent changes in the properties of TFT in the pixel region.

Embodiment 33

FIG. 159A is a perspective plan view of the two adjacent pixel regions Px of the signal line end side and a portion of the outer peripheral section Ss of the active matrix substrate plate in Embodiment 33, FIG. 159B is a cross sectional view through the plane L–L', FIGS. 160A–160D are cross sectional views through the plane L–L' to show the manufacturing steps of the outer peripheral section Ss, and refer to steps 1–3, respectively, and a channel-formed TFT.

Also, FIG. 165 is a schematic diagram of the wiring formed on the outer peripheral section Ss of the active matrix substrate plate, and FIG. 166A is a perspective plan view of the silver bead section 97 in FIG. 165, FIG. 166B is a cross sectional view through the plane D–D'. FIGS. 167A–167C are cross sectional views through the plane D–D' to show the manufacturing steps of the silver bead section 97, and refer to steps 1–3, respectively.

In the active matrix substrate plate in Embodiment 33, in the outer peripheral section Ss of the signal line end side, the end section of each signal line 31 and the signal line linking line 39 extending at right angles to the signal line 31 are linked to each other by the high resistance line 95 comprised by amorphous silicon. Also, the signal line linking line 39 is connected to the common wiring linking line 19 by a silver bead section 97 at one end section of the glass plate 1 where each common wiring line 13 of the display surface Dp is bound together.

The structure and method for manufacturing the display surface Dp and the terminal section of this active matrix substrate plate are the same as those presented in Embodiment 6, and therefore, their explanations are omitted here.

The active matrix substrate plate is manufactured according to the following four steps contained in the manufacturing steps described in Embodiment 6.

Figure 160A:
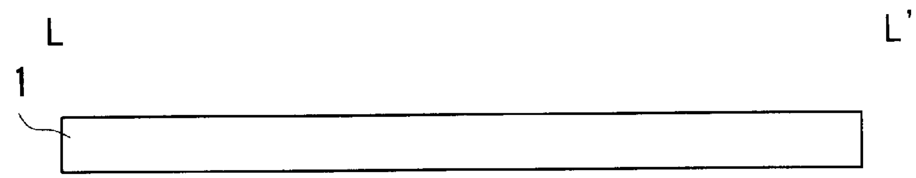

(Step 1) as shown in FIG. 160A and FIG. 167A, the first conductor layer 10 is formed by continually sputtering Al of about 200 nm thickness on the glass plate 1 to form the lower metallic layer 10A and a nitride film of Ti of about 100 nm thickness to form the upper metallic layer 10B, and through photolithographic processes, excepting the common wiring linking line 19 in the outer peripheral section Ss and the common wiring silver bead section 97C formed in its end, at least the portions for forming the high resistance line 95 and the signal line linking line 39 of the first conductor layer 10 are removed by etching.

Figure 160B:
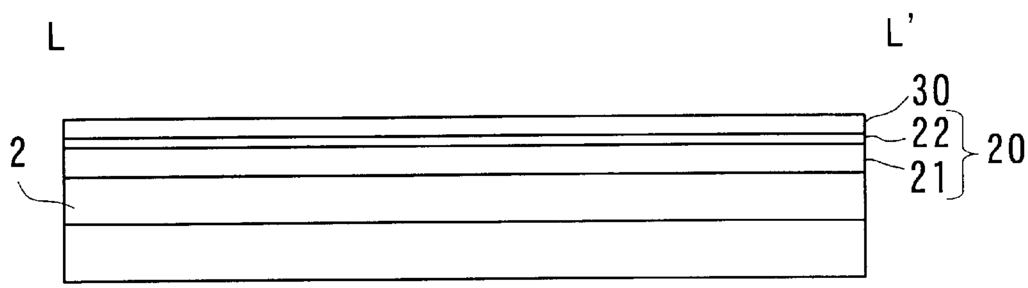

(Step 2) as shown in FIG. 160B and FIG. 167B, by continually applying plasma CVD on the above substrate plate, a gate insulation layer 2 comprised by a silicon nitride film of about 400 nm thickness and the semiconductor layer 20 comprised by the amorphous silicon layer 21 of about 250 nm thickness and $n^+$ amorphous silicon layer 22 of about 50 nm thickness are formed, and using sputtering the metallic layer 30 comprised by Mo of about 250 nm thickness is deposited, and through photolithographic processes, excepting at least the signal line 31 in the outer peripheral section Ss, high resistance line 95, signal line linking line 39 opposing the end section of the signal line 31, the metallic layer 30 and the semiconductor layer 20 are removed successively by etching.

Figure 160C:
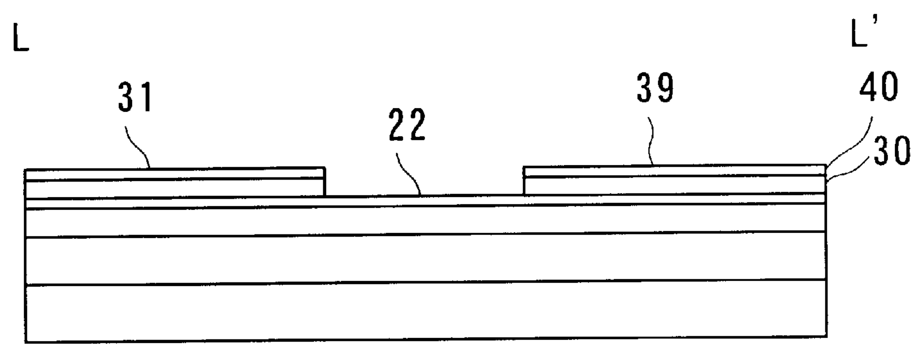

(Step 3) as shown in FIG. 160C and FIG. 167C the transparent conductive layer 40 comprised by ITO of about 50 nm thickness is formed by sputtering on the above substrate plate, and through photolithographic processes, leaving so as to cover each signal line 31 and signal line linking line 39, the transparent conductive layer 40 is removed by etching, and then the exposed metallic layer 30 is removed by etching. At this time, the transparent conductive layer 40 is left in such a way that the transparent conductive layer 40 extends above the gate insulation layer 2 by descending vertically along the lateral surface of the end section of the signal line linking line 39 to form the signal line silver bead section 97D.

Figure 160D:
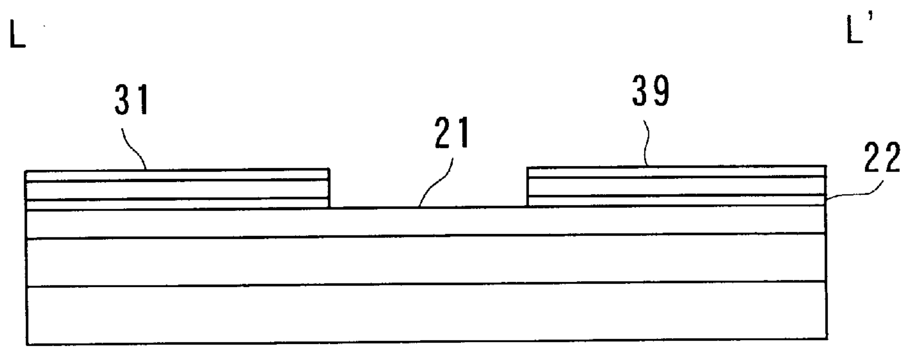

Next, as shown in FIG. 160D, concurrently-with forming the channel gap of the TFT section Tf, the $n^+$ amorphous silicon layer 22 is removed by etching to expose the portion of the amorphous silicon layer 21 that will form the high resistance line 95 of the space section between the end section of signal line 31 and the signal line linking line 39. Accordingly, the high resistance line 95 connected integrally to the end section of signal line 31 and the signal line linking line 39 can be formed integrally without increasing the number of manufacturing steps.

(Step 4) as shown in FIGS. 159A, 159B and FIGS. 166A, 166B, the protective insulation layer 3 comprised by the silicon nitride film of about 300 nm thickness is formed on the above substrate plate by plasma CVD, and through photolithographic processes, the opening section 68 punched through the protective insulation layer 3 above the signal line silver bead section 97D, and the opening section 69 punched through the protective insulation layer 3 and the gate insulation layer 2 above the common wiring silver bead section 97C, are formed.

Lastly, in the subsequent processing steps, Ag is melted and embedded in the silver bead section 97 through the opening sections 68, 69 so as to connect the respective signal line silver bead section 97D and the common wiring silver bead section 97C.

In this case, each signal line and common wiring line are linked by one high resistance line, but several high resistance lines may be provided.

In this embodiment, although the method of manufacturing is based on making the static charge protection element related to Embodiment 6, exactly the same process may be adopted in Embodiments 7–9. Also, in Embodiments 2, similar static charge protection elements may be manufactured according to the method.

In the active matrix substrate plate in Embodiment 33, even if unexpected electrical shock is applied to a signal line during subsequent manufacturing processes, because the potential can be dispersed effectively in the common wiring lines, it is possible to prevent shorting between the scanning lines and signal lines due to insulation breakdown and to prevent changes in the properties of TFT in the pixel region.

Embodiment 34

FIG. 161A is a perspective plan view of the two adjacent pixel regions Px of the signal line end side and a portion of the outer peripheral section Ss of the active matrix substrate plate in Embodiment 34, FIG. 161B is a cross sectional view through the plane M–M', FIGS. 162A–162D are cross sectional views through the plane M–M' to show the manufacturing steps of the outer peripheral section Ss, and refer to steps 1–3, respectively, and a channel-formed TFT. FIGS. 165, 166A–166B, and 167A–167C are the same as those in Embodiment 33.

In the active matrix substrate plate in Embodiment 34, in the outer peripheral section Ss of the signal line end side, provided are two lateral end sections 31T at the end section of each signal line 31, and the signal line linking section extension section 39E that extends from the signal line linking line 39 extending in the right angle direction to the signal line having a lateral end section 39T opposing the lateral end section 31T of the signal line across the space section. And, the two lateral end sections 31T of the signal line 31 and the lateral end section 39T of the opposing respective signal line linking line 39 are linked to each other by the high resistance line 95 comprised by amorphous silicon. Also, two parallel high resistance line 95 are provided and the lateral end sections 31T and 39T are formed symmetrically left to right between the signal line 31 end section and the signal line linking line extension section 39E about the vertical signal line. Also, the signal line linking line 39 is connected by a silver bead section 97 to the common wiring linking line 19 at one end section of the glass plate 1 where each common wiring line 13 of the display surface Dp is bound together.

The structure and method for manufacturing the display surface Dp and the terminal section of this active matrix substrate plate are the same as those presented in Embodiment 6, and therefore, their explanations are omitted here.

The active matrix substrate plate is manufactured according to the following four steps contained in the manufacturing steps described in Embodiment 6.

Figure 162A:

(Step 1) as shown in FIG. 162A and FIG. 167A, the first conductor layer 10 is formed by continually sputtering Al of about 200 nm thickness on the glass plate 1 to form the lower metallic layer 10A and a nitride film of Ti of about 100 nm thickness to form the upper metallic layer 10B, and through photolithographic processes, excepting the common wiring linking line 19 in the outer peripheral section Ss and the common wiring silver bead section 97C formed in its end, at least the portions for forming the high resistance line 95 and the signal line linking line 39 of the first conductor layer 10 are removed by etching.

Figure 162B:
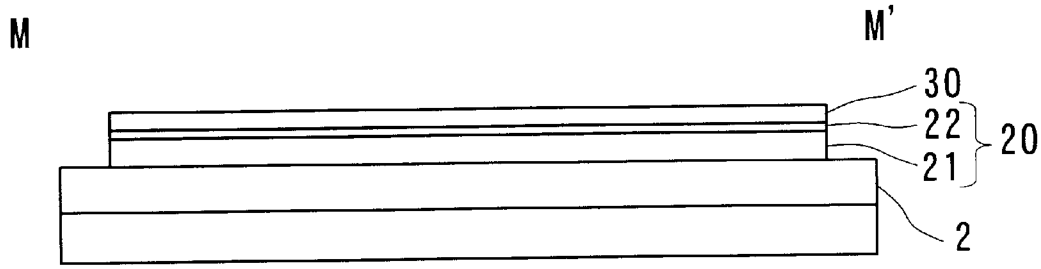

(Step 2) as shown in FIG. 162B and FIG. 167B, by continually applying plasma CVD on the above substrate plate, a gate insulation layer 2 comprised by a silicon nitride film of about 400 nm thickness and the semiconductor layer 20 comprised by the amorphous silicon layer 21 of about 250 nm thickness and $n^+$ amorphous silicon layer 22 of about 50 nm thickness are formed, and using sputtering the metallic layer 30 comprised by Mo of about 250 nm thickness is deposited, and through photolithographic processes, excepting at least the signal line 31 in the outer peripheral section Ss, signal line lateral end section 31T, signal line linking line lateral end section 39T, signal line linking line extension section 39E, and the portion to form the signal line linking line 39, the metallic layer 30 and the semiconductor layer 20 are removed successively by etching.

Figure 162C:
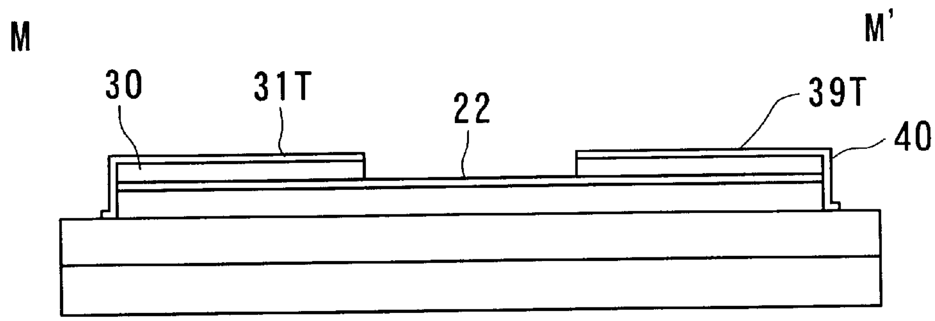

(Step 3) as shown in FIG. 162C and FIG. 167C, the transparent conductive layer 40 comprised by ITO of about 50 nm thickness is formed by sputtering on the above substrate plate, and through photolithographic processes, leaving so as to cover each signal line 31, signal line linking line 39, signal line linking line extension section 39E, and so as to form the space section between the signal line lateral end section 31T and the signal line linking line lateral end section 39T, the transparent conductive layer 40 is removed by etching, and then the metallic layer 30 exposed in the space section is removed by etching. At this time, the transparent conductive layer 40 is left in such a way that the transparent conductive layer 40 extends above the gate insulation layer 2 by descending vertically along the lateral surface of the end section of the signal line linking line 39 to form the signal line silver bead section 97D.

Figure 162D:
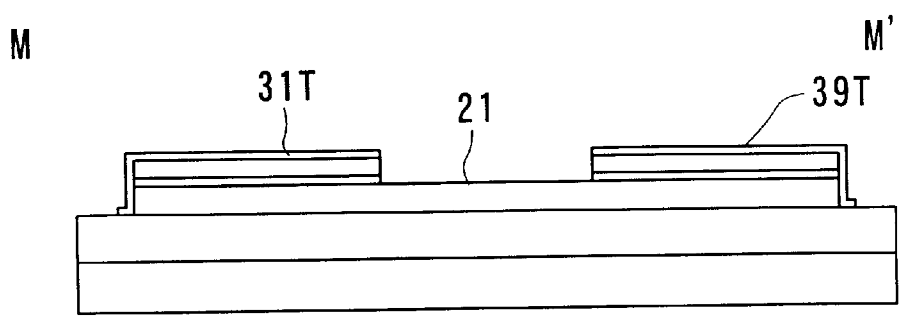

Next, as shown in FIG. 162D, concurrently with forming the channel gap of the TFT section Tf, the $n^+$ amorphous silicon layer 22 is removed by etching to expose the portion of the amorphous silicon layer 21 that will form the high resistance line of the space section between the signal line lateral end section 31T and the signal line linking line lateral end section 39T. Accordingly, the high resistance line 95 connected integrally to the signal line lateral end section 31T and the signal line linking line lateral end section 39T can be formed integrally without increasing the number of manufacturing steps.

(Step 4) as shown in FIGS. 161A, 161B and FIGS. 166A, 166B, the protective insulation layer 3 comprised by the silicon nitride film of about 300 nm thickness is formed on the above substrate plate by plasma CVD, and through photolithographic processes, the opening section 68 punched through the protective insulation layer 3 above the signal line silver bead section 97D, and the opening section 69 punched through the protective insulation layer 3 and the gate insulation layer 2 above the common wiring silver bead section 97C, are formed.

Lastly, in the subsequent processing steps, Ag is melted and embedded in the silver bead section 97C through the opening sections 68, 69 so as to connect the respective signal line silver bead section 97D and the common wiring silver bead section 97C.

In this case, each signal line lateral end section and signal line linking line lateral end section are linked by two high resistance lines, but one high resistance line or more than two high resistance lines may be provided.

In this embodiment, although the method of manufacturing is based on making the static charge protection element related to Embodiment 6, exactly the same process may be adopted in Embodiments 7–9. Also, in Embodiments 2, similar static charge protection elements may be manufactured according to the method.

In the active matrix substrate plate in Embodiment 34, even if unexpected electrical shock is applied to a signal line during subsequent manufacturing processes, because the potential can be dispersed effectively in the common wiring lines, it is possible to prevent shorting between the scanning lines and signal lines due to insulation breakdown and to prevent changes in the properties of TFT in the pixel region.

Embodiment 35

FIG. 163A is a perspective plan view of the two adjacent pixel regions Px of the signal line end side and a portion of the outer peripheral section Ss of the active matrix substrate plate in Embodiment 35, FIG. 163B is a cross sectional view through the plane N–N', FIGS. 164A–164D are cross sectional views through the plane N–N' to show the manufacturing steps of the outer peripheral section Ss, and refer to steps 1–3, respectively, and a channel-formed TFT. FIGS. 165, 166A–166B, and 167A–167C are the same as those in Embodiment 33.

In the active matrix substrate plate in Embodiment 35, in the outer peripheral section Ss of the signal line end side, provided are two lateral end sections 31T at the end section of each signal line 31, and the signal line linking section extension section 39E that extends from the signal line linking line 39 extending in the right angle direction to the signal line having a lateral end section 39T opposing the lateral end section 31T of the signal line across the space section. And, on the glass plate 1, the floating electrode 96 comprised by the first conductor layer 10 is formed, and the respective end sections of the floating electrode are disposed so as to superimpose on the opposing signal line lateral end section 31T and the signal line linking line lateral end section 39T across the gate insulation layer 2 and the amorphous silicon layer 21. Also, the lateral end sections are formed symmetrically left to right between the signal line 31 end section and the signal line linking line extension section 39E about the vertical signal line. Also, the signal line linking line 39 is connected by a silver bead section 97 to the common wiring linking line 19 at one end section of the glass plate 1 where each common wiring line 13 of the display surface Dp is bound together.

The structure and method for manufacturing the display surface Dp and the terminal section of this active matrix substrate plate are the same as those presented in Embodiment 6, and therefore, their explanations are omitted here.

The active matrix substrate plate is manufactured according to the following four steps contained in the manufacturing steps described in Embodiment 6.

Figure 164A:
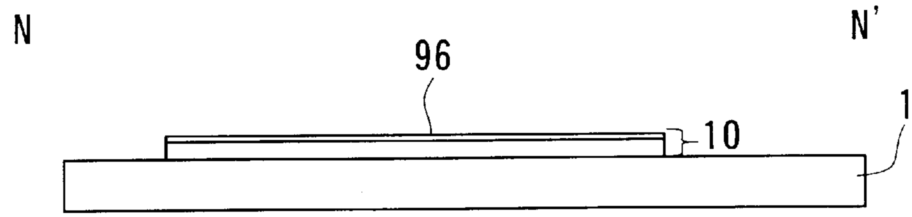

(Step 1) as shown in FIG. 164A and FIG. 167A, the first conductor layer 10 is formed by continually sputtering Al of about 200 nm thickness on the glass plate 1 to form the lower metallic layer 10A and a nitride film of Ti of about 100 nm thickness to form the upper metallic layer 10B, and through photolithographic processes, excepting at least the common wiring linking line 19 in the outer peripheral section Ss and common wiring silver bead section 97C formed in its end and the floating electrode 96 extending in such a way that the both end section respectively superimpose on the signal line lateral end section 31T and the signal line linking line lateral end section 39T, the first conductor layer 10 is removed by etching.

Figure 164B:
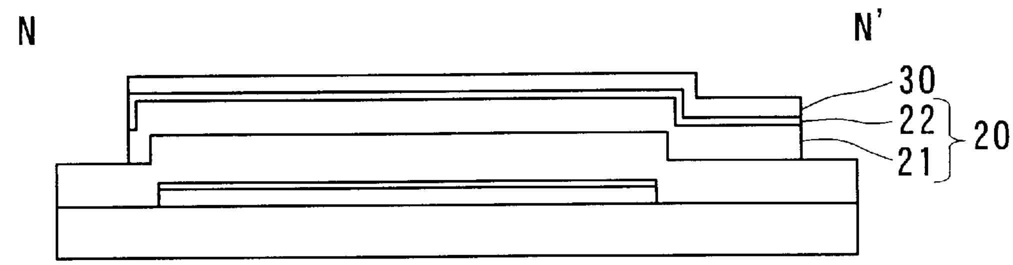

(Step 2) as shown in FIG. 164B and FIG. 167B, by continually applying plasma CVD on the above substrate plate, a gate insulation layer 2 comprised by a silicon nitride film of about 400 nm thickness and the semiconductor layer 20 comprised by the amorphous silicon layer 21 of about 250 nm thickness and $n^+$ amorphous silicon layer 22 of about 50 nm thickness are formed, and using sputtering the metallic layer 30 comprised by Mo of about 250 nm thickness is deposited, and through photolithographic processes, excepting at least the signal line 31 in the outer peripheral section Ss, signal line lateral end section 31T, signal line linking line lateral end section 39T, signal line linking line extension section 39E, and the portion to form the signal line linking line 39, the metallic layer 30 and the semiconductor layer 20 are removed successively by etching.

Figure 164C:
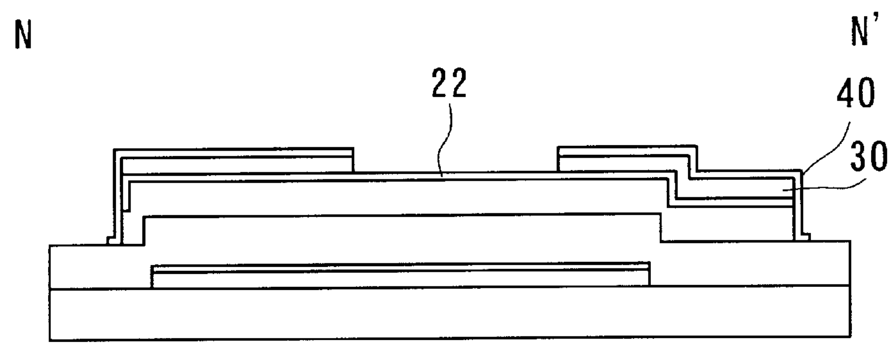

(Step 3) as shown in FIG. 164C and FIG. 167C, the transparent conductive layer 40 comprised by ITO of about 50 nm thickness is formed by sputtering on the above substrate plate, and through photolithographic processes, leaving so as to cover each signal line 31, signal line linking line 39, signal line linking line extension section 39E, and so as to form the space section between the signal line lateral end section 31T and the signal line linking line end section 39T, the transparent conductive layer 40 is removed by etching, and then the metallic layer 30 exposed in the space section is removed by etching. At this time, the transparent conductive layer 40 is left in such a way that the transparent conductive layer 40 extends above the gate insulation layer 2 by descending vertically along the lateral surface of the end section of the signal line linking line 39 to form the signal line silver bead section 97D.

Figure 164D:
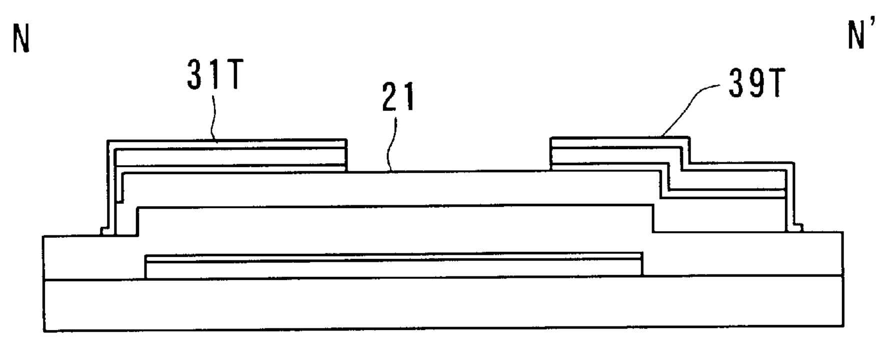

Next, as shown in FIG. 164D, concurrently with forming the channel gap of the TFT section Tf, the $n^+$ amorphous silicon layer 22 is removed by etching to expose the amorphous silicon layer 21 of the space section between the signal line lateral end section 31T and the signal line linking line lateral end section 39T.

(Step 4) as shown in FIGS. 163A, 163B and FIGS. 166A, 166B, the protective insulation layer 3 comprised by the silicon nitride film of about 300 nm thickness is formed on the above substrate plate by plasma CVD, and through photolithographic processes, the opening section 68 punched through the protective insulation layer 3 above the signal line silver bead section 97D, and the opening section 69 punched through the protective insulation layer 3 and the gate insulation layer 2 above the common wiring silver bead section 97C, are formed.

Lastly, in the subsequent processing steps, Ag is melted and embedded in the silver bead section 97 through the opening sections 68, 69 so as to connect the respective signal line silver bead section 97D and the common wiring silver bead section 97C.

In this case, two static charge protection elements having floating electrodes serving as the gate electrodes are provided in parallel, but one or more than two pieces may be provided.

In this embodiment, although the method of manufacturing is based on making the static charge protection element related to Embodiment 6, exactly the same process may be adopted in Embodiments 7–9. Also, in Embodiments 2, similar static charge protection elements may be manufactured according to the method.

In the active matrix substrate plate in Embodiment 35, the static charge protection element having the floating electrode as the gate electrode serves as the protective transistor so that, even if unexpected electrical shock is applied to a signal line during subsequent manufacturing processes, because the potential can be dispersed effectively in the common wiring lines, it is possible to prevent shorting between the scanning lines and signal lines due to insulation breakdown and to prevent changes in the properties of TFT in the pixel region.

Embodiment 36

FIG. 168 is a schematic diagram of the wiring formed on the outer peripheral section Ss of the active matrix substrate plate, and FIG. 169 is a perspective plan view of the protective transistor section 80 in FIG. 168, FIG. 170A is a cross sectional view through the plane A–A', and FIG. 171A is a cross sectional view through the plane B–B'. FIGS. 170B–170E and 171B–171E are cross sectional views through the planes A–A' and B–B' to show the manufacturing the protective transistor section 80, and refer to steps 1–3 and a channel-formed TFT. FIG. 172 is an equivalent circuit diagram to show the operation of the protective transistor section 80.

In the active matrix substrate plate in Embodiment 36, the signal line 31 extending from each pixel region Px to the outer peripheral section Ss, and at each intersection points of the signal lines 31 crossing the common wiring lines 13 in the outer peripheral section Ss, a protective transistor section 80 is provided. The protective transistor section 80 is comprised by a first transistor section 81 and a second transistor section 82. When the potential of the common wiring line 13 exceeds a certain threshold value and becomes higher than the potential of the signal line 31, the first transistor section 81 turns on to conduct current from the common wiring line 13 to the signal line 31. On the other hand, the second transistor section 82 turns on when the potential of the signal line 31 exceeds a certain threshold value and becomes higher than the potential of the common wiring line 13 to conduct current from the signal line 31 to the common wiring line 13. Even if a potential difference is generated between the signal line 31 and the common wiring line 13 by electrical shock, the potential difference is negated by the above effects, it is possible to prevent shorting between the scanning lines and signal lines due to insulation breakdown and to prevent changes in the properties of TFT in the pixel region. Similar protective transistor section 80 may be formed between the scanning lines 11 and the common wiring lines 13.

The structure and method for manufacturing the display surface Dp and the terminal section of this active matrix substrate plate are the same as those presented in Embodiment 10, and therefore, their explanations are omitted here.

The active matrix substrate plate is manufactured according to the following four steps contained in the manufacturing steps described in Embodiment 10.

Figure 170B:
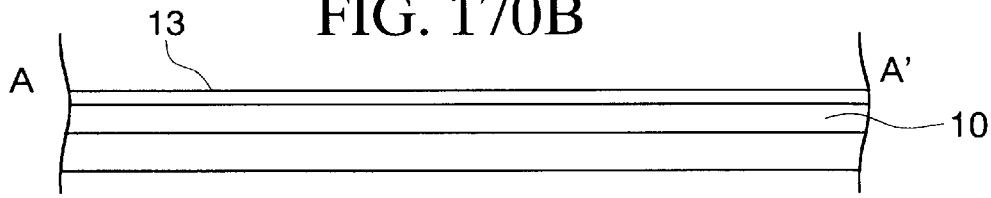
Figure 171B:
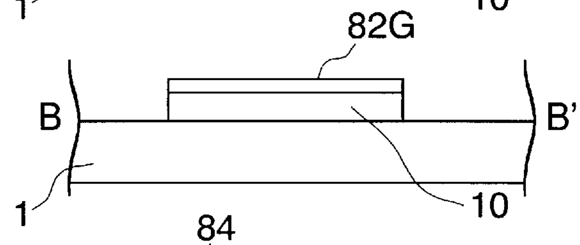

(Step 1) as shown in FIG. 170B and FIG. 171B, the first conductor layer 10 is formed by continually sputtering Al of about 200 nm thickness on the glass plate 1 to form the lower metallic layer 10A and Ti of about 100 nm thickness to form the upper metallic layer 10B, and through photolithographic processes, excepting the protective transistor section 80, the common wiring line 13, first transistor gate electrode 81G connected to the common wiring line 13, and the second transistor gate electrode 82G formed in a location independent of the common wiring line 13, the first conductor layer 10 is removed by etching.

Figure 170C:
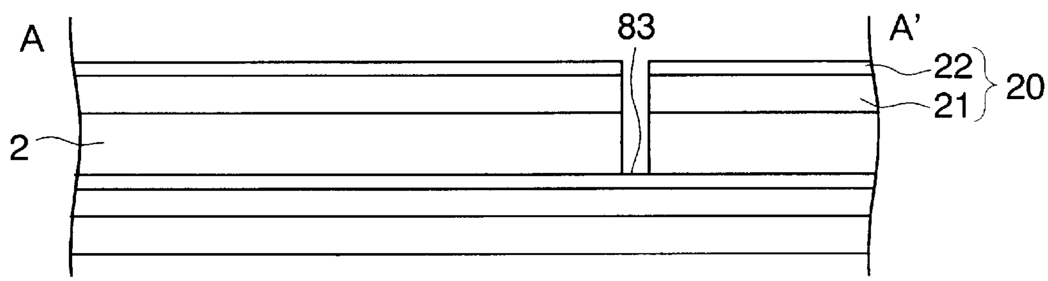
Figure 171C:
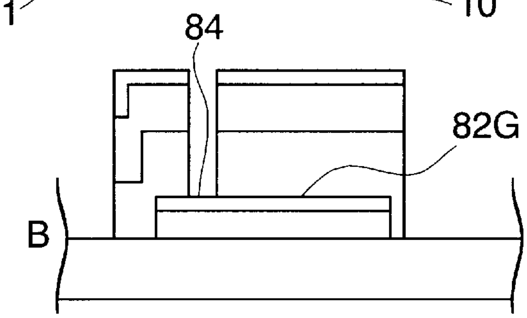

(Step 2) as shown in FIG. 170C and FIG. 171C, by continually applying plasma CVD on the above substrate plate, a gate insulation layer 2 comprised by a silicon nitride film of about 400 nm thickness and the semiconductor layer 20 comprised by the amorphous silicon layer 21 of about 250 nm thickness and $n^+$ amorphous silicon layer 22 of about 50 nm thickness are formed. Next, through photolithographic processes, excepting the opening section 83 reaching the common wiring line 13, two opposing opening sections 81H reaching the first transistor gate electrode 81G, opening section 84 reaching the second transistor gate electrode 82G, and opposing two opening sections 82H, and leaving so as to cover the upper surfaces and an entire lateral surfaces of the common wiring line 13 and the first transistor gate electrode 81G and second transistor gate electrode 82G with the gate insulation layer 2, semiconductor layer 20 and the gate insulation layer 2 are removed successively by etching.

Figure 170D:
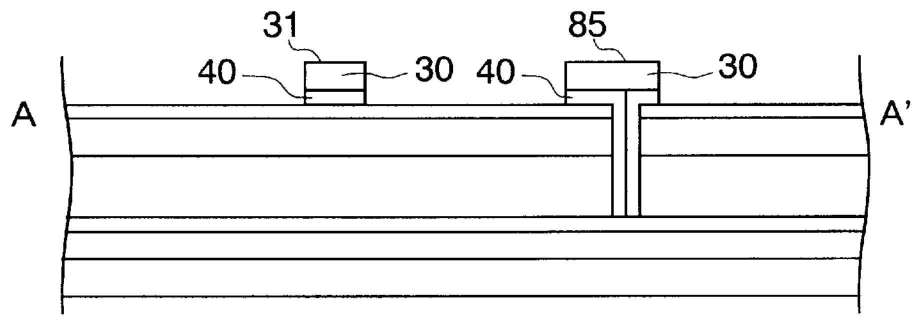
Figure 171D:
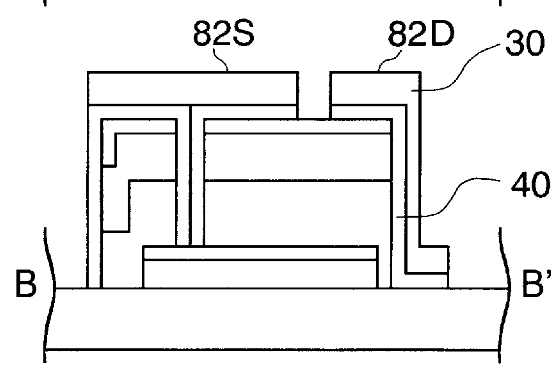

(Step 3) as shown in FIG. 170D and FIG. 171D, by applying plasma CVD process on the above substrate plate, the transparent conductive layer 40 comprised by ITO of about 50 nm thickness and the metallic layer 30 comprised by Cr of about 200 nm thickness are deposited to form the second conductor layer 50. Next, through photolithographic processes, leaving each signal line 31, first transistor drain electrode 81D and second transistor source electrode 82S formed by extending from the signal line to the first transistor section 81 and second transistor section 82, respectively, distribution electrode 85 formed independently above the opening section 83, and the first transistor source electrode 81S and second transistor drain electrode 82D formed by extending from the distribution electrode to the first transistor section 81 and second transistor section 82, respectively, the metallic layer 30 and the transparent conductive layer 40 are removed by etching. By so doing, the common wiring line 13 and the distribution electrode 85, second transistor gate electrode 82G and second transistor source electrode 82S are connected through the opening sections 83, 84.

Figure 170E:
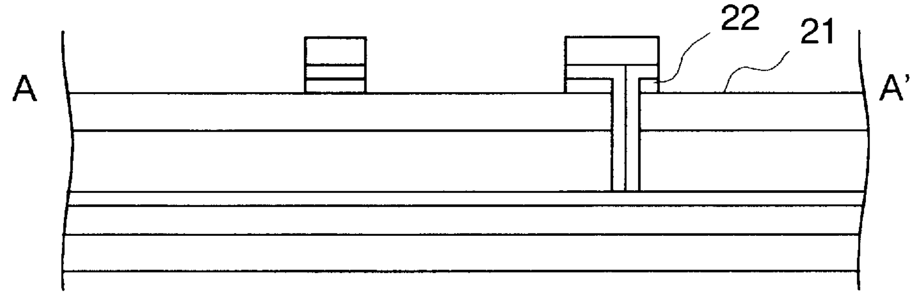
Figure 171E:
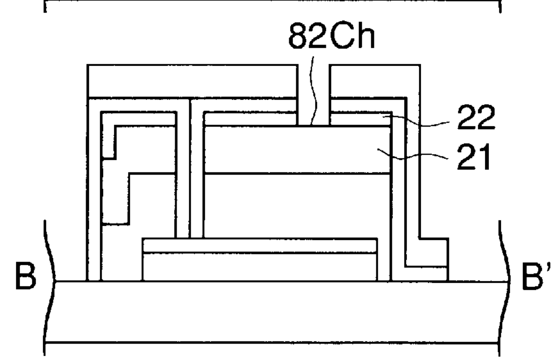

Next, as shown in FIG. 170E and FIG. 171E, using the masking pattern used in the etching process or the second conductor layer 50 after removing its masking, the exposed $n^+$ amorphous silicon layer 22 is removed by etching. Accordingly, channel gaps 81Ch, 82Ch, respectively, of the first transistor section 81 and the second transistor section 82, are formed and in the direction of the extending channel gap, the amorphous silicon layer 21 is exposed beyond the opening sections 81H, 82H.

(Step 4) as shown in FIGS. 169, 170A, 171A, the protective insulation layer 3 comprised by the silicon nitride film of about 150 nm thickness is formed on the above substrate plate by plasma CVD, and through photolithographic processes, leaving so as to cover at least the upper surfaces and an entire lateral surfaces of the signal line 31 and the distribution electrode 85 with the protective insulation layer 3 and so as to form semiconductor layer of the first transistor section 81 and the second transistor section 82, the protective insulation layer 3 and the amorphous silicon layer 21 are successively removed by etching. At this time, the opening sections 81H, 82H and the perimeter section of the protective insulation layer 3 are intersected, and leaving the protective insulation layer 3 above the first transistor section 81 and the second transistor section 82 in such a way that the perimeter section of the protective insulation layer covers a portion of the lateral surface of the channels gaps 81Ch, 82Ch side of the amorphous silicon layer 21 exposed at the opening section 81H, 82H, the protective insulation layer and the amorphous silicon layer in the outside are removed by etching.

In this embodiment, the method of manufacturing the protective transistor in Embodiment 10 is explained, but the protective transistor may be formed in exactly the same manner for Embodiments 11–17.

In the active matrix substrate plate in Embodiment 36, because the opening section to reach the first conductor layer is made in step 2, the first conductor layer and the second conductor layer can be electrically connected, and it is possible to manufacture the active matrix substrate plate including the protective transistor in four steps.

Embodiment 37

FIG. 168 is a schematic diagram of the wiring formed on the outer peripheral section Ss of the active matrix substrate plate, and FIG. 173 is a perspective plan view of the protective transistor section 80 in FIG. 168, and FIG. 174A is a cross sectional view through the plane A–A', and FIG. 175A is a cross sectional view through the plane B–B'. FIGS. 174B–174E and FIGS. 175B–175E are cross sectional views through the planes A–A' and B–B' to show the manufacturing steps of the protective transistor section 80, and refer to steps 1–3 and after forming the channel. FIG. 176 is an equivalent circuit diagram to show the operation of the protective transistor section 80.

In the active matrix substrate plate in Embodiment 37, the signal line 31 extending from each pixel region Px to the outer peripheral section Ss, and at each intersection points of the signal lines 31 crossing the common wiring lines 13 in the outer peripheral section Ss, a protective transistor section 80 is provided. The protective transistor section 80 is comprised by a first transistor section 81 and a second transistor section 82. Operation of the protective transistor is the same as that described in Embodiment 36. Similar protective transistor section 80 may be formed between the scanning lines 11 and the common wiring lines 13.

The structure and method for manufacturing the display surface Dp and the terminal section of this active matrix substrate plate are the same as those presented in Embodiment 18, and therefore, their explanations are omitted here.

The active matrix substrate plate is manufactured according to the following four steps contained in the manufacturing steps described in Embodiment 18.

Figure 174B:
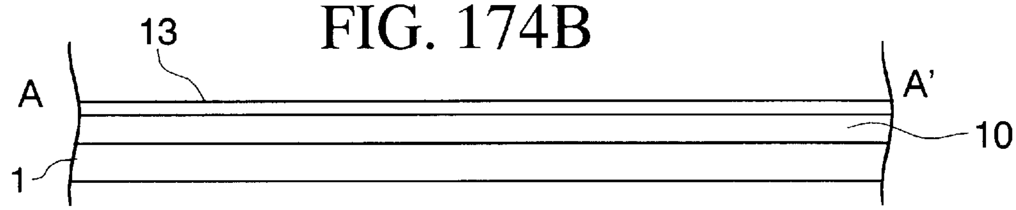
Figure 175B:
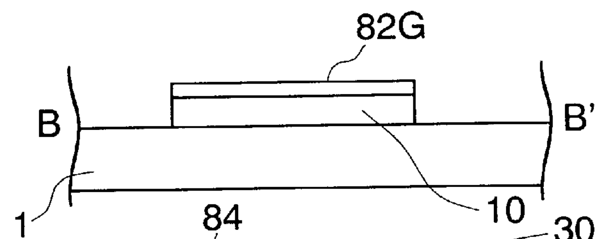

(Step 1) as shown in FIG. 174B and FIG. 175B, the first conductor layer 10 is formed by continually sputtering Al of about 200 nm thickness on the glass plate 1 to form the lower metallic layer 10A and Ti of about 100 nm thickness to form the upper metallic layer 10B, and through photolithographic processes, excepting the protective transistor section 80, the common wiring line 13, first transistor gate electrode 81G connected to the common wiring line 13, second transistor gate electrode 82G formed in a location independent of the common wiring line 13, the first conductor layer 10 is removed by etching.

Figure 174C:
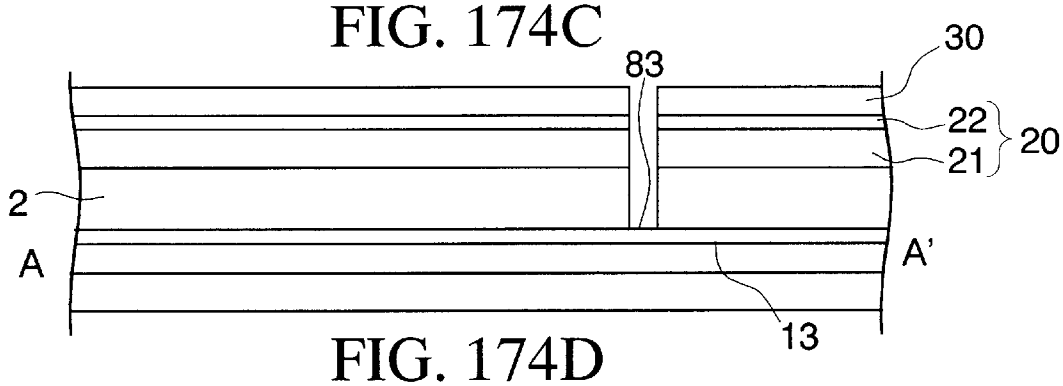
Figure 175C:
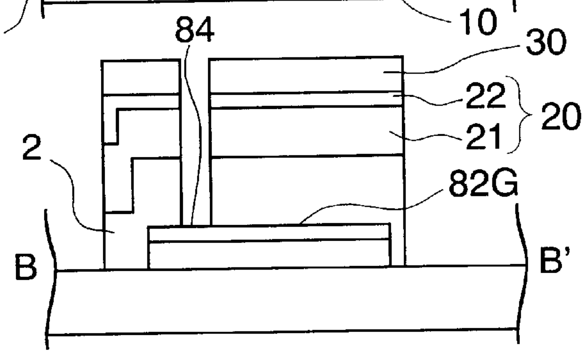

(Step 2) as shown in FIG. 174C and FIG. 175C, by continually applying plasma CVD on the above substrate plate, a gate insulation layer 2 comprised by a silicon nitride film of about 400 nm thickness and the semiconductor layer 20 comprised by the amorphous silicon layer 21 of about 250 nm thickness and $n^+$ amorphous silicon layer 22 of about 50 nm thickness are formed, and continuing, the metallic layer 30 comprised by Cr of about 200 nm thickness is deposited by sputtering. Next, through photolithographic processes, excepting the opening section 83 reaching the common wiring line 13, two opposing opening sections 81H reaching the first transistor gate electrode 81G, opening section 84 reaching the second transistor gate electrode 82G, and opposing two opening sections 82H, and leaving so as to cover the upper surfaces and an entire lateral surfaces of the common wiring line 13 and the first transistor gate electrode 81G and second transistor gate electrode 82G with the gate insulation layer 2, the metallic layer 30, semiconductor layer 20 and the gate insulation layer 2 are removed successively by etching.

Figure 174D:
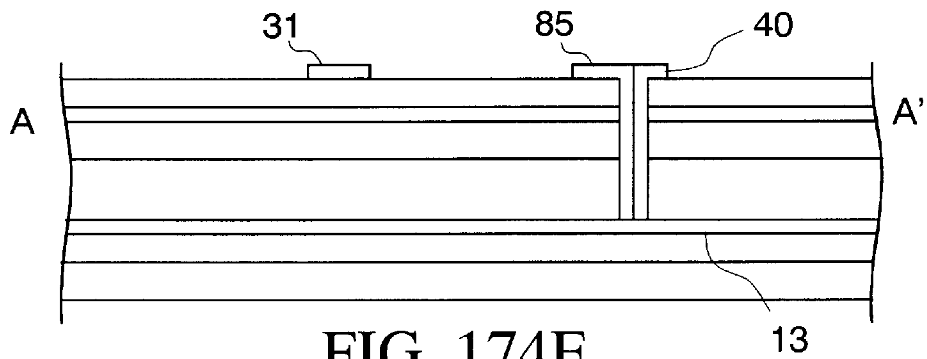
Figure 174E:
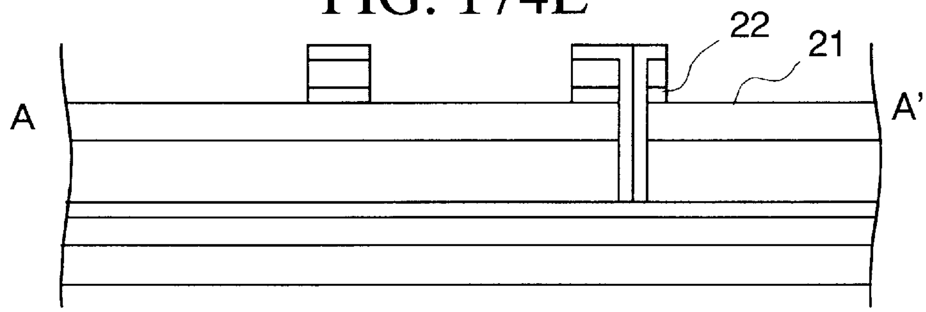
Figure 175D:
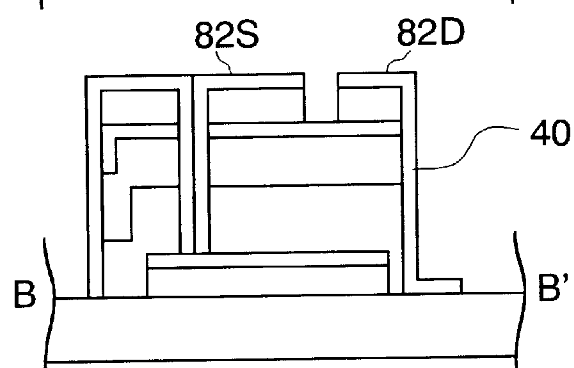
Figure 175E:
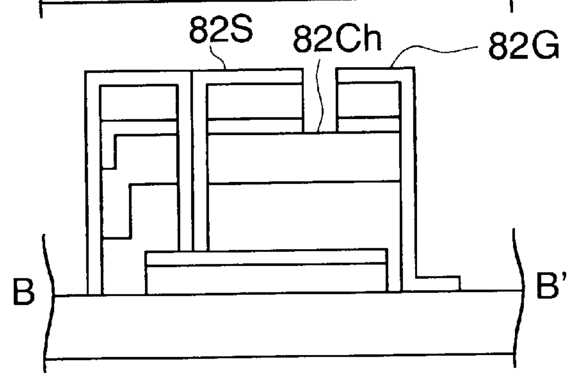

(Step 3) as shown in FIG. 174D and FIG. 175D, on the above substrate plate, the transparent conductive layer 40 comprised by ITO of about 50 nm thickness is formed by sputtering and, through photolithographic processes, excepting the signal line 31, first transistor drain electrode 81D and second transistor source electrode 82S formed by extending from the signal line to the first transistor section 81 and second transistor section 82, distribution electrode 85 formed independently above the opening section 83, and the first transistor source electrode 81S and second transistor drain electrode 82D formed by extending from the distribution electrode to the first transistor section 81 and second transistor section 82, the transparent conductive layer 40 is removed by etching. Next, the exposed metallic layer 30 is removed by etching. Accordingly, the common wiring line 13 and the distribution electrode 85, second transistor gate electrode 82G and second transistor source electrode 82S are connected through the opening sections 83, 84.

Next, as shown in FIG. 174D and FIG. 175D, using the masking pattern used in the etching process or the transparent conductive layer 40 after removing its masking, the exposed $n^+$ amorphous silicon layer 22 is removed by etching. Accordingly, channel gaps 81Ch, 82Ch, respectively, of the first transistor section 81 and the scanned transistor section 82, are formed and in the direction of the extending channel gap, the amorphous silicon layer 21 is exposed beyond the opening sections 81H, 82H.

(Step 4) as shown in FIGS. 173, 174A, and 175A, the protective insulation layer 3 comprised by the silicon nitride film of about 150 nm thickness is formed on the above substrate plate by plasma CVD, and through photolithographic processes, leaving so as to cover at least the upper surfaces and an entire lateral surfaces of the signal line 31 and the distribution electrode 85 with the protective insulation layer 3 and so as to form semiconductor layer of the first transistor section 81 and the second transistor section 82, the protective insulation layer 3 and the amorphous silicon layer 21 are successively removed by etching. At this time, the opening sections 81H, 82H and the perimeter section of the protective insulation layer 3 are intersected, and leaving the protective insulation layer 3 above the first transistor section 81 and the second transistor section 82 in such a way that the perimeter section of the protective insulation layer covers a portion of the lateral surface of the channels gaps 81Ch, 82Ch side of the amorphous silicon layer 21 exposed at the opening section 81H, 82H, the outer protective insulation layer and the amorphous silicon layer are removed by etching.

In this embodiment, the method of manufacturing the protective transistor in Embodiment 18 is explained, but the protective transistor may be formed in exactly the same manner for Embodiments 19–25.

In the active matrix substrate plate in Embodiment 37, because the opening section to reach the first conductor layer is made in step 2, the first conductor layer and the second conductor layer can be electrically connected, and it is possible to manufacture the active matrix substrate plate including the protective transistor in four steps.

Embodiment 38

FIG. 177A is a perspective plan view of a one-pixel-region of the active matrix substrate plate, and FIG. 177B is a cross sectional view of the accumulation capacitance section Cp through the plane D–D'. Also, FIGS. 178A–178D are diagrams to show the manufacturing process for the accumulation capacitance section Cp, and refer to steps 1–3, and a channel-formed TFT.

In the active matrix substrate plate in Embodiment 38, the accumulation capacitance section Cp is formed so that the conductor layer 10 of the forestage scanning line 11 and the transparent conductive layer 40 extending from the pixel electrode 41 in the pixel region Px are opposite to each other across the lamination comprised by the gate insulation layer 2 and the semiconductor layer 20. In the accumulation capacitance section Cp, the lateral end surfaces of the transparent conductive layer 40 and the semiconductor layer 20 are aligned.

The structure and method for manufacturing this active matrix substrate plate excepting the accumulation capacitance section Cp are the same as those presented in Embodiment 10, and therefore, their explanations are omitted here.

The active matrix substrate plate is manufactured according to the following four steps contained in the manufacturing steps described in Embodiment 10.

Figure 178A:
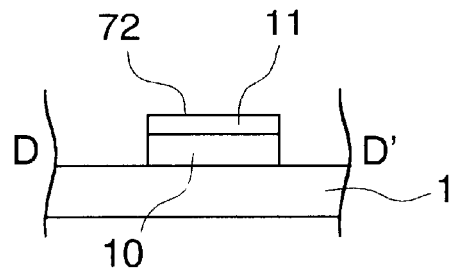

(Step 1) as shown in FIG. 178A, the first conductor layer 10 is formed by continually sputtering Al of about 200 nm thickness on the glass plate 1 to form the lower metallic layer 10A and Ti of about 100 nm thickness to form the upper metallic layer 10B, and through photolithographic processes, leaving the forestage scanning line 11 in the pixel region Px so as to form the accumulation common electrode 72 in the accumulation capacitance section Cp in each pixel region, the first conductor layer 10 is removed by etching.

Figure 178B:
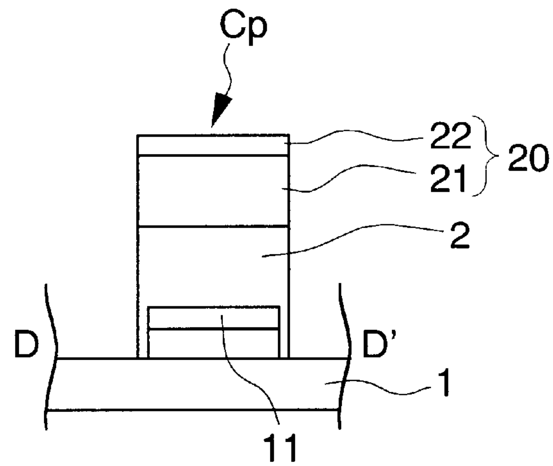

(Step 2) as shown in FIG. 178B, by continually applying plasma CVD on the above substrate plate, a gate insulation layer 2 comprised by a silicon nitride film of about 400 nm thickness and the semiconductor layer 20 comprised by the amorphous silicon layer 21 of about 250 nm thickness and $n^+$ amorphous silicon layer 22 of about 50 nm thickness are formed. Next, through photolithographic processes, leaving so as to cover at least the upper surface and an entire lateral surface of the scanning line 11 with the gate insulation layer 2, the semiconductor layer 20 and the gate insulation layer 2 are successively removed by etching.

Figure 178C:
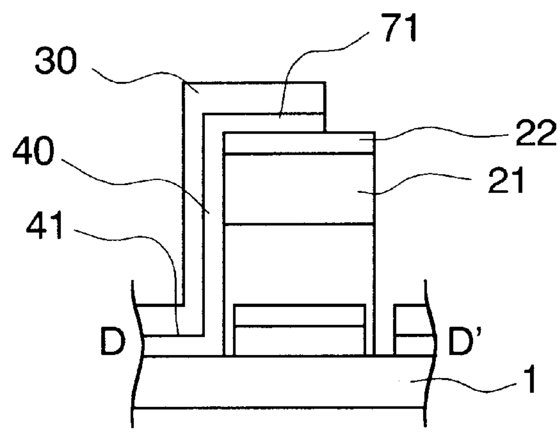

(Step 3) as shown in FIG. 178C, by continually sputtering on the above substrate plate, the transparent conductive layer 40 comprised by ITO of about 50 nm thickness and the metallic layer 30 comprised by Cr of about 200 nm thickness are deposited to form the second conductor layer 50. Next, through photolithographic processes, leaving so as to form the accumulation capacitance electrode 71 extending from the pixel region 41 to the accumulation capacitance section Cp, the metallic layer 30 and the transparent conductive layer 40 are successively removed by etching.

Figure 178D:
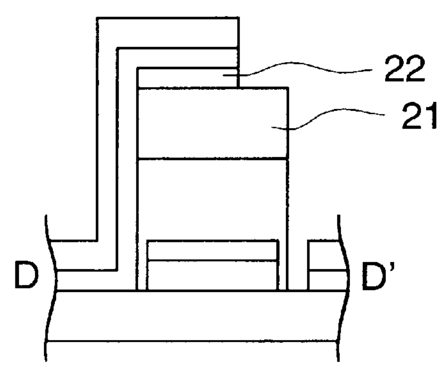

Next, as shown in FIG. 178D, using the masking pattern used in the etching process or the second conductor layer 50 after removing its masking, the exposed $n^+$ amorphous silicon layer 22 is removed by etching.

(Step 4) as shown in FIG. 177B, the protective insulation layer 3 comprised by the silicon nitride film of about 150 nm thickness is formed on the above substrate plate by plasma CVD, and through photo-lithographic processes, the protective insulation layer 3 and the amorphous silicon layer 21 where the accumulation capacitance section Cp is formed are removed successively by etching. Next, the metallic layer 30 above the exposed transparent conductive layer 40 is removed by etching to expose the transparent conductive layer 40.

In this embodiment, the method of manufacturing the accumulation capacitance in Embodiment 10 is explained, but the accumulation capacitance may be formed in exactly the same manner for Embodiments 11–17.

In the active matrix substrate plate in Embodiment 38, because it is made so as to align the lateral end surfaces of the transparent conductive layer and the semiconductor layer in the accumulation capacitance section, it is possible to manufacture the active matrix substrate plate including the accumulation capacitance in four steps.

Embodiment 39

FIG. 179A is a perspective plan view of a one-pixel-region of the active matrix substrate plate, and FIG. 179B is a cross sectional view of the accumulation capacitance section Cp through the plane D–D'. Also, FIGS. 180A–180D are diagrams to show the manufacturing process for the accumulation capacitance section Cp of this active matrix substrate plate, and refer to steps 1–3, and a channel-formed TFT.

In the active matrix substrate plate in Embodiment 39, the accumulation capacitance section Cp is formed so that the conductor layer 10 of the forestage scanning line 11 and the transparent conductive layer 40 extending from the pixel electrode 41 in the pixel region Px are opposite to each other across the lamination comprised by the gate insulation layer 2 and the semiconductor layer 20. In the accumulation capacitance section Cp, the lateral end surfaces of the transparent conductive layer 40 and the metallic layer 30 and the semiconductor layer 20 are aligned.

The structure and method for manufacturing this active matrix substrate plate excepting the accumulation capacitance section Cp are the same as those presented in Embodiment 18, and therefore, their explanations are omitted here.

The active matrix substrate plate is manufactured according to the following four steps contained in the manufacturing steps described in Embodiment 18.

Figure 180A:
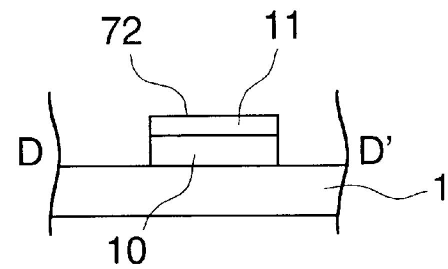

(Step 1) as shown in FIG. 180A, the first conductor layer 10 is formed by continually sputtering Al of about 200 nm thickness on the glass plate 1 to form the lower metallic layer 10A and Ti of about 100 nm thickness to form the upper metallic layer 10B, and through photolithographic processes, leaving the forestage scanning line 11 in the pixel region Px so as to form the accumulation common electrode 72 in the accumulation capacitance section Cp in each pixel region, the first conductor layer 10 is removed by etching.

Figure 180B:
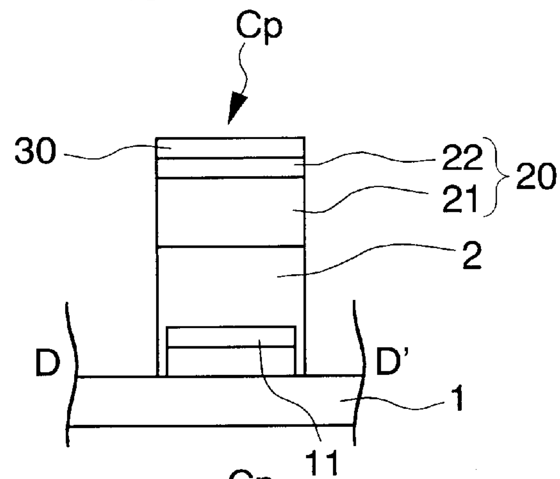

(Step 2) as shown in FIG. 180B, by continually applying plasma CVD on the above substrate plate, a gate insulation layer 2 comprised by a silicon nitride film of about 400 nm thickness and the semiconductor layer 20 comprised by the amorphous silicon layer 21 of about 250 nm thickness and $n^+$ amorphous silicon layer 22 of about 50 nm thickness, and continuing, the metallic layer 30 comprised by Cr of about 200 nm thickness is sputtered. Next, through photolithographic processes, leaving so as to cover the upper surface and an entire lateral surface of the scanning line 11 with the gate insulation layer 2, the metallic layer 30, semiconductor layer 20 and the gate insulation layer 2 are successively removed by etching.

Figure 180C:
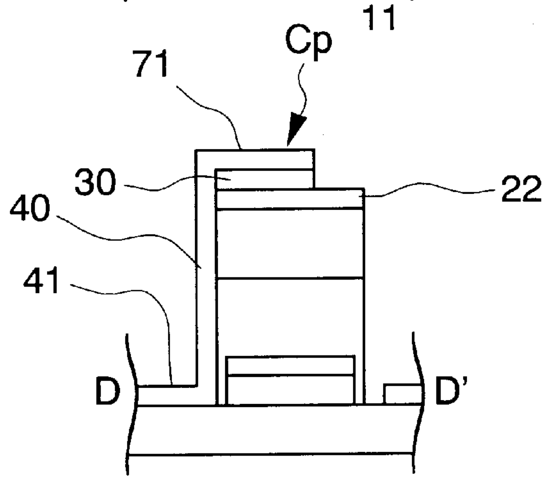

(Step 3) as shown in FIG. 180C, by continually sputtering on the above substrate plate, the transparent conductive layer 40 comprised by ITO of about 50 nm thickness is formed. Next, through photolithographic processes, leaving so as to form the accumulation capacitance electrode 71 extending from the pixel electrode 41 to the accumulation capacitance section Cp, the transparent conductive layer 40 is removed by etching, and next, the exposed metallic layer 30 is removed by etching.

Figure 180D:
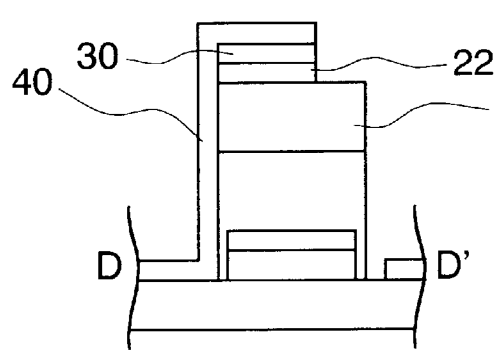

Next, as shown in FIG. 180D, using the masking pattern used in the etching process or the transparent conductive layer 40 after removing its masking, the exposed $n^+$ amorphous silicon layer 22 is removed by etching:

(Step 4) as shown in FIG. 179B, the protective insulation layer 3 comprised by the silicon nitride film of about 150 nm thickness is formed on the above substrate plate by plasma CVD, and through photo-lithographic processes, the protective insulation layer 3 and the amorphous silicon layer 21 where the accumulation capacitance section Cp is formed are removed successively by etching.

In this embodiment, the method of manufacturing the accumulation capacitance in Embodiment 18 is explained, but the accumulation capacitance may be formed in exactly the same manner for Embodiments 19–25.

In the active matrix substrate plate in Embodiment 39, because the lateral end surfaces of the transparent conductive layer, metallic layer and the semiconductor layer are aligned in the accumulation capacitance section, it is possible to manufacture the active matrix substrate plate including the accumulation capacitance in four steps.

What is claimed is:

1. A method for manufacturing an active matrix substrate plate formed on a transparent insulating substrate plate having an array of pixel regions, wherein each pixel region contains a scanning line and a signal line and is surrounded by the scanning line and the signal line crossing each other at right angles, and in each pixel region is formed an inverted staggered structure thin film transistor comprised by a gate electrode, an island-shaped semiconductor layer opposing the gate electrode across a gate insulation layer, a pair of drain electrode and source electrode separated by a channel gap formed above the semiconductor layer, such that a pixel electrode is formed in a window section surrounded by the scanning line and the signal line for transmitting light, and the gate electrode is connected to the scanning line, the drain electrode is connected to the signal line, and the source electrode is connected to the pixel electrode, said method comprising:

in a first photolithographic step, forming a conductor layer on the transparent insulation substrate plate, and excepting the scanning line, a scanning line terminal section formed in a scanning line start end, and in each pixel region, the gate electrode extending from the scanning line to the thin film transistor section or sharing a portion of the scanning line, removing the conductor layer by etching;

in a second photolithographic step, laminating successively on the transparent insulation substrate plate, a gate insulation layer and a semiconductor layer comprised by an amorphous silicon layer and an n+ amorphous silicon layer, and a metallic layer, and excepting the signal line or a portion covering the signal line, a signal line terminal section formed on the signal line start end section, and in each pixel region, a protrusion section extending from the signal line to the pixel electrode through the thin film transistor section, removing the metallic layer and the semiconductor layer by etching;

in a third photolithographic step, forming a transparent conductive layer on the transparent insulation substrate plate, and excepting the signal line or the portion covering the signal line, the signal line terminal section formed in the signal line start end section, and in each pixel region, the drain electrode extending from the signal line to the thin film transistor section, the pixel electrode, and the source electrode disposed opposite to the drain electrode across a channel gap, removing the transparent conductive layer by etching, and then removing by etching the metallic layer and the $n^+$ amorphous silicon layer where exposed; and in a fourth photolithographic step, forming a protective insulation layer on the transparent insulation substrate plate, and removing the protective insulation layer above the pixel electrode and the signal line terminal section, and the protective insulation layer and the gate insulation layer above the scanning line terminal section by etching, to expose the pixel electrode comprised by the transparent conductive layer, signal line terminal comprised by a lamination of the metallic layer and the transparent conductive layer or the transparent conductive layer itself, and the scanning line terminal comprised by the conductor layer.

2. A method for manufacturing an active matrix substrate plate formed on a transparent insulating substrate plate having an array of pixel regions, wherein each pixel region contains a scanning line and a signal line and is surrounded by the scanning line and the signal line crossing each other at right angles, and in each pixel region is formed an inverted staggered structure thin film transistor comprised by a gate electrode, an island-shaped semiconductor layer opposing the gate electrode across a gate insulation layer, a pair of drain electrode and source electrode separated by a channel gap formed above the semiconductor layer, such that a pixel electrode is formed in a window section surrounded by the scanning line and the signal line for transmitting light, and the gate electrode is connected to the scanning line, the drain electrode is connected to the signal line, and the source electrode is connected to the pixel electrode, said method comprising:

in a first photolithographic step, forming a conductor layer on the transparent insulation substrate plate, and excepting the scanning line, a scanning line terminal section formed in a scanning line start end, and in each pixel region, the gate electrode extending from the scanning line to the thin film transistor section or sharing a portion of the scanning line, removing the conductor layer by etching;

in a second photolithographic step, laminating successively on the transparent insulation substrate plate, a gate insulation layer and a semiconductor layer comprised by an amorphous silicon layer, and forming an $n^+$ amorphous silicon layer on the semiconductor layer by doping with a group V element, and then depositing a metallic layer, and excepting the signal line or a portion covering the signal line, a signal line terminal section formed on a signal line start end section, and in each pixel region, a protrusion section extending from the signal line to the pixel electrode through the thin film transistor section, removing the metallic layer and the semiconductor layer by etching;

in a third photolithographic step, forming a transparent conductive layer on the transparent insulation substrate plate, and excepting the signal line or the portion covering the signal line, the signal line terminal section formed in the signal line start end section, and in each pixel region, the drain electrode extending from the signal line to the thin film transistor section, the pixel electrode, and the source electrode disposed opposite to the drain electrode across a channel gap, removing the transparent conductive layer by etching, and then removing by etching portions of the metallic layer and the $n^+$ amorphous silicon layer formed by doping with a group V element where exposed; and in a fourth photolithographic step, forming a protective insulation layer on the transparent insulation substrate plate, and removing the protective insulation layer above the pixel electrode and the signal line terminal section, and the protective insulation layer and the gate insulation layer above the scanning line terminal section by etching, to expose the pixel electrode comprised by the transparent conductive layer, the signal line terminal comprised by a lamination of the metallic layer and the transparent conductive layer or the transparent conductive layer itself, and the scanning line terminal comprised by the conductor layer.

3. A method for manufacturing an active matrix substrate plate formed on a transparent insulating substrate plate by a plurality of scanning lines alternating with a plurality of common wiring lines, and a pixel region, containing a scanning line and a signal line is surrounded by the scanning line and the signal line crossing at right angles to each other, is arrayed in such a way that in each pixel region is formed an inverted staggered structure thin film transistor comprised by a gate electrode, an island-shaped semiconductor layer opposing the gate electrode across a gate insulation layer, a pair of drain electrode and source electrode separated by a channel gap formed above the semiconductor layer, such that in a window section surrounded by the scanning line and the signal line are formed a pixel electrode of a comb teeth shape and a common electrode of a comb teeth shape connecting to a common wiring line and opposing the pixel electrode, so that the gate electrode is connected to the scanning line, the drain electrode is connected to the signal line, and the source electrode is connected to the pixel electrode, so as to generate a horizontal electrical field with respect to the transparent insulating substrate plate between the pixel electrode and the common electrode, said method comprising:

in a first photolithographic step, forming a conductor layer on the transparent insulation substrate plate, and excepting the scanning line, a scanning line terminal section formed in a scanning line start end, and, a common wiring line whose end section at least in one perimeter section of the transparent insulation substrate plate extends outside of an end section of the scanning line in the same perimeter section, a common wiring line linking line for electrically connecting end sections of the common wiring lines, and in each pixel region, the gate electrode sharing a portion of the scanning line, and a plurality of common electrodes extending from the common wiring line, removing the conductor layer by etching;

in a second photolithographic step, laminating successively on the transparent insulation substrate plate, a gate insulation layer and a semiconductor layer comprised by an amorphous silicon layer and an $n^+$ amorphous silicon layer, and a metallic layer, and excepting the signal line or the portion covering the signal line, a signal line terminal section formed in the signal line start end section, and in each pixel region, a protrusion section extending from the signal line to the pixel electrode section through the thin film transistor section, removing the metallic layer and the semiconductor layer by etching;

in a third photolithographic step, laminating on the transparent insulation substrate plate a transparent conductive layer or a nitride film layer of a metal or a second metallic layer, and excepting the signal line or the portion covering the signal line, the signal line terminal section formed in the signal line start end section, and in each pixel region, the drain electrode extending from the signal line to the thin film transistor section above the gate electrode, the pixel electrode opposing the common electrode across the gate insulation layer, and the source electrode extending from the pixel electrode to the thin film transistor section disposed opposite to the drain electrode across a channel gap, removing the transparent conductive layer or the nitride film layer of a metal or the second metallic layer by etching, and then removing by etching portions of the metallic layer and the n+ amorphous silicon layer where exposed; and in a fourth photolithographic step, forming a protective insulation layer on the transparent insulation substrate plate, and removing the protective insulation layer above the signal line terminal section and the protective insulation layer and the gate insulation layer above the scanning line terminal section by etching, to expose the signal line terminal comprised by any one of a lamination of the metallic layer and the transparent conductive layer or a nitride film layer of a metal, or the transparent conductive layer, or a nitride film layer of a metal, or the second metallic layer, and the scanning line terminal comprised by the conductor layer.

4. A method for manufacturing an active matrix substrate plate formed on a transparent insulating substrate plate by a plurality of scanning lines alternating with a plurality of common wiring lines, and a pixel region, containing a scanning line and a signal line is surrounded by the scanning line and the signal line crossing at right angles to each other, is arrayed in such a way that in each pixel region is formed an inverted staggered structure thin film transistor comprised by a gate electrode, an island-shaped semiconductor layer opposing the gate electrode across a gate insulation layer, a pair of drain electrode and source electrode separated by a channel gap formed above the semiconductor layer, such that in a window section surrounded by the scanning line and the signal line are formed a pixel electrode of a comb teeth shape and a common electrode of a comb teeth shape connecting to a common wiring line and opposing the pixel electrode, so that the gate electrode is connected to the scanning line, the drain electrode is connected to the signal line, and the source electrode is connected to the pixel electrode, so as to generate a horizontal electrical field with respect to the transparent insulating substrate plate between the pixel electrode and the common electrode, said method comprising:

in a first photolithographic step, forming a conductor layer on the transparent insulation substrate plate, and excepting the scanning line, a scanning line terminal section formed in a scanning line start end, and, a common wiring line whose end section at least in one perimeter section of the transparent insulation substrate plate extends outside of an end section of the scanning line in the same perimeter section, a common wiring line linking line for electrically connecting end sections of the common wiring lines, and in each pixel region, the gate electrode sharing a portion of the scanning line, and a plurality of common electrodes extending from the common wiring line, removing the conductor layer by etching;

in a second photolithographic step, laminating successively on the transparent insulation substrate plate, a gate insulation layer and a semiconductor layer comprised by an amorphous silicon layer, and forming an $n^+$ amorphous silicon layer on the semiconductor layer by doping with a group V element, and then depositing a metallic layer, and excepting the signal line or a portion covering the signal line, a signal line terminal section formed in a signal line start end section, and in each pixel region, a protrusion section extending from the signal line to the pixel electrode section through the thin film transistor section, removing the metallic layer and the semiconductor layer by etching;

in a third photolithographic step, laminating on the transparent insulation substrate plate a transparent conductive layer or a nitride film layer of a metal or a second metallic layer, and excepting the signal line or the portion covering the signal line, the signal line terminal section formed in the signal line start end section, and in each pixel region, the drain electrode extending from the signal line to the thin film transistor section above the gate electrode, the pixel electrode opposing the common electrode across the gate insulation layer, and the source electrode extending from the pixel electrode to the thin film transistor section disposed opposite to the drain electrode across a channel gap, removing the transparent conductive layer or the nitride film layer of a metal or the second conductor layer by etching, and then removing by etching the metallic layer and the n+ amorphous silicon layer formed by doping with the group V element where exposed; and in a fourth photolithographic step, forming a protective insulation layer on the transparent insulation substrate plate, and removing the protective insulation layer above the signal line terminal section, and the protective insulation layer and the gate insulation layer above the scanning line terminal section by etching, to expose the signal line terminal comprised by any one of a lamination of the metallic layer and the transparent conductive layer or a metal nitride film, or the transparent conductive layer, or a metal nitride film layer, or the second metallic layer, and the scanning line terminal comprised by the conductor layer.

5. A method for manufacturing an active matrix substrate plate formed on a transparent insulating substrate plate by a plurality of scanning lines alternating with a plurality of common wiring lines, and a pixel region, containing a scanning line and a signal line is surrounded by the scanning line and the signal line crossing at right angles to each other, is arrayed in such a way that in each pixel region is formed an inverted staggered structure thin film transistor comprised by a gate electrode, an island-shaped semiconductor layer opposing the gate electrode across a gate insulation layer, a pair of drain electrode and source electrode separated by a channel gap formed above the semiconductor layer, such that in a window section surrounded by the scanning line and the signal line are formed a pixel electrode of a comb teeth shape and a common electrode of a comb teeth shape connecting to a common wiring line and opposing the pixel electrode, so that the gate electrode is connected to the scanning line, the drain electrode is connected to the signal line, and the source electrode is connected to the pixel electrode, so as to generate a horizontal electrical field with respect to the transparent insulating substrate plate between the pixel electrode and the common electrode, said method comprising:

in a first photolithographic step, forming a conductor layer on the transparent insulation substrate plate, and excepting the scanning line, a scanning line terminal section formed in a scanning line start end, and a common wiring line whose end section at least in one perimeter section of the transparent insulation substrate plate extends outside of an end section of the scanning line in the same perimeter section, a common wiring line linking line for electrically connecting end sections of the common wiring lines, and in each pixel region, the gate electrode sharing a portion of the scanning line, and a plurality of common electrodes extending from the common wiring line, removing the conductor layer by etching;

in a second photolithographic step, laminating successively on the transparent insulation substrate plate, a gate insulation layer and a semiconductor layer comprised by an amorphous silicon layer and an $n^+$ amorphous silicon layer, and a metallic layer, and excepting the signal line or a portion covering the signal line, a signal line terminal section formed in a signal line start end section, and in each pixel region, a protrusion section extending from the signal line to the pixel electrode section through the thin film transistor section, and the pixel electrode extending from the protrusion section to the common electrode through the gate insulation layer or the portion covering the pixel electrode, removing the metallic layer and the semiconductor layer by etching;

in a third photolithographic step, laminating on the transparent insulation substrate plate, a transparent conductive layer or a nitride layer of a metal or a second metallic layer, and excepting the signal line or the portion covering the signal line, the signal line terminal section formed in the signal line start end section, and in each pixel region, the drain electrode extending from the signal line to the thin film transistor section above the gate electrode, the pixel electrode or the portion covering the pixel electrode, and the source electrode extending from the pixel electrode to the thin film transistor section disposed opposite to the drain electrode across a channel gap, removing the transparent conductive layer or the nitride film layer of a metal or the second metallic layer by etching, and then removing by etching the metallic layer and the $n^+$ amorphous silicon layer where exposed; and in a fourth photolithographic step, forming a protective insulation layer on the transparent insulation substrate plate, and removing the protective insulation layer above the signal line terminal section, and the protective insulation layer and the gate insulation layer above the scanning line terminal section by etching, to expose the signal line terminal comprised by any one of a lamination of the metallic layer and the transparent conductive layer or a metal nitride film, or the transparent conductive layer or a metal nitride film layer or the second metallic layer, and the scanning line terminal comprised by the conductor layer.

6. A method for manufacturing an active matrix substrate plate formed on a transparent insulating substrate plate by a plurality of scanning lines alternating with a plurality of common wiring lines, and a pixel region, containing a scanning line and a signal line is surrounded by the scanning line and the signal line crossing at right angles to each other, is arrayed in such a way that in each pixel region is formed an inverted staggered structure thin film transistor comprised by a gate electrode, an island-shaped semiconductor layer opposing the gate electrode across a gate insulation layer, a pair of drain electrode and source electrode separated by a channel gap formed above the semiconductor layer, such that in a window section surrounded by the scanning line and the signal line are formed a pixel electrode of a comb teeth shape and a common electrode of a comb teeth shape connecting to a common wiring line and opposing the pixel electrode, so that the gate electrode is connected to the scanning line, the drain electrode is connected to the signal line, and the source electrode is connected to the pixel electrode, so as to generate a horizontal electrical field with respect to the transparent insulating substrate plate between the pixel electrode and the common electrode, said method comprising:

in a first photolithographic step, forming a conductor layer on the transparent insulation substrate plate, and excepting the scanning line, a scanning line terminal section formed in a scanning line start end, and a common wiring line whose end section at least in one perimeter section of the transparent insulation substrate plate extends outside of an end section of the scanning line in the same perimeter section, a common wiring line linking line for electrically connecting end sections of the common wiring lines, and in each pixel region, the gate electrode sharing a portion of the scanning line, and a plurality of common electrodes extending from the common wiring line, removing the conductor layer by etching;

in a second photolithographic step, laminating successively on the transparent insulation substrate plate, a gate insulation layer and a semiconductor layer comprised by an amorphous silicon layer, and forming an $n^+$ amorphous silicon layer on the semiconductor layer by doping with a group V element, and then depositing a metallic layer, and excepting the signal line or the portion covering the signal line, a signal line terminal section formed in a signal line start end section, and in each pixel region, a protrusion section extending from the signal line to the pixel electrode section through the thin film transistor section, and the pixel electrode extending from the protrusion section to the opposing common electrode through the gate insulation layer or a portion covering the pixel electrode, removing the metallic layer and the semiconductor layer by etching;

in a third photolithographic step, laminating on the transparent insulation substrate plate a transparent conductive layer or a nitride layer of a metal or a second metallic layer, and excepting the signal line or the portion covering the signal line, the signal line terminal section formed in the signal line start end section, and in each pixel region, the drain electrode extending from the signal line to the thin film transistor section above the gate electrode, the pixel electrode or the portion covering the pixel electrode, and the source electrode extending from the pixel electrode to the thin film transistor section disposed opposite to the drain electrode across a channel gap, removing the transparent conductive layer or the nitride film layer of a metal or the second metallic layer by etching, and then removing the metallic layer and the $n^+$ amorphous silicon layer formed by doping of the group V element, where expose, by etching; and in a fourth photolithographic step, forming a protective insulation layer on the transparent insulation substrate plate, and removing the protective insulation layer above the signal line terminal section and the protective insulation layer and the gate insulation layer above the scanning line terminal section by etching, to expose the signal line terminal comprised by any one of a lamination of the metallic layer and the transparent conductive layer or a metal nitride film, or the transparent conductive layer or a metal nitride film layer or the second metallic layer, and the scanning line terminal comprised by the conductor layer.

7. A method for manufacturing an active matrix substrate plate according to one of claims 1 to 6, wherein in said first photolithographic step, said conductor layer is formed by laminating Al or an alloy of primarily Al, or by laminating a high melting point metal and an upper layer of Al or an alloy of primarily Al on the transparent insulation substrate plate.

8. A method for manufacturing an active matrix substrate plate according to one of claims 1 to 6 wherein in said first photolithographic step, said conductor layer is formed by laminating not less than one layer of a conductive film and an upper layer of a nitride film of a metal or a transparent conductive film on the transparent insulation substrate plate.

9. A method of manufacturing an active matrix substrate plate according to one of claims 3–6, wherein in said third photolithographic step, said second conductor layer or said second metallic layer is formed by laminating a high melting point metal and an upper layer of Al or an alloy of primarily Al.

10. A method of manufacturing an active matrix substrate plate according to claim 8, wherein said nitride film of a metal is comprised by a nitride film of Ti, Ta, Nb, Cr or a nitride film of an alloy comprised primarily of at least one metal selected from Ti, Ta, Nb, Cr.

11. A method of manufacturing an active matrix substrate plate according to claim 10, wherein said nitride film of a metal is formed by reactive sputtering so as to produce a nitrogen concentration of not less than 25 atomic percent.

12. A method of manufacturing an active matrix substrate plate according to one of claims 1–6, wherein, on the outside of a display surface where said pixel regions are arranged in a matrix, a gate-shunt bus line is formed for electrically connecting the respective scanning line, and on the outside of the display surface, a drain-shunt bus line is formed for electrically connecting the respective signal line, and the gate-shunt bus line and the drain-shunt bus line are connected at least at one point, and when manufacturing said active matrix substrate plate, in the first photolithographic step, excepting the gate-shunt bus line for electrically connecting respective scanning line, removing the conductor layer by etching;

in the second photolithographic step, removing by etching the metallic layer and the semiconductor layer above the gate-shunt bus line;

in the third photolithographic step, leaving so as to superimpose the drain-shunt bus line for electrically connecting respective signal line on the gate-shunt bus line at one point at least and removing the transparent conductive layer, and next, removing the metallic layer and the $n^+$ amorphous silicon layer where exposed by etching; and in the fourth photolithographic step, removing by etching the protective insulation layer on top of a superposition location of the gate-shunt bus line and the drain-shunt bus line, and irradiating the superposition location with a laser beam to fuse and short circuit the gate-shunt bus line and the drain-shunt bus line by punching through the gate insulation layer.

13. A method of manufacturing an active matrix substrate plate according to one of claim 1 or 2, wherein, on the outside of a display surface where said pixel regions are arranged in a matrix, a high resistance line for electrically connecting adjacent signal lines or for electrically connecting a signal line and a common wiring line is provided, and when manufacturing said active matrix substrate plate, in the second photolithographic step, excepting the portion to form the high resistance line, removing the metallic layer and the semiconductor layer by etching; and in the third photolithographic step, removing by etching the transparent conductive layer above the portion to form the high resistance line and then removing the metallic layer and the $n^+$ amorphous silicon layer where exposed by etching, thereby forming the signal line and the high resistance line using a same step.

14. A method of manufacturing an active matrix substrate plate according to one of claims 3–6, wherein, on the outside of a display surface where said pixel regions are arranged in a matrix, a high resistance line for electrically connecting adjacent signal lines or for electrically connecting a signal line and a signal line linking line connected to a common wiring line is provided, and when manufacturing said active matrix substrate plate, in the second photolithographic step, excepting the portions to form the signal line linking line and the high resistance line, removing the metallic layer and the semiconductor layer by etching;

in the third photolithographic step, removing by etching the transparent conductive layer above the portion to form the high resistance line and then removing the metallic layer and the $n^+$ amorphous silicon layer where exposed by etching, thereby making the signal line and the high resistance line in a same step;

in the fourth photolithographic step, removing by etching a portion of the protective insulation layer above the signal line linking line, and a portion of the protective insulation layer and the gate insulation layer above the common wiring line, and in the subsequent steps, through the opening section formed in the protective insulation layer above the signal line linking line and the opening section formed in the protective insulation layer and the gate insulation layer above the common wiring line, the signal line linking line and the common wiring line are connected by silver beading.

15. A method of manufacturing an active matrix substrate plate according to claim 1 or 2, wherein, on the outside of a display surface where the pixel regions are arranged in a matrix where adjacent signal lines are linked to each other across the semiconductor layer comprised by amorphous silicon above the floating electrode formed concurrently with the scanning lines, or the signal line is connected electrically to the common wiring line across the semiconductor layer comprised by amorphous silicon above the floating electrode formed concurrently with the scanning lines, and when manufacturing said active matrix substrate plate, in the first photolithographic step, excepting the floating electrode, removing the conductor layer by etching;

in the second photolithographic step, leaving so as to link the adjacent signal lines or the signal line and the common wiring line, removing the metallic layer and the semiconductor layer by etching; and in the third photolithographic step, removing by etching the transparent conductive layer on top of a portion where the adjacent signal lines or the signal line and the common wiring line are electrically connected, and then removing the metallic layer and the $n^+$ amorphous silicon layer where exposed by etching, thereby making the signal line and the common wiring line and the semiconductor layer of the linking portion in a same step.

16. A method of manufacturing an active matrix substrate plate according to one of claims 3–6, wherein, on the outside of a display surface where the pixel regions are arranged in a matrix, where adjacent signal lines are electrically connected to each other across the semiconductor layer comprised by amorphous silicon above the floating electrode formed concurrently with the scanning lines, or the signal line is connected electrically to the signal line linking line connected to a common line linking line across the semiconductor layer comprised by amorphous silicon above the floating electrode formed concurrently with the scanning lines, and when manufacturing said active matrix substrate plate, in the first photolithographic step, excepting the floating electrode, removing the conductor layer by etching;

in the second photolithographic step, removing the metallic layer and the semiconductor layer by etching so as to electrically connect the adjacent signal lines or the signal line and the common wiring line linking line, in the third photolithographic step, removing by etching the transparent conductive layer above the adjacent signal lines or a portion where the signal line and the common wiring line linking line are linked, and then removing the metallic layer and the $n^+$ amorphous silicon layer where exposed by etching, thereby making the signal line and the common wiring line linking line and the semiconductor layer at the linked portion in a same step;

in the fourth photolithographic step, removing by etching a portion of the protective insulation layer above the signal line linking line, and a portion of the protective insulation layer and the gate insulation layer above the common wiring line, and in the subsequent steps, through the opening section formed in the protective insulation layer above the signal line linking line and the opening section formed in protective insulation layer and the gate insulation layer above the common wiring line, the signal line linking line and the common wiring line are connected by silver beading.

17. A method of manufacturing an active matrix substrate plate according to one of claim 1, 2, wherein, in the first photolithographic step, the conductor layer is removed by etching so as to leave the light blocking layer to superimpose at least on one section of the perimeter section of each pixel region.

* * * * *